US007761465B1

(12) United States Patent
Nonaka et al.

(10) Patent No.: US 7,761,465 B1
(45) Date of Patent: Jul. 20, 2010

(54) DATA PROVIDING SYSTEM AND METHOD THEREFOR

(75) Inventors: Akira Nonaka, Kanagawa (JP); Tadashi Ezaki, Tokyo (JP)

(73) Assignee: Sony Corporation, Tokyo (JP)

( * ) Notice: Subject to any disclaimer, the term of this patent is extended or adjusted under 35 U.S.C. 154(b) by 2624 days.

(21) Appl. No.: 09/856,276

(22) PCT Filed: Sep. 14, 2000

(86) PCT No.: PCT/JP00/06308

§ 371 (c)(1),
(2), (4) Date: Oct. 2, 2001

(87) PCT Pub. No.: WO01/22242

PCT Pub. Date: Mar. 29, 2001

(30) Foreign Application Priority Data

Sep. 17, 1999 (JP) ................................ 11-309721
Sep. 17, 1999 (JP) ................................ 11-309722

(51) Int. Cl.
*G06F 17/30* (2006.01)

(52) U.S. Cl. ........................ 707/770; 713/161; 713/165

(58) Field of Classification Search ................. 709/200; 713/155, 185, 165, 194, 161; 707/10, 9, 707/102, 104.1, 770; 705/57, 54, 26, 56, 705/53, 51; 380/30, 705, 54, 37, 233, 228
See application file for complete search history.

(56) References Cited

U.S. PATENT DOCUMENTS 4,238,854 A * 12/1980 Ehrsam et al. ............. 713/165
4,652,990 A * 3/1987 Pailen et al. .................. 705/56
5,010,571 A * 4/1991 Katznelson .................. 705/53
5,029,207 A * 7/1991 Gammie ..................... 380/228
5,081,678 A * 1/1992 Kaufman et al. ............ 713/161
5,081,680 A * 1/1992 Bennett ...................... 380/233

(Continued)

FOREIGN PATENT DOCUMENTS

EP 0715246 11/1995

(Continued)

OTHER PUBLICATIONS

A Consideration About the Platform of Network Music Contents Distribution, A. Sunada, et al, (DICOMO '98) Symposium Ronbunshu, pp. 587-593, Jul. 8, 1998.

(Continued)

*Primary Examiner*—Shahid A Alam
(74) *Attorney, Agent, or Firm*—Sonnenschein Nath & Rosenthal LLP

(57) ABSTRACT

To provide a data providing system able to protect the interests of interested parties of a data providing apparatus. The content provider 101 distributes a secure container 104 storing content data encrypted using content key data, content key data encrypted using distribution key data, and encrypted usage control policy data showing handling of the content data to a SAM $\mathbf{105}_1$ of a user home network 103. The SAM $\mathbf{105}_1$ etc. decrypts the content key data and usage control policy data stored in the secure container 104 and determines the handling such as the purchase form and usage form of the content data based on the decrypted usage control policy data.

10 Claims, 142 Drawing Sheets

U.S. PATENT DOCUMENTS

| | | | | |
|---|---|---|---|---|
| 5,349,643 | A * | 9/1994 | Cox et al. | 713/155 |
| 5,495,533 | A * | 2/1996 | Linehan et al. | 713/155 |
| 5,701,343 | A | 12/1997 | Takashima et al. | |
| 5,848,158 | A * | 12/1998 | Saito et al. | 705/54 |
| 6,005,943 | A * | 12/1999 | Cohen et al. | 380/30 |
| 6,081,794 | A * | 6/2000 | Saito et al. | 705/57 |
| 6,240,441 | B1 * | 5/2001 | Beckett et al. | 709/200 |
| 6,249,866 | B1 * | 6/2001 | Brundrett et al. | 713/165 |
| 6,343,283 | B1 * | 1/2002 | Saito et al. | 705/57 |
| 6,351,813 | B1 * | 2/2002 | Mooney et al. | 713/185 |
| 6,587,837 | B1 * | 7/2003 | Spagna et al. | 705/26 |
| 6,728,713 | B1 * | 4/2004 | Beach et al. | 707/10 |
| 6,738,905 | B1 * | 5/2004 | Kravitz et al. | 713/194 |
| 6,792,425 | B2 * | 9/2004 | Yagawa et al. | 707/10 |
| 2002/0076044 | A1 * | 6/2002 | Pires | 380/37 |
| 2003/0105718 | A1 * | 6/2003 | Hurtado et al. | 705/51 |

FOREIGN PATENT DOCUMENTS

| | | |
|---|---|---|
| JP | 10161937 | 6/1998 |
| JP | 1185504 | 3/1999 |
| WO | WO 96/27155 | 9/1996 |
| WO | WO 98/10381 | 3/1998 |

OTHER PUBLICATIONS

"Sound-Recording Database and Content Distribution via Networks for the Recording Industry", H.Uriu et al, Recording Industry Association of Japan, Sep. 19, 1998, pp. 105-111. vol. 98, No. 85.

EP Communication dated May 30, 2008 for Application No. 00961019.7-1245.

* cited by examiner

SAM $105_1$

FIG.27

DATA STORED IN EXTERNAL MEMORY 201

USAGE LOG DATA 108
SAM REGISTRATION LIST

FIG.28

DATA STORED IN STACK MEMORY 200

CONTENT KEY DATA $K_C$
USAGE CONTROL POLICY DATA(USP) 106
LOCK KEY DATA $K_{LOG}$ OF STORAGE UNIT(FLASH MEMORY) 192
CERTIFICATE $CER_{CP}$ OF CONTENT PROVIDER 101
USAGE CONTROL STATUS DATA(UCS) 166
SAM PROGRAM DOWNLORD CONTAINERS $SD_1$ TO $SDC_3$ $105_1 \sim 105_4$ SAM

SAM105₂

1051~1054SAM $105_2$SAM

FIG.42A 101(CP)→SAM105₁ (IN-BAND)
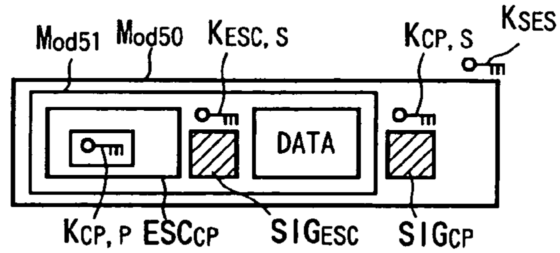
FIG.42B 101(CP)→SAM105₁ (OUT-OF-BAND)
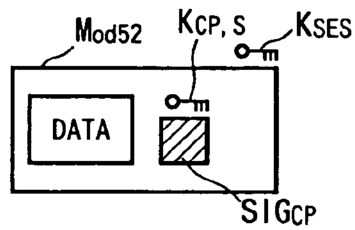
FIG.42C 102(ESC)→SAM105₁ (OUT-OF-BAND)
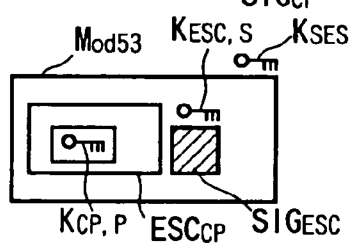
FIG.42D SAM105₁→101(CP) (IN-BAND)
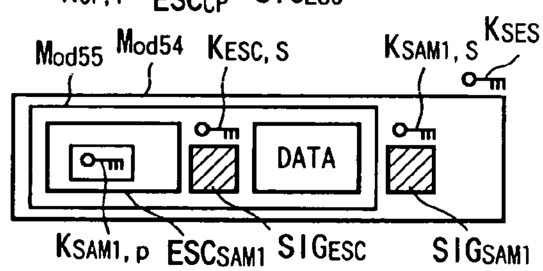
FIG.42E SAM105₁→101(CP) (OUT-OF-BAND)
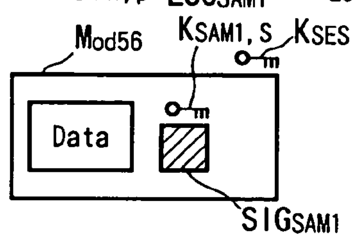
FIG.42F 102(ESC)→101(CP) (OUT-OF-BAND)
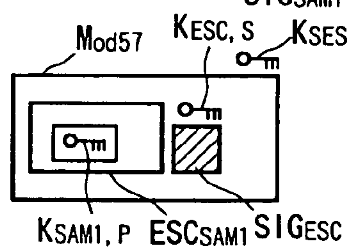

FIG.43G 101(CP)→102(ESC) (IN-BAND)
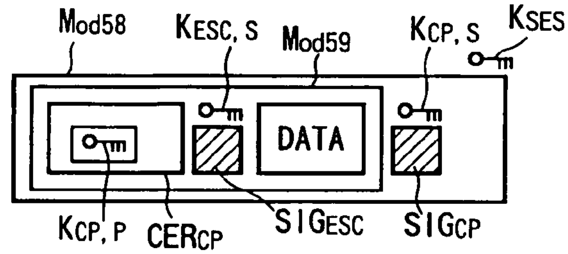
FIG.43H 101(CP)→102(ESC) (OUT-OF- BAND)
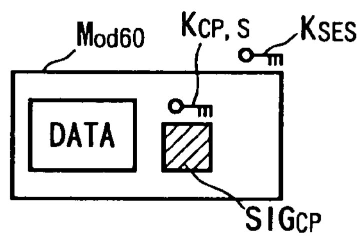
FIG.43I SAM105₁→102(ESC) (IN-BAND)
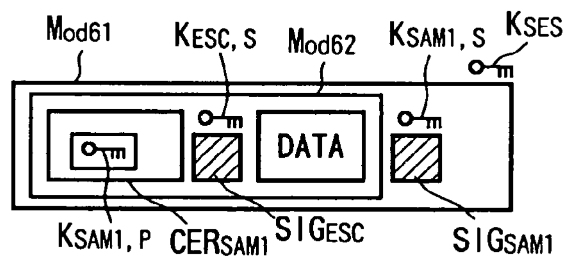
FIG.43J SAM105₁→102(ESC) (OUT-OF-BAND)
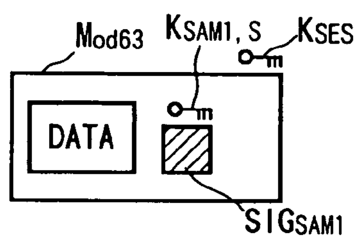

SAM REGISTRATION LIST (PREPARED BY EMD SERVICE CENTER)

FIG.73

CONTENT OF USAGE LOG DATA 308

IDENTIFIER Content_ID
IDENTIFIER CP_ID
IDENTIFIER SP_ID
SIGNAL PARAMETER DATA OF CONTENT DATA C
COMPRESSION METHOD OF CONTENT DATA C
IDENTIFIER MEDIA_ID OF STORAGE MEDIA
IDENTIFIER SAM_ID
USER_ID OF USER

FIG.77

STORED DATA OF STACK MEMORY 200

CONTENT KEY DATA $K_C$
USAGE CONTROL POLICY DATA(UCP) 106
LOCK KEY DATA $K_{LOC}$ OF NOVOLATILE MEMORY 201
PUBLIC KEY CERTIFICATE DATA $CER_{CP}$ OF CONTENT PROVIDER 301
PUBLIC KEY CERTIFICATE DATA $CER_{SP}$ OF SERVICE PROVIDER 301
USAGE CONTROL STATUS DATA(UCS) 166
SAM PROGRAM DOWNLOAD CONTAINERS $SD_1$～$SDC_3$
PRICE TAG DATA 312

$305_2$SAM

INCREMENT OF SECURE CONTAINER TO PROTOCOL CLASS WHERE MHEG IS USED IN DATA BROADCAST METHOD OF DIGITAL BROADCAST

ACQUISITION ROUTE OF PUBLIC KEY CERTIFICATE

WHERE CERSAM2 IS INVALIDATED

DATA FORMAT OF SECURE CONTAINER (COMPOSITE TYPE)-①

DATA FORMAT OF SECURE CONTAINER (COMPOSITE TYPE)-②

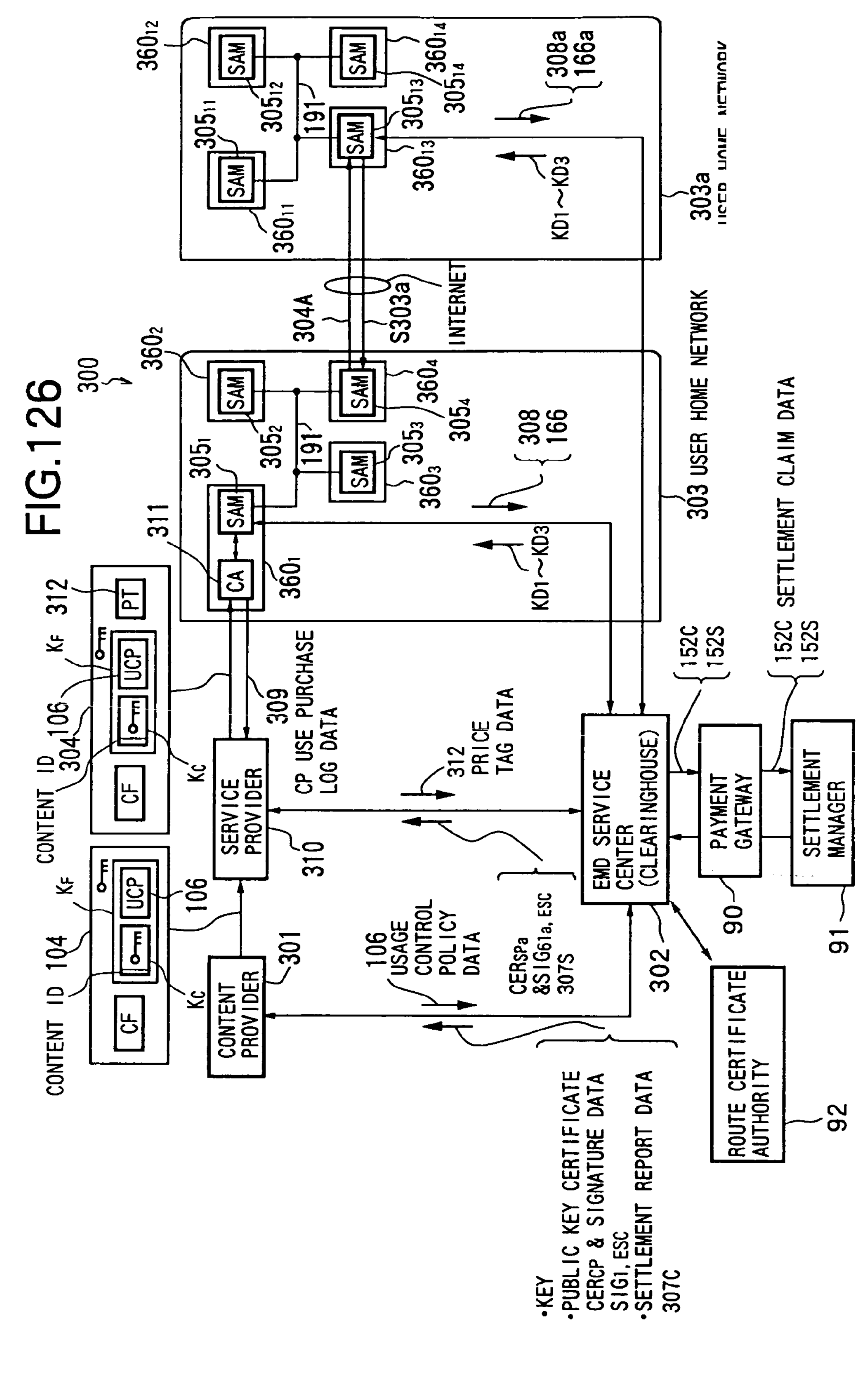

FIG.126
300
CONTENT ID 104
CONTENT ID 304
CF
UCP
PT
KF
KC
106
312
309
311
CA
SAM
CONTENT PROVIDER
301
SERVICE PROVIDER
310
CP USE PURCHASE LOG DATA
106 USAGE CONTROL POLICY DATA
312 PRICE TAG DATA
CERSPa &SIG61a, ESC 307S
•KEY
•PUBLIC KEY CERTIFICATE CERCP & SIGNATURE DATA SIG1, ESC
•SETTLEMENT REPORT DATA 307C
EMD SERVICE CENTER (CLEARINGHOUSE)
302
ROUTE CERTIFICATE AUTHORITY
92
PAYMENT GATEWAY
90
SETTLEMENT MANAGER
91
152C 152S
SETTLEMENT CLAIM DATA
303 USER HOME NETWORK
303a
308 166
308a 166a
KD1～KD3
191
304A
S303a
INTERNET
3601 3602 3603 3604
3051 3052 3053 3054
36011 36012 36013 36014
30511 30512 30513 30514

FILE INCLUSION SIZE RELATIONSHIP OF SECURE CONTAINER

DATA PROVIDING SYSTEM AND METHOD THEREFOR

TECHNICAL FIELD

The present invention relates to a data providing system providing content data and a method of same, a data providing apparatus, and a data processing apparatus.

BACKGROUND ART

There is a data providing system for distributing encrypted content data to data processing apparatuses of users concluding predetermined contracts and having the related data processing apparatuses decrypt and reproduce and record the content data.

As one of such data providing systems, there is the conventional EMD (electronic music distribution) system for distributing music data.

FIG. 145 is a view of the configuration of a conventional EMD system 700.

In the EMD system 700 shown in FIG. 145, content providers 701*a* and 701*b* encrypt content data 704*a*, 704*b*, and 704*c* and copyright information 705*a*, 705*b*, and 705*c* by session key data obtained after mutual certification and supply them to a service provider 710 on-line or supply by off-line. Here, the copyright information 705*a*, 705*b*, and 705*c* include for example SCMS (serial copy management system) information, electronic watermark information requesting burying in the content data, and information concerning the copyright requesting burying in a transmission protocol of the service provider 710.

The service provider 710 decrypts the received content data 704*a*, 704*b*, and 704*c* and copyright information 705*a*, 705*b*, and 705*c* by using the session key data.

Then, the service provider 710 buries the copyright information 705*a*, 705*b*, and 705*c* in the content data 704*a*, 704*b*, and 704*c* decrypted or received off-line to produce content data 707*a*, 707*b*, and 707*c*. At this time, the service provider 710 changes predetermined frequency domains of for example the electronic watermark information among the copyright information 705*a*, 705*b*, and 705*c* and buries them in the content data 704*a*, 704*b*, and 704*c* and buries the SCMS information in a network protocol used when transmitting the related content data to the user.

Further, the service provider 710 encrypts the content data 707*a*, 707*b*, and 707*c* by using content key data Kca, Kcb, and Kcc read out from a key database 706. Thereafter, the service provider 710 encrypts a secure container 722 storing the encrypted content data 707*a*, 707*b*, and 707*c* by the session key data obtained after the mutual certification and transmits the same to a CA (conditional access) module 711 existing in a terminal 709 of the user.

The CA module 711 decrypts the secure container 722 by using the session key data. Also, the CA module 711 receives the content key data Kca, Kcb, and Kcc from the key database 706 of the service provider 710 by using a charge function such as an electronic settlement and CA and decrypts them by using the session key data. By this, in the terminal 709, it becomes possible to decrypt the content data 707*a*, 707*b*, and 707*c* by using the content key data Kca, Kcb, and Kcc.

At this time, the CA module 711 performs charge processing in units of content, produces charge information 721 in accordance with a result of this, and encrypts this by the session key data and then transmits the same to a right clearing module 720 of the service provider 710.

In this case, the CA module 711 collects items to be managed by the service provider 710 concerning services provided by itself, that is, the contract (update) information and the monthly basic fee and other network rent of the users, performs the charge processing in units of the content, and ensure security of a physical layer of the network.

The service provider 710 performs distributes profit among the service provider 710 and the content providers 701*a*, 701*b*, and 701*c* when receiving the charge information 721 from the CA module 711.

At this time, the profit is distributed from the service provider 710 to the content providers 701*a*, 701*b*, and 701*c* via for example the JASRAC (Japanese Society for Rights of Authors, Composers, and Publishers). Also, the profit of the content provider is distributed to copyright owner, an artist, a song writer, and/or composer of the related content data and their affiliated production companies by the JASRAC.

Also, in the terminal 709, when recording the content data 707*a*, 707*b*, and 707*c* decrypted by using the content key data Kca, Kcb, and Kcc in a RAM type storage medium 723 or the like, copying is controlled by rewriting SCMS bits of the copyright information 705*a*, 705*b*, and 705*c*. Namely, on the user side, copying is controlled based on the SCMS bits buried in the content data 707*a*, 707*b*, and 707*c* to achieve protection of the copyright.

The SCMS prohibits copying of the content data over for example two generations. Copying of one generation can be carried out without restriction, however, so there is a problem of insufficient protection of the copyright owner.

Also, in the EMD system 700, the content data not encrypted by the service provider 710 can be technically freely handled, so interested parties of the content provider 710 must monitor actions etc. of the service provider 710, so there are problems in that the load of the related monitoring is large and, at the same time, there is a high possibility of improper loss of the profit of the content provider 701.

Also, in the EMD system 700, it is difficult to restrict acts of the terminal 709 of the user authoring the content data distributed from the service provider 710 and redistributing the same to another terminal etc., so there is the problem of the Improper loss of the profit of the content provider 701.

DISCLOSURE THE INVENTION

The present invention was made in consideration with the problems of the related art mentioned above and has as an object thereof to provide a data providing system capable of adequately protecting the profit of right holders (interested parties) of the content provider and a method of the same.

Also, another object of the present invention is to provide a data providing system capable of reducing the load of inspection for protecting the profit of the right holders of the content provider and a method of the same.

To solve the problems of the prior art mentioned above and achieve the above objects, a data providing system of a first aspect of the present invention is preferably a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data, the data providing apparatus provides the content data encrypted by using the content key data, and the data processing apparatus decrypts the content key data and the usage control policy data stored in the key file and determines the handling of the content data based on the related decrypted usage control policy data.

The mode of operation of the data providing system of the first aspect of the present invention becomes as follows.

In the management apparatus, the key file storing the encrypted content key data and the encrypted usage control policy data indicating the handling of the content data is produced, and the related key file is sent to the data providing apparatus.

Then, the content data encrypted by using the content key data is provided from the data providing apparatus to the data processing apparatus.

Then, in the data processing apparatus, the content key data and the usage control policy data stored in the key file are decrypted, and the handling of the content data is determined based on the related decrypted usage control policy data.

Also, a data providing system of a second aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data, the data providing apparatus distributes a module storing a content file storing the content data encrypted by using the content key data and the key file received from the management apparatus to the data processing apparatus, and the data processing apparatus decrypts the content key data and the usage control policy data stored in the distributed module and determines the handling of the content data based on the related decrypted usage control policy data.

The mode of operation of the data providing system of the second aspect of the present invention becomes as follows.

In the management apparatus, the key file storing the encrypted content key data and the encrypted usage control policy data indicating the handling of the content data is produced.

Then, the related produced key file is distributed from the management apparatus to the data providing apparatus.

Then, the module storing the content file storing the content data encrypted by using the content key data and the key file received from the management apparatus is distributed from the data providing apparatus to the data processing apparatus.

Then, in the data processing apparatus, the content key data and the usage control policy data stored in the distributed module are decrypted, and the handling of the content data is determined based on the related decrypted usage control policy data.

A data providing system of a third aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data, the data providing apparatus distributes a module storing a content file containing content data encrypted by using the content key data and the key file received from the management apparatus to the data processing apparatus, and the data processing apparatus decrypts the content key data and the usage control policy data stored in the distributed module and determines the handling of the content data based on the related decrypted usage control policy data.

The mode of operation of the data providing system of the third aspect of the present invention becomes as follows.

In the management apparatus, the key file storing the encrypted content key data and the encrypted usage control policy data indicating the handling of the content data is produced, and the related produced key file is sent to the data providing apparatus.

Then, the module storing the content file containing the content data encrypted by using the content key data and the key file received from the management apparatus is distributed from the data providing apparatus to the data processing apparatus.

Then, in the data processing apparatus, the content key data and the usage control policy data stored in the distributed module are decrypted, and the handling of the content data is determined based on the related decrypted usage control policy data.

Also, a data providing system of a fourth aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data, the data providing apparatus individually distributes the content file storing the content data encrypted by using the content key data and the key file received from the management apparatus to the data processing apparatus, and the data processing apparatus decrypts the content key data and the usage control policy data stored in the distributed key file and determines the handling of the content data stored in the distributed content file based on the related decrypted usage control policy data.

The mode of operation of the data providing system of the fourth aspect of the present invention becomes as follows.

In the management apparatus, the key file storing the encrypted content key data and the encrypted usage control policy data indicating the handling of the content data is produced, and the related produced key file is sent to the data providing apparatus.

Then, in the data providing apparatus, the content file storing the content data encrypted by using the content key data and the key file received from the management apparatus are distributed.

Then, in the data processing apparatus, the content key data and the usage control policy data stored in the distributed key file are decrypted, and the handling of the content data stored in the distributed content file is determined based on the related decrypted usage control policy data.

Also, a data providing system of a fifth aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data and distributes the related produced key file to the data processing apparatus, the data providing apparatus distributes a content file storing the content data encrypted by using the content key data to the data processing apparatus, and the data processing apparatus decrypts the content key data and the usage control policy data stored in the distributed key file and determines the handling of the content data stored in the distributed content file based on the related decrypted usage control policy data.

The mode of operation of the data providing system of the fifth aspect of the present invention becomes as follows.

In the management apparatus, the key file storing the encrypted content key data and the encrypted usage control policy data indicating the handling of the content data is produced.

The related produced key file is distributed from the management apparatus to the data processing apparatus.

Also, the content file storing the content data encrypted by using the content key data is distributed from the data providing apparatus to the data processing apparatus.

Then, in the data processing apparatus, the content key data and the usage control policy data stored in the distributed key file are decrypted, and the handling of the content data stored in the distributed content file is determined based on the related decrypted usage control policy data.

Also, a data providing system of a sixth aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data, the data providing apparatus distributes a module storing the content data encrypted by using the content key data and the key file received from the management apparatus to the data processing apparatus, and the data processing apparatus decrypts the content key data and the usage control policy data stored in the distributed module and determines the handling of the content data based on the related decrypted usage control policy data.

The mode of operation of the data providing system of the sixth aspect of the present invention becomes as follows.

In the management apparatus, the key file storing the encrypted content key data and the encrypted usage control policy data indicating the handling of the content data is produced, and the related produced key file is sent to the data providing apparatus.

Then, the module storing the content data encrypted by using the content key data and the key file received from the management apparatus is distributed from the data providing apparatus to the data processing apparatus.

Then, in the data processing apparatus, the content key data and the usage control policy data stored in the distributed module are decrypted, and the handling of the content data is determined based on the related decrypted usage control policy data.

Also, a data providing system of a seventh aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data, the data providing apparatus individually distributes the content data encrypted by using the content key data and the key file received from the management apparatus to the data processing apparatus, and the data processing apparatus decrypts the content key data and the usage control policy data stored in the distributed key file and determines the handling of the distributed content data based on the related decrypted usage control policy data.

The mode of operation of the data providing system of the seventh aspect of the present invention becomes as follows.

In the management apparatus, the key file storing the encrypted content key data and the encrypted usage control policy data indicating the handling of the content data is produced, and the related produced key file is sent to the data providing apparatus.

Then, the content data encrypted by using the content key data and the key file received from the management apparatus are individually distributed from the data providing apparatus to the data processing apparatus.

Then, in the data processing apparatus, the content key data and the usage control policy data stored in the distributed key file are decrypted, and the handling of the distributed content data is determined based on the related decrypted usage control policy data.

Also, a data providing system of an eighth aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating handling of the content data and distributes the related produced key file to the data processing apparatus, the data processing apparatus distributes the content data encrypted by using the content key data to the data processing apparatus, and the data processing apparatus decrypts the content key data and the usage control policy data stored in the distributed key file and determines the handling of the distributed content data based on the related decrypted usage control policy data.

The mode of operation of the data providing system of the eighth aspect of the present invention becomes as follows.

In the management apparatus, the key file storing the encrypted content key data and the encrypted usage control policy data indicating the handling of the content data is produced, and the related produced key file is sent to the data processing apparatus.

Also, the content data encrypted by using the content key data are distributed from the data providing apparatus to the data processing apparatus.

Then, in the data processing apparatus, the content key data and the usage control policy data stored in the distributed key file are decrypted, and the handling of the distributed content data is determined based on the related decrypted usage control policy data.

Also, a data providing system of a ninth aspect of the present invention is a data providing system for distributing content data from a data providing apparatus to a data processing apparatus and managing the data providing apparatus and the data processing apparatus by a management apparatus, wherein the management apparatus produces encrypted content key data and encrypted usage control policy data indicating handling of the content data, the data providing apparatus individually distributes the content data encrypted by using the content key data, the encrypted content key data received from the management apparatus, and the encrypted usage control policy data to the data processing apparatus, and the data processing apparatus decrypts the distributed content key data and the usage control policy data and determines the handling of the content data stored in the distributed content file based on the related decrypted usage control policy data.

The mode of operation of the data providing system of the ninth aspect of the present invention becomes as follows.

In the management apparatus, the encrypted content key data and the encrypted usage control policy data indicating the handling of the content data are produced, and they are sent to the data providing apparatus.

Then, the content data encrypted by using the content key data and the encrypted content key data and the encrypted usage control policy data received from the management apparatus are individually distributed from the data providing apparatus to the data processing apparatus.

Then, in the data processing apparatus, the distributed content key data and the usage control policy data are decrypted, and the handling of the content data stored in the distributed content file is determined based on the related decrypted usage control policy data.

Also, a data providing system of a 10th aspect of the present invention is a data providing system for distributing content data from a data providing apparatus to a data processing apparatus and managing the data providing apparatus and the data processing apparatus by a management apparatus, wherein the management apparatus produces encrypted content key data and encrypted usage control policy data indicating handling of the content data and distributes the same to the data processing apparatus, the data providing apparatus distributes the content data encrypted by using the content key data to the data processing apparatus, and the data processing apparatus decrypts the distributed content key data and the usage control policy data and determines the handling of the distributed content data based on the related decrypted usage control policy data.

The mode of operation of the data providing system of the 10th aspect of the present invention becomes as follows.

In the management apparatus, the encrypted content key data and the encrypted usage control policy data indicating the handling of the content data are produced, and they are sent to the data processing apparatus.

Also, the content data encrypted by using the content key data are distributed from the data providing apparatus to the data processing apparatus.

Then, in the data processing apparatus, the distributed content key data and the usage control policy data are decrypted, and the handling of the distributed content data is determined based on the related decrypted usage control policy data.

Also, a data providing system of an 11th aspect of the present invention is a data providing system having a data providing apparatus, a data distribution apparatus, a data processing apparatus, and a management apparatus, wherein the management apparatus produces a key file storing encrypted content key data and encrypted usage control policy data indicating the handling of the content data, the data providing apparatus provides the content data encrypted by using the content key data, the data distribution apparatus distributes the provided content data to the data processing apparatus, and the data processing apparatus decrypts the content key data and the usage control policy data stored in the key file and determines the handling of the distributed content data based on the related decrypted usage control policy data.

The mode of operation of the data providing system of the 11th aspect of the present invention becomes as follows.

In the management apparatus, the key file storing the encrypted content key data and the encrypted usage control policy data indicating the handling of the content data is produced.

Then, the content data encrypted by using the content key data is provided from the data providing apparatus to the data distribution apparatus.

Then, the provided content data is distributed from the data distribution apparatus to the data processing apparatus.

Then, in the data processing apparatus, the content key data and the usage control policy data stored in the key file are decrypted, and the handling of the distributed content data is determined based on the related decrypted usage control policy data.

Also, a data providing system of a 12th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus provides a first module storing a content file storing the content data encrypted by using the content key data and the key file received from the management apparatus to the data distribution apparatus, the data distribution apparatus distributes a second module storing the provided content file and the key file to the data processing apparatus, and the data processing apparatus decrypts the content key data and the usage control policy data stored in the distributed second module and determines the handling of the content data stored in the distributed second module based on the related decrypted usage control policy data.

The mode of operation of the data providing system of the 12th aspect of the present invention becomes as follows.

In the management apparatus, the key file storing the encrypted content key data and the encrypted usage control policy data indicating the handling of the content data is produced, and the related produced key file is sent to the data providing apparatus.

Then, the first module storing the content file storing the content data encrypted by using the content key data and the key file received from the management apparatus is provided from the data providing apparatus to the data distribution apparatus.

Then, the second module storing the provided content file and the key file is distributed from the data distribution apparatus to the data processing apparatus.

Then, in the data processing apparatus, the content key data and the usage control policy data stored in the distributed second module are decrypted, and the handling of the content data stored in the distributed second module is determined based on the related decrypted usage control policy data.

Also, a data providing system of a 13th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus provides a first module storing a content file containing the content data encrypted by using the content key data and a key file received from the management apparatus to the data distribution apparatus, the data distribution apparatus distributes a second module storing the provided content file to the data processing apparatus, and the data processing apparatus decrypts the content key data and the usage control policy data stored in the distributed second module and determines the handling of the content data stored in the distributed second module based on the related decrypted usage control policy data.

Also, a data providing system of a 14th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus individually distributes a content file storing the content data encrypted by using the content key data and the key file received from the management apparatus to the data distribution apparatus, the data distribution apparatus individually distributes the distributed content file and key file to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 15th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data and distributes the related produced key file to the data processing apparatus, the data providing apparatus provides a content file storing the content data encrypted by using the content key data to the data distribution apparatus, the data distribution apparatus distributes the provided content file to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 16th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus provides a first module storing the content data encrypted by using the content key data and the key file received from the management apparatus to the data distribution apparatus, the data distribution apparatus distributes a second module storing the provided content data and the key file to the data processing apparatus, and the data processing apparatus decrypts the content key data and the usage control policy data stored in the distributed second module and determines the handling of the content data stored in the distributed second module based on the related decrypted usage control policy data.

Also, a data providing system of a 17th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus individually distributes the content data encrypted by using the content key data and the key file received from the management apparatus to the data distribution apparatus, the data distribution apparatus individually distributes the distributed content data and the key file to the data distribution apparatus, and the data processing apparatus decrypts the content key data and the usage control policy data stored in the distributed key file and determines the handling of the distributed content data based on the related decrypted usage control policy data.

Also, a data providing system of an 18th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data and distributes the related produced key file to the data processing apparatus, the data processing apparatus provides the content data encrypted by using the content key data to the data distribution apparatus, the data distribution apparatus distributes the provided content data to the data processing apparatus, and the data processing apparatus decrypts the content key data and the usage control policy data stored in the distributed key file and determines the handling of the distributed content data based on the related decrypted usage control policy data.

Also, a data providing system of a 19th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus provides encrypted content key data and encrypted usage control policy data indicating the handling of the content data to the data providing apparatus, the data providing apparatus individually distributes the content data encrypted by using the content key data and the encrypted content key data and the encrypted usage control policy data received from the management apparatus to the data distribution apparatus, the data distribution apparatus individually distributes the distributed content data, the encrypted content key data, and the encrypted usage control policy data to the data distribution apparatus, and the data processing apparatus decrypts the distributed content key data and the usage control policy data and determines the handling of the distributed content data based on the related decrypted usage control policy data.

Also, a data providing system of a 20th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus provides encrypted content key data and encrypted usage control policy data indicating the handling of the content data to the data processing apparatus, the data providing apparatus provides the content data encrypted by using the content key data to the data distribution apparatus, the data distribution apparatus distributes the provided content data to the data processing apparatus, and the data processing apparatus decrypts the distribute the content key data and the usage control policy data and determines the handling of the distributed content data based on the related decrypted usage control policy data.

Also, a data providing system of a 21st aspect of the present invention is a data providing system having a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file and the key file to the data distribution apparatus, the data distribution apparatus distributes the provided content file and the key file to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 22nd aspect of the present invention is a data providing system having a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file to the data distribution apparatus, provides the key file to the data processing apparatus, the data distribution apparatus distributes the provided content file to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 23rd aspect of the present invention is a data providing system having a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, and provides the content file provided from the data providing apparatus and the produced key file to the data distribution apparatus, the data distribution apparatus distributes the provided content file and the key file to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 24th aspect of the present invention is a data providing system having a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, provides the content file provided from the data providing apparatus to the data distribution apparatus, and provides the produced key file to the data processing apparatus, the data distribution apparatus distributes the provided content file to the data processing apparatus, and the data processing apparatus decrypts the content key data and the usage control policy data stored in the provided key file and determines the handling of the content data stored in the distributed content file based on the related decrypted usage control policy data.

Also, a data providing system of a 25th aspect of the present invention is a data providing system having a data providing apparatus, a data distribution apparatus, a management apparatus, a database device, and a data processing apparatus, wherein the data providing apparatus encrypts content data by using content key data, produces a content file storing the related encrypted content data, and stores the related produced content file and a key file provided from the management apparatus in the database device, the management apparatus produces the key file storing the encrypted content key data and encrypted usage control policy data indicating the handling of the content data, and provides the related produced key file to the data providing apparatus, the data distribution apparatus distributes the content file and key file obtained from the database device to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 26th aspect of the present invention is a data providing system having a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces the key file storing the encrypted content key data and encrypted usage control policy data indicating the handling of the content data and provides the related produced key file to the data distribution apparatus, the data distribution apparatus distributes the content file obtained from the database device and the key file provided from the data distribution apparatus to the data processing apparatus, and the data processing apparatus decrypts the content key data and the usage control policy data stored in the distributed key file and determines the handling of the content data stored in the distributed content file based on the related decrypted usage control policy data.

Also, a data providing system of a 27th aspect of the present invention is a data providing system having a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces the key file storing the encrypted content key data and encrypted usage control policy data indicating the handling of the content data and provides the related produced key file to the data processing apparatus, the data distribution apparatus distributes the content file obtained from the database device and the key file provided from the data distribution apparatus to the data processing apparatus, and the data processing apparatus decrypts the content key data and the usage control policy data stored in the provided key file and determines the handling of the content data stored in the distributed content file based on the related decrypted usage control policy data.

Also, a data providing system of a 28th aspect of the present invention is a data providing system having a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files and key files provided from corresponding management apparatuses in the database device, the management apparatuses produce key files storing the encrypted content key data and the encrypted usage control policy data indicating the handling of the content data for the content data provided by corresponding data providing apparatuses, and provide the related produced key files to corresponding data providing apparatuses, the data distribution apparatus distributes the content files and key files obtained from the database device to the data processing apparatus, and the data processing apparatus decrypts the content key data and the usage control policy data stored in the distributed key files and determines the handling of the content data stored in the distributed content files based on the related decrypted usage control policy data.

Also, a data providing system of a 29th aspect of the present invention is a data providing system having a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce key files storing the encrypted content key data and the encrypted usage control policy data indicating the handling of the content data for the content data provided by corresponding data providing apparatuses, and provide the related produced key files to the data distribution apparatus, the data distribution apparatus distributes the content files obtained from the database device and the key files provided from the management apparatus to the data processing apparatus, and the data processing apparatus decrypts the content key data and the usage control policy data stored in the distributed key files and determines the handling of the content data stored in the distributed content files based on the related decrypted usage control policy data.

Also, a data providing system of a 30th aspect of the present invention is a data providing system having a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce key files storing the encrypted content key data and the encrypted usage control policy data indicating the handling of the content data for the content data provided by corresponding data providing apparatuses, and provide the related produced key files to the data processing apparatus, the data distribution apparatus distributes the content files obtained from the database device to the data processing apparatus, and the data processing apparatus decrypts the content key data and the usage control policy data stored in the distributed key files and determines the handling of the content data stored in the distributed content files based on the related decrypted usage control policy data.

Also, a data providing system of a 31st aspect of the present invention is a data providing system having a plurality of data providing apparatuses, a data distribution apparatus, a plurality of management apparatuses, a database device, and a data processing apparatus, wherein the data providing apparatuses provide master sources of content data to corresponding management apparatuses and store content files and key files received from the related management apparatuses in the database, the management apparatuses encrypt the master sources received from corresponding data providing apparatuses by using content key data, produce the content files storing the related encrypted content data, produce key files storing the encrypted content key data and encrypted usage control policy data indicating the handling of the content data for the content data provided by corresponding data providing apparatuses, and send the produced content files and the produced key files to corresponding data providing apparatuses, the data distribution apparatus distributes the content files and key files obtained from the database device to the data processing apparatus, and the data processing apparatus decrypts the content key data and the usage control policy data stored in the distributed key files and determines the handling of the content data stored in the distributed content files based on the related decrypted usage control policy data.

Also, a data providing system of a 32nd aspect of the present invention is a data providing system having a plurality of data providing apparatuses, a data distribution apparatus, a plurality of management apparatuses, a database device, and a data processing apparatus, wherein the data providing apparatuses provide master sources of content data to corresponding management apparatuses, and store content files received from the related management apparatuses in the database, the management apparatuses encrypt the master sources received from corresponding data providing apparatuses by using content key data, produce the content files storing the related encrypted content data, send the related produced content files to the data providing apparatuses, produce key files storing the encrypted content key data and encrypted usage control policy data indicating the handling of the content data for the content data provided by corresponding data providing apparatuses, and send the produced key files to corresponding data distribution apparatus, the data distribution apparatus distributes the content files obtained from the database device and the key files provided from the management apparatuses to the data processing apparatus, and the data processing apparatus decrypts the content key data and the usage control policy data stored in the distributed key files and determines the handling of the content data stored in the distributed content files based on the related decrypted usage control policy data.

Also, a data providing system of a 33rd aspect of the present invention is a data providing system having a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce the content files storing the related encrypted content data, send the related produced content files to the data providing apparatuses, produce key files storing the encrypted content key data and encrypted usage control policy data indicating the handling of the content data for the content data provided by corresponding data providing apparatuses, and send the produced key files to the data processing apparatus, the data distribution apparatus distributes the content files obtained from the database device and the key files provided from the management apparatuses to the data processing apparatus, and the data processing apparatus decrypts the content key data and the usage control policy data stored in the provided key files and determines the handling of the content data stored in the distributed content files based on the related decrypted usage control policy data.

Also, a data providing method of a first aspect of the present invention is a data providing method for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data, the data providing apparatus provides the content data encrypted by using the content key data, and the data processing apparatus decrypts the content key data and the usage control policy data stored in the key file and determines the handling of the content data based on the related decrypted usage control policy data.

Also, a data providing method of a second aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the produced key file from the management apparatus to the data providing apparatus, distributing a module storing a content file storing the content data encrypted by using the content key data and the key file distributed from the management apparatus from the data providing apparatus to the data processing apparatus, and in the data processing apparatus, decrypting the content key data and the usage control policy data stored in the distributed module and determining the handling of the content data based on the related decrypted usage control policy data.

Also, a data providing method of a third aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, in the data providing apparatus, distributing a module storing a content file containing the content data encrypted by using the content key data and the key file received from the management apparatus to the data processing apparatus, and in the data processing apparatus, decrypting the content key data and the usage control policy data stored in the distributed module and determining the handling of the content data based on the related decrypted usage control policy data.

Also, a data providing method of a fourth aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related key file from the management apparatus to the data providing apparatus, individually distributing a content file storing the content data encrypted by using the content key data and the key file received from the management apparatus from the data providing apparatus to the data processing apparatus, and in the data processing apparatus, decrypting the content key data and the usage control policy data stored in the distributed key file and determining the handling of the content data stored in the distributed content file based on the related decrypted usage control policy data.

Also, a data providing method of a fifth aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related key file from the management apparatus to the data processing apparatus, distributing a content file storing the content data encrypted by using the content key data from the data providing apparatus to the data processing apparatus, and in the data processing apparatus, decrypting the content key data and the usage control policy data stored in the distributed key file and determining the handling of the content data stored in the distributed content file based on the related decrypted usage control policy data.

Also, a data providing method of a sixth aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, in the data providing apparatus, distributing a module storing the content data encrypted by using the content key data and the key file received from the management apparatus to the data processing apparatus, and in the data processing apparatus, decrypting the content key data and the usage control policy data stored in the distributed module and determining the handling of the content data based on the related decrypted usage control policy data.

Also, a data providing method of a seventh aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, in the data providing apparatus, individually distributing the content data encrypted by using the content key data and the key file received from the management apparatus to the data processing apparatus, and in the data processing apparatus, decrypting the content key data and the usage control policy data stored in the distributed key file and determining the handling of the distributed content data based on the related decrypted usage control policy data.

Also, a data providing method of an eighth aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related produced key file to the data processing apparatus, in the data providing apparatus, distributing the content data encrypted by using the content key data to the data processing apparatus, and in the data processing apparatus, decrypting the content key data and the usage control policy data stored in the distributed key file and determining the handling of the distributed content data based on the related decrypted usage control policy data.

Also, a data providing method of a ninth aspect of the present invention is a data providing method for distributing content data from a data providing apparatus to a data processing apparatus and managing the data providing apparatus and the data processing apparatus by a management apparatus, comprising the steps of, in the management apparatus, preparing encrypted content key data and encrypted usage control policy data indicating the handling of the content data, in the data providing apparatus, individually distributing the content data encrypted by using the content key data and the encrypted content key data and the encrypted usage control policy data received from the management apparatus to the data processing apparatus, and in the data processing apparatus, decrypting the distributed content key data and the usage control policy data and determining the handling of the content data stored in the distributed content file based on the related decrypted usage control policy data.

Also, a data providing method of a 10th aspect of the present invention is a data providing method for distributing content data from a data providing apparatus to a data processing apparatus and managing the data providing apparatus and the data processing apparatus by a management apparatus, comprising the steps of, in the management apparatus, preparing encrypted content key data and encrypted usage control policy data indicating the handling of the content data and distributing the same to the data processing apparatus, in the data providing apparatus, distributing the content data encrypted by using the content key data to the data processing apparatus, and in the data processing apparatus, decrypting the distributed content key data and the usage control policy data and determining the handling of the distributed content data based on the related decrypted usage control policy data.

Also, a data providing method of an 11th aspect of the present invention is a data providing method using a data providing apparatus, a data distribution apparatus, a data processing apparatus, and a management apparatus, comprising the steps of, in the management apparatus, preparing a key file storing encrypted content key data and encrypted usage control policy data indicating the handling of the content data, providing the content data encrypted by using the content key data from the data providing apparatus to the data distribution apparatus, in the data distribution apparatus, distributing the provided content data to the data processing apparatus, and in the data processing apparatus, decrypting the content key data and the usage control policy data stored in the key file and determining the handling of the distributed content data based on the related decrypted usage control policy data.

Also, a data providing method of a 12th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, distributing the related produced key file from the management apparatus to the data providing apparatus, providing a first module storing a content file storing the content data encrypted by using the content key data and the key file received from the management apparatus from the data providing apparatus to the data distribution apparatus, and distributing a second module storing the provided content file and the key file from the data distribution apparatus to the data processing apparatus, and in the data processing apparatus, decrypting the content key data and the usage control policy data stored in the distributed second module and determining the handling of the content data stored in the distributed second module based on the related decrypted usage control policy data.

Also, a data providing method of a 13th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, in the data providing apparatus, providing a first module storing a content file containing the content data encrypted by using the content key data and a key file received from the management apparatus to the data distribution apparatus, in the data distribution apparatus, distributing a second module storing the provided content file to the data processing apparatus, and in the data processing apparatus, decrypting the content key data and the usage control policy data stored in the distributed second module and determining the handling of the content data stored in the distributed second module based on the related decrypted usage control policy data.

Also, a data providing method of a 14th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, distributing the produced key file from the management apparatus to the data providing apparatus, individually distributing a content file storing the content data encrypted by using the content key data and the key file received from the management apparatus from the data providing apparatus to the data distribution apparatus, individually distributing the distributed content file and the key file from the data distribution apparatus to the data distribution apparatus, and in the data processing apparatus, decrypting the content key data and the usage control policy data stored in the distributed key file and determining the handling of the content data stored in the distributed content file based on the related decrypted usage control policy data.

Also, a data providing method of a 15th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related produced key file from the management apparatus to the data processing apparatus, providing a content file storing the content data encrypted by using the content key data from the data providing apparatus to the data distribution apparatus, and distributing the provided content file from the data distribution apparatus to the data processing apparatus, and in the data processing apparatus, decrypting the content key data and the usage control policy data stored in the distributed key file and determining the handling of the content data stored in the distributed content file based on the related decrypted usage control policy data.

Also, a data providing method of a 16th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, in the data providing apparatus, providing a first module storing the content data encrypted by using the content key data and the key file received from the management apparatus to the data distribution apparatus, in the data distribution apparatus, distributing a second module storing the provided content data and the key file to the data processing apparatus, and in the data processing apparatus, decrypting the content key data and the usage control policy data stored in the distributed second module and determining the handling of the content data stored in the distributed second module based on the related decrypted usage control policy data.

Also, a data providing method of a 17th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, in the data providing apparatus, individually distributing the content data encrypted by using the content key data and the key file received from the management apparatus to the data distribution apparatus, in the data distribution apparatus, individually distributing the distributed content data and the key file to the data distribution apparatus, and in the data processing apparatus, decrypting the content key data and the usage control policy data stored in the distributed key file and determining the handling of the distributed content data based on the related decrypted usage control policy data.

Also, a data providing method of an 18th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data and distributing the related produced key file to the data processing apparatus, in the data providing apparatus, providing the content data encrypted by using the content key data to the data distribution apparatus, in the data distribution apparatus, distributing the provided content data to the data processing apparatus, and in the data processing apparatus, decrypting the content key data and the usage control policy data stored in the distributed key file and determining the handling of the distributed content data based on the related decrypted usage control policy data.

Also, a data providing method of a 19th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, providing encrypted content key data and encrypted usage control policy data indicating the handling of the content data to the data providing apparatus, in the data providing apparatus, individually distributing the content data encrypted by using the content key data and the encrypted content key data and the encrypted usage control policy data which are received from the management apparatus to the data distribution apparatus, in the data distribution apparatus, individually distributing the distributed content data, the encrypted content key data, and the encrypted usage control policy data to the data distribution apparatus, and in the data processing apparatus, decrypting the distributed content key data and the usage control policy data and determining the handling of the distributed content data based on the related decrypted usage control policy data.

Also, a data providing method of a 20th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, distributing encrypted content key data and encrypted usage control policy data-indicating the handling of the content data to the data processing apparatus, in the data providing apparatus, distributing the content data encrypted by using the content key data to the data distribution apparatus, in the data distribution apparatus, distributing the provided content data to the data processing apparatus, and in the data processing apparatus, decrypting the distributed content key data and the usage control policy data and determining the handling of the distributed content data based on the related decrypted usage control policy data.

Also, a data providing method of a 21st aspect of the present invention is a data providing method using a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file and the key file to the data distribution apparatus, the data distribution apparatus distributes the provided content file and the key file to the data processing apparatus, and the data processing apparatus decrypts the content key data and the usage control policy data stored in the distributed key file and determines the handling of the content data stored in the distributed content file based on the related decrypted usage control policy data.

Also, a data providing method of a 22nd aspect of the present invention is a data providing method using a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file to the data distribution apparatus and provides the key file to the data processing apparatus, the data distribution apparatus distributes the provided content file to the data processing apparatus, and the data processing apparatus decrypts the content key data and the usage control policy data stored in the provided key file and determines the handling of the content data stored in the distributed content file based on the related decrypted usage control policy data.

Also, a data providing method of a 23rd aspect of the present invention is a data providing method using a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, provides the content file provided from the data providing apparatus and the produced key file to the data distribution apparatus, the data distribution apparatus distributes the provided content file and the key file to the data processing apparatus, and the data processing apparatus decrypts the content key data and the usage control policy data stored in the distributed key file and determines the handling of the content data stored in the distributed content file based on the related decrypted usage control policy data.

Also, a data providing method of a 24th aspect of the present invention is a data providing method using a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, provides the content file provided from the data providing apparatus to the data distribution apparatus, and provides the produced key file to the data processing apparatus, the data distribution apparatus distributes the provided content file to the data processing apparatus, and the data processing apparatus decrypts the content key data and the usage control policy data stored in the provided key file and determines the handling of the content data stored in the distributed content file based on the related decrypted usage control policy data.

Also, a data providing method of a 25th aspect of the present invention is a data providing method using a data providing apparatus, a data distribution apparatus, a management apparatus, a database device, and a data processing apparatus, wherein the data providing apparatus encrypts content data by using content key data, produces a content file storing the related encrypted content data, and stores the related produced content file and a key file provided from the management apparatus in the database device, the management apparatus produces a key file storing the encrypted content key data and encrypted usage control policy data indicating the handling of the content data and provides the related produced key file to the data providing apparatus, the data distribution apparatus distributes the content file and key file obtained from the database device to the data processing apparatus, and the data processing apparatus decrypts the content key data and the usage control policy data stored in the distributed key file and determines the handling of the content data stored in the distributed content file based on the related decrypted usage control policy data.

Also, a data providing method of a 26th aspect of the present invention is a data providing method using a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces a key file storing the encrypted content key data and encrypted usage control policy data indicating the handling of the content data and provides the related produced key file to the data distribution apparatus, the data distribution apparatus distributes the content file obtained from the database device and the key file provided from the data distribution apparatus to the data processing apparatus, and the data processing apparatus decrypts the content key data and the usage control policy data stored in the distributed key file and determines the handling of the content data stored in the distributed content file based on the related decrypted usage control policy data.

Also, a data providing method of a 27th aspect of the present invention is a data providing method using a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces a key file storing the encrypted content key data and encrypted usage control policy data indicating the handling of the content data and provides the related produced key file to the data processing apparatus, the data distribution apparatus distributes the content file obtained from the database device and the key file provided from the data distribution apparatus to the data processing apparatus, and the data processing apparatus decrypts the content key data and the usage control policy data stored in the provided key file and determines the handling of the content data stored in the distributed content file based on the related decrypted usage control policy data.

Also, a data providing method of a 28th aspect of the present invention is a data providing method using a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files and key files provided from corresponding management apparatuses in the database device, the management apparatuses produce the key files storing the encrypted content key data and encrypted usage control policy data indicating the handling of the content data for the content data provided by corresponding data providing apparatuses and provide the related produced key files to corresponding data providing apparatuses, the data distribution apparatus distributes the content files and key files obtained from the database device to the data processing apparatus, and the data processing apparatus decrypts the content key data and the usage control policy data stored in the distributed key files and determines the handling of the content data stored in the distributed content files based on the related decrypted usage control policy data.

Also, a data providing method of a 29th aspect of the present invention is a data providing method using a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce the key files storing the encrypted content key data and encrypted usage control policy data indicating the handling of the content data for the content data provided by corresponding data providing apparatuses and provide the related produced key files to the data distribution apparatus, the data distribution apparatus distributes the content files obtained from the database device and the key files provided from the management apparatuses to the data processing apparatus, and the data processing apparatus decrypts the content key data and the usage control policy data stored in the distributed key files and determines the handling of the content data stored in the distributed content files based on the related decrypted usage control policy data.

Also, a data providing method of a 30th aspect of the present invention is a data providing method using a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce the key files storing the encrypted content key data and encrypted usage control policy data indicating the handling of the content data for the content data provided by corresponding data providing apparatuses and provide the related produced key files to the data processing apparatus, the data distribution apparatus distributes the content files obtained from the database device to the data processing apparatus, and the data processing apparatus decrypts the content key data and the usage control policy data stored in the provided key files and determines the handling of the content data stored in the distributed content files based on the related decrypted usage control policy data.

Also, a data providing method of a 31st aspect of the present invention is a data providing method using a plurality of data providing apparatuses, a data distribution apparatus, a plurality of management apparatuses, a database device, and a data processing apparatus, wherein the data providing apparatuses provide master sources of content data to corresponding management apparatuses and store content files and key files received from the related management apparatuses in the database, the management apparatuses encrypt the master sources received from corresponding data providing apparatuses by using content key data, produce content files storing the related encrypted content data, produce key files storing the encrypted content key data and encrypted usage control policy data indicating the handling of the content data for the content data provided by corresponding data providing apparatuses, and send the produced content files and the produced key files to corresponding data providing apparatuses, the data distribution apparatus distributes the content files and key files obtained from the database device to the data processing apparatus, and the data processing apparatus decrypts the content key data and the usage control policy data stored in the distributed key files and determines the handling of the content data stored in the distributed content files based on the related decrypted usage control policy data.

Also, a data providing method of a 32nd aspect of the present invention is a data providing method using a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce content files storing the related encrypted content data, send the related produced content files to the data providing apparatuses, produce key files storing the encrypted content key data and encrypted usage control policy data indicating the handling of the content data for the content data provided by corresponding data providing apparatuses, and send the related produced key files to corresponding data distribution apparatus, the data distribution apparatus distributes the content files obtained from the database device and key files provided from the management apparatuses to the data processing apparatus, and the data processing apparatus decrypts the content key data and the usage control policy data stored in the distributed key files and determines the handling of the content data stored in the distributed content files based on the related decrypted usage control policy data.

Also, a data providing method of a 33rd aspect of the present invention is a data providing method using a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce content files storing the related encrypted content data, send the related produced content files to the data providing apparatuses, produce key files storing the encrypted content key data and encrypted usage control policy data indicating the handling of the content data for the content data provided by corresponding data providing apparatuses, and provide the related produced key files to the data processing apparatus, the data distribution apparatus distributes the content files obtained from the database device to the data processing apparatus, and the data processing apparatus decrypts the content key data and the usage control policy data stored in the provided key files and determines the handling of the content data stored in the distributed content files based on the related decrypted usage control policy data.

Also, a data providing system of a 34th aspect of the present invention is a data providing system for distributing content data from a data providing apparatus to a data processing apparatus, wherein the data providing apparatus distributes a module storing the content data encrypted by using content key data, the encrypted content key data, and encrypted usage control policy data indicating the handling of the content data to the data processing apparatus by using a predetermined communication protocol in a format not depending upon the related communication protocol or by recording the same on a storage medium, and the data processing apparatus decrypts the content key data and the usage control policy data stored in the distributed module and determines the handling of the content data based on the related decrypted usage control policy data.

The mode of operation of the data providing system of the 34th aspect of the present invention becomes as follows.

The module storing the content data encrypted by using the content key data, the encrypted content key data, and the encrypted usage control policy data indicating the handling of the content data is distributed from the data providing apparatus to the data processing apparatus.

At this time, the related module is distributed from the data providing apparatus to the data processing apparatus by using a predetermined communication protocol in a format not depending upon the related communication protocol or while being recorded on a storage medium.

Then, in the data processing apparatus, the content key data and the usage control policy data stored in the distributed module are decrypted, and the handling of the content data is determined based on the related decrypted usage control policy data.

In this way, by storing the usage control policy data indicating the handling of the related content data in the module storing the content data, in the data processing apparatus, it becomes possible to handle (use) the content data based on the usage control policy data produced by the interested parties of the data providing apparatus.

Also, the module is distributed from the data providing apparatus to the data processing apparatus in the format not depending upon a predetermined communication protocol, so a compression method, encryption method, etc. of the content data stored in the module can be freely determined by the data providing apparatus.

Also, in the data providing system of the 34th aspect of the present invention, preferably the module further storing signature data for verifying a legitimacy of a producer and a transmitter of at least one data among the content data, the content key data, and the usage control policy data is distributed to the data processing apparatus.

Also, in the data providing system of the 34th aspect of the present invention, preferably the data providing apparatus distributes the module further storing at least one data between data for verifying if the related data is not tampered with and signature data for verifying if the related data was normally certified by a predetermined manager for at least one data among the content data, the content key data, and the usage control policy data to the data processing apparatus.

Also, in the data providing system of the 34th aspect of the present invention, preferably the data processing apparatus determines a purchase form of the content data based on the usage control policy data, and where the content data is transferred to another data processing apparatus, the signature data indicating the legitimacy of the purchaser of the related content data and the signature data indicating the legitimacy of the transmitter of the related content data are made different.

A data providing system of 35th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data, the data providing apparatus distributes a module storing a content file storing the content data encrypted by using the content key data and the key file received from the management apparatus to the data processing apparatus by using a predetermined communication protocol in a format not depending upon the related communication protocol or by recording the same on a storage medium, and the data processing apparatus decrypts the content key data and the usage control policy data stored in the distributed module and determines the handling of the content data based on the related decrypted usage control policy data.

The mode of operation of the data providing system of the 35th aspect of the present invention becomes as follows.

In the management apparatus, the key file storing the encrypted content key data and the encrypted usage control policy data indicating the handling of the content data is produced.

Then, the related produced key file is distributed from the management apparatus to the data providing apparatus.

Then, the module storing the content file storing the content data encrypted by using the content key data and the key file received from the management apparatus is distributed from the data providing apparatus to the data processing apparatus by using a predetermined communication protocol but in a format not depending upon the related communication protocol or while being recorded on a storage medium.

Then, in the data processing apparatus, the content key data and the usage control policy data stored in the distributed module are decrypted, and the handling of the content data is determined based on the related decrypted usage control policy data.

Also, in the data providing system of the 35th aspect of the present invention, preferably the management apparatus produces signature data for verifying the legitimacy of the producer of the key file and produces the key file further storing the related signature data.

Also, in the data providing system of the 35th aspect of the present invention, preferably the data providing apparatus produces the content key data and the usage control policy data and transmits the same to the management apparatus, and the management apparatus produces the key file based on the received content key data and usage control policy data and registers the related produced key file.

Also, a data providing apparatus of the present invention is a data providing apparatus which is managed by a management apparatus and distributes content data to a data processing apparatus, receiving a key file storing encrypted content key data and encrypted usage control policy data indicating the handling of the content data from the management apparatus and distributing a module storing a content file storing the content data encrypted by using the content key data and the key file received from the management apparatus to the data processing apparatus.

Also, a data processing apparatus of the present invention is a data processing apparatus managed by a management apparatus and utilizing content data, receiving a module containing a key file storing encrypted content key data and encrypted usage control policy data indicating the handling of the content data and a content file storing the content data encrypted by using the content key data, determining at least one between a purchase form and an usage form of the content data based on the usage control policy data, and transmitting a log data indicating the log of the determined at least one of the related purchase form and usage form to the management apparatus.

Also, a data providing system of a 36th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data, the data providing apparatus distributes a module storing a content file containing the content data encrypted by using the content key data and the key file received from the management apparatus to the data processing apparatus by using a predetermined communication protocol in a format not depending upon the related communication protocol or recording the same on a storage medium, and the data processing apparatus decrypts the content key data and the usage control policy data stored in the distributed module and determines the handling of the content data based on the related decrypted usage control policy data.

The mode of operation of the data providing system of the 36th aspect of the present invention becomes as follows.

In the management apparatus, the key file storing the encrypted content key data and the encrypted usage control policy data indicating the handling of the content data is produced, and the related key file is sent to the data providing apparatus.

Then, the module storing the content file containing the content data encrypted by using the content key data and the key file received from the management apparatus is distributed from the data providing apparatus to the data processing apparatus by using a predetermined communication protocol in a format not depending upon the related communication protocol or while being recorded on a storage medium.

Then, in the data processing apparatus, the content key data and the usage control policy data stored in the distributed module are decrypted, and the handling of the content data is determined based on the related decrypted usage control policy data.

Also, a data providing system of a 37th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data, the data providing apparatus individually distributes a content file storing the content data encrypted by using the content key data and the key file received from the management apparatus to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

The mode of operation of the data providing system of the 37th aspect of the present invention becomes as follows. In the management apparatus, the key file storing the encrypted content key data and the encrypted usage control policy data indicating the handling of the content data is produced, and the related key file is sent to the data providing apparatus.

Then, in the data processing apparatus, the content file storing the content data encrypted by using the content key data and the key file received from the management apparatus are individually distributed to the data processing apparatus by using a predetermined communication protocol but in a format not depending upon the related communication protocol or while being recorded on a storage medium.

Then, in the data processing apparatus, the content key data and the usage control policy data stored in the distributed key file are decrypted, and the handling of the content data stored in the distributed content file is determined based on the related decrypted usage control policy data.

Also, a data providing system of a 38th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data and distributes the related produced key file to the data processing apparatus, the data providing apparatus distributes a content file storing the content data encrypted by using the content key data to the data processing apparatus by using a predetermined communication protocol but in a format not depending upon the related communication protocol or recording the same on a storage medium, and the data processing apparatus decrypts the content key data and the usage control policy data stored in the distributed key file and determines the handling of the content data stored in the distributed content file based on the related decrypted usage control policy data.

Below, an explanation will be made of the mode of operation of the data providing system of the 38th aspect of the present invention.

In the management apparatus, the key file storing the encrypted content key data and the encrypted usage control policy data indicating the handling of the content data is produced.

The related produced key file is distributed from the management apparatus to the data processing apparatus.

Also, the content file storing the content data encrypted by using the content key data is distributed from the data providing apparatus to the data processing apparatus by using a predetermined communication protocol but in a format not depending upon the related communication protocol or while being recorded on a storage medium.

Then, in the data processing apparatus, the content key data and the usage control policy data stored in the distributed key file are decrypted, and the handling of the content data stored in the distributed content file is determined based on the related decrypted usage control policy data.

Also, a data providing system of a 39th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data, the data providing apparatus distributes a module storing the content data encrypted by using the content key data and the key file received from the management apparatus to the data processing apparatus by using a predetermined communication protocol but in a format not depending upon the related communication protocol or recording the same on a storage medium, and the data processing apparatus decrypts the content key data and the usage control policy data stored in the distributed module and determines the handling of the content data based on the related decrypted usage control policy data.

Below, an explanation will be made of the mode of operation of the data providing system of the 39th aspect of the present invention.

In the management apparatus, the key file storing the encrypted content key data and the encrypted usage control policy data indicating the handling of the content data is produced, and the related key file is sent to the data providing apparatus.

Then, the module storing the content data encrypted by using the content key data and the key file received from the management apparatus is distributed from the data providing apparatus to the data processing apparatus by using a predetermined communication protocol but in a format not depending upon the related communication protocol or while being recorded on a storage medium.

Then, in the data processing apparatus, the content key data and the usage control policy data stored in the distributed module are decrypted, and the handling of the content data is determined based on the related decrypted usage control policy data.

Also, a data providing system of a 40th aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data, the data providing apparatus individually distributes the content data encrypted by using the content key data and the key file received from the management apparatus to the data processing apparatus by using a predetermined communication protocol but in a format not depending upon the related communication protocol or recording the same on a storage medium, and the data processing apparatus decrypts the content key data and the usage control policy data stored in the distributed key file and determines the handling of the distributed content data based on the related decrypted usage control policy data.

Below, an explanation will be made of the mode of operation of the data providing system of the 40th aspect of the present invention.

In the management apparatus, the key file storing the encrypted content key data and the encrypted usage control policy data indicating the handling of the content data is produced, and the related key file is sent to the data providing apparatus.

Then, the content data encrypted by using the content key data and the key file received from the management apparatus are individually distributed from the data providing apparatus to the data processing apparatus by using a predetermined communication protocol but in a format not depending upon the related communication protocol or while being recorded on a storage medium.

Then, in the data processing apparatus, the content key data and the usage control policy data stored in the distributed key file are decrypted, and the handling of the distributed content data is determined based on the related decrypted usage control policy data.

Also, a data providing system of a 41st aspect of the present invention is a data providing system for distributing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data and distributes the related produced key file to the data processing apparatus, the data providing apparatus distributes the content data encrypted by using the content key data to the data processing apparatus by using a predetermined communication protocol but in a format not depending upon the related communication protocol or recording the same on a storage medium, and the data processing apparatus decrypts the content key data and the usage control policy data stored in the distributed key file and determines the handling of the distributed content data based on the related decrypted usage control policy data.

Below, an explanation will be made of the mode of operation of the data providing system of the 41st aspect of the present invention.

In the management apparatus, the key file storing the encrypted content key data and the encrypted usage control policy data indicating the handling of the content data is produced, and the related produced key file is distributed to the data processing apparatus.

Also, the content data encrypted by using the content key data is distributed from the data providing apparatus to the data processing apparatus by using a predetermined communication protocol but in a format not depending upon the related communication protocol or while being recorded on a storage medium.

Then, in the data processing apparatus, the content key data and the usage control policy data stored in the distributed key file are decrypted, and the handling of the distributed content data is determined based on the related decrypted usage control policy data.

Also, a data providing system of a 42nd aspect of the present invention is a data providing system for distributing content data from a data providing apparatus to a data processing apparatus and managing the data providing apparatus and the data processing apparatus by a management apparatus, wherein the management apparatus produces encrypted content key data and encrypted usage control policy data indicating the handling of the content data, the data providing apparatus individually distributes the content data encrypted by using the content key data and the encrypted content key data and the encrypted usage control policy data received from the management apparatus to the data processing apparatus by using a predetermined communication protocol but in a format not depending upon the related communication protocol or recording the same on a storage medium, and the data processing apparatus decrypts the distributed content key data and the usage control policy data and determines the handling of the content data stored in the distributed content file based on the related decrypted usage control policy data.

Below, an explanation will be made of the mode of operation of the data providing system of the 42nd aspect of the present invention.

In the management apparatus, the encrypted content key data and the encrypted usage control policy data indicating the handling of the content data are produced and are sent to the data providing apparatus.

Then, the content data encrypted by using the content key data and the encrypted content key data and the encrypted usage control policy data received from the management apparatus are individually distributed from the data providing apparatus to the data processing apparatus by using a predetermined communication protocol but in a format not depending upon the related communication protocol or while being recorded on a storage medium.

Then, in the data processing apparatus, the distributed content key data and the usage control policy data are decrypted, and the handling of the content data stored in the distributed content file is determined based on the related decrypted usage control policy data.

Also, a data providing system of a 43rd aspect of the present invention is a data providing system for distributing content data from a data providing apparatus to a data processing apparatus and managing the data providing apparatus and the data processing apparatus by a management apparatus, wherein the management apparatus produces encrypted content key data and encrypted usage control policy data indicating the handling of the content data and distributes the same to the data processing apparatus, the data providing apparatus distributes the content data encrypted by using the content key data to the data processing apparatus by using a predetermined communication protocol but in a format not depending upon the related communication protocol or recording the same on a storage medium, and the data processing apparatus decrypts the distributed content key data and the usage control policy data and determines the handling of the distributed content data based on the related decrypted usage control policy data.

Below, an explanation will be made of the mode of operation of the data providing system of the 43rd aspect of the present invention.

In the management apparatus, the encrypted content key data and the encrypted usage control policy data indicating the handling of the content data are produced and are distributed to the data processing apparatus.

Then, the content data encrypted by using the content key data is distributed from the data providing apparatus to the data processing apparatus by using a predetermined communication protocol but in a format not depending upon the related communication protocol or while being recorded on a storage medium.

Then, in the data processing apparatus, the distributed content key data and the usage control policy data are decrypted, and the handling of the distribution the content data is determined based on the related decrypted usage control policy data.

Also, a data providing system of a 44th aspect of the present invention is a data providing system having a data providing apparatus, a data distribution apparatus, and a data processing apparatus, wherein the data providing apparatus provides a first module storing content data encrypted by using content key data, the encrypted content key data, and encrypted usage control policy data indicating the handling of the content data to the data distribution apparatus, the data distribution apparatus distributes a second module storing the encrypted content data, content key data, and the usage control policy data stored in the provided first module to the data processing apparatus by using a predetermined communication protocol but in a format not depending upon the related communication protocol or by recording the same on a storage medium, and the data processing apparatus decrypts the content key data and the usage control policy data stored in the distributed second module and determines the handling of the content data based on the related decrypted usage control policy data.

Below, an explanation will be made of the mode of operation of the data providing system of the 44th aspect of the present invention.

The first module storing the content data encrypted by using the content key data, the encrypted content key data, and the encrypted usage control policy data indicating the handling of the content data is provided from the data providing apparatus to the data distribution apparatus by for example using a predetermined communication protocol but in a format not depending upon the related communication protocol or while being recorded on a storage medium.

Next, the second module storing the encrypted content data, content key data, and the usage control policy data stored in the provided first module is distributed from the data distribution apparatus to the data processing apparatus by using a predetermined communication protocol but in a format not depending upon the related communication protocol or while being recorded on a storage medium.

Then, in the data processing apparatus, the content key data and the usage control policy data stored in the distributed second module are decrypted, and the handling of the content data is determined based on the related decrypted usage control policy data.

In this way, by storing the usage control policy data indicating the handling of the related content data in the first module and second module storing the content data, in the data processing apparatus, it becomes possible to have the data processing apparatus perform the handling (usage) of the content data based on the usage control policy data produced by the interested parties of the data providing apparatus.

Also, the second module is distributed from the data distribution apparatus to the data processing apparatus in a format not depending upon on a predetermined communication protocol, so the compression method and encryption method etc. of the content data stored in the second module can be freely determined by the data providing apparatus.

A data providing system of a 45th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus provides a first module storing a content file storing the content data encrypted by using the content key data and the key file received from the management apparatus to the data distribution apparatus, the data distribution apparatus distributes a second module storing the provided content file and the key file to the data processing apparatus by using a predetermined communication protocol but in a format not depending upon the related communication protocol or recording the same on a storage medium, and the data processing apparatus decrypts the content key data and the usage control policy data stored in the distributed second module and determines the handling of the content data stored in the distributed second module based on the related decrypted usage control policy data.

Below, an explanation will be made of the mode of operation of the data providing system of the 45th aspect of the present invention.

In the management apparatus, the key file storing the encrypted content key data and the encrypted usage control policy data indicating the handling of the content data is produced, and the related key file is sent to the data providing apparatus.

Then, the first module storing the content file storing the content data encrypted by using the content key data and the key file received from the management apparatus is provided from the data providing apparatus to the data distribution apparatus.

Then, the second module storing the provided content file and the key file is distributed from the data distribution apparatus to the data processing apparatus by using a predetermined communication protocol but in a format not depending upon the related communication protocol or while being recorded on a storage medium.

Then, in the data processing apparatus, the content key data and the usage control policy data stored in the distributed second module are decrypted, and the handling of the content data stored in the distributed second module is determined based on the related decrypted usage control policy data.

A data providing system of a 46th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus provides a first module storing a content file containing the content data encrypted by using the content key data and a key file received from the management apparatus to the data distribution apparatus, the data distribution apparatus distributes a second module storing the provided content file to the data processing apparatus by using a predetermined communication protocol but in a format not depending upon the related communication protocol or recording the same on a storage medium, and the data processing apparatus decrypts the content key data and the usage control policy data stored in the distributed second module and determines the handling of the content data stored in the distributed second module based on the related decrypted usage control policy data.

Also, a data providing system of a 47th aspect of the present invention is a data providing system for providing content data from a data providing apparatus to a first data distribution apparatus and a second data distribution apparatus, distributing the content data from the first data distribution apparatus and the second data distribution apparatus to a data processing apparatus, and managing the data providing apparatus, the first data distribution apparatus, the second data distribution apparatus, and the data processing apparatus by a management apparatus, wherein the management apparatus produces a key file storing encrypted content key data and encrypted usage control policy data indicating the handling of the content data, the data providing apparatus provides a first module storing a content file storing the content data encrypted by using the content key data and the key file received from the management apparatus to the first data distribution apparatus and the second data distribution apparatus, the first data distribution apparatus distributes a second module storing the provided content file and the key file to the data processing apparatus, the second data distribution apparatus distributes a third module storing the provided content file and the key file to the data processing apparatus, and the data processing apparatus decrypts the content key data and the usage control policy data stored in the distributed second module and the third module and determines the handling of the content data based on the related decrypted usage control policy data.

Also, a data providing system of a 48th aspect of the present invention is a data providing system for providing first content data from a first data providing apparatus to a data distribution apparatus, providing second content data from a second data providing apparatus to the data distribution apparatus, distributing the content data from the data distribution apparatus to a data processing apparatus, and managing the first data providing apparatus, the second data providing apparatus, the data distribution apparatus, and the data processing apparatus by a management apparatus, wherein the management apparatus produces a first key file storing an encrypted first content key data and an encrypted first usage control policy data indicating the handling of the first content data and a second key file storing an encrypted second content key data and an encrypted second usage control policy data indicating the handling of the second content data, the first data providing apparatus provides a first module storing a first content file storing the first content data encrypted by using the first content key data and the first key file received from the management apparatus to the data distribution apparatus, the second data providing apparatus provides a second module storing a second content file storing the second content data encrypted by using the second content key data and the second key file received from the management apparatus to the data distribution apparatus, the data distribution apparatus distributes a third module storing the provided first content file, the first key file, the second content file, and the second key file to the data processing apparatus, and the data processing apparatus decrypts the first content key data, the second content key data, the first usage control policy data, and the second usage control policy data stored in the distributed third module, determines the handling of the first content data based on the related decrypted first usage control policy data, and determines the handling of the second content data based on the related decrypted second usage control policy data.

Also, a data providing system of a 49th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus individually distributes a content file storing the content data encrypted by using the content key data and the key file received from the management apparatus to the data distribution apparatus, the data distribution apparatus individually distributes the distributed content file and the key file to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing system of a 50th aspect of the present invention is a data providing system for providing content data from a data providing apparatus to a data processing apparatus and managing the data providing apparatus and the data processing apparatus by a management apparatus, wherein the management apparatus produces a key file storing encrypted content key data and encrypted usage control policy data indicating the handling of the content data and distributes the related produced key file to the data processing apparatus, the data providing apparatus distributes a content file storing the content data encrypted by using the content key data to the data distribution apparatus, the data distribution apparatus distributes the provided content file to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing system of a 51st aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus provides a first module storing the content data encrypted by using the content key data and the key file received from the management apparatus to the data distribution apparatus, the data distribution apparatus distributes a second module storing the provided content data and the key file to the data processing apparatus by using a predetermined communication protocol but in a format not depending upon the related communication protocol or by recording the same on a storage medium, and the data processing apparatus decrypts the content key data and the usage control policy data stored in the distributed second module and determines the handling of the content data stored in the distributed second module based on the related decrypted usage control policy data.

Also, a data providing system of a 52nd aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus produces a key file storing encrypted content key data and encrypted usage control policy data indicating the handling of the content data, the data providing apparatus individually distributes the content data encrypted by using the content key data and the key file received from the management apparatus to the data distribution apparatus, the data distribution apparatus individually distributes the distributed content data and the key file to the data distribution apparatus by using a predetermined communication protocol but in a format not depending upon the related communication protocol or by recording the same on a storage medium, and the data processing apparatus decrypts the content key data and the usage control policy data stored in the distributed key file and determines the handling of the distributed content data based on the related decrypted usage control policy data.

Also, a data providing system of a 53rd aspect of the present invention is a data providing system for providing content data from a data providing apparatus to a data processing apparatus, and managing the data providing apparatus and the data processing apparatus by a management apparatus, wherein the management apparatus produces a key file storing encrypted content key data and encrypted usage control policy data indicating the handling of the content data and distributes the related produced key file to the data processing apparatus, the data providing apparatus distributes the content data encrypted by using the content key data to the data distribution apparatus, the data distribution apparatus distributes the provided content data to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the distributed content data based on the related decrypted usage control policy data.

Also, a data providing system of a 54th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus provides encrypted content key data and encrypted usage control policy data indicating the handling of the content data to the data providing apparatus, the data providing apparatus individually distributes the content data encrypted by using the content key data and the encrypted content key data and the encrypted usage control policy data received from the management apparatus to the data distribution apparatus, the data distribution apparatus distributes the distributed content data, the encrypted content key data, and the encrypted usage control policy data to the data distribution apparatus by using a predetermined communication protocol but in a format not depending upon the related communication protocol or recording the same on a storage medium, and the data processing apparatus decrypts the distributed content key data and the usage control policy data and determines the handling of the distributed content data based on the related decrypted usage control policy data.

Also, a data providing system of a 55th aspect of the present invention is a data providing system for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, wherein the management apparatus provides encrypted content key data and encrypted usage control policy data indicating the handling of the content data to the data processing apparatus, the data providing apparatus provides the content data encrypted by using the content key data to the data distribution apparatus, the data distribution apparatus distributes the distributed provided content data to the data processing apparatus by using a predetermined communication protocol but in a format not depending upon the related communication protocol or recording the same on a storage medium, and the data processing apparatus decrypts the distributed content key data and the usage control policy data and determines the handling of the distributed content data based on the related decrypted usage control policy data.

Also, a data providing system of a 56th aspect of the present invention is a data providing system having a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file and the key file to the data distribution apparatus, the data distribution apparatus distributes the provided content file and the key file to the data processing apparatus by using a predetermined communication protocol but in a format not depending upon the related communication protocol or recording the same on a storage medium, and the data processing apparatus decrypts the content key data and the usage control policy data stored in the distributed key file and determines the handling of the content data stored in the distributed content file based on the related decrypted usage control policy data.

Also, in the data providing system of the 56th aspect of the present invention, preferably the management apparatus produces a first module storing the content file and the key file and provides the related first module to the data distribution apparatus, and the data distribution apparatus produces a second module storing the content file and the key file stored in the first module and distributes the related second module to the data processing apparatus.

Also, in the data providing system of the 56th aspect of the present invention, preferably the management apparatus has at least one database among a database for storing and managing the content file, a database for storing and managing the key file, and a database for storing and managing the usage control policy data and centrally manages at least one among the content file, the key file, and the usage control policy data by using a content identifier uniquely allocated to the content data.

Also, a data providing system of a 57th aspect of the present invention is a data providing system having a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file to the data distribution apparatus and provides the key file to the data processing apparatus, the data distribution apparatus distributes the provided content file to the data processing apparatus by using a predetermined communication protocol but in a format not depending upon the related communication protocol or recording the same on a storage medium, and the data processing apparatus decrypts the content key data and the usage control policy data stored in the provided key file and determines the handling of the content data stored in the distributed content file based on the related decrypted usage control policy data.

Also, a data providing system of a 58th aspect of the present invention is a data providing system having a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, and provides the content file provided from the data providing apparatus and the produced key file to the data distribution apparatus, the data distribution apparatus distributes the provided content file and the key file to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing system of a 59th aspect of the present invention is a data providing system having a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, provides the content file provided from the data providing apparatus to the data distribution apparatus, and provides the produced key file to the data processing apparatus, the data distribution apparatus distributes the provided content file to the data processing apparatus by using a predetermined communication protocol but in a format not depending upon the related communication protocol or by recording the same on a storage medium, and the data processing apparatus decrypts the content key data and the usage control policy data stored in the provided key file and determines the handling of the content data stored in the distributed content file based on the related decrypted usage control policy data.

Also, a data providing system of a 60th aspect of the present invention is a data providing system having a data providing apparatus, a data distribution apparatus, a management apparatus, a database device, and a data processing apparatus, wherein the data providing apparatus encrypts content data by using content key data, produces a content file storing the related encrypted content data, and stores the related produced content file and a key file provided from the management apparatus in the database device, the management apparatus produces a key file storing the encrypted content key data and encrypted usage control policy data indicating the handling of the content data and provides the related produced key file to the data providing apparatus, the data distribution apparatus distributes the content file and key file obtained from the database device to the data processing apparatus by using a predetermined communication protocol but in a format not depending upon the related communication protocol or recording the same on a storage medium, and the data processing apparatus decrypts the content key data and the usage control policy data stored in the distributed key file and determines the handling of the content data stored in the distributed content file based on the related decrypted usage control policy data.

Also, a data providing system of a 61st aspect of the present invention is a data providing system having a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces a key file storing the encrypted content key data and encrypted usage control policy data indicating the handling of the content data and provides the related produced key file to the data providing apparatus, the data distribution apparatus distributes the content file obtained from the database device and the key file provided from the data distribution apparatus to the data processing apparatus by using a predetermined communication protocol but in a format not depending upon the related communication protocol or recording the same on a storage medium, and the data processing apparatus decrypts the content key data and the usage control policy data stored in the distributed key file and determines the handling of the content data stored in the distributed content file based on the related decrypted usage control policy data.

Also, a data providing system of a 62nd aspect of the present invention is a data providing system having a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces a key file storing the encrypted content key data and encrypted usage control policy data indicating the handling of the content data and provides the related produced key file to the data processing apparatus, the data distribution apparatus distributes the content file obtained from the database device to the data processing apparatus by using a predetermined communication protocol but in a format not depending upon the related communication protocol or recording the same on a storage medium, and the data processing apparatus decrypts the content key data and the usage control policy data stored in the provided key file and determines the handling of the content data stored in the distributed content file based on the related decrypted usage control policy data.

Also, a data providing system of a 63rd aspect of the present invention is a data providing system having a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files and key files provided from corresponding management apparatuses in the database device, the management apparatuses produce key files storing the encrypted content key data and encrypted usage control policy data indicating the handling of the content data for the content data provided by corresponding data providing apparatuses and provide the related produced key files to corresponding data providing apparatuses, the data distribution apparatus distributes the content files and key files obtained from the database device to the data processing apparatus by using a predetermined communication protocol but in a format not depending upon the related communication protocol or recording the same on a storage medium, and the data processing apparatus decrypts the content key data and the usage control policy data stored in the distributed key files and determines the handling of the content data stored in the distributed content files based on the related decrypted usage control policy data.

Also, a data providing system of a 64th aspect of the present invention is a data providing system having a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce key files storing the encrypted content key data and encrypted usage control policy data indicating the handling of the content data for the content data provided by corresponding data providing apparatuses and provide the related produced key files to the data distribution apparatus, the data distribution apparatus distributes the content files obtained from the database device and the key files provided from the management apparatuses to the data processing apparatus by using a predetermined communication protocol but in a format not depending upon the related communication protocol or recording the same on a storage medium, and the data processing apparatus decrypts the content key data and the usage control policy data stored in the distributed key files and determines the handling of the content data stored in the distributed content files based on the related decrypted usage control policy data.

Also, a data providing system of a 65th aspect of the present invention is a data providing system having a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce key files storing the encrypted content key data and encrypted usage control policy data indicating the handling of the content data for the content data provided by corresponding data providing apparatuses and provide the related produced key files to the data processing apparatus, the data distribution apparatus distributes the content files obtained from the database device to the data processing apparatus by using a predetermined communication protocol but in a format not depending upon the related communication protocol or recording the same on a storage medium, and the data processing apparatus decrypts the content key data and the usage control policy data stored in the provided key files and determines the handling of the content data stored in the distributed content files based on the related decrypted usage control policy data.

Also, a data providing system of a 66th aspect of the present invention is a data providing system having a plurality of data providing apparatuses, a data distribution apparatus, a plurality of management apparatuses, a database device, and a data processing apparatus, wherein the data providing apparatuses provide master sources of content data to corresponding management apparatuses and store content files and key files received from the related management apparatuses in the database, the management apparatuses encrypt the master sources received from corresponding data providing apparatuses by using content key data, produce content files storing the related encrypted content data, produce key files storing the encrypted content key data and encrypted usage control policy data indicating the handling of the content data for the content data provided by corresponding data providing apparatuses, and send the produced content files and the produced key files to corresponding data providing apparatuses, the data distribution apparatus distributes the content files and key files obtained from the database device to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the distributed content files based on the related decrypted usage control policy data.

Also, a data providing system of a 67th aspect of the present invention is a data providing system having a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce content files storing the related encrypted content data, send the related produced content files to the data providing apparatuses, produce key files storing the encrypted content key data and encrypted usage control policy data indicating the handling of the content data for the content data provided by corresponding data providing apparatuses, and send the related produced key files provided from the management apparatuses to corresponding data distribution apparatus, the data distribution apparatus distributes the content files obtained from the database device and key files provided from the management apparatuses to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the distributed content files based on the related decrypted usage control policy data.

Also, a data providing system of a 68th aspect of the present invention is a data providing system having a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce content files storing the related encrypted content data, send the related produced content files to the data providing apparatuses, produce key files storing the encrypted content key data and encrypted usage control policy data indicating the handling of the content data for the content data provided by corresponding data providing apparatuses, and send the related produced key files to the data processing apparatus, the data distribution apparatus distributes the content files obtained from the database device to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the provided content files based on the related decrypted usage control policy data.

Also, a data providing system of a 69th aspect of the present invention is a data providing system having a data providing apparatus, a data distribution apparatus, and a data processing apparatus, wherein the data providing apparatus provides a first module storing content data encrypted by using content key data, the encrypted content key data, and encrypted usage control policy data indicating the handling of the content data to the data distribution apparatus, performs charge processing in units of the content data based on log data received from the data processing apparatus, and performs a profit distribution processing for distributing the profit paid by interested parties of the data processing apparatus to interested parties of the related data providing apparatus and interested parties of the data distribution apparatus, the data distribution apparatus distributes a second module storing the encrypted content data, content key data, and usage control policy data stored in the provided first module to the data processing apparatus by using a predetermined communication protocol but in a format not depending upon the related communication protocol or by recording the same on a storage medium, and the data processing apparatus decrypts the content key data and the usage control policy data stored in the distributed module, determines the handling of the content data based on the related decrypted usage control policy data, produces the log data for the handling of the related content data, and sends the related log data to the data providing apparatus.

Also, a data providing system of a 70th aspect of the present invention is a data providing system having a data providing apparatus, a data distribution apparatus, and a management apparatus, wherein the data providing apparatus provides content data, the data distribution apparatus distributes the content file provided from the data providing apparatus or a content file in accordance with the content data provided by the data providing apparatus provided from the management apparatus to the data processing apparatus, and the data processing apparatus decrypts the usage control policy data stored in a key file received from the data distribution apparatus or the management apparatus, determines the handling of the content data stored in the content file received from the data distribution apparatus or the management apparatus based on the related decrypted usage control policy data, and further distributes the content file and key file received from the data distribution apparatus or the management apparatus to the other data processing apparatus.

Also, a data providing method of a 34th aspect of the present invention is a data providing method for distributing content data from a data providing apparatus to a data processing apparatus, comprising the steps of distributing a module storing the content data encrypted by using content key data, the encrypted content key data, and encrypted usage control policy data indicating the handling of the content data from the data providing apparatus to the data processing apparatus by using a predetermined communication protocol but in a format not depending upon the related communication protocol or recording the same on a storage medium, and in the data processing apparatus, decrypting the content key data and the usage control policy data stored in the distributed module and determining the handling of the content data based on the related decrypted usage control policy data.

Also, a data providing method of a **35*h*** aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the produced key file from the management apparatus to the data providing apparatus, and distributing a module storing a content file storing the content data encrypted by using the content key data and the key file distributed from the management apparatus from the data providing apparatus to the data processing apparatus by using a predetermined communication protocol but in a format not depending upon the related communication protocol or recording the same on a storage medium, and in the data processing apparatus, decrypting the content key data and the usage control policy data stored in the distributed module and determining the handling of the content data based on the related decrypted usage control policy data.

Also, a data providing method of a 36th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, in the data providing apparatus, distributing a module storing a content file containing the content data encrypted by using the content key data and a key file received from the management apparatus to the data processing apparatus by using a predetermined communication protocol but in a format not depending upon the related communication protocol or recording the same on a storage medium, and in the data processing apparatus, decrypting the content key data and the usage control policy data stored in the distributed module and determining the handling of the content data based on the related decrypted usage control policy data.

Also, a data providing method of a 37th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related produced key file from the management apparatus to the data providing apparatus, and individually distributing a content file storing the content data encrypted by using the content key data and the key file distributed from the management apparatus from the data providing apparatus to the data processing apparatus by using a predetermined communication protocol but in a format not depending upon the related communication protocol or recording the same on a storage medium, and in the data processing apparatus, decrypting the content key data and the usage control policy data stored in the distributed key file and determining the handling of the content data stored in the distributed content file based on the related decrypted usage control policy data.

Also, a data providing method of a 38th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related produced key file from the management apparatus to the data processing apparatus, and distributing a content file storing the content data encrypted by using the content key data from the data providing apparatus to the data processing apparatus by using a predetermined communication protocol but in a format not depending upon the related communication protocol or recording the same on a storage medium, and in the data processing apparatus, decrypting the content key data and the usage control policy data stored in the distributed key file and determining the handling of the content data stored in the distributed content file based on the related decrypted usage control policy data.

Also, a data providing method of a 39th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, in the data providing apparatus, distributing a module storing the content data encrypted by using the content key data and the key file received from the management apparatus to the data processing apparatus by using a predetermined communication protocol but in a format not depending upon the related communication protocol or recording the same on a storage medium, and in the data processing apparatus, decrypting the content key data and the usage control policy data stored in the distributed module and determining the handling of the content data based on the related decrypted usage control policy data.

Also, a data providing method of a 40th aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data, in the data providing apparatus, individually distributing the content data encrypted by using the content key data and the key file received from the management apparatus to the data processing apparatus by using a predetermined communication protocol but in a format not depending upon the related communication protocol or recording the same on a storage medium, and in the data processing apparatus, decrypting the content key data and the usage control policy data stored in the distributed key file and determining the handling of the distributed content data based on the related decrypted usage control policy data.

Also, a data providing method of a 41st aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data and distributing the related produced key file to the data processing apparatus, in the data providing apparatus, distributing the content data encrypted by using the content key data to the data processing apparatus by using a predetermined communication protocol but in a format not depending upon the related communication protocol or recording the same on a storage medium, and in the data processing apparatus, decrypting the content key data and the usage control policy data stored in the distributed key file and determining the handling of the distributed content data based on the related decrypted usage control policy data.

Also, a data providing method of a 42nd aspect of the present invention is a data providing method for distributing content data from a data providing apparatus to a data processing apparatus and managing the data providing apparatus and the data processing apparatus by a management apparatus, comprising the steps of, in the management apparatus, preparing encrypted content key data and encrypted usage control policy data indicating the handling of the content data, in the data providing apparatus, individually distributing the content data encrypted by using the content key data and the encrypted content key data and the encrypted usage control policy data received from the management apparatus to the data processing apparatus by using a predetermined communication protocol but in a format not depending upon the related communication protocol or recording the same on a storage medium, and in the data processing apparatus, decrypting the distributed content key data and the usage control policy data and determining the handling of the content data stored in the distributed content file based on the related decrypted usage control policy data.

Also, a data providing method of a 43rd aspect of the present invention is a data providing method for distributing content data from a data providing apparatus to a data processing apparatus and managing the data providing apparatus and the data processing apparatus by a management apparatus, comprising the steps of, in the management apparatus, preparing encrypted content key data and encrypted usage control policy data indicating the handling of the content data and distributing the same to the data processing apparatus, in the data providing apparatus, distributing the content data encrypted by using the content key data to the data processing apparatus by using a predetermined communication protocol but in a format not depending upon the related communication protocol or recording the same on a storage medium, and in the data processing apparatus, decrypting the distributed content key data and the usage control policy data and determining the handling of the distributed content data based on the related decrypted usage control policy data.

Also, a data providing method of a 44th aspect of the present invention is a data providing method using a data providing apparatus, a data distribution apparatus, and a data processing apparatus, comprising the steps of providing a first module storing content data encrypted by using content key data, encrypted the content key data, and encrypted usage control policy data indicating the handling of the content data from the data providing apparatus to the data distribution apparatus, distributing a second module storing the encrypted content data, content key data, and the usage control policy data stored in the provided the first module from the data distribution apparatus to the data processing apparatus by using the content key data to the data processing apparatus by using a predetermined communication protocol but in a format not depending upon the related communication protocol or recording the same on a storage medium, and in the data processing apparatus, decrypting the content key data and the usage control policy data stored in the distributed second module and determining the handling of the content data based on the related decrypted usage control policy data.

Also, a data providing method of a 45th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, distributing the related produced key file from the management apparatus to the data providing apparatus, providing a first module storing a content file storing the content data encrypted by using the content key data and the key file received from the management apparatus from the data providing apparatus to the data distribution apparatus, and distributing a second module storing the provided content file and the key file from the data distribution apparatus to the data processing apparatus by using a predetermined communication protocol but in a format not depending upon the related communication protocol or recording the same on a storage medium, and in the data processing apparatus, decrypting the content key data and the usage control policy data stored in the distributed second module and determining the handling of the content data stored in the distributed second module based on the related decrypted usage control policy data.

Also, a data providing method of a 46th aspect of the present invention is a data providing method for providing content data from a data providing apparatus to a data distribution apparatus, distributing the content data from the data distribution apparatus to a data processing apparatus, and managing the data providing apparatus, the data distribution apparatus and the data processing apparatus by a management apparatus, comprising the steps of, in the management apparatus, preparing a key file storing encrypted content key data and encrypted usage control policy data indicating the handling of the content data, in the data providing apparatus, providing a first module storing a content file containing the content data encrypted by using the content key data and a key file received from the management apparatus to the data distribution apparatus, in the data distribution apparatus, distributing a second module storing the provided content file to the data processing apparatus by using a predetermined communication protocol but in a format not depending upon the related communication protocol or recording the same on a storage medium, and in the data processing apparatus, decrypting the content key data and the usage control policy data stored in the distributed second module and determining the handling of the content data stored in the distributed second module based on the related decrypted usage control policy data.

Also, a data providing method of a 47th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, distributing the produced key file from the management apparatus to the data providing apparatus, individually providing a content file storing the content data encrypted by using the content key data and the key file received from the management apparatus from the data providing apparatus to the data distribution apparatus by using a predetermined communication protocol but in a format not depending upon the related communication protocol or recording the same on a storage medium, and individually distributing the distributed content file and the key file from the data distribution apparatus to the data distribution apparatus, and in the data processing apparatus, decrypting the content key data and the usage control policy data stored in the distributed key file and determining the handling of the content data stored in the distributed content file based on the related decrypted usage control policy data.

Also, a data providing method of a 48th aspect of the present invention is a data providing method for providing content data from a data providing apparatus to a data distribution apparatus and managing the data providing apparatus and the data processing apparatus by a management apparatus, comprising the steps of, in the management apparatus, preparing a key file storing encrypted content key data and encrypted usage control policy data indicating the handling of the content data, distributing the related produced key file from the management apparatus to the data processing apparatus, providing a content file storing the content data encrypted by using the content key data from the data providing apparatus to the data distribution apparatus, distributing the provided content file from the data distribution apparatus to the data processing apparatus by using a predetermined communication protocol but in a format not depending upon the related communication protocol or recording the same on a storage medium, and in the data processing apparatus, decrypting the content key data and the usage control policy data stored in the distributed key file and determining the handling of the content data stored in the distributed content file based on the related decrypted usage control policy data.

Also, a data providing method of a 49th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, in the data providing apparatus, providing a first module storing the content data encrypted by using the content key data and the key file received from the management apparatus to the data distribution apparatus, in the data distribution apparatus, distributing a second module storing the provided content data and the key file to the data processing apparatus by using a predetermined communication protocol but in a format not depending upon the related communication protocol or recording the same on a storage medium, and in the data processing apparatus, decrypting the content key data and the usage control policy data stored in the distributed second module and determining the handling of the content data stored in the distributed second module based on the related decrypted usage control policy data.

Also, a data providing method of a 50th aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, preparing a key file storing encrypted content key data and encrypted usage control policy data indicating the handling of the content data, in the data providing apparatus, individually providing the content data encrypted by using the content key data and the key file received from the management apparatus to the data distribution apparatus, in the data distribution apparatus, individually distributing the distributed content data and the key file to the data distribution apparatus by using a predetermined communication protocol but in a format not depending upon the related communication protocol or recording the same on a storage medium, and in the data processing apparatus, decrypting the content key data and the usage control policy data stored in the distributed key file and determining the handling of the distributed content data based on the related decrypted usage control policy data.

Also, a data providing method of a 51st aspect of the present invention is a data providing method for distributing content data from a data providing apparatus to a data processing apparatus and managing the data providing apparatus and the data processing apparatus by a management apparatus, comprising the steps of, in the management apparatus, preparing a key file storing encrypted content key data and encrypted usage control policy data indicating the handling of the content data and distributing the related produced key file to the data processing apparatus, in the data providing apparatus, providing the content data encrypted by using the content key data to the data distribution apparatus, in the data distribution apparatus, distributing the provided content data to the data processing apparatus, and in the data processing apparatus, decrypting the content key data and the usage control policy data stored in the distributed key file and determining the handling of the distributed content data based on the related decrypted usage control policy data.

Also, a data providing method of a 52nd aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, providing encrypted content key data and encrypted usage control policy data indicating the handling of the content data to the data providing apparatus, in the data providing apparatus, individually distributing the content data encrypted by using the content key data and the encrypted content key data and the encrypted usage control policy data received from the management apparatus to the data distribution apparatus, in the data distribution apparatus, individually distributing the distributed content data, the encrypted content key, data, and the encrypted usage control policy data to the data distribution apparatus by using a predetermined communication protocol but in a format not depending upon the related communication protocol or recording the same on a storage medium, and in the data processing apparatus, decrypting the distributed content key data and the usage control policy data and determining the handling of the distributed content data based on the related decrypted usage control policy data.

Also, a data providing method of a 53rd aspect of the present invention is a data providing method for providing content data from a data providing apparatus to a data distribution apparatus, distributing the content data from the data distribution apparatus to a data processing apparatus, and managing the data providing apparatus, the data distribution apparatus, and the data processing apparatus by a management apparatus, comprising the steps of, in the management apparatus, distributing encrypted content key data and encrypted usage control policy data indicating the handling of the content data to the data processing apparatus, in the data providing apparatus, providing the content data encrypted by using the content key data to the data distribution apparatus, the data distribution apparatus distributing the provided content data to the data processing apparatus by using a predetermined communication protocol but in a format not depending upon the related communication protocol by recording the same on a storage medium, and in the data processing apparatus, decrypting the distributed content key data and the usage control policy data and determining the handling of the distributed content data based on the related decrypted usage control policy data.

Also, a data providing method of a 54th aspect of the present invention is a data providing method using a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file and the key file to the data distribution apparatus, the data distribution apparatus distributes the provided content file and the key file to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing method of a 55th aspect of the present invention is a data providing method using a data providing apparatus, a data distribution apparatus, a management apparatus, and a data processing apparatus, wherein the data providing apparatus provides master source data of content to the management apparatus, the management apparatus manages the data providing apparatus, the data distribution apparatus, and the data processing apparatus, encrypts the provided master source data by using content key data to produce content data, produces a content file storing the related content data, produces a key file storing the encrypted content key data and encrypted usage control policy data indicating the handling of the content data, and provides the content file to the data distribution apparatus and provides the key file to the data processing apparatus, the data distribution apparatus distributes the provided content file to the data processing apparatus by using a predetermined communication protocol but in a format not depending upon the related communication protocol or by recording the same on a storage medium, and the data processing apparatus decrypts the content key data and the usage control policy data stored in the provided key file and determines the handling of the content data stored in the distributed content file based on the related decrypted usage control policy data.

Also, a data providing method of a 56th aspect of the present invention is a data providing method using a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, and provides the content file provided from the data providing apparatus and the produced key file to the data distribution apparatus, the data distribution apparatus distributes the provided content file and the key file to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing method of a 57th aspect of the present invention is a data providing method using a data providing apparatus, a data distribution apparatus, a management apparatus, and a data processing apparatus, wherein the data providing apparatus provides a content file storing encrypted content data using content key data to the management apparatus, the management apparatus manages the data providing apparatus, the data distribution apparatus, and the data processing apparatus, produces a key file storing the encrypted content key data and encrypted usage control policy data indicating the handling of the content data, provides the content file provided from the data providing apparatus to the data distribution apparatus and provides the produced key file to the data processing apparatus, the data distribution apparatus distributes the provided content file to the data processing apparatus by using a predetermined communication protocol but in a format not depending upon the related communication protocol or by recording the same on a storage medium, and the data processing apparatus decrypts the content key data and the usage control policy data stored in the provided key file and determines the handling of the content data stored in the distributed content file based on the related decrypted usage control policy data.

Also, a data providing method of a 58th aspect of the present invention is a data providing method using a data providing apparatus, a data distribution apparatus, a management apparatus, a database device, and a data processing apparatus, wherein the data providing apparatus encrypts content data by using content key data, produces a content file storing the related encrypted content data, and stores the related produced content file and a key file provided from the management apparatus in the database device, the management apparatus produces a key file storing the encrypted content key data and encrypted usage control policy data indicating the handling of the content data and provides the related produced key file to the data providing apparatus, the data distribution apparatus distributes the content file and key file obtained from the database device to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing method of a 59th aspect of the present invention is a data providing method using a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces a key file storing the encrypted content key data and encrypted usage control policy data indicating the handling of the content data and provides the related produced key file to the data distribution apparatus, the data distribution apparatus distributes the content file obtained from the database device and the key file provided from the data distribution apparatus to the data processing apparatus by using a predetermined communication protocol but in a format not depending upon the related communication protocol or by recording the same on a storage medium, and the data processing apparatus decrypts the content key data and the usage control policy data stored in the distributed key file and determines the handling of the content data stored in the distributed content file based on the related decrypted usage control policy data.

Also, a data providing method of a 60th aspect of the present invention is a data providing method using a data providing apparatus, a data distribution apparatus, a management apparatus, a database device, and a data processing apparatus, wherein the data providing apparatus encrypts content data by using content key data, produces a content file storing the related encrypted content data, and stores the related produced content file in the database device, the management apparatus produces a key file storing the encrypted content key data and encrypted usage control policy data indicating the handling of the content data and provides the related produced key file to the data processing apparatus, the data distribution apparatus distributes the content file obtained from the database device to the data processing apparatus by using a predetermined communication protocol but in a format not depending upon the related communication protocol or by recording the same on a storage medium, and the data processing apparatus decrypts the content key data and the usage control policy data stored in the provided key file and determines the handling of the content data stored in the distributed content file based on the related decrypted usage control policy data.

Also, a data providing method of a 61st aspect of the present invention is a data providing method using a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files and key files provided from corresponding management apparatuses in the database device, the management apparatuses produce key files storing the encrypted content key data and encrypted usage control policy data indicating the handling of the content data for the content data provided by corresponding data providing apparatuses and provide the related produced key files to corresponding data providing apparatuses, the data distribution apparatus distributes the content files and key files obtained from the database device to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the distributed content files based on the related decrypted usage control policy data.

Also, a data providing method of a 62nd aspect of the present invention is a data providing method using a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce key files storing the encrypted content key data and encrypted usage control policy data indicating the handling of the content data for the content data provided by corresponding data providing apparatuses and provide the related produced key files to the data distribution apparatus, the data distribution apparatus distributes the content files obtained from the database device and the key files provided from the management apparatuses to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the distributed content files based on the related decrypted usage control policy data.

Also, a data providing method of a 63rd aspect of the present invention is a data providing method using a plurality of data providing apparatuses, a data distribution apparatus, a plurality of management apparatuses, a database device, and a data processing apparatus, wherein the data providing apparatuses encrypt content data by using content key data, produce content files storing the related encrypted content data, and store the related produced content files in the database device, the management apparatuses produce key files storing the encrypted content key data and encrypted usage control policy data indicating the handling of the content data for the content data provided by corresponding data providing apparatuses and provide the related produced key files to the data processing apparatus, the data distribution apparatus distributes the content files obtained from the database device to the data processing apparatus by using a predetermined communication protocol but in a format not depending upon the related communication protocol or by recording the same on a storage medium, and the data processing apparatus decrypts the content key data and the usage control policy data stored in the provided key files and determines the handling of the content data stored in the distributed content files based on the related decrypted usage control policy data.

Also, a data providing method of a 64th aspect of the present invention is a data providing method using a plurality of data providing apparatuses, a data distribution apparatus, a plurality of management apparatuses, a database device, and a data processing apparatus, wherein the data providing apparatuses provide master sources of content data to corresponding management apparatuses and store content files and key files received from the related management apparatuses in the database, the management apparatuses encrypt the master sources received from corresponding data providing apparatuses by using content key data, produce content files storing the related encrypted content data, produce key files storing the encrypted content key data and encrypted usage control policy data indicating the handling of the content data for the content data provided by corresponding data providing apparatuses, and send the produced content files and the produced key files to corresponding data providing apparatuses, the data distribution apparatus distributes the content files and key files obtained from the database device to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the distributed content files based on the related decrypted usage control policy data.

Also, a data providing method of a 65th aspect of the present invention is a data providing method using a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce content files storing the related encrypted content data, send the related produced content files to the data providing apparatuses, produce key files storing the encrypted content key data and encrypted usage control policy data indicating the handling of the content data for the content data provided by corresponding data providing apparatuses, send the related produced key files to corresponding data distribution apparatus, the data distribution apparatus distributes the content files obtained from the database device and the key files provided from the management apparatuses to the data processing apparatus by using a predetermined communication protocol but in a format not depending upon the related communication protocol or by recording the same on a storage medium, and the data processing apparatus decrypts the content key data and the usage control policy data stored in the distributed key files and determines the handling of the content data stored in the distributed content files based on the related decrypted usage control policy data.

Also, a data providing method of a 66th aspect of the present invention is a data providing method using a plurality of data providing apparatuses, a data distribution apparatus, a plurality of management apparatuses, a database device, and a data processing apparatus, wherein the data providing apparatuses provide master sources of content data to corresponding management apparatuses and store content files received from the related management apparatuses in the database, the management apparatuses encrypt the master sources received from corresponding data providing apparatuses by using content key data, produce content files storing the related encrypted content data, send the related produced content files to the data providing apparatuses, produce key files storing the encrypted content key data and encrypted usage control policy data indicating the handling of the content data for the content data provided by corresponding data providing apparatuses, and provide the related produced key files to the data processing apparatus, the data distribution apparatus distributes the content files obtained from the database device to the data processing apparatus by using a predetermined communication protocol but in a format not depending upon the related communication protocol or by recording the same on a storage medium, and the data processing apparatus decrypts the content key data and the usage control policy data stored in the provided key files and determines the handling of the content data stored in the distributed content files based on the related decrypted usage control policy data.

Also, a data providing method of a 67th aspect of the present invention is a data providing method using a data providing apparatus, a data distribution apparatus, and a data processing apparatus, wherein the data providing apparatus provides a first module storing content data encrypted by using content key data, the encrypted content key data, and encrypted usage control policy data indicating the handling of the content data to the data distribution apparatus, performs charge processing in units of the content data based on log data received from the data processing apparatus, performs profit distribution processing for distributing the profit paid by interested parties of the data processing apparatus to interested parties of the related data providing apparatus and interested parties of the data distribution apparatus, the data distribution apparatus distributes a second module storing the encrypted content data, content key data and usage control policy data stored in the provided first module to the data processing apparatus by using a predetermined communication protocol but in a format not depending upon the related communication protocol or by recording the same on a storage medium, and the data processing apparatus decrypts the content key data and the usage control policy data stored in the distributed module, determines the handling of the content data based on the related decrypted usage control policy data, produces the log data for the handling of the related content data and sends the related log data to the data providing apparatus.

Also, a data providing method of a 68th aspect of the present invention is a data providing method using a data providing apparatus, a data distribution apparatus, a data processing apparatus, and a management apparatus, wherein the data providing apparatus provides content data, the data distribution apparatus distributes the content file provided from the data providing apparatus or a content file in accordance with the content data provided by the data providing apparatus received from the management apparatus to the data processing apparatus, and the data processing apparatus decrypts the usage control policy data stored in the key file received from the data distribution apparatus or the management apparatus, determines the handling of the content data stored in the content file received from the data distribution apparatus or the management apparatus based on the related decrypted usage control policy data, and further distributes the content file and key file received from the data distribution apparatus or the management apparatus to the other data processing apparatus.

Also, a data providing system of a 71st aspect of the present invention is a data providing system for distributing content data from a data providing apparatus to a data processing apparatus, wherein the data providing apparatus distributes a module storing content data encrypted by using content key data, the encrypted content key data, and encrypted usage control policy data indicating the handling of the content data in a format not depending upon at least one among existence of a compression of the content data, a compression method, a method of the encryption, and parameters of a signal giving the content data to the data processing apparatus by using a predetermined communication protocol but in a format not depending upon the related communication protocol or by recording the same on a storage medium, and the data processing apparatus decrypts the content key data and the usage control policy data stored in the distributed module and determines the handling of the content data based on the related decrypted usage control policy data.

Also, a data providing system of a 72nd aspect of the present invention is a data providing system having a data providing apparatus, a data distribution apparatus, and a data processing apparatus, wherein the data providing apparatus distributes a first module storing content data encrypted by using content key data, the encrypted content key data, and encrypted usage control policy data indicating the handling of the content data in a format not depending upon at least one among existence of compression of the content data, a compression method, a method of the encryption, and parameters of a signal giving the content data to the data distribution apparatus, the data distribution apparatus distributes a second module storing the encrypted content data, content key data, and the usage control policy data stored in the provided first module to the data processing apparatus by using a predetermined communication protocol but in a format not depending upon the related communication protocol or by recording the same on a storage medium, and the data processing apparatus decrypts the content key data and the usage control policy data stored in the distributed second module and determines the handling of the content data based on the related decrypted usage control policy data.

Also, a data providing system of a 73rd aspect of the present invention is a data providing system having a data providing apparatus, a data distribution apparatus, and a data processing apparatus, wherein the data providing apparatus distributes a first module storing content data encrypted by using content key data, the encrypted content key data, and encrypted usage control policy data indicating the handling of the content data to the data distribution apparatus, the data distribution apparatus encrypts a plurality of second modules storing the encrypted content data, content key data, and the usage control policy data stored in the provided first module by using a common key obtained by mutual certification with the data processing apparatus, and then distributes the same to the data processing apparatus by using a predetermined communication protocol but in a format not depending upon the related communication protocol, and the data processing apparatus has a first processing circuit for decrypting the distributed plurality of second modules by using the common key, selecting a single or a plurality of second modules from among the related decrypted plurality of second modules, and performing charge processing with respect to a distribution service of the second modules and a tamper resistant second processing circuit receiving the selected the second modules, decrypting the content key data and the usage control policy data stored in the related second modules, and determining the handling of the content data based on the related decrypted usage control policy data.

BRIEF DESCRIPTION OF THE DRAWINGS

FIG. 27 is a view for explaining data stored in an external memory shown in FIG. 25, FIG. 28 is a view for explaining data stored in a stack memory, FIGS. 43G to 43J are views for explaining the format of the data transmitted and received among the content provider shown in FIG. 1, EMD service center, and SAM by the in-band method and the out-of-band method, FIG. 73 is a view for explaining contents of usage log data, FIG. 77 is a view for explaining the data stored in the storage unit shown in FIG. 76, FIG. 126 is a view of the configuration of the EMD system according to a ninth modification of the second embodiment of the present invention.

BEST MODE FOR WORKING THE INVENTION

Below, an explanation will be given of an EMD (electronic music distribution) system according to the present embodiment.

First Embodiment

Figure 1:
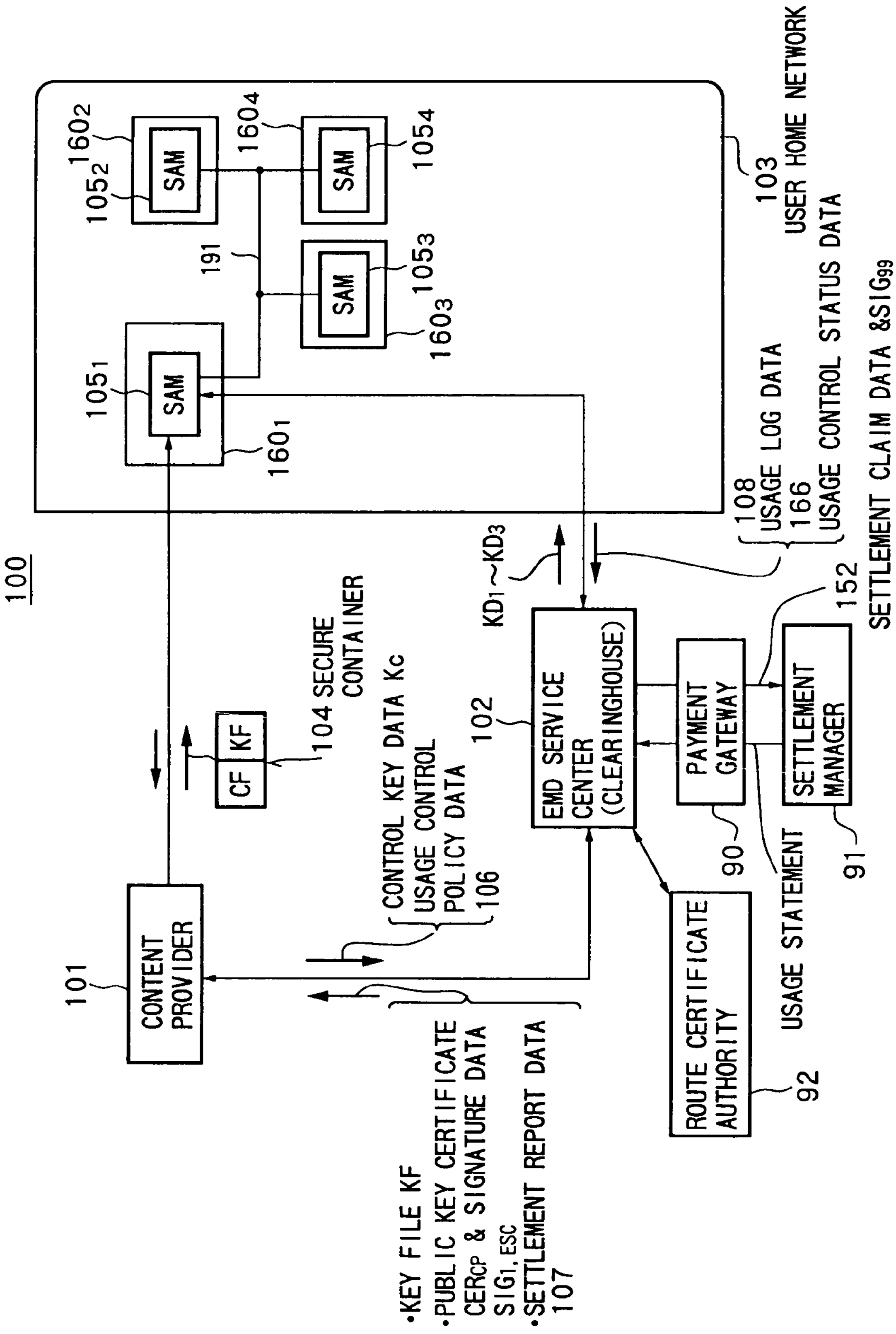
FIG. 1 is a view of the overall configuration of an EMD system of a first embodiment of the present invention.

FIG. 1 is a view of the configuration of an EMD system 100 of the present embodiment.

In the present embodiment, the content data distributed to the user means digital data with the information per se having value and includes image data, audio data, programs (software), etc., but an explanation will be given below by taking as an example music data.

As shown in FIG. 1, the EMD system 100 has a content provider 101, an EMD service center (clearinghouse, hereinafter, also described as an "ESC") 102, and a user home network 103.

Here, the content provider 101, EMD service center 102, and SAMs 105$_1$ to 105$_4$ correspond to the data providing apparatus, management device, and the data processing apparatuses according to claim 1, claim 6, claim 104, and claim 109.

First, a brief explanation will be given of the EMD system 100.

In the EMD system 100, the content provider 101 sends the content key data Kc used when encrypting the content data C of the content to be provided by itself, usage control policy (UCP, certificate of title) data 106 indicating the content of rights such as usage permission conditions of the content data C, and electronic watermark information management data indicating the content and buried location of the electronic watermark information to the EMD service center 102 serving as the reputable authority manager.

The EMD service center 102 registers (certifies or authorizes) the content key data Kc, usage control policy data 106, and the electronic watermark information key data received from the content provider 101.

Also, the EMD service center 102 produces a key file KF with the content key data Kc encrypted by the distribution use key data $KD_1$ to $KD_6$ of a corresponding period, the usage control policy data 106, and its own signature data stored therein and sends this to the content provider 101.

Here, the signature data is used for verifying existence of tampering with the key file KF, the legitimacy of the author of the key file KF, and the fact that the key file KF was normally registered in the EMD service center 102.

Also, the content provider 101 encrypts the content data C by the content key data Kc and distributes a secure container (module of the present invention) 104 storing the related produced content file CF, key file KF received from the EMD service center 102, its own signature data, etc. therein to the user home network 103 by using a network such as the Internet, digital broadcast, or package media such as storage media.

Here, the signature data stored in the secure container 104 is used for verifying the existence of tampering with the corresponding data and the legitimacy of the author and transmitter of the related data.

The user home network 103 has for example a network apparatus 160$_1$ and AV apparatuses 160$_2$ to 160$_4$.

The network apparatus 160$_1$ includes a built-in SAM (secure application module) 105$_1$.

The AV apparatuses 160$_2$ to 160$_4$ include built-in SAMs 105$_1$ to 105$_4$. The SAMs 105$_1$ to 105$_4$ are connected to each other via a bus 191 for example an IEEE (Institute of Electrical and Electronics Engineers) 1394 serial interface bus.

The SAMs 105$_1$ to 105$_4$ decrypt the secure container 104 received by the network apparatus 160$_1$ via the network or the like from the content provider 101 on-line and/or the secure container 104 received at the AV apparatuses 160$_2$ to 160$_4$ from the content provider 101 via storage media off-line by using the distribution use key data $KD_1$ to $KD_3$ of the corresponding period, then perform the verification of the signature data.

The secure container 104 supplied to the SAMs 105$_1$ to 105$_4$ becomes the object of the reproduction, recording to a storage medium etc. after the purchase and/or usage form is determined by an operation of the users in the network apparatus 160$_1$ and the AV apparatuses 160$_2$ to 160$_4$.

The SAMs 105$_1$ to 105$_4$ record the log of the purchase and/or usage form of the secure container 104 as usage log data 108 and, at the same time, produce usage control status data 166 indicating the purchase form.

The usage log data 108 is transmitted from the user home network 103 to the EMD service center 102 in response to for example a request from the EMD service center 102.

The usage control status data 166 is transmitted from the user home network 103 to the EMD service center 102 whenever for example the purchase form is determined.

The EMD service center 102 determines (calculates) a charge content based on the usage log data 108 and performs settlement at a settlement manager 91 such as a bank via a payment gateway 90. By this, the money paid to the settlement manager 91 by the user of the user home network 103 is paid to the content provider 101 by the settlement processing by the EMD service center 102.

Also, the EMD service center 102 transmits the settlement report data 107 to the content provider 101 at every predetermined period.

In the present embodiment, the EMD service center 102 has a certificate authority function, a key data management function, and a right clearing (profit distribution) function.

Namely, the EMD service center 102 functions as a second certificate authority with respect to a route certificate authority 92 as the highest authority manager located at a neutral position (located in the lower layer of the route certificate authority 92) and certifies the legitimacy of the related public key data by attaching a signature by secret key data of the EMD service center 102 to the certificate data of the public key data used for the verification processing of the signature data in the content provider 101 and SAMs $\mathbf{105}_1$ to $\mathbf{105}_4$. Also, as mentioned above, the registration and authorization of the usage control policy data 106 of the content provider 101 by the EMD service center 102 is one of the certificate authority functions of the EMD service center 102.

Also, the EMD service center 102 has a key data management function for managing the key data, for example, the distribution use key data $KD_1$ to $KD_6$.

Also, the EMD service center 102 has a right clearing (profit distribution) function of performing settlement for a purchase and/or usage of the content by the user based on the suggested retailer price SRP described in the authorized usage control policy data 106 and the usage log data 108 input from the SAMs $\mathbf{105}_1$ to $\mathbf{105}_4$ and distributing money paid by the user to the content provider 101.

Figure 2:
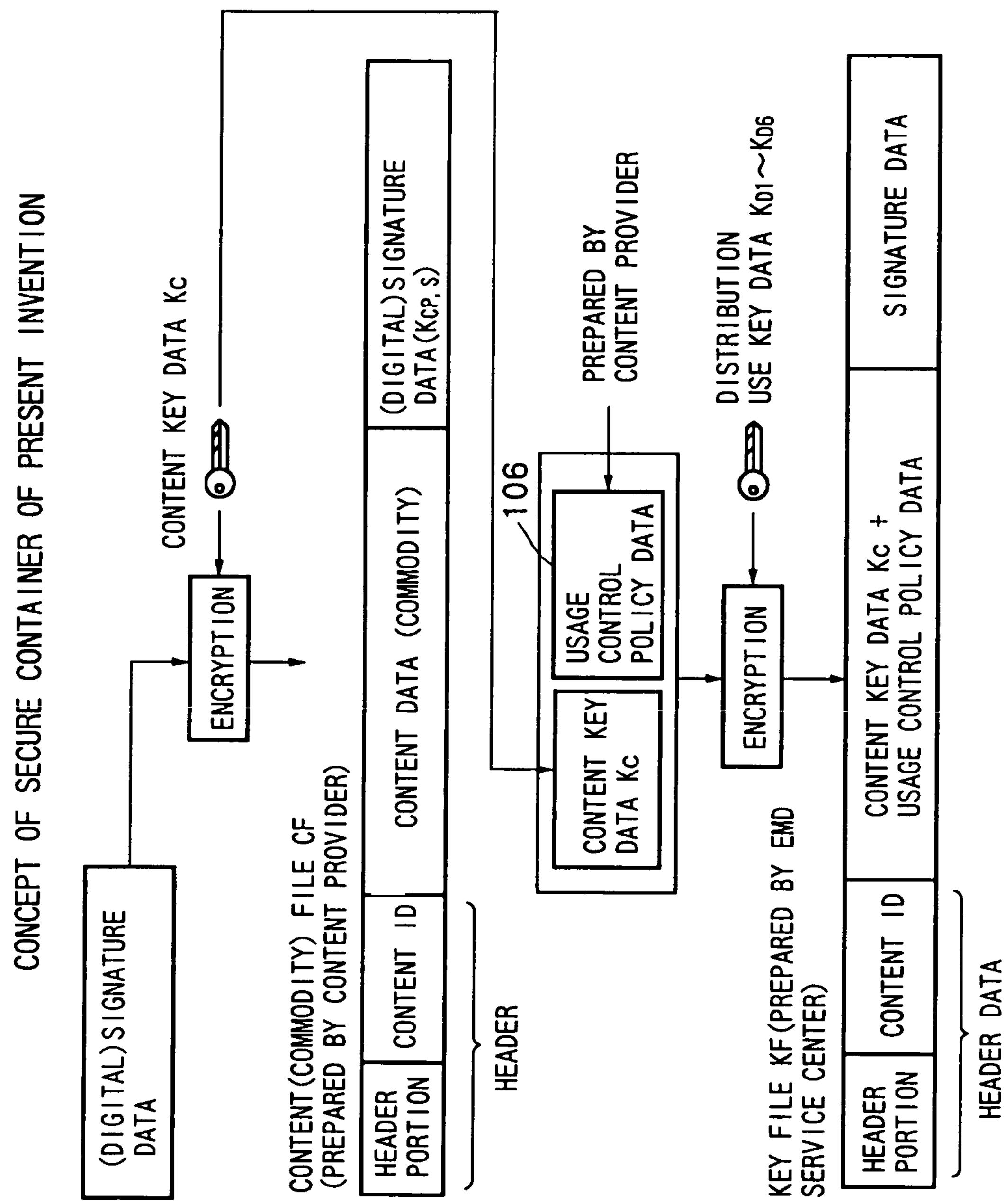
FIG. 2 is a view for explaining a concept of a secure container of the present invention.

FIG. 2 is a view summarizing the concept of the secure container 104.

As shown in FIG. 2, in the secure container 104, the content file CF produced by the content provider 101 and the key file KF produced by the EMD service center 102 are stored.

In the content file CF, header data containing the header portion and the content ID, the encrypted content data C using the content key data Kc, and the signature data using a secret key data $K_{CP,S}$ of the content provider 101 for them are stored.

In the key file KF, the header data containing the header portion and the content ID, the content key data Kc, and the usage control policy data 106 encrypted by the distribution use key data $KD_1$ to $KD_6$ and the signature data by secret key data $K_{ESC,S}$ of the EMD service center 102 for them are stored.

Below, a detailed explanation will be given of the components of the content provider 101.

[Content Provider 101]

Figure 3:
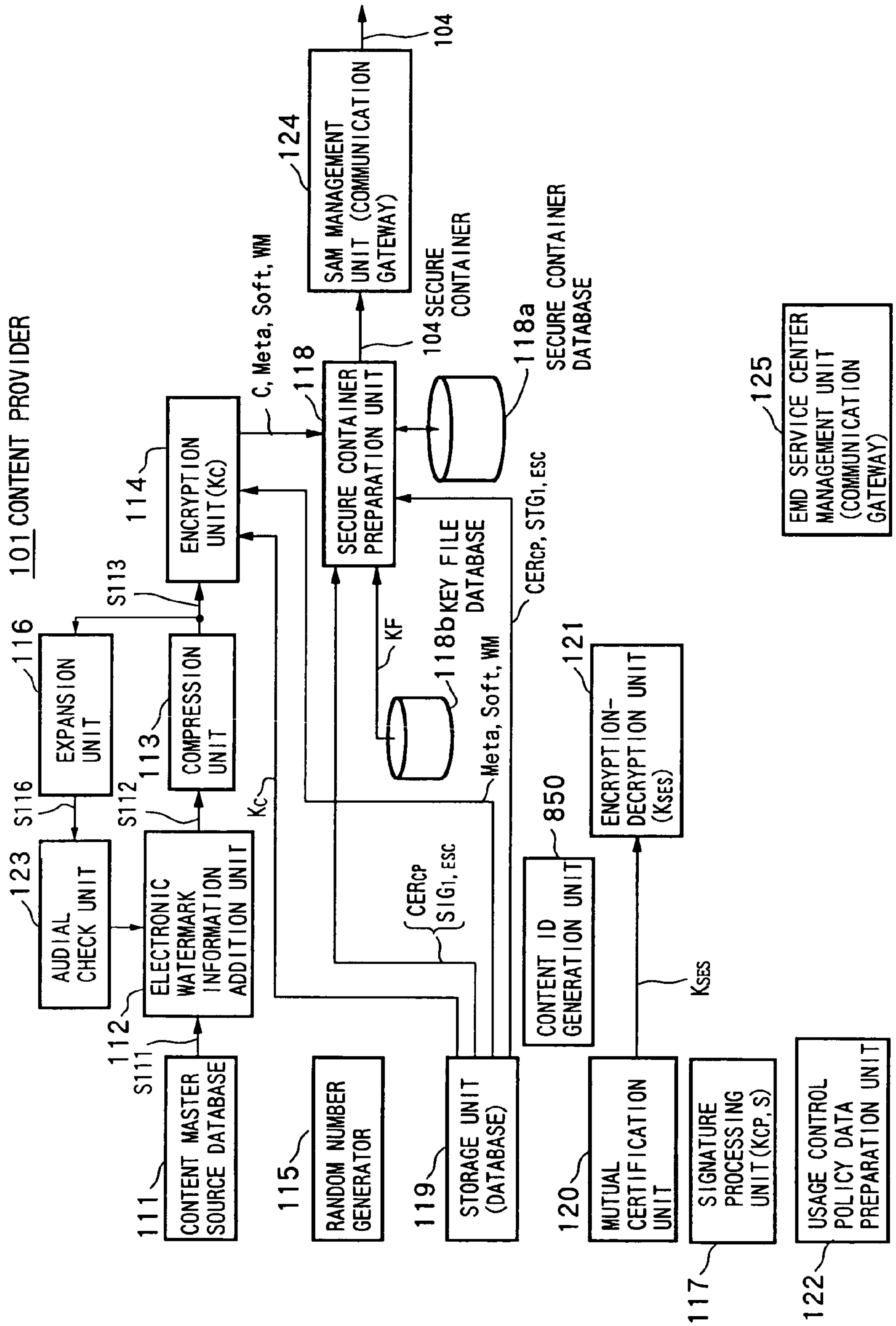
FIG. 3 is a functional block diagram of a content provider shown in FIG. 1 and a view of a flow of data related to data transmitted and received with a SAM of a user home network.

FIG. 3 is a functional block diagram of the content provider 101 and shows the flow of the data related to the data transmitted and received with the SAM $\mathbf{105}_1$ to $\mathbf{105}_4$ of the user home network 103.

Figure 4:
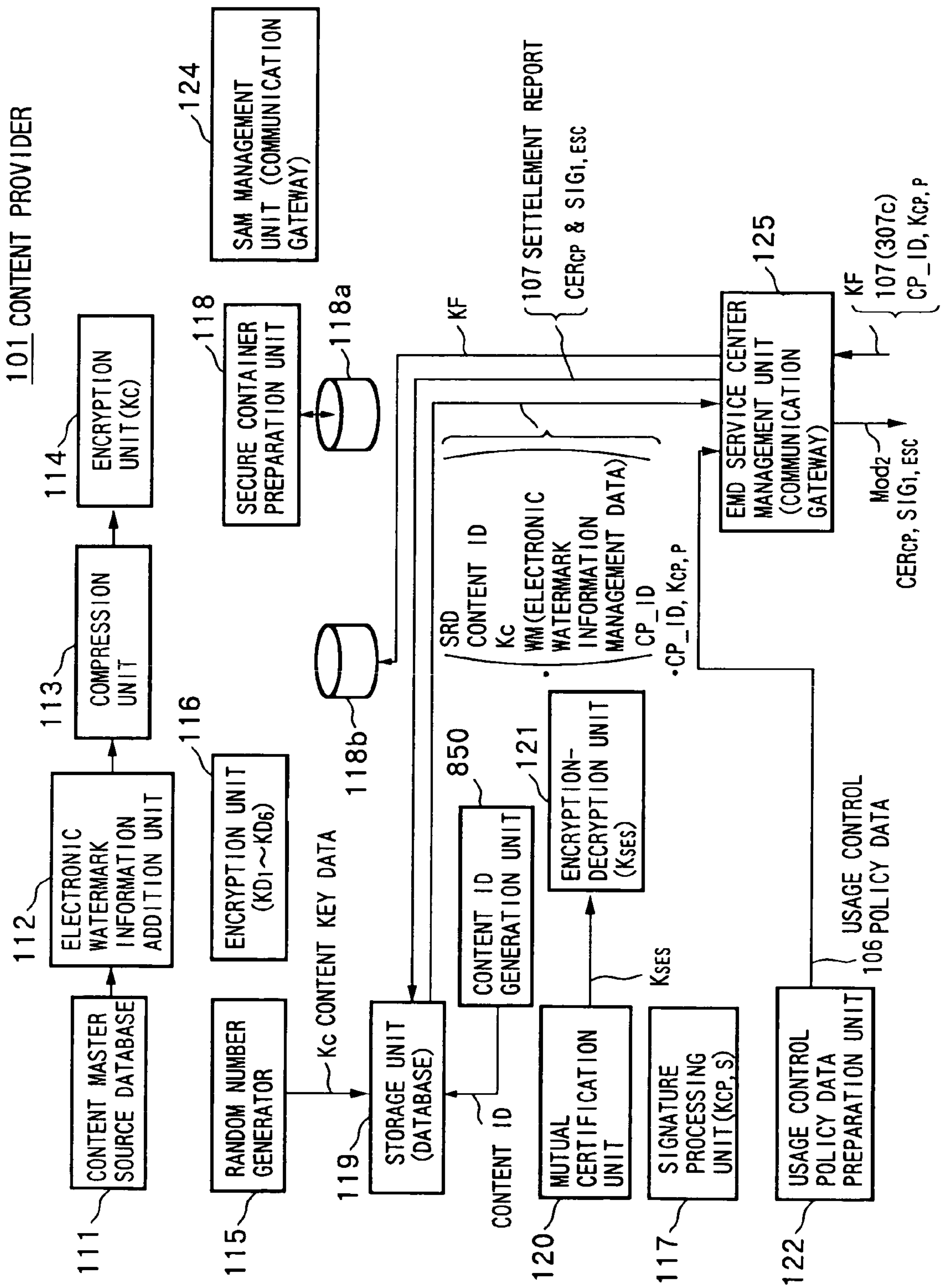
FIG. 4 is a functional block diagram of the content provider shown in FIG. 1 and a view of the flow of data related to the data transmitted and received between the content provider and an EMD service center.

Also, in FIG. 4, the flow of the data related to the data transmitted and received between the content provider 101 and the EMD service center 102 is shown.

Note that, in FIG. 4 and the following drawings, the flow of the data input and output to and from the signature data processing unit and the encryption and/or decryption unit using session key data $K_{SES}$ is omitted.

As shown in FIG. 3 and FIG. 4, the content provider 101 has a content master source database 111, an electronic watermark information addition unit 112, a compression unit 113, an encryption unit 114, a random number generation unit 115, an expansion unit 116, a signature processing unit 117, a secure container preparation unit 118, a secure container database 118*a*, a key file database 118*b*, a storage unit (database) 119, a mutual certification unit 120, an encryption and/or decryption unit 121, a usage control policy data preparation unit 122, an audial check unit 123, a SAM management unit 124, an EMD service center management unit 125, and a content ID generation unit 850.

The content provider 101 registers for example its own generated public key data, ID, and its own bank account number (account number for settlement) in the EMD service center 102 off-line before communicating with the EMD service center 102 and acquires its own identifier (identification number) CP_ID. Also, the content provider 101 receives the public key data of the EMD service center 102 and the public key data of the route certificate authority 92 from the EMD service center 102.

Below, an explanation will be given of the functional blocks of the content provider 101 shown in FIG. 3 and FIG. 4.

The content master source database 111 stores the content data as the master source of the content to be provided to the user home network 103 and outputs content data S111 to be provided to the electronic watermark information addition unit 112.

The electronic watermark information addition unit 112 buries a source watermark Ws, a copy control watermark Wc, a user watermark Wu, a link watermark WL, etc. in the content data S111 to produce content data S112 and outputs the content data S112 to the compression unit 113.

The source watermark Ws is information concerning the copyright such as the name of the copyright owner of the content data, the ISRC code, authoring date, authoring apparatus ID (identification data), and destination of distribution of the content.

The copy control watermark Wc is information containing a copy prohibition bit for prevention of copying via an analog interface.

The user watermark Wu contains, for example, the identifier CP_ID of the content provider 101 for specifying the origin of distribution and the destination of distribution of the secure container 104 and identifiers $SAM\_ID_1$ to $SAM\_ID_4$ of the SAMs $\mathbf{105}_1$ to $\mathbf{105}_4$ of the user home network 103.

The link watermark WL contains for example the content ID of the content data C.

By burying the link watermark WL in the content data C, even in a case where the content data C is distributed by an analog broadcast for example a television or AM/FM radio, the EMD service center 102 can introduce a content provider 101 handling the related content data C to the user in response to a request from the user. Namely, by detecting the link watermark WL buried in the content data C utilizing an electronic watermark information decoder at the receiving location of the related content data C and transmitting the content ID contained in the related detected link watermark WL to the EMD service center 102, the EMD service center 102 can introduce the content provider 101 etc. handling the related content data C to the related user.

Concretely, for example, if the user pushes a predetermined button at a point of time when he thinks that the music being broadcast is good while listening to the radio in a car, the electronic watermark information decoder built-in the related radio detects the content ID contained in the link watermark WL buried in the related content data C, a communication address, etc. of the EMD service center 102 registering the related content data C etc., and stores the related detected data in a media SAM carried in for example a memory stick or other semiconductor memory or an MD (Mini Disc) or other optical disc or other portable medium. Then, he sets the related movable media in the network apparatus carrying a SAM connected to the network. Then, after mutual certification by the related SAM and the EMD service center 102, he transmits the personal information carried in the media SAM and the stored content ID etc. from the network apparatus to the EMD service center 102. Thereafter, the network apparatus receives an introduction list etc. of the content provider 101 etc. handling the related content data C from the EMD service center 102.

In addition, for example, when the EMD service center 102 receives the content ID etc. from the user, the information specifying the related user may be notified to the content provider 101 providing the content data C corresponding to the related content ID. In this case, the content provider 101 receiving the related communication transmits the related content data C to the network apparatus of the user if the related user is a contracting subscriber or may transmit promotional information concerning itself to the network apparatus of the user if the related user is not a contracting subscriber.

Note that, in the second embodiment mentioned later, an EMD service center 302 can introduce a service provider 310 handling the related content data C to the user based on the link watermark WL.

Also, in the present embodiment, preferably, the content and buried location of each electronic watermark information are defined as a watermark module WM, and the watermark module WM is registered and managed in the EMD service center 102. The watermark module WM is used when for example the network apparatus $\mathbf{160}_1$ and the AV apparatuses $\mathbf{160}_2$ to $\mathbf{160}_4$ in the user home network 103 verify the legitimacy of the electronic watermark information.

For example, in the user home network 103, by deciding that the electronic watermark information is legitimate where both of the buried location of the electronic watermark information and the content of the buried electronic watermark information match based on the user watermark module managed by the EMD service center 102, the burial of a false electronic watermark information can be detected with a high probability.

The compression unit 113 compresses the content data S112 by an acoustic compression method, for example ATRAC3 (Adaptive Transform Acoustic Coding 3) (trademark), and outputs compressed content data S113 to the encryption unit 114.

In this case, at the time of compression by the compression unit 113, it is also possible to bury the electronic watermark information in the content data again. Concretely, as shown in FIG. 3, when the content data 113 is expanded at the expansion unit 116 to produce content data S116 and the content data S116 is reproduced at the audial check unit 123, the influence exerted upon the quality of sound by the burial of the electronic watermark information is decided by for example a person actually listening to it. Where it does not satisfy a predetermined standard, the electronic watermark information addition unit 112 is instructed to perform the processing for burying the electronic watermark information again.

By this, when employing an acoustic compression method accompanied by for example loss of data, it is possible to adequately cope with the case where the buried electronic watermark information is lost due to the related compression. Further, it is also possible to expand the compressed content data again and confirm whether or not the buried electronic watermark information can be correctly detected. In this case, the feeling of the sound quality is also verified. Where there is a problem in the sound, the burial of the electronic watermark information is adjusted. For example, where the electronic watermark information is buried by using a masking effect, the layer for burying the electronic watermark information is adjusted.

The encryption unit 114 uses the content key data Kc as the common key, encrypts the content data S113 by a common key encryption method such as DES (Data Encryption Standard) or Triple DES to produce the content data C, and outputs this to the secure container preparation unit 118.

Also, the encryption unit 114 encrypts an A/V expansion use software Soft, a meta data Meta, and the watermark module WM by using the content key data Kc as the common key and then outputs them to the secure container preparation unit 117.

DES is the encryption method for processing 64 bits of plain text as one block by using a common key of 56 bits. The processing of DES is comprised of a portion for scrambling the plain text to convert the same to encrypted text (data scrambling portion) and a portion for creating the key (magnification key) data used in the data scrambling portion from the common key data (key processing portion). All algorithms of the DES are public, therefore, here, the basic processing of the data scrambling portion will be simply explained.

First, 64 bits of the plain text are divided to $H_0$ of the upper significant 32 bits and $L_0$ of lower significant 32 bits. By receiving as input the magnification key data $K_1$ of 48 bits supplied from the key processing unit and the $L_0$ of the lower significant 32 bits, the output of an F function scrambled $L_0$ of the lower significant 32 bits is calculated. The F function is comprised of two types of basic transforms of "substitution" of switching numerical values by a predetermined rule and "transposition" of switching bit locations by a predetermined rule. Next, an exclusive OR of the $H_0$ of the upper significant 32 bits and the output of the F function is calculated, and the result thereof is defined as $L_1$. Also, $L_0$ is made $H_1$.

Then, based on the $H_0$ of the upper significant 32 bits and the $L_0$ of the lower significant 32 bits, the above processing is repeated 16 times. The obtained $H_{16}$ of the upper significant 32 bits and $L_{16}$ of the lower significant 32 bits are output as the encrypted text. The decryption is realized by inversely following the sequence by using the common key data used for the encryption.

The random number generation unit 115 generates a random number of a predetermined number of bits and stores the related random number as the content key data Kc in the storage unit 119.

Note that, it is also possible if the content key data Kc is produced from the information concerning a song provided by the content data. The content key data Kc is updated for example every predetermined time.

Also, where a plurality of content providers 101 exist, it is also possible to use inherent content key data Kc from individual content providers 101 or it is also possible to use the content key data Kc common to all content providers 101.

Figures 5A, 5B, 5C:
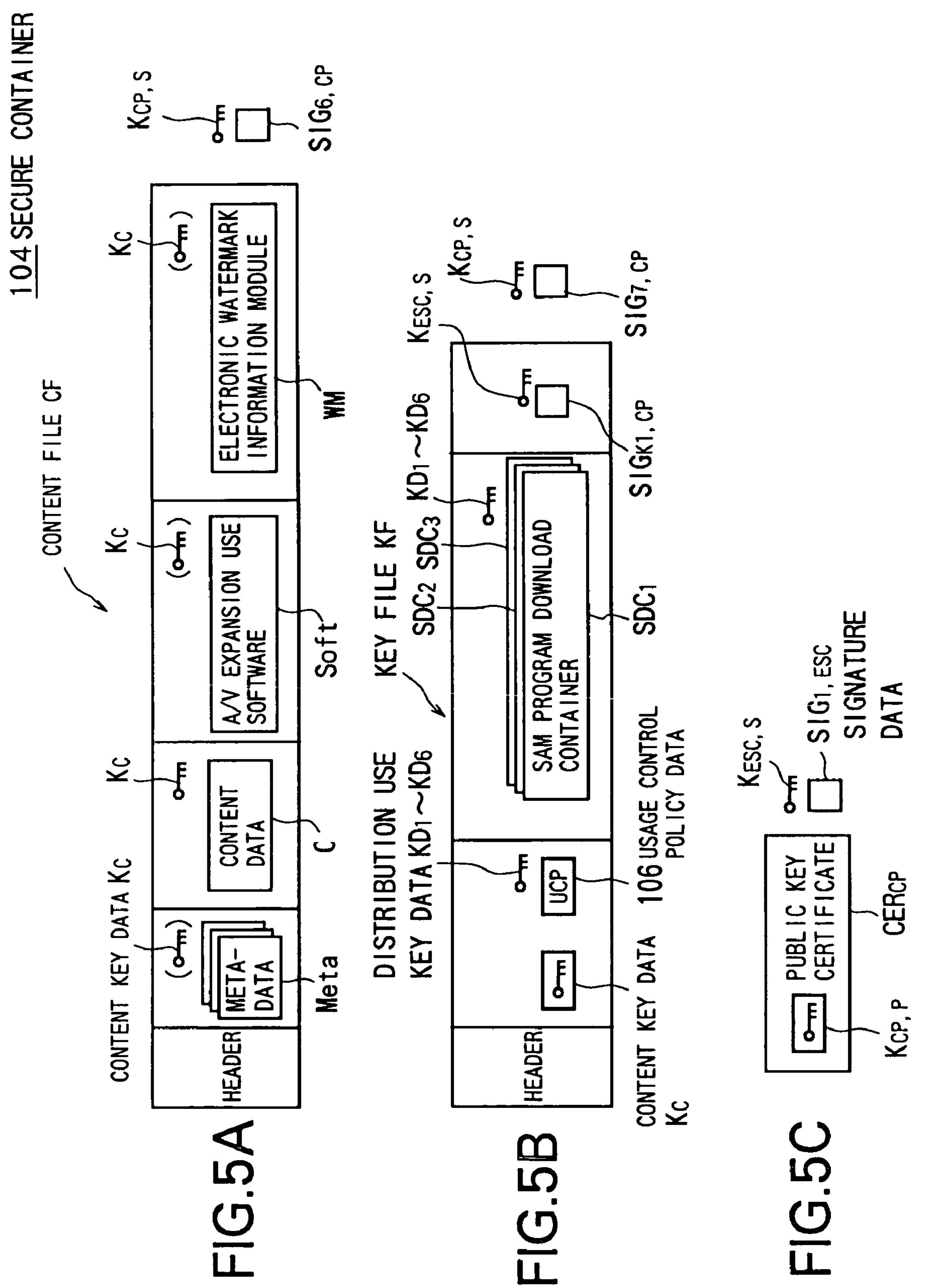
FIGS. 5A to 5C are views for explaining a format of the secure container transmitted from the content provider shown in FIG. 1 to the SAM.

In the key file database 118*b*, as shown in FIG. 4, the key file KF shown in FIG. 5B received from the EMD service center 102 via the EMD service center management unit 125 is stored. The key file KF exists for every content data C. As will be mentioned later, a link is designated with the corresponding content file CF by directory structure data DSD in the header of the content file CF.

Figure 7:
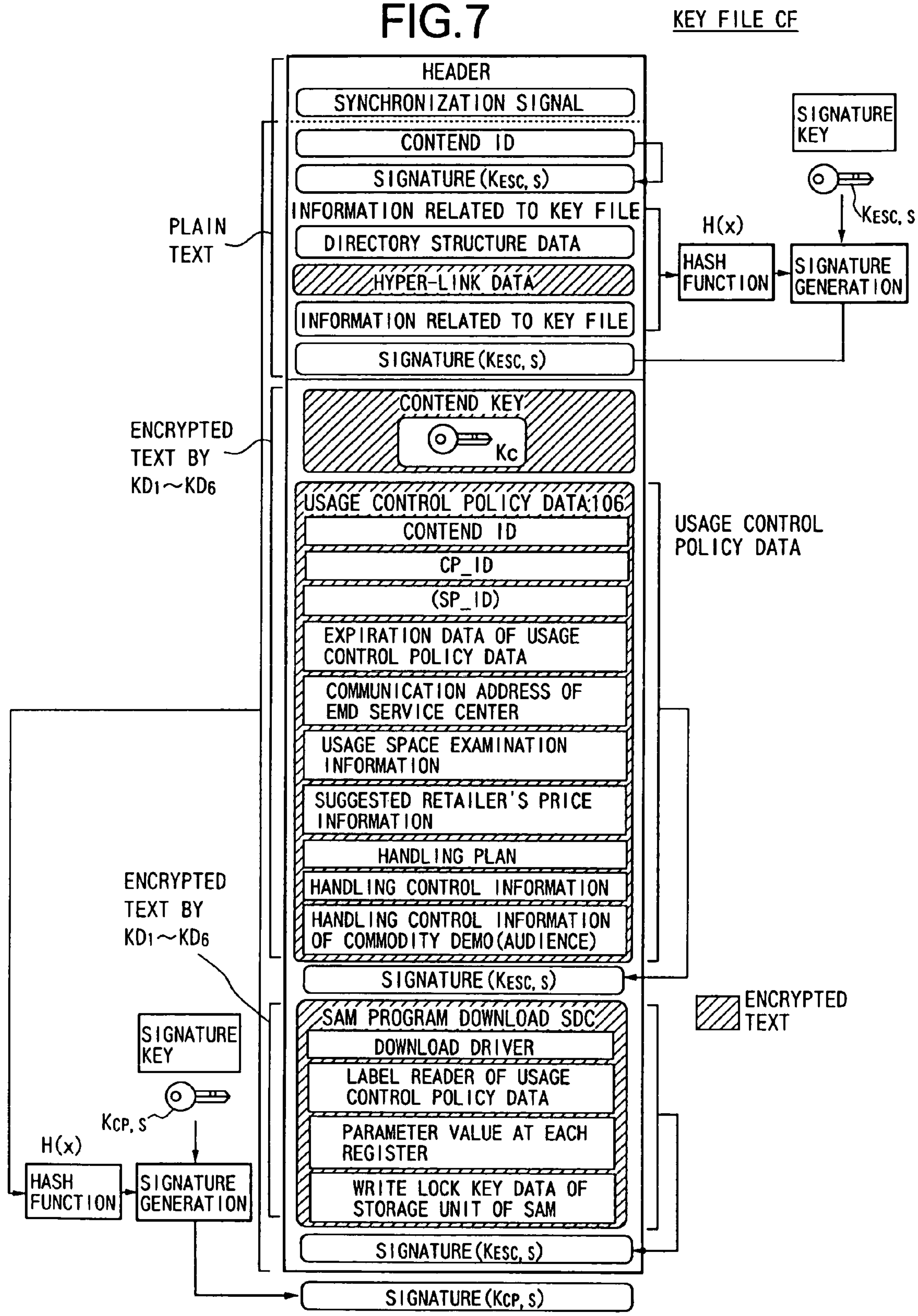
FIG. 7 is a view for explaining data contained in a key file shown in FIG. 5 in detail.

In the key file KF, as shown in FIG. 5B and FIG. 7, the header, content key data Kc, usage control policy data 106 (usage permission condition) 106, SAM program download containers $SDC_1$ to $SDC_3$, and signature data $SIG_{K1,ESC}$ are stored.

Here, as the signature data using the secret key data $K_{ESC,S}$ of the content provider 101, use can be also made of the signature data $K_{1,ESC}$ for all data stored in the key file KF as shown in FIG. 5B. Alternatively, signature data for the data from the header to the information concerning the key file, signature data for the content key data Kc and the usage control policy data 106, and signature data for the SAM program download container SDC can be separately provided too as shown in FIG. 7.

The content key data Kc and usage control policy data 106 and the SAM program download containers $SDC_1$ to $SDC_3$ are encrypted by using the distribution use key data $KD_1$ to $KD_6$ of the corresponding periods.

In the header data, as shown in FIG. 7, synchronization signal, the content ID, the signature data by the secret key data $K_{ESC,S}$ of the content provider 101 for the content ID, the directory structure data, hyper link data, the information concerning the key file KF, the signature data by the secret key data $K_{ESC,S}$ of the content provider 101 for the directory structure data, etc. are contained.

Figure 8:
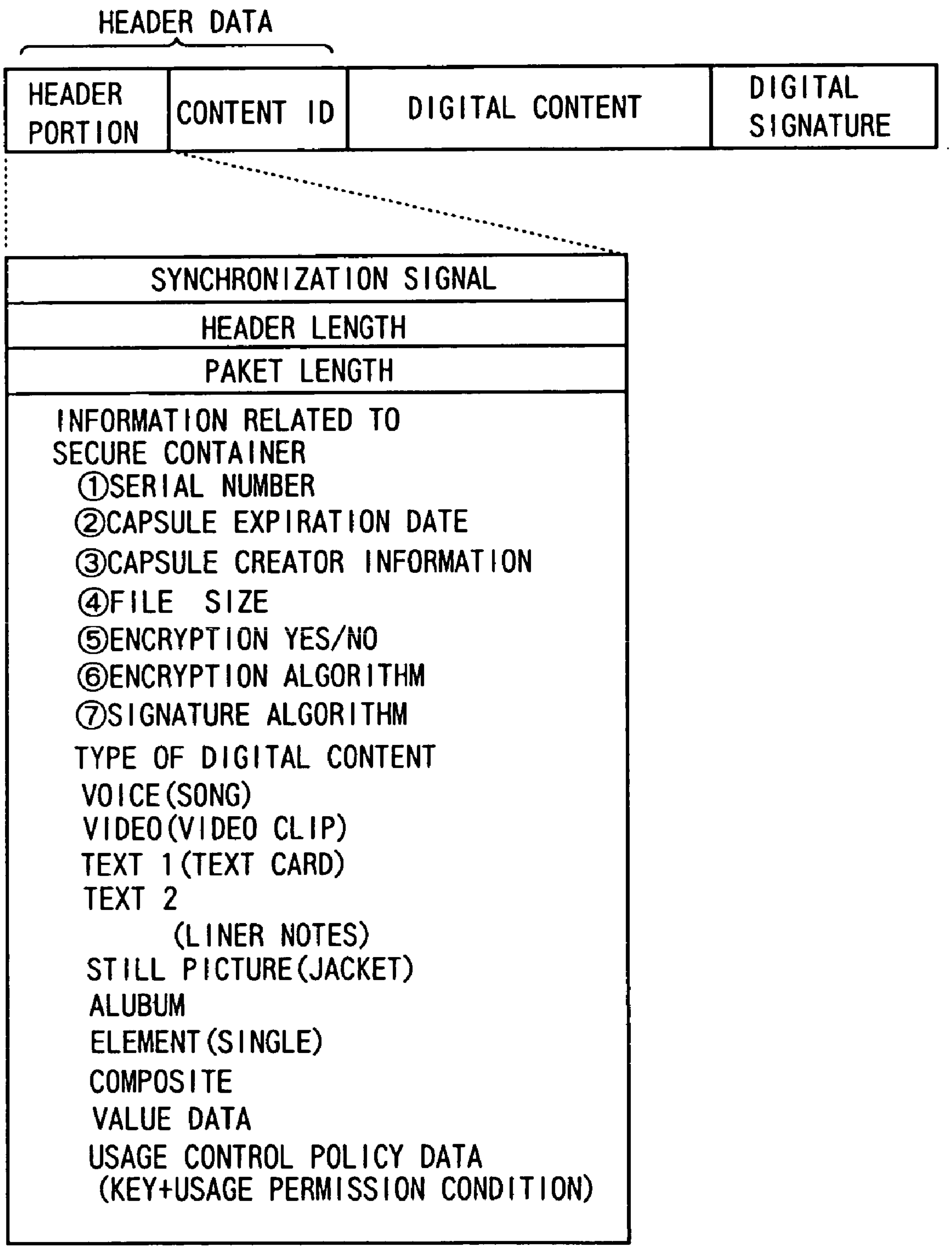
FIG. 8 is a view for explaining a header data stored in the content file.

Note that, as the information to be contained in the header data, various information can be considered and freely varied according to the situation. For example, it is also possible if the information as shown in FIG. 8 is contained in the header data.

Figure 9:
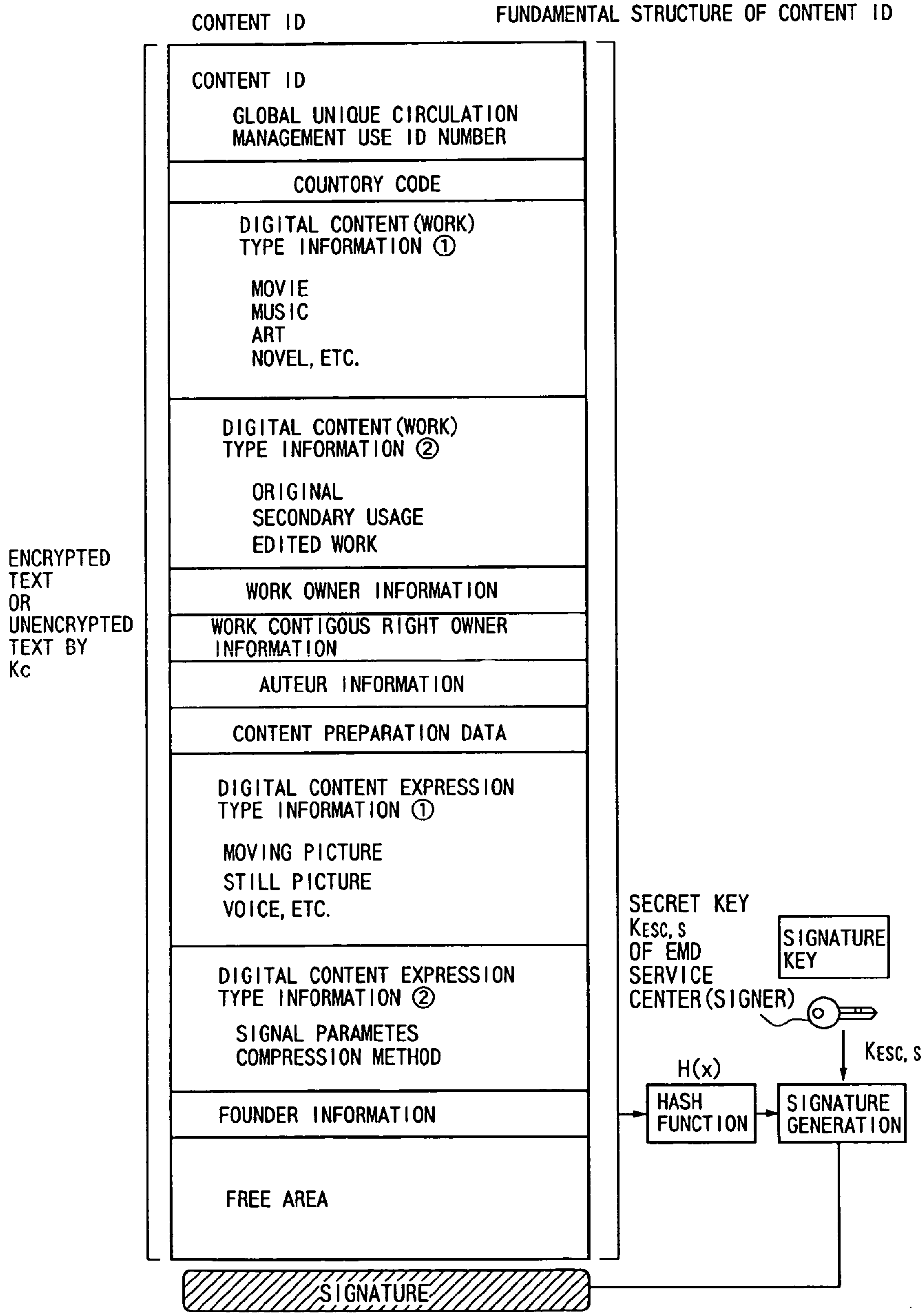
FIG. 9 is a view for explaining a content ID.

Also, in the content ID, for example, the information as shown in FIG. 9 is contained. The content ID is produced in the EMD service center 102 or the content provider 101. Where it is produced in the EMD service center 102, the signature data by the secret key data $K_{ESC,S}$ of the EMD service center 102 is added as shown in FIG. 9, while where it is produced at the content provider 101, the secret key data $K_{CP,S}$ of the content provider 101 is added.

The content ID is produced by for example the content ID generation unit 850 as shown in FIG. 4 and stored in the storage unit 119. Note that, it is also possible if the content ID is produced by the EMD service center 102.

The directory structure data indicates correspondence among the content files CF in the secure container 104 and correspondence between the content files CF and the key files KF.

Figure 10:
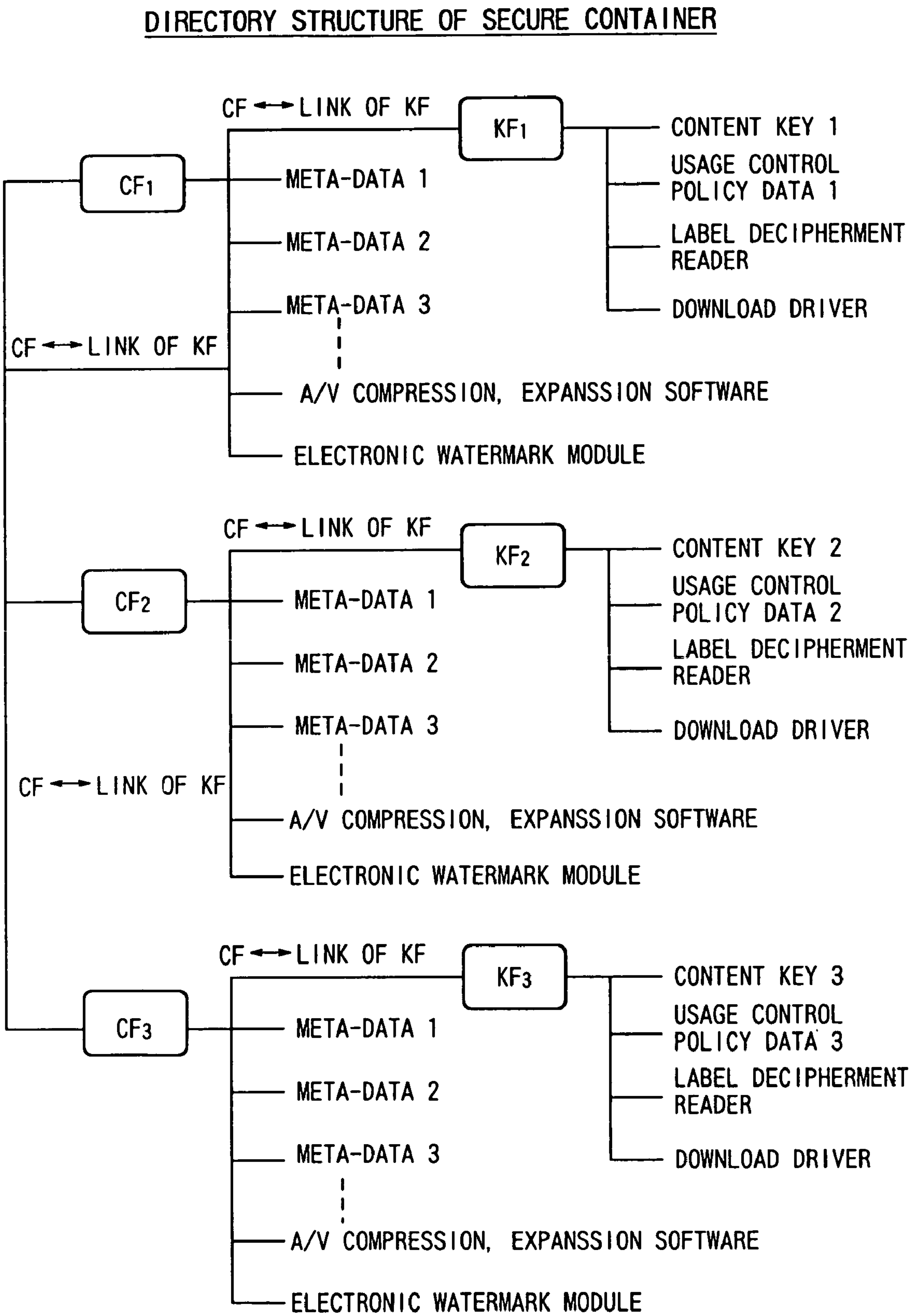
FIG. 10 is a view for explaining a directory structure of the secure container.

For example, where the content files $CF_1$ to $CF_3$ and the key files $KF_1$ to $KF_3$ corresponding to them are stored in the secure container 104, as shown in FIG. 10, the links among the content files $CF_1$ to $CF_3$ and the links between the content files $CF_1$ to $CF_3$ and the key files $KF_1$ to $KF_3$ are established by the directory structure data.

The hyper link data indicates a hierarchy structure among the key files KF and the correspondence between the content files CF and the key files KF covering all files inside and outside the secure container 104.

Figure 11:
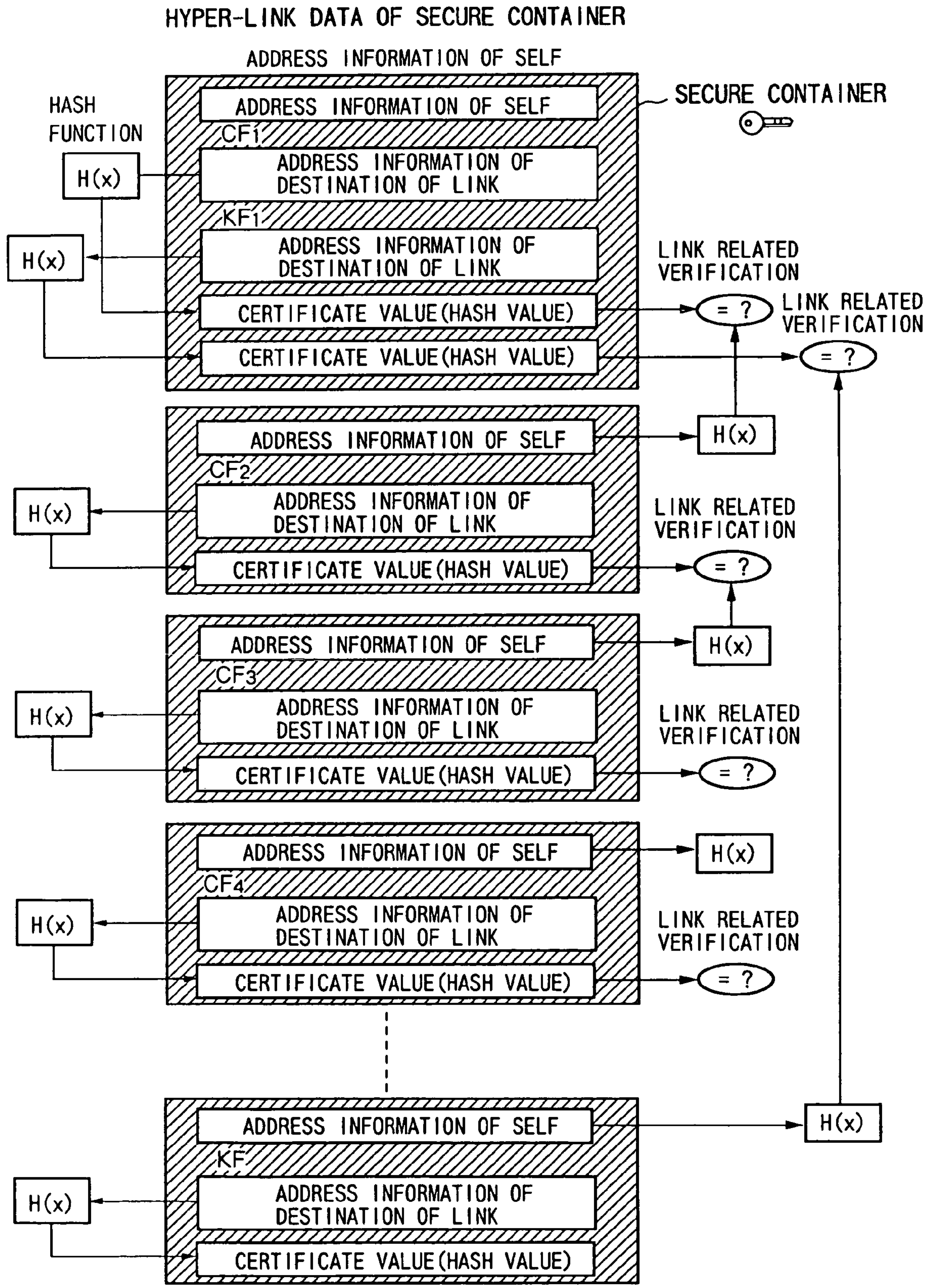
FIG. 11 is a view for explaining a hyper link structure of the secure container.

Concretely, as shown in FIG. 11, the address information of the linked site for every content file CF and key file KF and the certificate value (hash value) thereof are stored in the secure container 104. The links are verified by comparing the hash value of one's own address information obtained by using the hash function H(x) and the certificate value of the other party.

Also, in the usage control policy data 106, as shown in FIG. 7, the content ID, identifier CP_ID of the content provider 101, an expiration date of the usage control policy data 106, the communication address of the EMD service center 102, usage space examination information, wholesale price information, a handling plan, handling control information, handling control information of a commodity demo, the signature data for them, etc. are contained.

Note that, as in the second embodiment mentioned later, where a secure container 304 is transmitted via the service provider 310 to a user home network 303, in the usage control policy data 106, an identifier SP_ID of the service provider 310 for providing the secure container 104 by the content provider 301 is contained.

Also, in the SAM program download containers $SDC_1$ to $SDC_3$, as shown in FIG. 7, a download driver indicating the routine of the download used when downloading a program in the SAMs $105_1$ to $105_4$, a label reader such as an UCP-L (Label) R (Reader) indicating a syntax (grammar) of the usage control policy data (UCP) U106, lock key data for locking/unlocking rewriting and erasing of the storage units (flash-ROM) built in the SAMs $105_1$ to $105_4$ in block units, and the signature data for them are contained.

Note that, the storage unit 119 is provided with various databases including for example a database for storing the certificate data.

The signature processing unit 117 obtains the hash value of the data covered by the signature and produces the signature data SIG thereof by using the secret key data $K_{CP,S}$ of the content provider 101.

Note that, the hash value is produced by using a hash function. A hash function is a function receiving as input the data covered, compressing the related input data to data having a predetermined bit length, and outputting the same as the hash value. The hash function has as its characteristic feature that it is difficult to predict the input of the hash function from the hash value (output). When one bit input to the hash function varies, many bits of the hash value vary, so it is difficult to find the input data having an identical hash value.

The secure container preparation unit 118 produces the content file CF storing the header data, meta data Meta, the content data C, A/V expansion use software Soft, and the watermark module WM input from the encryption unit 114 and encrypted by the content key data Kc therein as shown in FIG. 5A.

Figure 6:
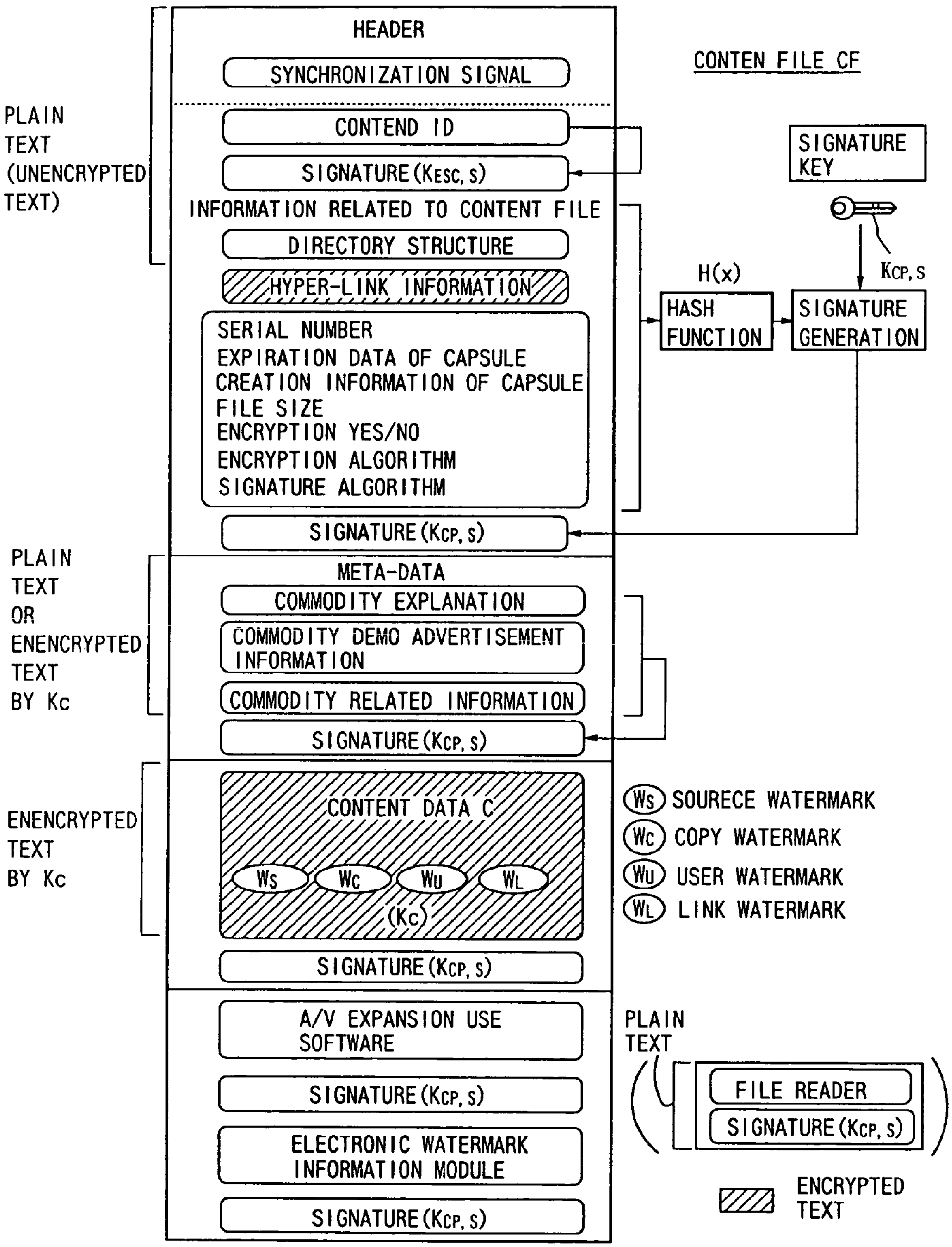
FIG. 6 is a view for explaining data contained in a content file shown in FIG. 5 in detail.

It is also possible to contain the file reader and the signature data of the file reader in the secret key data $K_{CP,S}$ as shown in FIG. 6. By doing this, in the SAMs $105_1$ to $105_4$, a plurality of secure containers 104 storing the content files CF of different formats received from a plurality of secure containers 104 of different streams can be efficiently processed.

Here; the file reader is used when reading a content file CF and the key file KF corresponding to that and indicates the reading routine etc. of these files.

Note, in the present embodiment, a case where the related file reader is transmitted in advance from the EMD service center 102 to the SAMs $105_1$ to $105_4$ is exemplified. Namely, in the present embodiment, the content file CF of the secure container 104 does not store the file reader.

In the header data, as shown in FIG. 6, the synchronization signal, content ID, signature data by the secret key data $K_{CP,S}$ of the content provider 101 for the content ID, directory information, hyper link information, serial number, expiration date and producer information of the content file CF, file size, existence of encryption, encryption algorithm, information concerning the signature algorithm, signature data by the secret key data $K_{CP,S}$ of the content provider 101 concerning the directory information, etc. are contained.

In the meta data Meta, as shown in FIG. 6, explanatory text of the commodity (content data C), commodity demo and PR information, information related to the commodity, and the signature data from the content provider 101 for them are contained.

In the present invention, as shown in FIG. 5 and FIG. 6, the case where the meta data Meta is stored in the content file CF and transmitted is exemplified, but it is also possible not to store the meta data Meta in the content file CF, but transmit the same from the content provider 101 to the SAM $\mathbf{105}_1$ etc. through a route different from the route for transmitting the content file CF.

The A/V expansion use software Soft is the software used when expanding the content file CF in the network apparatus $\mathbf{160}_1$ and the AV apparatuses $\mathbf{160}_2$ to $\mathbf{160}_4$ of the user home network 103 and is the expansion use software of for example the ATRAC3 method.

In this way, by storing the A/V expansion use software Soft in the secure container 104, the content data C can be expanded by using the A/V expansion use software Soft stored in the secure container 104 in the SAMs $\mathbf{105}_1$ to $\mathbf{105}_4$. Even if the compression and expansion method of the content data C is freely set by the content provider 101 for every content data C or every content provider 101, a large load will not be imposed on the user.

The watermark module WM contains for example the information required for detecting the electronic watermark information buried in the content data C and software as mentioned before.

Also, the secure container preparation unit 118 produces the secure container 104 storing the content file CF shown FIG. 5A mentioned above, signature data $SIG_{6,CP}$ of the related content file CF, the key file KF shown in FIG. 5B corresponding to the related content file CF read out from the key file database 118*b*, signature data $SIG_{Lc}$, of the related key file KF, certificate data $CER_{CP}$ of the content provider 101 read out from the storage unit 119, and signature data $SIG_{1,ESC}$ of the related certificate data $CER_{CP}$ therein.

Here, the signature data $SIG_{6,CP}$ is used for verifying the legitimacy of the producer and transmitter of the content file CF at the received site of the secure container 104.

Here, the signature data $SIG_{7,CP}$ is used for verifying the legitimacy of the transmitter of the key file KF at the received site of the secure container 104. Note that, at the received site of the secure container 104, the legitimacy of the producer of the key file KF is verified based on the signature data $SIG_{K1,ESC}$ in the key file KF. Also, the signature data $SIG_{K1,ESC}$ is used also for verifying whether or not the key file KF is registered in the EMD service center 102.

In the present embodiment, the encrypted content data C is stored in the secure container 104 in a form not depending upon the compression method of the content data C, existence of compression, encryption method (including both the cases of the common key encryption method and public key encryption method), parameters of the signals giving the content data C (sampling frequency etc.), and the preparation method (algorithm) of the signature data. Namely, these items can be freely determined by the content provider 101.

Also, the secure container preparation unit 118 outputs the secure container 104 stored in the secure container database 118*a* to the SAM management unit 124 in response to a request from the user.

In this way, in the present embodiment, an in-band method of storing the certificate $CER_{CP}$ of the public key data $K_{CP,P}$ of the content provider 101 in the secure container 104 and transmitting the same to the user home network 103 is employed. Accordingly, the user home network 103 does not have to communicate with the EMD service center 102 for obtaining the certificate $CER_{CP}$.

Note that, in the present invention, it is also possible to employ an out-of-band method of obtaining the certificate $CER_{CP}$ from the EMD service center 102 by the user home network 103 without storing the certificate $CER_{CP}$ in the secure container 104.

The mutual certification unit 120 performs mutual certification between the EMD service center 102 and the user home network 103 to produce the session key data (common key) $K_{SES}$ when the content provider 101 transmits or receives data on-line with the EMD service center 102 and the user home network 103. The session key data $K_{SES}$ is newly produced at each mutual certification.

The encryption and/or decryption unit 121 encrypts the data to be transmitted on-line to the EMD service center 102 and the user home network 103 by the content provider 101 by using the session key data $K_{SES}$.

Also, the encryption and/or decryption unit 121 decrypts the data received on-line from the EMD service center 102 and the user home network 103 by the content provider 101 by using the session key data $K_{SES}$.

The usage control policy data preparation unit 122 produces the usage control policy data 106 and outputs this to the EMD service center management unit 125.

The usage control policy data 106 is a descriptor defining operating rules of the content data C and for example describes the suggested retailer's price SRP intended by an operator of the content provider 101, copy rule of the content data C, etc.

The SAM management unit 124 supplies the secure container 104 off-line or on-line to the user home network 103.

Also, when distributing the secure container 104 to the SAMs $\mathbf{105}_1$ to $\mathbf{105}_4$ on-line, the SAM management unit 124 uses, as the communication protocol for transmitting the secure container 104, an MHEG (Multimedia and Hypermedia Information Coding Experts Group) protocol if a digital broadcast or uses an XML/SMIL/HTML (Hyper TextMarkup Language) if the Internet and buries the secure containers 104 in these communication protocols in a form not depending upon the coding method by tunneling.

Accordingly, it is not necessary to match formats between the communication protocol and the secure container 104, so the format of the secure container 104 can be flexibly set.

Note that, the communication protocol used when transmitting the secure container 104 from the content provider 101 to the user home network 103 is not limited to those mentioned above and may be any protocol.

Figure 12:
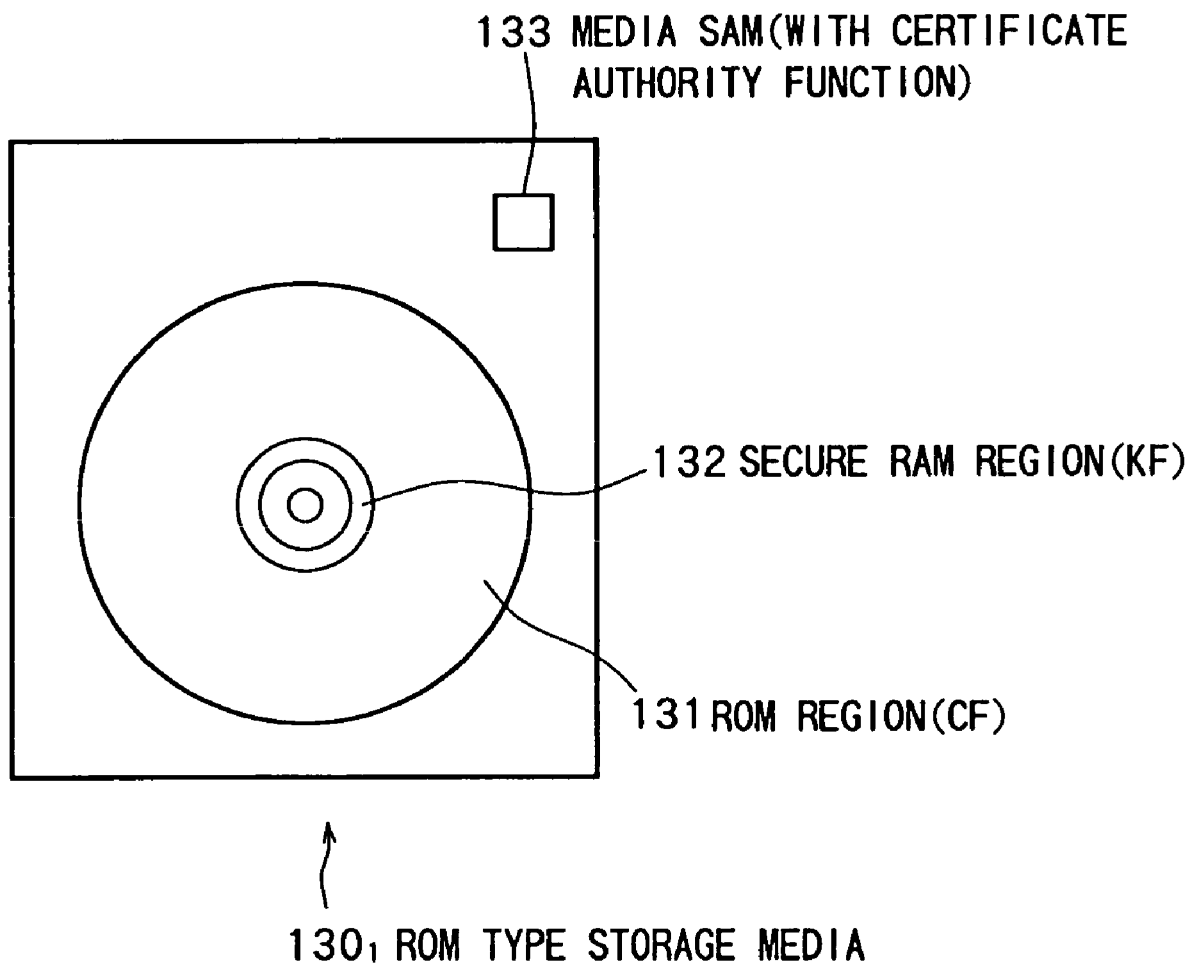
FIG. 12 is a view for explaining a first example of ROM type storage medium used in the present embodiment.

FIG. 12 is a view for explaining a storage medium $\mathbf{130}_1$ of a ROM type used in the present embodiment.

As shown in FIG. 12, the ROM type storage medium $\mathbf{130}_1$ has a ROM region 131, a secure RAM region 132, and a media SAM 133.

In the ROM region 131, the content file CF shown in FIG. 5A is stored.

Also, the secure RAM region 132 is a region where predetermined permission (certification) is necessary for accessing the stored data. Signature data produced by using a MAC (Message Authentication Code) function with the key file KF and the certificate data $CER_{CP}$ and a storage use key data $K_{STR}$ having an inherent value in accordance with the type of the apparatus shown in FIGS. 5B and 5C as factors and the data obtained by encrypting the related key file KF and the certificate data $CER_{CP}$ by using media key data $K_{MED}$ having an inherent value in the storage medium are stored.

Also, in the secure RAM region 132, for example, certificate revocation data (revocation list) for specifying the content provider 101 and the SAMs $\mathbf{105}_1$ to $\mathbf{105}_5$ which became invalid due to illegitimate actions or the like is stored.

Also, in the secure RAM region 132, as will be mentioned later, usage control status (UCS) data 166 etc. produced when the purchase and/or usage form of the content data C is determined in the SAMs $\mathbf{105}_1$ to $\mathbf{105}_4$ of the user home network 103 is determined are stored. By this, by the storage of the user control status data 166 in the secure RAM region 132, a ROM type storage medium 130 with a purchase and/or usage form determined therein is obtained.

In the media SAM 133, for example the media ID serving as the identifier of the ROM type storage medium $\mathbf{130}_1$ and the media key data $K_{MED}$ are stored.

The media SAM 133 has for example a mutual certificate authority function.

Figure 13:
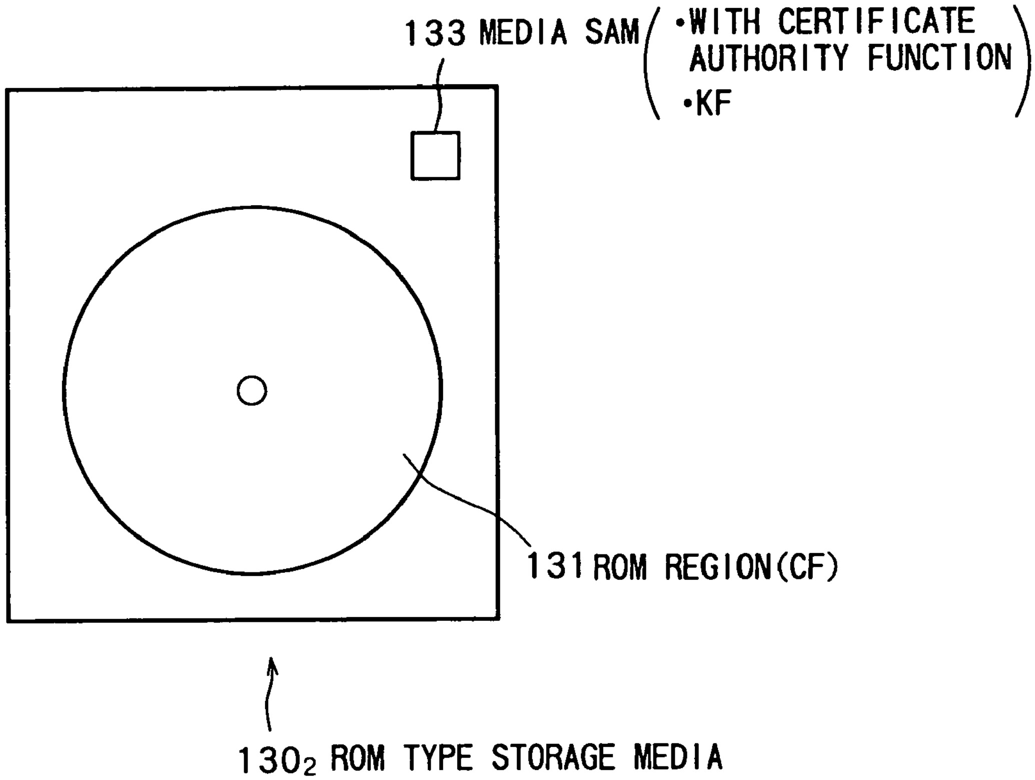
FIG. 13 is a view for explaining a second example of the ROM type storage medium used in the present embodiment.
Figure 14:
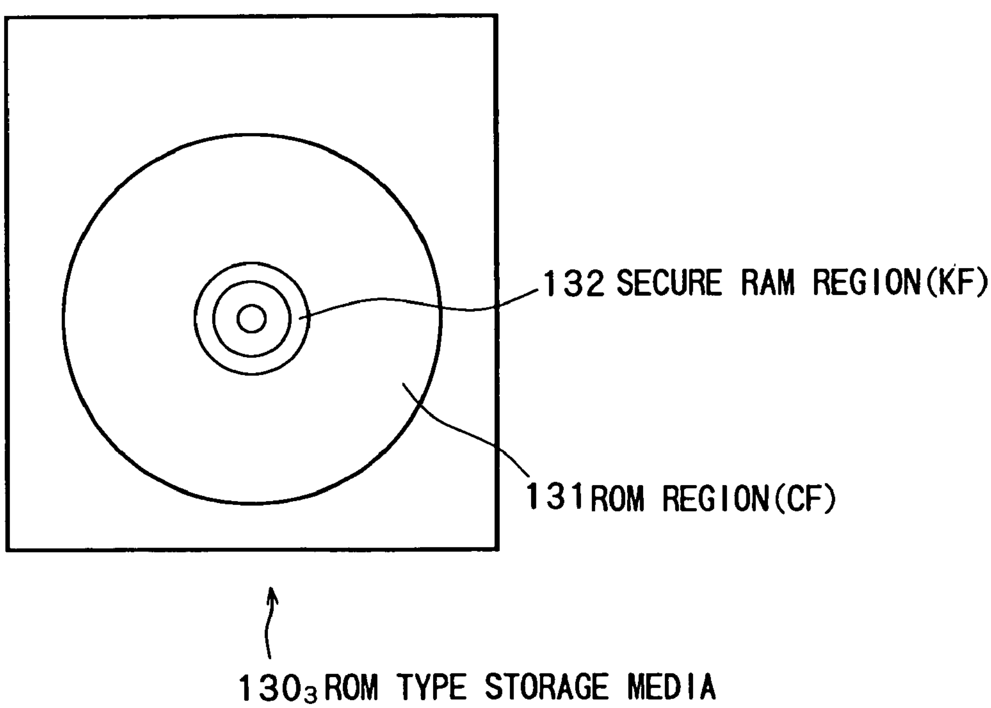
FIG. 14 is a view for explaining a third example of the ROM type storage medium used in the present embodiment.

As the storage medium of the ROM type used in the present embodiment, for example, other than one shown in FIG. 12, also a ROM type storage medium $\mathbf{130}_2$ shown in FIG. 13 and a ROM type storage medium $\mathbf{130}_3$ shown in FIG. 14 can be considered.

The ROM type storage medium $\mathbf{130}_2$ shown in FIG. 13 has the ROM region 131 and the media SAM 133 having the certificate authority function, but is not provided with the secure RAM region 132 as in the ROM type storage medium $\mathbf{130}_1$ shown in FIG. 12. Where use is made of the ROM type storage medium $\mathbf{130}_2$, the content file CF is stored in the ROM region 131, and the key file KF is stored in the media SAM 133.

Also, the ROM type storage medium $\mathbf{130}_3$ shown in FIG. 14 has the ROM region 131 and the secure RAM region 132 and does not have the media SAM 133 as in the ROM type storage medium $\mathbf{130}_1$ shown in FIG. 12. Where the ROM type storage medium $\mathbf{130}_3$ is used, the content file CF is stored in the ROM region 131, and the key file KF is stored in the secure RAM region 132. Also, where the ROM type storage medium $\mathbf{130}_3$ is used, mutual certification is not carried out with the SAM.

Also, in the present embodiment, other than the ROM type storage medium, also a RAM type storage medium is used.

Figure 15:
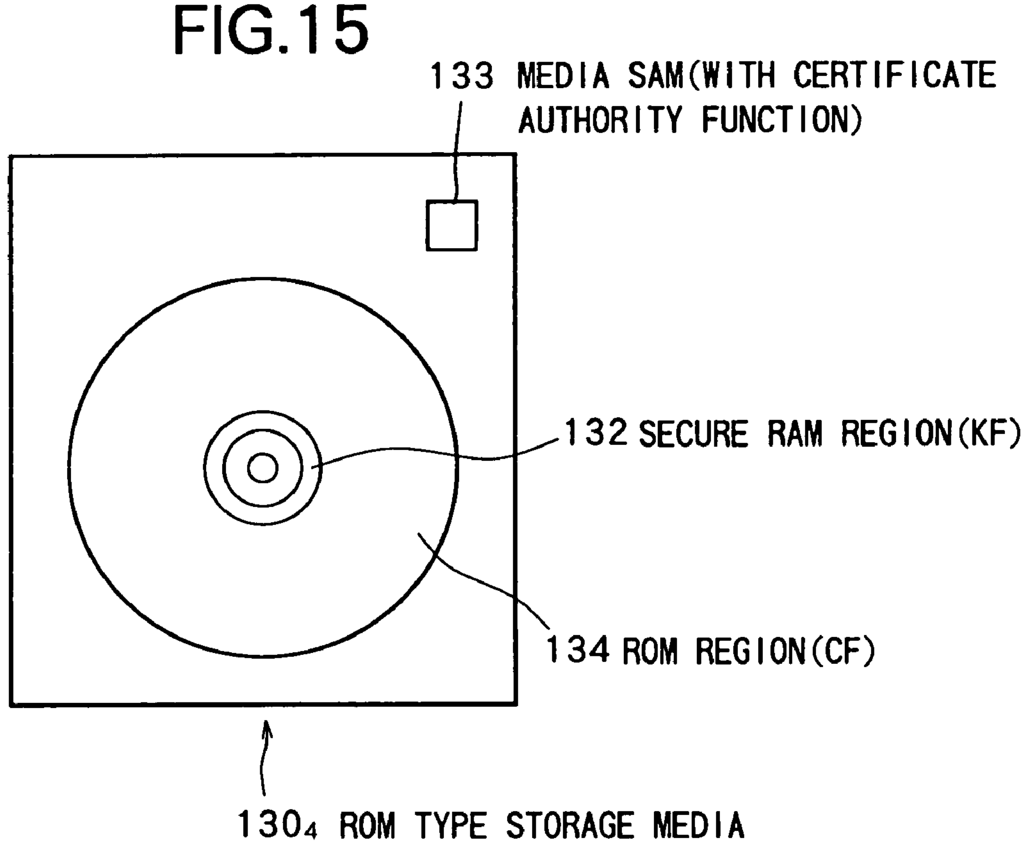
FIG. 15 is a view for explaining a first example of RAM type storage medium used in the present embodiment.

As the RAM type storage medium used in the present embodiment, there is, for example, as shown in FIG. 15, a RAM type storage medium $\mathbf{130}_4$ having the media SAM 133, secure RAM region 132, and nonsecure RAM region 134. In the RAM type storage medium $\mathbf{130}_4$, the media SAM 133 has the certificate authority function and stores the key file KF. Also, in the RAM region 134, the content file CF is stored.

Figure 16:
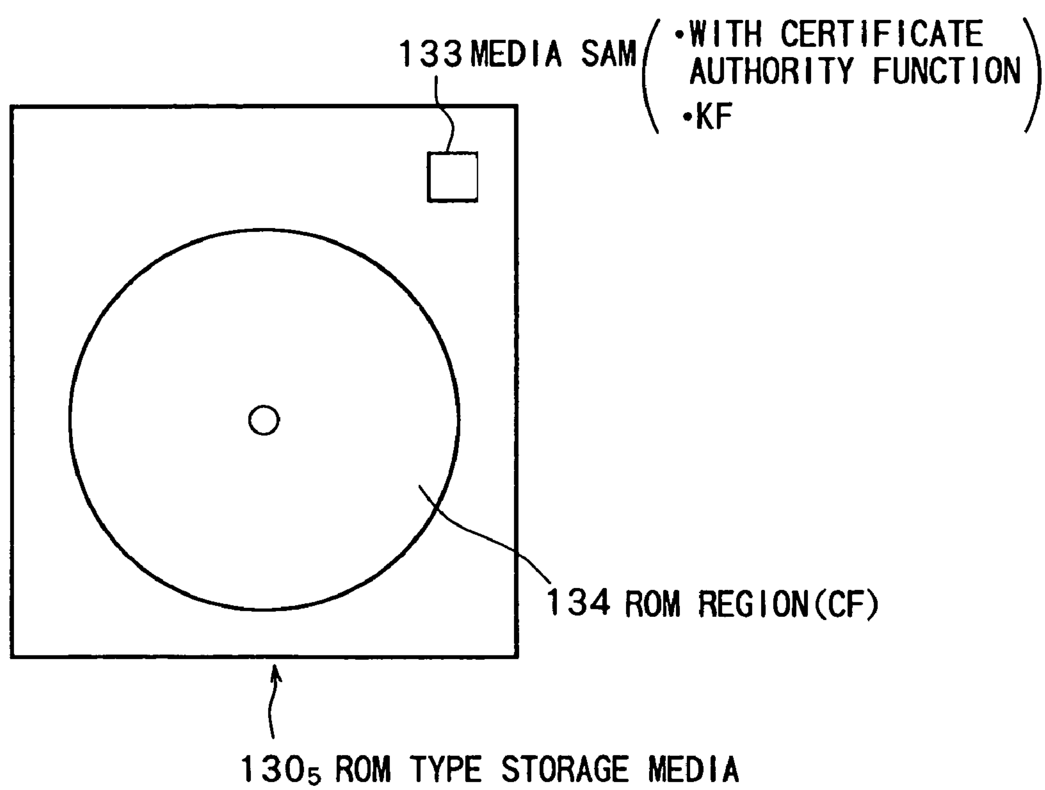
FIG. 16 is a view for explaining a second example of the RAM type storage medium used in the present embodiment.
Figure 17:
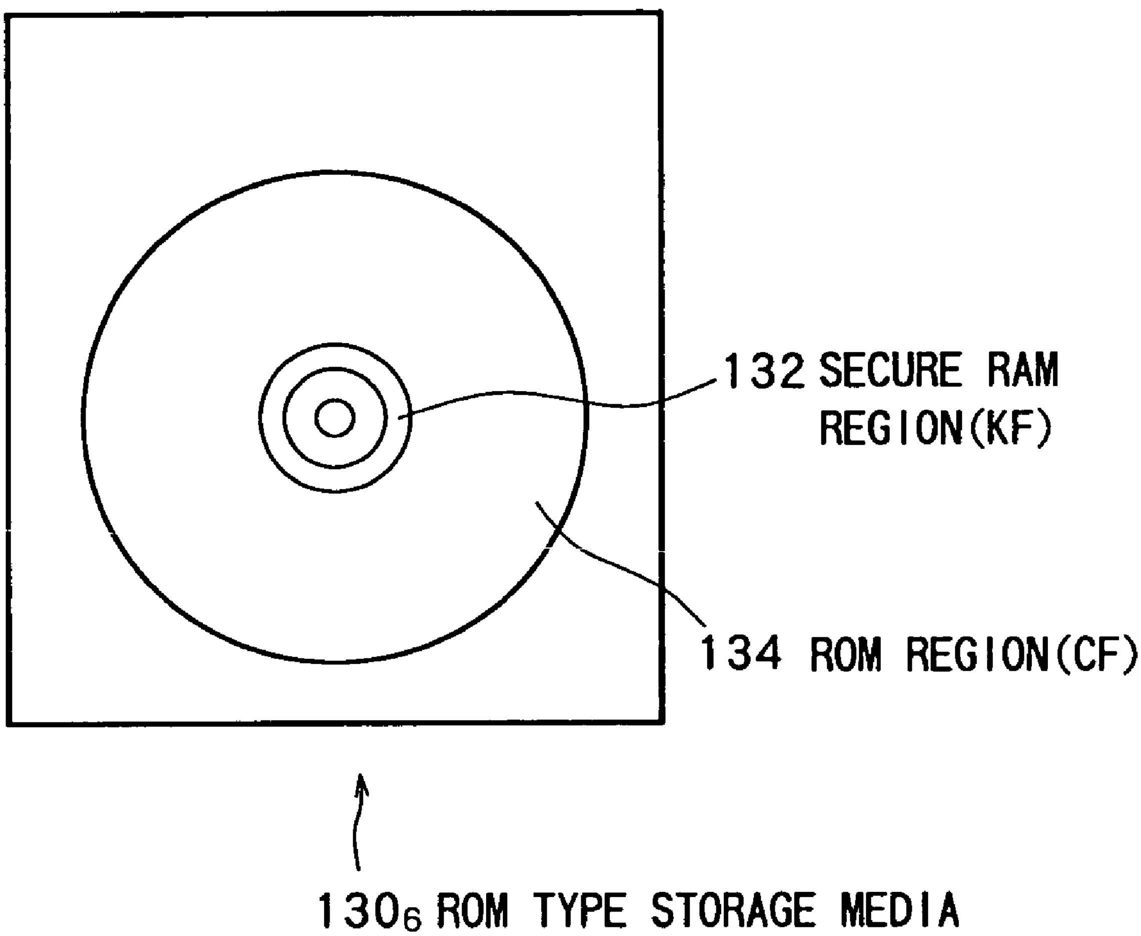
FIG. 17 is a view for explaining a third example of the RAM type storage medium used in the present embodiment.

Also, as the RAM type storage medium used in the present embodiment, other than that, also a RAM type storage medium $\mathbf{130}_5$ shown in FIG. 16 and a RAM type storage medium $\mathbf{130}_6$ shown in FIG. 17 can be considered.

The RAM type storage medium $\mathbf{130}_5$ shown in FIG. 16 has the nonsecure RAM region 134 and the media SAM 133 having the certificate authority function, but is not provided with the secure RAM region 132 as in the RAM type storage medium $\mathbf{130}_4$ shown in FIG. 15. Where the RAM type storage medium $\mathbf{130}_5$ is used, the content file CF is stored in the RAM region 134, and the key file KF is stored in the media SAM 133.

Also, the RAM type storage medium $\mathbf{130}_6$ shown in FIG. 17 has the secure RAM region 132 and the nonsecure RAM region 134, but does not have the media SAM 133 as in the RAM type storage medium $\mathbf{130}_4$ shown in FIG. 15. Where use is made of the RAM type storage medium $\mathbf{130}_6$, the content file CF is stored in the RAM region 134, and the key file KF is stored in the secure RAM region 132. Also, where use is made of the RAM type storage medium $\mathbf{130}_6$, mutual certification is not carried out with the SAM.

Also, where the secure container 104 is distributed on-line to the user home network 103 by using a network or a digital broadcast, the SAM management unit 124 encrypts the secure container 104 by using the session key data $K_{SES}$ in the encryption and/or decryption unit 121, and then distributes the same via the network to the user home network 103.

In the present embodiment, as the SAM management unit and the EMD service center management unit and the content provider management unit and service provider management unit mentioned later, use is made of a communication gateway having a tamper resistant structure whereby for example monitoring and tampering of the processing content of the internal portion cannot be carried out or are difficult.

Here, in both of the case where the content data C is distributed from the content provider 101 to the user home network 103 by using the storage medium $\mathbf{130}_1$ and the case where it is distributed on-line by using the network, use is made of the secure container 104 of a common form with the usage-control policy data 106 stored therein. Accordingly, in the SAMs $\mathbf{105}_1$ to $\mathbf{105}_4$ of the user home network 103, the rights clearing based on the common usage control policy data 106 can be carried out in both of the cases of off-line and on-line.

Also, as mentioned above, in the present embodiment, the in-band method of enclosing the content data C encrypted by the content key data Kc and the content key data Kc for decrypting the related encryption in the secure container 104 is employed. In the in-band method, when it is intended to reproduce the content data C by the apparatus of the user home network 103, it is not necessary to separately distribute the content key data Kc, so there is an advantage that the load of the network communication can be reduced. Also, the content key data Kc has been encrypted by the distribution use key data $KD_1$ to $KD_6$, but the distribution use key data $KD_1$ to $KD_6$ are managed at the EMD service center 102 and distributed to the SAMs $\mathbf{105}_1$ to $\mathbf{105}_5$ of the user home network 103 in advance (when the SAMs $\mathbf{105}_1$ to $\mathbf{105}_4$ access the EMD service center 102 for the first time), therefore, in the user home network 103, the usage of the content data C off-line becomes possible without connecting with the EMD service center 102 on-line.

Note that, the present invention has the flexibility to employ the out-of-band method for separately supplying the content data C and the content key data Kc to the user home network 103 as will be mentioned later.

When receiving the settlement report data 107 from the EMD service center 102, the EMD service center management unit 125 decrypts it at the encryption and/or decryption unit 121 by using the session key data $K_{SES}$ and then stores the same in the storage unit 119.

As the settlement report data 107, for example, the content of the settlement concerning the content provider 101 performed by the EMD service center 102 at the settlement manager 91 shown in FIG. 1 is described.

Also, the EMD service center management unit 125 transmits the content ID as a global unique identifier of the content data C to be provided, a public key data $K_{CP,P}$, and signature data $SIG_{9,CP}$ of them to the EMD service center 102 and receives as input the certificate data $CER_{CP}$ of the public key data $K_{CP,P}$ from the EMD service center 102.

Figure 18:
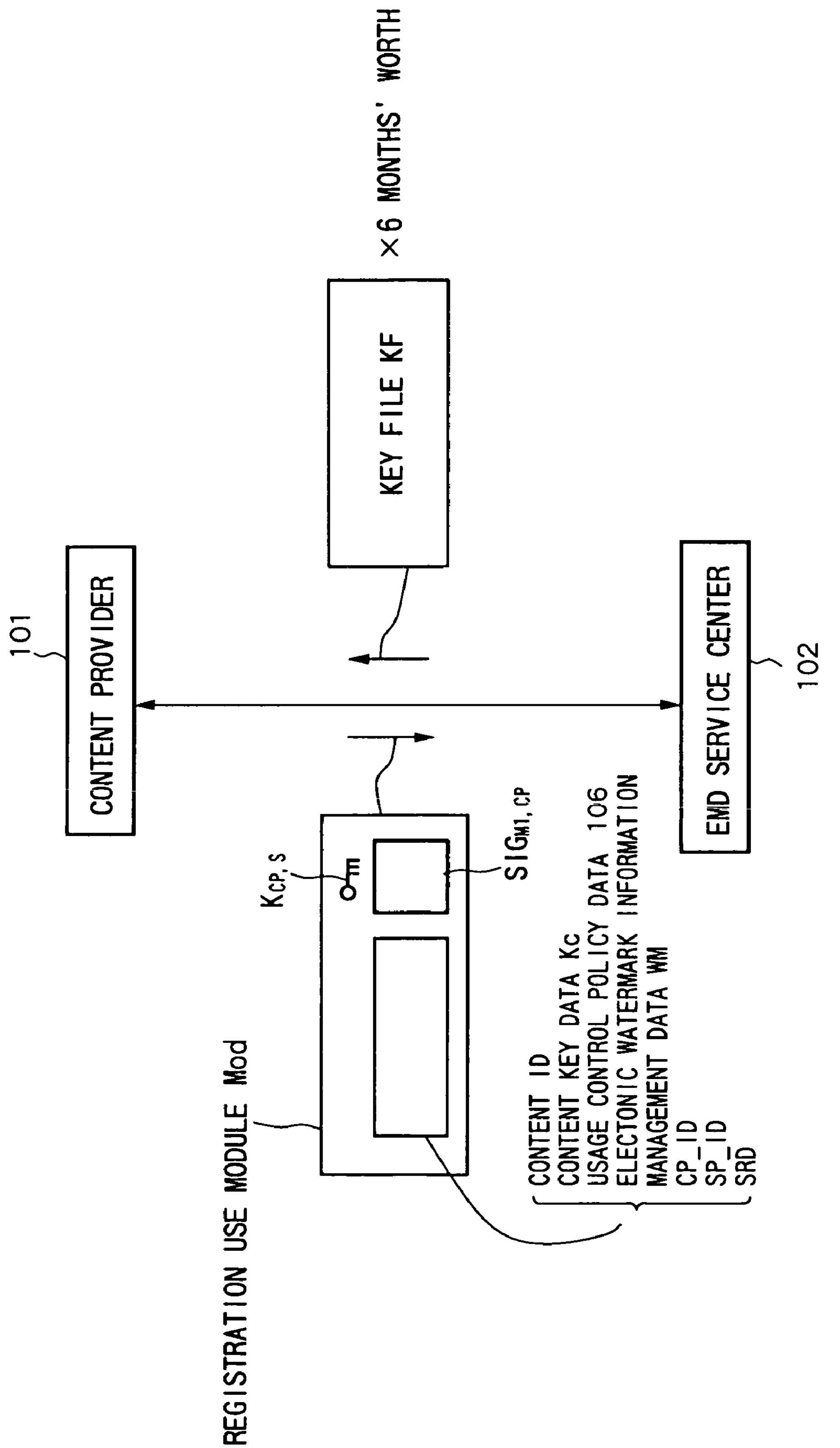
FIG. 18 is a view for explaining a registration request use module transmitted from the content provider to the EMD service center.

Also, the EMD service center management unit 125 produces, as shown in FIG. 18, a registration module $Mod_2$ storing the content ID as the global unique identifier of the content data C to be provided, the content key data Kc, the usage control policy data 106, the watermark module WM, CP_ID as the global unique identifier of the content provider 101, and signature data $SIG_{M1,CP}$ by the secret key data $K_{CP,S}$ of the content provider 101 for them therein when registering the content key data Kc, the usage control policy data 106, and the watermark module WM in the EMD service center 102 and receiving the key file KF for each of the content data C. Then, the EMD service center 125 encrypts the registration module $Mod_2$ in the encryption and/or decryption unit 121 by using the session key data $K_{SES}$ and then transmits the same via the network to the EMD service center 102. As the EMD service center management unit 125, as mentioned above, for example use is made of a communication gateway having a high tamper resistant structure whereby monitoring or tampering of the processing content of the internal portion cannot be carried out or are difficult.

Below, an explanation will be given of the flow of the processing in the content provider 101 by referring to FIG. 3 and FIG. 4.

Note that, as a prerequisite for performing the following processing, the interested party of the content provider 101 performs the registration processing for the EMD service center 102 off-line by using for example its own ID and a bank account for performing the settlement processing and acquires the global unique identifier CP_ID. The identifier CP_ID is stored in the storage unit 119.

First, an explanation will be given of the processing where the content provider 101 requests the certificate data $CER_{CP}$ for proving the legitimacy of the public key data $K_{CP,S}$ corresponding to its own secret key data $K_{CP,S}$ from the EMD service center 102 by referring to FIG. 4.

The content provider 101 generates a random number by using a true random number generator to produce the secret key data $K_{CP,S}$, produces the public key data $K_{CP,P}$ corresponding to the related secret key data $K_{CP,S}$ and stores the same in the storage unit 119.

The EMD service center management unit 125 reads out the identifier CP_ID and the public key data $K_{CP,P}$ of the content provider 101 from the storage unit 119.

Then, the EMD service center management unit 125 transmits the identifier CP_ID and the public key data $K_{CP,P}$ to the EMD service center 102.

Then, the EMD service center management unit 125 receives as input the certificate data $CER_{CP}$ and the signature data $SIG_{1,ESC}$ thereof from the EMD service center 102 in accordance with the related registration and writes them into the storage unit 119.

Next, an explanation will be given of the processing where the content provider 101 registers the content key data Kc, usage control policy data 106, and the watermark module WM in the EMD service center 102 and receives the key file KF corresponding to the content data C by referring to FIG. 4, FIG. 18, and FIG. 19.

The registration of the usage control policy data 106 etc. is carried out for individual content data C.

Figure 19:
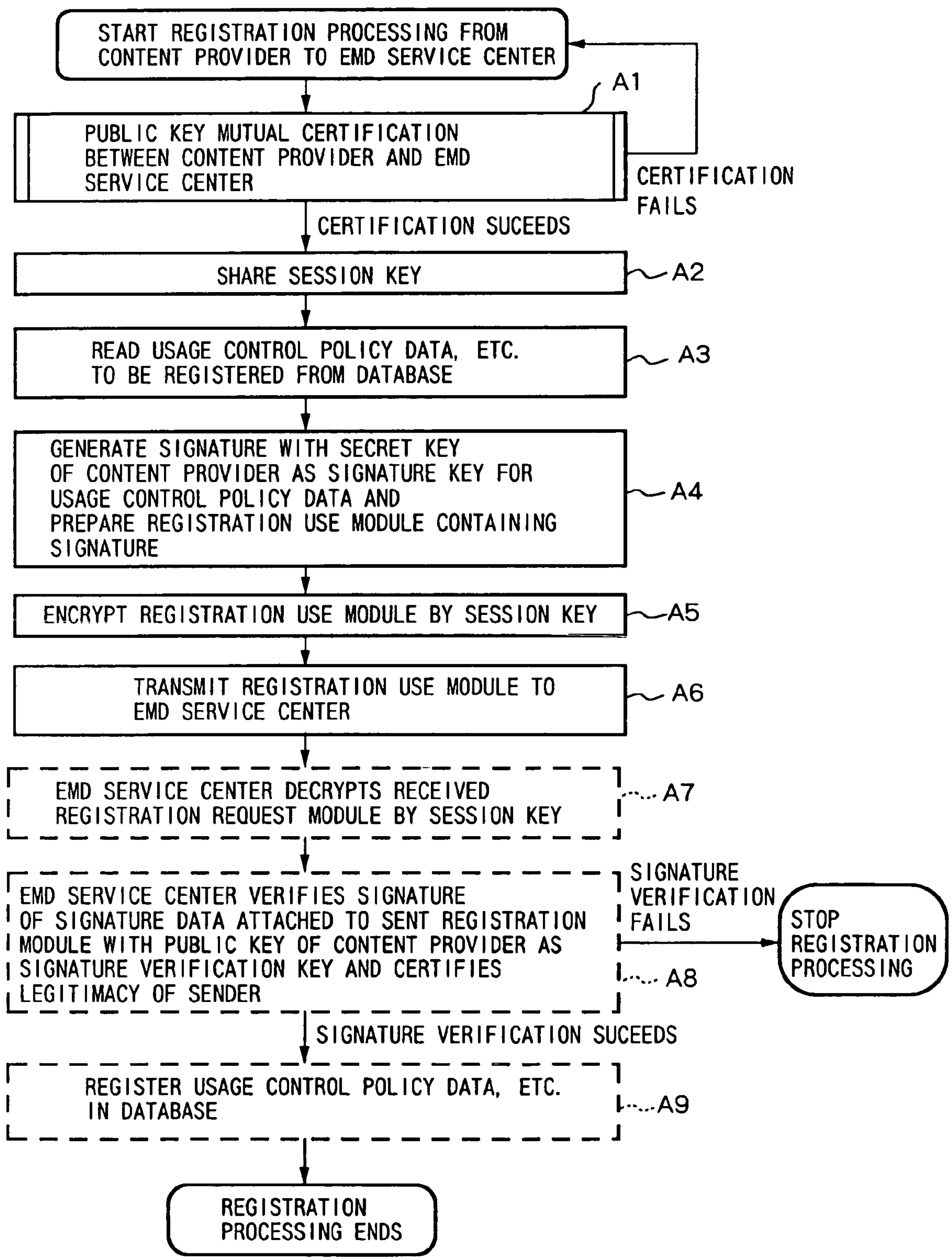
FIG. 19 is a flowchart showing a routine of processing for registration from the content provider to the EMD service center.

FIG. 19 is a flowchart for explaining the registration processing from the content provider 101 to the EMD service center 102.

Step A1: Mutual certification is carried out between the mutual certification unit 120 of the content provider 101 shown in FIG. 4 and the EMD service center 102.

Step A2: The session key data $K_{SES}$ obtained by the mutual certification performed at step A1 is shared by the content provider 101 and the EMD service center 102.

Step A3: The content provider 101 reads out the content ID, content key data Kc, usage control policy data 106, watermark module WM, and CP_ID, etc. to be registered into the EMD service center 102 from the database of the storage unit 119 etc.

Step A4: In the signature processing unit 117, the signature data $SIG_{M1,CP}$ indicating the legitimacy of the sender is produced for a module containing for example the usage control policy data 106 read out at step A3 by using the secret key data of the content provider 101.

Then, the EMD service center management unit 125 produces the registration use module $Mod_2$ storing the content ID, content key data Kc, usage control policy data 106, watermark module WM and CP_ID, and the signature data $SIG_{M1,CP}$ for them therein as shown in FIG. 18.

Step A5: The encryption and/or decryption unit 121 encrypts the registration use module $Mod_2$ produced at step A4 by using the session key data $K_{SES}$ shared at step A2.

Step A6: The EMD service center management unit 125 transmits the registration use module $Mod_2$ encrypted at step A5 to the EMD service center 102.

The processing of step A7 and following processing are the processing in the EMD service center 102.

Step A7: The EMD service center 102 decrypts the received registration use module $Mod_2$ by using the session key data $K_{SES}$ shared at step A2.

Step A8: The EMD service center 102 verifies the signature data $SIG_{M1,CP}$ stored in the decrypted registration use module $Mod_2$ by using the public key data $K_{CP,P}$, confirms the legitimacy of the sender of the registration use module $Mod_2$, and performs the processing of step A9 under the condition that the legitimacy of the sender is proved.

Step A9: The EMD service center 102 stores and registers the content ID, content key data Kc, usage control policy data 106, watermark module WM, and CP_ID stored in the registration use module $Mod_2$ in the predetermined database.

Note that, the EMD service center management unit 125 receives, as shown in FIG. 18, for example six months worth of the key files KF from the EMD service center 102 after the registration processing in accordance with the registration use module $Mod_2$ is carried out for the EMD service center 102, decrypts the related received key files KF by using the session key data $K_{SES}$ obtained by the mutual certification between the mutual certification unit 120 and the EMD service center 102, and then stores the same in the key file database 118*b*.

Next, an explanation will be given of the processing where the content provider 101 transmits the secure container 104 to the SAM $105_1$ of the user home network 103 by referring to FIG. 3 and FIG. 4.

Note that, in the following example, the case where the secure container 104 is transmitted from the content provider 101 to the SAM $105_1$ is exemplified, but the case where the secure container 104 is transmitted to each of the SAMs $105_2$ to $105_4$ is the same except it transmitted to each of the SAMs $105_2$ to $105_4$ via the SAM $105_1$.

First, as shown in FIG. 3, the content data S111 is read out from the content master source database 111 and output to the electronic watermark information addition unit 112.

Next, the electronic watermark information addition unit 112 buries the electronic watermark information in the content data S111 to produce the content data S112 and outputs this to the compression unit 113.

Next, the compression unit 113 compresses the content data S112 by for example the ATRAC3 method to produce the content data S113 and outputs this to the encryption unit 114.

Also, as shown in FIG. 4, the content key data Kc is produced by generating a random number at the random number generation unit 115, and the related produced content key data Kc is stored in the storage unit 119.

Next, the encryption unit 114 encrypts the content data 5113 input from the compression unit 113, meta data Meta read out from the storage unit 119, the expansion use software Soft and the watermark module WM by using the content key data Kc and outputs the same to the secure container preparation unit 118. In this case, it is also possible if the meta data Meta and the watermark module WM are not encrypted.

Then, the secure container preparation unit 118 produces the content file CF shown in FIG. 5A. Also, in the signature processing unit 117, the hash value of the content file CF is obtained and the signature data $SIG_{6,CP}$ is produced by using the secret key data $K_{CP,S}$.

Also, the secure container preparation unit 118 reads out the key file KF corresponding to the content data C from the key file database 118*b* and outputs this to the signature processing unit 117.

Then, the signature processing unit 117 obtains the hash value of the key file KF input from the secure container preparation unit 118, produces the signature data $SIG_{7,CP}$ by using the secret key data $K_{CP,S}$, and outputs this to the secure container preparation unit 118.

Next, the secure container preparation unit 118 produces the secure container 104 storing the content file CF and the signature data $SIG_{6,CP}$ thereof shown in FIG. 5A, the key file KF and the signature data $SIG_{7,CP}$ thereof shown in FIG. 5B, and the certificate data $CER_{CP}$ and the signature data $SIG_{1,ESC}$ thereof shown in FIG. 5C read out from the storage unit 119 therein and stores this in the secure container database 118*b*. Then, the secure container preparation unit 118 reads out the secure container 104 to be provided to the user home network 103 in response to for example a request from the user from the secure container database 118*a*, encrypts this at the encryption and/or decryption unit 121 by using the session key data $K_{SES}$ obtained by the mutual certification between the mutual certification unit 120 and the SAM $\mathbf{105}_1$, and then transmits the same via the SAM management unit 124 to the SAM $\mathbf{105}_1$ of the user home network 103.

Below, a summary of the flow of the overall processing of the content provider 101 will be explained relative to the secure container preparation processing.

Figure 20:
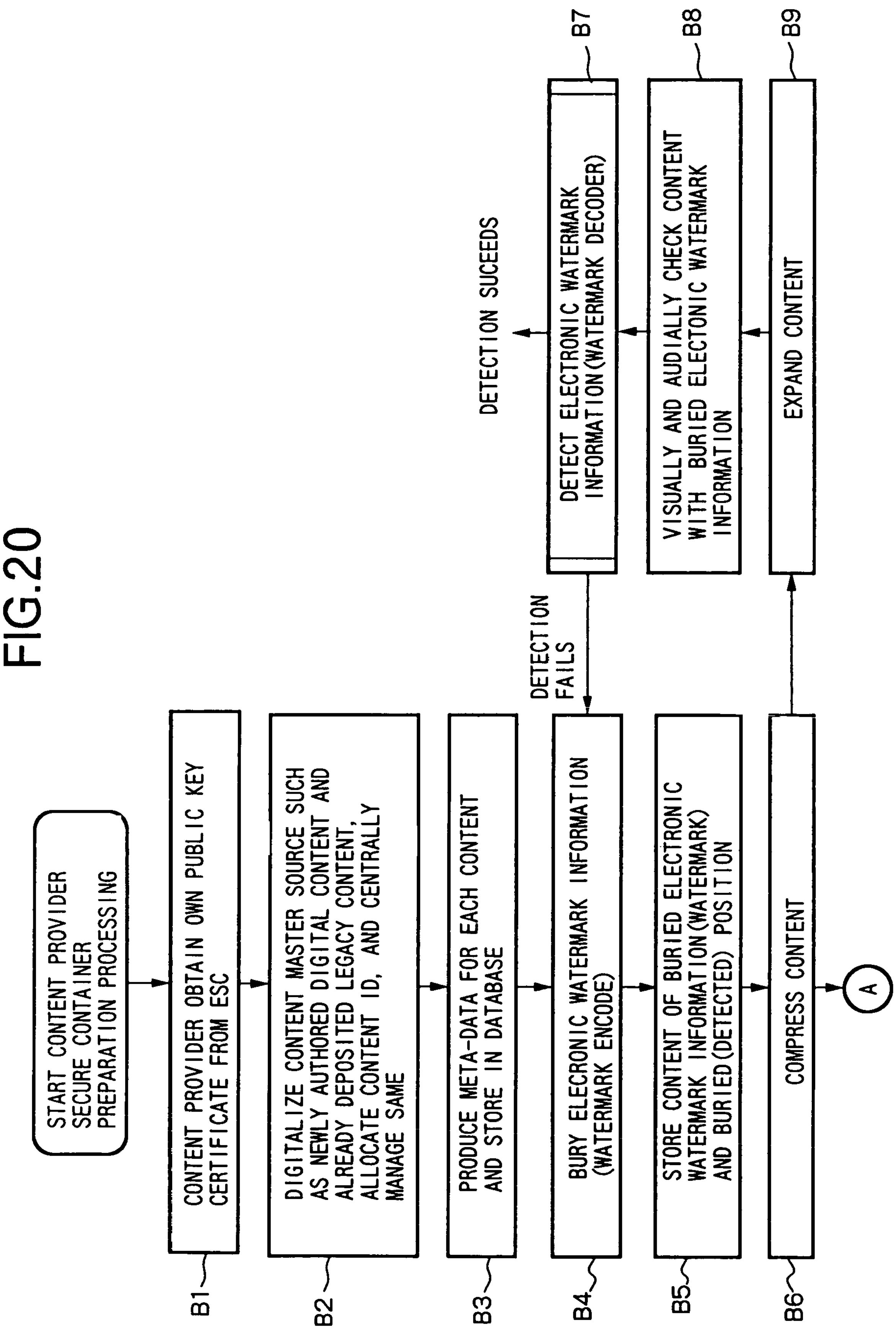
FIG. 20 is a flowchart showing a routine of processing for preparation of an explanation in the content provider.
Figure 21:
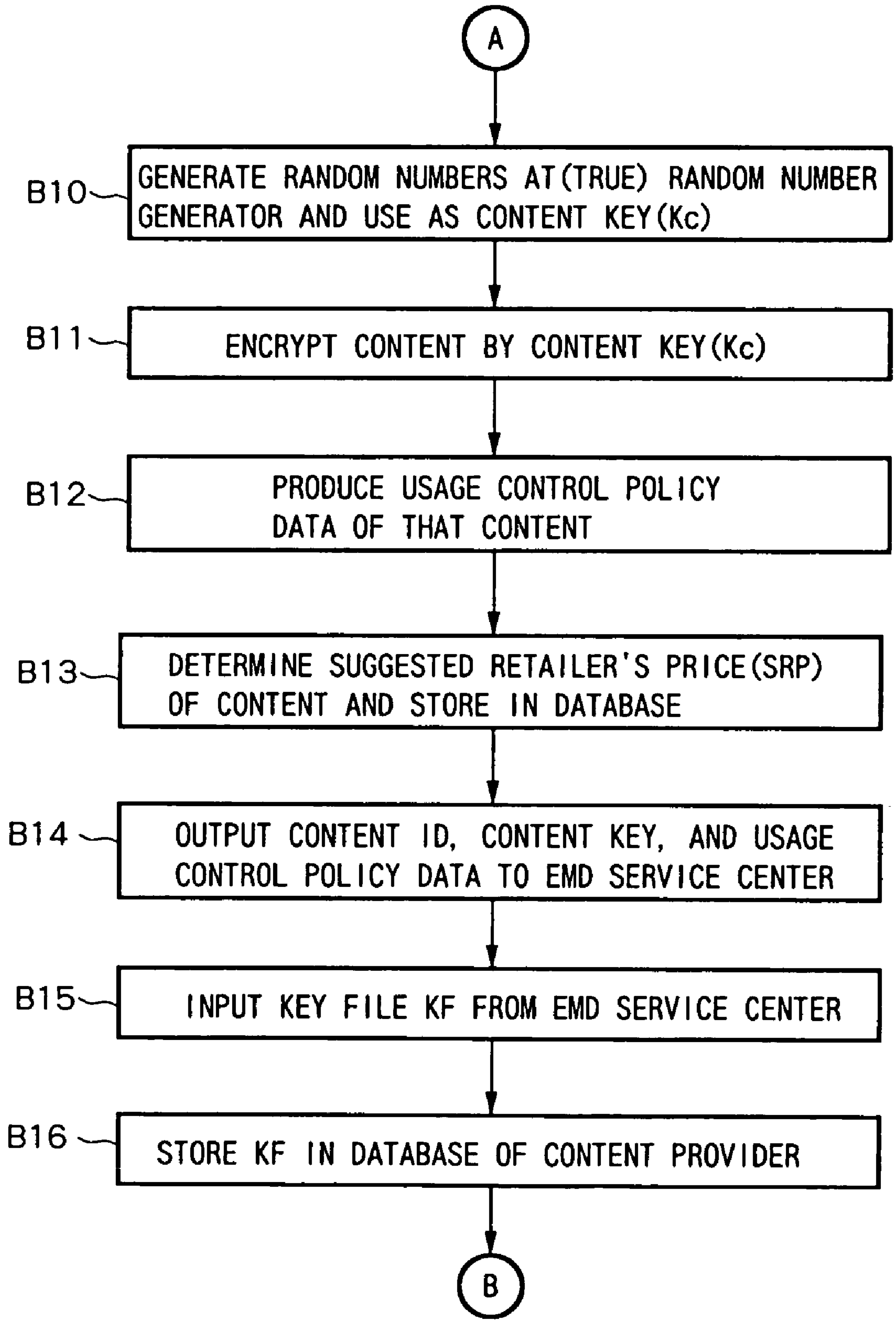
FIG. 21 is a flowchart showing a routine of processing for preparation of an explanation in the content provider.
Figure 22:
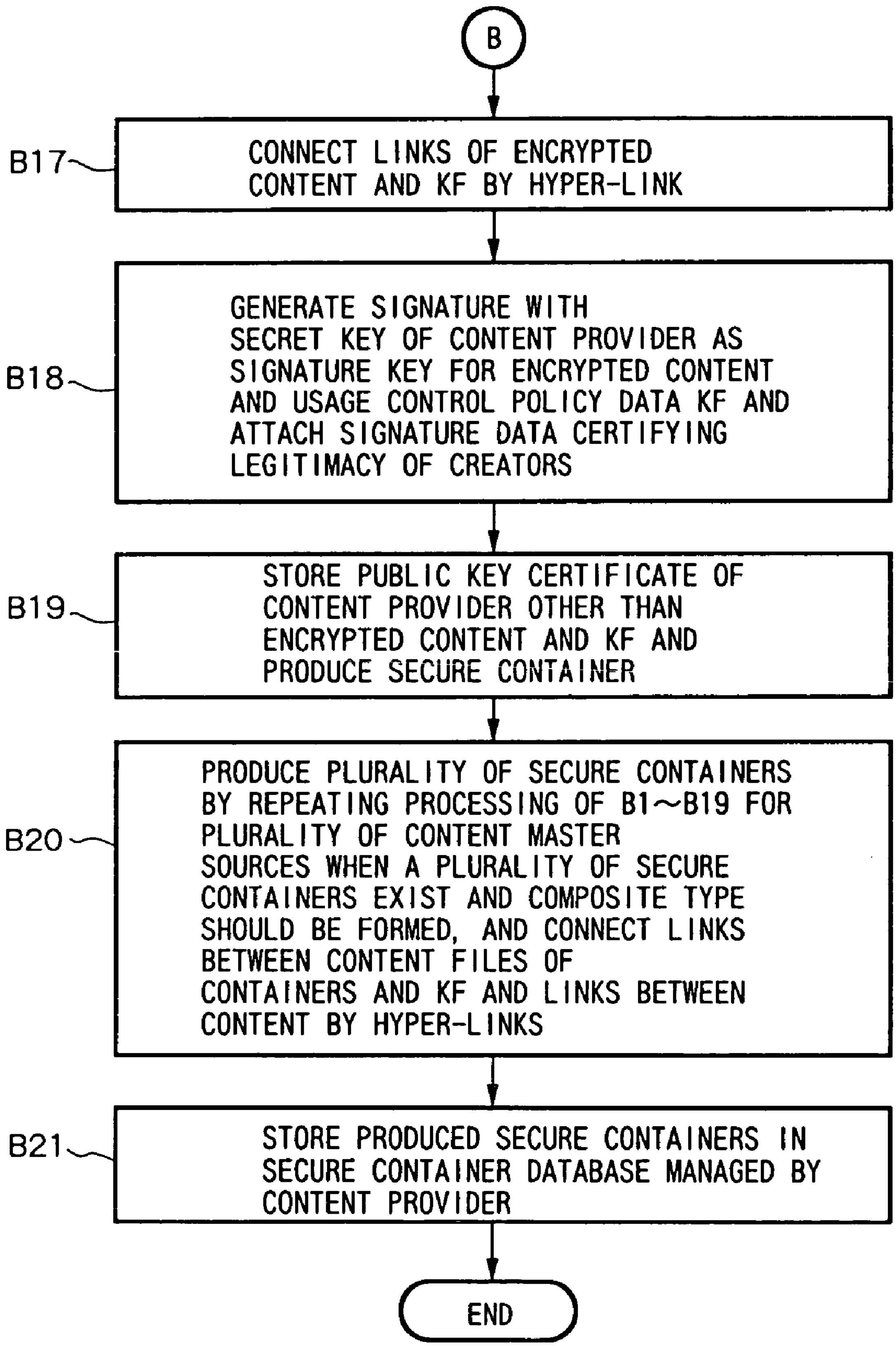
FIG. 22 is a flowchart showing a routine of processing for preparation of an explanation in the content provider.

FIG. 20, FIG. 21, and FIG. 22 are flowcharts for explaining the flow of the related processing.

Step B1: The content provider 101 receives as input its own certificate data $CER_{CP}$ from the EMD service center 102 in advance and stores this in the storage unit (database) 119.

Step B2: The content data to be newly authored and an already stored content master source such as legacy content data are digitized, allocated a content ID, and stored in the content master source database 111 and uniquely managed.

Step B3: The meta data Meta is produced for each content master source uniquely managed at step B1 and is stored in the storage unit 119.

Step B4: The content data S111 serving as the content master source is read out from the content master source database 111 and output to the electronic watermark information addition unit 112, the electronic watermark information is buried, and the content data S112 is produced.

Step B5: The electronic watermark information addition unit 112 stores the content of the buried electronic watermark information and the burial location in the predetermined database.

Step B6: In the compression unit 113, the content data S112 with the electronic watermark information buried therein is compressed to produce the content data S113.

Step B7: In the expansion unit 116, the compressed content data S113 is expanded to produce the content data S116.

Step B8: In the audial check unit 123, the check of the sound of the expanded content data S116 is carried out.

Step B9: The content provider 101 detects the electronic watermark information buried in the content data S116 based on the buried content and the burial location stored in the database at step B5.

Then, the content provider 101 performs the processing of step B10 where both of the audial check and the detection of the electronic watermark information succeed, while repeats the processing of step B4 where either one fails.

Step B10: A random number is generated at the random number generation unit 115 to produce the content key data Kc, and this is stored in the storage unit 119.

Step B11: In the encryption unit 114, the compressed content data S113 is encrypted by using the content key data Kc to produce the content data C.

Step B12: In the usage control policy data preparation unit 122, the usage control policy data 106 for the content data C is produced.

Step B13: The content provider 101 determines the SRP and stores this in the storage unit 119.

Step B14: The content provider 101 outputs the content ID, content key data Kc, and the usage control policy data 106 to the EMD service center 102.

Step B15: The content provider 101 receives as input the key file KF encrypted by the distribution use key data $KD_1$ to $KD_3$ from the EMD service center 102.

Step B16: The content provider 101 stores the input key file KF in the key file database 118*b*.

Step B17: The content provider 101 connects the links of the content data C and the key file KF by the hyper link.

Step B18: In the signature processing unit 117, the signature data indicating the legitimacy of the producer is produced by using the secret key data $K_{CP,S}$ for each of the content data C and the key files KF.

Step B19: In the secure container preparation unit 118, the secure container 104 shown in FIG. 5 is produced.

Step B20: Where the content data is provided in a composite form using a plurality of secure containers, the processing of the steps B1 to B19 is repeated to produce the secure container 104 and the link between the content file CF and the key file KF and the link among the content files CF by using the hyper link, etc.

Step B21: The content provider 101 stores the produced secure container 104 in the secure container database 118*a*.

[EMD Service Center 102]

The EMD service center 102 has a certificate authority (CA) function, a key management function, and a rights clearing (profit distribution) function.

Figure 23:
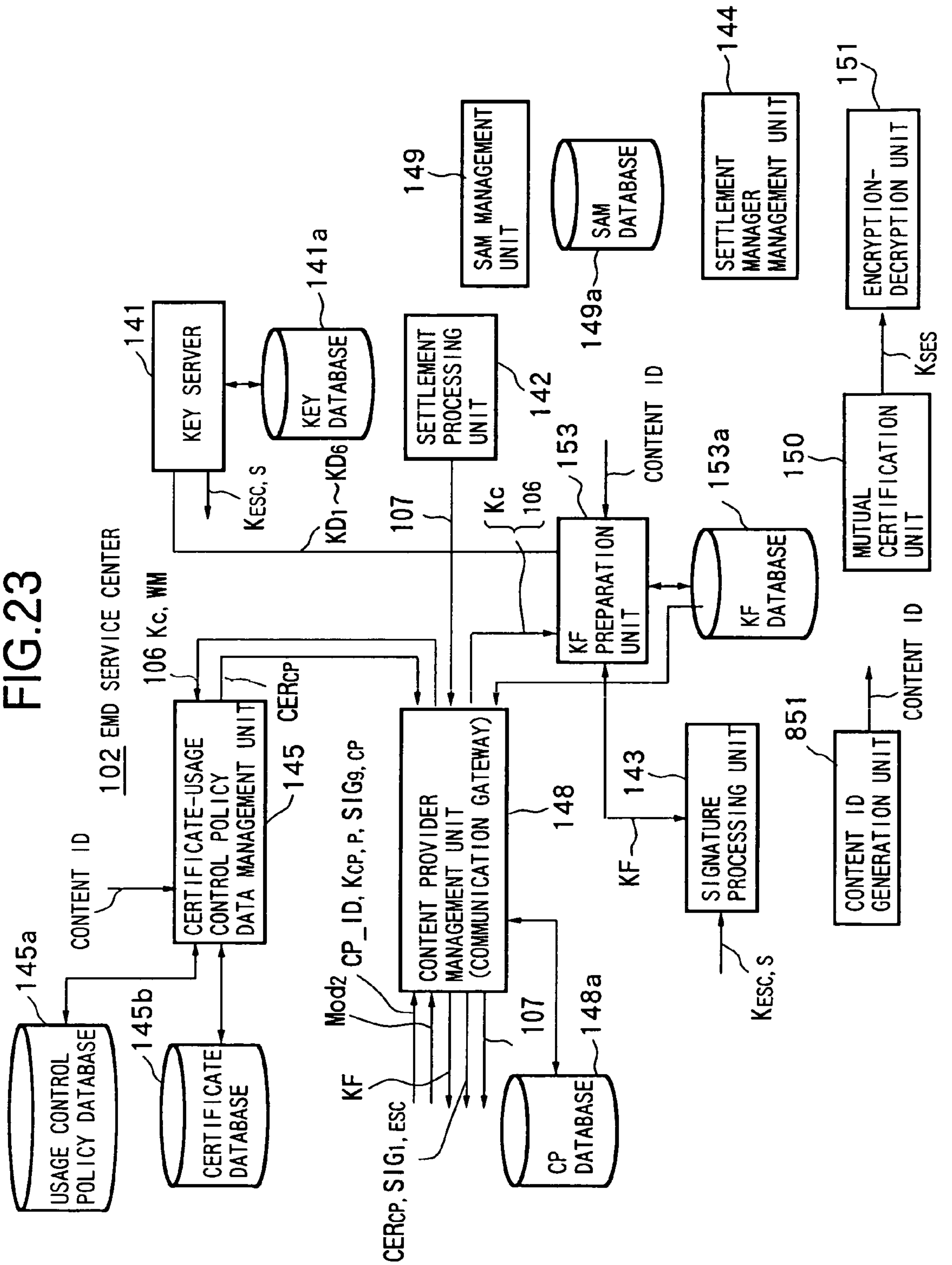
FIG. 23 is a functional block diagram of the EMD service center shown in FIG. 1 and a view of the flow of the data related to the data transmitted and received with the content provider.

FIG. 23 is a view of the configurations of functions of the EMD service center 102.

As shown in FIG. 23, the EMD service center 102 has a key server 141, a key database 141*a*, a settlement processing unit 142, a signature processing unit 143, a settlement manager management unit 144, a certificate and/or usage control policy management unit 145, a usage control policy database 145*a*, a certificate database 145*b*, a content provider management unit 148, a CP database 148*a*, a SAM management unit 149, a SAM database 149*a*, a mutual certification unit 150, an encryption and/or decryption unit 151, and a KF preparation unit 153.

Note that, in FIG. 23, the flow of the data related to the data transmitted and received between the EMD service center 102 and the content provider 101 in the flow of the data among the functional blocks in the EMD service center 102 is shown.

Figure 24:
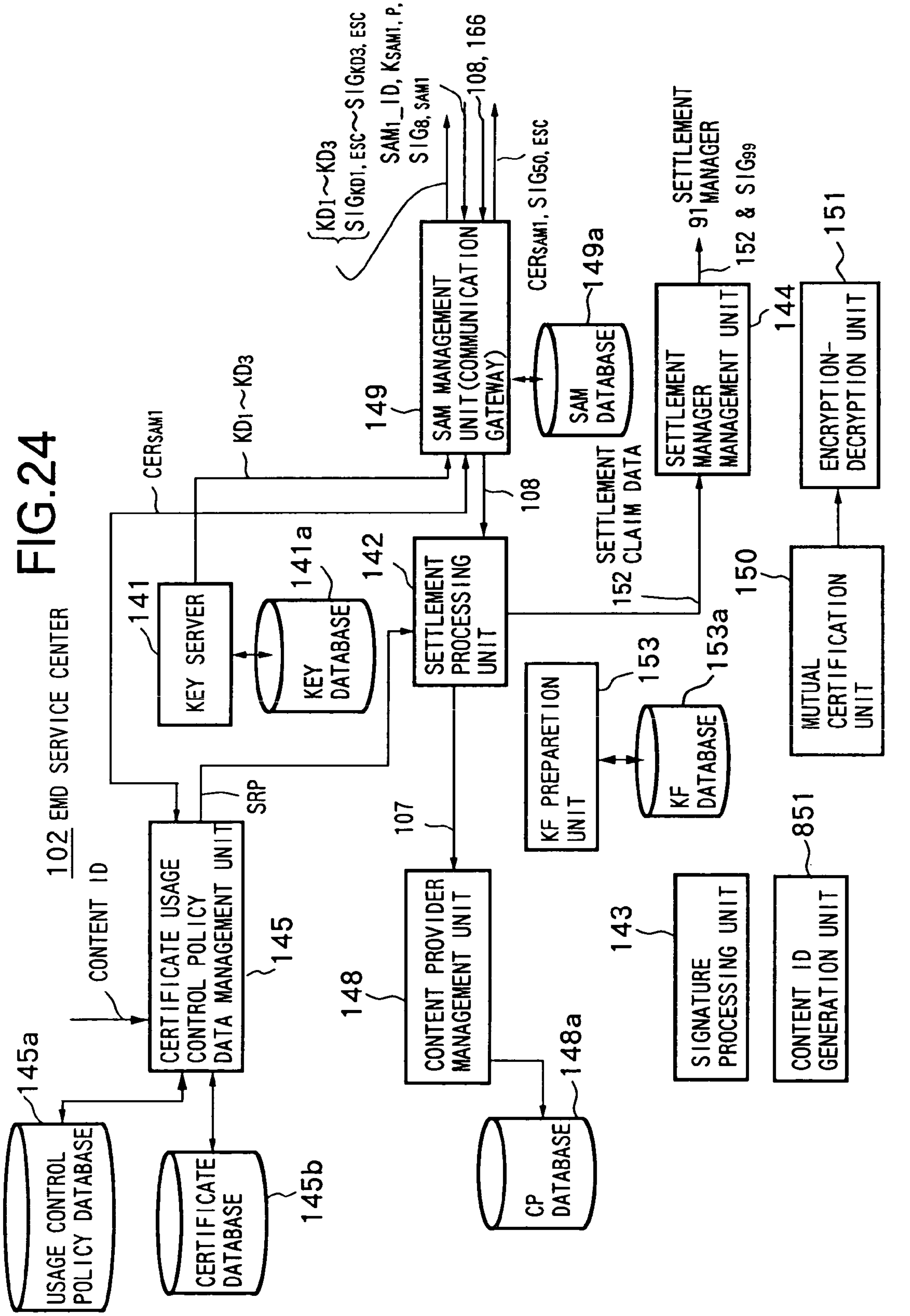
FIG. 24 is a functional block diagram of the EMD service center shown in FIG. 1 and a view of the flow of the data related to the data transmitted and received between the SAM and a settlement manager shown in FIG. 1.

Also, in FIG. 24, the flow of the data related to the data transmitted and received between the SAMs $105_1$ to $105_4$ and the settlement manager 91 shown in FIG. 1 in the flow of the data among the functional blocks in the EMD service center 102 is shown.

The key server 141 reads out six months worth of the distribution use key data having the expiration date of one month stored in the key database 141*a* and outputs the same to the SAM management unit 149.

Also, other than the key database 141*a* distribution use key data KD, one series of key data for storing the key data such as the secret key data $K_{ESC,S}$ of the EMD service center 102, storage use key data $K_{STR}$, media key data $K_{MED}$, and the MAC key data $K_{MAC}$ are stored.

The settlement processing unit 142 performs settlement processing based on the usage log data 108 input from the SAMs $105_1$ to $105_4$, the suggested retailer's price SRP input from the certificate and/or usage control policy management unit 145 and sales price, produces the settlement report data 107 and settlement claim data 152, outputs the settlement report data 107 to the content provider management unit 148, and outputs the settlement claim data 152 to the settlement manager management unit 144.

Note that, the settlement processing unit 142 monitors whether or not transactions based on an illegal dumping price were carried out based on the sales price.

Here, the usage log data 108 indicates the log of the purchase and usage (reproduction, recording, transfer, etc.) of the secure container 104 in the user home network 103 and is used when determining the payment sum of a license fee related to the secure container 104 in the settlement processing unit 142.

In the usage log data 108, for example the content ID serving as the identifier of the content data C stored in the secure container 104, the identifier CP_ID of the content provider 101 distributing the secure container 104, the compression method of the content data C in the secure container 104, an identifier Media_ID of the storage medium storing the secure container 104, the identifier SAM_ID of the SAMs $105_1$ to $105_4$ receiving the distribution of the secure container 104, USER_ID of the user of the related SAMs $105_1$ to $105_4$, etc. are described. Accordingly, the EMD service center 102 determines the sum of payment for each other party based on a distribution rate table determined in advance when it is necessary to distribute the money paid by the user of the user home network 103 to license owners of for example the compression method and the storage medium other than the owner of the content provider 101 and produces the settlement report data 107 and the settlement claim data 152 in accordance with the related determination. The related distribution rate table is produced for example for every content data stored in the secure container 104.

Also, the settlement claim data 152 is the authenticated data for which the payment of money to the settlement manager 91 may be claimed. For example, when the money paid by the user is distributed to a plurality of right holders, it is produced for individual right holders.

Note that, the settlement manager 91 sends a statement of the related settlement manager to the EMD service center 102 when the settlement is terminated. The EMD service center 102 notifies the content of the related statement to the corresponding right holders.

The settlement manager management unit 144 transmits the settlement claim data 152 produced by the settlement processing unit 142 via the payment gateway 90 shown in FIG. 1 to the settlement manager 91.

Note that, as will be mentioned later, it is also possible if the settlement manager management unit 144 transmits the settlement claim data 152 to the right holders of the content provider 101 etc., and the right holders per se perform the settlement at the settlement manager 91 by using the received settlement claim data 152.

Also, the settlement manager management unit 144 obtains the hash value of the settlement claim data 152 in the signature processing unit 143 and transmits signature data $SIG_{99}$ produced by using the secret key data $K_{ESC,S}$ together with the settlement claim data 152 to the settlement manager 91.

The certificate and/or usage control policy management unit 145 reads out the certificate data $CER_{CP}$ and certificate data $CER_{SAM1}$ to $CER_{SAM4}$ etc. which are registered (stored) in the certificate database 145*b* and authenticated and, at the same time, registers the usage control policy data 106 of the content provider 101, the content key data Kc, the watermark module WM, etc. in the usage control policy database 145*a* to authenticate the same.

Here, for the usage control policy database 145*a*, a search is carried out by using the content ID as a search key, while for the certificate database 145*b*, a search is carried out by using the identifier CP_ID of the content provider 101 as the search key.

Also, the certificate and/or usage control policy management unit 145 obtains the hash values of for example the usage control policy data 106, content key data Kc, and the watermark module WM and stores the authenticated data attached with the signature data using the secret key data $K_{ESC,S}$ in the usage control policy database 145*a*.

The content provider management unit 148 has a function of communication with the content provider 101 and can access the CP database 148*a* for managing the identifiers CP_ID etc. of the registered content providers 101.

The SAM management unit 149 has a function of communication with the SAMs $105_1$ to $105_4$ in the user home network 103 and can access the SAM database 149*a* storing the identifiers SAM_ID and SAM registration list etc. of the registered SAMs.

The KF preparation unit 153 outputs the content key data Kc and usage control policy data 106 input from the content provider management unit 148 and the SAM program download containers $SDC_1$ to $SDC_3$ to the signature processing unit 143.

Also, the KF preparation unit 153 encrypts the content key data Kc, the usage control policy data 106, and the SAM program download containers $SDC_1$ to $SDC_3$ by using the distribution use key data $KD_1$ to $KD_6$ of the corresponding period input from the key server 141, produces the key file KF storing the related encrypted data and the signature data $SIG_{K1,ESC}$ by the secret key data $K_{ESC,S}$ for the related encrypted data input from the signature processing unit 143 therein as shown in FIG. 5B, and stores the related produced key file KF in the KF database 153*a*.

Below, an explanation will be given of the flow of the processing in the EMD service center 102.

First, an explanation will be given of the flow of the processing when transmitting the distribution use key data from the EMD service center 102 to the SAMs $105_1$ to $105_4$ in the user home network 103 by referring to FIG. 24.

As shown in FIG. 24, the key server 141 reads out for example three months worth of the distribution use key data $KD_1$ to $KD_3$ from the key database 141*a* every predetermined period and outputs the same to the SAM management unit 149.

Also, the signature processing unit 143 obtains the hash values of each of the distribution use key data $KD_1$ to $KD_3$ to produce signature data $SIG_{KD1,ESC}$ to $SIG_{KD3,ESC}$ individually corresponding to them by using the secret key data $K_{ESC,S}$ of the EMD service center 102 and outputs them to the SAM management unit 149.

The SAM management unit 149 encrypts these three months worth of the distribution use key data $KD_1$ to $KD_3$ and the signature data $SIG_{KD3,ESC}$ of them by using the session key data $K_{SES}$ obtained by the mutual certification between the mutual certification unit 150 and the SAMs $\mathbf{105}_1$ to $\mathbf{105}_4$ and then transmits them to the SAMs $\mathbf{105}_1$ to $\mathbf{105}_4$.

Next, an explanation will be given of the processing in the case where the EMD service center 102 receives an issuance request of the certificate data $CER_{CP}$ from the content provider 101 by referring to FIG. 23.

In this case, when receiving the identifier CP_ID of the content provider 101, public key data $K_{CP,P}$, and the signature data $SIG_{9,CP}$ from the content provider 101, the content provider management unit 148 decrypts them by using the session key data $K_{SES}$ obtained by the mutual certification between the mutual certification unit 150 and the mutual certification unit 120 shown in FIG. 4.

Then, after confirming the legitimacy of the related decrypted signature data $SIG_{9,CP}$ at the signature processing unit 143, it is confirmed whether or not the content provider 101 issuing the issuance request of the related certificate data is registered in the CP database 148*a* based on the identifier CP_ID and the public key data $K_{CP,P}$.

Then, the certificate and/or usage control policy management unit 145 reads out the certificate data $CER_{CP}$ of the related content provider 101 from the certificate database 145*b* and outputs this to the content provider management unit 148.

Also, the signature processing unit 143 obtains the hash value of the certificate data $CER_{CP}$, produces the signature data $SIG_{1,ESC}$ by using the secret key data $K_{ESC,S}$ of the EMD service center 102, and outputs this to the content provider management unit 148.

Then, the content provider management unit 148 encrypts the certificate data $CER_{CP}$ and the signature data $SIG_{1,ESC}$ thereof by using the session key data $K_{SES}$ obtained by the mutual certification between the mutual certification unit 150 and the mutual certification unit 120 shown in FIG. 4 and then transmits the same to the content provider 101.

Next, an explanation will be given of the processing where the EMD service center 102 receives the issuance request of the certificate data $CER_{SAM1}$ from the SAM $\mathbf{105}_1$ by referring to FIG. 24.

In this case, when receiving an identifier $SAM_1$_ID of the SAM $\mathbf{105}_1$, public key data $K_{SAM1,P}$, and signature data $SIG_{8,SAM1}$ from the SAM $\mathbf{105}_1$, the SAM management unit 149 decrypts them by using the session key data $K_{SES}$ obtained by the mutual certification between the mutual certification unit 150 and the SAM $\mathbf{105}_1$.

Then, after confirming the legitimacy of the related decrypted signature data $SIG_{8,SAM1}$ in the signature processing unit 143, based on the identifier $SAM_1$_ID and the public key data $K_{SAM1,P}$, it is confirmed whether or not the SAM $\mathbf{105}_1$ outputting the issuance request of the related certificate data is registered in the SAM database 149*a*.

Then, the certificate and/or usage control policy management unit 145 reads out the certificate data $CER_{SAM1}$ of the related SAM $\mathbf{105}_1$ from the certificate database 145*b* and outputs this to the SAM management unit 149.

Also, the signature processing unit 143 obtains the hash value of the certificate data $CER_{SAM1}$, produces signature data $SIG_{50,ESC}$ by using the secret key data $K_{ESC,S}$ of the EMD service center 102, and outputs this to the SAM management unit 149.

Then, the SAM management unit 149 encrypts the certificate data $CER_{SAM1}$ and the signature data $SIG_{50,ESC}$ thereof by using the session key data $K_{SES}$ obtained by the mutual certification between the mutual certification unit 150 and the SAM $\mathbf{105}_1$, and then transmits the same to the SAM $\mathbf{105}_1$.

Note that, the processing where the SAMs $\mathbf{105}_1$ to $\mathbf{105}_4$ request the certificate data is the same as the case of the SAM $\mathbf{105}_1$ mentioned above except only the object is replaced by the SAMs $\mathbf{105}_1$ to $\mathbf{105}_4$.

Note that, in the present invention, it is also possible if the EMD service center 102 produces the certificate data $CER_{SAM1}$ of the public key data $K_{SAM1,P}$ at the time of shipment when a secret key data $K_{SAM1,S}$ and the public key data $K_{SAM1,P}$ of the SAM $\mathbf{105}_1$ are stored in the storage unit of the SAM $\mathbf{105}_1$ at for example the related shipment of the SAM $\mathbf{105}_1$.

At this time, at the related shipment, it is also possible to store the certificate data $CER_{SAM1}$ in the storage unit of the SAM $\mathbf{105}_1$.

Next, an explanation will be given of the processing where the EMD service center 102 receives the registration use module $Mod_2$ shown in FIG. 1 from the content provider 101 by referring to FIG. 23.

In this case, when the content provider management unit 148 receives the registration use module $Mod_2$ shown in FIG. 18 from the content provider 101, the registration use module $Mod_2$ is decrypted by using the session key data $K_{SES}$ obtained by the mutual certification between the mutual certification unit 150 and the mutual certification unit 120 shown in FIG. 4.

Then, in the signature processing unit 143, the legitimacy of the signature data $SIG_{M1,CP}$ is verified by using the public key data $K_{CP,P}$ read out from the key database 141*a*.

Next, the certificate and/or usage control policy management unit 145 registers the usage control policy data 106, content key data Kc, watermark module WM, and SRP stored in the registration use module $Mod_2$ in the usage control policy database 145*a*.

Next, the content provider management unit 148 outputs the content key data Kc and the usage control policy data 106 to the KF preparation unit 153.

Next, the KF preparation unit 153 outputs the content key data Kc and usage control policy data 106 input from the content provider management unit 148 and the SAM program download containers $SDC_1$ to $SDC_3$ to the signature processing unit 143.

Then, the signature processing unit 143 obtains the hash value with respect to the whole data input from the KF preparation unit 153, produces the signature data $SIG_{K1,ESC}$ thereof by using the secret key data $K_{ESC,S}$ of the EMD service center 102, and outputs this to the KF preparation unit 153.

Next, in the KF preparation unit 153, by using the distribution use key data $KD_1$ to $KD_6$ of the corresponding period input from the key server 141, the content key data Kc and usage control policy data 106 and the SAM program download containers $SDC_1$ to $SDC_3$ are encrypted, and the key file KF storing the related encrypted data and the signature data $SIG_{K1,ESC}$ input from the signature processing unit 143 therein is produced and is stored in the KF database 153*a*.

Here, as the SAM program download containers $SDC_1$ to $SDC_3$, it is also possible to use those stored in the registration use module $Mod_2$ or it is also possible to use those held by the EMD service center 102 in advance.

Next, the content provider management unit 148 encrypts the key file KF obtained by accessing the KF obtained by the mutual certification between the mutual certification unit 150 and the mutual certification unit 120 shown in FIG. 4, and then transmits the same to the content provider 101.

Next, an explanation will be given of the settlement processing performed in the EMD service center 102 by referring to FIG. 24.

When receiving as input the usage log data 108 and signature data $SIG_{200,SAM1}$ thereof from for example the SAM $\mathbf{105}_1$ of the user home network 103, the SAM management unit 149 decrypts the usage log data 108 and the signature data $SIG_{200,SAM1}$ by using the session key data $K_{SES}$ obtained by the mutual certification between the mutual certification unit 150 and the SAM $\mathbf{105}_1$, verifies the signature data $SIG_{200,SAM1}$ by the public key data $K_{SAM1}$ of the SAM $\mathbf{105}_1$, and then outputs the same to the settlement processing unit 142.

Then, the settlement processing unit 142 performs the settlement processing based on the usage log data 108 input from the SAM management unit 149 and the suggested retailer's price SRP contained in the usage control policy data 106 read out from the usage control policy database 145*a* via the certificate and/or usage control policy management unit 145 and the sales price and produces the settlement claim data 152 and the settlement report data 107.

The settlement processing unit 142 outputs the settlement claim data 152 to the settlement manager management unit 144 and, at the same time, outputs the settlement report data 107 to the content provider management unit 148.

Next, the settlement manager management unit 144 transmits the settlement claim data 152 and the signature data $SIG_{99}$ thereof via the payment gateway 90 shown in FIG. 1 to the settlement manager 91 after the mutual certification and the decryption by the session key data $K_{SES}$.

By this, the money of the sum indicated in the settlement claim data 152 is paid to the content provider 101.

Next, an explanation will be given of the processing where the EMD service center 102 transmits the settlement report to the content provider 101 by referring to FIG. 23.

When the settlement is carried out in the settlement processing unit 142, as mentioned above, the settlement report data 107 is output from the settlement processing unit 142 to the content provider management unit 148.

In the settlement report data 107, as mentioned above, for example the content of the settlement concerning the content provider 101 performed with respect to the settlement manager 91 shown in FIG. 1 by the EMD service center 102 is described.

When receiving as input the settlement report data 107 from the settlement processing unit 142, the EMD service center 102 encrypts this by using the session key data $K_{SES}$, obtained by the mutual certification between the mutual certification unit 150 and the mutual certification unit 120 shown in FIG. 4 and then transmits the same to the content provider 101.

Also, after registering (authenticating) the usage control policy data 106 as mentioned above, the EMD service center 102 may encrypt the authenticated certificate module by the distribution use key data $KD_1$ to $KD_6$ and transmit the same from the EMD service center 102 to the content provider 101 too.

Also, the EMD service center 102 performs the processing at the time of shipment of the SAMs $\mathbf{105}_1$ to $\mathbf{105}_4$ and the registration processing of the SAM registration list other than the above, but these processings will be mentioned later.

[User Home Network 103]

The user home network 103 has a network apparatus $\mathbf{160}_1$ and A/V apparatuses $\mathbf{160}_2$ to $\mathbf{160}_4$ as shown in FIG. 1.

The network apparatus $\mathbf{160}_1$ includes a built-in SAM $\mathbf{105}_1$. Also, the AV apparatuses $\mathbf{160}_2$ to $\mathbf{160}_4$ includes built-in SAMs $\mathbf{105}_2$ to $\mathbf{105}_4$.

The SAMs $\mathbf{105}_1$ to $\mathbf{105}_4$ are connected to each other via a bus 191, for example, an IEEE1394 serial interface bus.

Note that, the AV apparatuses $\mathbf{160}_2$ to $\mathbf{160}_4$ can have a network communication function too or may not have the network communication function, but utilize the network communication function of the network apparatus $\mathbf{160}_1$ via the bus 191.

Also, the user home network 103 can have only AV apparatuses not having the network function too.

Below, an explanation will be made of the network apparatus $\mathbf{160}_1$.

Figure 25:
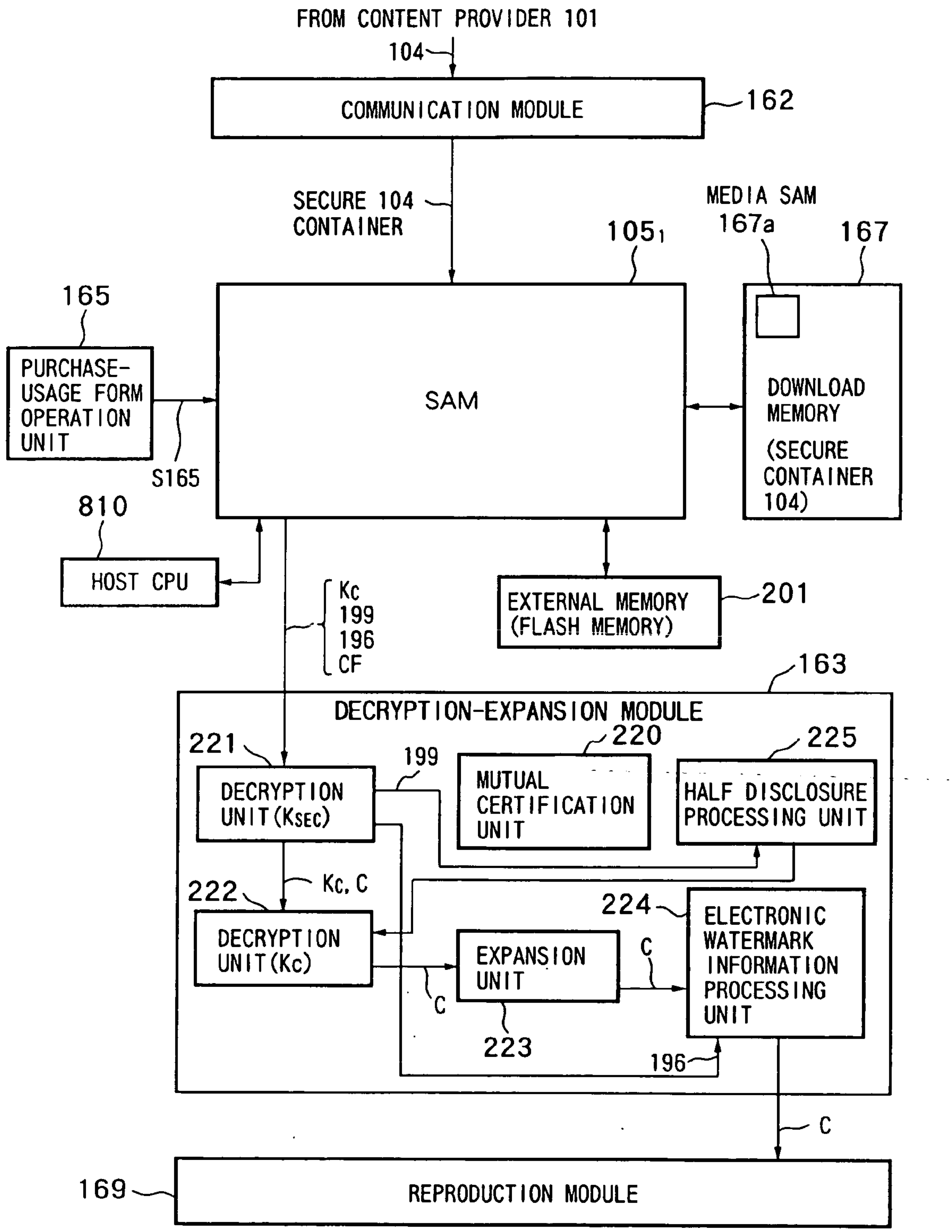
FIG. 25 is a view of the configuration of network apparatuses in the user home network shown in FIG. 1.

FIG. 25 is a view of the configuration of the network apparatus $\mathbf{160}_1$.

As shown in FIG. 25, the network apparatus $\mathbf{160}_1$ has the SAM $\mathbf{105}_1$, a communication module 162, a decryption and/or expansion module 163, a purchase and/or usage form determination operation unit 165, a download memory 167, a reproduction module 169, and an external memory 201.

The SAMs $\mathbf{105}_1$ to $\mathbf{105}_4$ are modules for performing the charge processing in units of content and communicate with the EMD service center 102.

The SAMs $\mathbf{105}_1$ to $\mathbf{105}_4$ are managed in their specifications, versions, etc. by for example the EMD service center 102. If there is a desire for mounting them by a home electric apparatus maker, they are licensed as a black box charging module for charging in units of content. For example, a home electric apparatus developer/manufacturer cannot determine the specifications inside the ICs (integrated circuits) of the SAMs $\mathbf{105}_1$ to $\mathbf{105}_4$. The EMD service center 102 standardizes the interfaces etc. of the related ICs. They are mounted in the network apparatus $\mathbf{160}_1$ and the AV apparatuses $\mathbf{160}_2$ to $\mathbf{160}_4$ according to that.

The SAMs $\mathbf{105}_1$ to $\mathbf{105}_4$ are hardware modules (IC modules etc.) having tamper resistance so that the processing contents thereof are completely sheltered from the outside, the processing contents cannot be monitored or tampered with from the outside, and the data stored inside in advance and the data being processed cannot be monitored and tampered with from the outside.

When the functions of the SAMs $\mathbf{105}_1$ to $\mathbf{105}_4$ are realized in the form of ICs, secret memories are provided inside the ICs, and secret programs and secret data are stored there. If the function of a SAM can be incorporated in any other portion of the apparatus not limited to the physical form of an IC, that portion can be defined as a SAM too.

Below, a detailed explanation will be made of the function of the SAM $\mathbf{105}_1$.

Note that the SAMs $\mathbf{105}_2$ to $\mathbf{105}_4$ have basically the same functions as the SAM $\mathbf{105}_1$.

Figure 26:
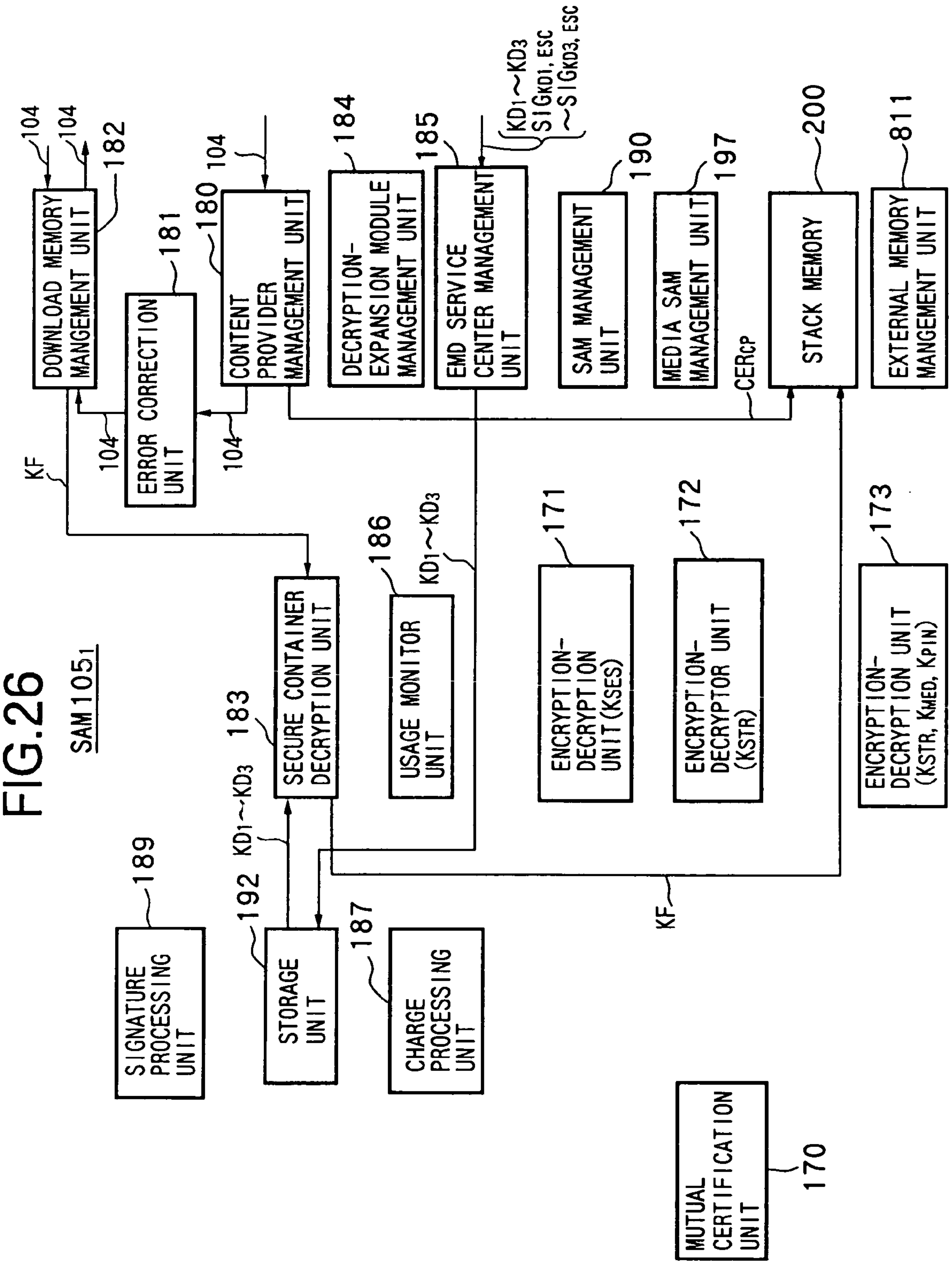
FIG. 26 is a functional block diagram of a SAM in the user home network shown in FIG. 1 and a view of the flow of the data until the secure container received from the content provider is decrypted.

FIG. 26 is a view of the configuration of the function of the SAM $\mathbf{105}_1$.

Note that, in FIG. 26, the flow of the data related the processing of inputting a secure container 104 from the content provider 101 and decrypting the key file KF in the secure container 104 is shown.

As shown in FIG. 26, the SAM $\mathbf{105}_1$ has a mutual certification unit 170, encryption and/or decryption units 171, 172, and 173, a content provider management unit 180, an error correction unit 181, a download memory management unit 182, a secure container decryption unit 183, a decryption and/or expansion module management unit 184, an EMD service center management unit 185, a usage monitor unit 186, a charge processing unit 187, a signature processing unit 189, a SAM management unit 190, a media SAM management unit 197, a stack (work) memory 200, and an external memory management unit 811.

Note that, the AV apparatuses $160_2$ to $160_4$ do not have the download memory 167, so the download memory management unit 182 does not exist in the SAM $105_2$ to $105_4$.

Note that, the predetermined function of the SAM $105_1$ shown in FIG. 26 is realized by executing a secret program in for example a not illustrated CPU.

Also, in the external memory 201, after going through the following processing, as shown in FIG. 27, usage log data 108 and a SAM registration list are stored.

Here, the memory space of the external memory 201 cannot be seen from the outside (for example a host CPU 810) of the SAM $105_1$. Only the SAM $105_1$ can manage access with respect to the storage region of the external memory 201.

As the external memory 210, use is made of for example a flash memory or a ferro-electric memory (FeRAM).

Also, as the stack memory 200, use is made of for example a SARAM. As shown in FIG. 28, the secure container 104, content key data Kc, usage control policy data (UCP) 106, a lock key data $K_{LOC}$ of a storage unit 192, certificate data $CER_{CP}$ of the content provider 101, usage control status data (UCS) 166, SAM program download containers $SDC_1$ to $SDC_3$, etc. are provided.

Below, among the functions of the SAM $105_1$, the processing contents of the functional blocks when the secure container 104 from the content provider 101 is input will be explained by referring to FIG. 26.

The mutual certification unit 170 performs mutual certification between the content provider 101 and the EMD service center 102 when the SAM $105_1$ transmits and receives the data on-line between the content provider 101 and the EMD service center 102 to produce a session key data (common key) $K_{SES}$ and outputs this to the encryption and/or decryption unit 171. The session key data $K_{SES}$ is newly produced with each mutual certification.

The encryption and/or decryption unit 171 encrypts and/or decrypts the data transmitted and received between the content provider 101 and the EMD service center 102 by using the session key data $K_{SES}$ produced by the mutual certification unit 170.

The error correction unit 181 corrects the error of the secure container 104 and outputs the same to the download memory management unit 182.

Note that, it is also possible if the user home network 103 has a function for detecting whether or not the secure container 104 has been tampered with.

In the present embodiment, the case where the error correction unit 181 was built in the SAM $105_1$ was exemplified, but it is also possible to impart the function of the error correction unit 181 to the outside of the SAM $105_1$, for example, the host CPU 810.

The download memory management unit 182 performs the mutual certification between the mutual certification unit 170 and a media SAM 167*a* in a case where the download memory 167 has a media SAM 167*a* having a mutual certification function as shown in FIG. 25, and then encrypts the secure container 104 after the error correction by using the session key data $K_{SES}$ obtained by the mutual certification and writes the same into the download memory 167 shown in FIG. 25. As the download memory 167, use is made of for example a nonvolatile semiconductor memory such as memory stick.

Figure 29:
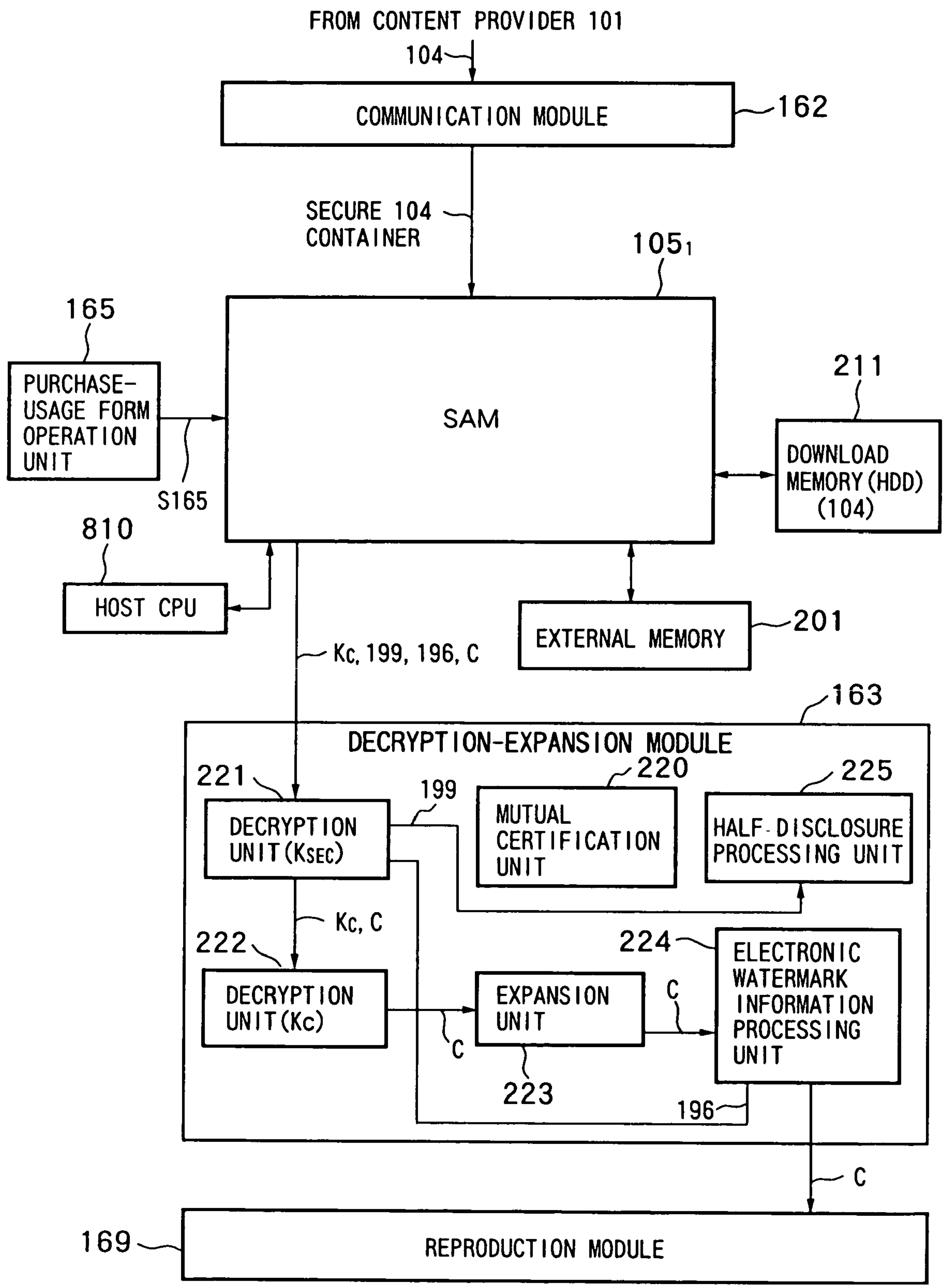
FIG. 29 is another view of the configuration of the network apparatus in the user home network shown in FIG. 1.

Note that, as shown in FIG. 29, where a memory not provided with a mutual certification function such as a HDD (hard disk drive) is used as a download memory 211, the inside of the download memory 211 is not secure, so the content file CF is downloaded on the download memory 211, and a key file KF having a high secrecy is downloaded on for example the stack memory 200 shown in FIG. 26.

The secure container decryption unit 183 decrypts the content key data Kc, usage control policy data 106, and the SAM program download containers $SDC_1$ to $SDC_3$ in the key file KF stored in the secure container 104 input from the download memory management unit 182 by using distribution use key data $KD_1$ to $KD_3$ read out from the storage unit 192.

The related decrypted content key data Kc, usage control policy data 106, and the SAM program download containers $SDC_1$ to $SDC_3$ are written into the stack memory 200.

The EMD service center management unit 185 manages the communication with the EMD service center 102 shown in FIG. 1.

The signature processing unit 189 verifies the signature data in the secure container 104 by using a public key data $K_{ESC,P}$ of the EMD service center 102 read out from the storage unit 192 and the public key data $K_{CP,P}$ of the content provider 101.

Figure 30:
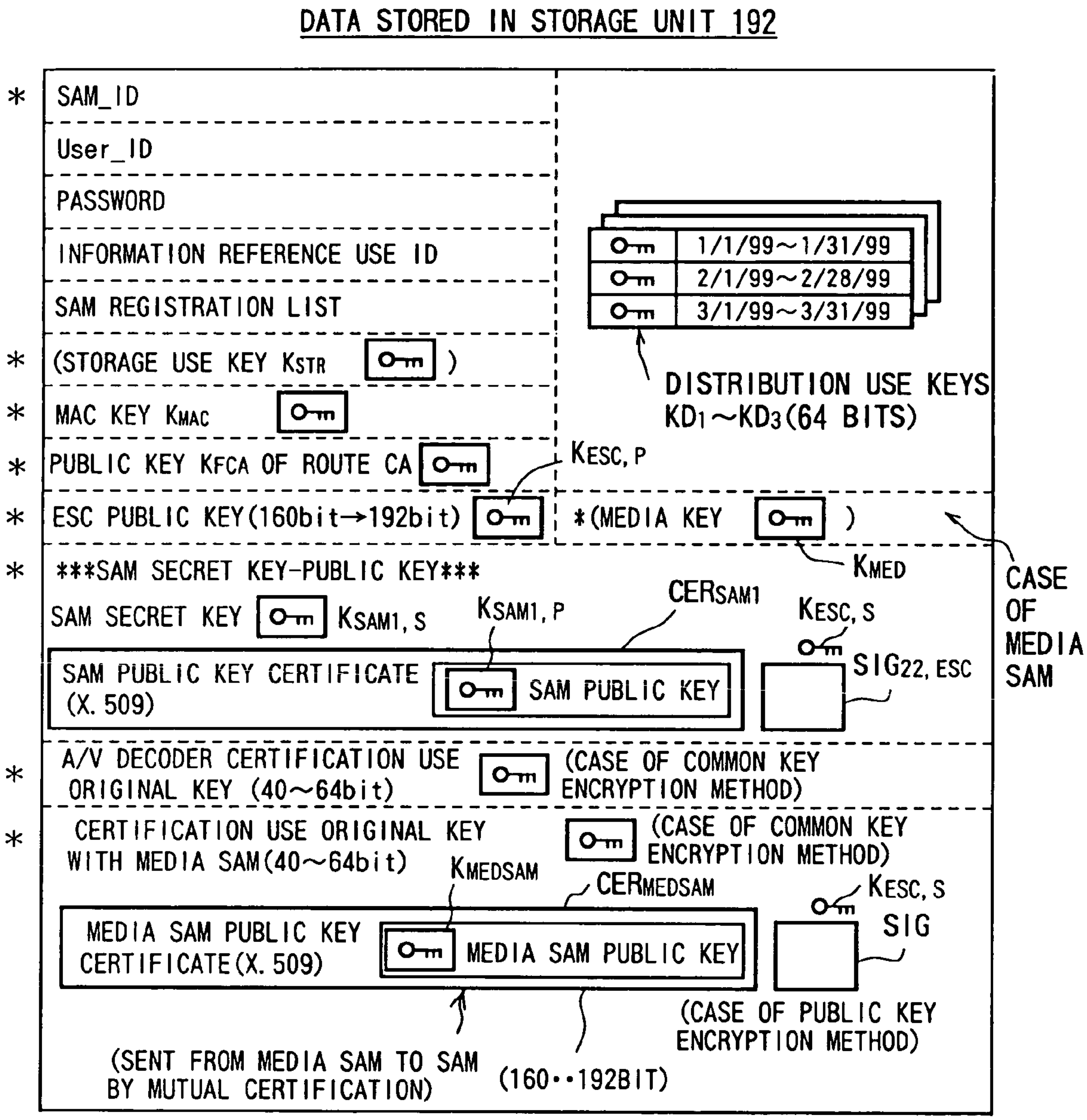
FIG. 30 is a view for explaining data stored in a storage unit shown in FIG. 26.

The storage unit 192 stores, as the secret data which cannot be read out and rewritten from the outside of the SAM $105_1$, as shown in FIG. 30, a plurality of distribution use key data $KD_1$ to $KD_3$ with expiration dates, SAM_IDs, user IDs, passwords, information reference use IDs, a SAM registration list, storage use key data $K_{STR}$, public key data $K_{R\text{-}CA,P}$ of the route CA, public key data $K_{ESC,P}$, of the EMD service center 102, media key data $K_{MED}$, public key data $K_{ESC,P}$ of the EMD service center 102, secret key data $K_{SAM1,S}$ of the SAM $105_1$, the certificate data $CER_{SAM1}$ storing public key data $K_{SAM1,P}$ of the SAM $105_1$ therein, signature data $SIG_{22}$ of the certificate $CER_{ESC}$ using the secret key data $K_{ESC,S}$ of the EMD service center 102, the original key data for the mutual certification with the decryption and/or expansion module 163 (where the common key encryption method is employed), the original key data for the mutual certification with the media SAM (where the common key encryption method is employed), and certificate data $CER_{MEDSAM}$ of the media SAM (where the public key encryption method is employed).

Also, in the storage unit 192, a secret program for realizing at least one part of the functions shown in FIG. 26 is stored.

As the storage unit 192, use is made of for example a flash-EEPROM (electrically erasable programmable RAM).

Below, an explanation will be made of the flow of the processing in the SAM $105_1$ when storing the distribution use key data $KD_1$ to $KD_3$ received from the EMD service center 102 in the storage unit 192 by referring to FIG. 26.

In this case, first, mutual certification is carried out between the mutual certification unit 170 and the mutual certification unit 150 shown in FIG. 23.

Next, three months' worth of the distribution use key data $K_1$ to $K_3$ encrypted by the session key data $K_{SES}$ obtained by the related mutual certification and the signature data $SIG_{KD1,ESC}$ to $SIG_{KD3,ESC}$ thereof are written from the EMD service center 102 via the EMD service center management unit 185 into the stack memory 811.

Next, in the encryption and/or decryption unit 171, by using the session key data $K_{SES}$, the distribution use key data $K_1$ to $K_3$ and the signature data $SIG_{KD1,ESC}$ to $SIG_{KD3,ESC}$ thereof are decrypted.

Next, in the signature processing unit 189, after the legitimacy of the signature data $SIG_{KD1,ESC}$ to $SIG_{KD1,ESC}$ stored in the stack memory 811 is confirmed, the distribution use key data $K_1$ to $K_3$ are written into the storage unit 192.

Below, an explanation will be made of the flow of the processing in the SAM $105_1$ receiving as input the secure container 104 provided by the content provider 101 by referring to FIG. 26.

Mutual certification is carried out between the mutual certification unit 170 of the SAM $105_1$ shown in FIG. 26 and the mutual certification unit 120 shown in FIG. 3.

The encryption and/or decryption unit 171 decrypts the secure container 104 supplied from the content provider 101 via the content provider management unit 180 by using the session key data $K_{SES}$ obtained by the related mutual certification.

Next, the signature processing unit 189 verifies the signature data $SIG_{1,ESC}$ shown in FIG. 5C and then verifies the legitimacy of the signature data $SIG_{6,CP}$ and $SIG_{7,CP}$ by using the public key data $K_{CP,P}$ of the content provider 101 stored in the certificate data $CER_{CP}$ shown in FIG. 5C.

At this time, when it is verified that the signature data $SIG_{6,CP}$ is legitimate, the legitimacy of the producer and the transmitter of the content file CF is confirmed.

Also, when it is verified that the signature data $SIG_{7,CP}$ is legitimate, the legitimacy of the transmitter of the key file KF is confirmed.

Also, the signature processing unit 189 verifies the legitimacy of the signature data $SIG_{K1,ESC}$ in the key file KF shown in FIG. 5B, that is, the legitimacy of the producer of the key file KF and whether or not the key file KF is registered in the EMD service center 102 by using the public key data $K_{ESC,P}$ read out from the storage unit 192.

The content provider management unit 180 outputs the secure container 104 to the error correction unit 181 when the legitimacy of the signature data $SIG_{6,CP}$, $SIG_{7,CP}$, and $SIG_{K1,ESC}$ is confirmed.

The error correction unit 181 performs the error correction of the secure container 104 and then outputs the same to the download memory management unit 182.

The download memory management unit 182 writes the secure container 104 into the download memory 167 after performing the mutual certification between the mutual certification unit 170 and the media SAM 167*a* shown in FIG. 25.

Next, the download memory management unit 182 performs mutual certification between the mutual certification unit 170 and the media SAM 167*a* shown in FIG. 25 and then reads out the key file KF shown in FIG. 5B stored in the secure container 104 from the download memory 167 and outputs the same to the secure container decryption unit 183.

Then, in the secure container decryption unit 183, by using the distribution use data $KD_1$ to $KD_3$ of the corresponding period input from the storage unit 192, the content key data Kc, usage control policy data 106, and the SAM program download containers $SDC_1$ to $SDC_3$ in the key file KF shown in FIG. 5B are decrypted.

Then, the decrypted content key data Kc, usage control policy data 106, and the SAM program download containers $SDC_1$ to $SDC_3$ are written into the stack memory 200.

Below, an explanation will be made of the processing contents of the functional blocks related to the processing of using and purchasing the content data C downloaded on the download memory 167 by referring to FIG. 31.

The usage monitor unit 186 reads out the usage control policy data 106 and the usage control status data 166 from the stack memory 200 and monitors so that the purchase and/or usage of the content is carried out within a range permitted by the related read out usage control policy data 106 and usage control status data 166.

Here, the usage control policy data 106 is stored in the KF after decryption and stored in the stack memory 200 as explained by using FIG. 26.

Also, the usage control status data 166 is stored in the stack memory 200 when the purchase form is determined by the user as will be mentioned later.

The charge processing unit 187 produces the usage log data 108 in response to an operation signal S165 from the purchase and/or usage form determination operation unit 165 shown in FIG. 25.

Here, the usage log data 108 describes the log of the purchase and usage forms of the secure container 104 by the user as mentioned before and is used when performing settlement processing in accordance with the purchase of the secure container 104 and determining the payment of the license fee in the EMD service center 102.

Also, the charge processing unit 187 notifies the sales price or the suggested retailer's price data SRP read out from the stack memory 200 to the user according to need.

Here, the sales price and the suggested retailer's price data SRP have been stored in the usage control policy data 106 of the key file KF shown in FIG. 5B stored in the stack memory 200 after decryption.

The charge processing by the charge processing unit 187 is carried out based on the right content such as the usage permission condition indicated by the usage control policy data 106 and the usage control status data 166 under the monitoring of the usage monitor unit 186. Namely, the user purchases and uses the content within the range according to the related right content, etc.

Also, the charge processing unit 187 produces the usage control status (UCS) data describing the purchase form of the content by the user and writes this into the stack memory 200.

As the purchase form of the content, there are for example an outright purchase without restriction as to the reproduction by the purchaser and copying for the usage of the related purchaser, a reproduction charge for charging with each reproduction, etc.

Here, the usage control status data 166 is produced when the user determines the purchase form of the content and is used for control so that the user uses the related content within the range permitted by the related determined purchase form 5 hereafter. In the usage control status data 166, the ID of the content, the purchase form, the price in accordance with the related purchase form, the SAM_ID of the SAM with the purchase of the related content performed therefor, the USER_ID of the purchased user, etc. are described.

Note that, where the determined purchase form is a reproduction charge, for example, the usage control status data 166 is transmitted from the SAM $105_1$ to the content provider 101 in real-time simultaneously with the purchase of the content data C, and the content provider 101 instructs the EMD service center 102 to obtain the usage log data 108 at the SAM $105_1$ within the predetermined period.

Also, where the determined purchase form is an outright purchase, for example, the usage control status data 166 is transmitted in real-time to both of the content provider 101 and the EMD service center 102. In this way, in the present embodiment, in both cases, the usage control status data 166 is transmitted in real-time to the content provider 101.

The EMD service center management unit 185 transmits the usage log data 108 read out from the external memory 201 via the external memory management unit 811 to the EMD service center 102.

At this time, the EMD service center management unit 185 produces the signature data $SIG_{200,SAM1}$ of the usage log data 108 by using the secret key data $K_{SAM1,S}$ in the signature processing unit 189 and transmits the signature data $SIG_{200,SAM1}$ together with the usage log data 108 to the EMD service center 102.

The usage log data 108 can be transmitted to the EMD service center 102 in response to for example a request from the EMD service center 102 or periodically or can be transmitted when the amount of information of the log information contained in the usage log data 108 becomes a predetermined amount or more too. The related amount of information is determined in accordance with for example the storage capacity of the external memory 201.

The download memory management unit 182 outputs the content data C read out from the download memory 167, content key data Kc read out from the stack memory 200, and the user watermark use data 196 input from the charge processing unit 187 to the decryption and/or expansion module management unit 184 in the case where for example a reproduction operation of the content is carried out in response to the operation signal S165 from the purchase form determination operation unit 165 shown in FIG. 25.

Also, the decryption and/or expansion module management unit 184 outputs the content file CF read out from the download memory 167 and the content key data Kc and a half disclosure parameter data 199 read out from the stack memory 200 to the decryption and/or expansion module management unit 184 when a demo operation of the content is carried out in response to the operation signal 5165 from the purchase form determination operation unit 165 shown in FIG. 25.

Here, the half disclosure parameter data 199 is described in the usage control policy data 106 and indicates the handling of the content in the demo mode. In the decryption and/or expansion module 163, it becomes possible to reproduce the encrypted content data C in the half disclosure state based on the half disclosure parameter data 199. As the procedure of the half disclosure, there is for example a procedure of designating the blocks to be decrypted and the blocks not to be decrypted by using the content key data Kc, limiting the reproduction function at the demo or limiting a demo enable period by the half disclosure parameter data 199 by utilizing the fact that the decryption and/or expansion module 163 processes the data (signal) in units of predetermined blocks.

Below, an explanation will be made of the flow of the processing in the SAM $105_1$.

First, an explanation will be made of the flow of the processing up to when the purchase form of the secure container 104 downloaded on the download memory 167 from the content provider 101 is determined by referring to FIG. 31.

When the operation signal S165 indicating the demo mode is output to the charge processing unit 187 by the operation of the purchase and/or usage form determination operation unit 165 shown in FIG. 25 by the user, for example, the content file CF stored in the download memory 167 is output via the decryption and/or expansion module management unit 184 to the decryption and/or expansion module 163 shown in FIG. 25.

At this time, for the content file CF, mutual certification between the mutual certification unit 170 and the media SAM 167*a*, encryption and/or decryption by the session key data $K_{SES}$, mutual certification between the mutual certification unit 170 and the mutual certification unit 220, and encryption and/or decryption by the session key data $K_{SES}$ are carried out.

The content file CF is decrypted by using the session key data $K_{SES}$ at the decryption unit 221 shown in FIG. 25, and then output to the decryption unit 222.

Also, the content key data Kc and the half disclosure parameter data 199 read out from the stack memory 200 are output to the decryption and/or expansion module 163 shown in FIG. 25. At this time, after the mutual certification between the mutual certification unit 170 and the mutual certification unit 220, encryption and decryption by the session key data $K_{SES}$ are carried out with respect to the content key data Kc and the half disclosure parameter data 199.

Next, the decrypted half disclosure parameter data 199 is output to the half disclosure processing unit 225. Under the control of the half disclosure processing unit 225, the decryption of the content data C using the content key data Kc by the decryption unit 222 is carried out in half disclosure.

Next, the content data C decrypted in half disclosure is expanded at the expansion unit 223 and then output to the electronic watermark information processing unit 224.

Next, the user watermark use data 196 is buried in the content data C in the electronic watermark information processing unit 224, and then the content data C is reproduced at the reproduction module 169, and sound in accordance with the content data C is output.

Then, when the user trying out the content determines the purchase form by operating the purchase and/or usage form determination operation unit 165, the operation signal S165 indicating the related determined purchase form is output to the charge processing unit 187.

Then, in the charge processing unit 187, the usage log data 108 and the usage control status data 166 in accordance with the determined purchase form are produced, the usage log data 108 is written into the external memory 201 via the external memory management unit 811, and, at the same time, the usage control status data 166 is written into the stack memory 200.

Thereafter, in the usage monitor unit 186, control (monitoring) is carried out so that the content data is purchased and used within the range permitted by the usage control status data 166.

Then, a new key file $KF_1$ shown in FIG. 34C mentioned later is produced, and the related produced key file $KF_1$ is stored in the download memory 167 via the download memory management unit 182.

Figures 34A, 34B, 34C, 34D:
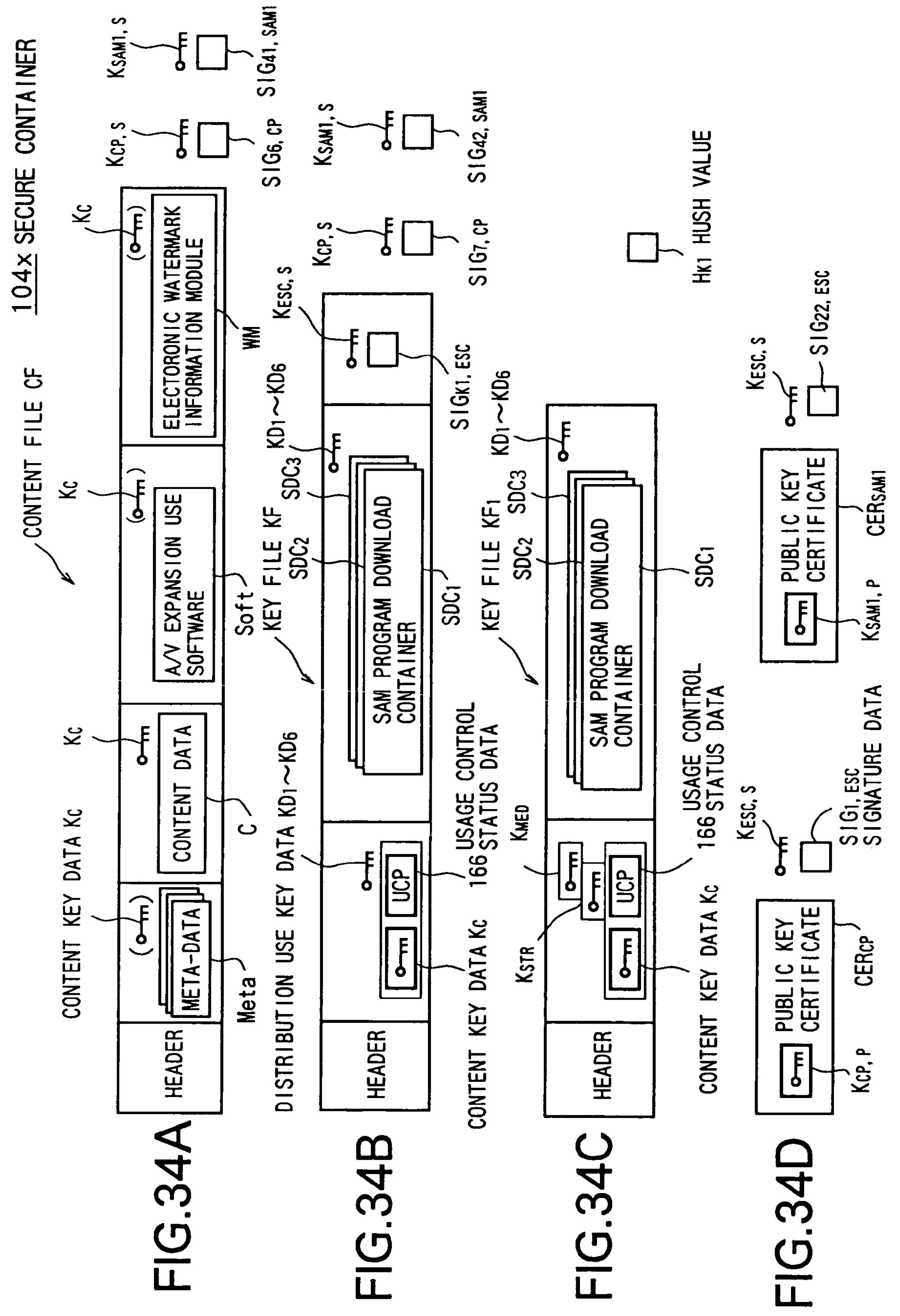

As shown in FIG. 34C, the usage control status data 166 stored in the key file $KF_1$ is sequentially encrypted by using the storage key data $K_{STR}$ and the media key data $K_{MED}$ by utilizing the CBC mode of the DES.

Here, the storage use key data $K_{STR}$ is data determined in accordance with the type of apparatus, for example, a SACD (Super Audio Compact Disc), a DVD (Digital Versatile Disc) apparatus, CD-R apparatus, and MD (Mini Disc) apparatus and is used for establishing one-to-one correspondence between the types of the apparatuses and the types of the storage media. Also, the media key data $K_{MED}$ is data unique to the storage medium.

Also, in the signature processing unit 189, a hash Value $H_{K1}$ of the key file $KF_1$ is produced by using the secret key data $K_{SAM1,S}$ of the SAM $105_1$, and the related produced hash value $H_{K1}$ is written into the stack memory 200 in correspondence to the key file $KF_1$. The hash value $H_{K1}$ is used for verifying the legitimacy of the producer of the key file $KF_1$ and whether or not the key file $KF_1$ was tampered with.

Next, the flow of the processing where the content data C with the purchase form already determined therefor stored in the download memory 167 will be explained by referring to FIG. 31.

Figure 31:
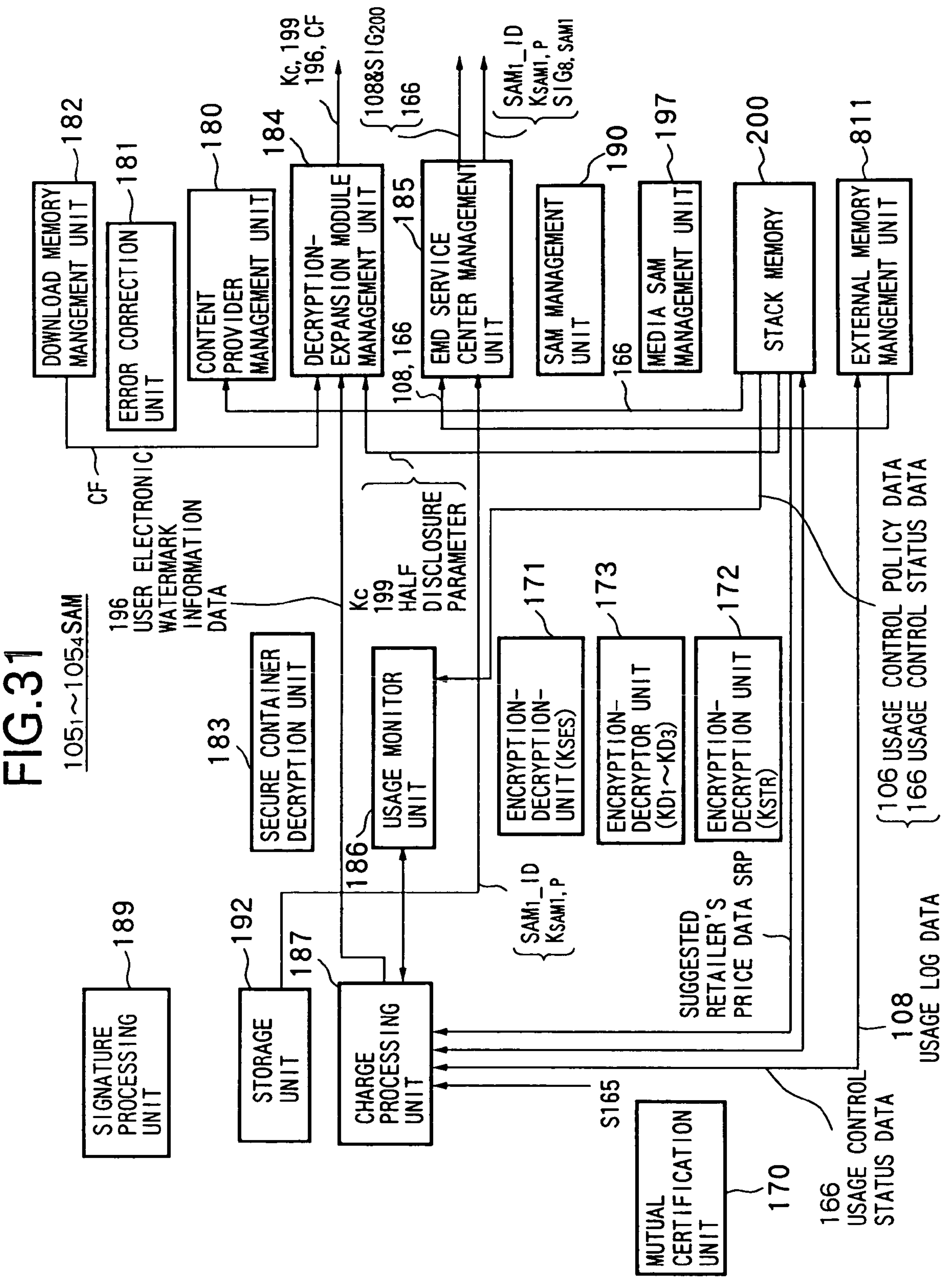
FIG. 31 is a functional block diagram of the SAM in the user home network shown in FIG. 1 and a view of the flow of the data related to processing for using and/or purchasing the content data.

In this case, under the monitoring of the usage monitor unit 186, based on the operation signal S165, the content file CF stored in the download memory 167 is output to the decryption and/or expansion module 163 shown in FIG. 31. At this time, mutual certification is carried out between the mutual certification unit 170 shown in FIG. 31 and the mutual certification unit 220 of the decryption and/or expansion module 163 shown in FIG. 25.

Also, the content key data Kc read out from the stack memory 200 is output to the decryption and/or expansion module 163.

Then, in the decryption unit 222 of the decryption and/or expansion module 163, the decryption of the content file CF using the content key data Kc and the expansion processing by an expansion unit 223 are carried out, and in the reproduction module 169, the content data C is reproduced.

At this time, by the charge processing unit 187, the usage log data 108 stored in the external memory 201 is updated in accordance with the operation signal S165.

The usage log data 108 is read out from the external memory 201, and then, after passing through the mutual certification, transmitted via the EMD service center management unit 185 together with the signature data $SIG_{200,SAM1}$ to the EMD service center 102.

Figure 32:
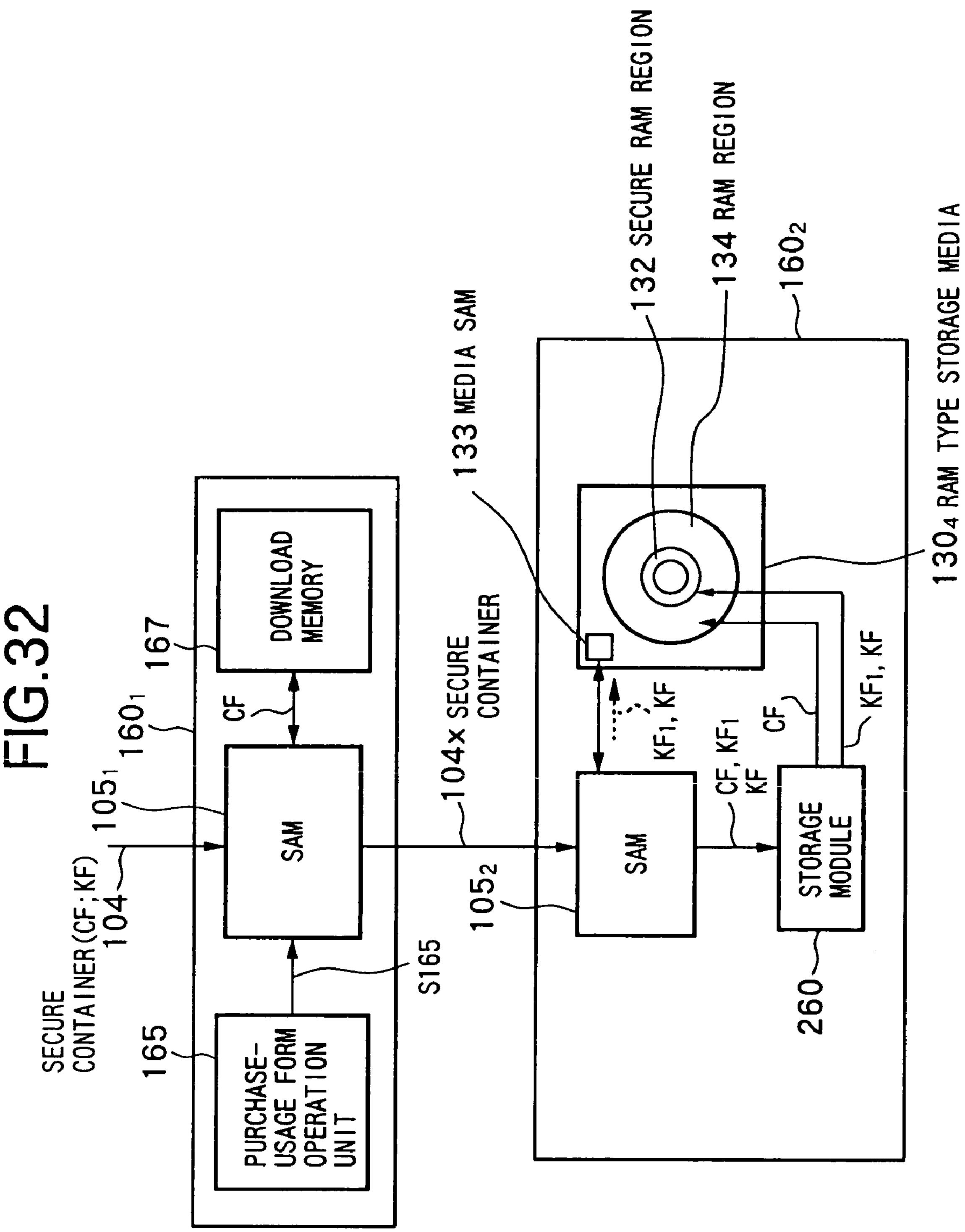
FIG. 32 is a view for explaining the flow of processing in a transferring side SAM in a case where the content file which is downloaded on a download memory of the network apparatus shown in FIG. 25 and with a purchase form already determined therefor is transferred to the SAM of an AV apparatus.
Figure 33:
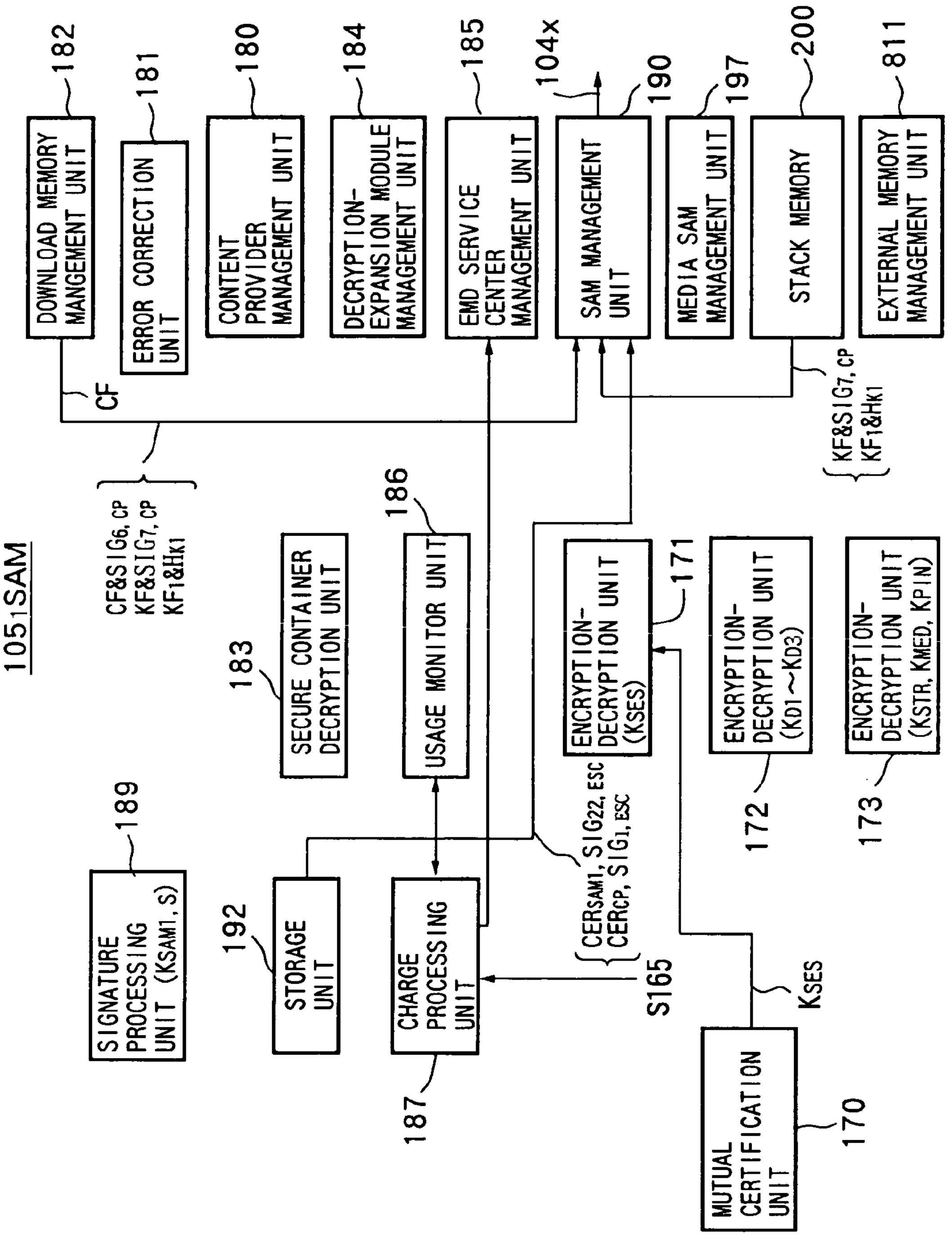
FIG. 33 is a view of the flow of the data in the transferring side SAM in the case shown in FIG. 32, FIGS. 34A to 34D are views for explaining the format of the secure container for which the purchase form is determined.

Next, as shown in FIG. 32, the flow of the processing in the SAM $\mathbf{105}_1$ in a case where for example, after the purchase form of the content file CF downloaded on the download memory 167 of the network apparatus $\mathbf{160}_1$ is determined as mentioned above, a new secure container 104*x* storing the related content file CF is produced, and the secure container 104*x* is transferred via the bus 191 to the SAM $\mathbf{105}_2$ of the AV apparatus $\mathbf{160}_2$ will be explained by referring to FIG. 33.

The user operates the purchase and/or usage form determination operation unit 165 and instructs the transfer of the predetermined content stored in the download memory 167 to the AV apparatus $\mathbf{160}_2$, and the operation signal S165 in accordance with the related operation is output to the charge processing unit 187.

By this, the charge processing unit 187 updates the usage log data 108 stored in the external memory 201 based on the operation signal S165.

Also, the charge processing unit 187 transmits the usage control status data 166 indicating the related determined purchase form via the EMD service center management unit 185 to the EMD service center 102 whenever the purchase form of the content data is determined.

Also, the download memory management unit 182 outputs the content file CF and the signature data $SIG_{6,CP}$ thereof shown in FIG. 5A, the key file KF and the signature data $SIG_{7,CP}$ thereof, and the key file $KF_1$ and the hash value $H_{K1}$ thereof read out from the download memory 167 to the SAM management unit 190. At this time, the mutual certification between the mutual certification unit 170 of the SAM $\mathbf{105}_1$ and the media SAM 167*a* and the encryption and/or decryption by the session key data $K_{SES}$ are carried out.

Also, the signature processing unit 189 obtains the hash value of the content file CF, produces signature data $SIG_{41,n}$ by using the secret key data $K_{SAM1,S}$, and outputs this to the SAM management unit 190.

Also, the signature processing unit 189 obtains the hash value of the key file $KF_1$, produces signature data $SIG_{42,SAM1}$ by using the secret key data $K_{SAM1,S}$ and outputs this to the SAM management unit 190.

Also, the SAM management unit 190 reads out the certificate data $CER_{CP}$ and the signature data $SIG_{1,ESC}$ thereof and the certificate data $CER_{SAM1}$ and the signature data $SIG_{22,ESC}$ thereof shown in FIG. 34D from the storage unit 192.

Also, the mutual certification unit 170 outputs the session key data $K_{SES}$ obtained by performing the mutual certification with the SAM $\mathbf{105}_2$ to the encryption and/or decryption unit 171.

The SAM management unit 190 produces a new secure container 104*x* comprised of the data shown in FIGS. 34A, 34B, 34C, and 34D, encrypts the secure container 104*x* in the encryption and/or decryption unit 171 by using the session key data $K_{SES}$, and then outputs the same to the SAM $\mathbf{105}_2$ of the AV apparatus $\mathbf{160}_2$ shown in FIG. 32.

At this time, in parallel to the mutual certification between the SAM $\mathbf{105}_1$ and the SAM $\mathbf{105}_2$, mutual certification of the bus 191 serving as the IEEE1394 serial bus is carried out.

Below, as shown in FIG. 32, the flow of the processing in the SAM $\mathbf{105}_2$ when writing the secure container 104*x* input from the SAM $\mathbf{105}_1$ into the storage medium $\mathbf{130}_4$ of a RAM type or the like will be explained by referring to FIG. 35.

Here, the RAM type storage medium $\mathbf{130}_4$ has for example an unsecure RAM region 134, a media SAM 133, and a secure RAM region 132.

Figure 35:
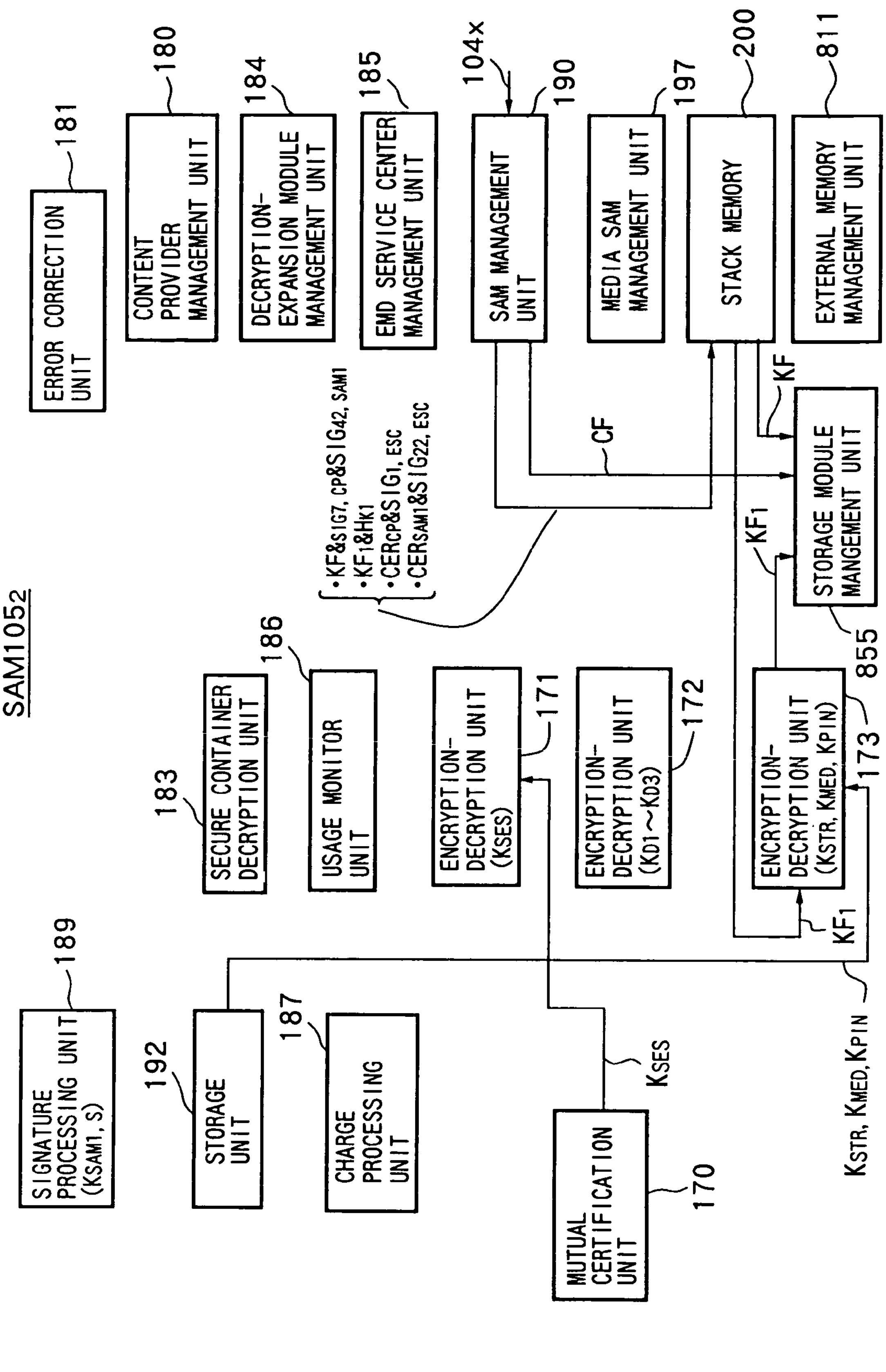
FIG. 35 is a view of the flow of the data when writing the input content file etc. in a RAM type or ROM type storage medium in the transferring side SAM in the case shown in FIG. 32.

In this case, the SAM management unit 190 of the SAM $\mathbf{105}_2$ receives as input the secure container 104*x* from the SAM $\mathbf{105}_1$ of the network apparatus $\mathbf{160}_1$ as shown in FIG. 32 and FIG. 35.

Then, in the encryption and/or decryption unit 171, the secure container 104*x* input via the SAM management unit 190 is decrypted by using the session key data $K_{SES}$ obtained by the mutual certification between the mutual certification unit 170 and the mutual certification unit 170 of the SAM $\mathbf{105}_i$.

Next, in the signature processing unit 189, the legitimacy of the signature data $SIG_{6,CP}$ is verified by using the public key data $K_{CP,P}$, and the legitimacy of the producer of the content file CF is confirmed. Also, in the signature processing unit 189, the legitimacy of the signature data $SIG_{41,SAM1}$ is verified by using the public key data $K_{SAM1,P}$, and the legitimacy of the transmitter of the content file CF is confirmed.

Then, after it is confirmed that the producer and the transmitter of the content file CF are legitimate, the content file CF is output from the SAM management unit 190 to a storage module management unit 855, and the content file CF is written into the RAM region 134 of the RAM type storage medium $\mathbf{130}_4$ shown in FIG. 32.

Also, the key file KF and the signature data $SIG_{7,CP}$ and $SIG_{42,SAM1}$ thereof, the key file $KF_1$ and the hash value $K_{K1}$ thereof, the certificate data $CER_{CP}$ and the signature data $SIG_{1,ESC}$ thereof, and the certificate data $CER_{SAM1}$ and the signature data $SIG_{22,ESC}$ thereof decrypted by using the session key data $K_{SES}$ are written into the stack memory 200.

Next, the signature processing unit 189 verifies the signature data $SIG_{22,ESC}$ read out from the stack memory 200 by using the public key data $K_{ESC,P}$ read out from the storage unit 192 and confirms the legitimacy of the certificate data $CER_{SAM1}$.

Then, the signature processing unit 189 verifies the legitimacy of the signature data $SIG_{42,SAM1}$ stored in the stack memory 200 by using the public key data $K_{SAM1,P}$ stored in the certificate data $CER_{SAM1}$ when confirming the legitimacy of the certificate data $CER_{SAM1}$. Then, when it is verified that the signature data $SIG_{42,SAM1}$ is legitimate, the legitimacy of the key file KF is confirmed.

Also, the signature processing unit 189 verifies the signature data $SIG_{1,ESC}$ read out from the stack memory 200 by using the public key data $K_{ESC,P}$ read out from the storage unit 192 and confirms the legitimacy of the certificate data $CER_{CP}$.

Then, the signature processing unit 189 verifies the legitimacy of the signature data $SIG_{7,SAM1}$ stored in the stack memory 200 by using the public key data $K_{CP,P}$ stored in the certificate data $CER_{CP}$ when confirming the legitimacy of the certificate data $CER_{CP}$. Then, when it is verified that the signature data $SIG_{7,SAM1}$ is legitimate, the legitimacy of the producer of the key file KF is confirmed.

When it is confirmed that the producer and the transmitter of the key file KF are legitimate, the key file KF is read out from the stack memory 200 and written into the secure RAM region 132 of the RAM type storage medium $\mathbf{130}_4$ shown in FIG. 34 via the storage module management unit 855.

Also, the signature processing unit 189 verifies the legitimacy of the hash value $H_{K1}$ by using the public key data $K_{SAM1,P}$ and confirms the legitimacy of the producer and transmitter of the key file $KF_1$.

Then, when the legitimacy of the producer and the transmitter of the key file $KF_1$ is confirmed, the key file $KF_1$ shown in FIG. 34C is read out from the stack memory 200 and output to the encryption and/or decryption unit 173.

Note that, in the related example, the case where the producer and the transmitter of the key file $KF_1$ were the same was mentioned, but where the producer and the transmitter of the key file $KF_1$ are different, the signature data of the producer and the signature data of the transmitter are produced with respect to the key file $KF_1$, and the legitimacy of the both signature data is verified in the signature processing unit 189.

Then, the encryption and/or decryption unit 173 encrypts the content key data Kc and the usage control status data 166 in the key file $KF_1$ by sequentially using the storage use key data $K_{STR}$, media key data $K_{MED}$, and the purchaser key data $K_{PIN}$ read out from the storage unit 192 and outputs the same to the storage module management unit 855.

Then, by the storage module management unit 855, the encrypted key file $KF_1$ is stored in the secure RAM region 132 of the RAM type storage medium $\mathbf{130}_4$.

Note that, the media key data $K_{MED}$ is stored in the storage unit 192 in advance by the mutual certification between the mutual certification unit 170 shown in FIG. 33 and the media SAM 133 of the RAM type storage medium $\mathbf{130}_4$ shown in FIG. 32.

Here, the storage use key data $K_{STR}$ is data determined in accordance with the type of apparatus (AV apparatus $\mathbf{160}_2$ in the related example) of for example the SACD (Super Audio Compact Disc), DVD (Digital Versatile Disc) apparatus, CD-R apparatus, and MD (Mini Disc) apparatus and is used for establishing one-to-one correspondence between the types of the apparatuses and the types of the storage media. Note that, the physical structures of the disc media are the same between SACD and DVD, so there is a case where the recording and/or reproduction of the storage medium of an SACD can be carried out by using a DVD apparatus. The storage use key data $K_{STR}$ performs the function of preventing illegitimate copies in such a case.

Note that, in the present embodiment, it is also possible not to encrypt using the storage use key data $K_{STR}$.

Also, the media key data $K_{MED}$ is data unique to the storage medium (RAM type storage medium $\mathbf{130}_4$ in the related example).

The media key data $K_{MED}$ is stored in the storage medium (RAM type storage medium $\mathbf{130}_4$ shown in FIG. 32 in the related example). It is preferred from the viewpoint of the security that encryption and the decryption using the media key data $K_{MED}$ be carried out in the media SAM of the storage medium. At this time, the media key data $K_{MED}$ is stored in the related media SAM where the media SAM is mounted in the storage medium, while is stored in for example a region out of management of the host CPU 810 in the RAM region where the media SAM is not mounted in the storage medium.

Note that, it is also possible to perform the mutual certification between the apparatus side SAM (SAM $\mathbf{105}_2$ in the related example) and the media SAM (media SAM 133 in the related example), transfer the media key data $K_{MED}$ via the secure communication route to the apparatus side SAM, and perform the encryption and decryption using the media key data $K_{MED}$ in the apparatus side SAM as in the present embodiment.

In the present embodiment, the storage use key data $K_{STR}$ and the media key data $K_{MED}$ are used for protecting the security of the level of the physical layer of the storage medium.

Also, the purchaser key data $K_{PIN}$ is data indicating the purchaser of the content file CF and is allocated by the EMD service center 102 to the related purchased user when for example the content is purchased by outright purchase. The purchaser key data $K_{PIN}$ is managed in the EMD service center 102.

Also, in the above embodiment, the case where the key files KF and $KF_1$ were stored in the secure RAM region 132 of the RAM type storage medium $\mathbf{130}_4$ by using the storage module 260 was exemplified, but as indicated by a dotted line in FIG. 32, it is also possible to store the key files KF and $KF_1$ in the media SAM 133 from the SAM $\mathbf{105}_2$.

Next, the flow of the processing when determining the purchase form in the AV apparatus $\mathbf{160}_2$ where the user home network 303 is distributed the ROM type storage medium $\mathbf{130}_1$ shown in FIG. 12 with the purchase form of the content undetermined therefor off-line will be explained by referring to FIG. 36 and FIG. 37.

Figure 37:
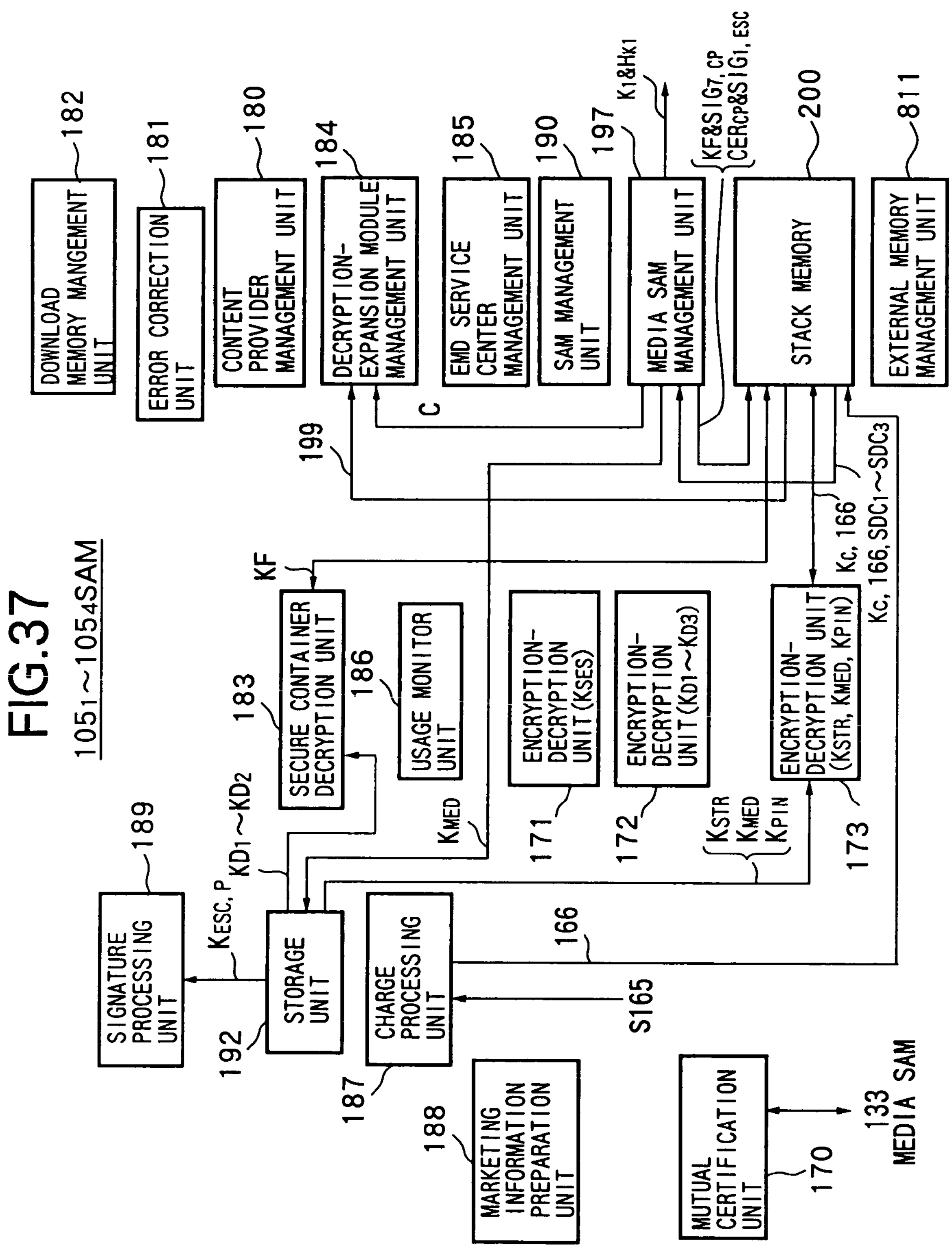
FIG. 37 is a view of the flow of the data in the SAM in the case shown in FIG. 36.

The SAM $\mathbf{105}_2$ of the AV apparatus $\mathbf{160}_2$ first performs the mutual certification between the mutual certification unit 170 shown in FIG. 37 and the media SAM 133 of the ROM type storage medium $\mathbf{130}_1$ shown in FIG. 12, and then receives as input the media key data $K_{MED}$ from the media SAM 133.

Note that, where the SAM $\mathbf{105}_2$ holds the media key data $K_{MED}$ in advance, it is also possible if the related input is not carried out.

Next, the key file KF and the signature data $SIG_{7,CP}$ thereof and the certificate data $CER_{CP}$ and the signature data $SIG_{1,ESC}$ thereof shown in FIGS. 5B and 5C stored in the secure container 104 stored in the secure RAM region 132 of the ROM type storage medium $\mathbf{130}_1$ are input via the media SAM management unit 197 or not illustrated read out module management unit and are written into the stack memory 200.

Next, in the signature processing unit 189, after the legitimacy of the signature data $SIG_{1,ESC}$ is confirmed, the public key data $K_{CP,P}$ is extracted from the certificate data $CER_{CP}$, and by using this public key data $K_{CP,P}$, the legitimacy of the signature data $SIG_{7,CP}$, that is, the legitimacy of the transmitter of the key file KF is verified.

Also, in the signature processing unit 189, by using the public key data $K_{ESC,P}$ read out from the storage unit 192, the legitimacy of the signature data $SIG_{K1,ESC}$ stored in the key file KF, that is, the legitimacy of the producer of the key file KF, is verified.

When the legitimacy of the signature data $SIG_{7,CP}$ and $SIG_{K1,ESC}$ is confirmed in the signature processing unit 189, the key file KF is read out from the stack memory 200 to the secure container decryption unit 183.

Next, in the secure container decryption unit 183, by using the distribution use data $KD_1$ to $KD_3$ of the corresponding period, the content key data Kc, usage control policy data 106, and the SAM program download containers $SDC_1$ to $SDC_3$ stored in the key file KF are decrypted and are written into the stack memory 200.

Figure 36:
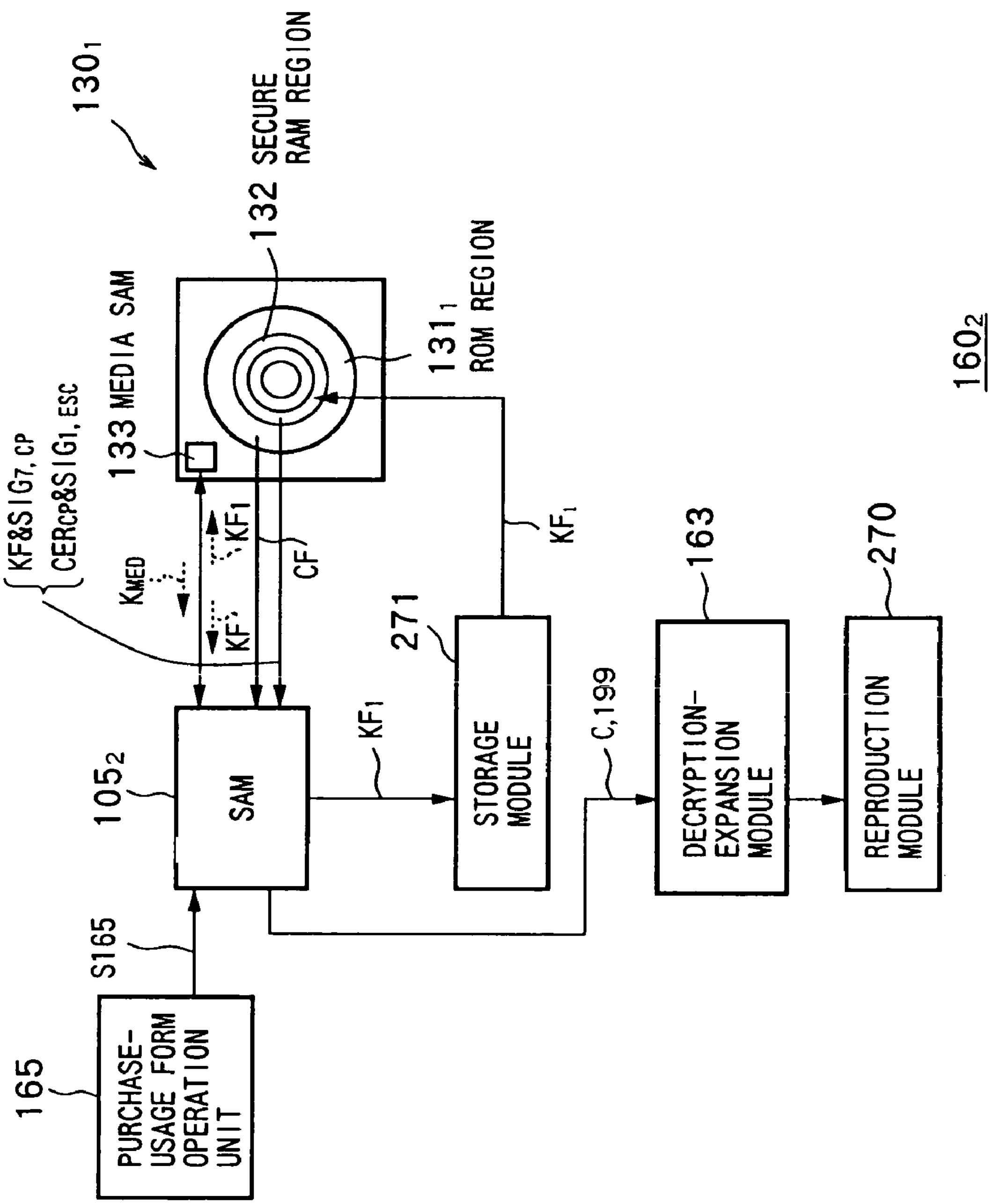
FIG. 36 is a view for explaining the flow of processing when determining the purchase form in an AV apparatus in a case where the user home network is receives the ROM type storage medium shown in FIG. 7 for which the purchase form of the content has not been determined off-line.

Next, after the mutual certification between the mutual certification unit 170 shown in FIG. 37 and the decryption and/or expansion module 163 shown in FIG. 36, the decryption and/or expansion module management unit 184 of the SAM $105_2$ outputs the content key data Kc stored in the stack memory 200 and the half disclosure parameter data 199 stored in the usage control policy data 106 and the content data C stored in the content file CF read out from the ROM region 131 of the ROM type storage medium $130_1$ to the decryption and/or expansion module 163 shown in FIG. 36. Next, in the decryption and/or expansion module 163, the content data C is decrypted in the half disclosure mode by using the content key data Kc and then expanded and output to a reproduction module 270. Then, in the reproduction module 270, the content data C from the decryption and/or expansion module 163 is reproduced.

Next, the purchase form of the content is determined by the purchase operation of the purchase form determination operation unit 165 shown in FIG. 36 by the user, and the operation signal S165 indicating the related determined purchase form is input to the charge processing unit 187.

Next, the charge processing unit 187 produces the usage control status data 166 in response to the operation signal S165 and writes this into the stack memory 200.

Next, the content key data Kc and the usage control status data 166 are output from the stack memory 200 to the encryption and/or decryption unit 173.

Next, the encryption and/or decryption unit 173 sequentially encrypts the content key data Kc and the usage control status data 166 input from the stack memory 200 by using the storage use key data $K_{STR}$, the media key data $K_{MED}$, and the purchaser key data $K_{PIN}$ read out from the storage unit 192 and writes them into the stack memory 200.

Next, in the media SAM management unit 197, the key file $KF_1$ shown in FIG. 34C is produced by using the encrypted content key data Kc, the usage control status data 166 and the SAM program download containers $SDC_1$ to $SDC_3$ read out from the stack memory 200.

Also, in the signature processing unit 189, the hash value $H_n$ of the key file $KF_1$ shown in Fig. Figure C is produced, and the related hash value $H_n$ is output to the media SAM management unit 197.

Next, after the mutual certification between the mutual certification unit 170 shown in FIG. 37 and the media SAM 133 shown in FIG. 36, the media SAM management unit 197 writes the key file $KF_1$ and the hash value $H_{K1}$ into the secure RAM region 132 of the ROM type storage medium $130_1$ via a storage module 271 shown in FIG. 36.

By this, the ROM type storage medium $130_1$ with the purchase form determined therefor is obtained.

At this time, the usage control status data 166 and the usage log data 108 produced by the charge processing unit 187 are read out from the stack memory 200 and the external memory 201 at the predetermined timing and transmitted to the EMD service center 102.

Note that, where the key file KF is stored in the media SAM 133 of the ROM type storage medium $130_1$, as indicated by the dotted line in FIG. 36, the SAM $105_2$ receives as input the key file KF from the media SAM 133. Also, in this case, the SAM $105_2$ writes the produced key file $KF_1$ into the media SAM 133.

Figure 38:
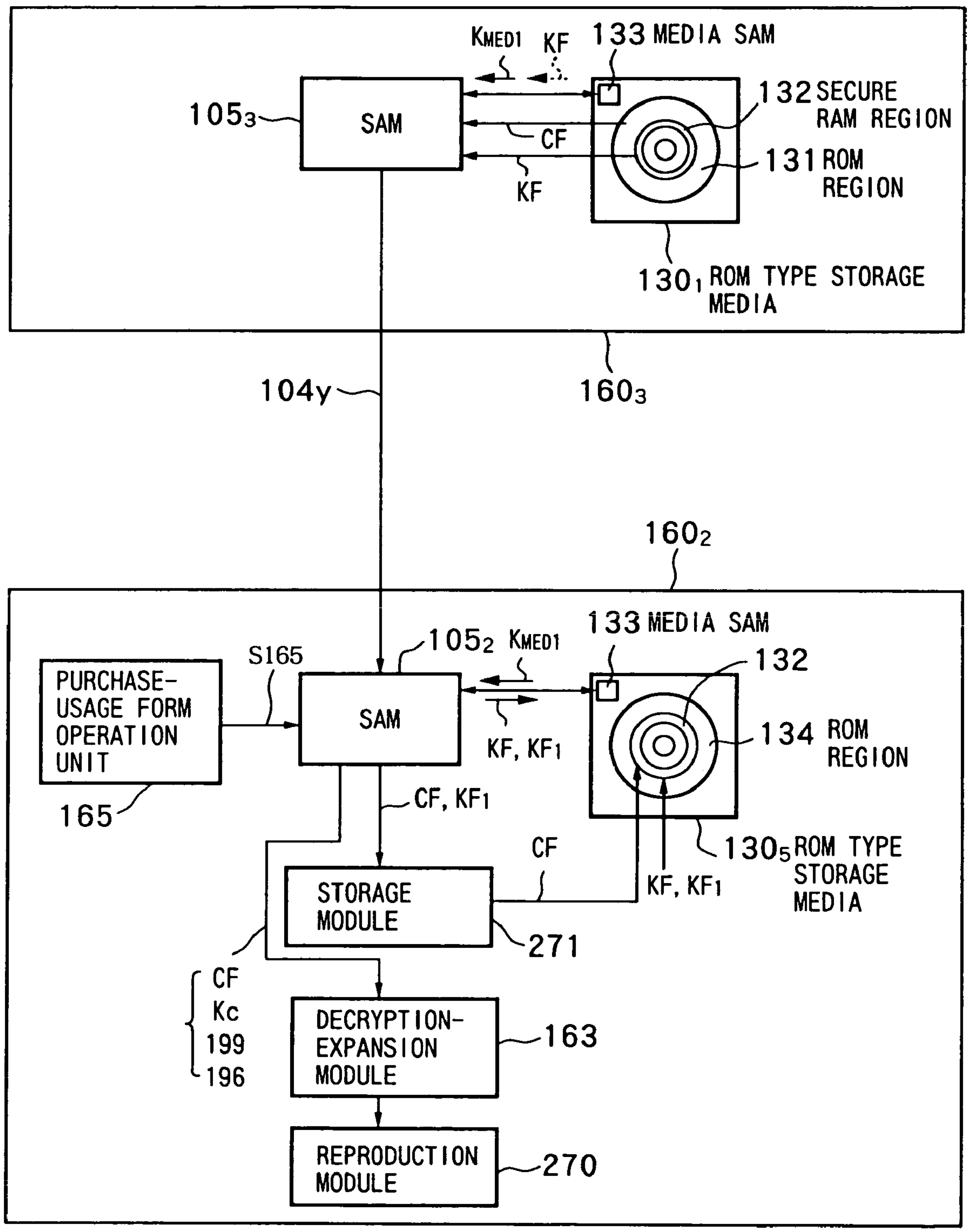
FIG. 38 is a view for explaining the flow of processing when reading the secure container from the ROM type storage medium with the purchase form not yet determined in the AV apparatus in the user home network, transferring this to another AV apparatus, and writing the same in a RAM type storage medium.

Below, as shown in FIG. 38, the flow of the processing when the secure container 104 is read out from the ROM type storage medium $130_1$ with the purchase form undetermined therefor in the AV apparatus $160_3$ to produce a new secure container 104*y*, this is transferred to the AV apparatus $160_2$, the purchase form is determined in the AV apparatus $160_2$, and this is written into a RAM type storage medium $130_5$ will be explained by referring to FIG. 39 and FIG. 40.'

Note that, the transfer of the secure container 104 from the ROM type storage medium $130_1$ to the RAM type storage medium $130_5$ can be carried out between the network apparatus $160_1$ shown in FIG. 1 and any of the AV apparatuses $160_1$ to $160_4$ shown in FIG. 1.

First, mutual certification is carried out between the SAM $105_3$ of the AV apparatus $160_3$ and the media SAM 133 of the ROM type storage medium $130_1$, and media key data $K_{MED1}$ of the ROM type storage medium $130_1$ is transferred to the SAM $105_3$.

Also, mutual certification is carried out between the SAM $105_2$ of the AV apparatus $160_2$ and the media SAM 133 of the RAM type storage medium $130_5$, and media key data $K_{MED2}$ of the RAM type storage medium $130_5$ is transferred to the SAM $105_2$.

Note that, where encryption using the media key data $K_{MED1}$ and $K_{MED2}$ is carried out in the media SAM 133 and the media SAM 133, the transfer of the media key data $K_{MED1}$ and $K_{MED2}$ is not carried out.

Figure 39:
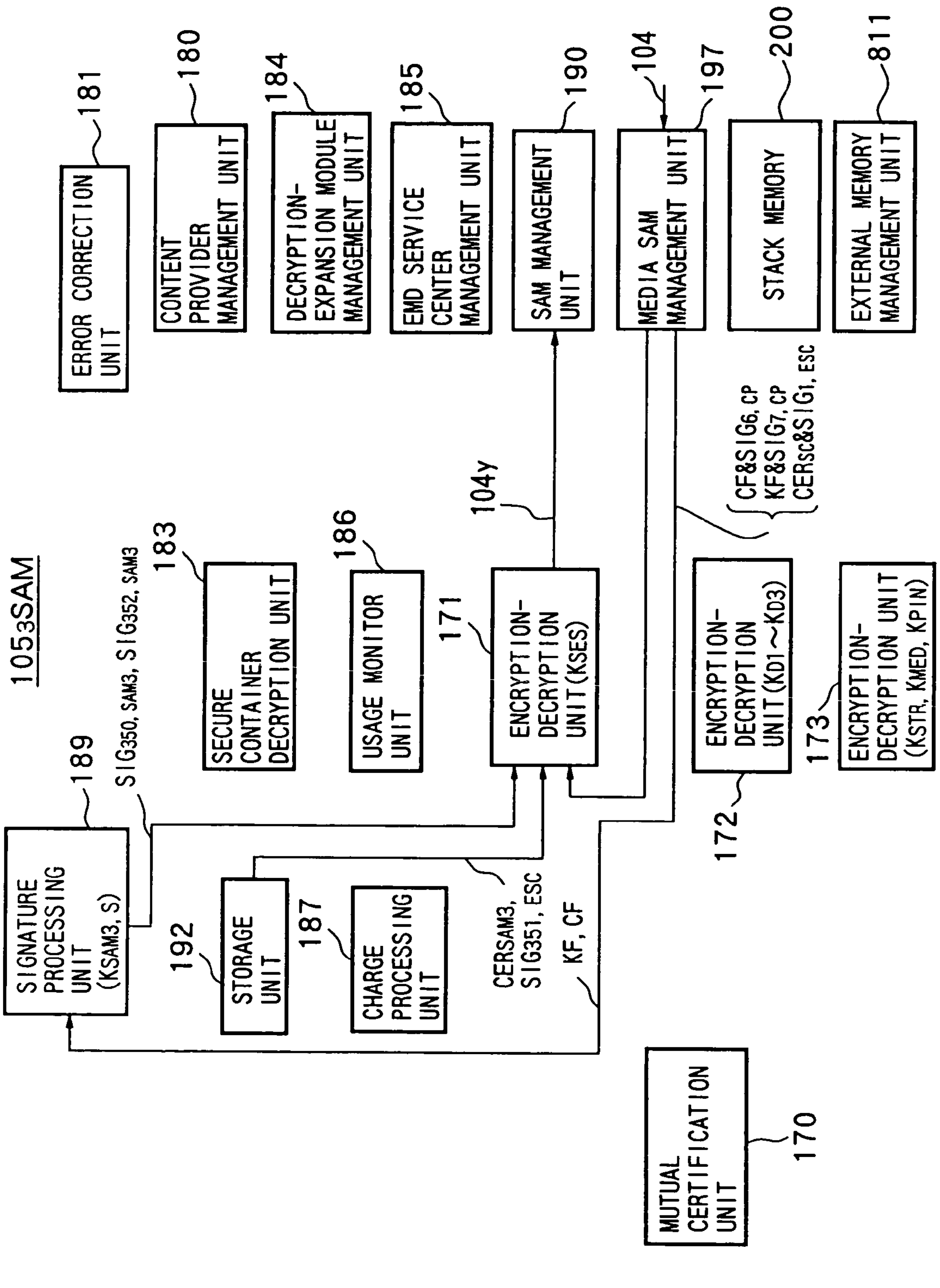
FIG. 39 is a view of the flow of the data in the transferring side SAM in the case shown in FIG. 38, FIGS. 40A to 40C are views for explaining the format of the secure container transferred from the transferring side SAM to a transferred side SAM in FIG. 38.

Next, the SAM $105_3$ outputs the content file CF and the signature data $SIG_{6,CP}$ thereof shown in FIG. 5A read out from the ROM region 131 of the ROM type storage medium $130_1$, the key file KF and the signature data $SIG_{7,CP}$ thereof shown in FIGS. 5B and 5C read out from the secure RAM region 132, and the certificate data $CER_{CP}$ and the signature data $SIG_{1,ESC}$ thereof to the encryption and/or decryption unit 171 via the media SAM management unit 197 or not illustrated read out module management unit as shown in FIG. 39.

Also, the content file CF and the key file KF are output from the media SAM management unit 197 to the signature processing unit 189.

Then, in the signature processing unit 189, the hash values of the content file CF and the key file KF are obtained, signature data $SIG_{350,SAM3}$ and $SIG_{352,SAM3}$ are produced by using secret key data $K_{SAM3,S}$, and they are output to the encryption and/or decryption unit 171.

Also, the certificate data $CER_{SAM3}$ and the signature data $SIG_{351,ESC}$ thereof are read out from the storage unit 192 and output to the encryption and/or decryption unit 171.

Figures 40A, 40B, 40C:
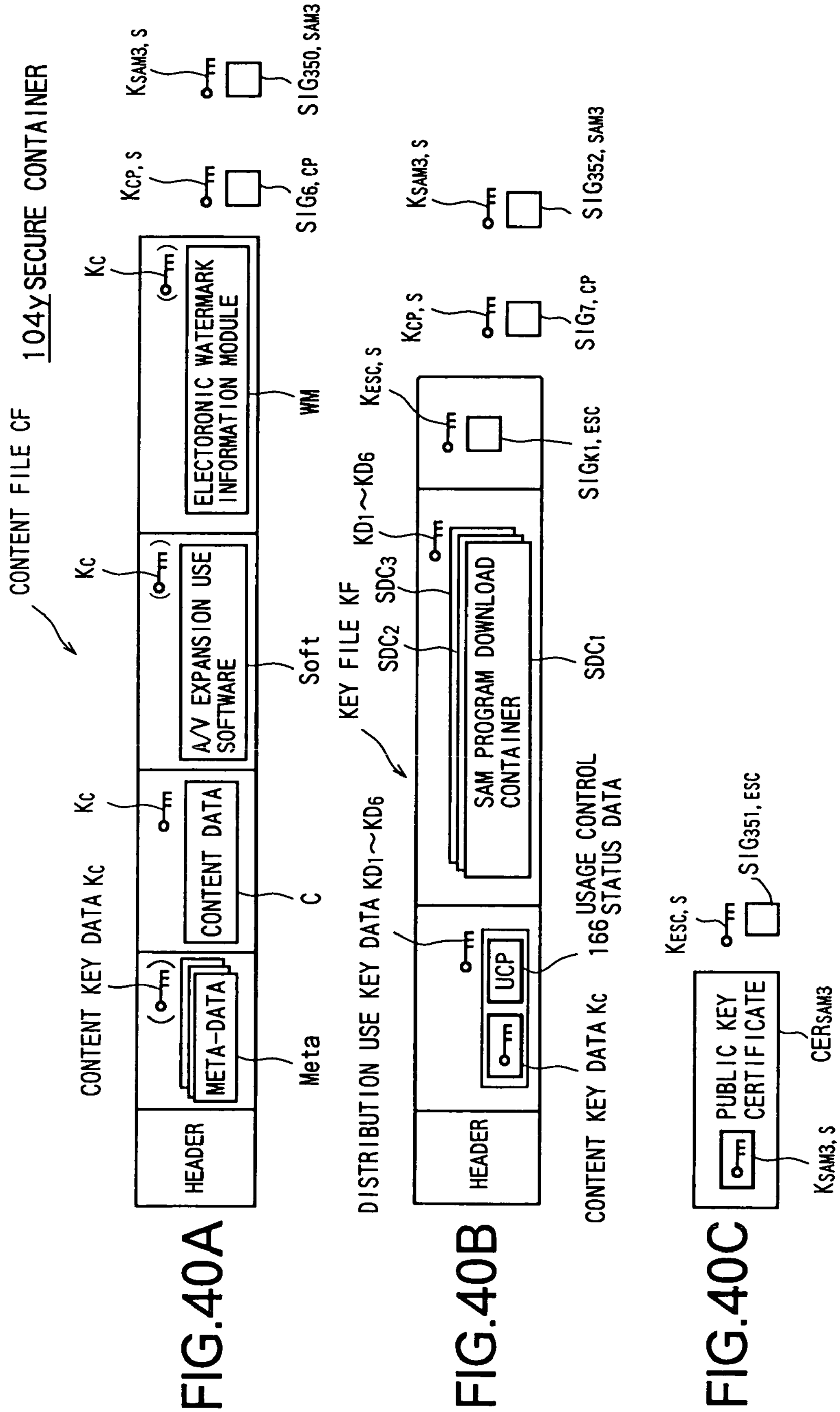

Then, the secure container 104*y* shown in FIG. 40 is encrypted by using the session key data $K_{SES}$ obtained by mutual certification between the SAM $105_3$ and $105_2$ in the encryption and/or decryption unit 171 and then output via the SAM management unit 190 to the SAM $105_2$ of the AV apparatus $160_1$.

Figure 41:
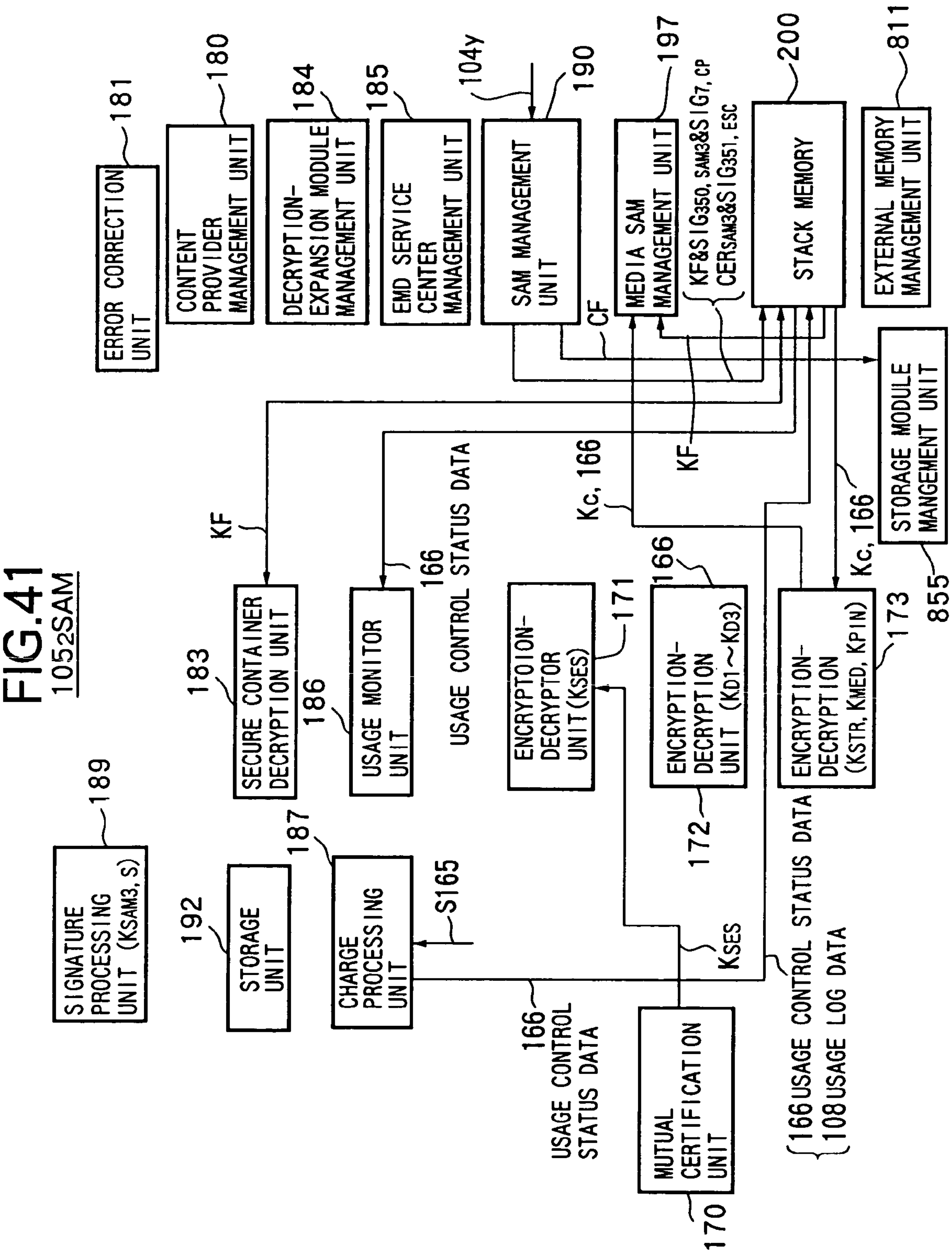
FIG. 41 is a view of the flow of data in the transferred side SAM in the case shown in FIG. 38, FIGS. 42A to 42F are views for explaining the format of the data transmitted and received among the content provider shown in FIG. 1, EMD service center, and SAM by an In-band method, and an out-of-band method.

In the SAM $105_2$, as shown in FIG. 41, the secure container 104*y* shown in FIG. 40 input from the SAM $105_3$ via the SAM management unit 190 is decrypted in the encryption and/or decryption unit 171 by using the session key data $K_{SEC}$, and then the legitimacy of the signature data $SIG_{6,CP}$ and $SIG_{350,SAM3}$ stored in the secure container 104*y*, that is, the legitimacy of the producer and the transmitter of the content file CF is confirmed.

Then, after it is confirmed that the producer and the transmitter of the content file CF are legitimate, the content file CF is written into the RAM region 134 of the RAM type storage medium $130_5$ via the media SAM management unit 197.

Also, after the key file KF and the signature data $SIG_{7,CP}$ and $SIG_{350,SAM3}$ thereof and certificate data $CER_{SAM3}$ and the signature data $SIG_{351,ESC}$ thereof input from the SAM $105_3$ via the SAM management unit 190 are written into the stack memory 200, they are decrypted in the encryption and/or decryption unit 171 by using the session key data $K_{SES}$.

Next, the related decrypted signature data $SIG_{351,ESC}$ is verified in the signature processing unit 189. When the legitimacy of the certificate data $CER_{SAM3}$ is confirmed, by using the public key data stored in the certificate data $CER_{SAM3}$, the legitimacy of the signature data $SIG_{7,CP}$ and $SIG_{352,SAM3}$, that is, the legitimacy of the producer and the transmitter of the key file KF is confirmed.

Then, when the legitimacy of the producer and the transmitter of the key file KF is confirmed, the key file KF is read out from the stack memory 200 and output to the secure container decryption unit 183.

Next, the secure container decryption unit 183 decrypts the key file KF by using the distribution use data $KD_1$ to $KD_3$ of the corresponding period and writes the related decrypted key file KF into the stack memory 200.

Next, the usage control policy data 106 stored in the already decrypted key file KF stored in the stack memory 200 is output to the usage monitor unit 186. The usage monitor unit 186 manages the purchase form and usage form of the content based on the usage control policy data 106.

Next, for example, when the demo mode is selected by the user, the content data C of the content file CF already decrypted by the session key data $K_{SES}$, the content key data Kc stored in the stack memory 200, the half disclosure parameter data 199 obtained from the usage control policy data 106, and the user watermark use data 196 are output via the decryption and/or expansion module management unit 184 shown in FIG. 38 to the reproduction module 270 after passing through mutual certification. Then, in the reproduction module 270, the reproduction of the content data C corresponding to the demo mode is carried out.

Next, the purchase and/or usage form of the content is determined by the operation of the purchase and/or usage form determination operation unit 165 shown in FIG. 38 by the user, and the operation signal S165 in accordance with the related determination is output to the charge processing unit 187.

Then, in the charge processing unit 187, the usage control status data 166 and the usage log data 108 are produced in accordance with the determined purchase and/or usage form and are written into the stack memory 200 and the external memory 201.

Next, the content key data Kc and the usage control status data 166 are read out from the stack memory 200 to the encryption and/or decryption unit 173, sequentially encrypted in the encryption and/or decryption unit 173 by using the storage use key data $K_{STR}$, media key data $K_{MED2}$, and the purchaser key data $K_{PIN}$ read out from the storage unit 192, and output to the storage module management unit 855. Then, for example, in the storage module management unit 855, the key file $KF_1$ shown in FIG. 34C is produced, and the key file $KF_1$ is written into the media SAM 133 of the RAM type storage medium $\mathbf{130}_5$ via the media SAM management unit 197.

Also, the content file CF stored in the secure container 104*y* is written into the RAM region 134 of the RAM type storage medium $\mathbf{130}_5$ by the storage module management unit 855.

Also, the usage control status data 166 and the usage log data 108 are transmitted to the EMD service center 102 at the predetermined timing.

Below, an explanation will be made of the method of realization of the SAMs $\mathbf{105}_1$ to $\mathbf{105}_4$.

Where the functions of the SAMs $\mathbf{105}_1$ to $\mathbf{105}_4$ are realized as hardware, by using an ASIC type CPU including a memory, data having a high degree of secrecy such as a security functional module for realizing the functions shown in FIG. 26, program module for performing the rights clearing of the content, and the key data are stored in that memory. One series of rights clearing use program modules such as an encryption library module (public key code, common key code, random number generator, hash function), program module for the usage control of the content, and the program module of the charge processing are mounted as for example software.

For example, a module such as the encryption and/or decryption unit 171 shown in FIG. 26 is mounted as an IP core in the ASIC type CPU as hardware due to the problem of for example processing speed. Depending on the clock speed or performance of the CPU code system etc., it is also possible to mount the encryption and/or decryption unit 171 as software.

Also, as the storage unit 192 shown in FIG. 26, the program module for realizing the functions shown in FIG. 26, and the memory for storing the data, use is made of for example a nonvolatile memory (flash-ROM), while as the working memory, a high speed writable memory such as an SRAM is used. Note that, other than them, as the memory included in the SAMs $\mathbf{105}_1$ to $\mathbf{105}_4$, it is also possible to use a ferroelectric memory (FeRAM).

Also, in the SAMs $\mathbf{105}_1$ to $\mathbf{105}_4$, other than the above, a clock function used for the verification of the date in the expiration date and the contract period etc. for the usage of the content is included.

As mentioned above, the SAMs $\mathbf{105}_1$ to $\mathbf{105}_4$ have tamper resistance sheltering the program module, data, and the processing content from the outside. In order to prevent the program and content of data having high secrecy stored in the memory inside the IC of the related SAM and values of the register group related to the system configuration of the SAM and the encryption library and the register group of the clock from being read out and newly written via the bus of the host CPU of the apparatuses with the SAMs $\mathbf{105}_1$ to $\mathbf{105}_4$ mounted thereon, that is, in order to prevent the host CPU of the mounted apparatus from not existing in the allocated address space, an address space not seen from the host CPU on the mounted apparatus side is set up in the related SAM by using an MMU (memory management unit) for managing the memory space on the CPU side.

Also, the SAMs $\mathbf{105}_1$ to $\mathbf{105}_4$ have structures durable against physical attack from the outside such as X-rays or heat and further have structures such that, even if real-time debugging (reverse engineering) using a debug use tool (hardware ICE or software ICE) or the like is carried out, the processing content thereof cannot be seen or the debug use tool per se cannot be used after the manufacture of the IC.

The SAMs $\mathbf{105}_1$ to $\mathbf{105}_4$ per se are usual ASIC type CPUs including memories in the hardware structure. Their functions depend on the software for operating the related CPU, but are different from the general ASIC type CPU in the point that they have a hardware structure of the encryption function and tamper resistance.

Where all of the functions of the SAMs $\mathbf{105}_1$ to $\mathbf{105}_4$ are realized by software, there are cases where the software processing is carried out by enclosing the same inside a module having the tamper resistance and cases where they are achieved by software processing on the host CPU mounted on the usual set and steps are taken so that decipherment becomes impossible at only the related processing. The former is the same as the case where an encryption library module is stored in the memory as not the IP core, but the usual software module, and can be considered similar to the case where the functions are realized as the hardware. On the other hand, the latter is referred to as tamper resistant software. Even if the execution situation is deciphered by the ICE (debugger), the execution sequence of the tasks is scattered (in this case, tasks are divided so that the a divided task has a meaning as a program, that is, no influence will be exerted upon the lines before and after that), and the tasks per se are encrypted, so one type of secure processing can be realized similar to a task scheduler (MiniOS). The related task scheduler is buried in the target program.

Next, an explanation will be made of the decryption and/or expansion module 163 shown in FIG. 25.

As shown in FIG. 25, the decryption and/or expansion module 163 has the mutual certification unit 220, decryption unit 221, decryption unit 222, expansion unit 223, electronic watermark information processing unit 224, and the half disclosure processing unit 225.

The mutual certification unit 220 performs the mutual certification with the mutual certification unit 170 shown in FIG. 32 when the decryption and/or expansion module 163 receives as its input the data from the SAM $105_1$ and produces the session key data $K_{SES}$.

The decryption unit 221 decrypts the content key data Kc, half disclosure parameter data 199, user watermark use data 196, and the content data C input from the SAM $105_1$ by using the session key data $K_{SES}$. Then, the decryption unit 221 outputs the decrypted content key data Kc and the content data C to the decryption unit 222, outputs the decrypted user watermark use data 196 to the electronic watermark information processing unit 224, and outputs the half disclosure parameter data 199 to the half disclosure processing unit 225.

The decryption unit 222 decrypts the content data C in the half disclosure mode by using the content key data Kc under the control from the half disclosure processing unit 225 and outputs the decrypted content data C to the expansion unit 223.

The expansion unit 223 expands the decrypted content data C and outputs the same to the electronic watermark information processing unit 224.

The expansion unit 223 performs the expansion processing by using the A/V expansion use software stored* in the content file CF shown in FIG. 5A and performs the expansion processing by for example the ATRAC3 method.

The electronic watermark information processing unit 224 buries the user watermark in accordance with decrypted user watermark use data 196 in the decrypted content data C and produces new content data C. The electronic watermark information processing unit 224 outputs the related new content data C to the reproduction module 169.

In this way, the user watermark is buried at the decryption and/or expansion module 163 when reproducing the content data C.

Note that, in the present invention, it is also possible if the user watermark use data 196 is not buried in the content data C.

The half disclosure processing unit 225 instructs the blocks not to be decrypted and the blocks to be decrypted in for example the content data C to the decryption unit 222 based on the half disclosure parameter data 199.

Also, the half disclosure processing unit 225 performs the control such as limiting the reproduction function at the time of a demo or the demo period based on the half disclosure parameter data 199.

The reproduction module 169 performs the reproduction in accordance with the decrypted and expanded content data C.

Next, an explanation will be made of the data format when transmitting and receiving data with the signature data produced by using the secret key data attached thereto and the certificate data among the content provider 101, EMD service center 102, and the user home network 103.

FIG. 42A is a view for explaining the data format where the data Data is transmitted from the content provider 101 to the SAM $105_1$ by the in-band method.

In this case, a module $Mod_{50}$ encrypted by the session key data $K_{SES}$ obtained by the mutual certification between the content provider 101 and the SAM $105_1$ is transmitted from the content provider 101 to the SAM $105_1$.

In the module $Mod_{50}$, a module $Mod_{51}$ and the signature data $SIG_{CP}$ by the secret key data $K_{CP,S}$ thereof are stored.

In the module $Mod_{51}$, the certificate data $CER_{CP}$ storing the secret key data $K_{CP,P}$ of the content provider 101, the signature data $SIG_{ESC}$ based on the secret key data $K_{ESC,S}$ with respect to the certificate data $CER_{CP}$, and the data Data to be transmitted are stored.

In this way, by transmitting the module $Mod_{50}$ storing the certificate data $CER_{CP}$ from the content provider 101 to the SAM $105_1$, when verifying the signature data $SIG_c$, at the SAM $105_1$, it becomes unnecessary to transmit the certificate data $CER_{CP}$ from the EMD service center 102 to the SAM $105_1$.

FIGS. 42B and 42C are views for explaining the data format where the data Data is transmitted from the content provider 101 to the SAM $105_1$ by the out-of-band method.

In this case, a module $Mod_{52}$ shown in FIG. 42B encrypted by the session key data $K_{SES}$ obtained by the mutual certification between the content provider 101 and the SAM $105_1$ is transmitted from the content provider 101 to the SAM $105_1$.

In the module $Mod_{52}$, the data Data to be transmitted and the signature data $SIG_{CP}$ by the secret key data $K_{CP,S}$ thereof are stored.

Further, a module $Mod_{53}$ shown in FIG. 42C encrypted by the session key data $K_{SES}$ obtained by the mutual certification between the EMD service center 102 and the SAM $105_1$ is transmitted from the EMD service center 102 to the SAM $105_1$.

In the module $Mod_{53}$, the certificate data $CER_{CP}$ of the content provider 101 and the signature data $SIG_{ESC}$ by the secret key data $K_{ESC,S}$ thereof are stored.

FIG. 42D is a view for explaining the data format of the case where the data Data is transmitted from the SAM $105_1$ to the content provider 101 by the in-band method.

In this case, a module $Mod_{54}$ encrypted by the session key data $K_{SES}$ obtained by the mutual certification between the content provider 101 and the SAM $105_1$ is transmitted from the SAM $105_1$ to the content provider 101.

In the module $Mod_{54}$, a module $Mod_{55}$ and the signature data $SIG_{SAM1}$ by the secret key data $K_{SAM1,S}$ thereof are stored.

In the module $Mod_{55}$, the certificate data $CER_{SAM1}$ storing the secret key data $K_{SAM1,P}$ of the SAM $105_1$, the signature data $SIG_{ESC}$ by the secret key data $K_{ESC,S}$ with respect to the certificate data $CER_{SAM1}$, and the data Data to be transmitted are stored.

In this way, by transmitting the module $Mod_{55}$ storing the certificate data $CER_{SAM1}$ from the SAM $105_1$ to the content provider 101, when verifying the signature data $SIG_{SAM1}$ in the content provider 101, it becomes unnecessary to transmit the certificate data $CER_{SAM1}$ from the EMD service center 102 to the content provider 101.

FIGS. 42E and 42F are views for explaining the data format where the data Data is transmitted from the SAM $105_1$ to the content provider 101 by the out-of-band method.

In this case, a module $Mod_{56}$ shown in FIG. 42E encrypted by the session key data $K_{SES}$ obtained by the mutual certification between the content provider 101 and the SAM $105_1$ is transmitted from the SAM $105_1$ to the content provider 101.

In the module $Mod_{56}$, the data Data to be transmitted and the signature data $SIG_{SAM1}$ by the secret key data $K_{SAM1,S}$ thereof are stored.

Also, from the EMD service center 102 to the content provider 101, a module $Mod_{57}$ shown in FIG. 42F encrypted by session key data $K_{SES}$ obtained by the mutual certification between the EMD service center 102 and the content provider 101 is transmitted.

In the module $Mod_{57}$, the certificate data $CER_{SAM1}$ of the SAM 105$_1$ and the signature data $SIG_{ESC}$ by the secret key data $K_{ESC,S}$ thereof are stored.

FIG. 43G is a view for explaining the data format where the data Data is transmitted from the content provider 101 to the EMD service center 102 by the in-band method.

In this case, a module $Mod_{58}$ encrypted by the session key data $K_{SES}$ obtained by the mutual certification between the content provider 101 and the EMD service center 102 is transmitted from the content provider 101 to the EMD service center 102.

In the module $Mod_{58}$, a module $Mod_{59}$ and the signature data $SIG_{CP}$ by the secret key data $K_{CP,S}$ thereof are stored.

In the module $Mod_{59}$, the certificate data $CER_{CP}$ storing the secret key data $K_{CP,P}$ of the content provider 101, the signature data $SIG_{ESC}$ by the secret key data $K_{ESC,S}$ with respect to the certificate data $CER_{CP}$, and the data Data to be transmitted are stored.

FIG. 43H is a view for explaining the data format of the case where the data Data is transmitted from the content provider 101 to the EMD service center 102 by the out-of-band method.

In this case, from the content provider 101 to the EMD service center 102, a module $Mod_{60}$ shown in FIG. 43H encrypted by the session key data $K_{SES}$ obtained by the mutual certification between the content provider 101 and the EMD service center 102 is transmitted.

In the module $Mod_{60}$, the data Data to be transmitted and the signature data $SIG_{CP}$ by the secret key data $K_{CP,S}$ thereof are stored.

At this time, the certificate data $CER_{CP}$ of the content provider 101 has been already registered in the EMD service center 102.

FIG. 43I is a view for explaining the data format where the data Data is transmitted from the SAM 105$_1$ to the EMD service center 102 by the in-band method.

In this case, a module $Mod_{61}$ encrypted by the session key data $K_{SES}$ obtained by the mutual certification between the EMD service center 102 and the SAM 105$_1$ is transmitted from the SAM 105$_1$ to the EMD service center 102.

In the module $Mod_{61}$, a module $Mod_{62}$ and the signature data $SIG_{SAM1}$ by the secret key data $K_{SAM1,S}$ thereof are stored.

In the module $Mod_{62}$, the certificate data $CER_{SAM1}$ storing the secret key data $K_{SAM1,P}$ of the SAM 105$_1$, the signature data $SIG_{ESC}$ by the secret key data $K_{ESC,S}$ with respect to the certificate data $CER_{SAM1}$, and the data Data to be transmitted are stored.

FIG. 43J is a view for explaining the data format where the data Data is transmitted from the SAM 105$_1$ to the EMD service center 102 by the out-of-band method.

In this case, a module $Mod_{63}$ shown in FIG. 43J encrypted by the session key data $K_{SES}$ obtained by the mutual certification between the EMD service center 102 and the SAM 105$_1$ is transmitted from the SAM 105$_1$ to the EMD service center 102.

In the module $Mod_{63}$, the data Data to be transmitted and the signature data $SIG_{SAM1}$ by the secret key data $K_{SAM1,S}$ thereof are stored.

At this time, in the EMD service center 102, the certificate data $CER_{SAM1}$ of the SAM 105$_1$ has been already registered.

Below, an explanation will be made of the registration processing in the EMD service center 102 at the time of shipment of the SAMs 105$_1$ to 105$_4$.

Note that, the registration processings of the SAMs 105$_1$ to 105$_4$ are the same, so the registration processing of the SAM 105$_1$ will be mentioned below.

At the time of shipment of the SAM 105$_1$, by the key server 141 of the EMD service center 102 shown in FIG. 24, the key data shown below is initially registered in the storage unit 192 shown in FIG. 26 etc. via the SAM management unit 149.

Further, in the SAM 105$_1$, for example, at the time of shipment, the program etc. used when accessing the EMD service center 102 by the SAM 105$_1$ the first time are stored in the storage unit 192 etc.

Namely, in the storage unit 192, for example, the identifier SAM_ID of the SAM 105$_1$ given an "*" at the left side in FIG. 30, storage use key data $K_{STR}$, public key data $K_{R-CA}$, of the route certificate authority 2, public key data $K_{ESC,P}$ of the EMD service center 102, secret key data $K_{SAM1,S}$ of the SAM 105$_1$, certificate data $CER_{SAM1}$ and the signature data $SIG_{22,ESC}$ thereof, and the original key data for creating the certification use key data between the decryption and/or expansion module 163 and the media SAM are stored by the initial registration.

Note that, it is also possible to transmit the certificate data $CER_{SAM1}$ from the EMD service center 102 to the SAM 105$_1$ when registering the same after the time of shipment of the SAM 105$_1$.

Also, in the storage unit 192, at the time of shipment of the SAM 105$_1$, a file reader indicating the reading format of the content file CF and the key file KF shown in FIG. 5 is written by the EMD service center 102.

In the SAM 105$_1$, when utilizing the data stored in the content file CF and the key file KF, the file reader stored in the storage unit 192 is used.

Here, the public key data $K_{R-CA}$ of the route certificate authority 2 uses an RSA generally used in electronic commercial transactions over the Internet and has a data length of for example 1024 bits. The public key data $K_{R-CA}$ is issued by the route certificate authority 2 shown in FIG. 1.

Also, the public key data $K_{ESC,P}$ of the EMD service center 102 is produced by utilizing an elliptical curve code having a short data length and a power equivalent to the RSA or more. Its data length is for example 160 bits. Note, when considering the power of the encryption, desirably the public key data $K_{ESC,P}$ has 192 bits or more. Further, the EMD service center 102 registers the public key data $K_{ESC,P}$ in the route certificate authority 92.

Also, the route certificate authority 92 produces the certificate data $CER_{ESC}$ of the public key data $K_{ESC,P}$. The certificate data $CER_{ESC}$ storing the public key data $K_{ESC,P}$ is preferably stored in the storage unit 192 at the time of shipment of the SAM 105$_1$. In this case, the certificate data $CER_{ESC}$ is signed by a secret key data $K_{ROOT,S}$ of the route certificate authority 92.

The EMD service center 102 produces the secret key data $K_{SAM1,S}$ of the SAM 105$_1$ by generating a random number and produces the public key data $K_{SAM1,P}$ forming a pair together with this.

Also, the EMD service center 102 is given the certification of the route certificate authority 92, issues the certificate data $CER_{SAM1}$ of the public key data $K_{SAM1,P}$, and attaches the signature data to this by using its own secret key data $K_{ESC,S}$. Namely, the EMD service center 102 achieves the function of a second CA (certificate authority).

Also, the unique identifier SAM_ID under the management of the EMD service center 102 is allocated to the SAM 105$_1$ by the SAM management unit 149 of the EMD service center 102 shown in FIG. 24. This is stored in the storage unit

192 of the SAM $105_1$ and, at the same time, stored also in the SAM database 149*a* shown in FIG. 24 and managed by the EMD service center 102.

Also, the SAM $105_1$ is connected to and registered at the EMD service center 102 by for example the user after the time of shipment. At the same time, the distribution use public key data $KD_1$ to $KD_3$ are transferred from the EMD service center 102 to the storage unit 192.

Namely, the user utilizing the SAM $105_1$ must perform a registration procedure at the EMD service center 102 before downloading the content. This registration procedure is carried out off-line by for example mail by the user himself giving information specifying himself by using for example a registration card attached when purchasing the apparatus with the SAM $105_1$ mounted thereon (in the related example, network apparatus 1600.

The SAM $105_1$ cannot be used until the registration procedure is passed.

The EMD service center 102 issues the identifier USER_ID inherent to the user in accordance with the registration procedure of the SAM $105_1$ by the user, manages the correspondence between the SAM_ID and the USER_ID in for example the SAM database 149*a* shown in FIG. 24, and utilizes the same at the time of charging.

Also, the EMD service center 102 allocates the information reference use identifier ID and the password used at the first time to the user of the SAM $105_1$ and notifies this to the user. The user can make an inquiry about information for example the usage situation (usage log) of the content data up to the present at the EMD service center 102 by using the information reference use identifier ID and the password.

Also, the EMD service center 102 confirms the identity of the user at the credit card company or the like or confirms the user off-line at the time of registration of the user.

Next, as shown in FIG. 30, an explanation will be made of the procedure for storing the SAM registration list in the storage unit 192 inside the SAM $105_1$.

The SAM $105_1$ shown in FIG. 1 acquires the SAM registration list of the SAMs $105_1$ to $105_4$ existing in its own system by utilizing a topology map produced when powering up apparatuses connected to the bus 191 and connecting new apparatuses to the bus 191 where for example the IEEE1394 serial bus is used as the bus 191.

Figure 44:
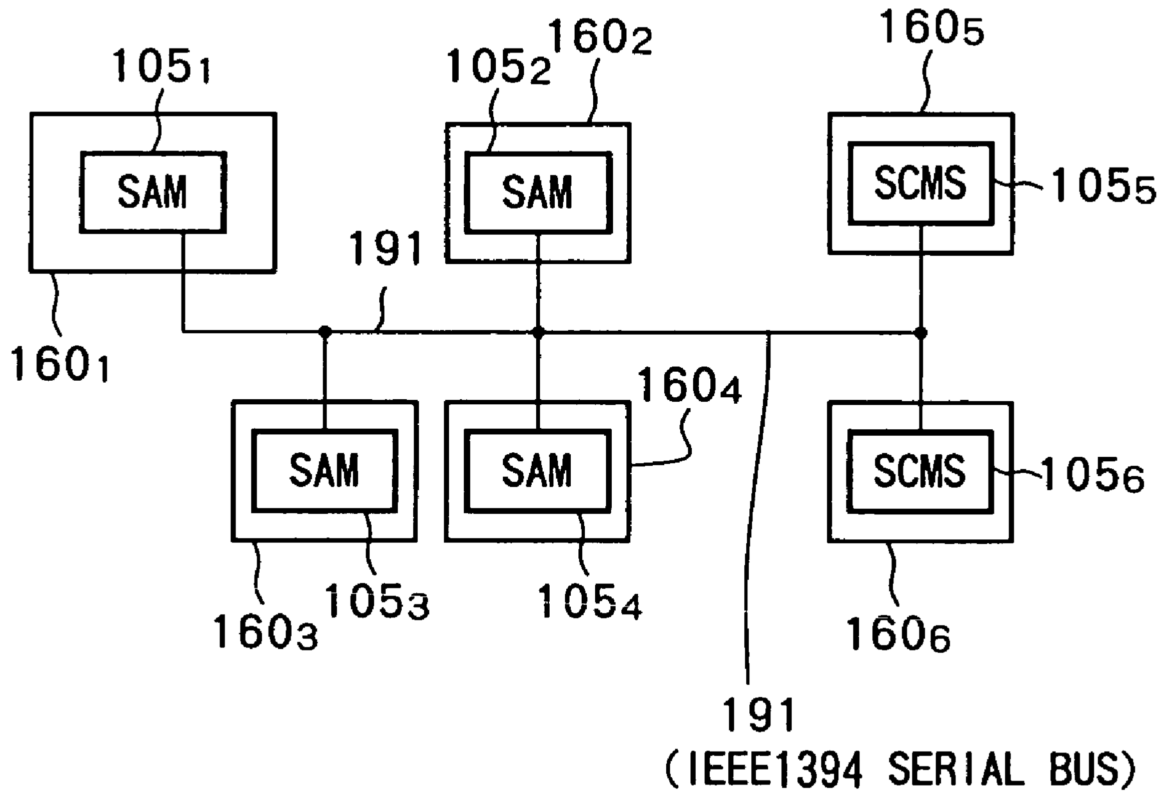
FIG. 44 is a view for explaining an example of a connection configuration of apparatuses to buses in the user home network.

Note that, the topology map produced in accordance with the IEEE1394 serial bus, that is, the bus 191, is produced for the SAMs $105_1$ to $105_4$ and SCMS processing circuits $105_5$ and $105_6$ when, for example, as shown in FIG. 44, in addition to the SAMs $105_1$ to $105_4$, SCMS processing circuits $105_5$ and $105_6$ of AV apparatus $160_5$ and $160_6$ are connected to the bus 191.

Figure 45:
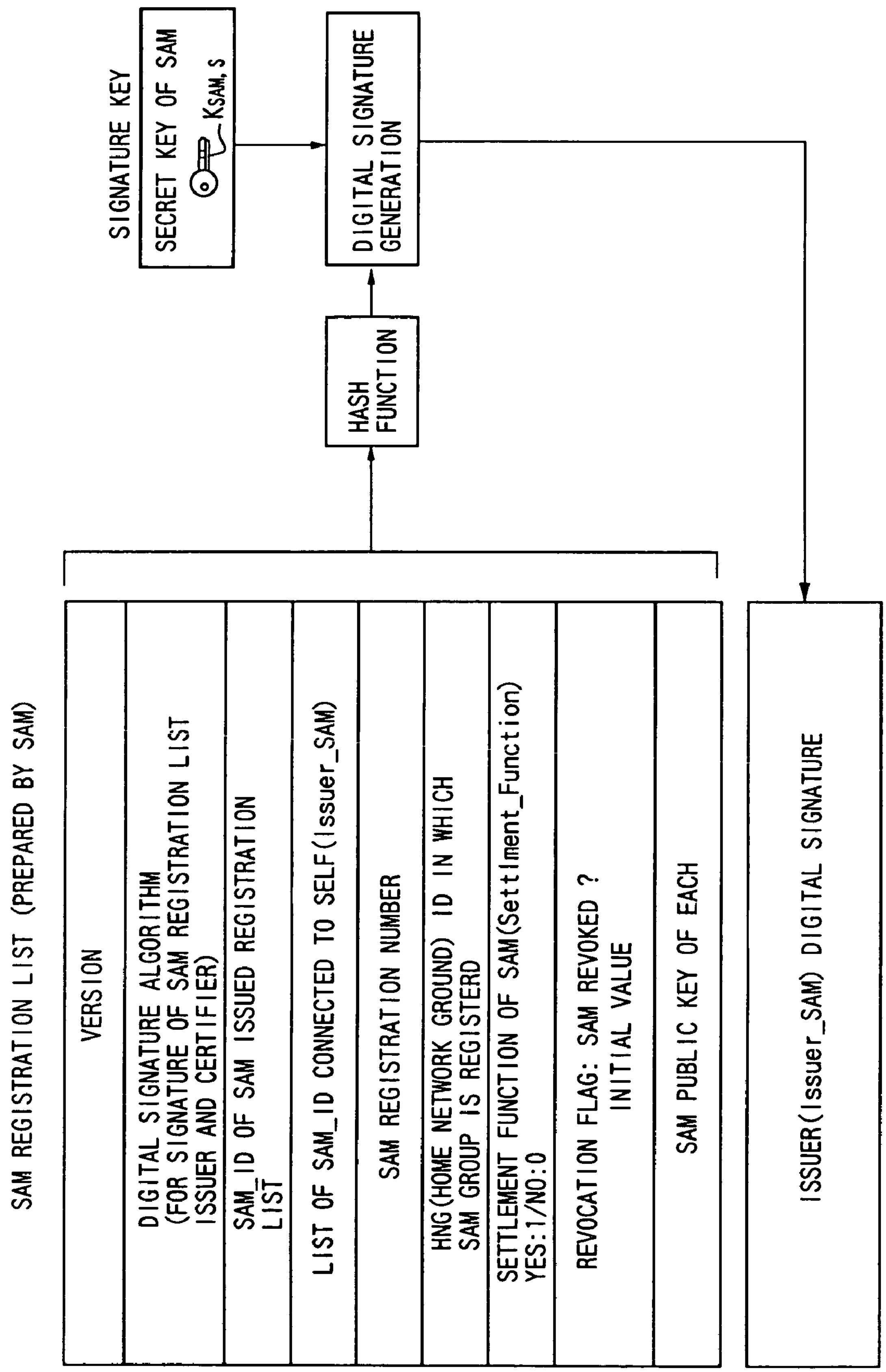
FIG. 45 is a view for explaining the data format of a SAM registration list produced by a SAM.

Accordingly, the SAM $105_1$ extracts the information for the SAMs $105_1$ to $105_4$ from the related topology map and produces the SAM registration list shown in FIG. 45.

Then, the SAM $105_1$ registers the SAM registration list shown in FIG. 45 in the EMD service center 102 and acquires the signature.

These processings are automatically carried out by the SAM $105_1$ by utilizing the session of the bus 191. The registration instruction of the SAM registration list is issued to the EMD service center 102.

The EMD service center 102 confirms the expiration date when receiving the SAM registration list shown in FIG. 45 from the SAM $105_1$. Then, the EMD service center 102 sets up the corresponding portion by referring to the existence of the settlement function designated by the SAM $105_1$ at the time of registration. Further, the EMD service center 102 checks the revocation list and sets a revocation flag in the SAM registration list. The revocation list is the list of the SAMs for which usage is prohibited (invalid) by the EMD service center 102 for the reason of for example illegitimate usage.

Also, the EMD service center 102 extracts the SAM registration list corresponding to the SAM $105_1$ at the time of settlement and confirms if the SAM described therein is contained in the revocation list. Further, the EMD service center 102 attaches the signature to the SAM registration list.

Figure 46:
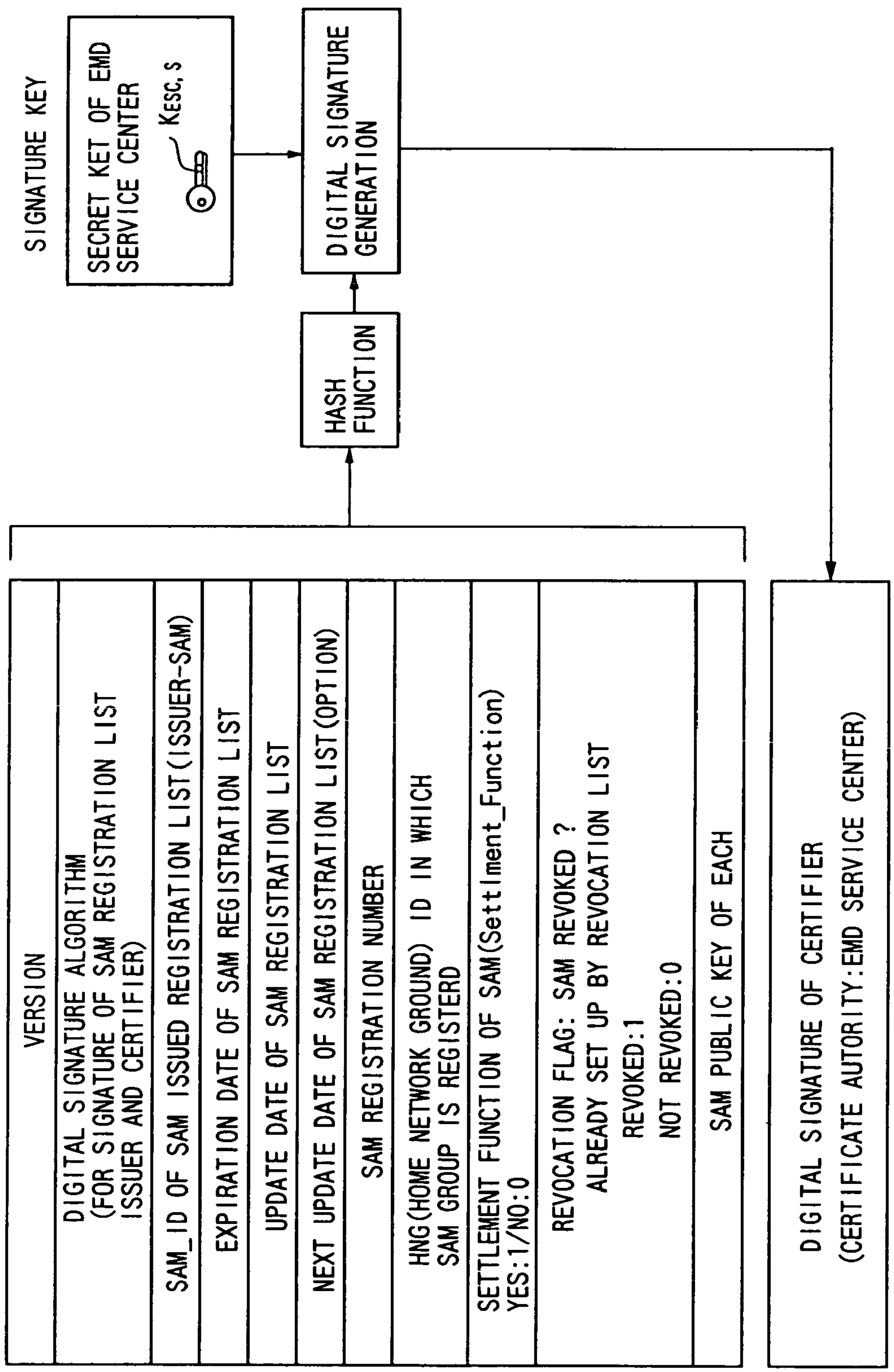
FIG. 46 is a view for explaining the data format of the SAM registration list produced by the EMD service center.

By this, the SAM registration list shown in FIG. 46 is produced.

Note that, the SAM revocation list is produced aimed at only the SAMs of the identical system (connected to the identical bus 191), and the validity and invalidity of the related SAMs are indicated by the revocation flag corresponding to each SAM.

Below, an explanation will be made of the overall operation of the content provider 101 shown in FIG. 1.

Figure 47:
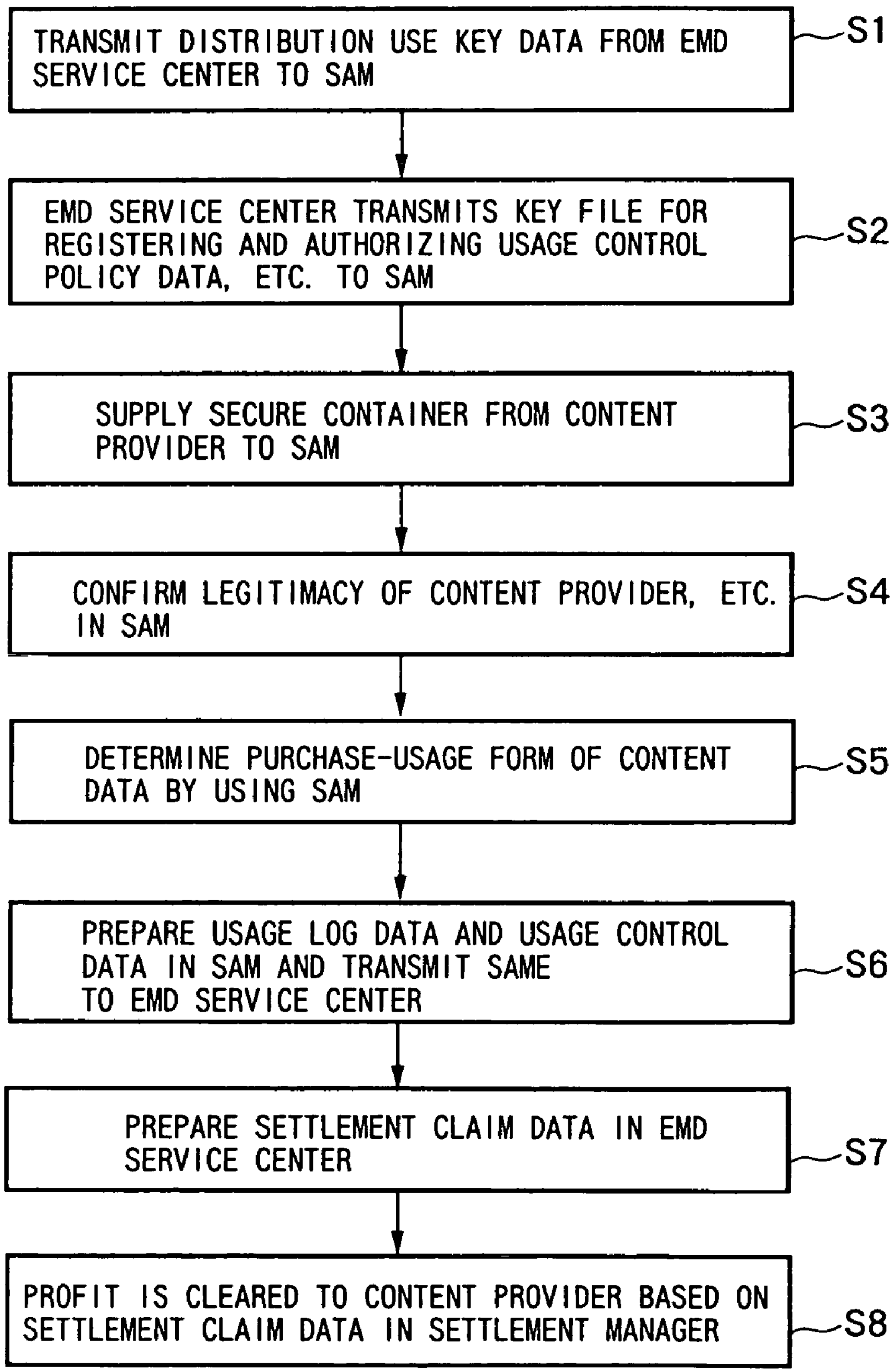
FIG. 47 is a flowchart of the overall operation of the content provider shown in FIG. 1.

FIG. 47 is a flowchart of the overall operation of the content provider 101.

Step S1: The EMD service center 102 transmits the certificate data $CER_{CP}$ of the public key data $K_{CP}$ of the content provider 101 to the content provider 101 after the content provider 101 goes through the predetermined registration processing.

Also, the EMD service center 102 transmits the certificate $CER_{CP1}$ to $CER_{CP4}$ of the public key data $K_{SAM1,P}$ to $K_{SAM4,P}$ of the SAMs $105_1$ to $105_4$ to the SAMs $105_1$ to $105_4$ after the SAMs $105_1$ to $105_4$ pass through the predetermined registration processing.

Also, the EMD service center 102 transmits three months worth of the distribution use key data $KD_1$ to $KD_3$ each having the expiration date of one month to the SAMs $105_1$ to $105_4$ of the user home network 103 after the mutual certification.

In this way, in the EMD system 100, the distribution use key data $KD_1$ to $KD_3$ are distributed to the SAMs $105_1$ to $105_4$ in advance. Therefore, even in the state where the space between the SAMs $105_1$ to $105_4$ and the EMD service center 102 is off-line, the secure container 104 distributed from the content provider 101 can be decrypted and purchased and used in the SAMs $105_1$ to $105_4$. In this case, the log of the related purchase and/or usage is described in the usage log data 108, and the usage log data 108 is automatically transmitted to the EMD service center 102 when the SAMs $105_1$ to $105_4$ and the EMD service center 102 are connected. Therefore, the settlement processing in the EMD service center 102 can be reliably carried out. Note that, a SAM for which usage log data 108 cannot be collected by the EMD service center 102 in a predetermined period is regarded as being invalidated by the revocation list.

Note that, the usage control status data 166 is transmitted from the SAMs $105_1$ to $105_4$ to the EMD service center 102 in real-time in principle.

Step S2: The content provider 101 transmits the right registration request module $Mod_2$ shown in FIG. 18 to the EMD service center 102 after the mutual certification.

Then, the EMD service center 102 registers and authenticates the usage control policy data 106 and the content key data Kc after the predetermined signature verification.

Also, the EMD service center 102 produces six months worth of the key files KF in accordance with the registration use module $Mod_2$ and transmits them to the content provider 101.

Step S3: The content provider 101 produces the content files CF and the signature data $SIG_{6,CP}$ thereof and the key file KF and the signature data $SIG_{7,CP}$ thereof shown in FIGS. 5A and 5B and distributes the secure container 104 storing them and the certificate data $CER_{CP}$ and the signature data $SIG_{1,ESC}$ thereof shown in FIG. 5C to the SAMs $105_1$ to $105_4$ of the user home network 103 on-line and/or off-line.

In the on-line case, the content provider use transport protocol is used. The secure container 104 is transported from the content provider 101 to the user home network 103 in a form not depending upon the related protocol (namely, as data transmitted by using a predetermined layer of communication protocol comprised of a plurality of layers). Also, in the off-line case, the secure container 104 is transported from the content provider 101 to the user home network 103 in the state stored in a ROM type or RAM type storage medium.

Step S4: The SAMs $105_1$ to SAM $105_4$ of the user home network 103 verify the signature data $SIG_{6,CP}$, $SIG_{7,CP}$, and $SIG_{K1,ESC}$ in the secure container 104 distributed from the content provider 101 and confirm the legitimacy of the producer and transmitter of the content file CF and the key file KF, then decrypt the key file KF by using the distribution use data $KD_1$ to $KD_6$ of the corresponding period.

Step S5: In the SAMs $105_1$ to $105_4$, the purchase and/or usage form is determined based on the operation signal 5165 in accordance with the operation of the purchase and/or usage form determination operation unit 165 shown in FIG. 25 by the user.

At this time, in the usage monitor unit 186 shown in FIG. 31, the purchase and/or usage form of the content file CF by the user is managed based on the usage control policy data 106 stored in the secure container 104.

Step S6: In the charge processing unit 187 shown in FIG. 31 of the SAMs $105_1$ to $105_4$, the usage log data 108 and the usage control status data 166 describing the operation of the settlement of the purchase and/or usage form by the user are produced based on the operation signal S165 and are transmitted to the EMD service center 102.

Step S7: The EMD service center 102 performs the settlement processing based on the usage log data 108 in the settlement processing unit 142 shown in FIG. 24 and produces the settlement claim data 152 and the settlement report data 107. The EMD service center 102 transmits the settlement claim data 152 and the signature data $SIG_{88}$ thereof via the payment gateway 90 shown in FIG. 1 to the settlement manager 91. Further, the EMD service center 102 transmits the settlement report data 107 to the content provider 101.

Step S8: In the settlement manager 91, after verifying the signature data $SIG_{88}$, based on the settlement claim data 152, the money paid by the user is distributed to the owner of the content provider 101.

As explained above, in the EMD system 100, the secure container 104 of the format shown in FIG. 5 is distributed from the content provider 101 to the user home network 103, and the processing for the key file KF in the secure container 104 is carried out in the SAMs $105_1$ to $105_4$.

Also, the content key data Kc and the usage control policy data 106 stored in the key file KF have been encrypted by using the distribution use key data $KD_1$ to $KD_3$ and decrypted inside only the SAMs $105_1$ to $105_4$ holding the distribution use key data $KD_1$ to $KD_3$. Then, in the SAMs $105_1$ to $105_4$, the purchase form and the usage form of the content data C are determined based on a module having tamper resistance and the handling content of the content data C described in the usage control policy data 106.

Accordingly, according to the EMD system 100, the purchase and usage of the content data C in the user home network 103 can be reliably carried out based on the content of the usage control policy data 106 produced by the interested parties of the content provider 101.

Also, in the EMD system 100, by distributing the content data C from the content provider 101 to the user home network 103 by using the secure container 104 in both of the cases of on-line and off-line, the rights clearing of the content data C in the SAMs $105_1$ to $105_4$ can be shared in both cases.

Also, in the EMD system 100, when purchasing, using, recording, and transferring the content data C in the network apparatus $160_1$ and the AV apparatuses $160_2$ to $160_4$ in the user home network 103, by performing processing always based on the usage control policy data 106, common rights clearing rule can be employed.

Figure 48:
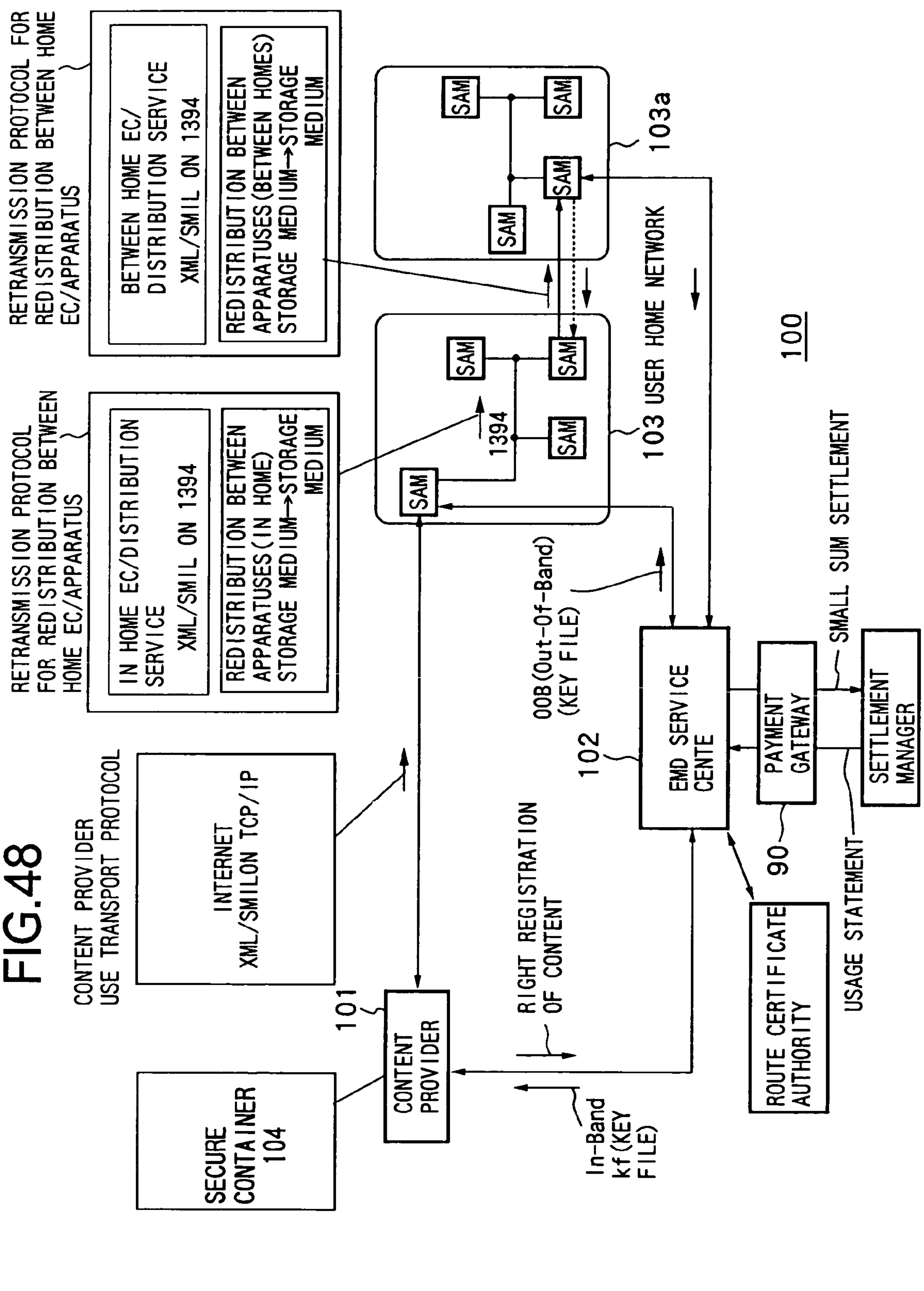
FIG. 48 is a view for explaining an example of a delivery protocol of the secure container used in the EMD system of a first embodiment.

FIG. 48 is a view for explaining an example of the transport protocol of the secure container employed in the first embodiment.

As shown in FIG. 48, in the multi-processor system 100, as the protocol for transporting the secure container 104 from the content provider 101 to the user home network 103, use is made of for example TCP/IP and XML/SMIL.

Also, as the protocol for transferring the secure container between SAMs of the user home network 103, and the protocol for transferring the secure container between the user home networks 103 and 103*a*, use is made of for example XML/SMIL constructed in the 1394 serial bus interface. Also, in this case, it is also possible to store the secure container in a ROM type or RAM type storage medium and transport the same between SAMs.

First Modification of First Embodiment

In the above embodiment, as shown in FIG. 5B, the case where the key file KF was encrypted by using the distribution use key data KD in the EMD service center 102, and the key file KF was decrypted by using the distribution use key data KD in the SAMs $105_1$ to $105_4$ was exemplified, but the encryption of the key file KF using the distribution use key data KD does not always have to be carried out when the secure container 104 is directly supplied from the content provider 101 to the SAMs $105_1$ to $105_4$ as shown in FIG. 1.

In this way, the encryption of the key file KF by using the distribution use key data KD has a large effect when suppressing illegitimate action by the service provider by giving the distribution use key data KD to only the content provider and the user home network when the content data is supplied from the content provider to the user home network via the service provider as in the second embodiment mentioned later.

Note, also in the case of the first embodiment, the encryption of the key file KF by using the distribution use key data KD has an effect in the point of raising the force of suppressing illegitimate usage of the content data.

Further, in the above embodiment, the case where the suggested retailer's price data SRP was stored in the usage control policy data 106 in the key file KF shown in FIG. 5B was exemplified, but it is also possible to store the suggested retailer's price data SRP (price tag data) other than in the key file KF in the secure container 104. In this case, signature data produced by using the secret key data $K_{CP}$ is attached to the suggested retailer's price data SRP.

Second Modification of First Embodiment

Figure 49:
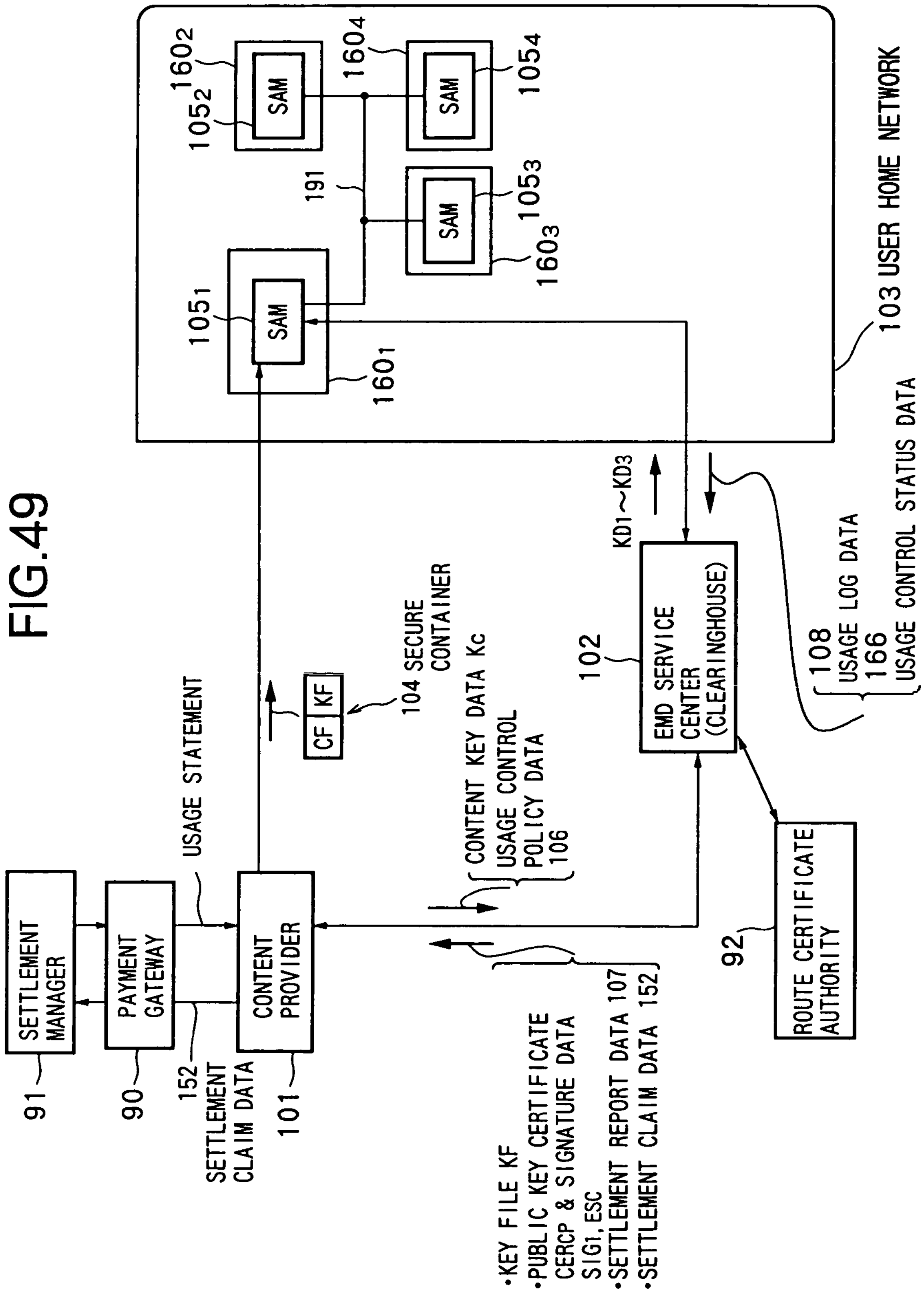
FIG. 49 is a view for explaining a second modification of the first embodiment of the present invention.

In the first embodiment, as shown in FIG. 1, the case where the EMD service center 102 performed the settlement processing in the settlement manager 91 via the payment gateway 90 by using the settlement claim data 152 produced by itself was exemplified, but it is also possible to transmit for example the settlement claim data 152 from the EMD service center 102 to the content provider 101 as shown in FIG. 49 and have the content provider 101 itself perform the settlement processing at the settlement manager 91 via the payment gateway 90 by using the settlement claim data 152.

Third Modification of First Embodiment

In the first embodiment, the case where the secure container 104 was supplied from a single content provider 101 to the SAMs $\mathbf{105}_1$ to $\mathbf{105}_4$ of the user home network 103 was exemplified, but it is also possible to supply secure containers 104*a* and 104*b* from two or more content providers 101*a* and 101*b* to the SAMs $\mathbf{105}_1$ to $\mathbf{105}_4$.

Figure 50:
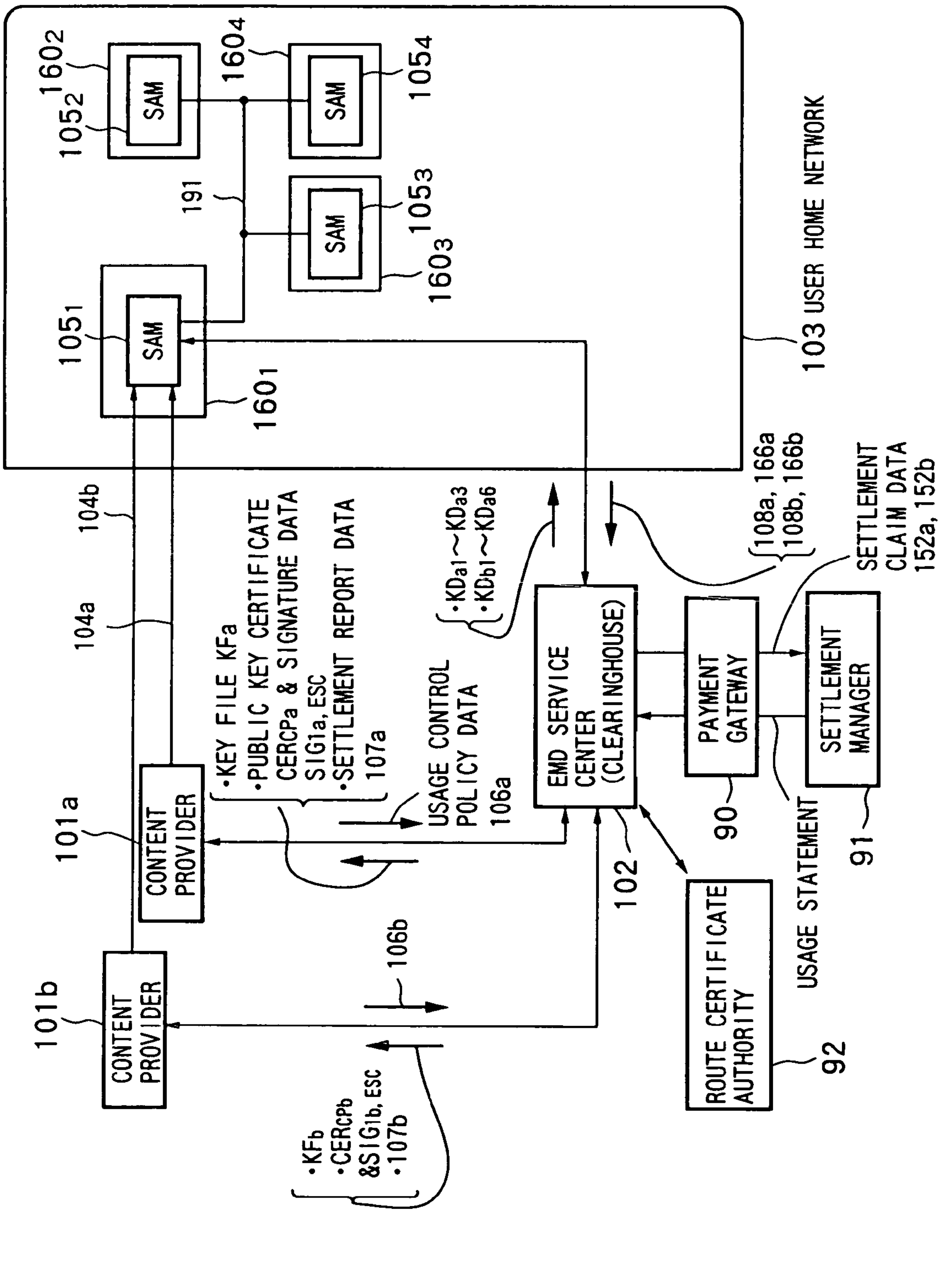
FIG. 50 is a view for explaining a third modification of the first embodiment of the present invention.
Figure 51:
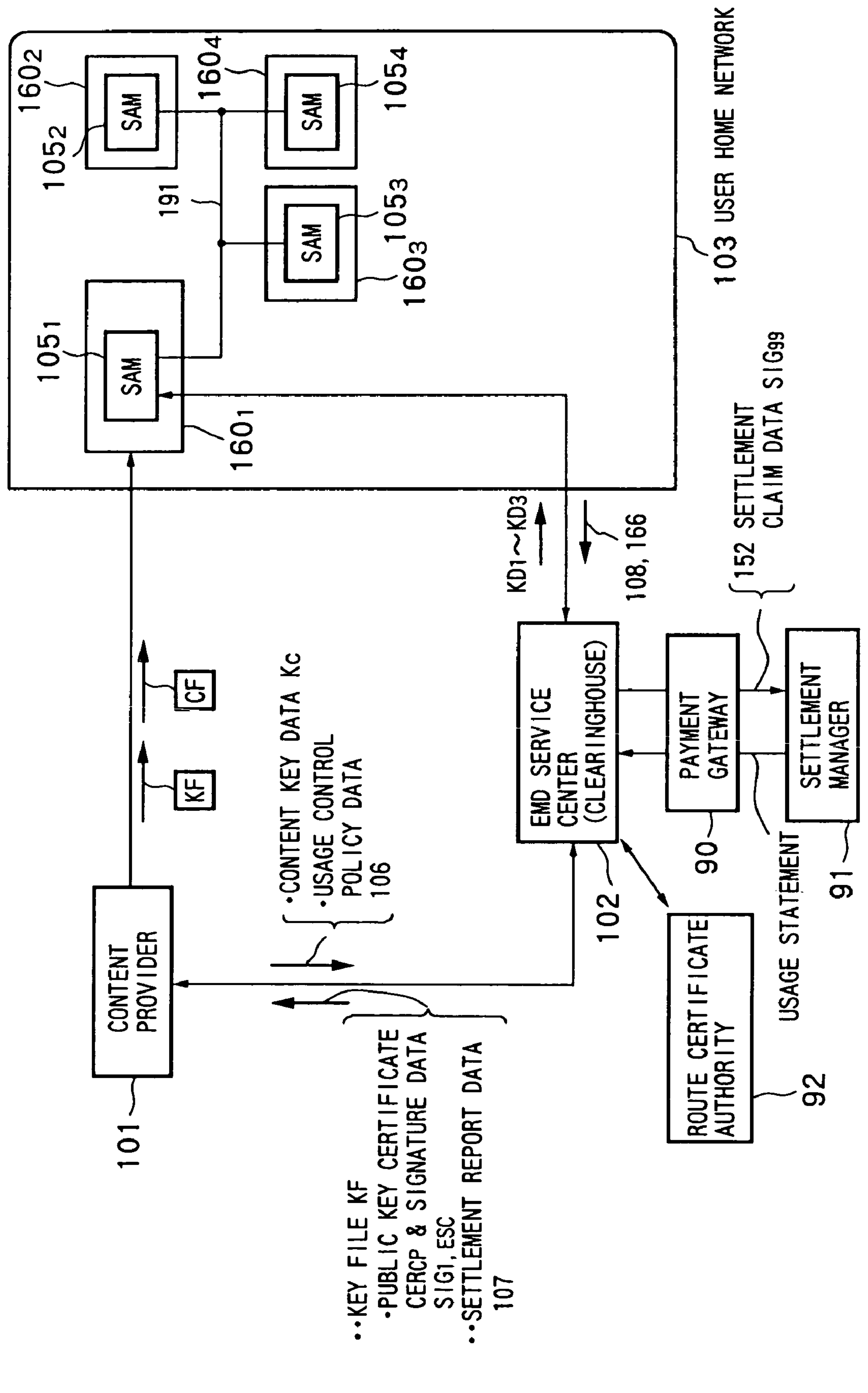
FIG. 51 is a view for explaining a case where a first procedure is employed in a fourth modification of the first embodiment of the present invention.

FIG. 50 is a view of the configuration of the EMD system according to a third modification of the first embodiment where the content providers 101*a* and 101*b* are used.

In this case, the EMD service center 102 distributes key files $KFa_1$ to $KFa_6$ and $KFb_1$ to $KFb_6$ encrypted by using six months worth of distribution use key data $KDa_1$ to $KDa_6$ and $KDb_1$ to $KDb_6$ to the content providers 101*a* and 101*b*.

Also, the EMD service center 102 distributes three months worth of distribution use key data $KDa_1$ to $KDa_3$ and $KDb_1$ to $KDb_3$ to the SAMs $\mathbf{105}_1$ to $\mathbf{105}_4$.

Then, the content provider 101*a* supplies a secure container 104*a* storing a content file CFa encrypted by using unique content key data Kca and key files $KFa_1$ to $KFa_6$ of the corresponding period received from the EMD service center 102 to the SAMs $\mathbf{105}_1$ to $\mathbf{105}_4$ on-line and/or off-line.

At this time, as the identifier of a key file, use is made of the global unique identifier content ID distributed by the EMD service center 102: The content data is centrally managed by the EMD service center 102.

Also, the content provider 101*b* supplies a secure container 104*b* storing a content file CFb encrypted by using unique content key data Kcb and key files $KFb_1$ to $KFb_6$ of the corresponding period received from the EMD service center 102 to the SAMs $\mathbf{105}_1$ to $\mathbf{105}_4$ on-line and/or off-line.

The SAMs $\mathbf{105}_1$ to $\mathbf{105}_4$ decrypt the secure container 104*a* by using the distribution use key data $KDa_1$ to $KDa_3$ of the corresponding period, determine the purchase form of the content after passing through the predetermined signature verification processing, etc., and transmit usage log data 108*a* and usage control status data 166*a* produced in accordance with the related determined purchase form and usage form to the EMD service center 102.

Also, the SAMs $\mathbf{105}_1$ to $\mathbf{105}_4$ decrypt the secure container 104*b* by using the distribution use key data $KDb_1$ to $KDb_3$ of the corresponding period, determine the purchase form of the content after passing through the predetermined signature verification processing, etc., and transmit usage log data 108*b* and usage control status data 166*b* produced in accordance with the related determined purchase form and usage form to the EMD service center 102.

In the EMD service center 102, based on the usage log data 108*a*, settlement claim data 152*a* for the content provider 101*a* is produced, and settlement processing is carried out at the settlement manager 91 using this.

Also, in the EMD service center 102, settlement claim data 152*b* for the content provider 101*b* is produced based on the usage log data 108*b*, and settlement processing is carried out at the settlement manager 91 using this.

Also, the EMD service center 102 registers and authenticates the usage control policy data 106*a* and 106*b*. At this time, the EMD service center 102 distributes the global unique identifier content ID for the key files KFa and KFb corresponding to the usage control policy data 106*a* and 106*b*.

Also, the EMD service center 102 issues certificate data $CER_{CPa}$ and $CER_{CPb}$ of the content providers 101*a* and 101*b* and attaches signature data $SIG_{1b,ESC}$ and $SIG_{1a,ESC}$ to them to verify their legitimacy.

Fourth Modification of First Embodiment

In the above embodiment, the case where the content files CF and the key files KF were stored in the secure container 104 with directory structures and transmitted from the content provider 101 to the SAMs $\mathbf{105}_1$ to $\mathbf{105}_4$ was exemplified, but it is also possible to separately transmit the content files CF and the key file KF to the SAMs $\mathbf{105}_1$ to $\mathbf{105}_4$.

This includes for example the following first technique and second technique.

Figure 52:
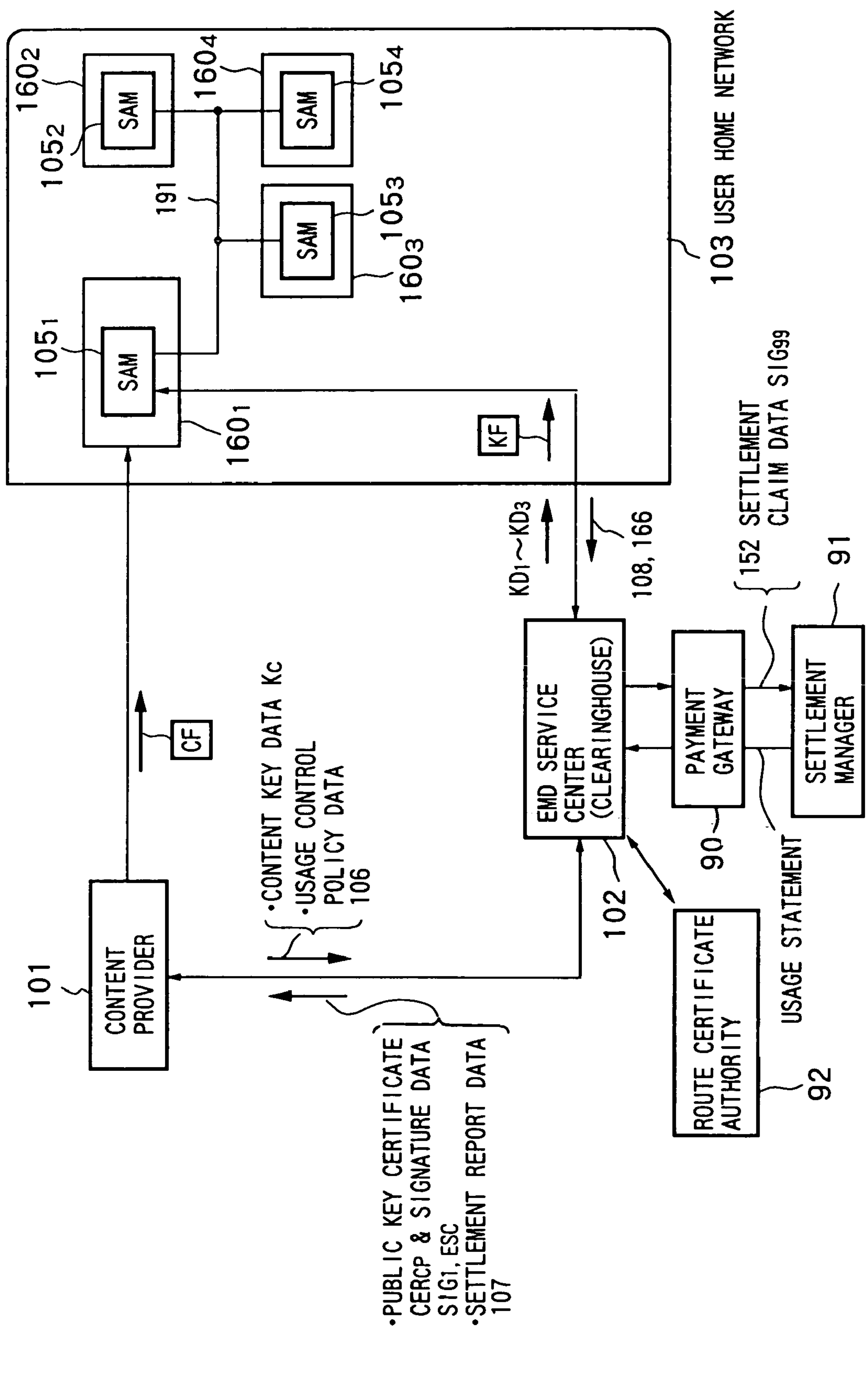
FIG. 52 is a view for explaining a case where a second procedure is employed in a fourth modification of the first embodiment of the present invention.

In the first technique, as shown in FIG. 52, the content files CF and the key files KF are separately transmitted from the content provider 101 to the SAMs $\mathbf{105}_1$ to $\mathbf{105}_4$ in a format not depending upon the communication protocol.

Also, in the second technique, as shown in FIG. 52, the content files CF are transmitted from the content provider 101 to the SAMs $\mathbf{105}_1$ to $\mathbf{105}_4$ in a format not depending upon the communication protocol and, at the same time, the key files KF are transmitted from the EMD service center 102 to the SAMs $\mathbf{105}_1$ to $\mathbf{105}_4$. The related key files KF are transmitted from the EMD service center 102 to the SAMs $\mathbf{105}_1$ to $\mathbf{105}_4$ when for example the users of the SAMs $\mathbf{105}_1$ to $\mathbf{105}_4$ are about to determine the purchase form of the content data C.

When the first technique and the second technique are employed, a link is established between related content files CF and between the content files CF and the key files KF corresponding to them by using hyper link data stored in the header of at least one of the content file CF and the key file KF. In the SAMs $\mathbf{105}_1$ to $\mathbf{105}_4$, the rights clearing and the usage of the content data C are carried out based on the related link.

Note that, in the present modification, as the formats of the content file CF and the key file KF, for example, those shown in FIGS. 5A and 5B are employed. Also, in this case, preferably, together with the content file CF and the key file KF, the signature data $SIG_{6,CP}$ and $SIG_{7,CP}$ thereof are transmitted.

Fifth Modification of First Embodiment

Figure 53:
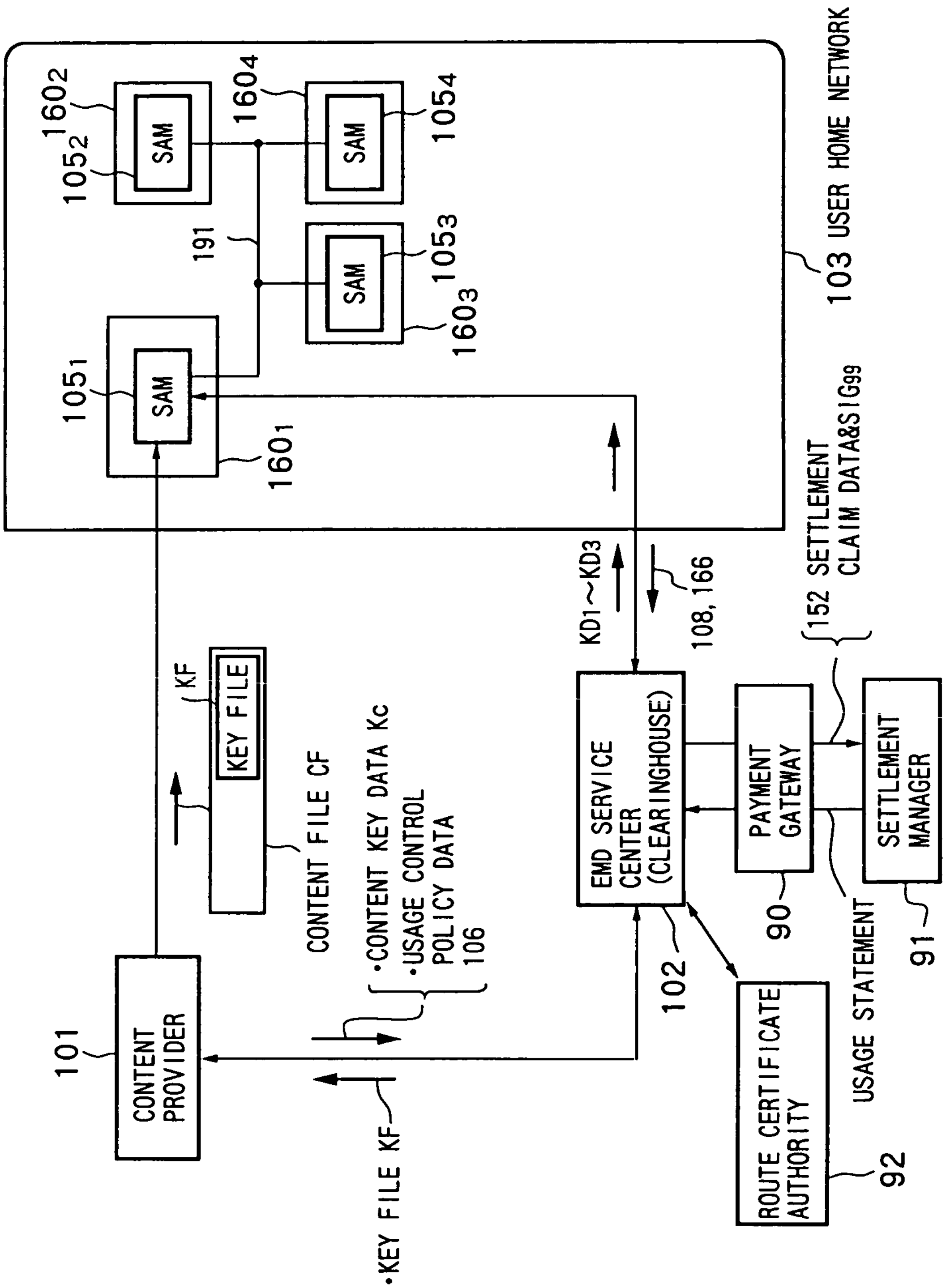
FIG. 53 is a view for explaining a fifth modification of the first embodiment of the present invention.

In the above embodiment, the case where the content file CF and the key file KF were separately provided in the secure container 104 was exemplified, but for example it is also possible to store the key file KF in the content file CF in the secure container 104 as shown in FIG. 53.

In this case, the signature data by the secret key data $K_{CP,S}$ of the content provider 101 is attached to the content file CF storing the key file KF.

Sixth Modification of First Embodiment

In the above embodiment, the case where the content data C was stored in the content file CF, and the content key data Kc and the usage control policy data 106 were stored in the key file KF and transmitted from the content provider 101 to the SAM $\mathbf{105}_1$ or the like was exemplified, but it is also possible to transmit at least one among the content data C, content key data Kc, and the usage control policy data 106 from the content provider 101 to the SAM $\mathbf{105}_1$ or the like without employing the file format and in a format not depending upon the communication protocol.

Figure 54:
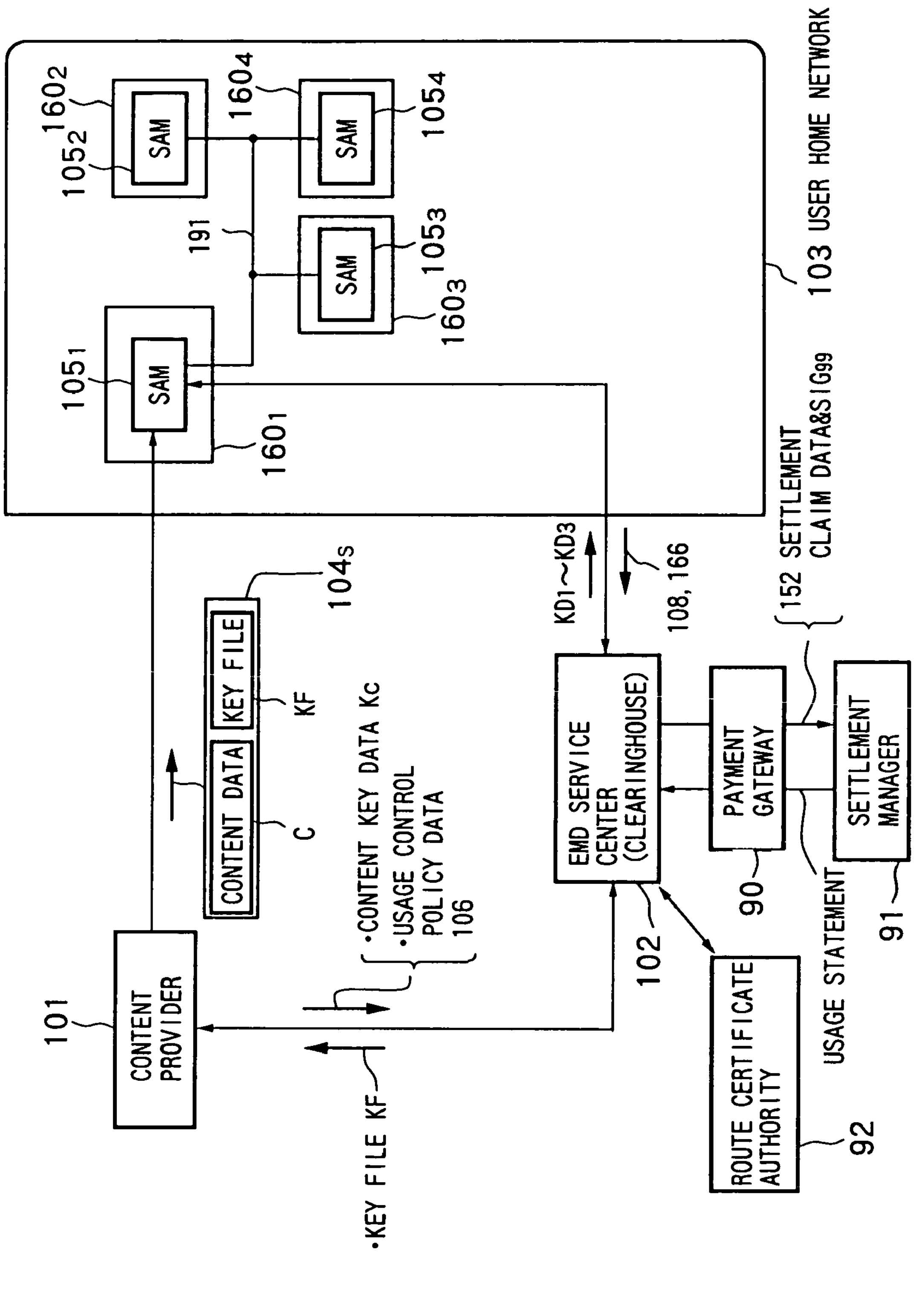
FIG. 54 is a view for explaining a first pattern of a sixth modification of the first embodiment of the present invention.

For example, as shown in FIG. 54, it is also possible if a secure container 104*s* storing the key file KF containing the content data C encrypted by the content key data Kc, the encrypted content key data Kc, the encrypted usage control policy data 106, etc. is produced in the content provider 101, and the secure container 104*s* is transmitted to the SAM $\mathbf{105}_1$ etc. in a format not depending upon the communication protocol.

Figure 55:
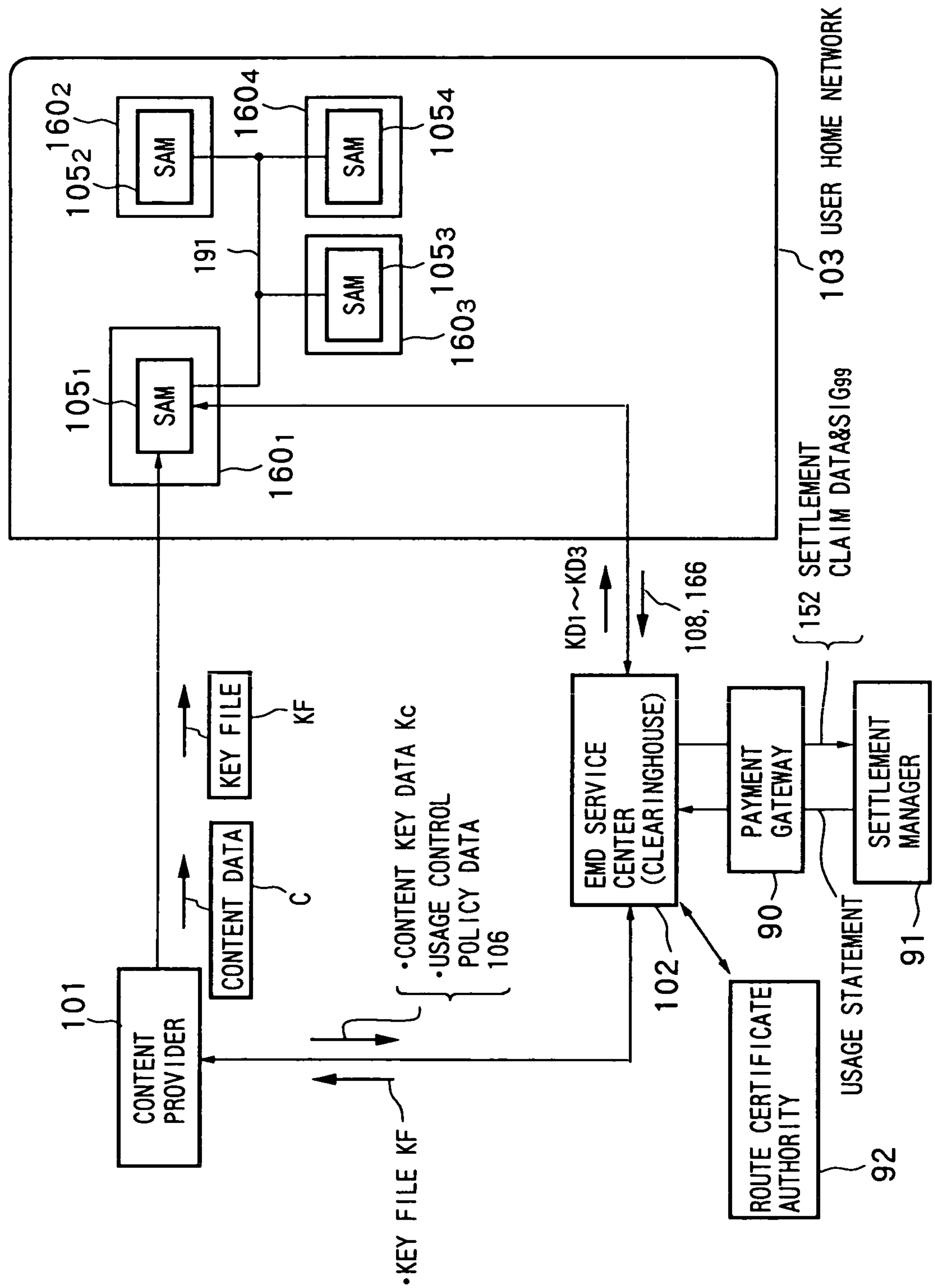
FIG. 55 is a view for explaining a second pattern of a sixth modification of the first embodiment of the present invention.

Also, as shown in FIG. 55, it is also possible to individually transmit the key file KF containing the content data C encrypted by the content key data Kc, encrypted content key data Kc, the encrypted usage control policy data 106, and so on from the content provider 101 to the SAM $\mathbf{105}_1$ etc. in a format not depending upon the communication protocol. Namely, the content data C is transmitted by an identical route to the key file KF without employing the file format.

Figure 56:
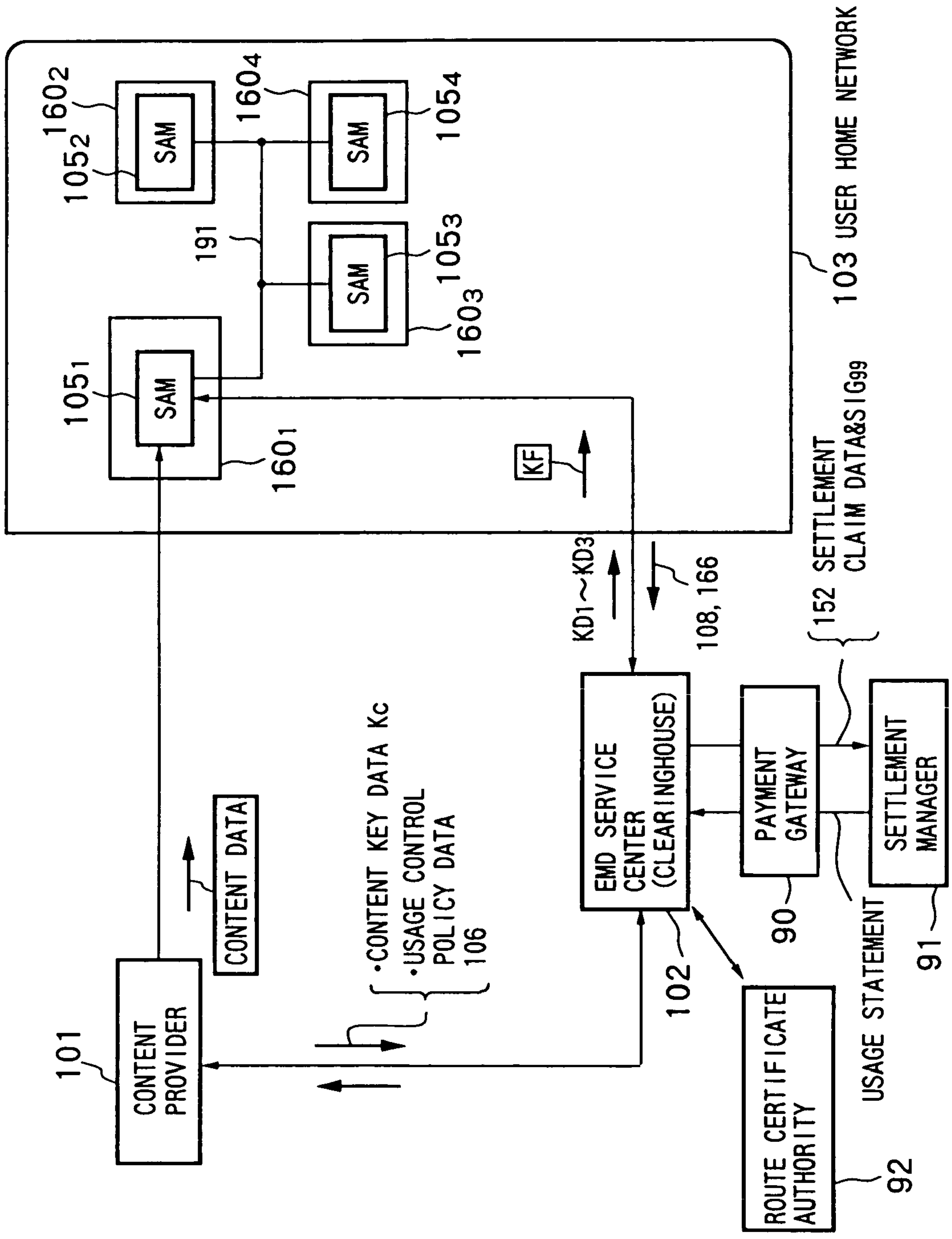
FIG. 56 is a view for explaining a third pattern of a sixth modification of the first embodiment of the present invention.

Also, as shown in FIG. 56, it is also possible if the content data C encrypted by the content key data Kc is transmitted from the content provider 101 to the SAM $\mathbf{105}_1$ etc. in a format not depending upon the communication protocol and, at the same time, the key file KF containing the encrypted content key data Kc and the encrypted usage control policy data 106 etc. is transmitted from the EMD service center 102 to the SAM $\mathbf{105}_1$ etc. Namely, the content data C is transmitted by a different route from that for the key file KF without employing the file format.

Figure 57:
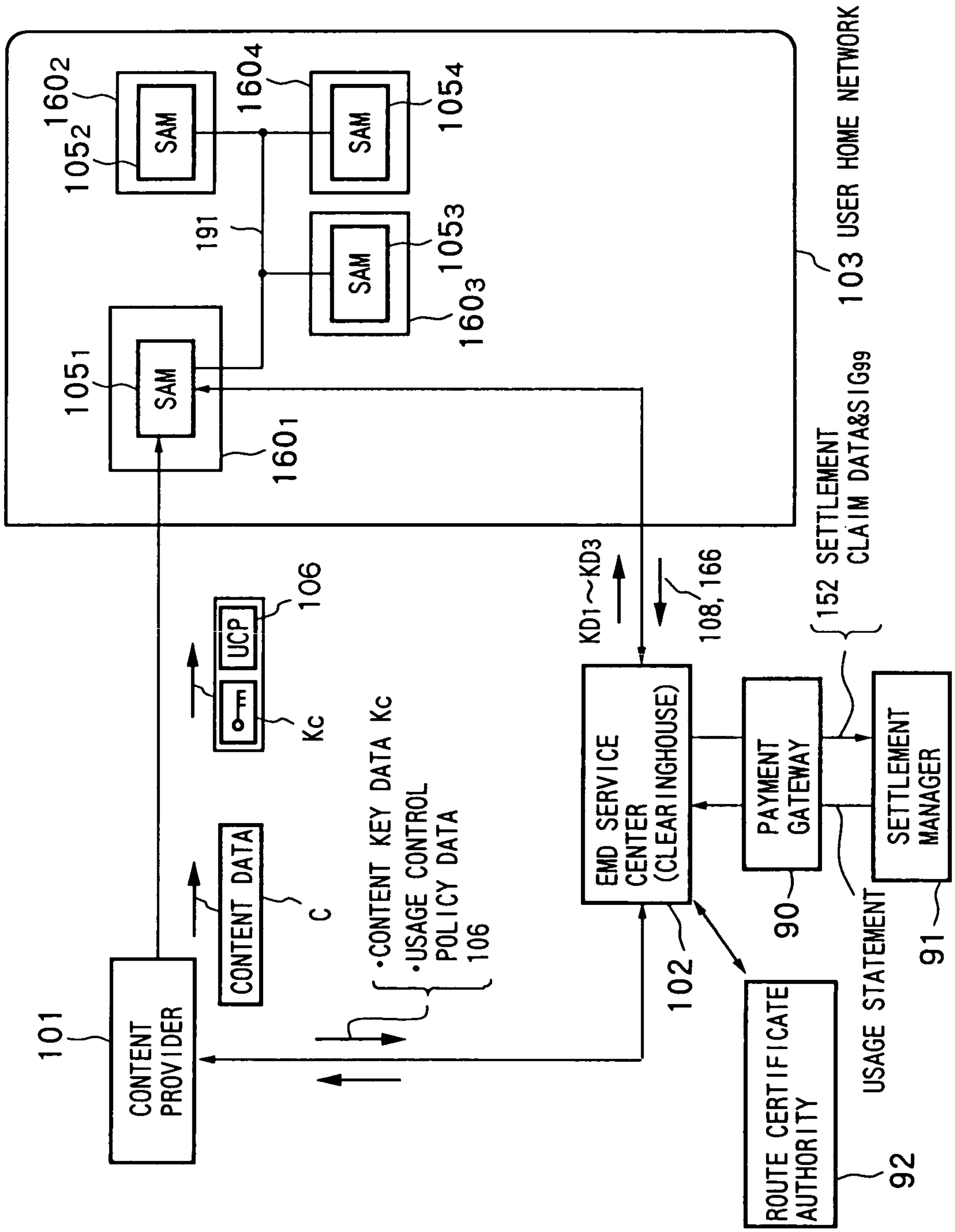
FIG. 57 is a view for explaining a fourth pattern of a sixth modification of the first embodiment of the present invention.

Also, as shown in FIG. 57, it is also possible if the content data C encrypted by the content key data Kc, the content key data Kc, and the usage control policy data 106 are transmitted from the content provider 101 to the SAM $\mathbf{105}_1$ etc. in a format not depending upon the communication protocol. Namely, the content data C, content key data Kc, and the usage control policy data 106 are transmitted by the identical route without employing the file format.

Figure 58:
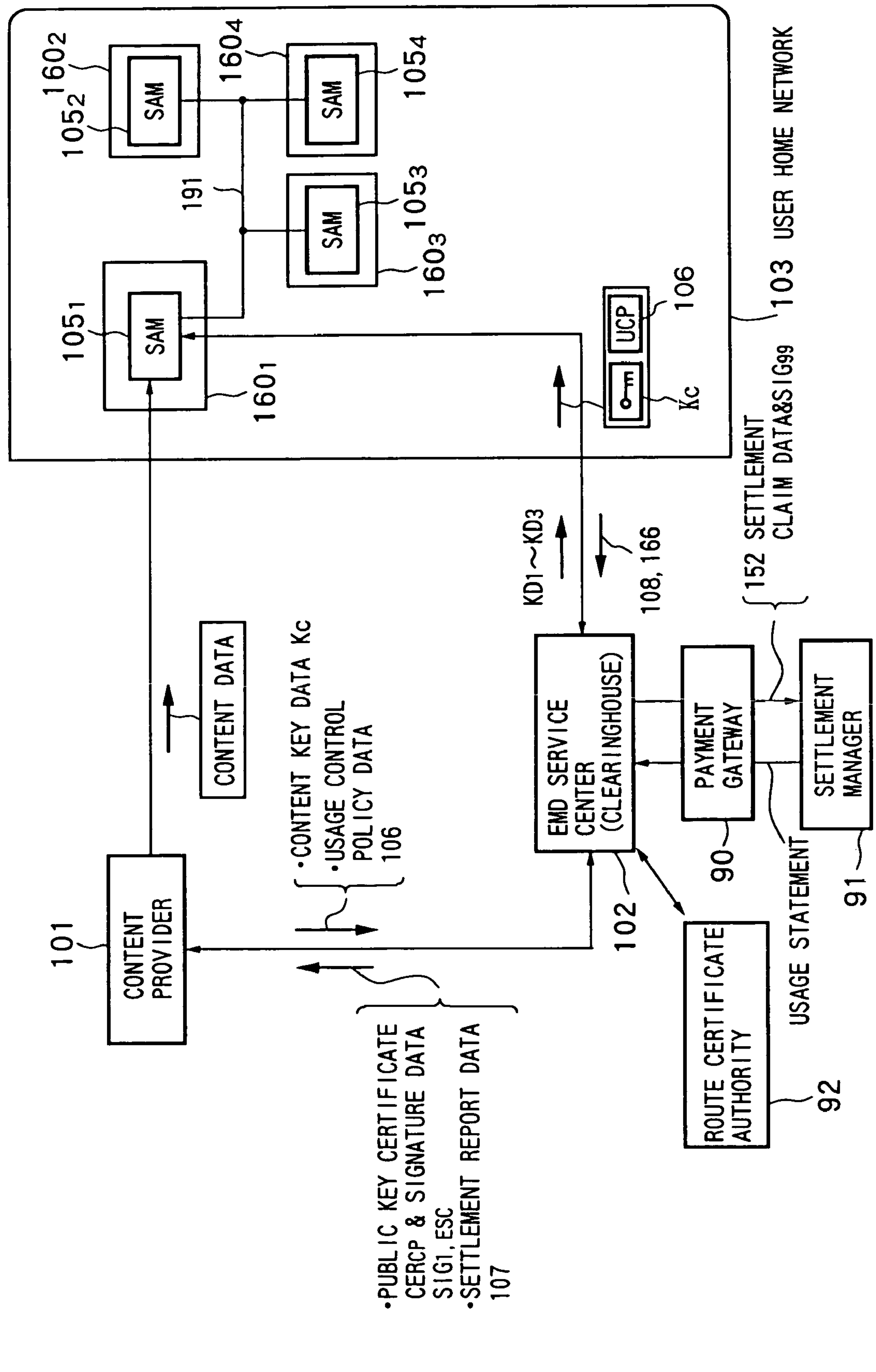
FIG. 58 is a view for explaining a fifth pattern of a sixth modification of the first embodiment of the present invention.

Also, as shown in FIG. 58, it is also possible if the content data C encrypted by the content key data Kc is transmitted from the content provider 101 to the SAM $\mathbf{105}_1$ etc. in a format not depending upon the communication protocol and, at the same time, the content key data Kc and the usage control policy data 106 are transmitted from the EMD service center 102 to the SAM $\mathbf{105}_1$ etc. Namely, the content data C, content key data Kc, and the usage control policy data 106 are transmitted by different routes without employing the file format.

Second Embodiment

In the above embodiment, the case where the content data was directly distributed from the content provider 101 to the SAMs $\mathbf{105}_1$ to $\mathbf{105}_4$ of the user home network 103 was exemplified, but in the present embodiment, an explanation will be made of a case where the content data provided by the content provider is distributed to a SAM of the user home network via the service provider.

Figure 59:
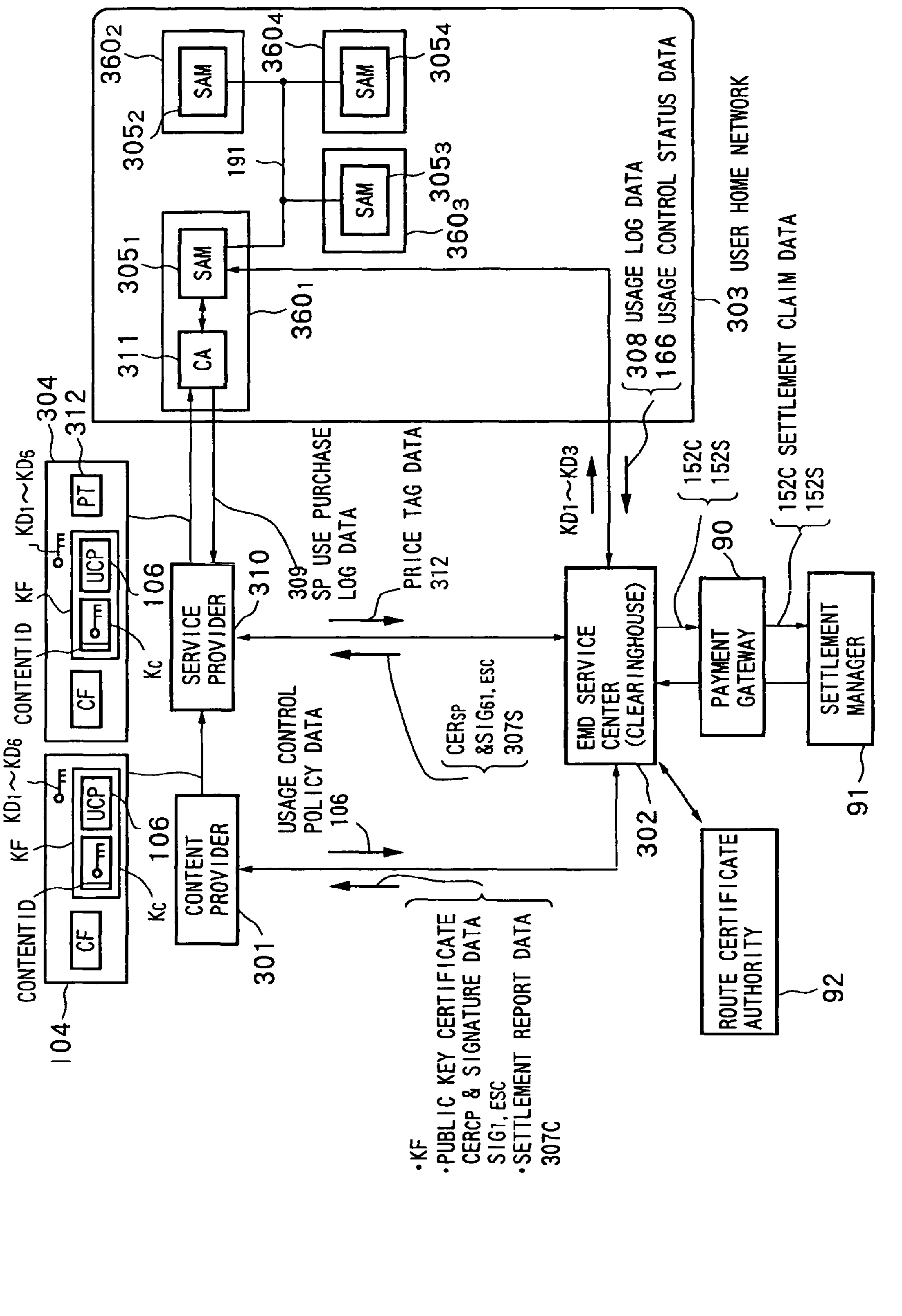
FIG. 59 is an overall view of the configuration of the EMD system of a second embodiment of the present invention.

FIG. 59 is a view of the configuration of an EMD system 300 of the present embodiment.

As shown in FIG. 59, the EMD system 300 has a content provider 301, an EMD service center 302, the user home network 303, a service provider 310, the payment gateway 90, and the settlement manager 91.

The content provider 301, EMD service center 302, SAMs $\mathbf{305}_1$ to $\mathbf{305}_4$, and the service provider 310 correspond to the data providing apparatus, management device, data processing apparatus, and the data distribution apparatus according to claim 22 and claim 152 etc.

The content provider 301 is the same as the content provider 101 of the first embodiment except for the point that it supplies the content data to the service provider 310.

Also, the EMD service center 302 is the same as the EMD service center 102 of the first embodiment except for the point that the certificate authority function, key data management function, and the rights clearing function are provided also to the service provider 310 in addition to the content provider 101 and SAMs $\mathbf{505}_1$ to $\mathbf{505}_4$.

Also, the user home network 303 has a network apparatus $\mathbf{360}_1$ and AV apparatuses $\mathbf{360}_2$ to $\mathbf{360}_4$. The network apparatus $\mathbf{360}_1$ includes a SAM $\mathbf{305}_1$ and a CA module 311, and the AV apparatuses $\mathbf{360}_2$ to $\mathbf{360}_4$ include the SAMs $\mathbf{305}_2$ to $\mathbf{305}_4$.

Here, the SAMs $\mathbf{305}_1$ to $\mathbf{305}_4$ are the same as the SAMs $\mathbf{105}_1$ to $\mathbf{105}_4$ of the first embodiment except for the point that they are distributed a secure container 304 from the service provider 310 and the point that they perform the verification processing of the signature data and the preparation of an SP use purchase log data (data distribution device use purchase log data) 309 for the service provider 310 in addition to the content provider 301.

First, a brief explanation will be made of the EMD system 300.

In the EMD system 300, the content provider 301 transmits the usage control policy (UCP) data 106 in the same way as that of the first embodiment mentioned before indicating the rights contents such as the usage permission condition of the content data C of the content to be provided by itself and the content key data Kc to the EMD service center 302 as the authority manager having a high reliability. The usage control policy data 106 and the content key data Kc are registered and authenticated (certified) in the EMD service center 302.

Also, the content provider 301 encrypts the content data C by the content key data Kc and produces the content file CF. Also, the content provider receives six months' worth of the key files KF for the content files CF from the EMD service center 302.

In the related key file KF, the signature data for verifying the existence of tampering of the related key file KF and the legitimacy of the producer and the transmitter of the related key file KF is stored.

Then, the content provider 301 supplies the secure container 104 shown in FIG. 5 storing the content file CF, key file KF, and its own signature data to the service provider 310 by using a network such as the Internet, digital broadcast, storage medium, or informal protocol or off-line or the like.

Also, the signature data stored in the secure container 104 is used for verifying the existence of tampering of the corresponding data and the legitimacy of the producer and transmitter of the related data.

When receiving the secure container 104 from the content provider 301, the service provider 310 verifies the signature data and confirms the producer and the transmitter of the secure container 104.

Next, the service provider 310 produces price tag data (PT) 312 indicating the price obtained by adding a price for service such as authoring performed by itself to the price (SRP) for the content intended by the content provider 301 notified for example off-line.

Then, the service provider 310 produces the secure container 304 storing the content file CF and key file KF extracted from the secure container 104, price tag data 312, and the signature data by its own secret key data $K_{SP,S}$ with respect to them.

At this time, the key file KF has been encrypted by the distribution use key data $KD_1$ to $KD_6$, and the service provider 310 does not hold the related distribution use key data $KD_1$ to $KD_6$, therefore the service provider 310 cannot see or rewrite the content of the key file KF.

Also, the EMD service center 302 registers and authenticates the price tag data 312.

The service provider 310 distributes the secure container 304 to the user home network 303 on-line and/or off-line.

At this time, in the case of off-line, the secure container 304 is stored in the ROM type storage medium or the like and supplied to the SAMs $\mathbf{305}_1$ to $\mathbf{305}_4$ as it is. On the other hand, in the case of on-line, mutual certification is carried out between the service provider 310 and the CA module 311, the secure container 304 is encrypted by using the session key data $K_{SES}$ in the service provider 310 and transmitted, and the secure container 304 received at the CA module 311 is decrypted by using the session key data $K_{SES}$ and then transferred to the SAMs $\mathbf{305}_1$ to $\mathbf{305}_4$.

In this case, as the communication protocol for transmitting the secure container 304 from the content provider 301 to the user home network 303, an MHEG (Multimedia and Hypermedia Information Coding Experts Group) protocol is used in the case of a digital broadcast and XML/SMIL/HTML (Hyper Textmarkup Language) is used in the case of the Internet. In these communication protocols, the secure container 304 is buried by tunneling in a format not depending upon the related communication protocol (encoding method or the like).

Accordingly, it is not necessary to ensure compatibility of the format between the communication protocol and the secure container 304, so the format of the secure container 304 can be flexibly set.

Next, in the SAMs $\mathbf{305_1}$ to $\mathbf{305_4}$, the signature data stored in the secure container 304 is verified, and the legitimacy of producers and transmitters of the content file CF and the key file KF stored in the secure container 304 is confirmed. Then, in the SAMs $\mathbf{305_1}$ to $\mathbf{305_4}$, when the related legitimacy is confirmed, the key file KF is decrypted by using the distribution use data $KD_1$ to $KD_3$ of the corresponding period distributed from the EMD service center 302.

The secure container 304 supplied to the SAMs $\mathbf{305_1}$ to $\mathbf{305_4}$ is reproduced and recorded into the storage medium after the purchase and/or usage form is determined in accordance with the operation of the user in the network apparatus $\mathbf{360_1}$ and the AV apparatuses $\mathbf{360_2}$ to $\mathbf{360_4}$.

The SAMs $\mathbf{305_1}$ to $\mathbf{305_4}$ store the log of the purchase and/or usage of the secure container 304 as the usage log data 308.

A usage log data (log data or the management device use log data) 308 is transmitted from the user home network 303 to the EMD service center 302 in response to for example a request from the EMD service center 302.

Also, the SAMs $\mathbf{305_1}$ to $\mathbf{305_4}$ transmit the usage control status (UCS) data 166 indicating the related purchase form to the EMD service center 302 when the purchase form of the content is determined.

The EMD service center 302 determines (calculates) the charge content for each of the content provider 301 and the service provider 310 based on the usage log data 308 and performs settlement at the settlement manager 91 such as a bank via the payment gateway 90 based on the results. By this, the money paid by the user of the user home network 103 is distributed to the content provider 101 and the service provider 310 by the settlement processing by the EMD service center 102.

In the present embodiment, the EMD service center 302 has the certificate authority function, key data management function, and the rights clearing (profit distribution) function.

Namely, the EMD service center 302 functions as a second certificate authority with respect to the route certificate authority 92 as the highest authority manager at the neutral position and verifies the legitimacy of the related public key data by attaching a signature by the secret key data of the EMD service center 302 to the certificate data of the public key data to be used for the verification processing of the signature data in the content provider 301, service provider 310, and the SAMs $\mathbf{305_1}$ to $\mathbf{305_4}$. Further, as mentioned before, also the registration and authentication of the usage control policy data 106 of the content provider 301, content key data Kc, and the price tag data 312 of the service provider 310 are achieved by the certificate authority function of the EMD service center 302.

Also, the EMD service center 302 has a key data management function for performing for example management of the key data of the distribution use key data $KD_1$ to $KD_6$.

Also, the EMD service center 302 has a rights clearing (profit distribution) function of performing settlement with respect to the purchase and/or usage of the content by the user of the user home network 303 based on the usage control policy data 106 registered by the content provider 301, the usage log data 308 input from the SAMs $\mathbf{305_1}$ to $\mathbf{305_4}$, and the price tag data 312 registered by the service provider 310 and distributing and paying the money paid by the user to the content provider 301 and the service provider 310.

Below, components of the content provider 301 will be explained in detail.

[Content Provider 301]

Figure 60:
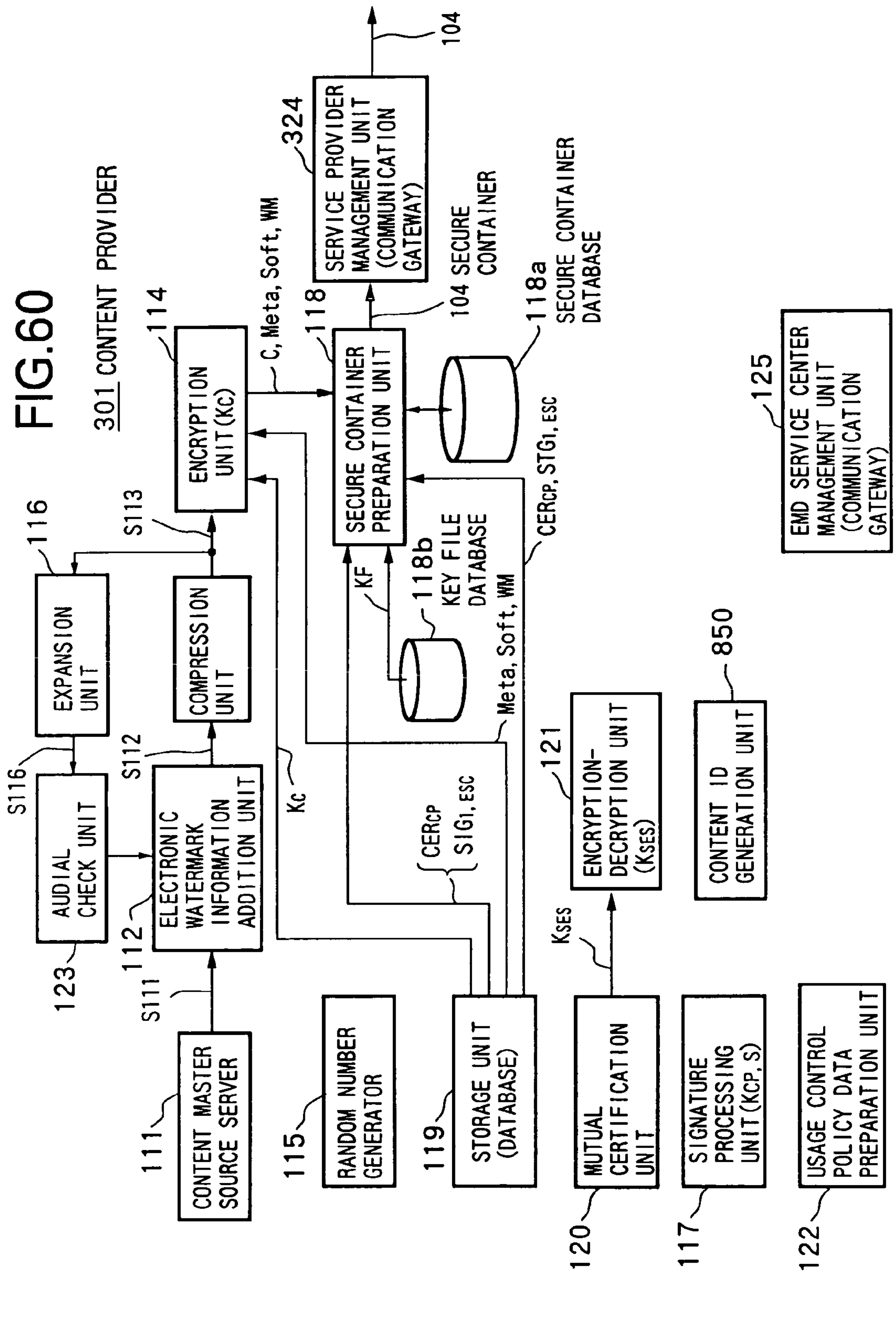
FIG. 60 is a functional block diagram of the content provider shown in FIG. 59 and a view of the flow of the data related to the secure container transmitted to a service provider.

FIG. 60 is a functional block diagram of the content provider 301 and shows the flow of the data related to the data transmitted and received with the service provider 310.

As shown in FIG. 60, the content provider 301 has a content master source server 111, electronic watermark information addition unit 112, compression unit 113, encryption unit 114, random number generation unit 115, signature processing unit 117, secure container preparation unit 118, secure container database **118*a*, key file database 118*b*, storage unit 119, mutual certification unit 120, encryption and/or decryption unit 121, usage control policy data preparation unit 122, EMD service center management unit 125, and a service provider management unit 324**.

In FIG. 60, components given the same reference numerals as those of FIG. 3 are the same as the components of the same reference numerals explained in the first embodiment referring to FIG. 3 and FIG. 4.

Namely, the content provider 301 has a configuration providing the service provider management unit 324 in place of the SAM management unit 124 shown in FIG. 3.

The service provider management unit 324 provides the secure container 104 shown in FIG. 5 input from the secure container preparation unit 118 to the service provider 310 shown in FIG. 59 off-line and/or on-line.

Where the secure container 104 shown in FIG. 5 is distributed to the service provider 310 on-line, the service provider management unit 324 encrypts the secure in the encryption and/or decryption unit 121 and then distributes the same via the network to the service provider 310.

Also, the flow of the data in the content provider 101 shown in FIG. 4 similarly applies also to the content provider 301.

Below, an explanation will be made of the flow of the processing when transmitting the secure container 104 from the content provider 301 to the service provider 310.

Figure 61:
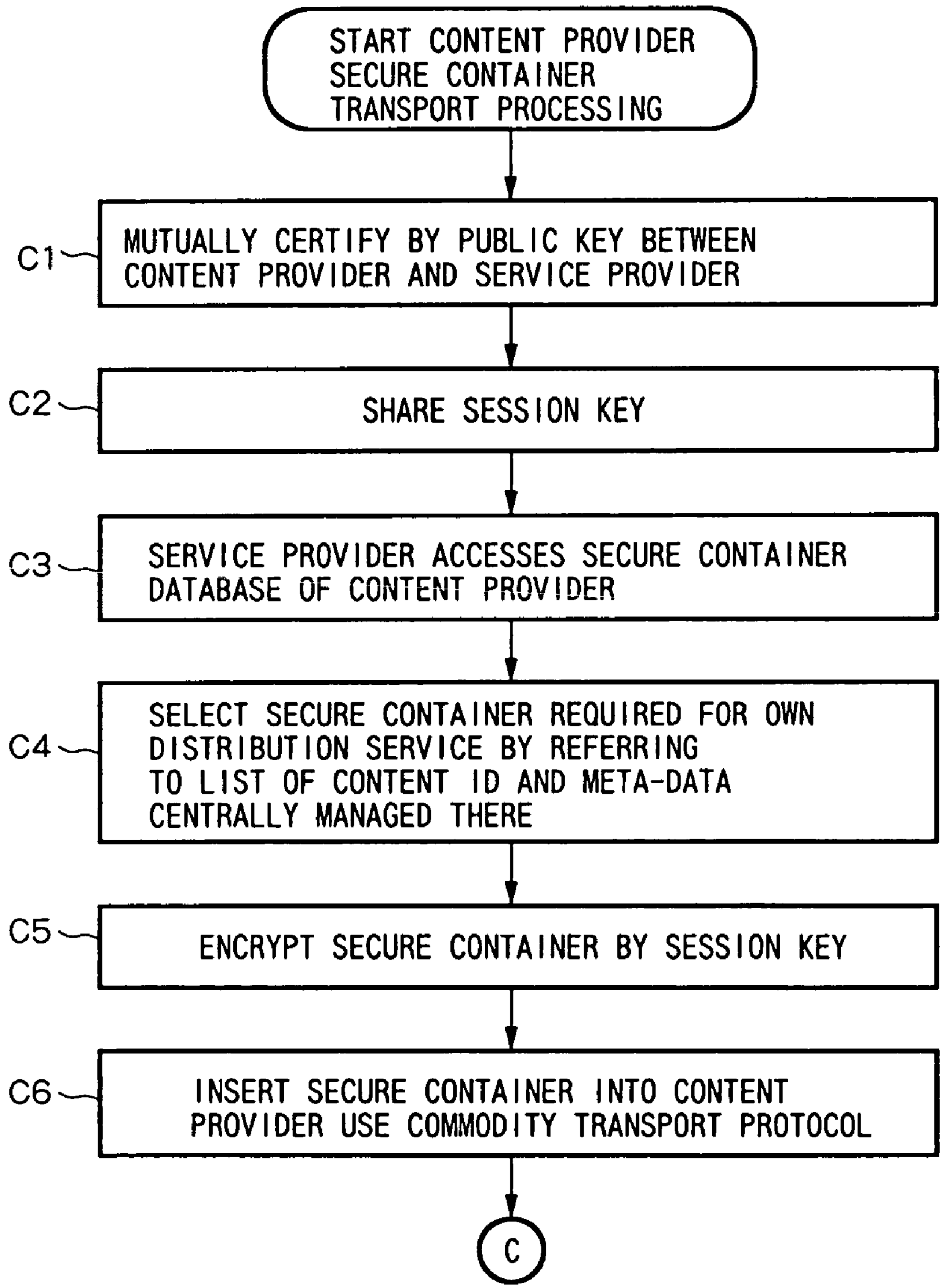
FIG. 61 is a flowchart showing a routine of processing for delivery of the secure container performed in the content provider.
Figure 62:
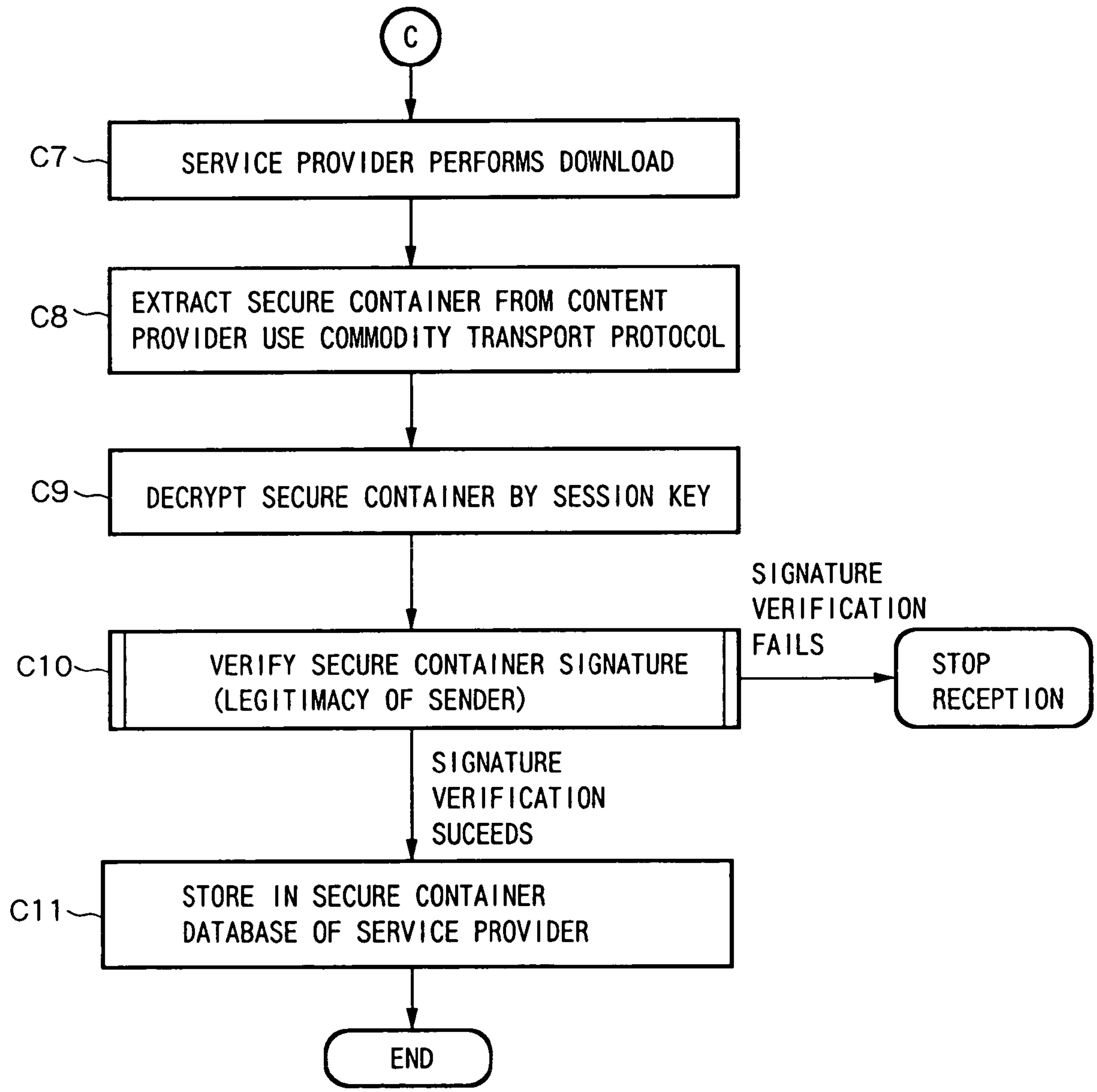
FIG. 62 is a flowchart showing a routine of the processing for delivery of the secure container performed in the content provider.

FIG. 61 and FIG. 62 are flowcharts showing the flow of the processing when transmitting the secure container 104 from the content provider 301 to the service provider 310.

Step C1: Mutual certification is carried out between the content provider 301 and the service provider 310.

Step C2: The session key data $K_{SES}$ obtained by the mutual certification at step C1 is shared between the content provider 301 and the service provider 310.

Step C3: By the service provider 310, the secure container database **118*a* possessed by the content provider 301** (for CP) is accessed.

Step C4: The service provider 310 selects the secure container 104 necessary for its distribution service by referring to for example the lists of the content ID and the meta data centrally managed at the secure container database **118*a***.

Step C5: The content provider 301 encrypts the secure container 104 selected at step C4 by using the session key data $K_{SES}$ shared at step C2.

Step C6: The content provider 301 inserts the secure container 104 obtained at step C5 into a content provider use commodity transport protocol.

Step C7: The service provider 310 performs the download.

Step C8: The service provider 310 takes out the secure container 104 from the content provider use commodity transport protocol.

Step C9: The service provider 310 decrypts the secure container 104 by using the session key data $K_{ms}$ shared at step C2.

Step C10: The service provider 310 verifies the signature data stored in the decrypted secure container 104 to confirm the legitimacy of the transmitter and performs the processing of step C11 under the condition that the transmitter is legitimate.

Step C11: The service provider 310 stores the secure container 104 in the secure container database of itself.

[Service Provider 310]

The service provider 310 produces the secure container 304 storing the content file CF and the key file KF in the secure container 104 received from the content provider 301 and the price tag data 312 produced by itself and distributes the secure container 304 to the network apparatus $360_1$ and the AV apparatuses $360_2$ to $360_4$ of the user home network 303 on-line and/or off-line.

The service format of the content distribution by the service provider 310 is roughly classified to an independent type service and a linked type service.

The independent type service is for example a service dedicated to download for individually distributing the content. Further, the linked type service is a service for distributing content linked to the program and CMs (advertisements). For example, content such as a theme song and other song of a drama are stored in a stream of the drama program. The user can purchase the content such as theme song or other song existing in the stream when watching the drama program.

Figure 63:
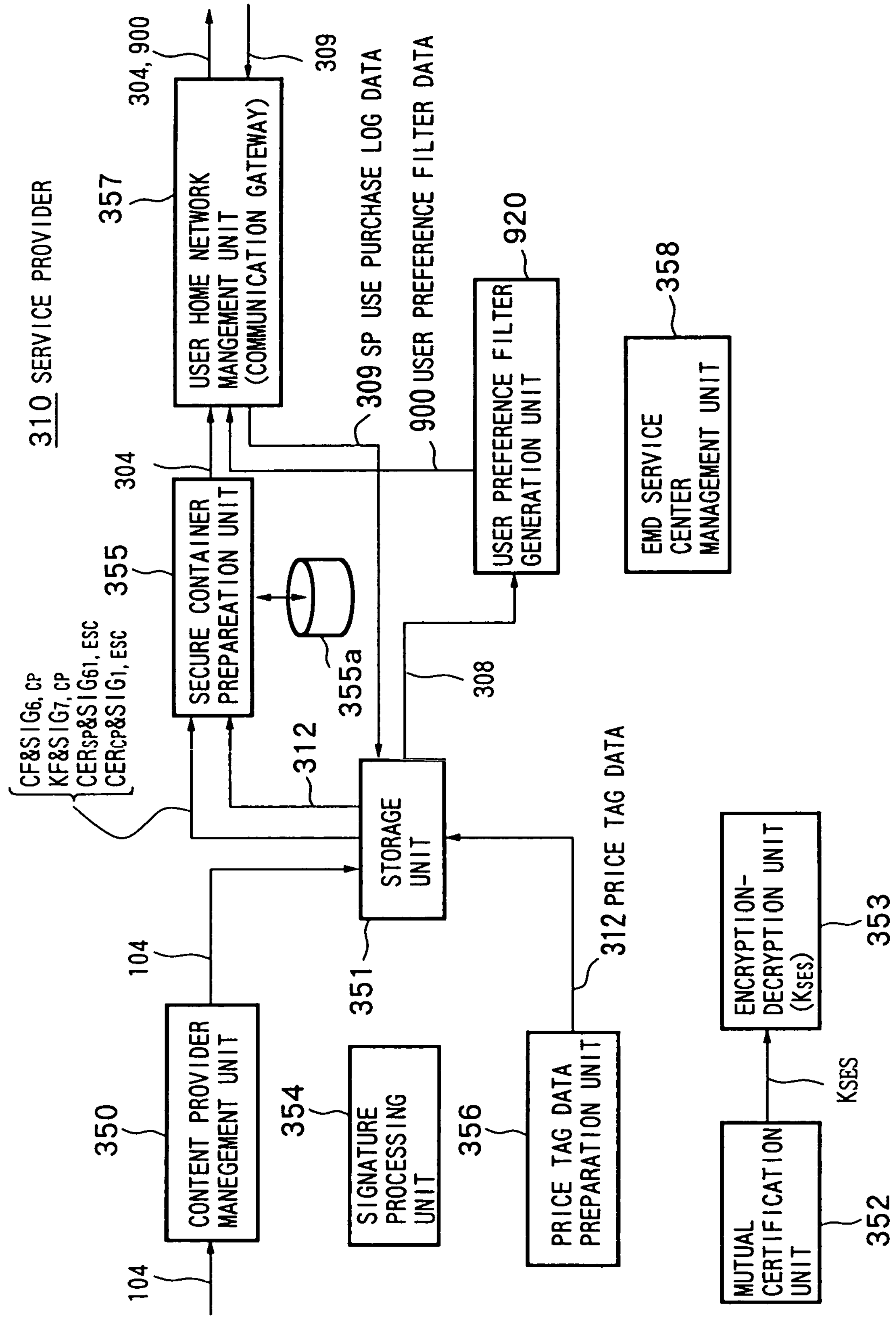
FIG. 63 is a functional block diagram of the service provider shown in FIG. 59 and a view of the flow of the data transmitted and received with the user home network.

FIG. 63 is a functional block diagram of the service provider 310.

Note that, in FIG. 63, the flow of the data when supplying the secure container 304 produced by using the secure container 104 supplied from the content provider 301 to the user home network 303 is shown.

As shown in FIG. 63, the service provider 310 has a content provider management unit 350, a storage unit 351, a mutual certification unit 352, an encryption and/or decryption unit 353, a signature processing unit 354, a secure container preparation unit 355, a secure container database 355*a*, a price tag data preparation unit 356, a user home network management unit 357, an EMD service center management unit 358, and a user preference filter generation unit 920.

Below, an explanation will be made of the flow of the processing in the service provider 310 when creating the secure container 304 from the secure container 104 supplied from the content provider 301 and distributing this to the user home network 303 by referring to FIG. 63 and FIG. 64.

Figure 64:
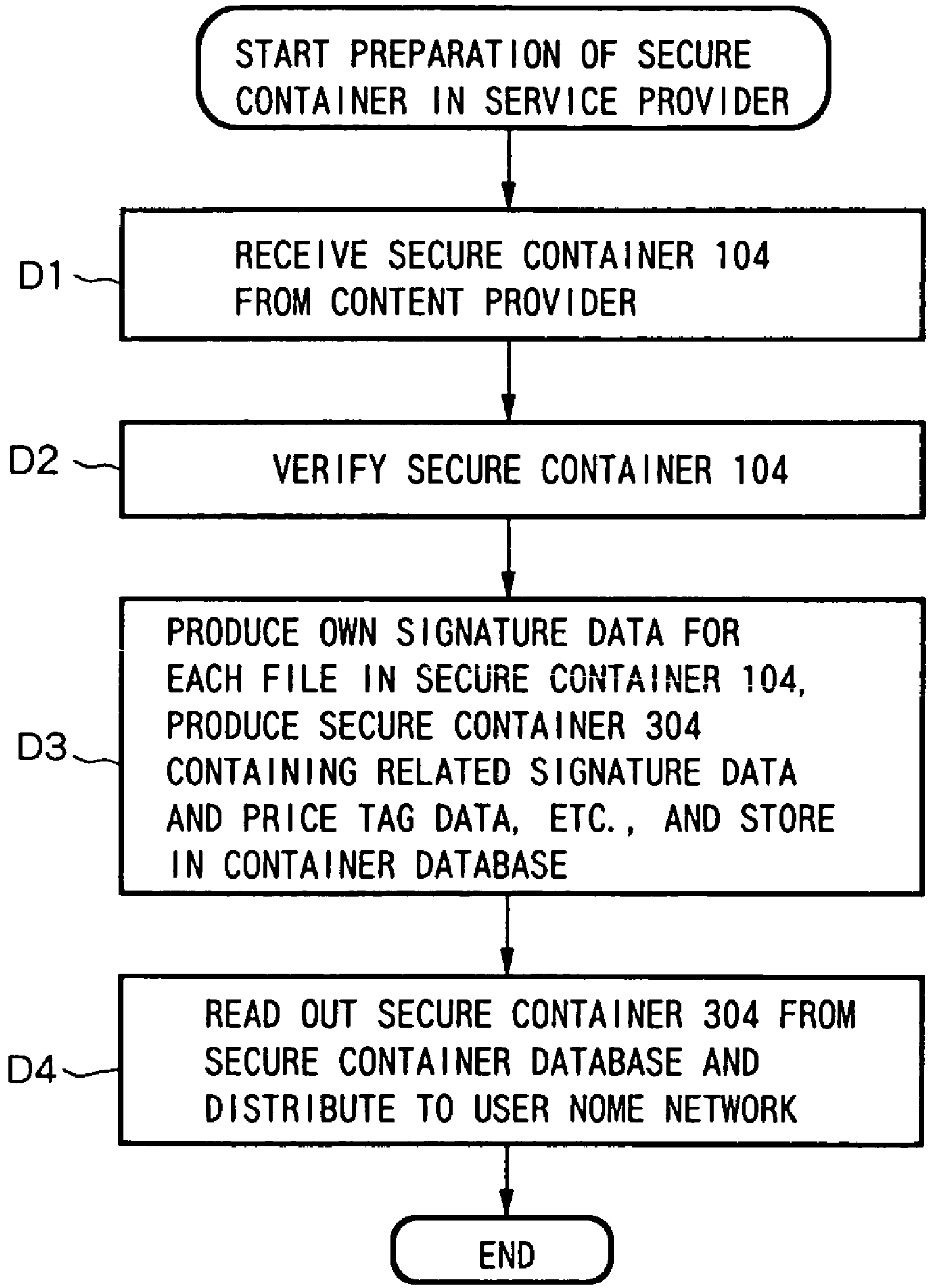
FIG. 64 is a flowchart showing a routine of the processing for preparation of the secure container performed in the service provider.

FIG. 64 is a flowchart for explaining the processing of distributing the secure container 304 from the content provider 301 to the service provider 310.

<Step D1>

The content provider management unit 350 receives the secure container 104 shown in FIG. 5 from the content provider 301 on-line and/or off-line and writes the secure container 104 into the storage unit 351.

At this time, the content provider management unit 350 decrypts the secure container 104 in the encryption and/or decryption unit 353 by using the session key data $K_{SES}$ obtained by mutual certification between the mutual certification unit 120 shown in FIG. 60 and the mutual certification unit 352 shown in FIG. 63 in the case of on-line and then writes the same into the storage unit 351.

Note that, the service provider 310 can have a dedicated secure container database for storing the secure container 104 separately from the storage unit 351.

<Step D2>

Next, in the signature processing unit 354, the signature data $SIG_{1,ESC}$ shown in FIG. 5C of the secure container 104 stored in the storage unit 351 is verified by using the public key data $K_{ESC,P}$ of the EMD service center 302 read out from the storage unit 351. After the legitimacy thereof is confirmed, the public key data $K_{CP,P}$ is extracted from the certificate data $CER_{CP}$ shown in FIG. 5C.

Next, the signature processing unit 354 verifies the signature data $SIG_{6,CP}$ and $SIG_7$ shown in FIGS. 5A and 5B of the secure container 104 stored in the storage unit 351, that is, verifies the legitimacy of the producer and transmitter of the content file CF and the transmitter of the key file KF by using the related extracted public key data $K_{CP,P}$.

Also, the signature processing unit 354 verifies the signature data $SIG_{K1,ESC}$ stored in the key file KF shown in FIG. 5B by using the public key data $K_{ESC,P}$ read out from the storage unit 351, that is, verifies the legitimacy of the producer of the key file KF. At this time, the verification of the signature data $SIG_{K1,ESC}$ serves also as the verification of whether or not the key file KF is registered in the EMD service center 302.

<Step D3>

Next, the secure container preparation unit 355 reads out the content file CF and the signature data $SIG_{6,CP}$, thereof, the key file KF and the signature data $SIG_{7,CP}$ thereof, the certificate data $CER_{SP}$ of the service provider 310 and the signature data $SIG_{61,ESC}$ thereof, and the certificate data $CER_{CP}$ of the content provider 301 and the signature data $SIG_{1,ESC}$ thereof from the storage unit 351 when the legitimacy of the signature data $SIG_{6,CP}$; $SIG_{7,CP}$ and $SIG_{K1,ESC}$ is confirmed.

Also, the price tag data preparation unit 356 produces price tag data 312 indicating the price obtained by adding the price of its own service to the price for the content requested by the content provider 301 notified from for example the content provider 301 off-line and stores this in the storage unit 351.

Also, the signature processing unit 354 obtains the hash values of the content file CF, key file KF, and the price tag data 312, produces signature data $SIG_{62,SP}$, $SIG_{63,SP}$, and $SIG_{64,SP}$ by using secret key data $K_{SP,P}$ of the service provider 310, and outputs them to the secure container preparation unit 355.

Here, the signature data $SIG_{62,SP}$ is used for verifying the legitimacy of the transmitter of the content file CF, the signature data $SIG_{63,SP}$ is used for verifying the legitimacy of the transmitter of the key file KF, and the signature data $SIG_{64,SP}$ is used for verifying the legitimacy of the producer and transmitter of the price tag data 312.

Next, the secure container preparation unit 355 produces the secure container 304 storing the content file CF and the signature data $SIG_{6,SP}$ and $SIG_{62,SP}$ thereof, the key file KF and the signature data $SIG_{7,CP}$ and $SIG_{63,ESC}$ thereof, the price tag data 312 and the signature data $SIG_{64,SP}$ thereof, the certificate data $CER_{SP}$ and the signature data $SIG_{61,ESC}$ thereof, and the certificate data $CER_{CP}$ and the signature data $SIG_{1,ESC}$ thereof as shown in FIGS. 65A to 65D and stores the same in the secure container database 355*a*.

The secure containers 304 stored in the secure container database 355*a* are centrally managed by the service provider 310 by using for example content IDs.

<Step D4>

The secure container preparation unit 355 reads out the secure container 304 in response to the request from the user home network 303 from the secure container database 355*a* and outputs this to the user home network management unit 357.

At this time, the secure container 304 may be a composite container storing a plurality of content files CF and a plurality of key files KF corresponding to them too. For example, it is also possible to store a plurality of content files CF concerning a song, a video clip, a text card, liner notes, and a jacket in a single secure container 304. It is also possible if these plurality of content files CF etc. are stored in the secure container 304 with a directory structure.

Also, where the secure container 304 is transmitted in a digital broadcast, an MHEG (Multimedia and Hypermedia Information Coding Experts Group) protocol is used, while where it is transmitted by the Internet, an XML/SMIL/HTML (Hyper Text Markup Language) protocol is used.

At this time, the content files CF and the key files KF etc. in the secure container 304 are stored in predetermined layers in the communication protocol employed between the service provider 310 and the user home network 303 in a format not depending upon the encoding method tunneling the protocols of MHEG and HTML.

Figure 66:
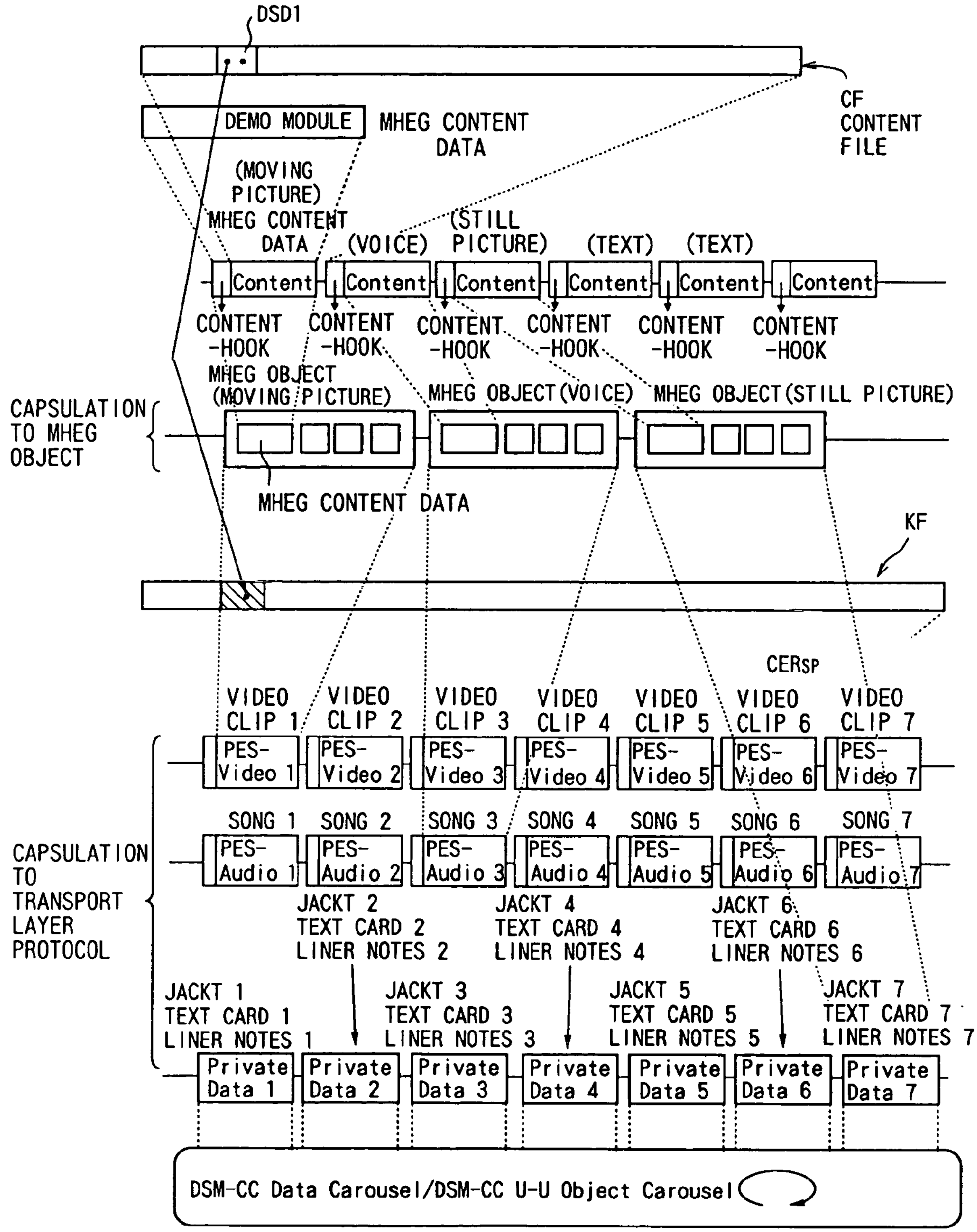
FIG. 66 is a view for explaining a transmission format of the content file stored in the secure container shown in FIG. 65.

For example, where the secure container 304 is transmitted in a digital broadcast, as shown in FIG. 66, the content file CF is stored as the MHEG content data in the MHEG object.

Also, in the transport layer protocol, the MHEG object is stored in PES (packetized elementary stream)-Video in the case of a moving picture image, stored in the PES-Audio in the case of audio, and stored in Private-Data in the case of a still image.

Figure 67:
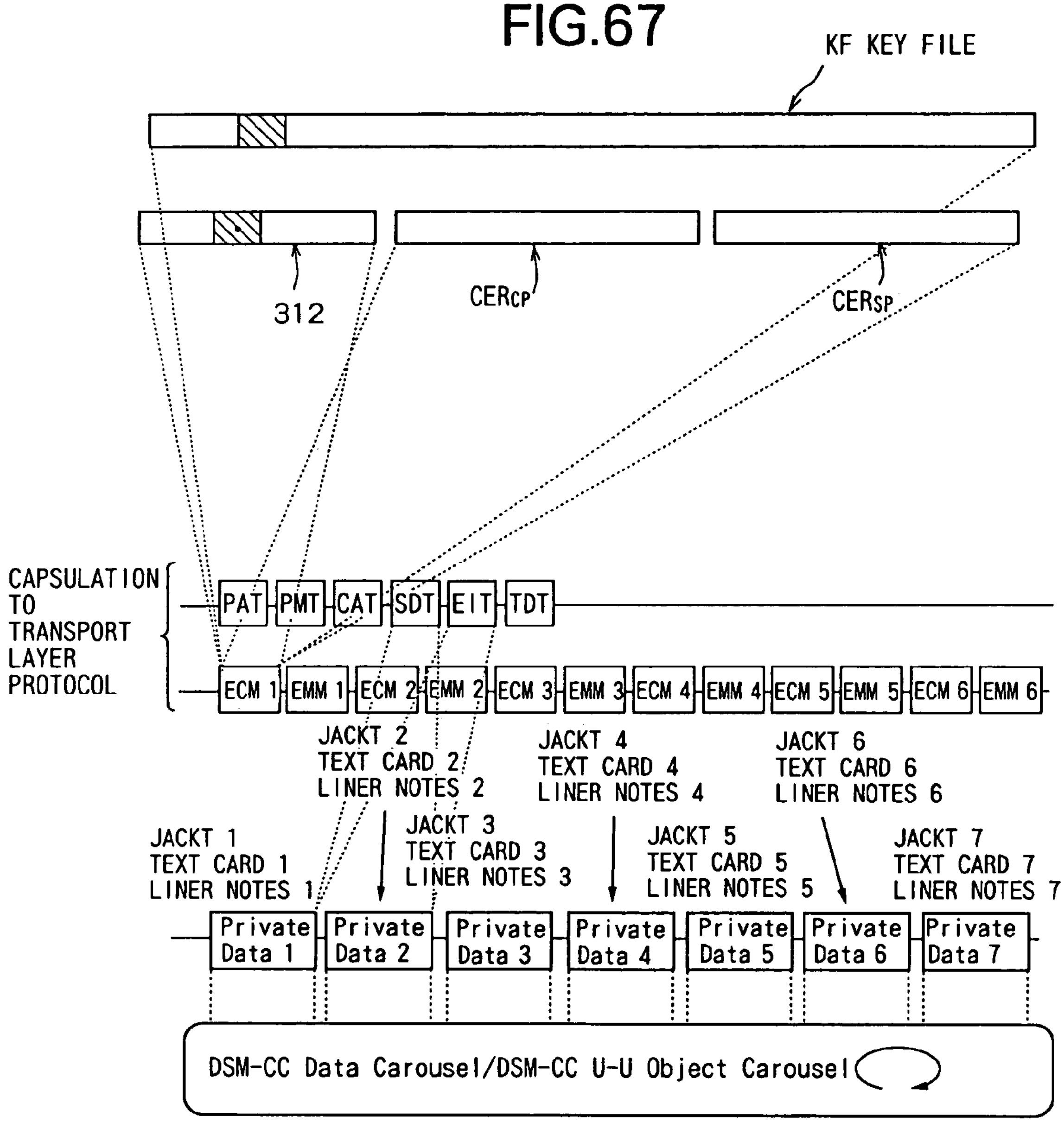
FIG. 67 is a view for explaining the transmission format of the key file stored in the secure container shown in FIG. 65.

Also, as shown in FIG. 67, the key file KF, price tag data 312, and the certificate data $CER_{CP}$ and $CER_{SP}$ are stored in an ECM (entitlement control message) in TS Packet of the transport layer protocol.

Here, a mutual link is established among the content file CF, key file KF, price tag data 312, and the certificate data $CER_{CP}$ and $CER_{SP}$ by the directory structure data $DSD_1$ in the header of the content file CF.

Next, the user home network management unit 357 supplies the secure container 304 to the user home network 303 off-line and/or on-line.

Where the secure container 304 is to be distributed to the network apparatus $360_1$ of the user home network 303 on-line, the user home network management unit 357 encrypts the secure container 304 by using the session key data $K_{SES}$ in the encryption and/or decryption unit 352 after the mutual certification and then distributes the same via the network to the network apparatus $360_1$.

Note that, where the secure container 304 is to be broadcasted via for example a satellite, the user home network management unit 357 encrypts the secure container 304 by using scramble key data $K_{SCR}$ or the like. Further, scramble key data $K_{SCR}$, is encrypted by using work key data $K_W$, and the work key data $K_W$ is encrypted by using master key data $K_W$.

Then, the user home network management unit 357 transmits scramble key data $K_{SCR}$ and the work key data $K_W$ together with the secure container 304 to the user home network 303 via the satellite.

Also, for example it stores the master key data $K_M$ in the IC card or the like and distributes the same to the user home network 303 off-line.

Also, when receiving the SP use purchase log data 309 concerning the content data C distributed by the related service provider 310 from the user home network 303, the user home network management unit 357 writes this into the storage unit 351.

The service provider 310 refers to the SP use purchase log data 309 when determining the service content in the future. Further, the user preference filter generation unit 920 analyzes the preference of the users of the SAMs $305_1$ to $305_4$ transmitting the related SP use purchase log data 309 based on the SP use purchase log data 309 to produce user preference filter data 900 and transmits this via the user home network management unit 357 to the CA module 311 of the user home network 303.

Figure 68:
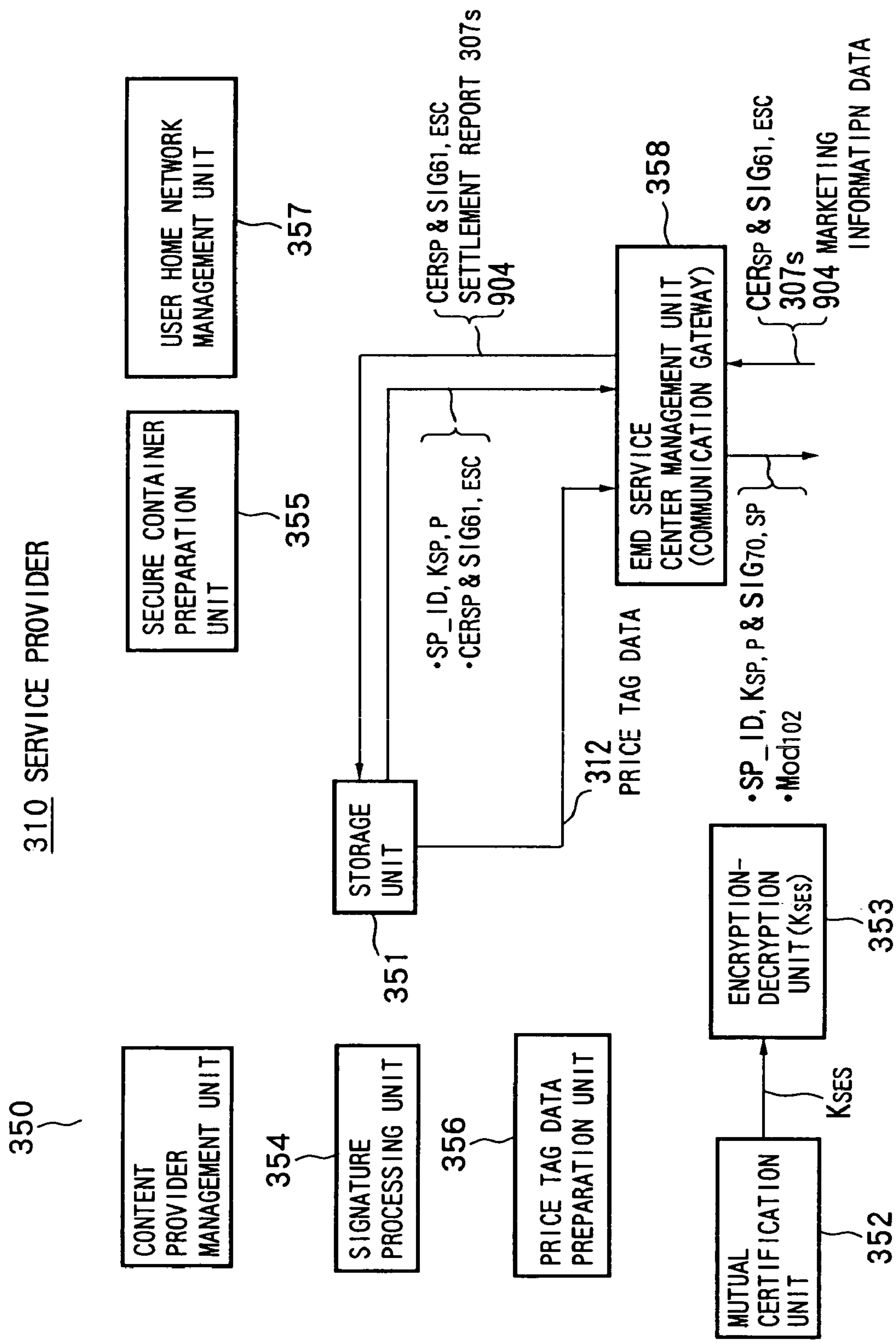
FIG. 68 is a functional block diagram of the service provider shown in FIG. 59 and a view of the flow of the data transmitted and received with the EMD service center.

In FIG. 68, the flow of the data related to the communication with the EMD service center 302 in the service provider 310 is shown.

Note that, as the prerequisite of performing the following processing, the interested party of the service provider 310 performs registration processing at the EMD service center 302 off-line by using for example its own ID card and a bank account for performing the settlement processing and acquires the global unique identifier SP_ID. The identifier SP_ID is stored in the storage unit 351.

First, an explanation will be made of the processing where the service provider 310 requests the certificate data $CER_{SP}$ for certifying the legitimacy of the public key data $K_{SP,S}$ corresponding to its own secret key data $K_{SP,S}$ at the EMD service center 302 by referring to FIG. 54.

The service provider 310 generates a random number by using the true random number generator to produce the secret key data $K_{SP,S}$, produces the public key data $K_{SP,S}$ corresponding to the related secret key data $K_{SP,S}$, and stores the same in the storage unit 351.

The identifiers SP_ID and the public key data $K_{SP,S}$ of the EMD service center management unit 358 and the service provider 310 are read out from the storage unit 351.

Then, the EMD service center management unit 358 transmits the identifier SP_ID and the public key data $K_{SP,P}$ to the EMD service center 302.

Then, the EMD service center management unit 348 receives as its inputs the certificate data $CER_{SP}$ and the signature data $SIG_{61,ESC}$ thereof from the EMD service center 302 in accordance with the related registration and writes the same into the storage unit 351.

Next, an explanation will be made of the processing of the case where the service provider 310 registers and authenticates the price tag data 312 in the EMD service center 302 by referring to FIG. 54.

Figure 69:
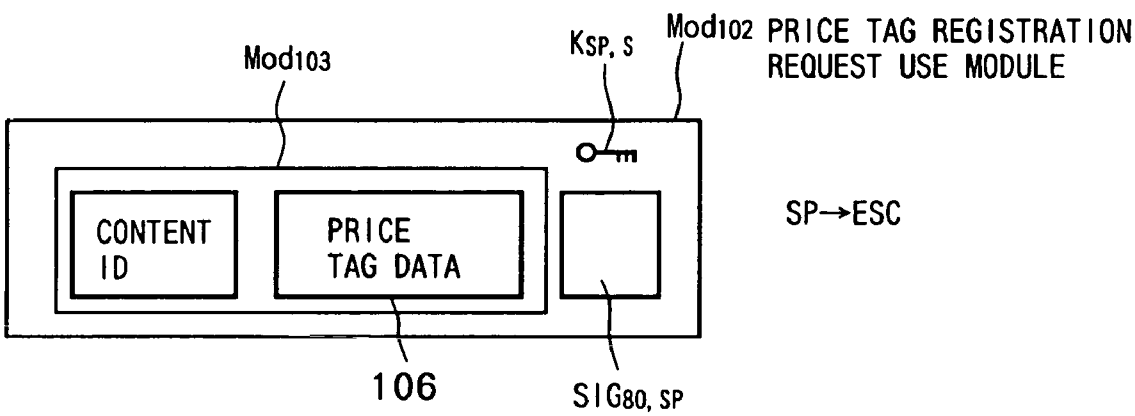
FIG. 69 is a view for explaining the format of a price tag registration request use module transmitted from the service provider to the EMD service center.

In this case, in the signature processing unit 354, the hash value of a module $Mod_{103}$ shown in FIG. 69 storing the price tag data 312 read out from the storage unit 351 and the content ID as the global unique identifier is found, and signature data $SIG_{80,SP}$ is produced by using the secret key data $K_{SP,S}$.

Also, the certificate data $CER_{SP}$ and the signature data $SIG_{61,ESC}$ thereof are read out from the storage unit 351.

Then, after encrypting a price tag registration request use module $Mod_{102}$ shown in FIG. 69 by using the session key data $K_{SES}$ obtained by the mutual certification between the mutual certification unit 352 and the EMD service center 302 in the encryption and/or decryption unit 353, it is transmitted from the EMD service center management unit 358 to the EMD service center 302.

Note that, it is also possible if the global unique identifier SP_ID of the service provider 310 is stored in the module $Mod_{102}$.

Also, the EMD service center management unit 358 writes a settlement report data 307*s* received from the EMD service center 302 into the storage unit 351.

Also, the EMD service center management unit 358 stores marketing information data 904 received from the EMD service center 302 in the storage unit 351.

The marketing information data 904 is used as a reference when the service provider 310 determines the content data C to be distributed from then on.

[EMD Service Center 302]

The EMD service center 302 functions as the certificate authority (CA), key management authority, and the rights clearing authority as mentioned before.

Figure 70:
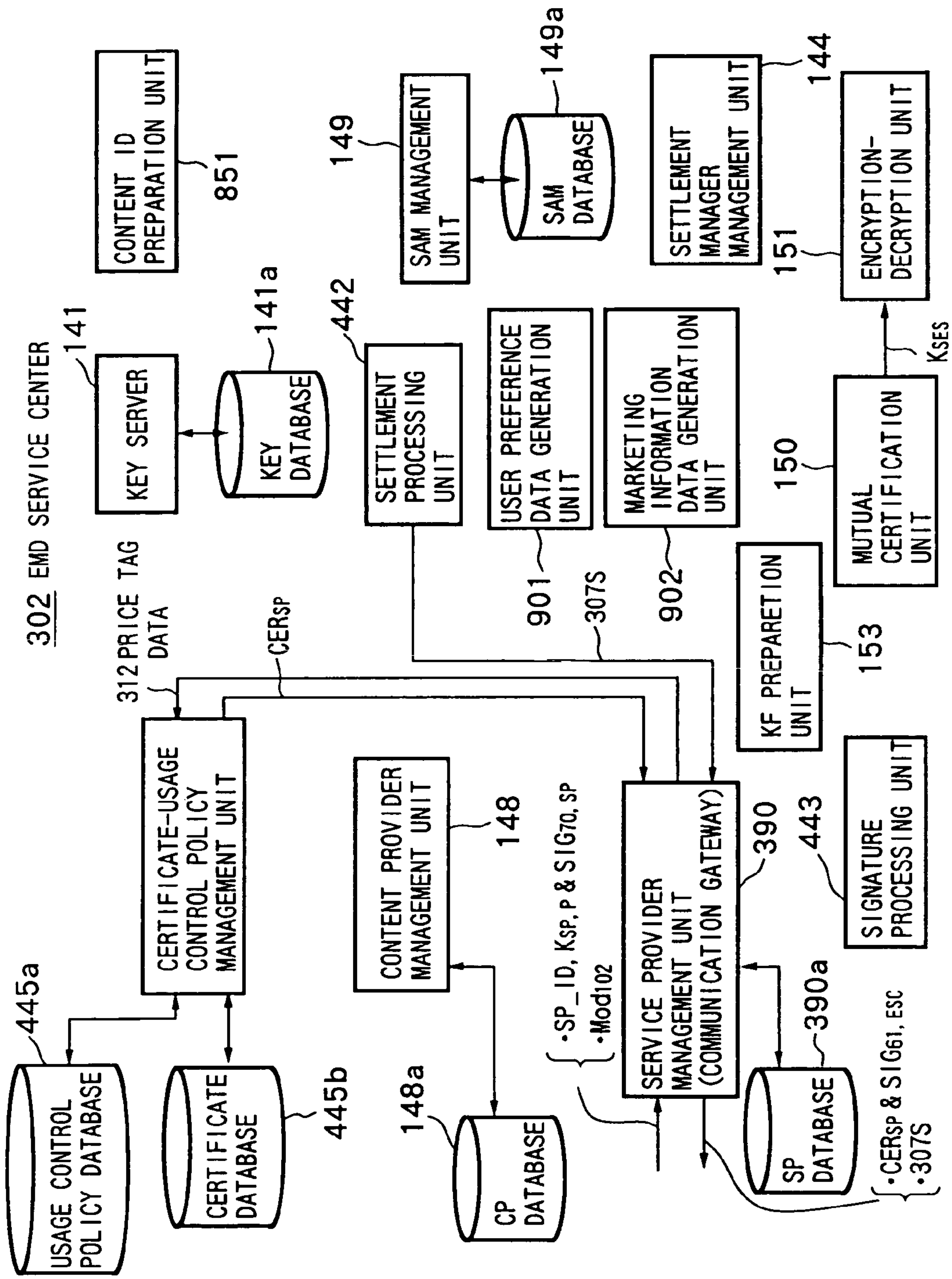
FIG. 70 is a functional block diagram of the EMD service center shown in FIG. 59 and a view of the flow of the data related to the data transmitted and received with the service provider.

FIG. 70 is a view of the configuration of the EMD service center 302.

As shown in FIG. 70, the EMD service center 302 has a key server 141, a key database 141*a*, a KF preparation unit 153, a settlement processing unit 442, a signature processing unit 443, a settlement manager management unit 144, a certificate and usage control policy management unit 445, a CER database 445*a*, a certificate database 445*b*, a content provider management unit 148, a CP database 148*a*, a SAM management unit 149, a SAM database 149*a*, a mutual certification unit 150, an encryption and/or decryption unit 151, a service provider management unit 390, an SP database 390*a*, a content ID preparation unit 851, a user preference filter generation unit 901, and a marketing information data generation unit 902.

In FIG. 70, the functional blocks given the same reference numerals as those of FIG. 23 and FIG. 24 have substantially the same functions as those of the functional blocks having the same reference numerals explained in the first embodiment.

Below, an explanation will be made of the functional blocks given the new reference numerals in FIG. 70.

Note that, in FIG. 70, the flow of the data related to the data transmitted and received between the EMD service center 302 and the service provider 310 in the flow of the data among the functional blocks in the EMD service center 302 is shown.

Figure 71:
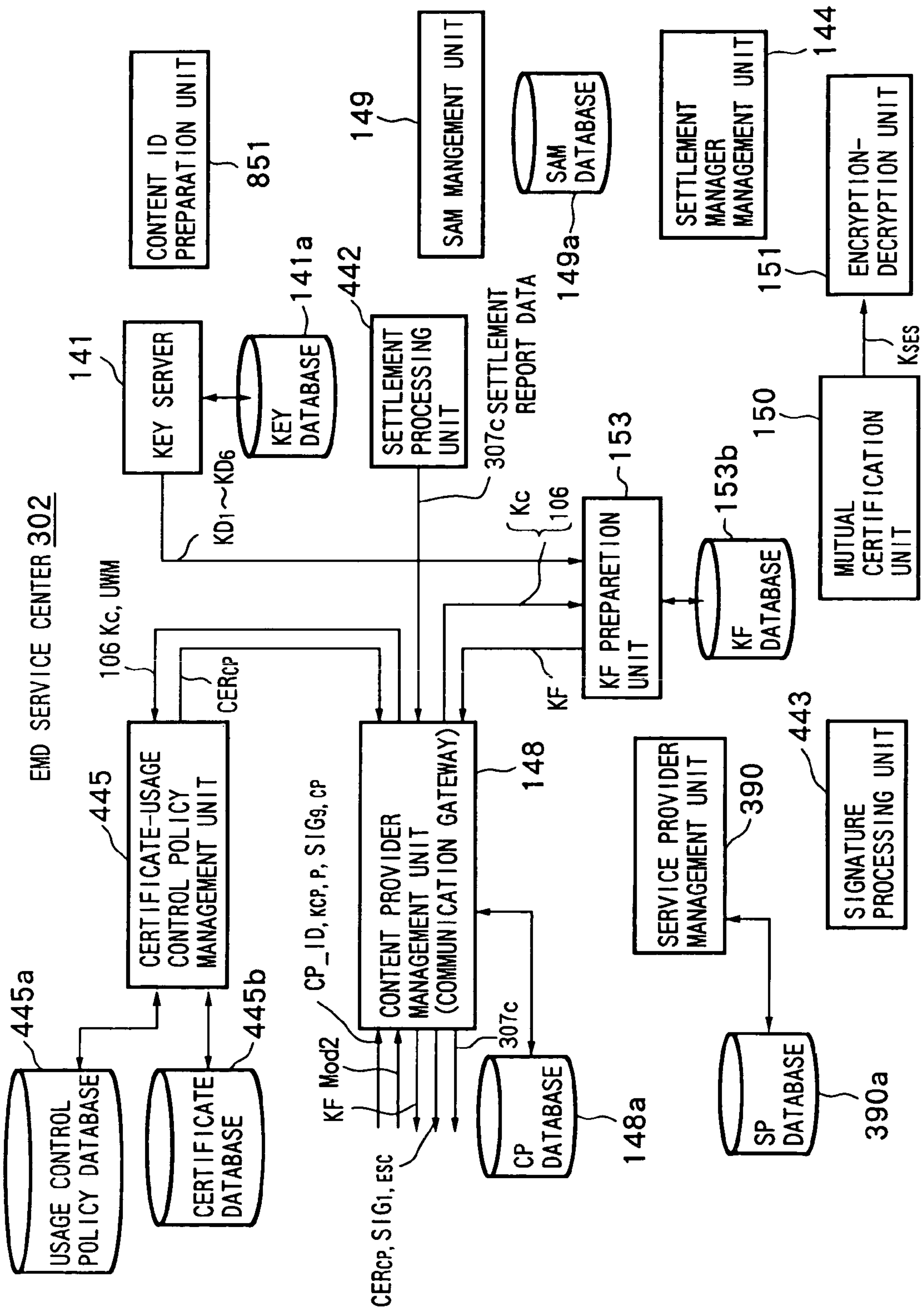
FIG. 71 is a functional block diagram of the EMD service center shown in FIG. 59 and a view of the flow of the data related to the data transmitted and received with the content provider.

Further, in FIG. 71, the flow of the data related to the data transmitted and received between the EMD service center 302 and the content provider 301 in the flow of the data among the functional blocks in the EMD service center 302 is shown.

Figure 72:
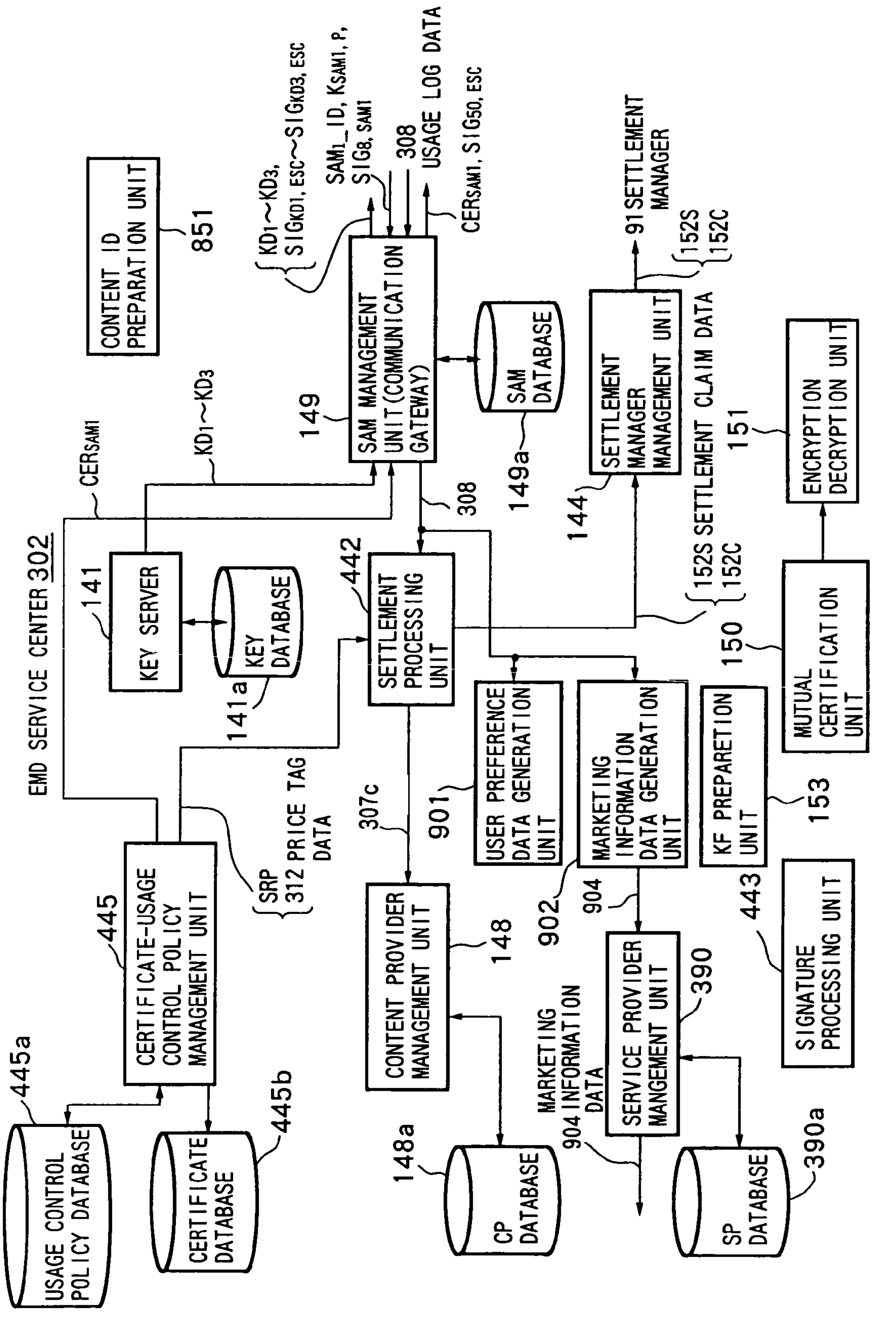
FIG. 72 is a functional block diagram of the EMD service center shown in FIG. 59 and a view of the flow of the data related to the data transmitted and received with the SAM.

Further, in FIG. 72, the flow of the data related to the data transmitted and received between the EMD service center 302 and the SAMs $\mathbf{305}_1$ to $\mathbf{305}_4$ shown in FIG. 59 and the settlement manager 91 in the flow of the data among the functional blocks in the EMD service center 302 is shown.

The settlement processing unit 442 performs the settlement processing based on the usage log data 308 input from the SAMs $\mathbf{305}_1$ to $\mathbf{305}_4$ and the suggested retailer's price data SPR and the price tag data 312 input from the certificate and usage control-policy management unit 445 as shown in FIG. 72. Note that, at this time, the settlement processing unit 442 monitors the existence of dumping etc. by the service provider 310.

The settlement processing unit 442 produces settlement report data 307*c* and settlement claim data 152*c* for the content provider 301 as shown in FIG. 72 by the settlement processing and outputs them to the content provider management unit 148 and the settlement manager management unit 144.

Also, by the settlement processing, as shown in FIG. 70 and FIG. 72, the settlement report data 307*s* and settlement claim data 152*s* for the service provider 310 are produced and are output to the service provider management unit 390 and the settlement manager management unit 144.

Here, the settlement claim data 152*c* and 152*s* are authenticated data enabling claim of payment of money to the settlement manager 91 based on the related data.

Here, the usage log data 308 is used when determining the payment of the license fee related to the secure container 304 in the same way as the usage log data 108 explained in the first embodiment. In the usage log data 308, for example, as shown in FIG. 73, the identifier of the content data C stored in the secure container 304, that is, the content ID, the identifier CP_ID of the content provider 301 providing the content data C stored in the secure container 304, the identifier SP_ID of the service provider 310 distributing the secure container 304, signal parameter data of the content data C, the compression method of the content data C in the secure container 304, the identifier Media_ID of the storage medium storing the secure container 304, the identifiers SAM_ID of the SAMs $\mathbf{305}_1$ to $\mathbf{305}_4$ receiving the distribution of the secure container 304, the USER_IDs of the users of the related SAMs $\mathbf{105}_1$ to $\mathbf{105}_4$, etc. are described. Accordingly, in a case where the money paid by the user of the user home network 303 must be distributed to the license owners of for example the compression method and the storage medium other than the owners of the content provider 301 and the service provider 310, the EMD service center 302 determines the sum of money to be paid to the other parties based on the distribution rate table determined in advance and produces the settlement report data and settlement claim data in accordance with the related determination.

The certificate and usage control policy management unit 445 reads out the certificate data $CER_{CP}$, certificate data $CER_{SP}$, the certificate data $CER_{SAM1}$ to $CER_{SAM2}$, etc. registered and authenticated in the certificate database 445*b* and, at the same time, registers and authenticates the usage control policy data 106 and content key data Kc of the content provider 301, the price tag data 312 of the service provider 310, etc. in the CER database 445*a*.

At this time, the certificate and usage control policy management unit 445 obtains the hash values of the usage control policy data 106, content key data Kc, the price tag data 312, etc., attaches the signature data using the secret key data $K_{ESC,S}$, and produces the authenticated certificate data.

The content provider management unit 148 has a function of communicating with the content provider 101 and can access the CP database 148*a* for managing the registered identifier CP_ID etc. of the content provider 101.

The user preference filter generation unit 901 produces user preference filter data 903 for selecting the content data C in accordance with the preference of the users of the SAMs $\mathbf{305}_1$ to $\mathbf{305}_4$ transmitting the related usage log data 308 based on the usage log data 308 and transmits the user preference filter data 903 to the SAMs $\mathbf{305}_1$ to $\mathbf{305}_4$ transmitting the related usage log data 308 via the SAM management unit 149.

The marketing information data generation unit 902 produces the marketing information data 904 indicating the purchase situation etc. of the whole content data C distributed to the user home network 103 by for example a plurality of service providers 310 based on the usage log data 308 and transmits this via the service provider management unit 390 to the service provider 310. The service provider 310 determines the content of the service to be provided from then on with reference to the marketing information data 904.

Below, an explanation will be made of the flow of the processing in the EMD service center 302.

The distribution use key data $KD_1$ to $KD_3$ are transmitted from the EMD service center 302 to the SAMs $\mathbf{305}_1$ to $\mathbf{305}_4$ in the same way as the case of the first embodiment.

Also, the processing in the case where the EMD service center 302 receives the issuance request of the certificate data from the content provider 301 is the same as the first embodiment except for the point that the certificate and usage control policy management unit 445 accesses the certificate database 445*b*. Further, the processing of registering the usage control policy data 106 etc. is similar to the case of the first embodiment mentioned above except for the point that the certificate and usage control policy management unit 445 stores the related data in the CER database 445*a*.

Next, an explanation will be made of the processing in the case where the EMD service center 302 receives the issuance request of the certificate data from the service provider 310 by referring to FIG. 70.

In this case, when receiving the identifier SP_ID, public key data $K_{SP,P}$ and signature data $SIG_{70,SP}$ of the service provider 310 given by the EMD service center 302 in advance from the service provider 310, the service provider management unit 390 decrypts them by using the session key data $K_{SES}$ obtained by the mutual certification between the mutual certification unit 150 and the mutual certification unit 352 shown in FIG. 63.

Then, after confirming the legitimacy of the related decrypted signature data $SIG_{70,SP}$ at the signature processing unit 443, it is confirmed whether or not the service provider 310 issuing the issuance request of the related certificate data is registered in the SP database 390*a* based on the identifier SP_ID and the public key data $K_{SP,P}$.

Then, the certificate and usage control policy management unit 445 reads out the certificate data $CER_{SP}$ of the related service provider 310 from the certificate database 445*b* and outputs the same to the service provider management unit 390.

Also, the signature processing unit 443 obtains the hash value of the certificate data $CER_{SP}$, produces the signature data $SIG_{61,ESC}$ by using the secret key data $K_{ESC,S}$ of the EMD service center 302, and outputs this to the service provider management unit 390.

Then, the service provider management unit 390 encrypts the certificate data $CER_{SP}$ and the signature data $SIG_{61,ESC}$ thereof by using the session key data $K_{SES}$ obtained by the mutual certification between the mutual certification unit 150 and the mutual certification unit 352 shown in FIG. 63 and then transmits the same to the service provider 310.

Note that, the processing where the EMD service center 302 receives the issuance request of the certificate data from the SAMs $\mathbf{105}_1$ to $\mathbf{105}_4$ is similar to the first embodiment.

Further, also the processing where the EMD service center 302 receives the registration request of the usage control policy data 106 and the content key data Kc from the content provider 301 is similar to that of the first embodiment.

Further, also the processing of preparing the key file KF in accordance with the registration use module $Mod_2$ received from the content provider 301 by the EMD service center 302 and transmitting the same to the content provider 301 is similar to the first embodiment.

Next, an explanation will be made of the processing where the EMD service center 302 receives the registration request of the price tag data 312 from the service provider 310 by referring to FIG. 70.

In this case, when the service provider management unit 390 receives the price tag registration request module $Mod_{102}$ shown in FIG. 69 from the service provider 310, it decrypts the price tag registration request module $Mod_{102}$ by using the session key data $K_{SES}$ obtained by the mutual certification between the mutual certification unit 150 and the mutual certification unit 352 shown in FIG. 63.

Then, after confirming the legitimacy of the signature data $SIG_{80,SP}$ stored in the related decrypted price tag registration request module $Mod_{102}$ in the signature processing unit 443, the price tag data 312 stored in the price tag registration request module $Mod_{102}$ is registered and authenticated in the CER database 445*a* via the certificate and usage control policy management unit 445.

Next, an explanation will be made of the processing where the settlement is carried out in the EMD service center 302 by referring to FIG. 72.

When receiving as its inputs the usage log data 308 and signature data $SIG_{205,SAM1}$, thereof from for example the SAM $\mathbf{305}_1$ of the user home network 303, the SAM management unit 149 decrypts the usage log data 308 and the signature data $SIG_{205,SAM1}$ by using the session key data $K_{SES}$ obtained by the mutual certification between the mutual certification unit 150 and the SAMs $\mathbf{305}_1$ to $\mathbf{305}_4$, verifies the signature data $SIG_{205,SAM1}$ by using the public key data $K_{SAM1,P}$ of the SAM $\mathbf{305}_1$, and then outputs the same to the settlement processing unit 442.

Then, the settlement processing unit 442 performs the settlement processing based on the usage log data 308 input from the SAM $\mathbf{305}_1$ and the suggested retailer's price data SRP and the price tag data 312 input from the certificate and usage control policy management unit 445.

The settlement processing unit 442 produces settlement report data 307*c* and settlement claim data 152*c* for the content provider 301 and outputs them to the content provider management unit 148 and the settlement manager management unit 144 as shown in FIG. 72.

Also, by the settlement processing, as shown in FIG. 70 and FIG. 72, the settlement report data 307*s* and the settlement claim data 152*s* for the service provider 310 are produced and are output to the service provider management unit 390 and the settlement manager management unit 144.

Next, the settlement manager management unit 144 performs the mutual certification of the settlement claim data 152*c* and 152*s* and the signature data produced for them by using the secret key data $K_{SES,S}$ and the decryption by the session key data $K_{SES}$ and then transmits the same to the settlement manager 91 via the payment gateway 90 shown in FIG. 59.

By this, the money of the sum indicated in the settlement claim data 152*c* is paid to the content provider 301, and the money of the sum indicated in the settlement claim data 152*s* is paid to the service provider 310.

Next, an explanation will be made of the processing in the case where the EMD service center 302 transmits the settlement report data 307*c* and 307*s* to the content provider 301 and the service provider 310.

When settlement is carried out in the settlement processing unit 442, the settlement report data 307*c* is output from the settlement processing unit 442 to the content provider management unit 148.

When receiving as input the settlement report data 307*c* from the settlement processing unit 442, the content provider management unit 148 encrypts this by using the session key data $K_{SES}$ obtained by the mutual certification between the mutual certification unit 150 and the mutual certification unit 120 shown in FIG. 60 and then transmits the same to the content provider 301.

Also, when the settlement is carried out in the settlement processing unit 442, the settlement report data 307*s* is output from the settlement processing unit 442 to the service provider management unit 390.

When receiving as input the settlement report data 307*s* from the settlement processing unit 442, the service provider management unit 390 encrypts this by using the session key data $K_{SES}$ obtained by the mutual certification between the mutual certification unit 150 and the mutual certification unit 352 shown in FIG. 63 and then transmits the same to the service provider 310.

The EMD service center 302 performs processing at the time of shipment of the SAMs $\mathbf{305}_1$ to $\mathbf{305}_4$ and the registration processing of the SAM registration list in the same way as the EMD service center 102 of the first embodiment other than the above.

[User Home Network 303]

The user home network 303 has the network apparatus $360_1$ and the A/V apparatuses $360_2$ to $360_4$ as shown in FIG. 59.

The network apparatus $360_1$ includes the built-in CA module 311 and the SAM $305_1$. Further, the A/V apparatuses $360_2$ to $360_4$ include the built-in SAMs $305_2$ to $305_4$.

The SAMs $305_2$ to $305_4$ are connected to each other via a bus 191, for example, an IEEE serial interface bus.

Note that, it is possible if the AV apparatuses $360_2$ to $360_4$ have a network communication function or do not have the network communication function, but utilize the network communication function of the network apparatus $360_1$ via the bus 191.

Also, it is also possible if the user home network 303 has only AV apparatuses not having network functions.

Below, an explanation will be made of the network apparatus $360_1$.

Figure 74:
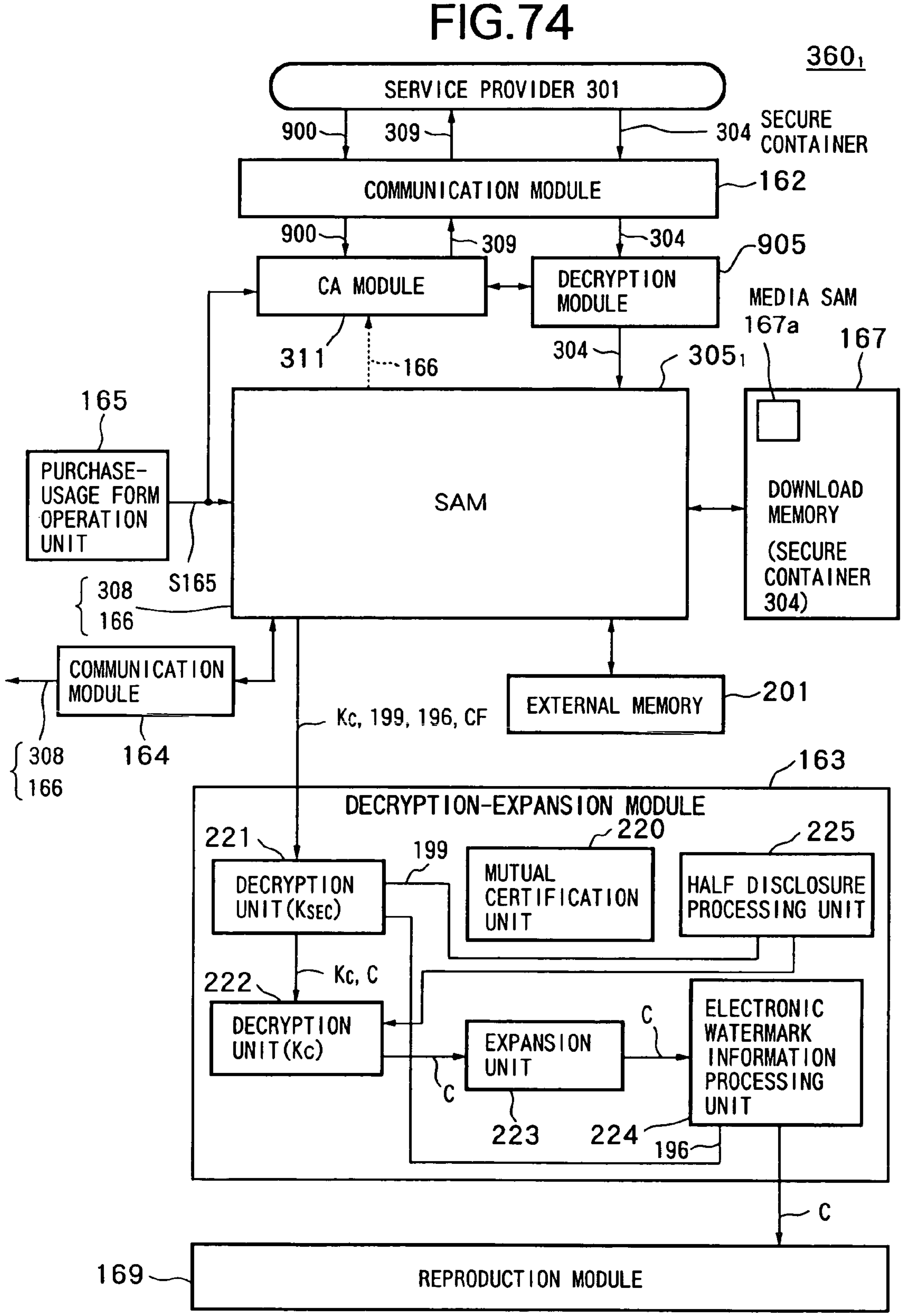
FIG. 74 is a view of the configuration of the network apparatus shown in FIG. 59.

FIG. 74 is a view of the configuration of the network apparatus $360_1$.

As shown in FIG. 74, the network apparatus $360_1$ has a communication module 162, CA module 311, decryption module 905, SAM $305_1$, decryption and/or expansion module 163, purchase and/or usage form determination operation unit 165, download memory 167, reproduction module 169, and external memory 201.

In FIG. 74, components given the same reference numerals as those of FIG. 25 are the same as the components of the same reference numerals explained in the first embodiment.

The communication module 162 performs the communication processing with the service provider 310.

Concretely, the communication module 162 outputs the secure container 304 received from the service provider 310 by a satellite broadcast or the like to the decryption module 905. Also, the communication module 162 outputs user preference filter data 900 received via a telephone line or the like at the service provider 310 to the CA module 311 and, at the same time, transmits SP use purchase log data 309 input from the CA module 311 to the service provider 310 via the telephone line or the like.

Figure 75:
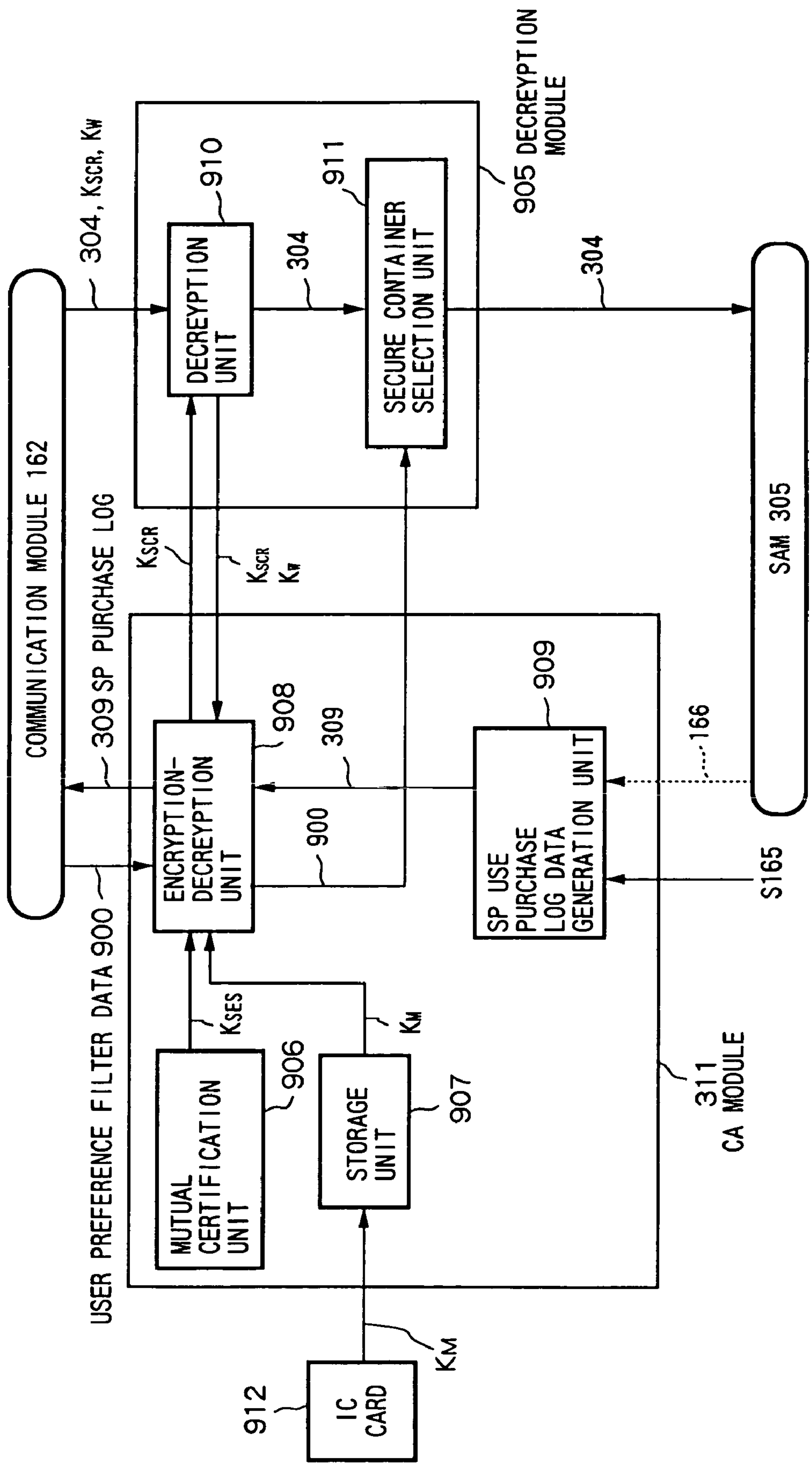
FIG. 75 is a functional block diagram of a CA module shown in FIG. 74.

FIG. 75 is a functional block diagram of the CA module 311 and the decryption module 905.

As shown in FIG. 75, the CA module 311 has a mutual certification unit 906, a storage unit 907, an encryption and/or decryption unit 908 and an SP use purchase log data generation unit 909.

When transmitting and receiving the data between the CA module 311 and the service provider 310 via the telephone line, the mutual certification unit 906 performs the mutual certification with the service provider 310 to produce the session key data $K_{SES}$ and outputs this to the encryption and/or decryption unit 908.

The storage unit 907 stores the master key data $K_M$ supplied from the service provider 310 off-line by using an IC card 912 etc. after for example a contract is established between the service provider 310 and the user.

The encryption and/or decryption unit 908 receives as its inputs the encrypted scramble key data $K_{SCR}$ and work key data $K_W$ from a decryption unit 910 of the decryption module 905 and decrypts the work key data $K_W$ by using the master key data $K_M$ read out from the storage unit 907. Then, the encryption and/or decryption unit 908 decrypts the scramble key data $K_{SCR}$ by using the related decrypted work key data $K_w$ and outputs the related decrypted scramble key data $K_{SCR}$ to the decryption unit 910.

Also, the encryption and/or decryption unit 908 decrypts the user preference filter data 900 received by the communication module 162 from the service provider 310 via the telephone line or the like by using the session key data $K_{SES}$ from the mutual certification unit 906 and outputs the same to a secure container selection unit 911 of the decryption module 905.

Also, the encryption and/or decryption unit 908 decrypts the SP use purchase log data 309 input from the SP use purchase log data generation unit 909 by using the session key data $K_{SES}$ from the mutual certification unit 906 and transmits the same via the communication module 162 to the service provider 310.

The SP use purchase log data generation unit 909 produces the SP use purchase log data 309 indicating the purchase log of the content data C inherent in the service provider 310 based on the operation signal S165 in accordance with the purchase operation of the content data C by the user by using the purchase and/or usage form determination operation unit 165 shown in FIG. 74, or the usage control status data 166 from the SAM $305_1$ and outputs this to the encryption and/or decryption unit 908.

The SP use purchase log data 309 includes for example the information to be collected from the user concerning the distribution service by the service provider 310, the monthly base fee (network rent), contract (update) information, and the purchase log information.

Note that, the CA module 311 communicates with a charge database, a customer management database, and a marketing information database of the service provider 310 when the service provider 310 has the charge function. In this case, the CA module 311 transmits the charge data for the distribution service of the content data to the service provider 310.

The decryption module 905 has a decryption unit 910 and a secure container selection unit 911.

The decryption unit 910 receives as its inputs the encrypted secure container 304, scramble key data $K_{SCR}$, and the work key data $K_W$ from the communication module 162.

Then, the decryption unit 910 outputs the encrypted scramble key data $K_{SCR}$ and work key data $K_W$ to the encryption and/or decryption unit 908 of the CA module 311 and receives as its input the decrypted scramble key data $K_{SCR}$ from the encryption and/or decryption unit 908.

Then, the decryption unit 910 decrypts the encrypted secure container 304 by using the scramble key data $K_{SCR}$ and then outputs the same to the secure container selection unit 911.

Note that, where the secure container 304 is transmitted from the service provider 310 by an MPEG2 Transport Stream method, for example, the decryption unit 910 extracts the scramble key data $K_{SCR}$ from an ECM (Entitlement Control Message) in a TS Packet and extracts the work key data $K_w$ from an EMM (Entitlement Management Message).

In the ECM, other than the above, for example, program attribute information for every channel are contained. Further, in the EMM, other than this, individual demo contract information different for every user (listener) etc. are contained.

The secure container selection unit 911 filters the secure containers 304 input from the decryption unit 910 by using the user preference filter data 900 input from the CA module 311, selects the secure container 304 in accordance with the preference of the user, and outputs the same to the SAM $305_1$.

Next, an explanation, will be made of the SAM $305_1$.

Note that, the SAM $305_1$ has basically the same function and structure as the SAM $105_1$ of the first embodiment mentioned before by using FIG. 26 to FIG. 41 except it performs the processing concerning the service provider 310 in addition to the content provider 310, for example, it performs the signature verification processing for the service provider 310.

Also, the SAMs $305_2$ to $305_4$ basically have the same functions as that of the SAM $305_1$.

Namely, the SAMs $305_1$ to $305_4$ are modules for performing charge processing in units of content and communicate with the EMD service center 302.

Below, the function of the SAM $305_1$ will be explained in detail.

Figure 76:
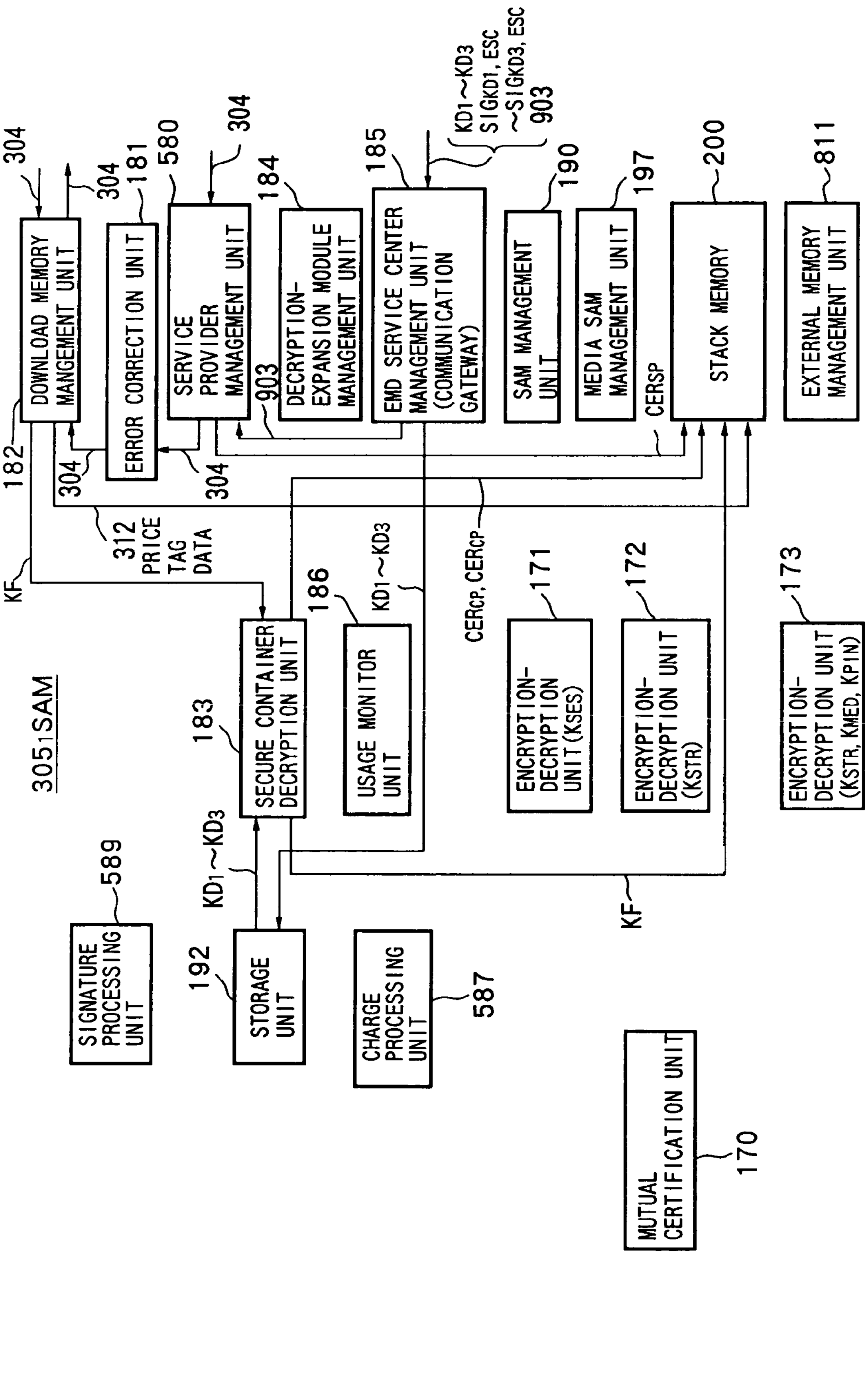
FIG. 76 is a functional block diagram of the SAM shown in FIG. 74 and a view of the flow of the data from the input of the secure container to decryption.

FIG. 76 is a view of the configuration of the SAM $305_1$.

Note that, in FIG. 76, the flow of the data related to the processing when receiving as input the secure container 304 from the service provider 310 is shown.

As shown in FIG. 76, the SAM $305_1$ has the mutual certification unit 170, encryption and/or decryption units 171, 172, and 173, error correction unit 181, download memory management unit 182, secure container decryption unit 183, decryption and/or expansion module management unit 184, EMD service center management unit 185, usage monitor unit 186, signature processing unit 189, SAM management unit 190, storage unit 192, media SAM management unit 197, stack memory 200, a service provider management unit 580, a charge processing unit 587, a signature processing unit 598, and the external memory management unit 811.

Note that, the predetermined function of the SAM $305_1$ shown in FIG. 76 is realized by executing a secret program in the CPU in the same way as the case of the SAM $105_1$.

In FIG. 76, functional blocks given the same reference numerals as those of FIG. 26 are the same as the functional blocks having the same reference numerals explained in the first embodiment.

Also, in the external memory 201 shown in FIG. 74, after the processing explained in the first embodiment and the processing mentioned later, the usage log data 308 and the SAM registration list are stored.

Also, in the stack memory 200, as shown in FIG. 77, the content key data Kc, usage control policy data (UCP) 106, lock key data $K_{LOC}$ of the storage unit 192, certificate data $CER_{CP}$ of the content provider 301, certificate data $CER_{SP}$ of the service provider 310, usage control status data (UCS) 366, SAM program download containers $SDC_1$ to $SFDC_3$, the price tag data 312, etc. are stored.

Below, an explanation will be made of the functional blocks newly given reference numerals in FIG. 76 among the functional blocks of the SAM $305_1$.

The signature processing unit 589 verifies the signature data in the secure container 304 by using the public key data $K_{ESC,P}$ of the EMD service center 302, public key data $K_{CP,P}$ of the content provider 301, and the public key data $K_{SP,P}$ of the service provider 310 read out from the storage unit 192 or the stack memory 200.

Figure 78:
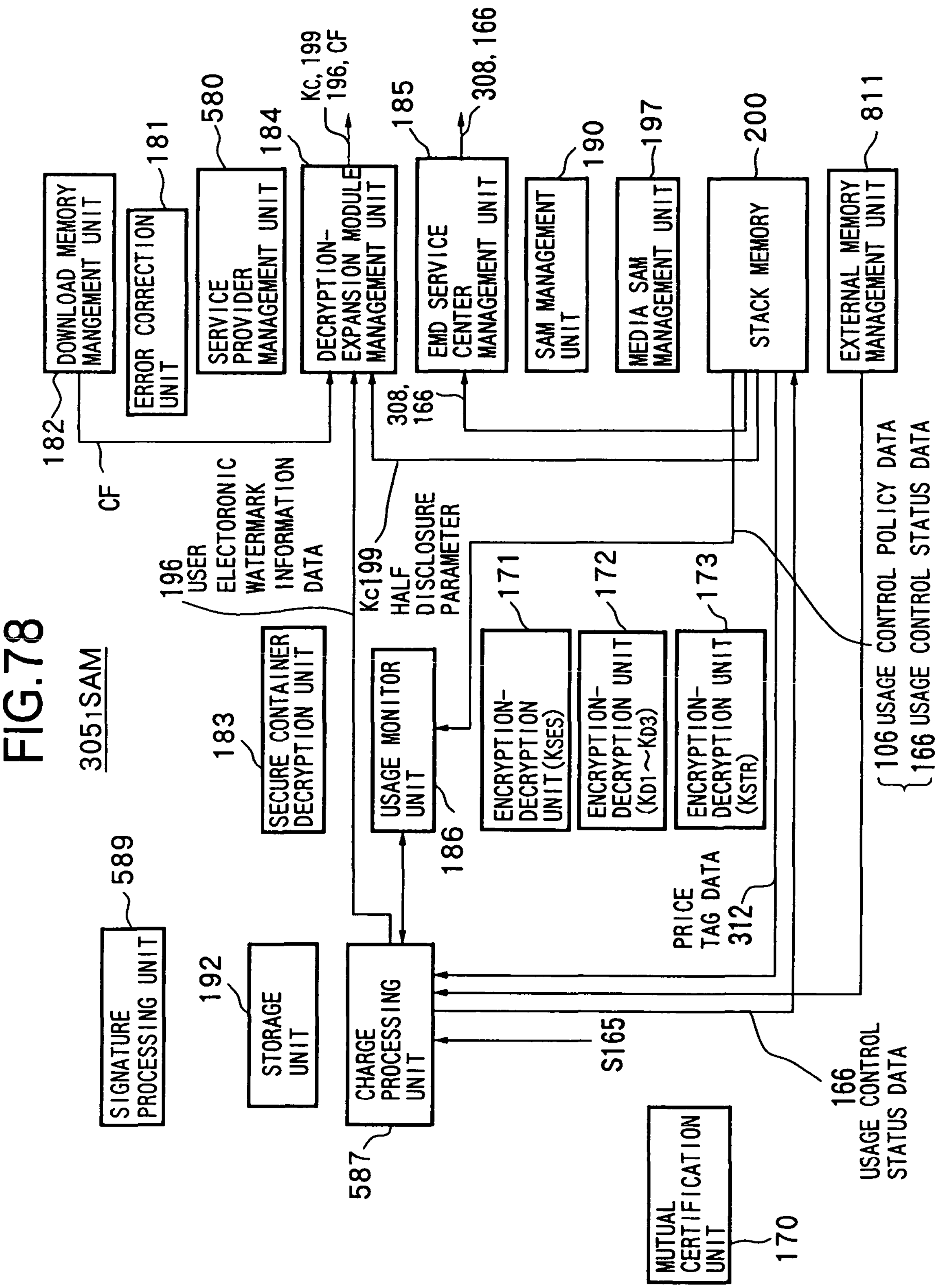
FIG. 78 is a functional block diagram of the SAM shown in FIG. 74 and a view of the flow of the data in a case where a purchase and/or usage form of the content etc. are determined.

The charge processing unit 587 performs the charge processing in accordance with the purchase and/or usage form of the content by the user based on the operation signal 5165 from the purchase and/or usage form determination operation unit 165 shown in FIG. 74 and the price tag data 312 read out from the stack memory 200 as shown in FIG. 78.

The charge processing by the charge processing unit 587 is carried out based on the rights contents such as the usage permission condition indicated by the usage control policy data 106 and the usage control status data 166 under the monitoring of the usage monitor unit 186. Namely, the user can purchase and use the content within the range according to the related rights content etc.

Also, the charge processing unit 587 produces the usage log data 308 in the charge processing and writes this into the external memory 201 via the external memory management unit 811.

Here, the usage log data 308 is used when determining the payment of the license fee related to the secure container 304 in the EMD service center 302 in the same way as the usage log data 108 of the first embodiment.

Also, the charge processing unit 587 produces the usage control status (UCS) data 166 describing the purchase and/or usage form of the content by the user based on the operation signal S165 and writes this into the stack memory 200.

As the purchase form of the content, there are for example outright purchase without restriction as to the reproduction by the purchaser or copying for use of the related purchaser and a reproduction charge for charging whenever the content is reproduced.

Here, the usage control status data 166 is produced when the user determines the purchase form of the content and used for control so that the user will use the related content within the range permitted by the related determined purchase form from then on. In the usage control status data 166, the ID of the content, purchase form, outright purchase price, SAM_ID of the SAM for which the related content was purchased, the USER_ID of the user purchasing the content, etc. are described.

Note that, where the determined purchase form is a reproduction charge, for example, the usage control status data 166 is transmitted from the SAM $305_1$ to the service provider 310 in real-time, and the service provider 310 instructs the EMD service center 302 to take the usage log data 308 from the SAM $105_1$.

Also, where the determined purchase form is outright purchase, for example, the usage control status data 166 is transmitted to the service provider 310 and the EMD service center 302 in real-time.

Also, in the SAM $305_1$, as shown in FIG. 76, the user preference filter data 903 received via the EMD service center management unit 185 from the EMD service center 302 is output to the service provider management unit 580. Then, in the service provider management unit 580, among the secure containers 304 input from the decryption module 905 shown in FIG. 74, the secure container 304 filtered based on the user preference filter data 903 and thus responding to the preference of the user is selected, and the related selected secure container 304 is output to the error correction unit 181. By this, in the SAM $305_1$, the selection processing of the content data C based on the preference of the related user obtained from the purchase situation of the content data C by the related user becomes possible for all service providers 310 contracting with the user of the related SAM $305_1$.

Below, the flow of the processing in the SAM $305_1$ will be explained.

The flow of the processing when storing the distribution use key data $KD_1$ to $KD_3$ received from the EMD service center 302 in the storage unit 192 is similar to that of the case of the SAM $105_1$ mentioned before.

Next, an explanation will be made of the flow of the processing in the SAM $305_1$ when receiving as input the secure container 304 from the service provider 310 by referring to FIG. 76.

Mutual certification is carried out between the mutual certification unit 170 and the mutual certification unit 352 of the service provider 310 shown in FIG. 63.

The encryption and/or decryption unit 171 decrypts the secure container 304 shown in FIG. 65 received from the service provider 310 via the service provider management unit 580 by using the session key data $K_{SES}$ obtained by the related mutual certification.

Figures 65A, 65B, 65C, 65D:
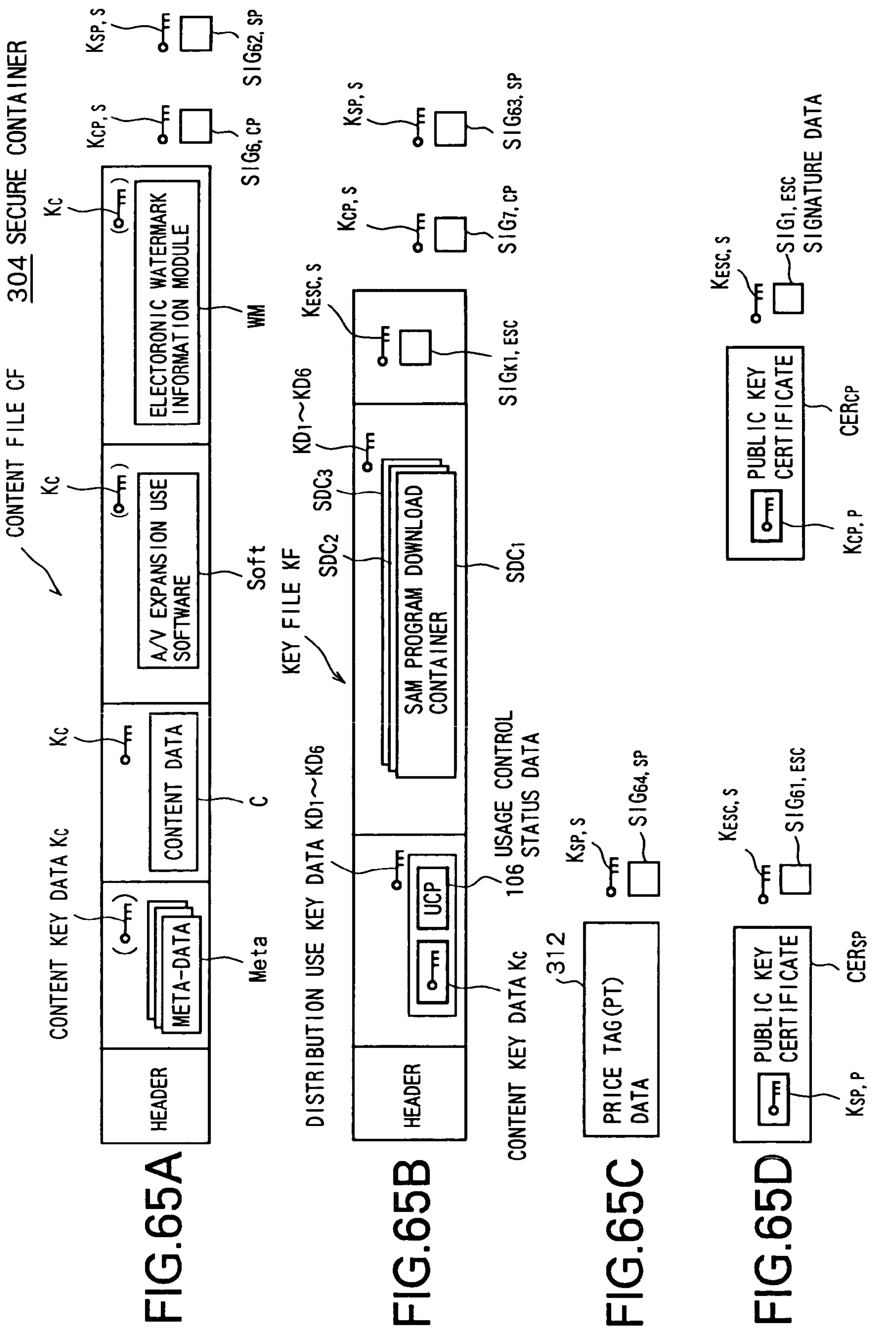
FIGS. 65A to 65D are views for explaining the format of the secure container transmitted from the service provider shown in FIG. 59 to the user home network.

Next, the signature processing unit 589 verifies the signature data $SIG_{61,ESC}$ and $SIG_{1,ESC}$ shown in FIG. 65D, and then verifies the legitimacy of the signature data $SIG_{6,CP}$, $SIG_{62,SP}$, $SIG_{7,CP}$, $SIG_{63,SP}$, and $SIG_{64,SP}$ by using the public key data $K_{SP,P}$ and $K_{CP,P}$ stored in the certificate data $CER_{SP}$ and $CER_{CP}$.

Here, by verifying the signature data $SIG_{6,CP}$ and $SIG_{62,SP}$, the legitimacy of the producer and transmitter of the content file CF is confirmed, by verifying the signature data $SIG_{7,CP}$ and $SIG_{63,SP}$ the legitimacy of the transmitter of the key file KF is confirmed, and by verifying the signature data $SIG_{64,SP}$, the legitimacy of the producer and the transmitter of the price tag data 312 is confirmed.

Also, by verifying the legitimacy of the signature data $SIG_{K1,ESC}$ stored in the key file KF shown in FIG. 65B by using the public key data $K_{ESC,P}$ read out from the storage unit 192, the signature processing unit 589 verifies the legitimacy of the producer of the key file KF and whether or not the key file KF is registered in the EMD service center 302.

When the legitimacy of all signature data mentioned above is confirmed in the signature processing unit 589, the service provider management unit 580 outputs the secure container 304 to the error correction unit 181.

The error correction unit 181 corrects the error of the secure container 304 and then outputs the same to the download memory management unit 182.

The download memory management unit 182 performs the mutual certification between the mutual certification unit 170 and the media SAM 167*a* shown in FIG. 74 and then writes the secure container 304 into the download memory 167.

Next, the download memory management unit 182 performs the mutual certification between the mutual certification unit 170 and the media SAM 167*a* shown in FIG. 74 and then reads out the key file KF shown in FIG. 65B stored in the secure container 304 from the download memory 167 and outputs the same to the secure container decryption unit 183.

Then, in the secure container decryption unit 183, by using the distribution use data $KD_1$ to $KD_3$ of the corresponding period input from the storage unit 192, the content key data Kc, usage control policy data 106, and the SAM program download containers $SDC_1$ to $SDC_3$ stored in the key file KF shown in FIG. 65B are decrypted.

Then, the decrypted content key data Kc, usage control policy data 106, and the SAM program download containers $SDC_1$ to $SDC_3$ are written into the stack memory 200.

Below, an explanation will be made of the flow of the processing until the purchase form of the secure container 304 downloaded on the download memory 167 from the service provider 310 is determined by referring to FIG. 78 and FIG. 79.

Figure 79:
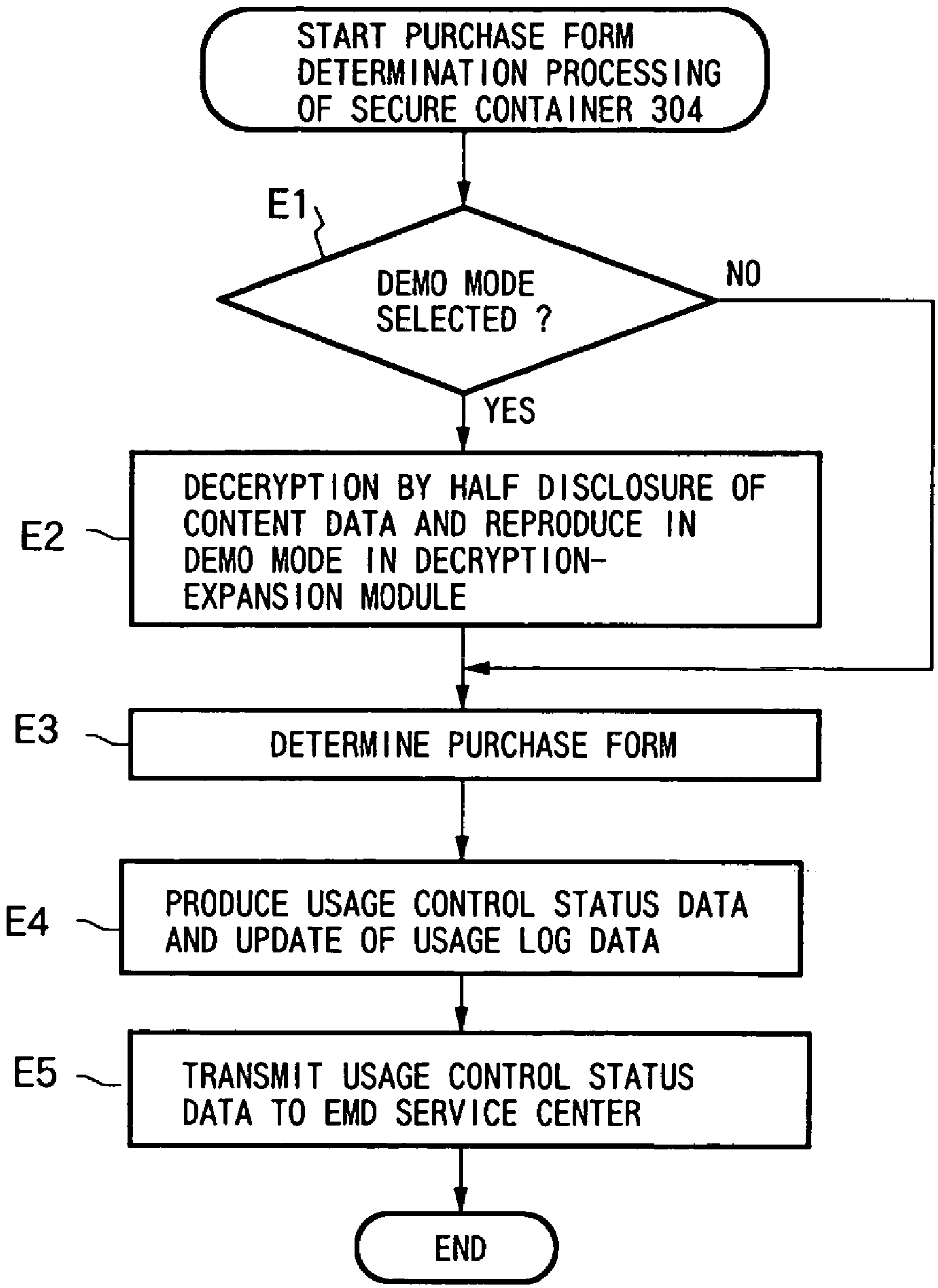
FIG. 79 is a flowchart showing a routine of processing for determining the purchase form of the secure container in the SAM.

FIG. 79 is a flowchart for explaining the purchase form determination processing of the secure container 304.

<Step E1>

Where the operation signal S165 indicating the demo mode is output to the charge processing unit 587 by the operation of the purchase and/or usage form determination operation unit 165 shown in FIG. 74 by the user, the processing of step E2 is carried out. In other cases, the processing of step E3 is carried out.

<Step E2>

This is carried out where the operation signal S165 indicating the demo mode is output to the charge processing unit 587, and for example the content file CF stored in the download memory 167 is output via the decryption and/or expansion module management unit 184 to the decryption and/or expansion module 163 shown in FIG. 74.

At this time, with respect to the content file CF, the mutual certification between the mutual certification unit 170 and the media SAM 167*a* and the encryption and/or decryption by the session key data $K_{SES}$ and the mutual certification between the mutual certification unit 170 and the mutual certification unit 220 and the encryption and/or decryption by the session key data $K_{SES}$ are carried out.

The content file CF is decrypted in the decryption unit 221 shown in FIG. 74 by using the session key data $K_{SES}$ and then output to the decryption unit 222.

Also, the content key data Kc and the half disclosure parameter data 199 read out from the stack memory 200 are output to the decryption and/or expansion module 163 shown in FIG. 74. At this time, after the mutual certification between the mutual certification unit 170 and the mutual certification unit 220, the encryption and decryption by the session key data $K_{SES}$ are carried out with respect to the content key data Kc and the half disclosure parameter data 199.

Next, the decrypted half disclosure parameter data 199 is output to the half disclosure processing unit 225, and under the control from the half disclosure processing unit 225, the decryption of the content data C using the content key data Kc by the decryption unit 222 is carried out in a half disclosure mode.

Next, the content data C decrypted in the half disclosure mode is expanded at the expansion unit 223 and then output to the electronic watermark information processing unit 224.

Next, the user watermark use data 196 is buried in the content data C in the electronic watermark information processing unit 224, then the content data C is reproduced at the reproduction module 169, and sound in accordance with the content data C is output.

<Step E3>

When the user determines the purchase form by operating the purchase and/or usage form determination operation unit 165, the operation signal S165 indicating the related determined purchase form is output to the charge processing unit 187.

<Step E4>

In the charge processing unit 187, the usage log data 308 and the usage control status data 166 in accordance with the determined purchase form are produced, the usage log data 308 is written into the external memory 201 via the external memory management unit 811, and the usage control status data 166 is written into the stack memory 200.

Thereafter, in the usage monitor unit 186, control (monitor) is carried out so that the content is purchased and used within the range permitted by the usage control status data 166.

Figures 81A, 81B, 81C, 81D, 81E:
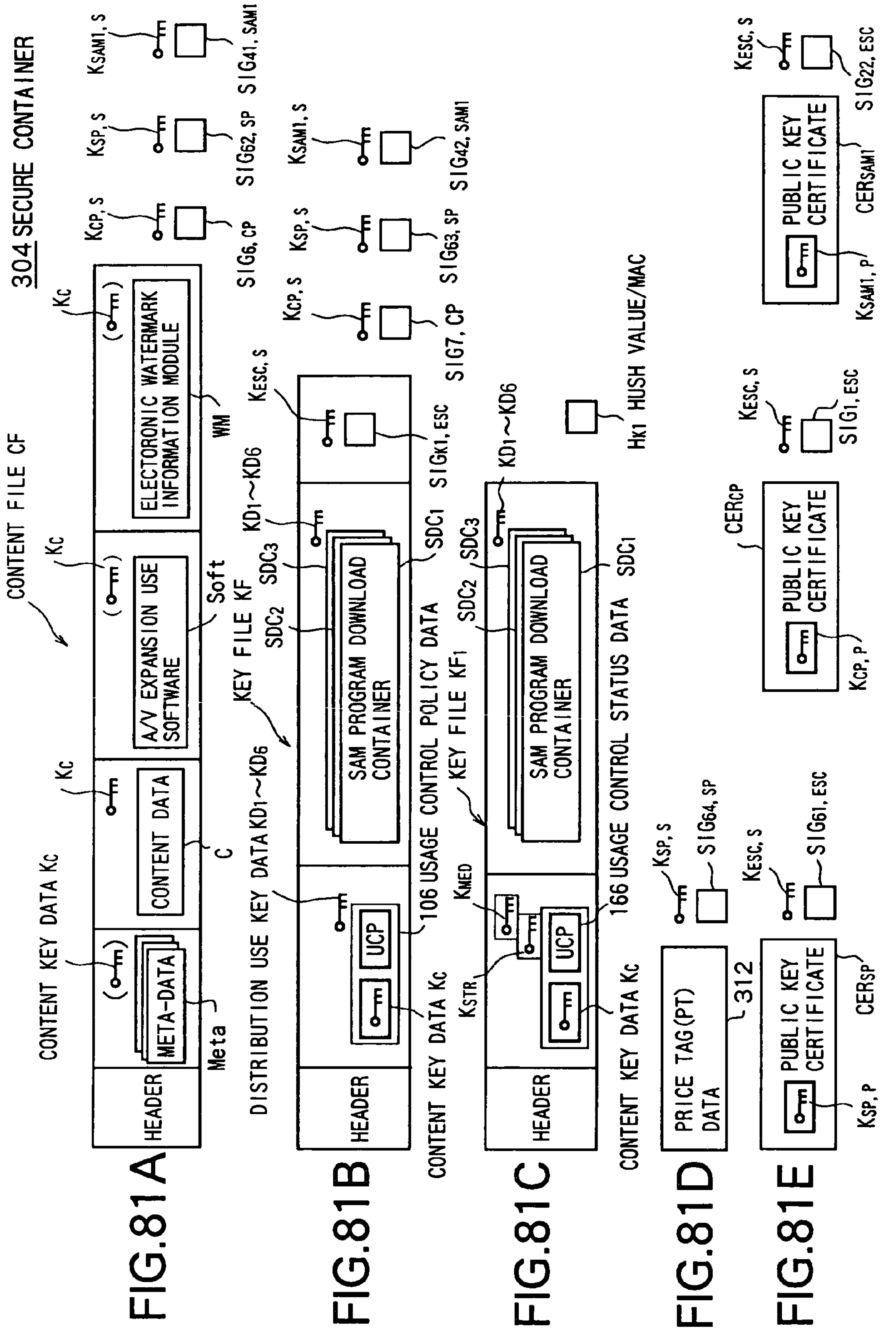
FIGS. 81A to 81E are views for explaining the flow of the processing in the transferred side SAM in a case where the content file downloaded on the download memory of the network apparatus shown in FIG. 74 and with the purchase form already determined therefor is transferred to the SAM of the AV apparatus.

Then, by using the key file KF and the usage control status data 166 stored in the stack memory 200, a new key file $KF_1$ with the purchase form determined therefor shown in FIG. 81C is produced, and the related produced key file $KF_1$ is stored in the stack memory 200.

As shown in FIG. 81C, the usage control status data 166 stored in the key file $KF_1$ has been sequentially encrypted by utilizing the CBC mode of the DES by using the storage key data $K_{STR}$ and the media key data $K_{MED}$.

Here, the storage use key data $K_{STR}$ is data determined in accordance with the type of apparatus, for example, an SACD (Super Audio Compact Disc), DVD (Digital Versatile Disc) apparatus, CD-R apparatus, and MD (Mini Disc) apparatus, and used for establishing one-to-one correspondence between the types of the apparatuses and the types of the storage medium. Also, the media key data $K_w$, is data unique to the storage medium.

Also, in the signature processing unit 589, the hash value $H_{K1}$ of the key file $KF_1$ is produced by using the secret key data $K_{SAM1,S}$ of the SAM $\mathbf{305}_1$, and the related produced hash value $H_{K1}$ is stored in the stack memory 200 in correspondence to the key file $KF_1$.

<Step E5>

The usage control status data 166 is transmitted from the SAM $\mathbf{305}_1$ to the EMD service center 302. The related usage control status data 166 is transmitted whenever the purchase form of the content data is determined in the SAM 305.

Note that, the usage log data 308 is transmitted from the SAM $\mathbf{305}_1$ to the EMD service center 302 at predetermined time intervals of for example one month.

Next, an explanation will be made of the flow of the processing in the case where the content data C for which the purchase form is already determined stored in the download memory 167 is reproduced by referring to FIG. 78.

In this case, under the monitoring by the usage monitor unit 186, based on the operation signal S165, the content file CF stored in the download memory 167 is output to the decryption and/or expansion module 163 shown in FIG. 74.

Also, the content key data Kc read out from the stack memory 200 is output to the decryption and/or expansion module 163.

Then, in the decryption unit 222 of the decryption and/or expansion module 163, the decryption of the content file CF using the content key data Kc and the expansion processing by the expansion unit 223 are carried out, and the content data C is reproduced in the reproduction module 169.

At this time, in the charge processing unit 587, the usage log data 308 stored in the external memory 201 is updated in response to the operation signal S165.

The usage log data 308 is transmitted together with the signature data $SIG_{205,SAM1}$ produced by using the secret key data $K_{SAM1,S}$ via the EMD service center management unit 185 to the EMD service center 302 at a predetermined timing.

Figure 80:
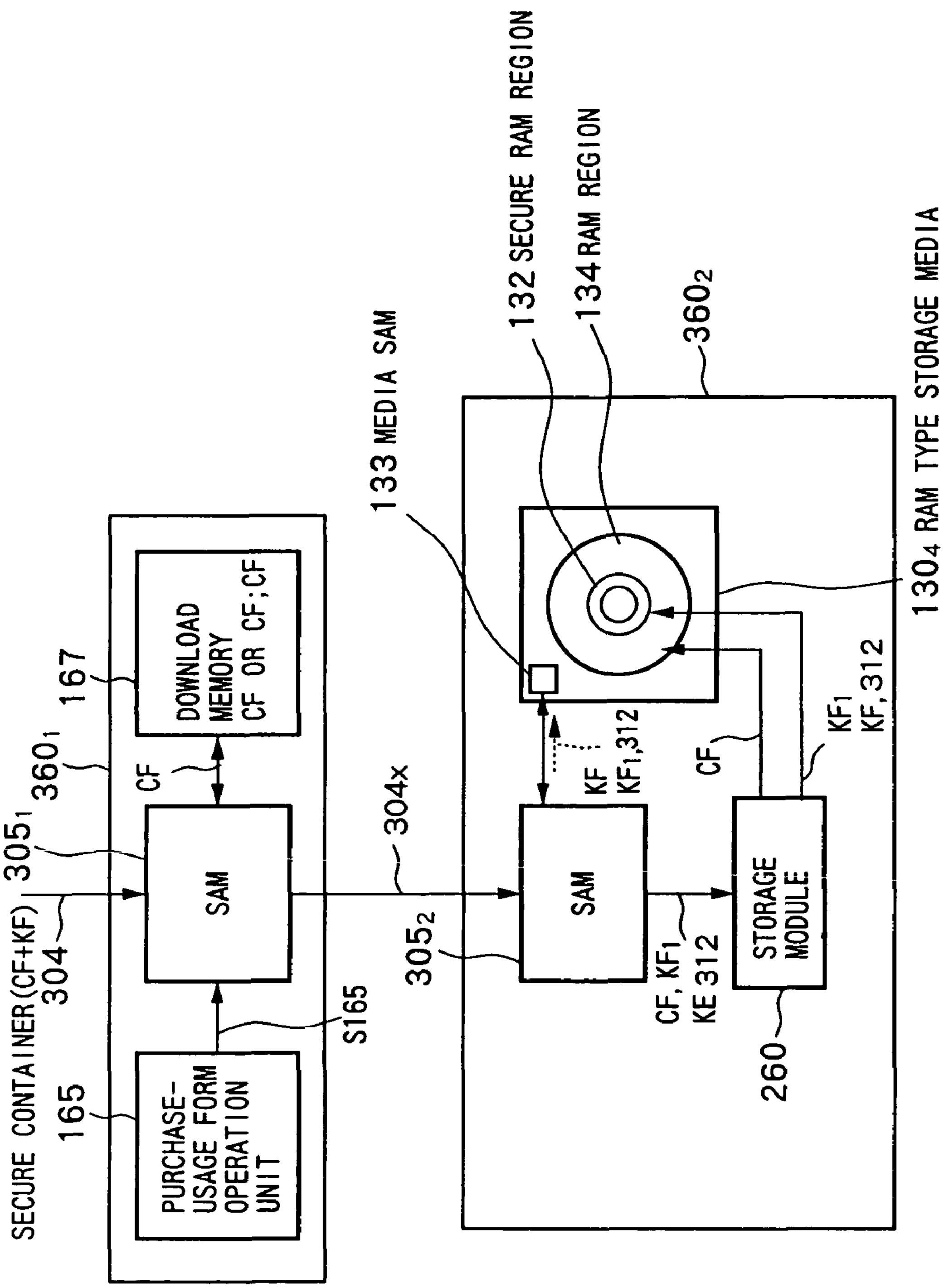
FIG. 80 is a view for explaining the format of the key file after the purchase form is determined.

Next, as shown in FIG. 80, an explanation will be made of the flow of the processing in the SAM $\mathbf{305}_1$ in the case where, for example, the secure container 304*x* shown in FIG. 81 for which the purchase form has been already determined and downloaded on the download memory 167 of the network apparatus $\mathbf{360}_1$ is transferred via the bus 191 to the SAM $\mathbf{305}_1$ of the AV apparatus $\mathbf{360}_2$ by referring to FIG. 82.

The user operates the purchase and/or usage form determination operation unit 165 to instruct to transfer the predetermined content stored in the download memory 167 to the AV apparatus $\mathbf{360}_2$. The operation signal S165 in accordance with the related operation is output to the charge processing unit 587.

By this, the charge processing unit 587 updates the usage log data 308 stored in the stack memory 200 based on the operation signal S165.

Also, the download memory management unit 182 outputs the content files CF and key files KF and $KF_1$ shown in FIGS. 81A, 81B and 81C read out from the download memory 167 to the signature processing unit 589 and the SAM management unit 190.

Then, the signature processing unit 589 produces the signature data $SIG_{41,SAM1}$ and $SIG_{42,SAM1}$ of the content files CF and the key files KF and, at the same time, produces the hash value $H_{K1}$ of the key file $KF_1$, and outputs them to the SAM management unit 190.

Also, the SAM management unit 190 reads out the price tag data 312 and the signature data $SIG_{64,SP}$ thereof and the certificate data $CER_{CP}$ and the signature data $SIG_{1,ESC}$ thereof shown in FIGS. 81D and 81E from the stack memory 200.

Also, the SAM management unit 190 reads out the certificate data $CER_{SAM1}$ and the signature data $SIG_{22,ESC}$ thereof shown in FIG. 81E from the storage unit 192.

Next, the SAM management unit 190 produces the secure container 304*x* shown in FIG. 81.

Also, the mutual certification unit 170 outputs the session key data $K_{SES}$ obtained by mutual certification with the SAM $\mathbf{305}_2$ to the encryption and/or decryption unit 171.

Figure 82:
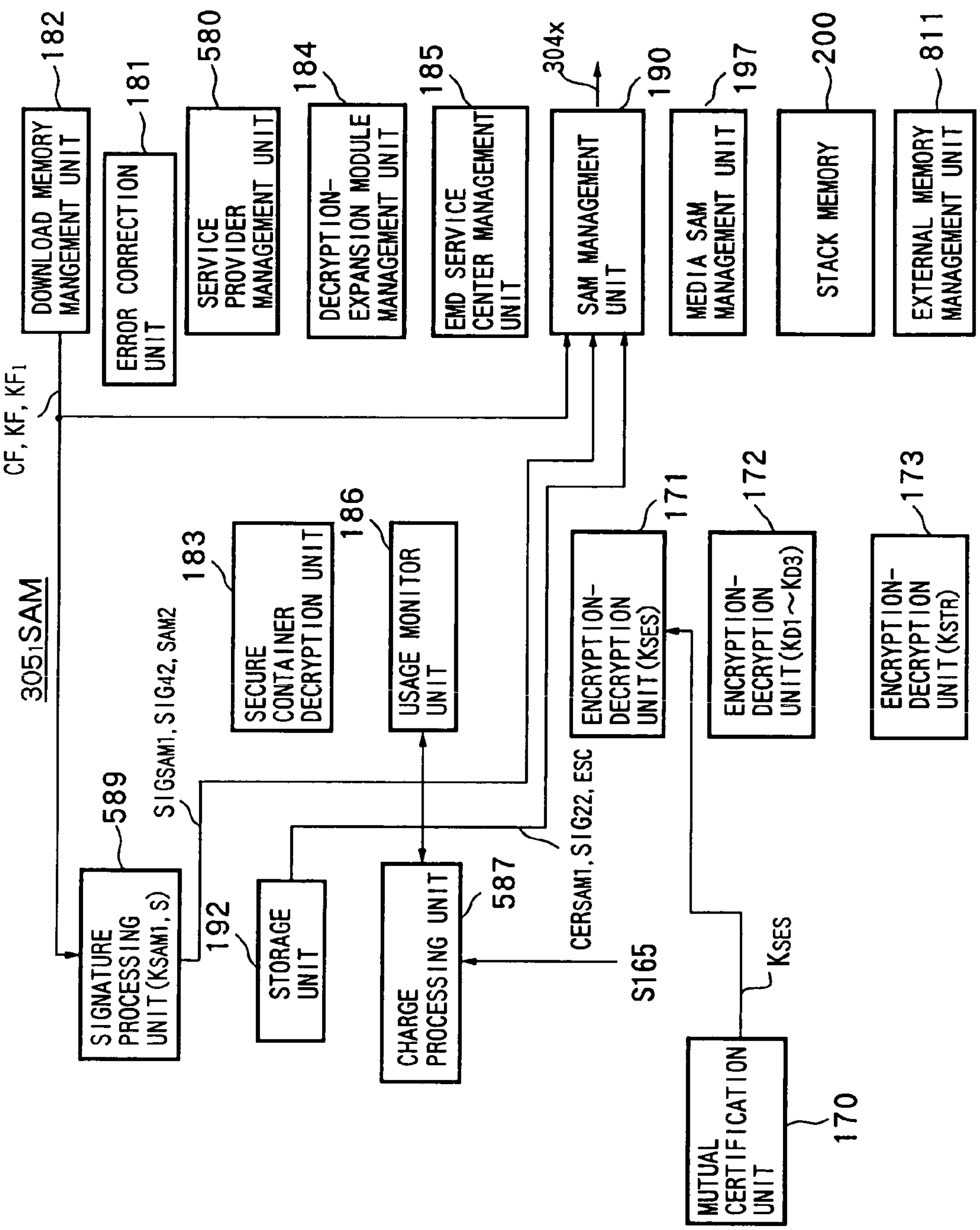
FIG. 82 is a view of the flow of the data in the transferring side SAM in the case shown in FIG. 81.

The SAM management unit 190 encrypts the secure container 304*x* shown in FIG. 81 in the encryption and/or decryption unit 171 by using the session key data $K_{SES}$ and then outputs the same to the SAM $\mathbf{305}_2$ of the AV apparatus $\mathbf{360}_2$ shown in FIG. 82.

Below, as shown in FIG. 80, an explanation will be made of the flow of the processing in the SAM $\mathbf{305}_2$ when writing the secure container 304*x* input from the SAM $\mathbf{305}_1$ into a storage medium such as a RAM by referring to FIG. 83.

Figure 83:
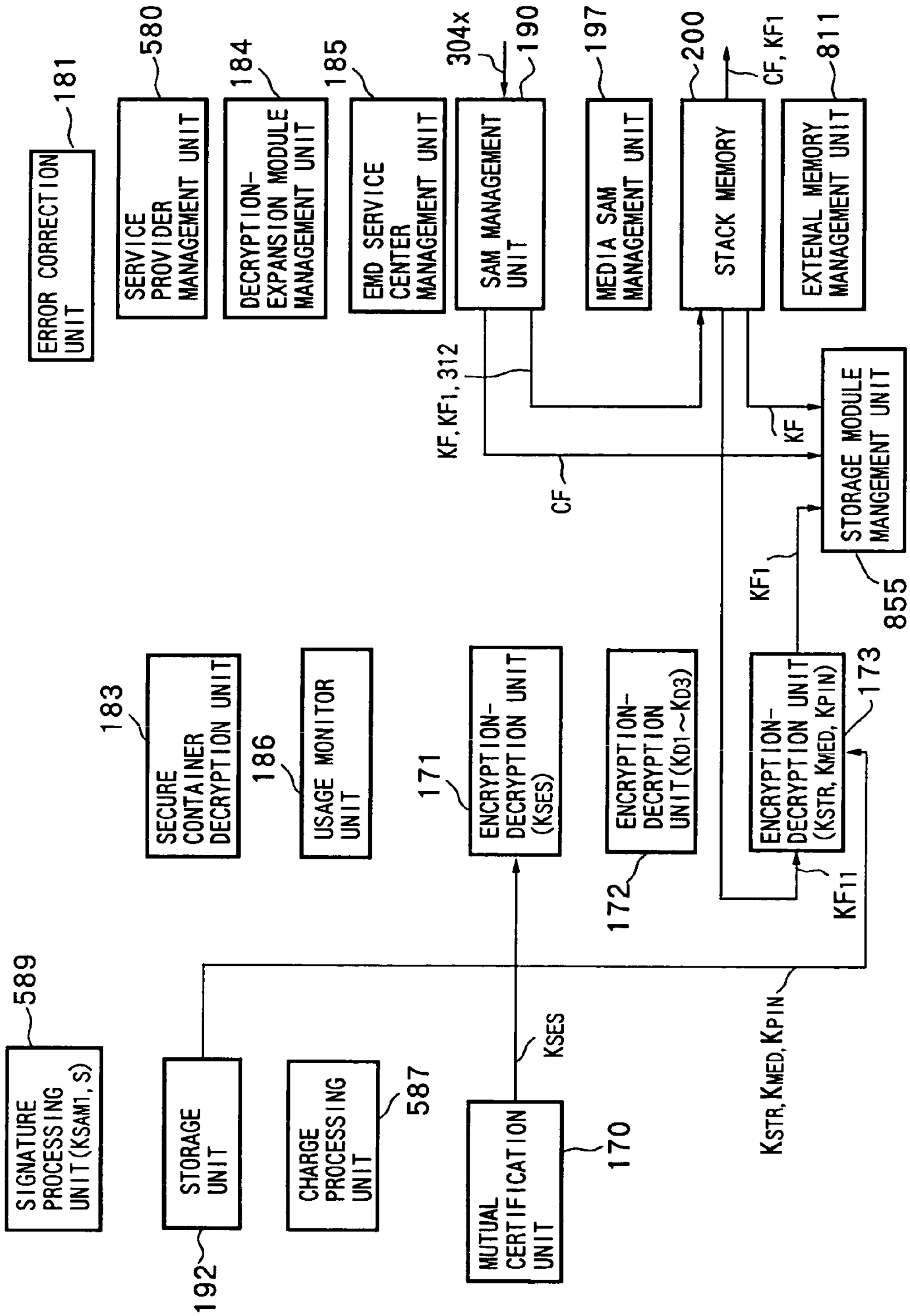
FIG. 83 is a view of the flow of the data in the transferred side SAM in the case shown in FIG. 81.

In this case, the SAM management unit 190 of the SAM $\mathbf{305}_2$ receives as input the secure container 304*x* shown in FIG. 81 from the SAM $\mathbf{305}_1$ of the network apparatus $\mathbf{360}_1$ as shown in FIG. 83.

Then, the mutual certification between the mutual certification unit 170 of the SAM $\mathbf{305}_1$ and the mutual certification unit 170 of the SAM $\mathbf{305}_2$ is carried out, and the signature processing unit 589 decrypts the secure container 304*x* by using the session key data $K_{SES}$ obtained by the related mutual certification.

Next, in the signature processing unit 589, by using the public key data $K_{ESC,P}$ read out from the storage unit 192, the legitimacy of the signature data $SIG_{61,ESC}$ and $SIG_{22,ESC}$ shown in FIG. 81E is verified.

Then, when the legitimacy of the signature data $SIG_{61,ESC}$, $SIG_{1,ESC}$ and $SIG_{22,ESC}$ is confirmed, in the signature processing unit 589, by using the public key data $K_{SP,P}$, $K_{CP,P}$, and $K_{SAM1,P}$ contained in the certificate data $CER_{SP}$, $CER_{CP}$, and $CER_{SAM1}$, the legitimacy of the signature data $SIG_{6,CP}$, $SIG_{62,SP}$, $SIG_{41,SAM1}$, $SIG_{7,CP}$, $SIG_{63,SP}$, $SIG_{42,SAM}$, and $SIG_{64,SP}$ shown in FIGS. 81A to 81D and the hash value $H_{K1}$ is verified.

Then, when the legitimacy of these signature data is confirmed, the key files KF and $KF_1$ and the price tag data 312 are stored in the stack memory 200.

Also, the content file CF is output from the SAM management unit 190 to the storage module management unit 855.

Then, the content key data Kc and the usage control status data 166 stored in the key file $KF_1$ shown in FIG. 81C are read out from the stack memory 200 to the encryption and/or decryption unit 173, and in the encryption and/or decryption unit 173, sequentially encrypted by using the storage use key distribution use data $KD_{STR}$, media key data $K_{MED}$, and the purchaser key data $K_{PIN}$ read out from the storage unit 192 and then output to the storage module management unit 855.

Also, the key file KF read out from the stack memory 200 is output to the storage module management unit 855.

Then, after the mutual certification between the mutual certification unit 170 and the media SAM 133 of the RAM type storage medium $\mathbf{130}_4$, the content file CF is stored in the unsecure RAM region 134 of the RAM type storage medium $\mathbf{130}_4$, and the key files KF and $KF_1$ and the price tag data 312 are written into the secure RAM region 132.

Note that, it is also possible to store the key files KF and $KF_1$ and the price tag data 312 in the media SAM 133 of the RAM type storage medium $\mathbf{130}_4$.

Note that, among the processing in the SAM $\mathbf{305}_1$, the flow of the processing in the AV apparatus $\mathbf{360}_2$ when determining the purchase form of the ROM type storage medium with the purchase form of the content still undetermined and the flow of the processing when reading the secure container 304 from the ROM type storage medium with the purchase form still undetermined in the AV apparatus $360_3$, transferring this to the AV apparatus $360_2$, and writing the same into the RAM type storage medium are the same as the case of the SAM $105_1$ of the first embodiment except for the point that the signature data is verified using the secret key data of the service provider 310 and for the point that the price tag data 312 is stored in the key file with the purchase form determined.

Next, an explanation will be made of the overall operation of the EMD system 300 shown in FIG. 59.

Figure 84:
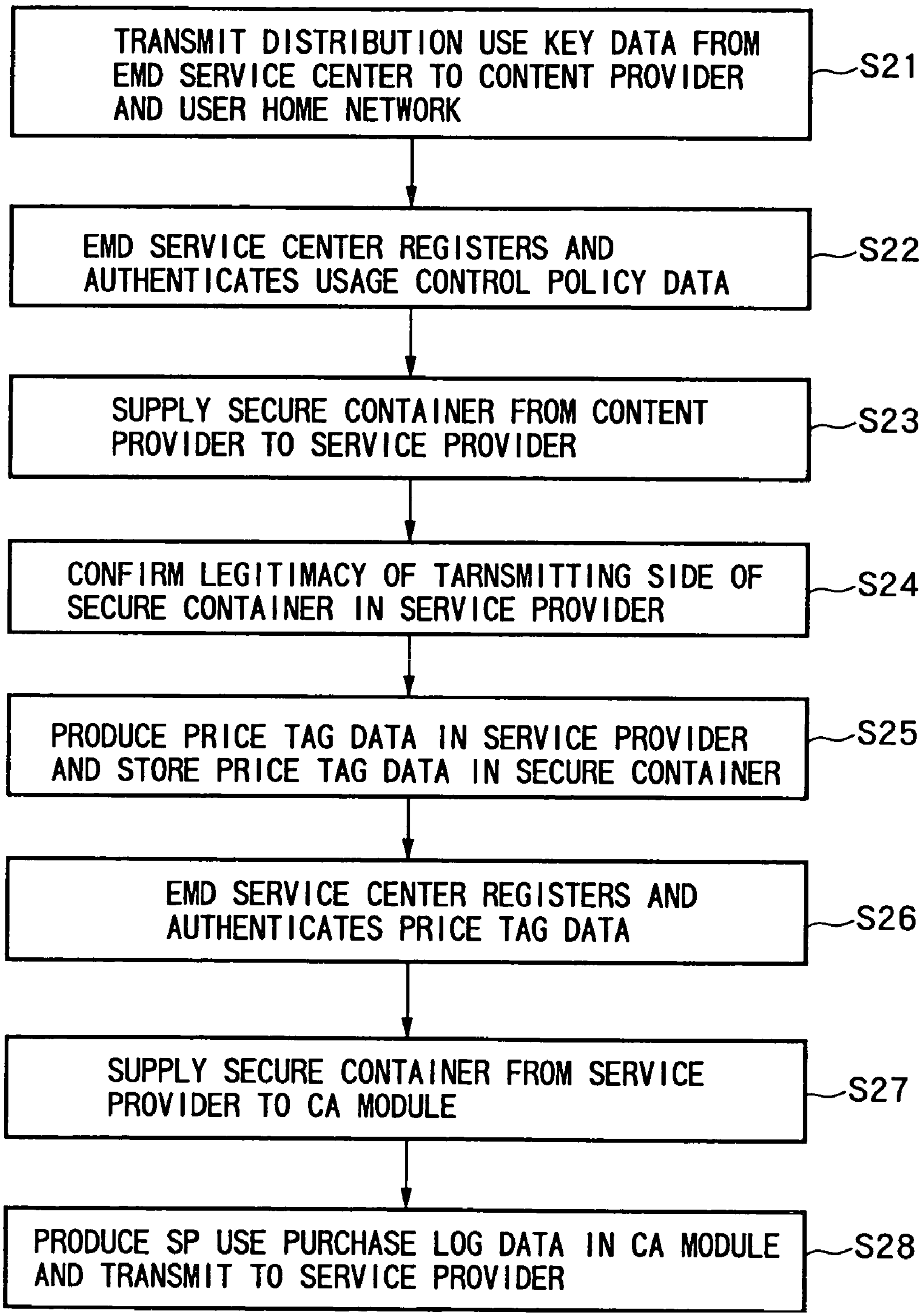
FIG. 84 is a flowchart of the overall operation of the EMD system shown in FIG. 59.
Figure 85:
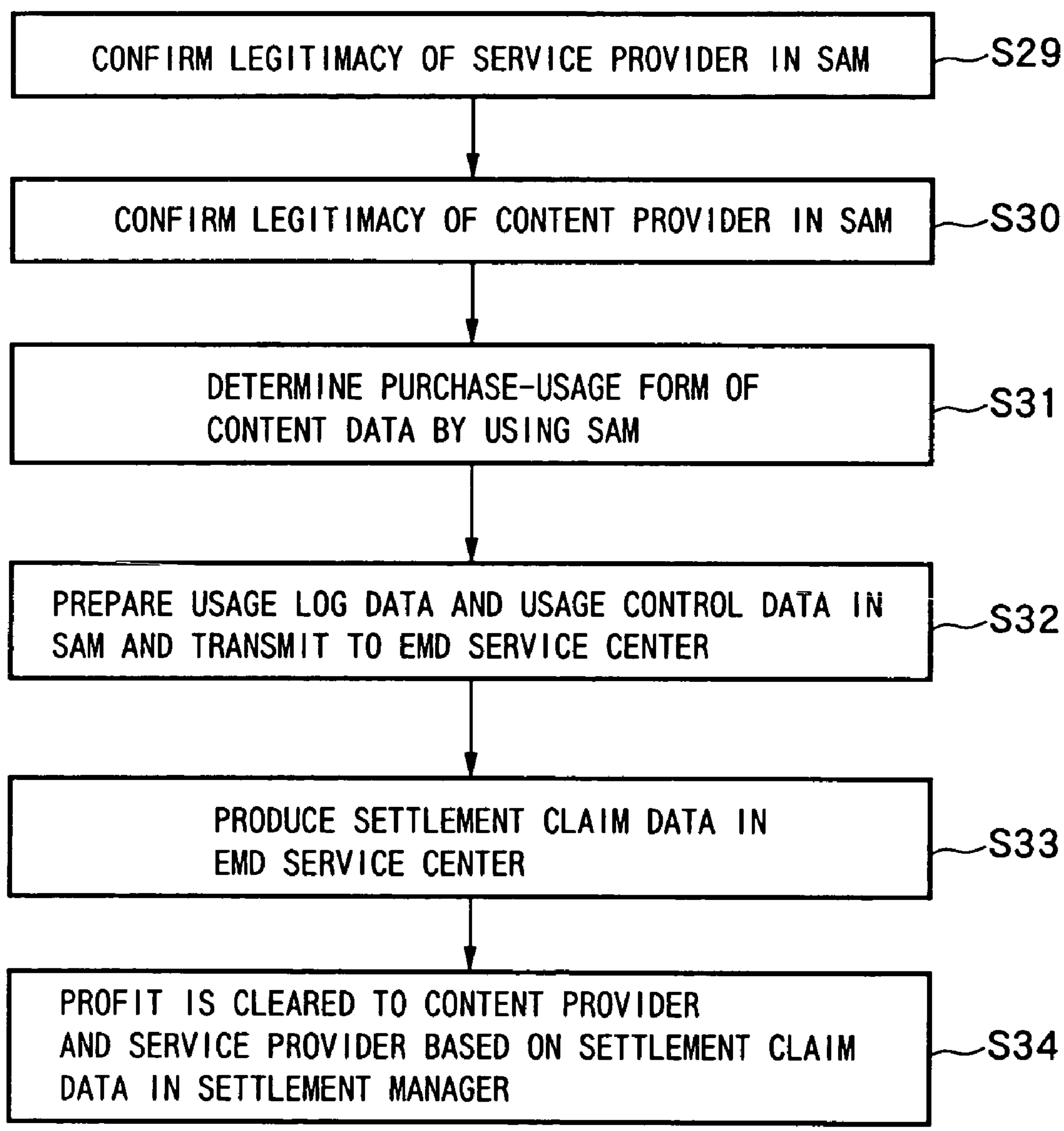
FIG. 85 is a flowchart of the overall operation of the EMD system shown in FIG. 59.

FIG. 84 and FIG. 85 are flowcharts of the overall operation of the EMD system 300.

Here, an explanation will be made by exemplifying the case where the secure container 304 is transmitted from the service provider 310 to the user home network 303 on-line.

Note that, as the prerequisite of the following processing, it is assumed that the registration of the content provider 301, service provider 310, and SAMs $305_1$ to $305_4$ to the EMD service center 302 has been already finished.

Step S21: The EMD service center 302 transmits the certificate $CER_{CP}$ of the public key data $K_{CP,P}$ of the content provider 301 together with the its own signature data $SIG_{1,ESC}$ to the content provider 301.

Also, the EMD service center 302 transmits the certificate $CER_{SP}$ of the public key data $K_{SP,P}$ of the content provider 301 together with its own signature data $SIG_{61,ESC}$ to the service provider 310.

Also, the EMD service center 302 transmits three months' worth of the distribution use key data $KD_1$ to $KD_3$ each having the expiration date of one month to the SAMs $305_1$ to $305_4$ of the user home network 303.

Step S22: After the mutual certification, the content provider 301 transmits the registration use module $Mod_2$ shown in FIG. 18 to the EMD service center 302.

Then, after the predetermined signature verification, the EMD service center 302 registers and authenticates the usage control policy data 106 and content key data Kc.

Also, the EMD service center 302 produces six months worth of the key files KF shown in FIG. 5B in accordance with the registration use module $Mod_2$, and transmits this to the content provider 301.

Step S23: The content provider 301 produces the content file CF and the signature data $SIG_{6,CP}$ thereof and the key file KF and the signature data $SIG_{7,CP}$ thereof shown in FIGS. 5A and 5B and provides the secure container 104 storing them and the certificate data $CER_{CP}$ and the signature data $SIG_{1,ESC}$ thereof shown in FIG. 5C to the service provider 310 on-line and/or off-line.

Step S24: The service provider 310 verifies the signature data $SIG_{1,ESC}$ shown in FIG. 5C and then verifies the signature data $SIG_{6,CP}$ and $SIG_{7,CP}$ shown in FIGS. 5A and 5B by using the public key data $K_{CP,P}$ stored in the certificate data $CER_{CP}$ and confirms if the secure container 104 was transmitted from a legitimate content provider 301.

Step S25: The service provider 310 produces the price tag data 312 and the signature data $SIG_{64,SP}$ thereof and produces the secure container 304 shown in FIG. 65 storing them.

Step S26: The service provider 310 transmits the price tag registration request module $Mod_{102}$ shown in FIG. 69 to the EMD service center 302.

Then, the EMD service center 302 registers and authenticates the price tag data 312 after the predetermined signature verification.

Step S27: The service provider 310 transmits the secure container 304 produced at step S25 on-line or off-line to the decryption module 905 of the network apparatus $360_1$ shown in FIG. 74 in response to the request from for example the CA module 311 of the user home network 303.

Step S28: The CA module 311 produces the SP use purchase log data 309 and transmits this to the service provider 310 at the predetermined timing.

Step S29: In any of the SAMs $305_1$ to $305_4$, after verifying the signature data $SIG_{61,ESC}$ shown in FIG. 65D, the signature data $SIG_{62,SP}$, $SIG_{63,SP}$, and $SIG_{64,SP}$ shown in FIGS. 65A, 65B and 65C are verified by using the public key data $K_{SP,P}$ stored in the certificate data $CER_{SP}$ and it is confirmed whether or not the predetermined data in the secure container 304 was produced and transmitted in a legitimate service provider 310.

Step S30: After verifying the signature data $SIG_{1,ESC}$ shown in FIG. 65D in any of the SAMs $305_1$ to $305_4$, the signature data $SIG_{6,SP}$, and $SIG_{7,SP}$ shown in FIGS. 65A, 65B and 65C are verified by using the public key data $K_{CP,P}$ stored in the certificate data $CER_{CP}$, and it is confirmed whether or not the content file CF in the secure container 304 was produced in a legitimate content provider 301 and whether or not the key file KF was transmitted from a legitimate content provider 301.

Also, by verifying the legitimacy of the signature data $SIG_{K1,ESC}$ in the key file KF shown in FIG. 65B by using the public key data $K_{ESC,P}$, in any of the SAMs $305_1$ to $305_4$, it is confirmed whether or not the key file KF was produced by a legitimate EMD service center 302.

Step S31: The user operates the purchase and/or usage form determination operation unit 165 of FIG. 74 and determines the purchase and/or usage form of the content.

Step S32: Based on the operation signal S165 produced at step S31, in the SAMs $305_1$ to $305_4$, the usage log data 308 of the secure container 304 is produced.

The usage log data 308 and the signature data $SIG_{205,SAM1}$ thereof are transmitted from the SAMs $305_1$ to $305_4$ to the EMD service center 302.

Also, whenever the purchase form is determined, the usage control status data 166 is transmitted from the SAMs $305_1$ to $305_4$ to the EMD service center 302.

Step S33: The EMD service center 302 determines (calculates) the charge content for each of the content provider 301 and the service provider 310 based on the usage log data 308 and produces the settlement claim data 152*c* and 152*s* based on the result thereof.

Step S34: The EMD service center 302 transmits the settlement claim data 152*c* and 152*s* together with its own signature data to the settlement manager 91 via the payment gateway 90. By this, the money paid by the user of the user home network 303 to the settlement manager 91 is distributed to the owners of the content provider 301 and the service provider 310.

As explained above, in the EMD system 300, the secure container 104 of the format shown in FIG. 5 is distributed from the content provider 301 to the service provider 310, the secure container 304 storing the content file CF and key file KF in the secure container 104 as they are distributed from the service provider 310 to the user home network 303, and the processing for the key file KF is carried out in the SAMs $305_1$ to $305_4$.

Also, the content key data Kc and usage control policy data 106 stored in the key file KF have been encrypted by using the distribution use key data $KD_1$ to $KD_3$ and decrypted in only the SAMs $305_1$ to $305_4$ holding the distribution use key data $KD_1$ to $KD_3$. The SAMs $305_1$ to $305_4$ are modules having tamper resistance. The purchase form and the usage form of the content data C are determined based on the handling content of the content data C described in the usage control policy data 106.

Accordingly, according to the EMD system 300, the content data C can be reliably purchased and used in the user home network 303 based on the content of the usage control policy data 106 produced by the interested party of the content provider 101 irrelevant to the processing in the service provider 310. Namely, according to the EMD system 300, it is possible to prevent the usage control policy data 106 from being managed by the service provider 310.

For this reason, according to the EMD system 300, even in a case where the content data C is distributed to the user home network 303 via a plurality of service providers 310 of different affiliations, the rights clearing for the related content data C in the user home network 303 can be performed based on the common usage control policy data 106 produced by the content provider 301.

Also, in the EMD system 300, for the files and data in the secure containers 104 and 304, the signature data indicating the legitimacy of the producers and the transmitters of them are stored. Therefore, in the service provider 310 and the SAMs $\mathbf{305}_1$ to 305 the legitimacy of the producers and transmitters and whether or not the data has been tampered with can be confirmed.

As a result, the illegitimate usage of the content data C can be effectively avoided.

Also, in the EMD system 300, by distributing the content data C from the service provider 310 to the user home network 103 by using the secure container 304 in both of the cases of on-line and off-line, in both cases, common rights clearing of the content data C in the SAMs $\mathbf{305}_1$ to $\mathbf{305}_4$ can be performed.

Also, in the EMD system 300, when purchasing, using, recording, and transferring the content data C in the network apparatus $\mathbf{360}_1$ and the AV apparatuses $\mathbf{360}_2$ to $\mathbf{360}_4$ in the user home network 303, by always performing the processing based on the usage control policy data 106, common rights clearing rules can be employed.

Figure 86:
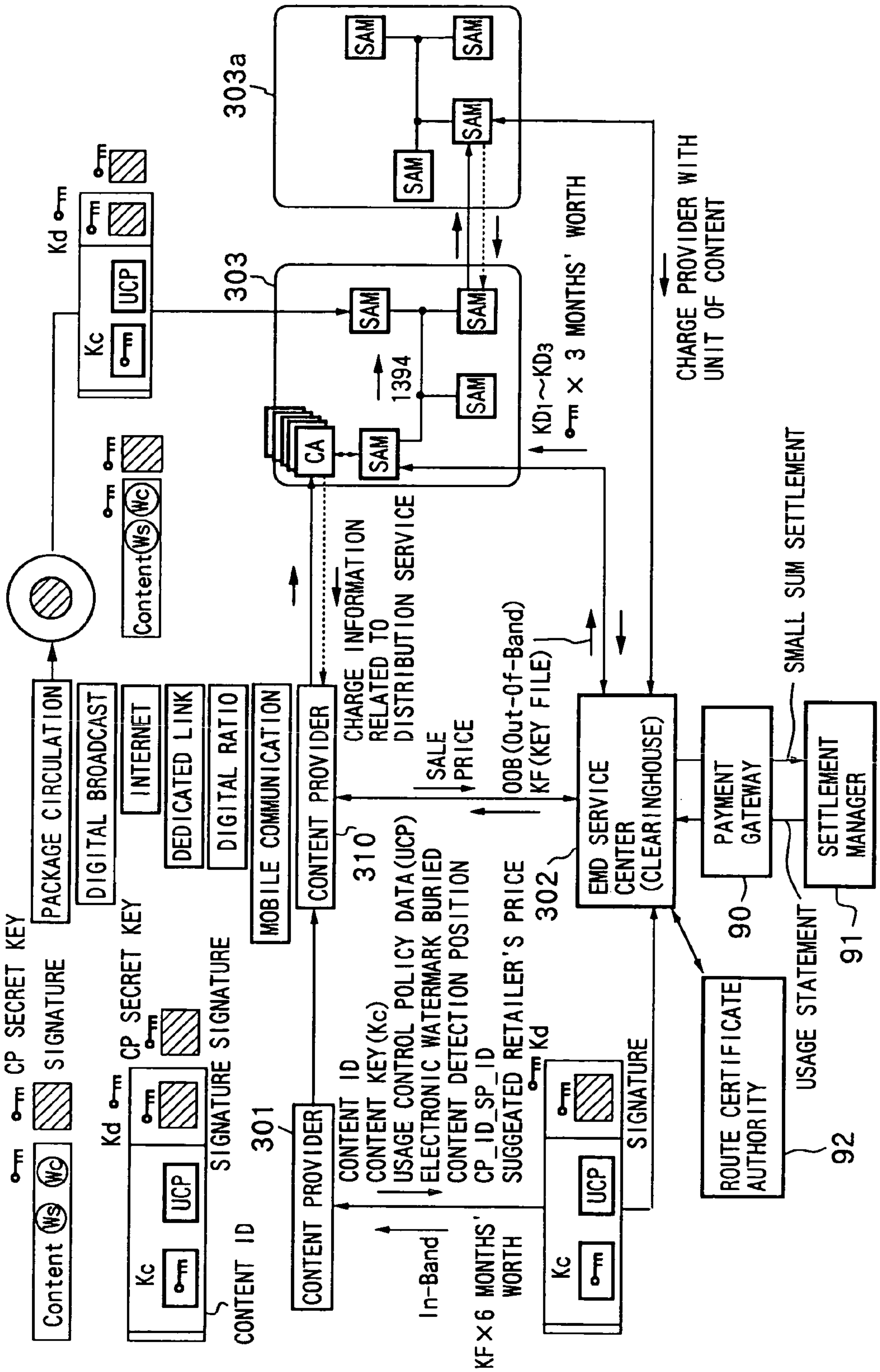
FIG. 86 is a view for explaining an example of the delivery format of the secure container from the service provider to the user home network in the EMD system of the second embodiment.

For example, as shown in FIG. 86, no matter by what technique (route) the content data C provided by the content provider 301 is distributed (delivered) from the service provider 310 to the user home network 303, such as package communication, a digital broadcast, Internet, dedicated line, digital radio, and mobile communication, in the SAMs of the user home networks 303 and 303*a*, common rights clearing rules are employed based on the usage control policy data 106 produced by the content provider 301.

Also, according to the EMD system 300, since the EMD service center 302 has the certificate authority function, key data management function, and the rights clearing (profit distribution) function, the money paid by the user accompanied with the usage of the content is reliably distributed to the owners of the content provider 301 and the EMD service center 302 according to the ratio determined in advance.

Also, according to the EMD system 300, the usage control policy data 106 for the same content file CF supplied by the same content provider 301 is supplied as is to the SAMs $\mathbf{305}_1$ to $\mathbf{305}_4$ irrelevant as to the service format of the service provider 310. Accordingly, in the SAMs $\mathbf{305}_1$ to $\mathbf{305}_4$, the content file CF can be used according to the intention of the content provider 301 based on the usage control policy data 106.

Namely, according to the EMD system 300, at the time of a service using the content and usage of the content by the user, the rights and profit of the owner of the content provider 301 can be reliably protected by technical means without depending on an inspection organization 725 as in the conventional case.

Below, an explanation will be made of a concrete example of the transport protocol such as the secure container employed in the EMD system 300 of the above second embodiment.

Figure 87:
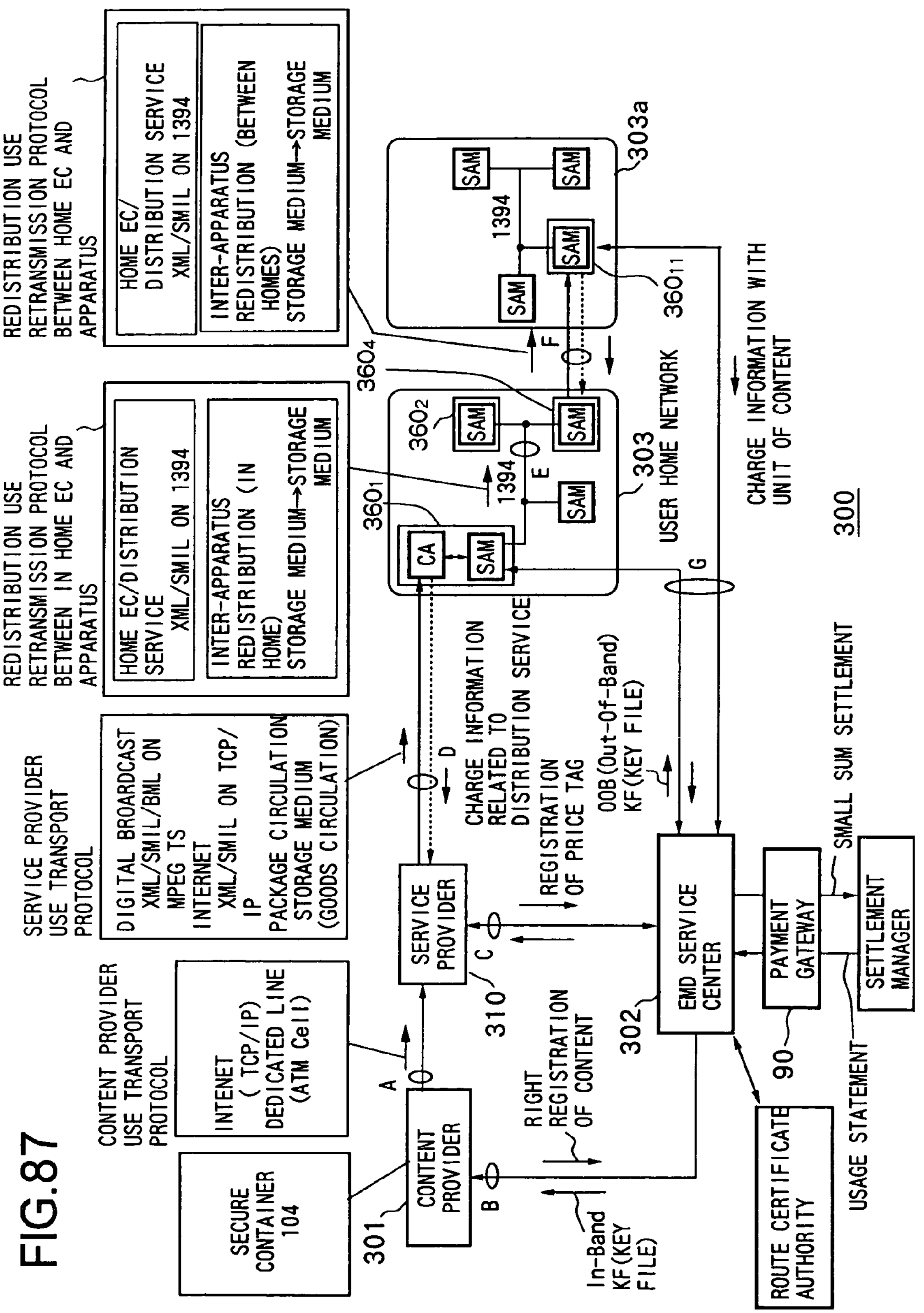
FIG. 87 is a view for explaining an example of the delivery protocol of the secure container employed by the EMD system of the second embodiment.

As shown in FIG. 87, the secure container 104 produced in the content provider 301 is provided to the service provider 310 by using a content provider use transport protocol of the Internet (TCP/IP) or dedicated line (ATM cell).

Also, the service provider 310 distributes the secure container 304 produced by using the secure container 104 to the user home network 303 by using the service provider use transport protocol of a digital broadcast (XML/SMIL on MPEG-TS), Internet (XML/SMIL on TCP/IP), or package circulation (storage medium).

Also, the secure container is transferred among SAMs in the user home networks 303 and 303*a* or between the user home network 303 and 303*a* by using the home EC/distribution service (XML/SMIL on 1394 serial bus interface) or storage medium.

Below, an example of the transport protocol employed in the data transfer in the routes indicated by reference symbols A to G will be explained in detail in FIG. 87.

Figure 88:
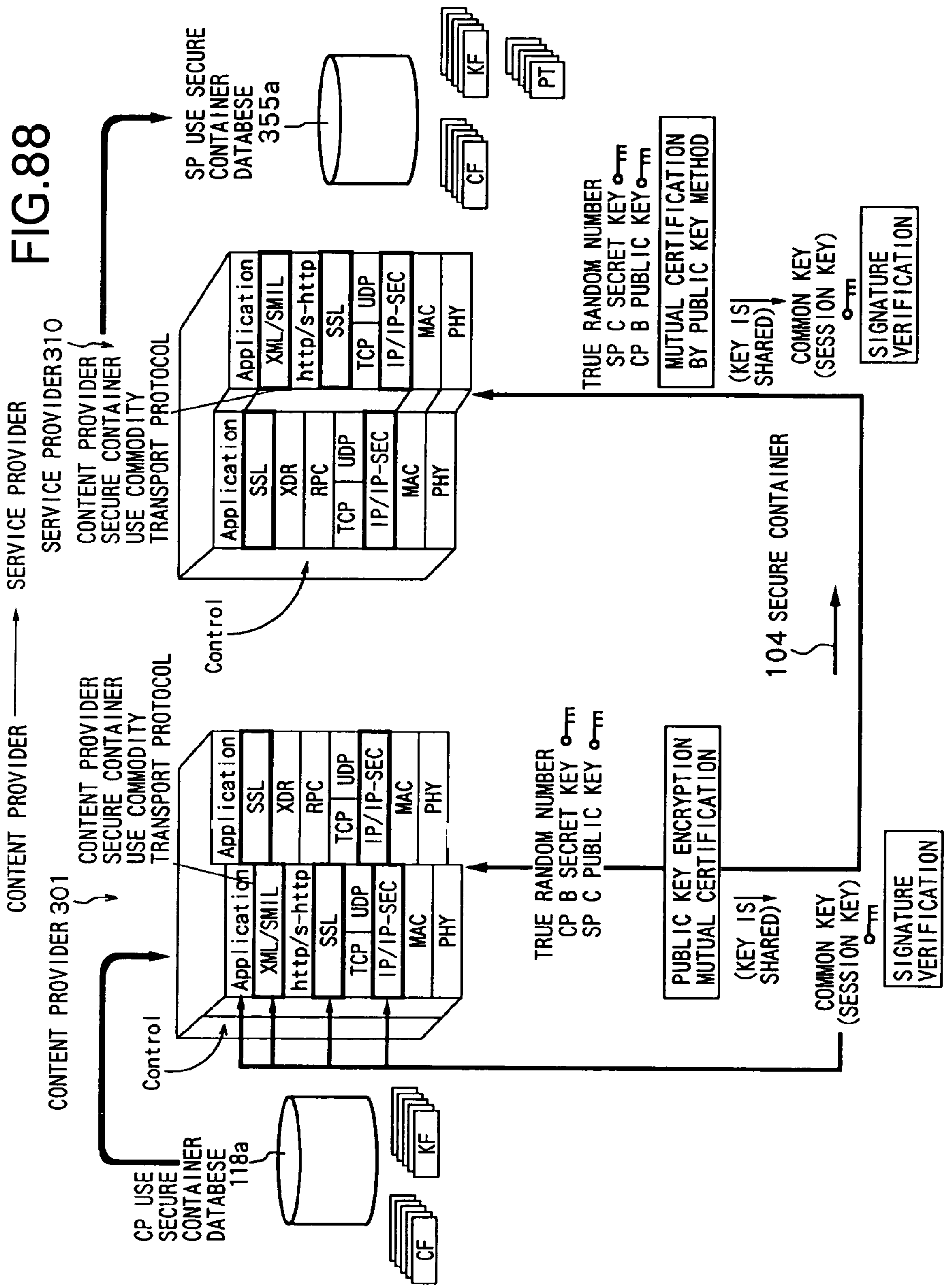
FIG. 88 is a view for explaining the delivery protocol used when delivering the secure container etc. from the user home network to a service provider 310 in FIG. 87.

FIG. 88 is a view for explaining the transport protocol employed when transporting the secure container 104 etc. between the content provider 301 and the service provider 310 (symbol A) shown in FIG. 87.

As shown in FIG. 88, the secure container 104 etc. are transported from the content provider 301 to the service provider 310 by a session using a common key in the IP/IP-SEC layer, SSL (Secure Sockets Layer), XML (Extensible Markup Language)/SMIL (Synchronized Multimedia Integration Language) layer, and application layer.

Figure 89:
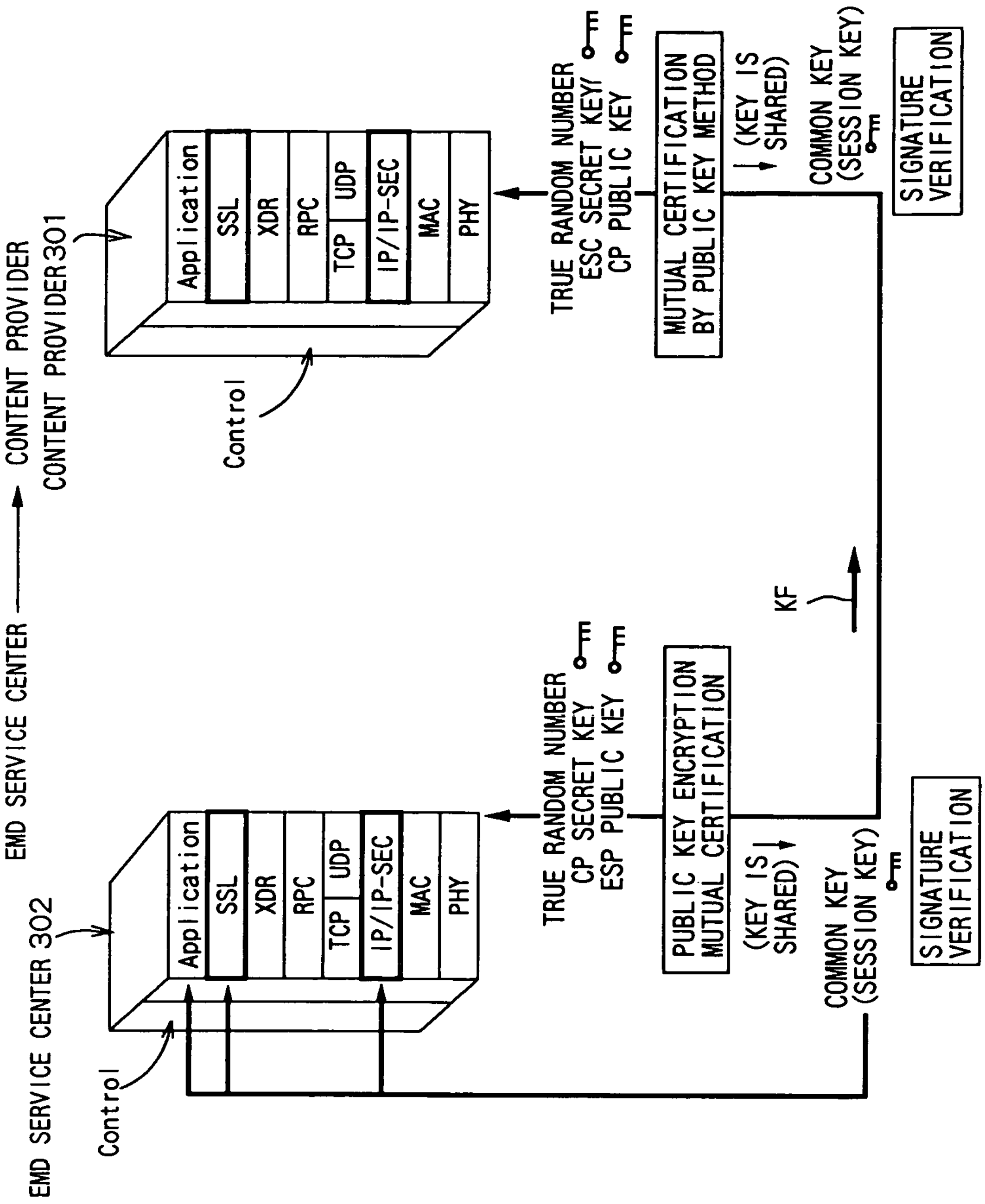
FIG. 89 is a view for explaining the delivery protocol used when delivering the key file etc. from the content provider to the EMD service center in FIG. 87.

FIG. 89 is a view for explaining the transport protocol employed when transporting the key file etc. between the EMD service center 302 and the content provider 301 (symbol B) shown in FIG. 87.

As shown in FIG. 89, the key file etc. are transported from the EMD service center 302 to the content provider 301 by a session using a common key in the IP/IP-SEC layer, SSL layer, and the application layer.

Figure 90:
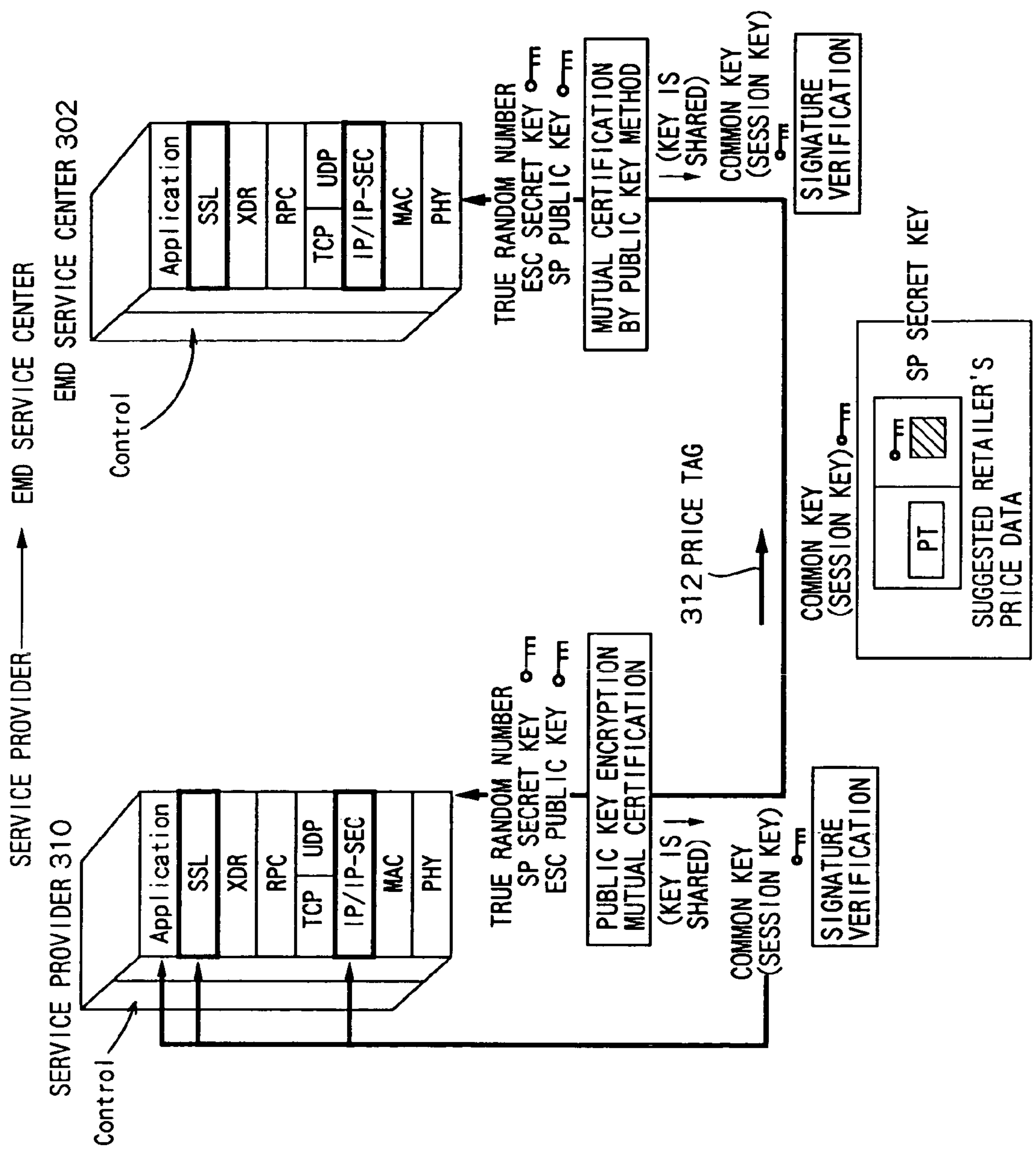
FIG. 90 is a view for explaining the delivery protocol used when delivering a price tag data 312 etc. from the service provider to the EMD service center in FIG. 87.

FIG. 90 is a view for explaining the transport protocol employed when transporting the price tag data 312 etc. between the EMD service center 302 and the service provider 310 (symbol C) shown in the figure.

As shown in FIG. 90, the price tag data 312 etc. are transported from the EMD service center 302 to the service provider 310 by a session using a common key in the IP/IP-SEC layer, SSL layer, and the application layer.

Figure 91:
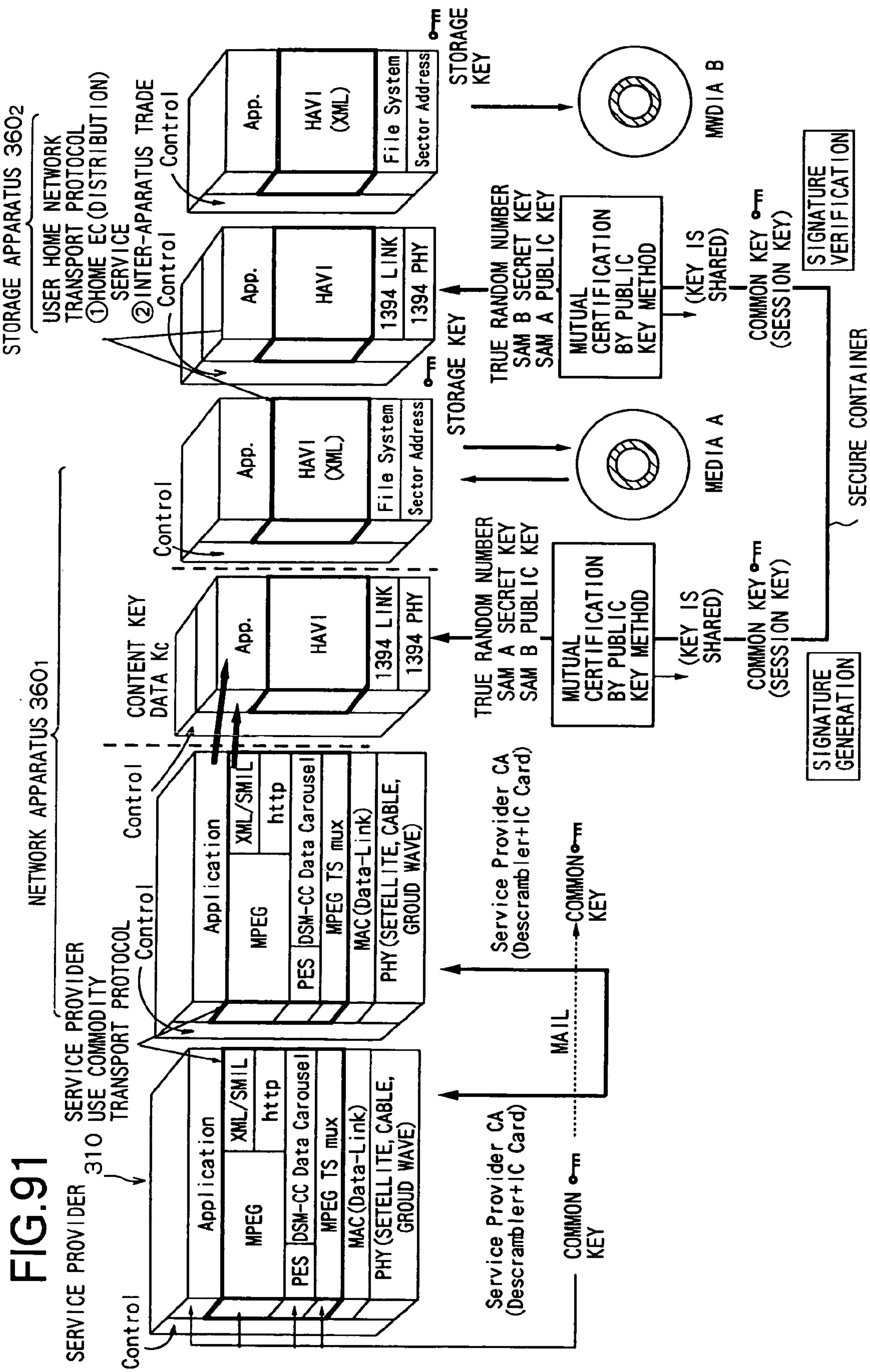
FIG. 91 is a view for explaining the delivery protocol used when delivering the secure container etc. in the user home network in FIG. 87.

FIG. 91 is a view for explaining the transport protocol employed when transporting the secure container 304 etc. between the service provider 310 and the user home network 303 (symbol D) and in the user home network 303 (symbol E) shown in FIG. 87.

As shown in FIG. 91, the secure container 304 etc. are transported from the service provider 310 to the network apparatus $\mathbf{360}_1$ of the user home network 303.

At this time, the MPEG-TS layer, PES layer, or DSM-CC_Data_Carousel layer and MHEG (Multimedia and Hypermedia Experts) layer or "http layer and XML/SMIL layer" are used as the service provider use commodity transport protocol for transferring the secure container 304 between the service provider 310 and the network apparatus $\mathbf{360}_1$.

Also, between the network apparatus 360$_1$ and a storage apparatus 360$_2$ and between AV apparatuses, HAVi (XML) is used as the user home network commodity transport protocol for transferring the secure container.

Figure 92:
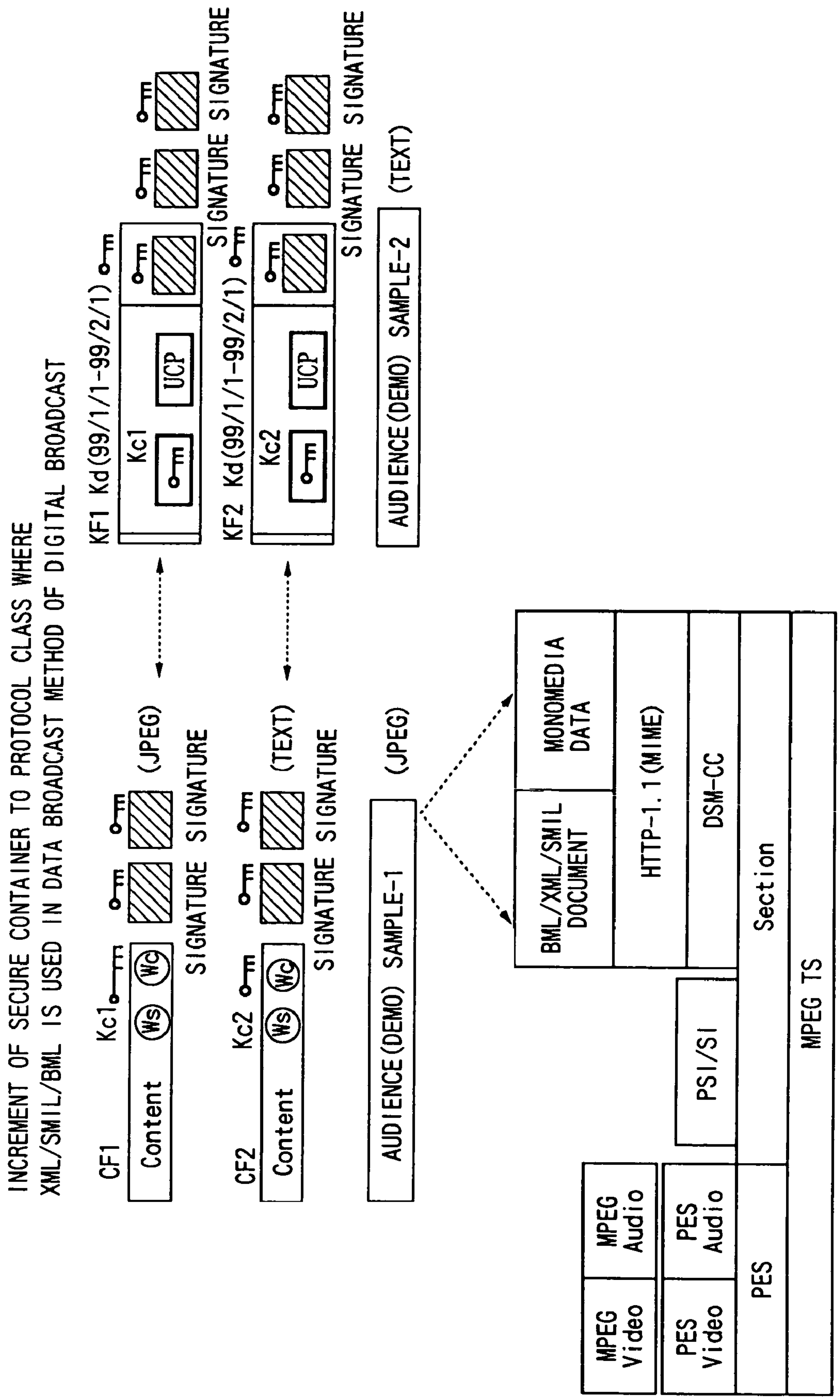
FIG. 92 is a view for explaining an implement format of the secure container to a protocol layer in a case where XML/SMIL/BML is utilized for a data broadcast method of a digital broadcast.

At this time, where XML/SMIL/BML is utilized in the data broadcast method of a digital broadcast, the content files CF1 and CF2 and the key files KF1 and KF2 and the demo sample of the secure container 304 are stored in a BML/XML/SMIL layer on the HTTP layer and a monomedia data layer and transported as shown in FIG. 92.

Figure 93:
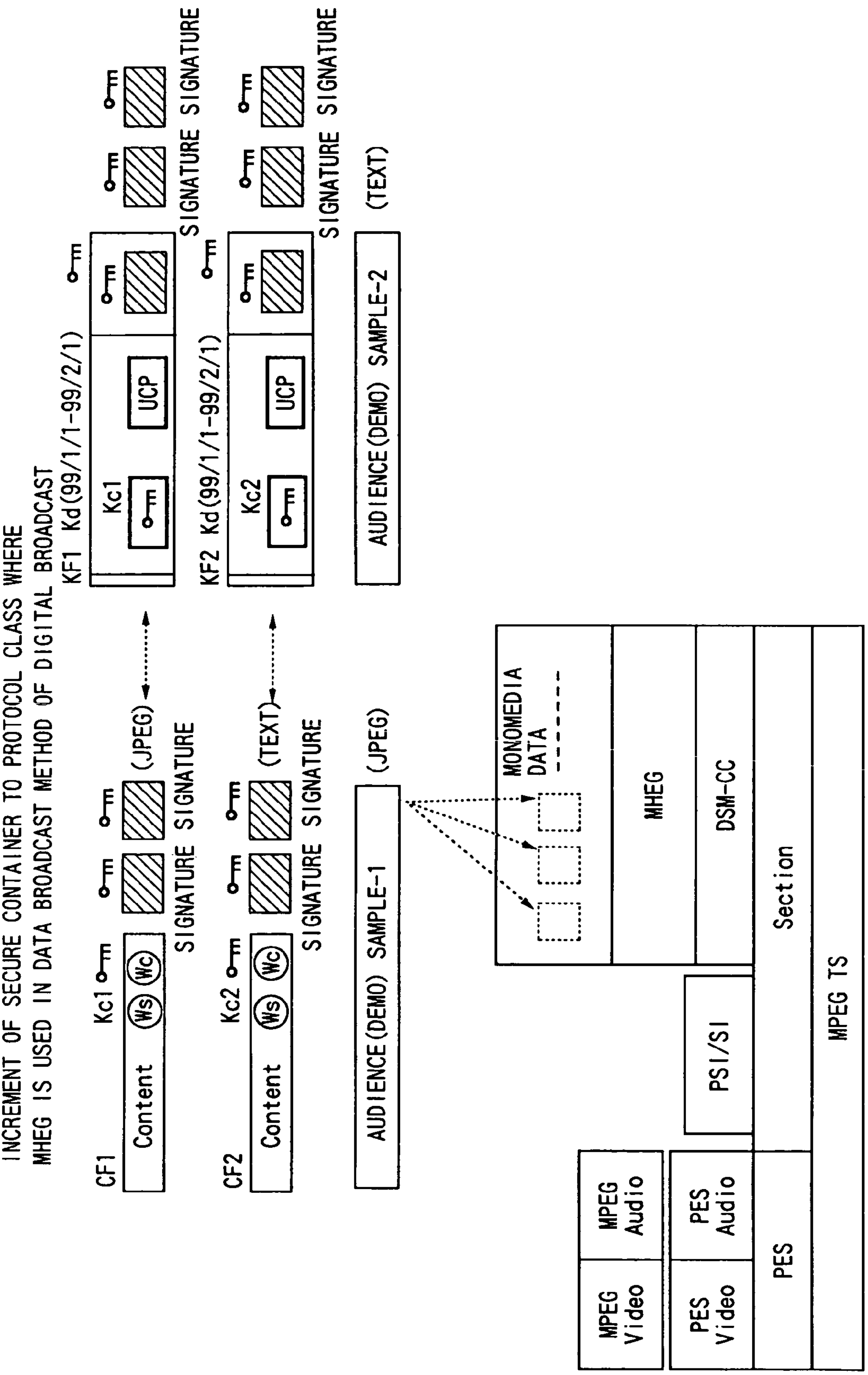
FIG. 93 is a view for explaining the implement format of the secure container to the protocol layer in a case where MHEG is utilized for the data broadcast method of the digital broadcast.

Also, where the MHEG is utilized in the data broadcast method of a digital broadcast, the content files CF1 and CF2 and the key files KF1 and KF2 and the demo sample of the secure container 304 are stored in the monomedia data layer on the MHEG layer and transported as shown in FIG. 93.

Figure 94:
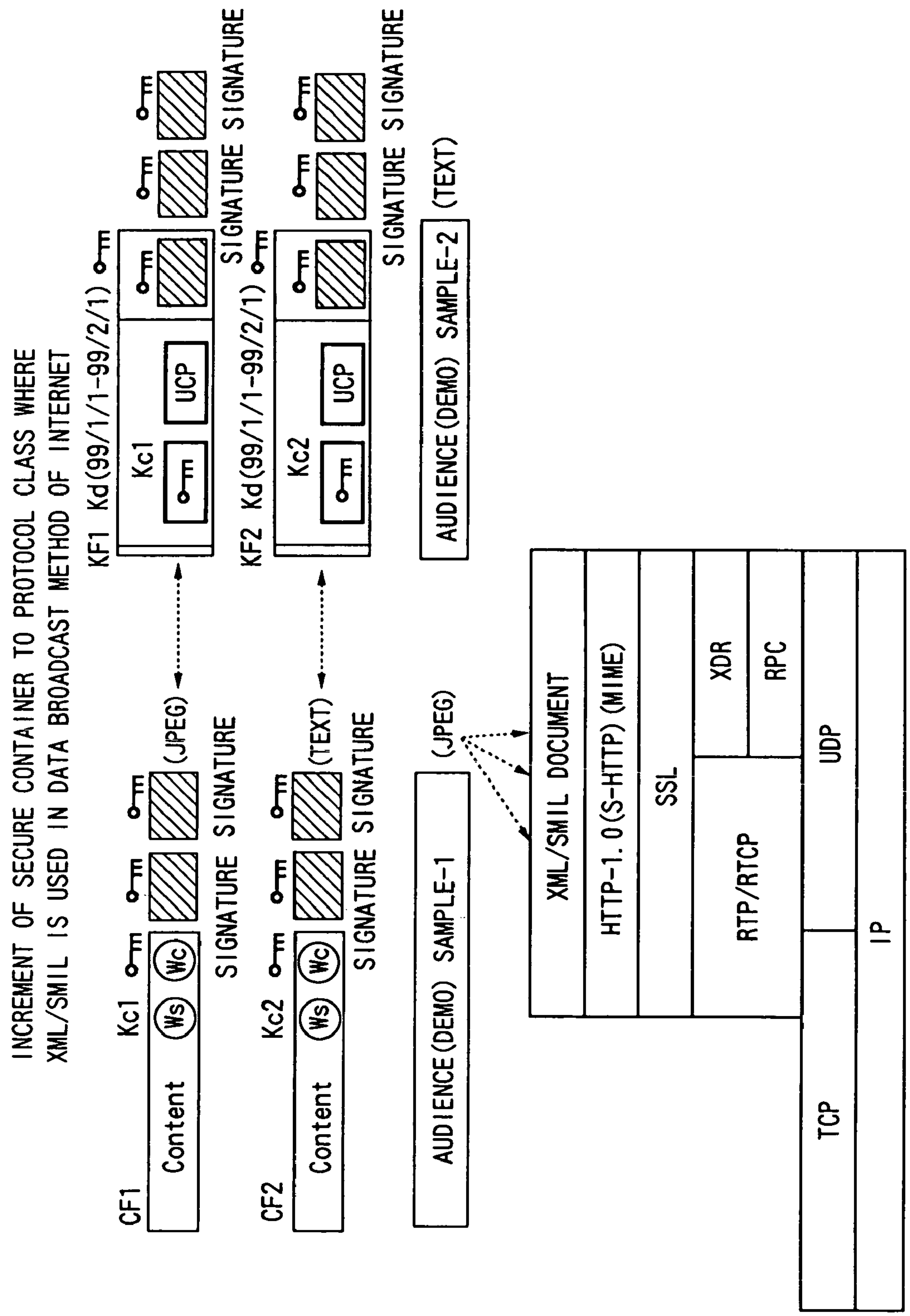
FIG. 94 is a view for explaining the implement format of the secure container to the protocol layer in a case where XML/SMIL is utilized for the data broadcast method of an interface.

Also, where the XML/SMIL is utilized in the data broadcast method of a digital broadcast, the content files CF1 and CF2 and the key files KF1 and KF2 and the demo sample of the secure container 304 are stored in the XML/SMIL layer on the HTTP layer and transported as shown in FIG. 94.

Figure 95:
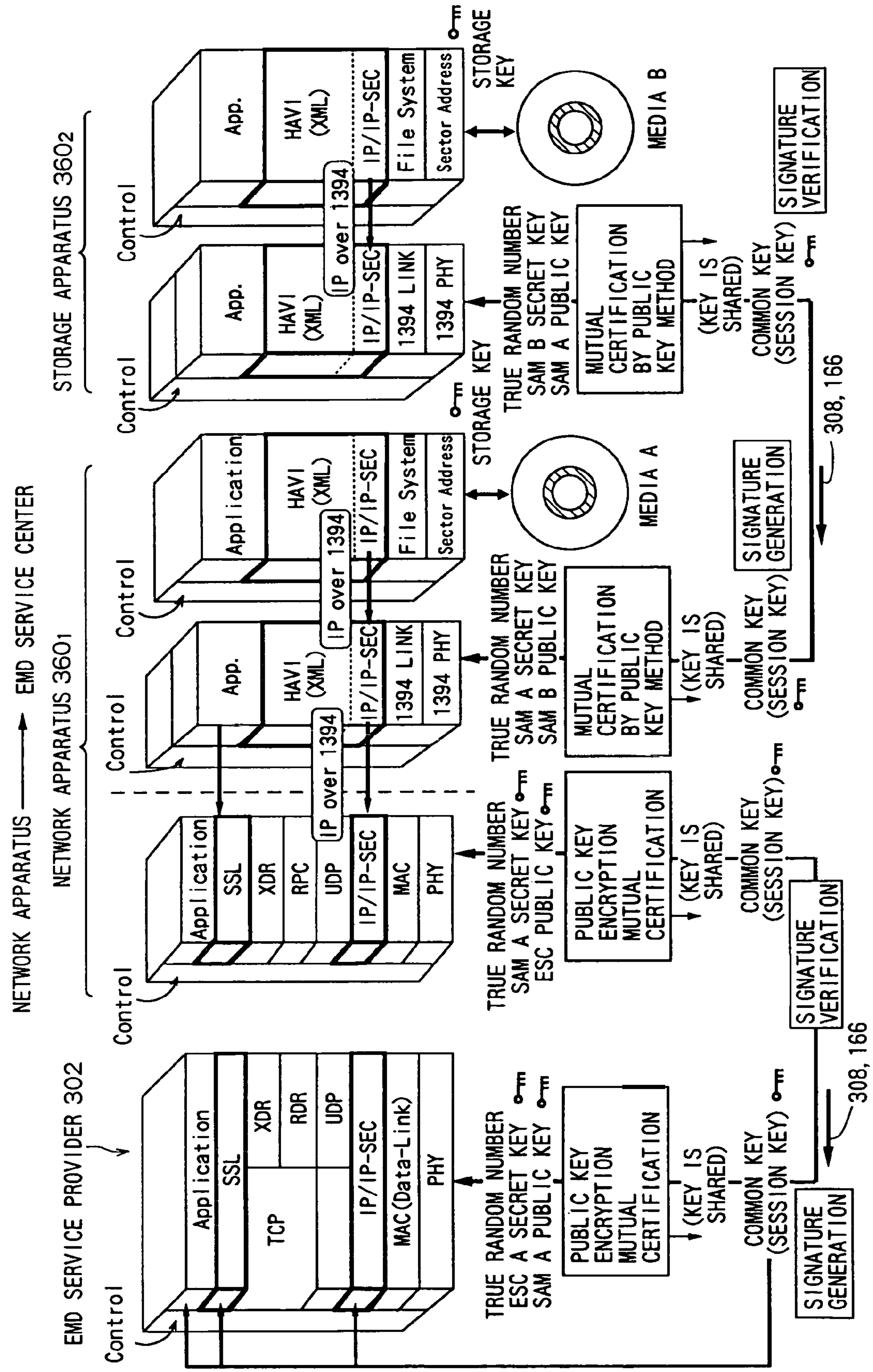
FIG. 95 is a view for explaining the delivery protocol used when delivering the usage log data etc. from the user home network to the EMD service center.

FIG. 95 is a view for explaining the transport protocol employed when the usage log data 308 and the usage control status data 166 etc. are transported between the EMD service center 302 and the user home networks 303 and 303*a* (symbol G) shown in FIG. 87.

As shown in FIG. 95, where the usage log data 308 etc. are transferred from the network apparatus 360$_1$ to the EMD service center 302, a session using the session key data is carried out in the IP/IP-SEC layer, SSL layer, and the application layer.

Also, where the network apparatus 360$_2$ etc. transfer the usage log data 308, usage control status data 166, etc. to the EMD service center 302, after the usage log data 308 etc. are transferred from the storage apparatus 360$_2$ to the network apparatus 360$_1$ by a session in the IP/IP-SEC layer and the HAVi layer, they are transferred from the network apparatus 360$_1$ to the EMD service center 302 as mentioned before.

Figure 96:
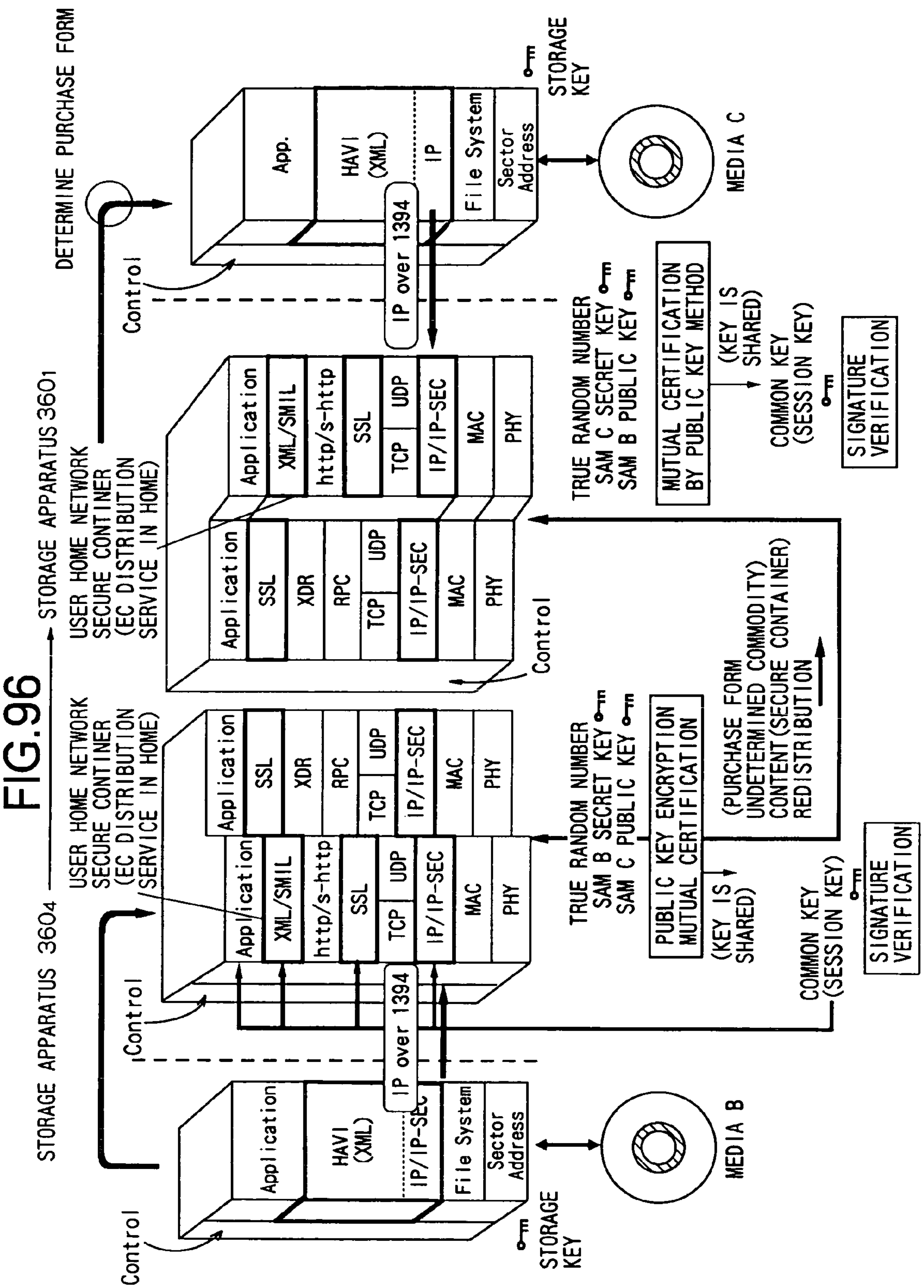
FIG. 96 is a view for explaining the delivery protocol used when delivering the secure container etc. in the user home network.

FIG. 96 is a view for explaining the transport protocol employed when transporting the secure container from the storage apparatus 360$_4$ of the user home network 303 to the storage apparatus 360$_{11}$ of the user home network 303*a* shown in FIG. 87.

As shown in FIG. 96, the secure container is transported from the storage apparatus 360$_4$ to the storage apparatus 360$_{11}$ by a session using a common key in the IP/IP-SEC layer, SSL layer, XML/SMIL layer, and the application layer.

First Modification of Second Embodiment

Figure 97:
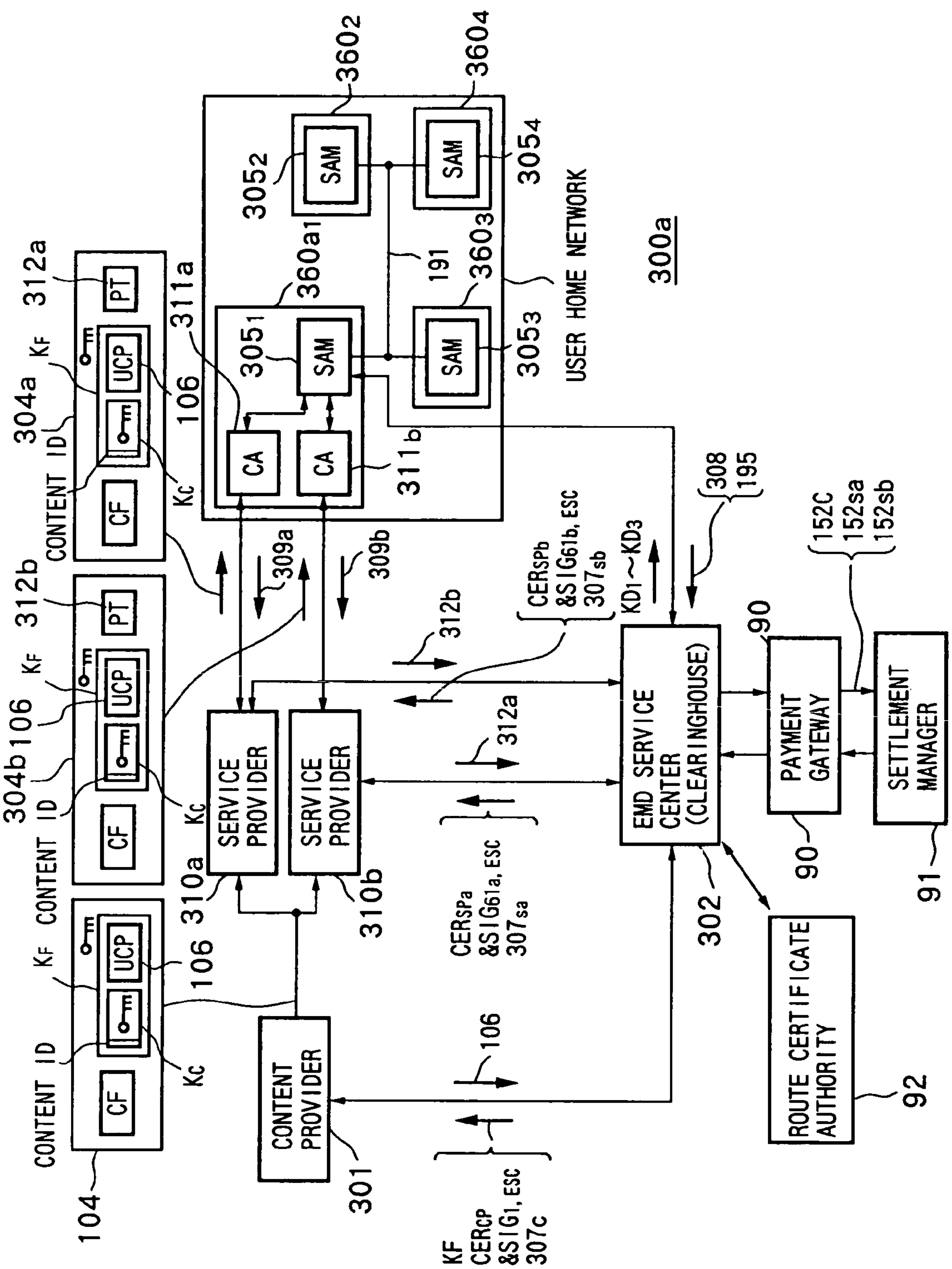
FIG. 97 is a view of the configuration of the EMD system using two service providers according to a first modification of the second embodiment of the present invention.

FIG. 97 is a view of the configuration of an EMD system 300*a* using two service providers according to a first modification of the second embodiment.

In FIG. 97, components given the same reference numerals as those of FIG. 59 are the same as the components having the same reference numerals explained in the first embodiment.

As shown in FIG. 97, in the EMD system 300*a*, the same secure containers 104 are supplied from the content provider 301 to service providers 310*a* and 310*b*.

The service provider 310*a* offers a service providing for example a drama program as the content. In the related service, a secure container 304*a* storing the content data C related to the drama program and price tag data 312*a* uniquely produced for the related content data C is produced and is distributed to the network apparatus 360$_1$.

Also, the service provider 310*b* provides for example a karaoke service. In the related service, a secure container 304*b* storing the content data C related to the karaoke service and price tag data 312*b* uniquely produced for the related content data C is produced and is distributed to the network apparatus 360$_1$.

Here, the formats of the secure containers 304*a* and 304*b* are the same as that of the secure container 304 explained by using FIG. 65.

A network apparatus 360*a*$_1$ is provided with CA modules 311*a* and 311*b* corresponding to the service providers 310*a* and 310*b*.

The CA modules 311*a* and 311*b* are receive the secure containers 304*a* and 304*b* in response to requests from them to the service providers 310*a* and 310*b*.

Next, the CA modules 311*a* and 311*b* produce SP use purchase log data 309*a* and 309*b* in accordance with the distributed secure containers 304*a* and 304*b* and transmit them to the service providers 310*a* and 310*b*.

Also, the CA modules 311*a* and 311*b* decrypt the secure containers 304*a* and 304*b* by the session key data $K_{SES}$ and then output the same to the SAMs 305$_1$ to 305$_4$.

Next, in the SAMs 305$_1$ to 305$_4$, the key files KF in the secure containers 304*a* and 304*b* are decrypted by using the common distribution use key data $KD_1$ to $KD_3$, the processing concerning the purchase and/or usage of the content in accordance with the operation from the user is carried out based on the common usage control policy data 106, and the usage log data 308 in accordance with that is produced.

Then, the usage log data 308 is transmitted from the SAMs 305$_1$ to 305$_4$ to the EMD service center 302.

In the EMD service center 302, based on the usage log data 308, the charge content is determined (calculated) for each of the content provider 301 and the service providers 310*a* and 310*b*, and the settlement claim data 152*c*, 152*sa*, and 152*sb* corresponding to them are produced based on the results thereof.

The EMD service center 302 transmits the settlement claim data 152*c*, 152*sa*, and 152*sb* to the settlement manager 91 via the payment gateway 90. By this, the money paid by the user of the user home network 303 to the settlement manager 91 is distributed to the owners of the content provider 301 and the service providers 310*a* and 310*b*.

As mentioned above, according to the EMD system 300*a*, when the same content file CF is supplied to the service providers 310*a* and 310*b*, the usage control policy data 106 for the related content file CF is encrypted by the distribution use key data $KD_1$ to $KD_6$ and supplied to the service providers 310*a* and 310*b*, and the service providers 310*a* and 310*b* distribute the secure containers 304*a* and 304*b* storing the encrypted usage control policy data 106 as it is to the user home network. For this reason, in the SAMs 305$_1$ to 305$_4$ in the user home network, no matter which of the service provider 310*a* or 310*b* the content file CF is distributed from, the rights can be cleared based on the common usage control policy data 106.

Note that, in the first modification, the case where two service providers were used was exemplified, but in the present invention, any number of the service providers may be provided.

Second Modification of Second Embodiment

Figure 98:
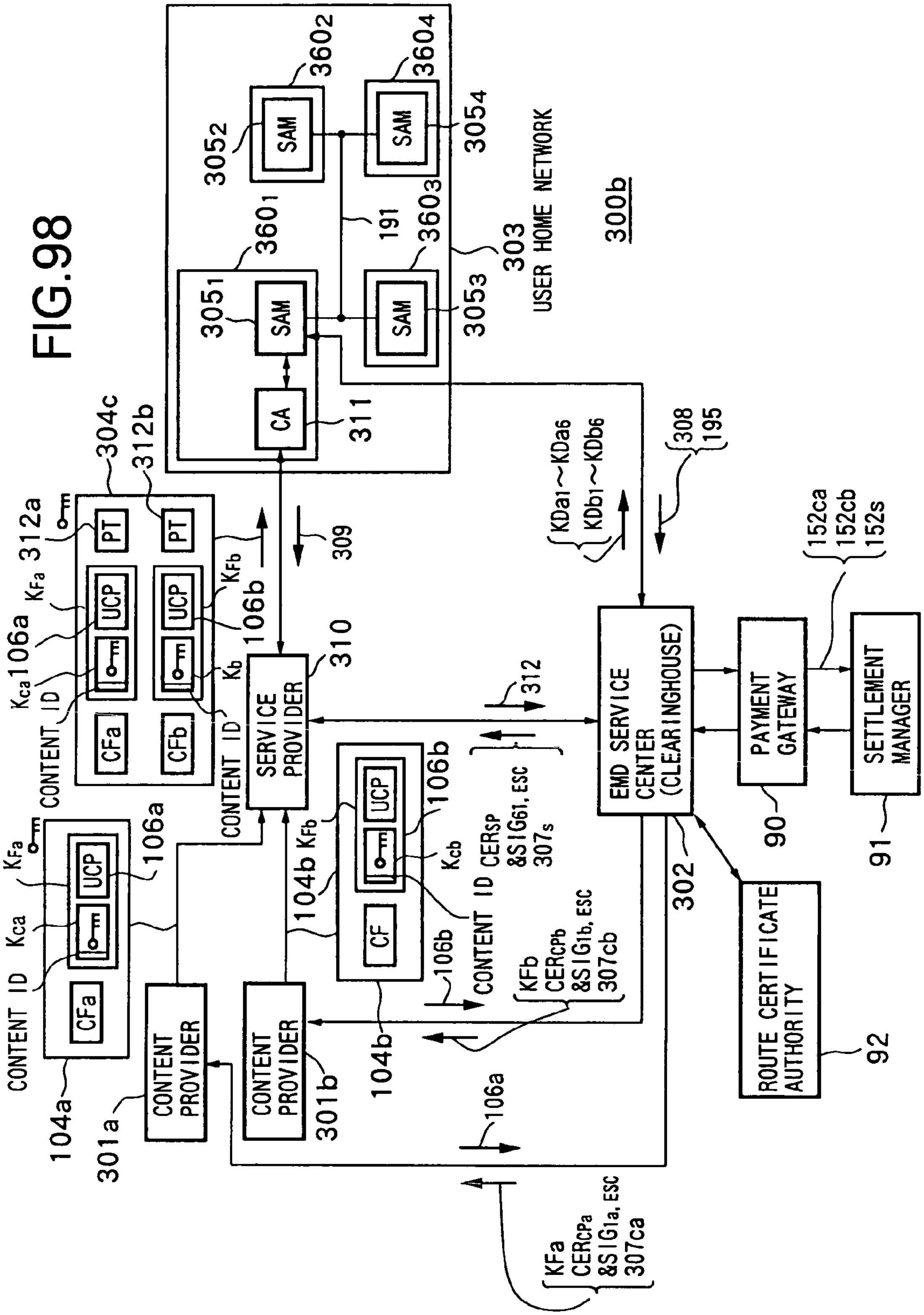
FIG. 98 is a view of the configuration of the EMD system using a plurality of content providers according to a second modification of the second embodiment of the present invention.

FIG. 98 is a view of the configuration of an EMD system 300*b* using a plurality of content providers according to a second modification of the second embodiment.

In FIG. 98, components given the same reference numerals as those of FIG. 59 are the same as the components having the same reference numerals explained in the first embodiment.

As shown in FIG. 98, in the EMD system 300*b*, the key files KFa and KFb are supplied from the EMD service center 302 to the content providers 301*a* and 301*b*, and the secure containers 104*a* and 104*b* are supplied from content providers 301*a* and 301*b* to the service provider 310.

The service provider 310 provides a service by using the content supplied by for example the content providers 301*a* and 301*b*, produces the price tag data 312*a* for the secure container 104*a* and the price tag data 312*b* for the secure container 104*b*, and produces a secure container 304*c* storing them.

As shown in FIG. 98, in the secure container 304*c*, the content data CFa, CFb, key files KFa and KFb, price tag data 312*a* and 312*b*, and the signature data by the secret key data $K_{CP,S}$ of the service provider 310 for each of them are stored.

The secure container 304*c* is received at the CA module 311 of the network apparatus $\mathbf{360}_1$ of the user home network 303 and then processed at the SAMs $\mathbf{305}_1$ to $\mathbf{305}_4$.

In the SAMs $\mathbf{305}_1$ to $\mathbf{305}_4$, the key file KFa is decrypted by using the distribution use key data $KDa_1$ to $KDa_3$, the processing concerning the purchase and/or usage is carried out in accordance with the operation from the user for the content file CFa based on the usage control policy data 106*a*, and the log thereof is described in the usage log data 308.

Also, in the SAMs $\mathbf{305}_1$ to $\mathbf{305}_4$, the key file KFb is decrypted by using distribution use key data $KDb_1$ to $KDb_3$, the processing concerning the purchase and/or usage is carried out in accordance with the operation from the user for the content file CFb based on the usage control policy data 106*b*, and the log thereof is described in the usage log data 308.

Then, the usage log data 308 is transmitted from the SAMs $\mathbf{305}_1$ to $\mathbf{305}_4$ to the EMD service center 302.

In the EMD service center 302, based on the usage log data 308, the charge content is determined (calculated) for each of the content providers 301*a* and 301*b* and the service provider 310, and settlement claim data 152*ca*, 152*cb*, and 152*s* corresponding to them are produced based on the results thereof.

The EMD service center 302 transmits the settlement claim data 152*ca*, 152*cb*, and 152*s* via the payment gateway 90 to the settlement manager 91. By this, the money paid by the user of the user home network 303 to the settlement manager 91 is distributed to the owners of the content providers 301*a* and 301*b* and the service provider 310.

As mentioned above, according to the EMD system 300*b*, as the usage control policy data 106*a* and 106*b* of the content files CFa and CFb stored in the secure container 304, those produced by the content providers 301*a* and 301*b* are used as they are, therefore, in the SAMs $\mathbf{305}_1$ to $\mathbf{305}_4$, the rights for the content files CFa and CFb are reliably cleared based on the usage control policy data 106*a* and 106*b* according to the intention of the content providers 301*a* and 301*b*.

Note that, in the second modification shown in FIG. 98, the case where two content providers were used was exemplified, but any number of the content providers may be used.

Further, there may be a plurality of both of the content providers and service providers.

Third Modification of Second Embodiment

Figure 99:
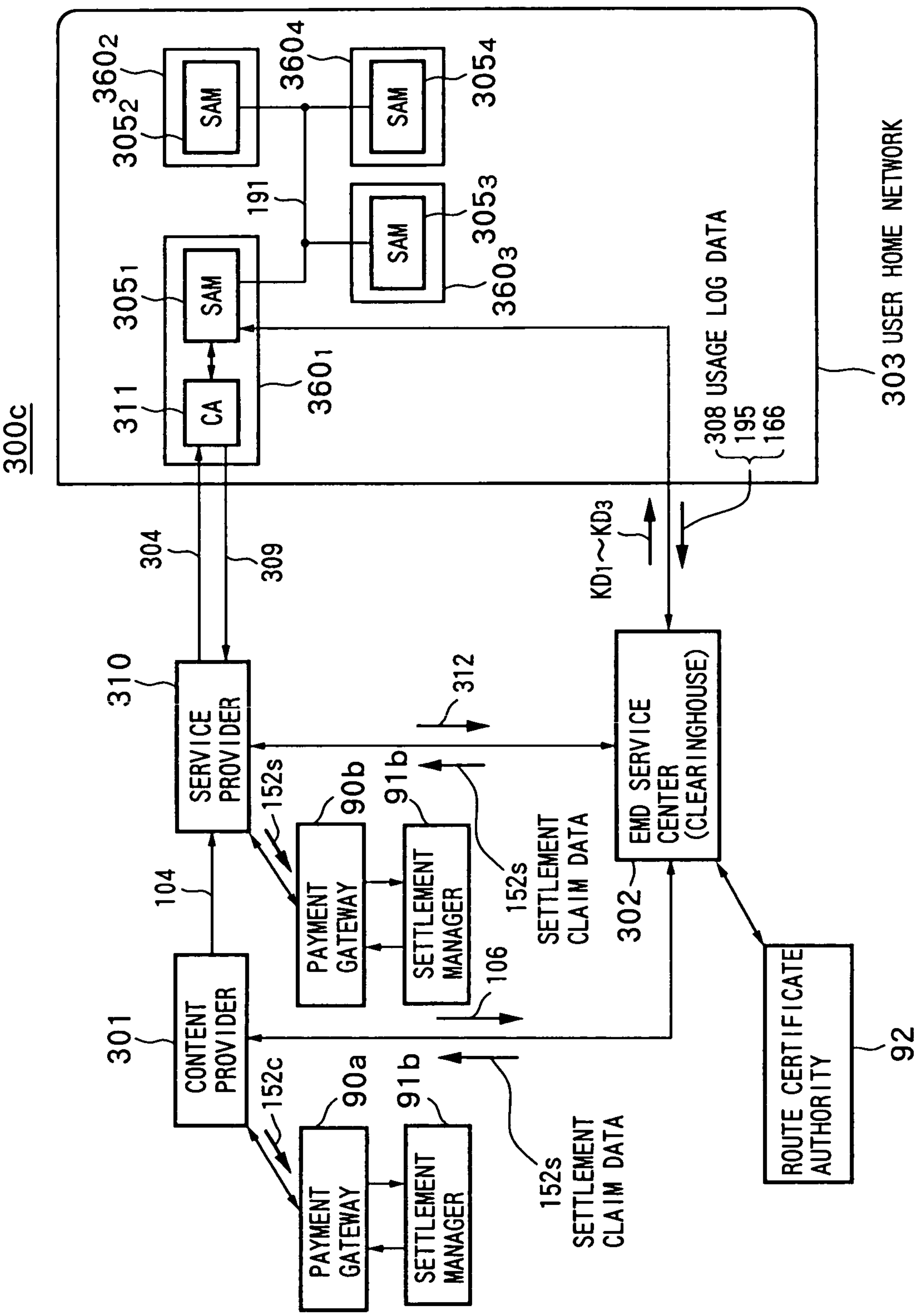
FIG. 99 is a view of the configuration of the EMD system according to a third modification of the second embodiment of the present invention.

FIG. 99 is a view of the configuration of the EMD system according to a third modification of the second embodiment.

In the second embodiment, the case where the EMD service center 302 performed the settlement for the content provider 301 and the service provider 310 at the settlement manager 91 was exemplified, but in the present invention, for example, as shown in FIG. 99, it is also possible for the settlement claim data 152*c* for the content provider 301 and the settlement claim data 152*s* for the service provider 310 to be produced based on the usage log data 308 in the EMD service center 302 and for them to be transmitted to the content provider 301 and the service provider 310.

In this case, the content provider 301 performs settlement at a settlement manager 91*a* via a payment gateway 90*a* by using the settlement claim data 152*c*. Further, the service provider 310 performs settlement at a settlement manager 91*b* via a payment gateway 90*b* by using the settlement claim data 152*s*.

Fourth Modification of Second Embodiment

Figure 100:
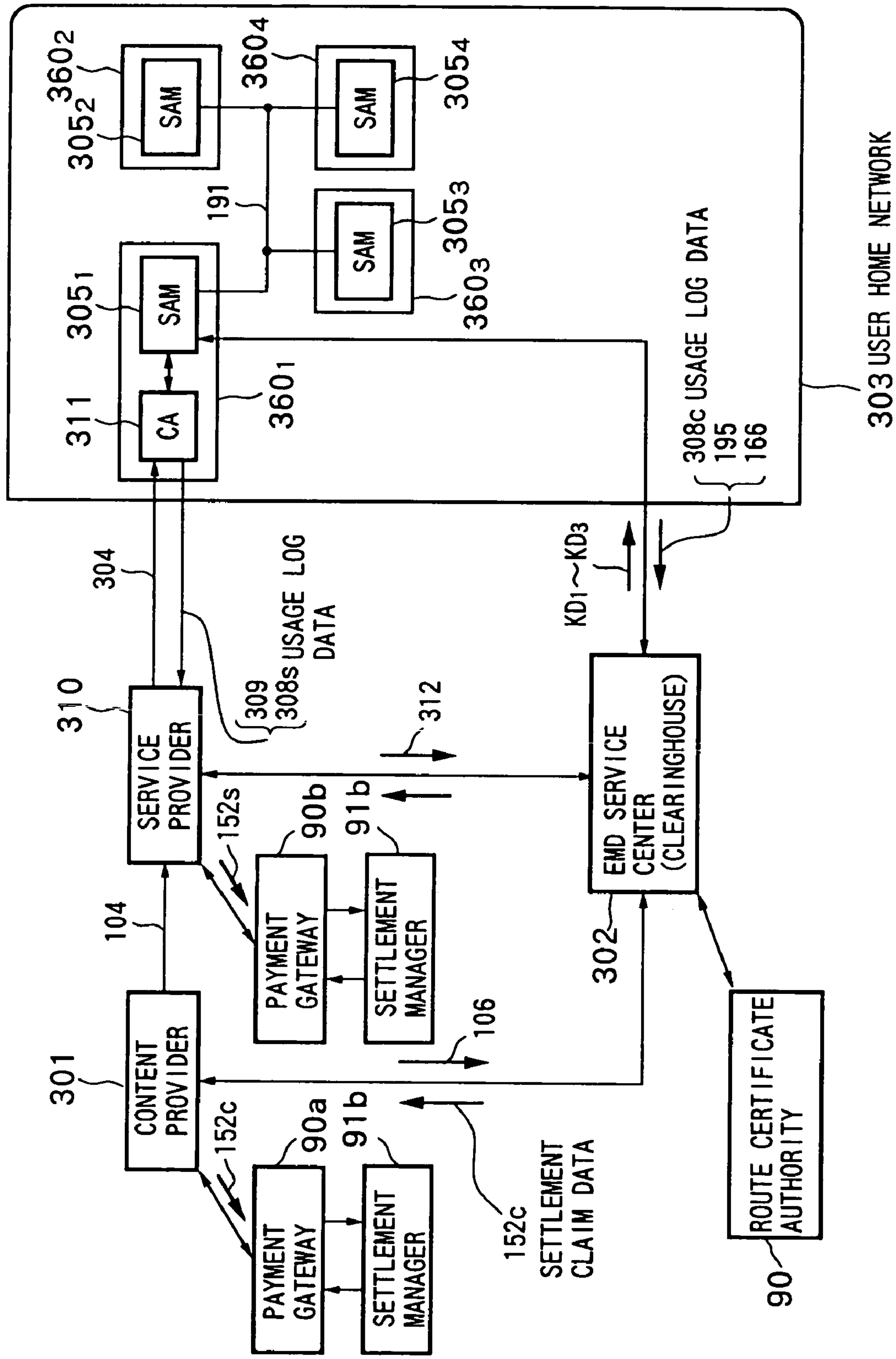
FIG. 100 is a view of the configuration of the EMD system according to a fourth modification of the second embodiment of the present invention.

FIG. 100 is a view of the configuration of the EMD system according to a fourth modification of the second embodiment.

In the second embodiment, the case where the service provider 310 did not have a charging function as in for example the current Internet was exemplified, but where the service provider 310 has a charging function as in the current digital broadcast, in the CA module 311, a usage log data 308*s* with respect to the service of the service provider 310 concerning the secure container 304 is produced and transmitted to the service provider 310.

Then, the service provider 310 performs charge processing based on the usage log data 308*s* to produce the settlement claim data 152*s* and performs settlement at the settlement manager 91*b* via the payment gateway 90*b* by using this.

On the other hand, the SAMs $\mathbf{305}_1$ to $\mathbf{305}_4$ produce usage log data 308*c* with respect to the rights clearing of the content provider 301 concerning the secure container 304 and transmit them to the EMD service center 302.

The EMD service center 302 produces the settlement claim data 152*c* based on the usage log data 308*c* and transmits this to the content provider 301.

The content provider 301 performs settlement at the settlement manager 91*a* via the payment gateway 90*a* by using the settlement claim data 152*c*.

Fifth Modification of Second Embodiment

In the embodiment, as shown in FIG. 72, the case where the user preference filter data 903 was produced based on the usage log data 308 received from the SAM $\mathbf{305}_1$ etc. in the user preference filter generation unit 901 of the EMD service center 302 was exemplified, but it is also possible to produce for example the user preference filter data 903 in the user preference filter generation unit 901 based on the usage control status data 166 produced in the user monitor unit 186 of the SAM $\mathbf{305}_1$ shown in FIG. 78 and transmitted to the EMD service center 302 in real-time.

Sixth Modification of Second Embodiment

The content provider 301, the service provider 310, and the SAMs $\mathbf{305}_1$ to $\mathbf{305}_4$ can register their secret key data $K_{CP,S}$, $K_{SP,S}$, and $K_{SAM1,S}$ to $K_{SAM4,S}$ in the EMD service center 302 too other than their public key data $K_{CP,P}$, $K_{SP,P}$, and $K_{SAM1,P}$ to $K_{SAM4,P}$.

By doing this, it becomes possible for the EMD service center 302 to tap into desired communication among the communication between the content provider 301 and the service provider 310, the communication between the service provider 310 and the SAMs $\mathbf{305}_1$ to $\mathbf{305}_4$, and the communication among the SAMs $\mathbf{305}_1$ to $\mathbf{305}_4$ in the user home network 303 by using the secret key data $K_{CP,S}$, $K_{SP,S}$, and $K_{SAM1,S}$ to $K_{SAM4,S}$ in response to demands from the government or police organizations at the time of emergencies.

Further, for the SAMs $\mathbf{305}_1$ to $\mathbf{305}_4$, it is also possible even if the secret key data $K_{SAM1,S}$ to $K_{SAM4,S}$ are produced by the EMD service center 302 at the time of shipment, and they are stored in the SAMs $\mathbf{305}_1$ to $\mathbf{305}_4$ and, at the same time, held (registered) by the EMD service center 302.

Seventh Modification of Second Embodiment

In the embodiment, the case where, when the content provider 301, service provider 310, and the SAMs $\mathbf{305}_1$ to $\mathbf{305}_4$ communicated with each other, the certificate data $CER_{CP}$, $CER_{SP}$, and $CER_{SAM1}$ to $CER_{SAM4}$ were acquired from the EMD service center 302 in advance and were transmitted to the destination of communication by the in-band method was exemplified, but in the present invention, various formats can be employed as the transmission format of the certificate data to the destination of communication.

For example, when the content provider 301, service provider 310, and the SAMs $305_1$ to $305_4$ communicate with each other, it is also possible if the certificate data $CER_{CP}$, $CER_{SP}$, and $CER_{SAM1}$ to $CER_{SAM4}$ are acquired from the EMD service center 302 in advance and are transmitted to the destination of communication by the in-band method preceding the related communication.

Further, it is also possible for the content provider 301, service provider 310, and the SAMs $305_1$ to $305_4$ to acquire the certificate data $CER_{CP}$, $CER_{SP}$, and $CER_{SAM1}$ to $CER_{SAM4}$ from the EMD service center 302 at the time of communication.

Figure 101:
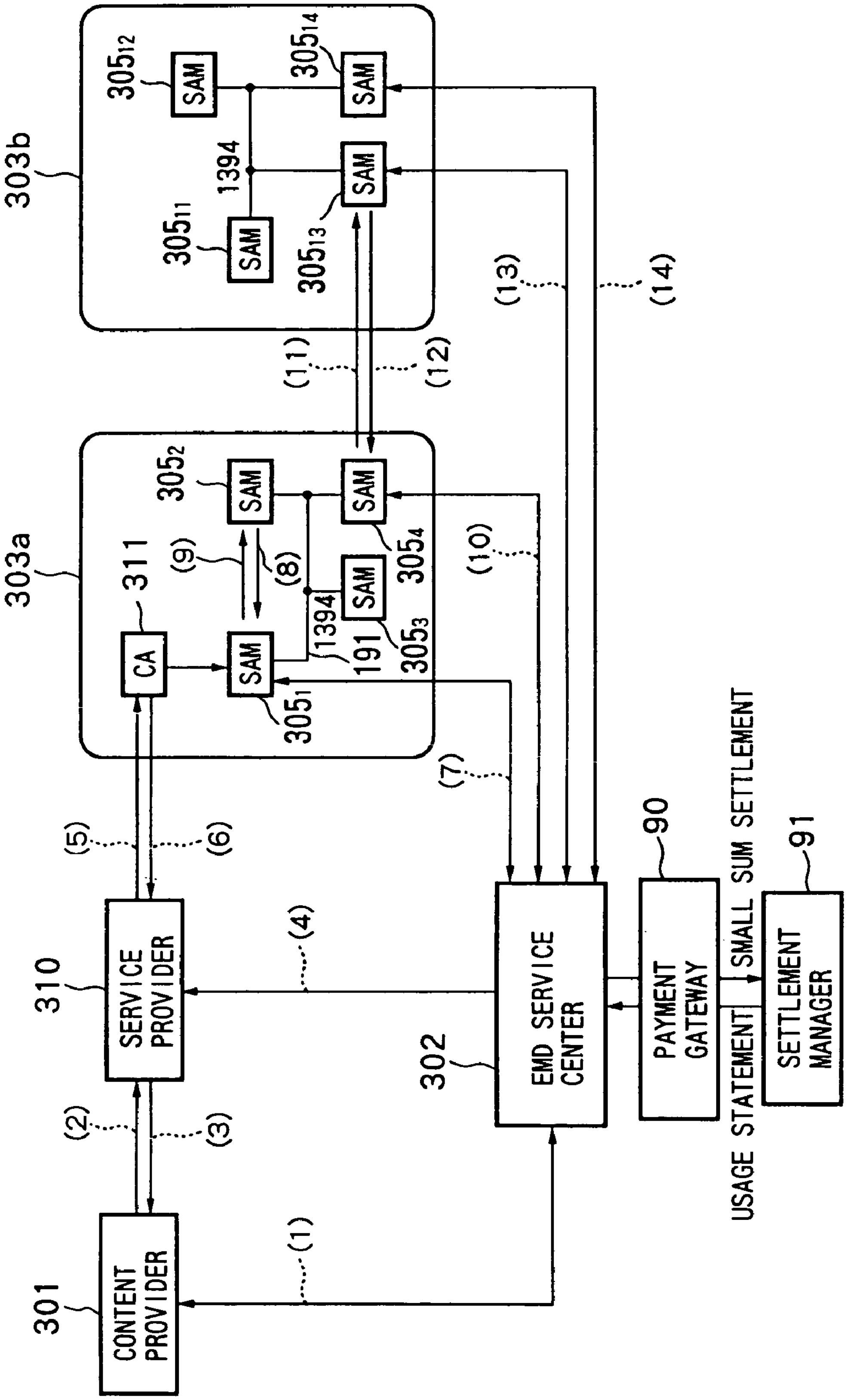
FIG. 101 is a view for explaining a form of a route for acquiring certificate data.

FIG. 101 is a view for explaining the format of the route for acquiring (obtaining) the certificate data.

Note that, in FIG. 101, components given the same reference numerals as those of FIG. 59 are the same as the components having the same reference numerals explained above. Further, the user home network 303*a* is the same as the user home network 303 mentioned before. In a user home network 303*b*, SAMs $305_{11}$ to $305_{14}$ are connected via the IEEE1394 serial bus serving as the bus 191.

Where the content provider 301 acquires the certificate data $CER_{SP}$ of the service provider 310, there are for example a case where the certificate data $CER_{SP}$ is transmitted from the service provider 310 to the content provider 301 preceding the communication ((3) in FIG. 101) and a case where the content provider 301 orders the certificate data $CER_{SP}$ from the EMD service center 302 ((1) in FIG. 101).

Also, where the service provider 310 acquires the certificate data $CER_{CP}$ of the content provider 301, there are for example a case where the certificate data $CER_{CP}$ is transmitted from the content provider 301 to the service provider 310 preceding the communication ((2) in FIG. 101) and a case where the service provider 310 orders the certificate data $CER_{CP}$ from the EMD service center 302 ((4) in FIG. 101).

Also, where the service provider 310 acquires the certificate data $CER_{SAM1}$ to $CER_{SAM4}$ of the SAMs $305_1$ to $305_4$, there are for example a case where the certificate data $CER_{SAM1}$ to $CER_{SAM4}$ are transmitted from the SAMs $305_1$ to $305_4$ to the service provider 310 preceding the communication ((6) in FIG. 101) and a case where the service provider 310 orders the certificate data $CER_{SAM1}$ to $CER_{SAM4}$ from the EMD service center 302 ((4) in FIG. 101).

Also, where the SAMs $305_1$ to $305_4$ acquire the Certificate data $CER_{SP}$ of the service provider 310, there are for example a case where the certificate data $CER_{SP}$ is transmitted from the service provider 310 to the SAMs $305_1$ to $305_4$ preceding the communication ((5) in FIG. 101) and a case where the SAMs $305_1$ to $305_4$ order the certificate data $CER_{SP}$ from the EMD service center 302 ((7) in FIG. 101, etc.).

Also, where the SAM $305_1$ acquires the certificate data $CER_{SAM2}$ of the SAM $305_2$, there are for example a case where the certificate data $CER_{SAM2}$ is transmitted from the SAM $305_2$ to the SAM $305_1$ preceding the communication ((8) in FIG. 101) and a case where the SAM $305_1$ orders the certificate data $CER_{SAM2}$ from the EMD service center 302 ((7) in FIG. 101, etc.).

Also, where the SAM $305_2$ acquires the certificate data $CER_{SAM1}$ of the SAM $305_1$, there are for example a case where the certificate data $CER_{SAM1}$ is transmitted from the SAM $305_1$ to the SAM $305_2$ preceding the communication ((9) in FIG. 101), a case where the SAM $305_2$ orders the certificate data $CER_{SAM1}$ from the EMD service center 302 by itself, and a case where the SAM $305_2$ orders the certificate data $CER_{SAM1}$ via the network apparatus with the SAM $305_1$ mounted thereon ((7) and (8) in FIG. 101).

Also, where the SAM $305_4$ acquires certificate data $CER_{SAM3}$ of the SAM $305_{13}$, there are for example a case where the certificate data $CER_{SAM3}$ is transmitted from the SAM $305_{13}$ to the SAM $305_4$ preceding the communication ((12) in FIG. 101), a case where the SAM $305_4$ orders the certificate data $CER_{SAM3}$ from the EMD service center 302 by itself ((10) in FIG. 101), and a case where the SAM $305_4$ orders the certificate data $CER_{SAM3}$ via the network apparatus in the user home network 303*b*.

Also, where the SAM $305_{13}$ acquires the certificate data $CER_{SAM4}$ of the SAM $305_4$, there are for example a case where the certificate data $CER_{SAM4}$ is transmitted from the SAM $305_4$ to the SAM $305_{13}$ preceding the communication ((11) in FIG. 101), a case where the SAM 305" orders the certificate data $CER_{SAM4}$ from the EMD service center 302 by itself ((13) in FIG. 101), and a case where the SAM $305_{13}$ orders the certificate data $CER_{SAM4}$ via the network apparatus in the user home network 303*b*.

Handling of Certificate Revocation List (Data) in Second Embodiment

In the second embodiment, in order to prevent the content provider 301, service provider 310, and the SAMs $305_1$ to $305_4$ used for illegitimate action etc. from communicating with the other apparatuses in the EMD service center 302, a certificate revocation list for invalidating the certificate data of the apparatus used for the related illegitimate action is produced. Then, the related certificate revocation list CRL is transmitted to the content provider 301, service provider 310, and the SAMs $305_1$ to $305_4$.

Note that, it is also possible if the certificate revocation list CRL is produced in for example the content provider 301, service provider 310, and the SAMs $305_1$ to $305_4$ other than the EMD service center 302.

First, an explanation will be made of the case where the EMD service center 302 invalidates the certificate data $CER_c$, of the content provider 301.

Figure 102:
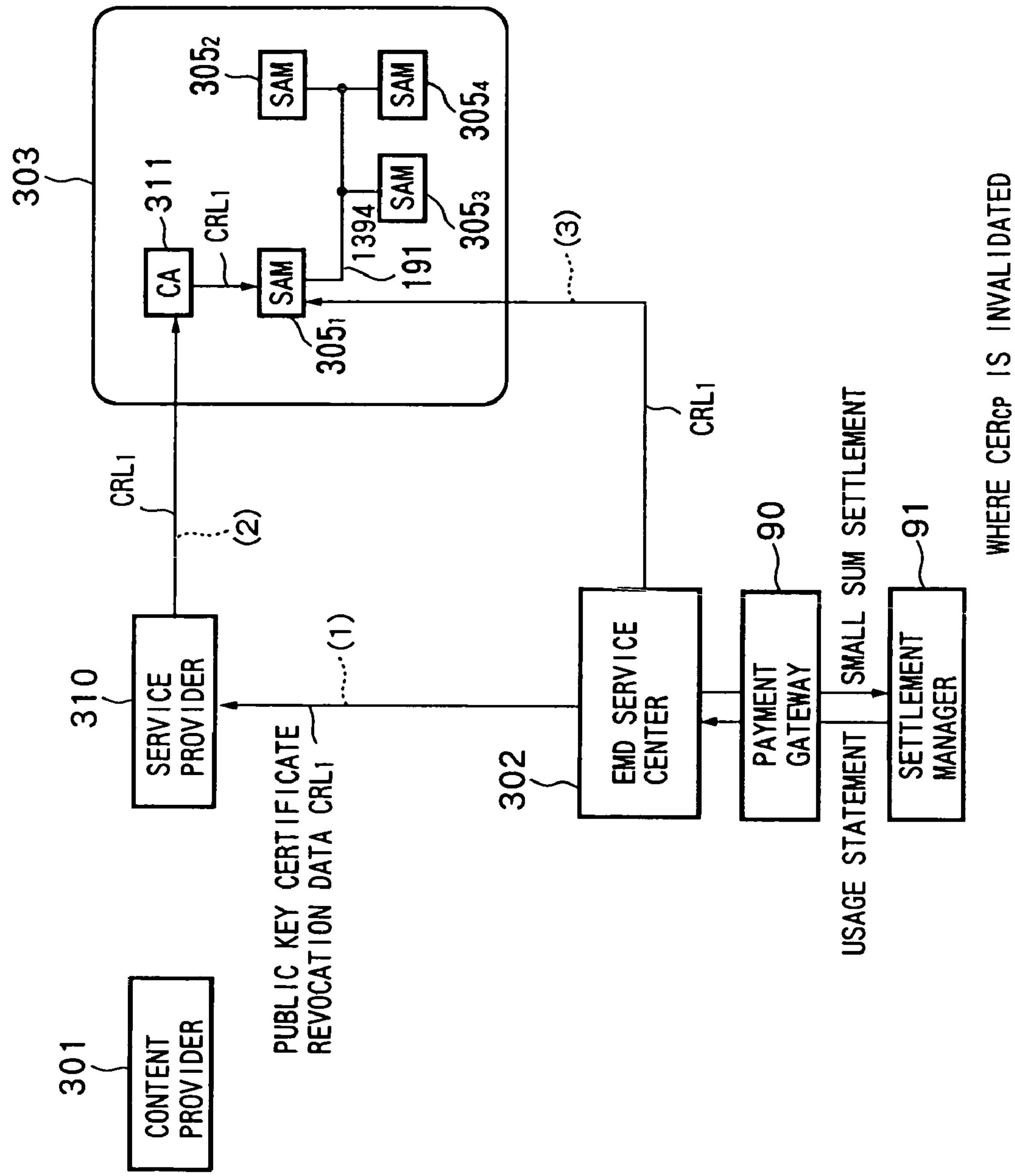
FIG. 102 is a view for explaining processing in a case where the certificate data of the content provider is invalidated.

As shown in FIG. 102, the EMD service center 302 transmits a certificate revocation list $CRL_1$ indicating the invalidation of the certificate data $CER_{CP}$ to the service provider 310 ((1) in FIG. 102). When verifying the signature data input from the content provider 301, the service provider 310 decides the validity of the certificate data $CER_{CP}$ by referring to the certificate revocation list $CRL_1$, performs signature verification using the public key data $K_{CP,P}$ where it decides that it is valid, while invalidates the data from the content provider 301 without the related signature verification where it decides that it is invalid. Note that, it is also possible not to invalidate the data, but reject the communication.

Also, the EMD service center 302 transmits the certificate revocation list $CRL_1$ to for example the SAM $305_1$ in the user home network 303 by utilizing circulation resources of the service provider 310 by either the broadcast type or on-demand type ((1) and (2) in FIG. 102). When verifying the signature data of the content provider 301 stored in the secure container input from the service provider 310, the SAM $305_1$ decides the validity of the certificate data $CER_{CP}$ by referring to the certificate revocation list $CRL_1$, performs signature verification using the public key data where it decides it as valid, while invalidates the related secure container without the related signature verification where it decides it as invalid.

Note that, it is also possible for the EMD service center 302 to directly transmit the certificate revocation list $CRL_1$ to the SAM $305_1$ via the network apparatus in the user home network 303 ((3) in FIG. 102).

Next, an explanation will be made of the case where the EMD service center 302 invalidates the certificate data $CER_{SP}$ of the service provider 310.

Figure 103:
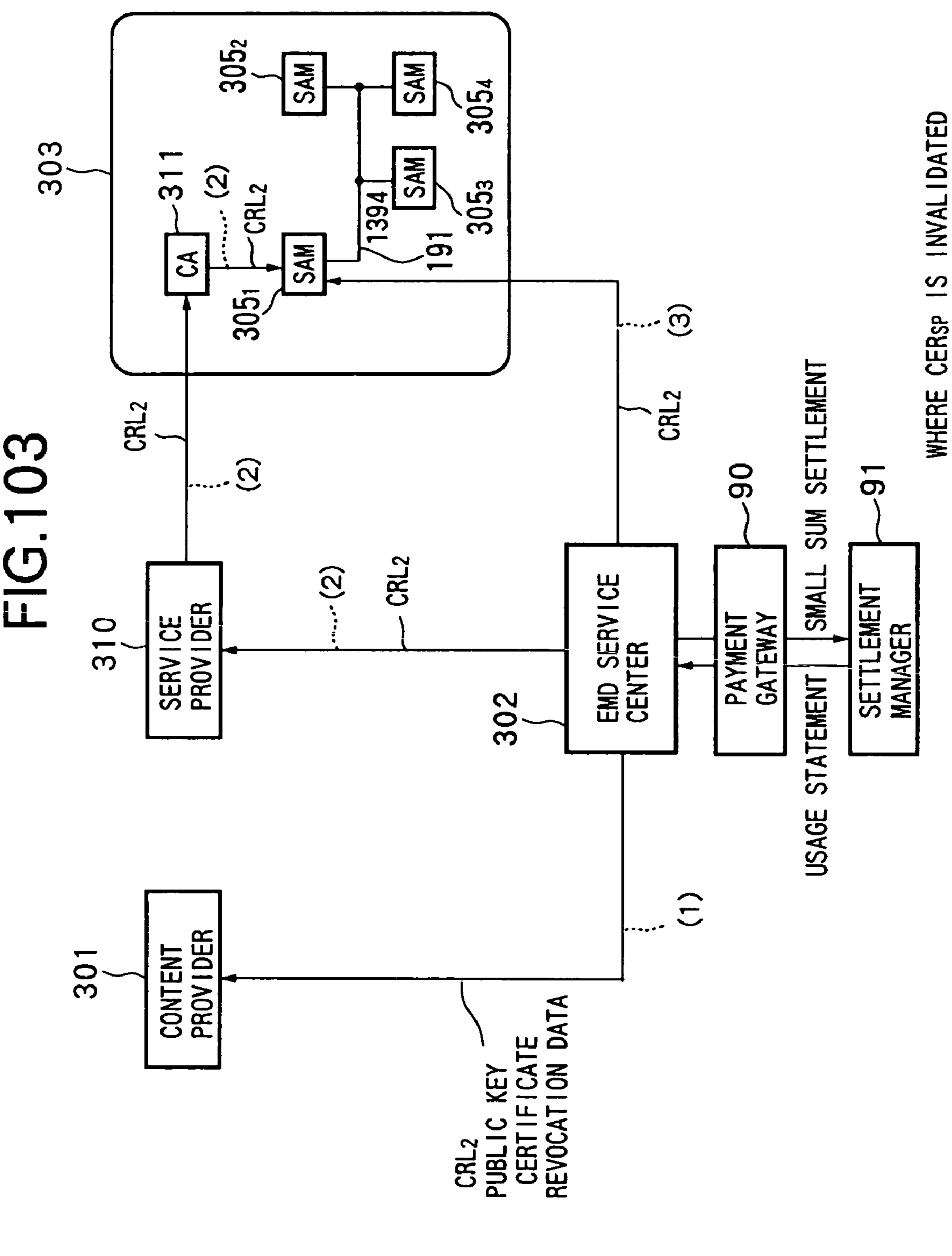
FIG. 103 is a view for explaining processing in a case where the certificate data of the service provider is invalidated.

As shown in FIG. 103, the EMD service center 302 transmits a certificate revocation list $CRL_2$ indicating the invalidation of the certificate data $CER_{SP}$ to the content provider 301 ((1) in FIG. 103). When verifying the signature data input from the service provider 310, the content provider 301 decides the validity of the certificate data $CER_{SP}$ by referring to the certificate revocation list $CRL_2$, performs signature verification using the public key data where it decides it as valid, while invalidates the data from the service provider 310 without the related signature verification where it decides it as invalid.

Also, the EMD service center 302 transmits the certificate revocation list $CRL_2$ to for example the SAM $305_1$ in the user home network 303 by utilizing the circulation resources of the service provider 310 by either the broadcast type or on-demand type ((2) in FIG. 103). When verifying the signature data of the content provider 301 stored in the secure container input from the service provider 310, the SAM $305_1$ decides the validity of the certificate data $CER_{SP}$ by referring to the certificate revocation list $CRL_2$, performs signature verification using the public key data $K_{SP,P}$ where it decides it as valid, and while invalidates the related secure container without the related signature verification where it decides it as invalid.

In this case, in the service provider 310, the module for transmitting and receiving the certificate revocation list $CRL_2$ must have tamper resistance.

Further, in the service provider 310, the certificate revocation list $CRL_2$ must be stored in a region where tampering by an interested party of the service provider 310 is difficult.

Note that, it is also possible for the EMD service center 302 to directly transmit the certificate revocation list $CRL_2$ to the SAM $305_2$ via the network apparatus in the user home network 303 ((3) in FIG. 103).

Next, an explanation will be made of a case where the EMD service center 302 invalidates for example the certificate data $CER_{SAM2}$ of the SAM $305_2$.

Figure 104:
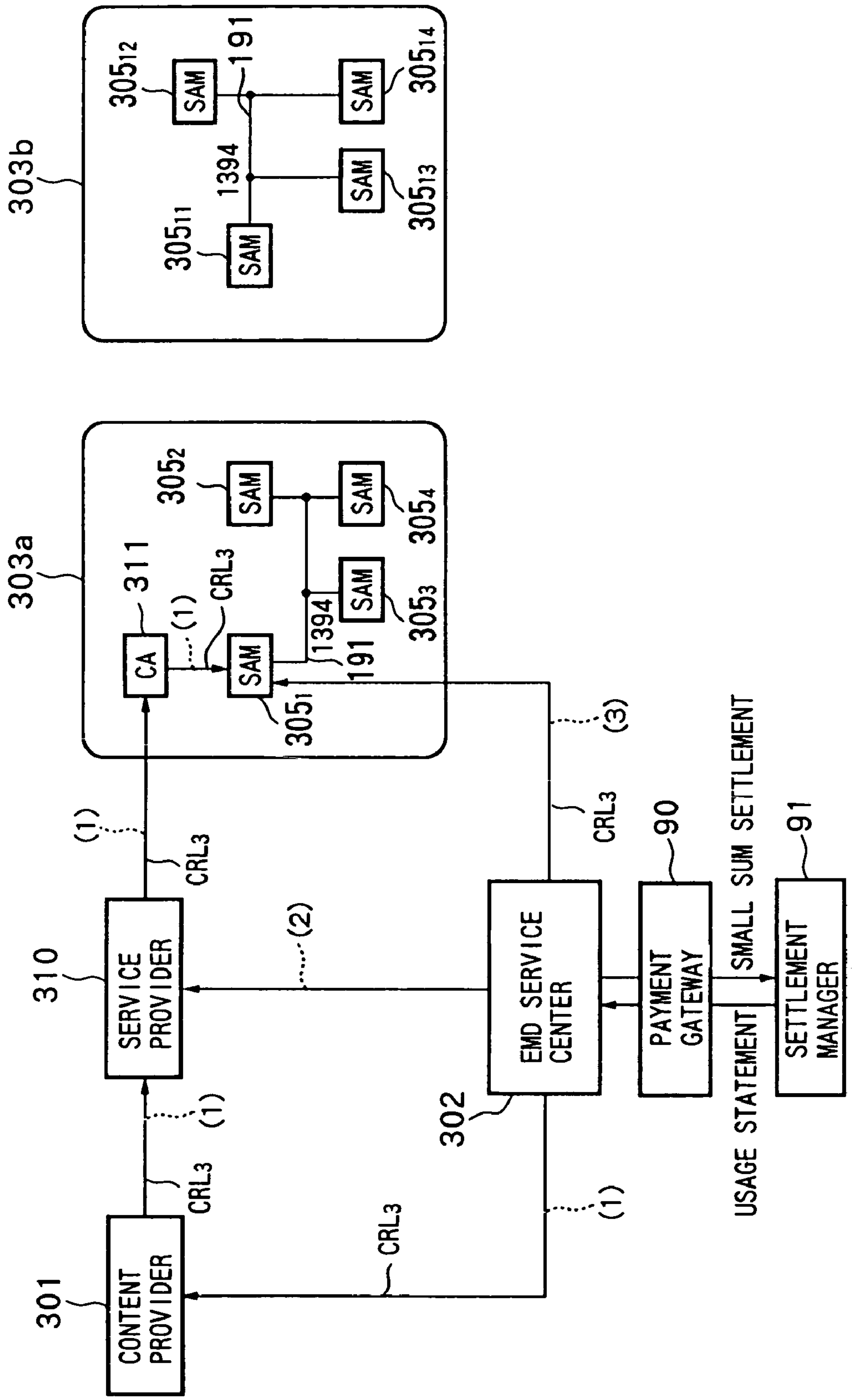
FIG. 104 is a view for explaining processing in a case where the certificate data of the SAM is invalidated.

As shown in FIG. 104, the EMD service center 302 transmits a certificate revocation list $CRL_3$ indicating the invalidation of the certificate data $CER_{SAM2}$ to the content provider 301 ((1) in FIG. 104). The content provider 301 transmits the certificate revocation list $CRL_3$ to the service provider 310. The service provider 310 transmits the certificate revocation list $CRL_3$ to for example the SAM $305_1$ in the user home network 303 by utilizing its own circulation resources by either the broadcast type or on-demand type ((1) in FIG. 104). When verifying the signature data of the SAM $305_2$ added to the data input from the SAM $305_2$, the SAM $305_1$ decides the validity of the certificate data $CER_{SAM2}$ by referring to the certificate revocation list $CRL_3$, performs signature verification using the public key data $K_{SAM2,P}$ where it decides it as valid, while invalidates the related data without the related signature verification where it decides it as invalid.

In this case, in the service provider 310, the module for transmitting and receiving the certificate revocation list $CRL_3$ must have tamper resistance. Further, in the service provider 310, the certificate revocation list $CRL_3$ must be stored in a region where tampering by an interested party of the service provider 310 is difficult.

It is also possible for the EMD service center 302 to transmit the certificate revocation list $CRL_3$ to the SAM $305_1$ via the service provider 310 ((1) and (2) in FIG. 104).

Further, it is also possible for the EMD service center 302 to directly transmit the certificate revocation list $CRL_3$ to the SAM $305_1$ via the network apparatus in the user home network 303 ((3) in FIG. 104).

Also, the EMD service center 302 produces and stores the certificate revocation list $CRL_3$ indicating the invalidation of for example the certificate data $CER_{SAM2}$ of the SAM $305_2$.

Figure 105:
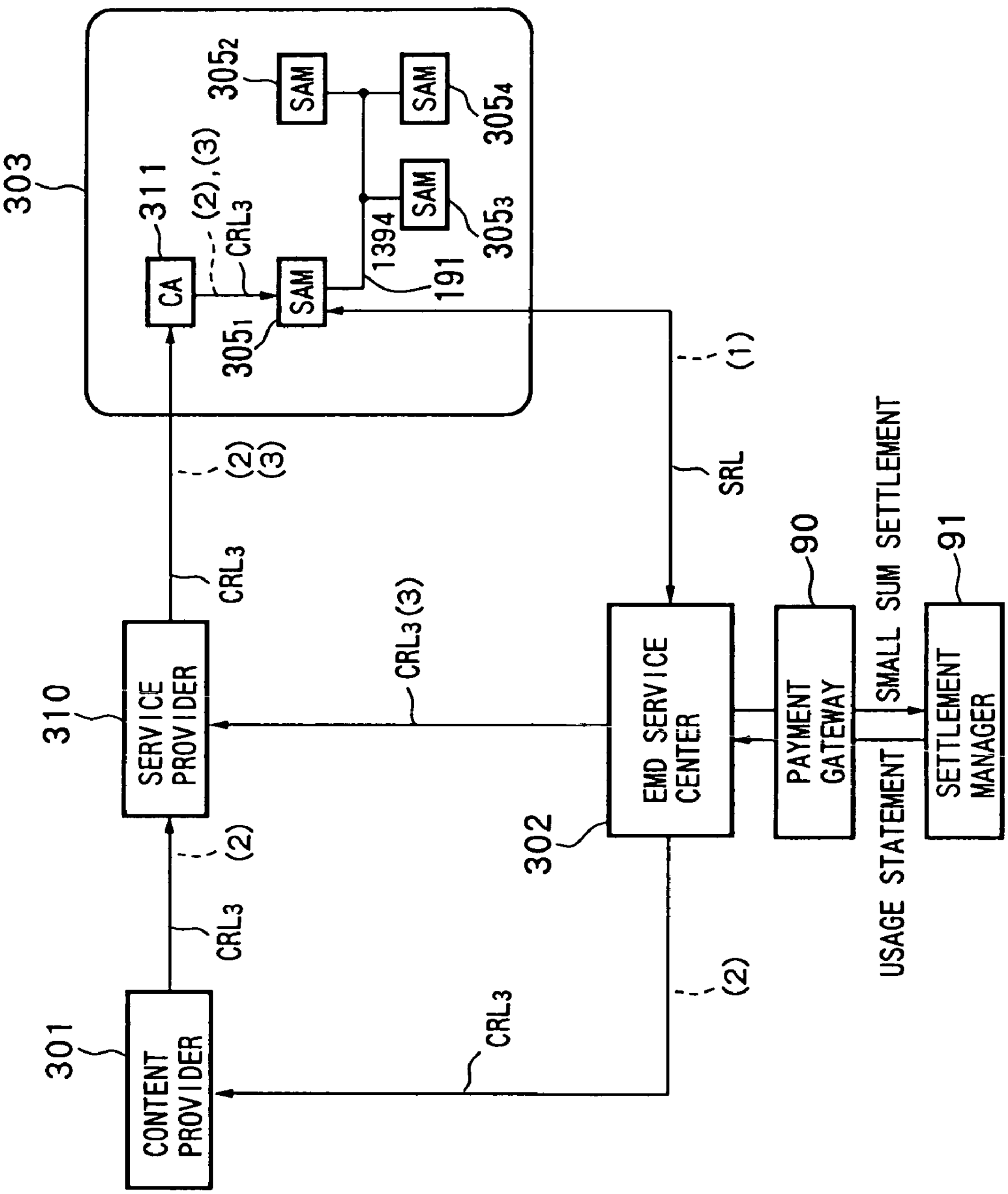
FIG. 105 is a view for explaining another processing in the case where the certificate data of the SAM is invalidated.

Also, the user home network 303 produces a SAM registration list SRL of the SAMs connected to the bus 191 and transmits this to the EMD service center 302 ((1) in FIG. 105).

The EMD service center 302 specifies the SAMs (for example SAM $305_4$) for which invalidation is instructed by the certificate revocation list $CRL_3$ among the SAMs $305_1$ to $305_4$ indicated in the SAM registration list, sets revocation flags corresponding to the related SAMs in the SAM registration list SRL so as to indicate the invalidity, and produces a new SAM registration list SRL.

Next, the EMD service center 302 transmits the related produced SAM registration list SRL to the SAM $305_1$ ((1) in FIG. 105).

The SAM $305_1$ determines the existence of the verification of the signature data and whether or not communication is permitted by referring to the revocation flags of the SAM registration list SRL when communicating with another SAM.

Also, the EMD service center 302 produces the certificate revocation list $CRL_3$ and transmits this to the content provider 301 ((2) in FIG. 105).

The content provider 301 transmits the certificate revocation list $CRL_3$ to the service provider 310 ((2) in FIG. 105).

Next, the service provider 310 transmits the certificate revocation list $CRL_3$ to the SAM $305_1$ by either the broadcast type or on-demand type by utilizing its own circulation resources ((2) in FIG. 105).

The SAM $305_1$ specifies the SAMs (for example SAM $305_2$) for which invalidation is instructed by the certificate revocation list $CRL_3$ among the SAMs $305_1$ to $305_4$ indicated in the SAM registration list produced by itself and sets revocation flags corresponding to the related SAMs in the SAM registration list SRL so as to indicate the invalidity.

From then on, the SAM $305_1$ determines the existence of verification of the signature data and whether or not communication is permitted by referring to the revocation flag of the related SAM registration list SRL when communicating with another SAM.

Also, the EMD service center 302 produces the certificate revocation list $CRL_3$ and transmits this to the service provider 310 ((3) in FIG. 105).

Next, the service provider 310 transmits the certificate revocation list $CRL_3$ to the SAM $305_1$ by either the broadcast type or on-demand type by utilizing its own circulation resources ((3) in FIG. 105).

The SAM $305_1$ specifies the SAMs (for example SAM $305_2$) for which invalidation is instructed by the certificate revocation list $CRL_3$ among the SAMs $305_1$ to $305_4$ indicated in the SAM registration list produced by itself and sets revocation flags corresponding to the related SAMs in the SAM registration list SRL so as to indicate the invalidity.

From then on, the SAM $305_1$ determines the existence of verification of the signature data and whether or not communication is permitted by referring to the revocation flag of the related SAM registration list SRL when communicating with another SAM.

Role Etc. of EMD Service Center 302

Figure 106:
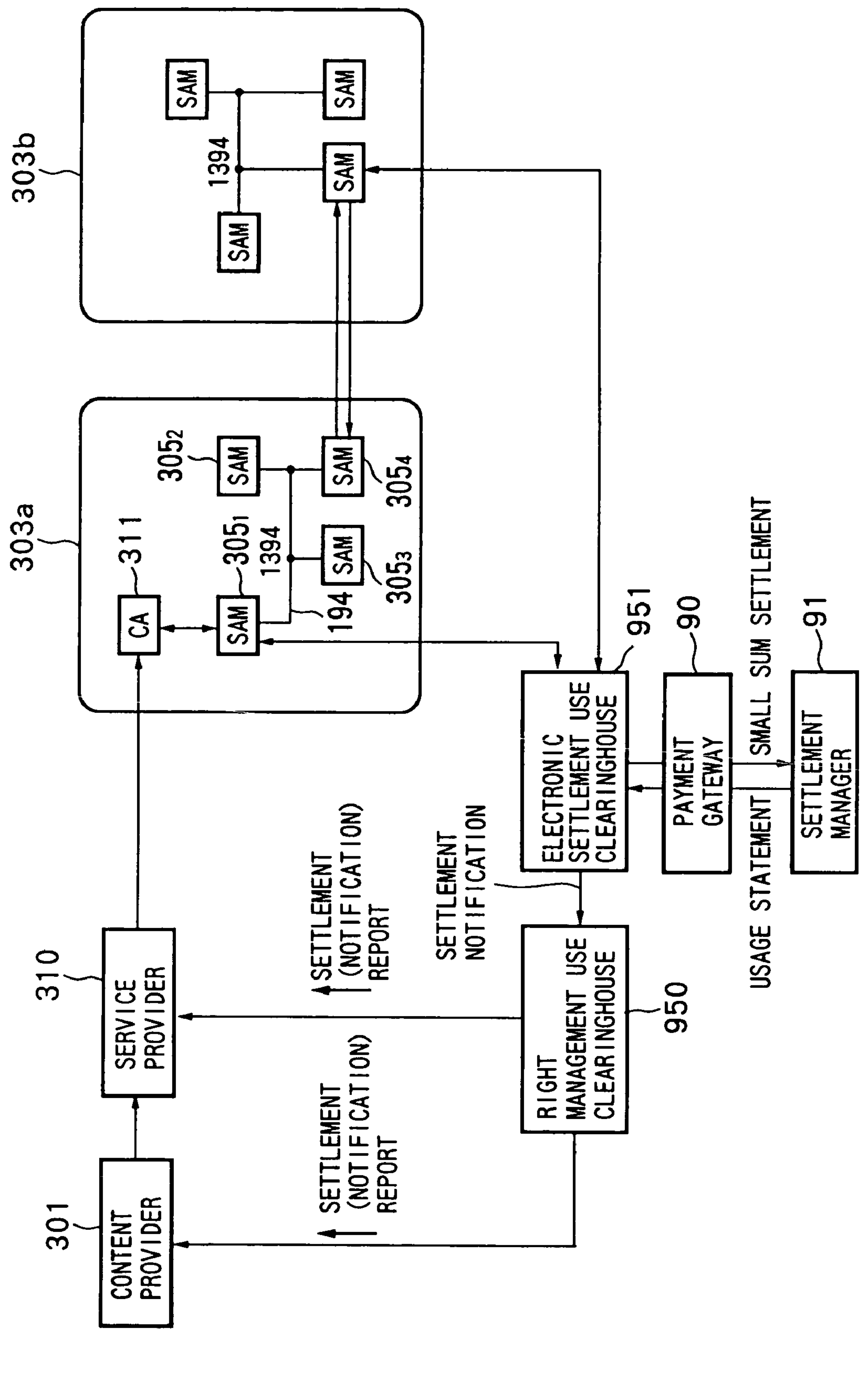
FIG. 106 is a view for explaining a case where a right management use clearinghouse and an electronic settlement use clearinghouse are provided in the EMD system shown in FIG. 47 in place of the EMD service center.

FIG. 106 is a view of the configuration of the EMD system where the functions of the EMD service center (clearinghouse) 302 shown in FIG. 59 are divided between a right management use clearinghouse 950 and an electronic settlement use clearinghouse 951.

In the related EMD system, in the electronic settlement use clearinghouse 951, settlement processing (profit distribution processing) is carried out based on the usage log data 308 from the SAM of the user home networks 303*a* and 303*b*, settlement claim data of the content provider 301 and the service provider 310 are produced, and settlement is carried out at the settlement manager 91 via the payment gateway 90.

Also, the right management use clearinghouse 950 produces the settlement reports of the content provider 301 and the service provider 310 in accordance with the settlement notification from the electronic settlement use clearinghouse 951 and transmits them to the content provider 301 and the service provider 310.

Also, it performs the registration (authentication) etc. of the usage control policy data 106 and the content key data Kc of the content provider 301.

Figure 107:
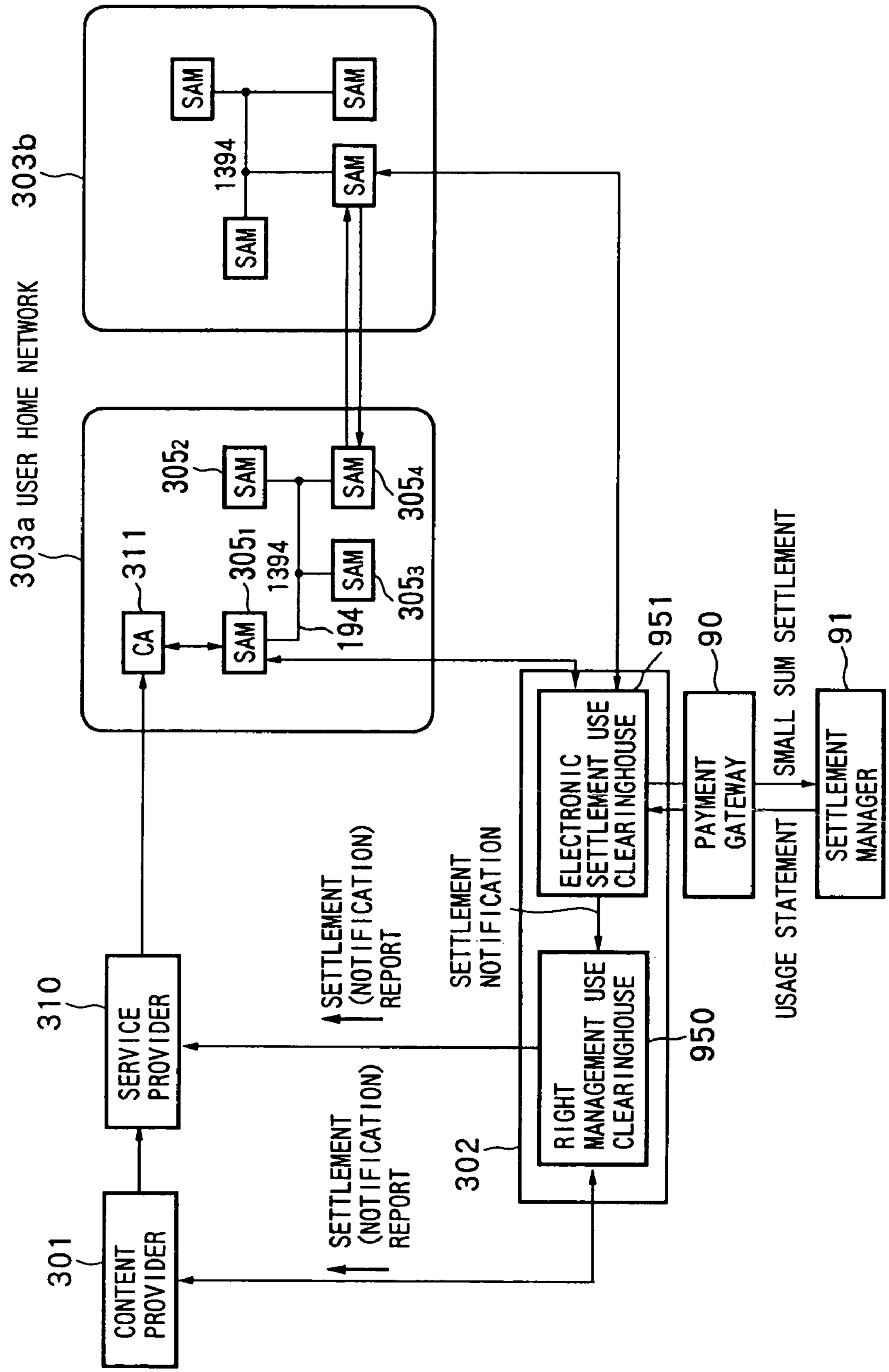
FIG. 107 is a view of the configuration of the EMD system in a case where the right management use clearinghouse and the electronic settlement use clearinghouse shown in FIG. 106 are provided in a single EMD service center.

Note that, as shown in FIG. 107, when the right management use clearinghouse 950 and the electronic settlement use clearinghouse 951 are accommodated in a single apparatus, the EMD service center 302 shown in FIG. 59 is formed.

Figure 108:
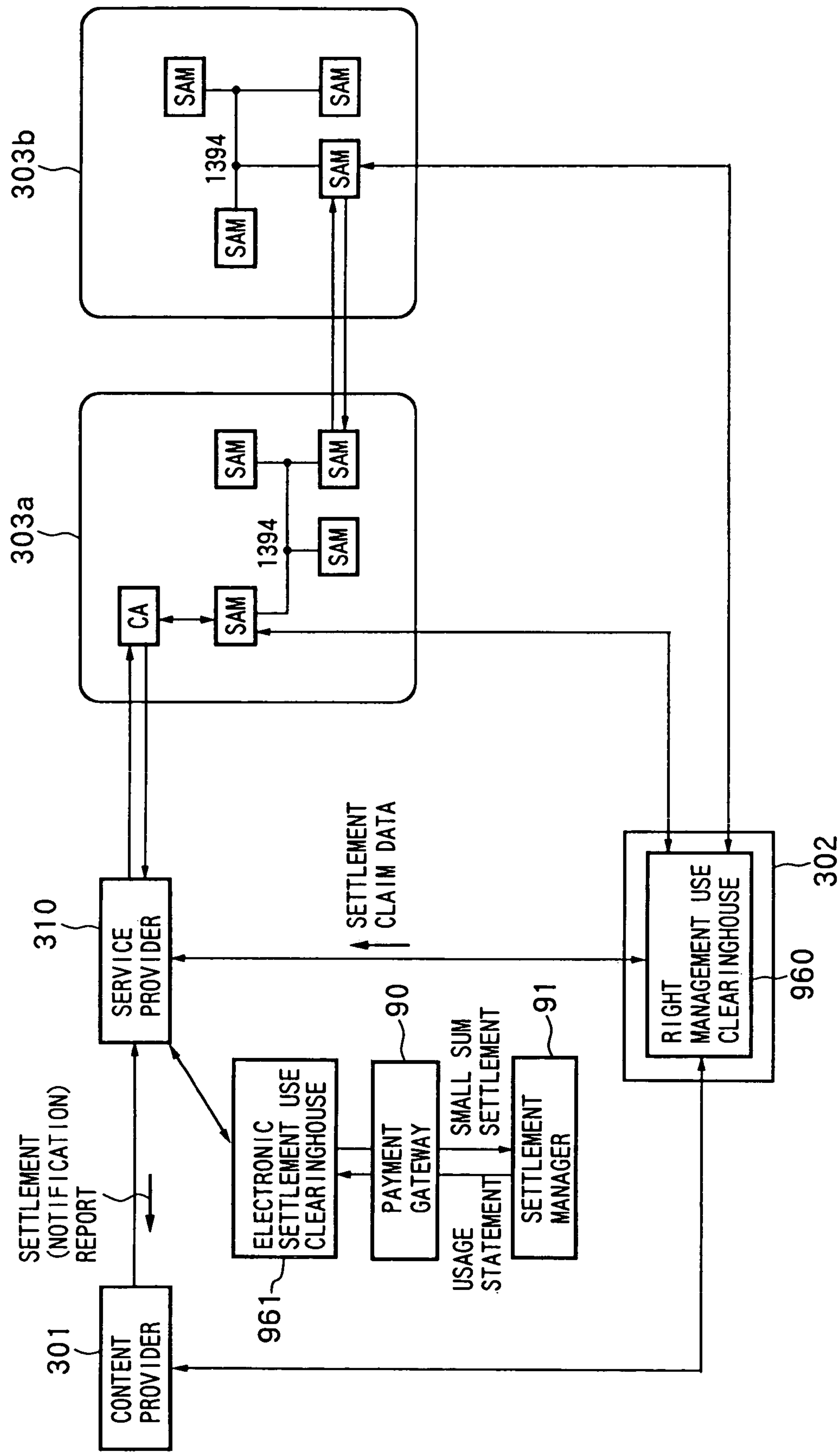
FIG. 108 is a view of the configuration of the EMD system in a case where the service provider directly performs settlement at the electronic settlement use clearinghouse.

Also, in the present invention, for example, it is also possible to provide the function of a right management use clearinghouse 960 in the EMD service center 302, perform the registration etc. of the usage control policy data 106 in the right management use clearinghouse 960 and, at the same time, produce the settlement claim data of the service provider 310 based on the usage log data 308 from the SAMs and transmit this to the service provider 310 as shown in FIG. 108. In this case, the service provider 310 utilizes its own charge system as an electronic settlement use clearinghouse 961 and performs settlement based on the settlement claim data from the right management use clearinghouse 960.

Figure 109:
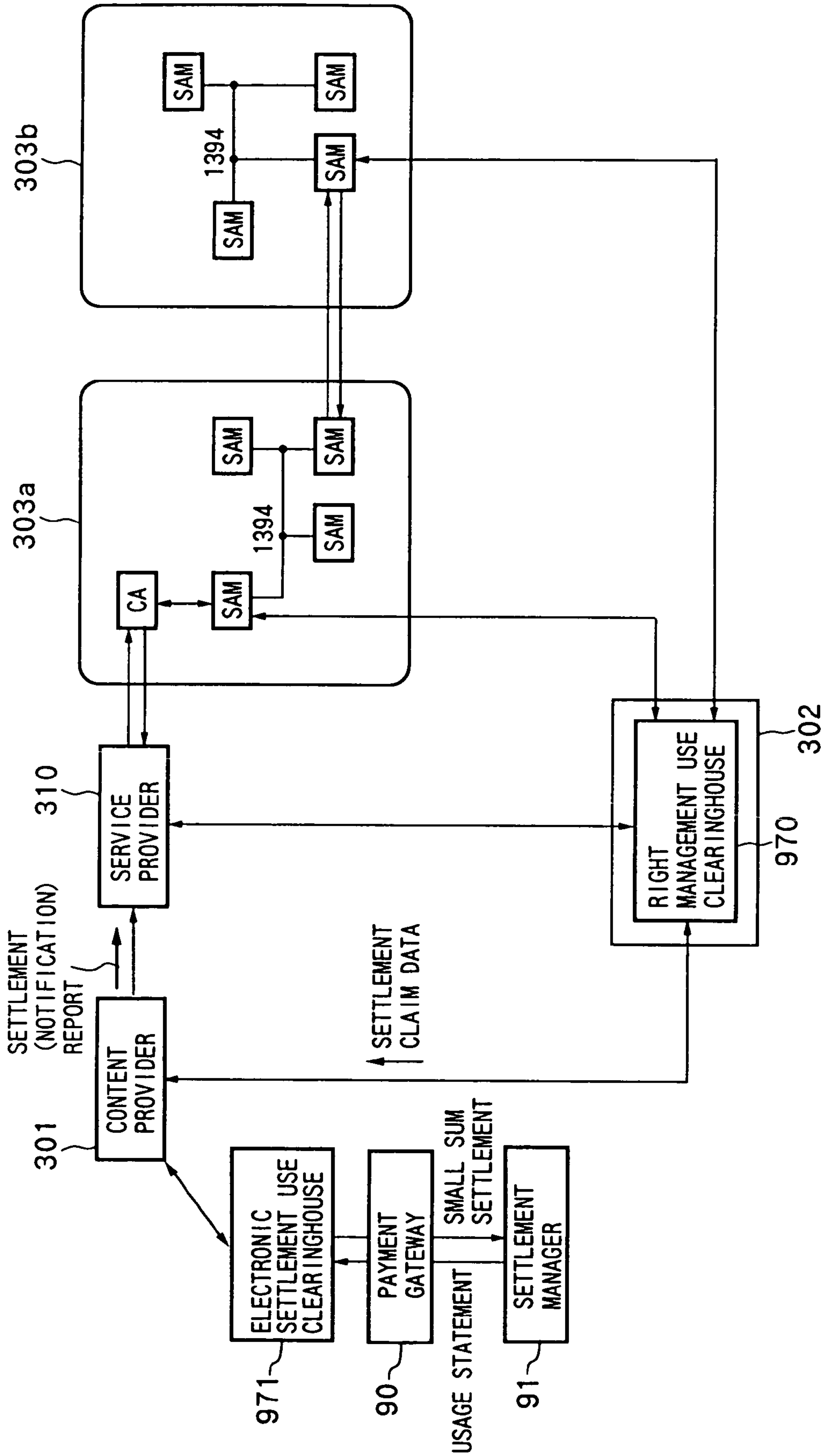
FIG. 109 is a view of the configuration of the EMD system in a case where the content provider directly performs settlement at the electronic settlement use clearinghouse.

Also, in the present invention, for example, it is also possible to provide the function of a right management use clearinghouse 970 in the EMD service center 302, perform the registration etc. of the usage control policy data 106 in the right management use clearinghouse 970 and, at the same time, produce the settlement claim data of the content provider 301 based oh the usage log data 308 from the SAMs and transmit this to the content provider 301 as shown in FIG. 109. In this case, the content provider 301 utilizes its own charge system as an electronic settlement use clearinghouse 971 and performs settlement based on the settlement claim data from the right management use clearinghouse 970.

Figure 110:
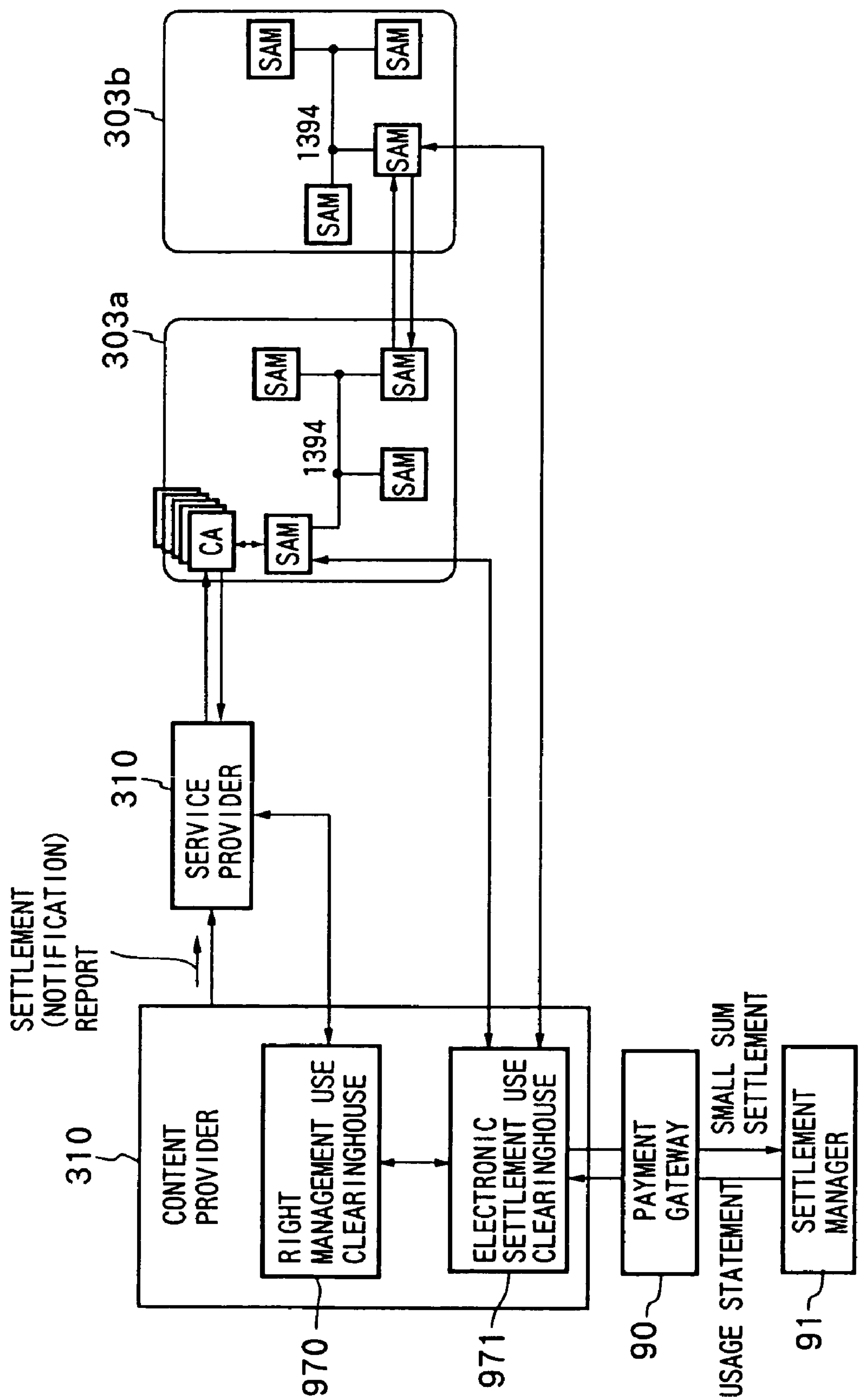
FIG. 110 is a view of the configuration of the EMD system in a case where the content provider is further provided with functions of both of the right management use clearinghouse and the electronic settlement use clearinghouse.

Also, in the present invention, for example, it is also possible to provide the function of the right management use clearinghouse 970 and the electronic settlement use clearinghouse 971 mentioned above in the content provider 301 as shown in FIG. 110.

In this case, the content provider 301 utilizes its own charge system as the electronic settlement use clearinghouse 961 and performs settlement by itself at the settlement manager 91 based on the settlement claim data produced in the right management use clearinghouse 970.

Eighth Modification of the Second Embodiment

In the second embodiment, the case where the secure container 104 of the format shown in FIG. 5 was provided from the content provider 301 to the service provider 310, and the secure container 304 of the format shown in FIG. 65 was distributed from the service provider 310 to the user home network 303 in the EMD system 300 shown in FIG. 59 was exemplified.

Namely, in the second embodiment, the case where a single content file CF and a single key file KF corresponding to the related content file CF were stored in the secure container 104 and the secure container 304 as shown in FIG. 5 and FIG. 65 was exemplified.

In the present invention, it is also possible to store a plurality of content files CF and a plurality of key files KF corresponding to the related plurality of content files CF in the secure container 104 and the secure container 304.

Figure 111:
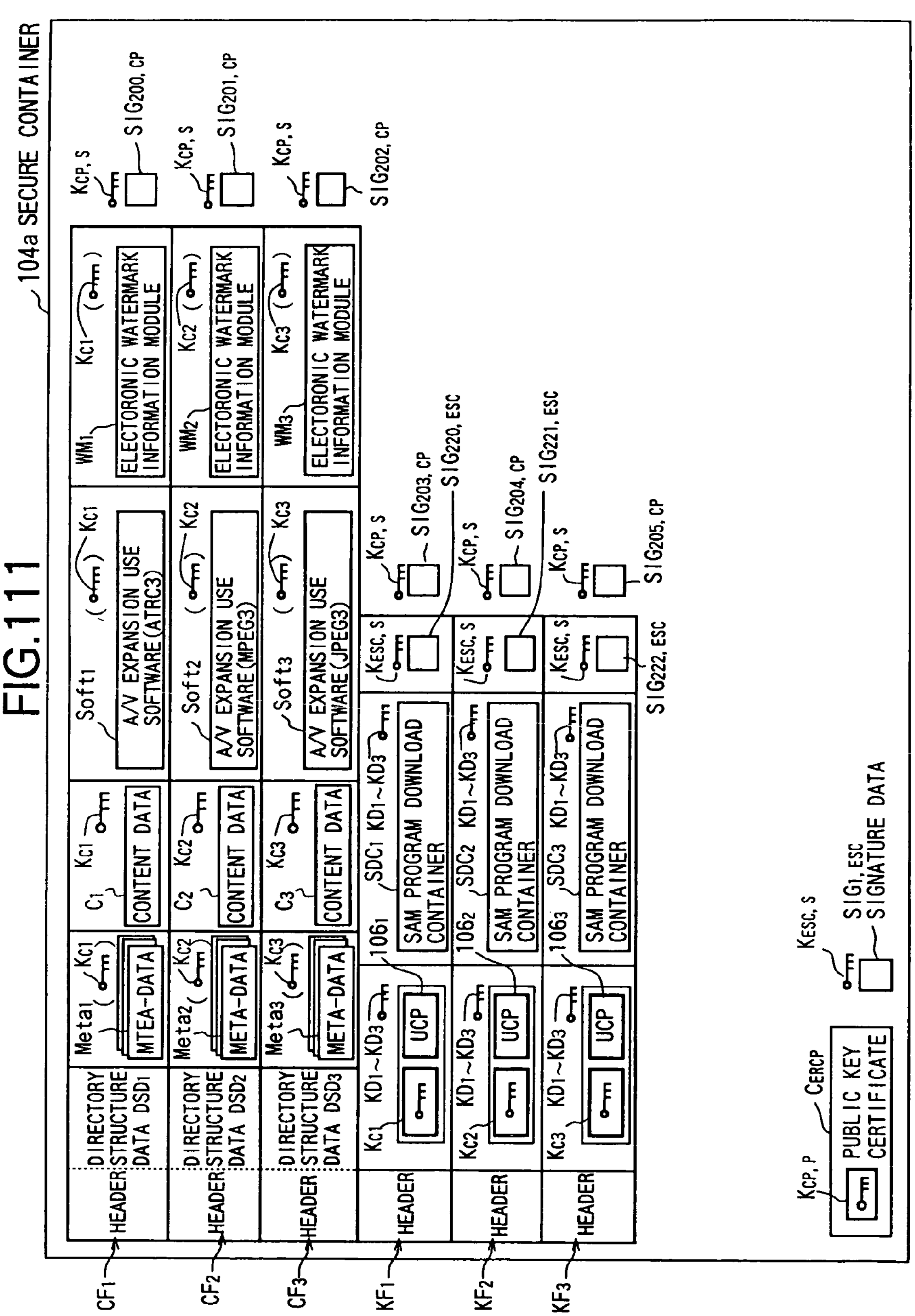
FIG. 111 is a view for explaining the format of the secure container provided from the content provider to the service provider shown in FIG. 47 in an eighth modification of the second embodiment of the present invention.

FIG. 111 is a view for explaining the format of the secure container 104*a* provided from the content provider 301 to the service provider 310 shown in FIG. 59 in the present modification.

As shown in FIG. 111, in the secure container 104*a*, content files $CF_1$, $CF_2$, and $CF_3$, key files $KF_1$, $KF_2$, and $KF_3$, certificate data $CER_{CP}$, and signature data $SIG_{200,CP}$, $SIG_{201,CP}$, $SIG_{202,CP}$, $SIG_{203,CP}$, $SIG_{204,CP}$, $SIG_{205,CP}$, and $SIG_{1,ESC}$ are stored.

Here, the signature data $SIG_{200,CP}$, $SIG_{201,CP}$, $SIG_{202,CP}$, $SIG_{203,CP}$, $SIG_{204,CP}$, and $SIG_{205,CP}$ are produced in the content provider 301 by taking the hash values of the content files $CF_1$, $CF_2$, and $CF_3$ and the key files $KF_1$, $KF_2$, and $KF_3$, and using the secret key data $K_{CP,S}$ of the content provider 301.

In the content file $CF_1$, a header, meta data $Meta_1$, content data $CF_1$, an A/V expansion use software $Soft_1$, and a watermark module $WM_1$ are stored.

Here, the content data $C_1$ and the A/V expansion use software $Soft_1$ have been encrypted by using the content key data $Kc_1$, and the meta data $Meta_1$ and the watermark module $WM_1$ have been encrypted by using the content key data $Kc_1$ according to need.

Also, the content data $C_1$ has been compressed by for example the ATRAC3 method. The A/V expansion use software $Soft_1$ is the software for the expansion of the ATRAC3 method.

Figure 112:
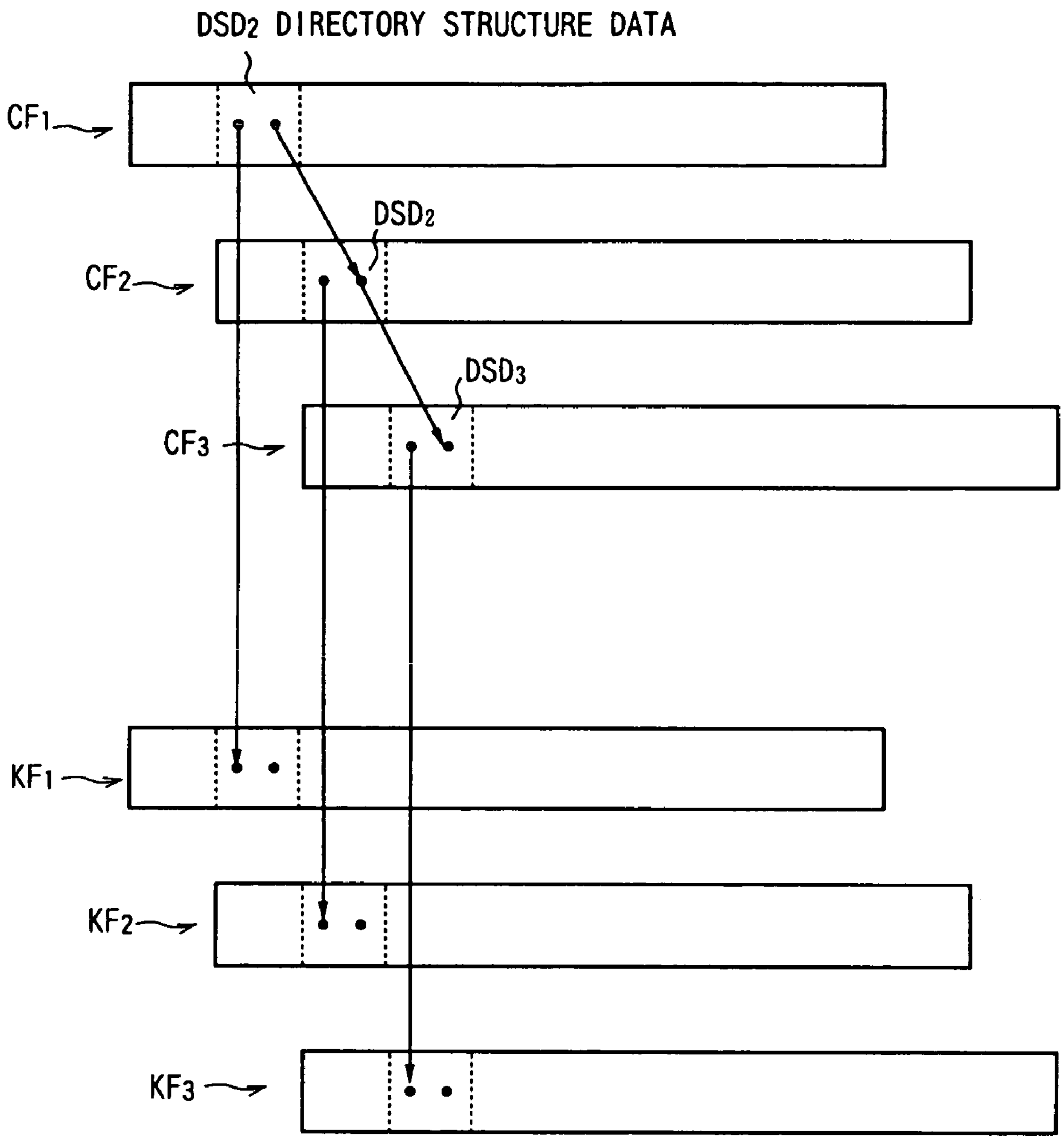
FIG. 112 is a view for explaining a link relationship by directory structure data between the content file and the key file shown in FIG. 111.

Also, in the header of the content file $CF_1$, for example, as shown in FIG. 112, directory structure data $DSD_1$ indicating the linkage to the key file $KF_1$ and the content file $CF_2$ is contained.

In the content file $CF_2$, the header, meta data $Meta_2$, content data $C_2$, an A/V expansion use software $Soft_2$, and a watermark module $WM_2$ are stored.

Here, the content data $C_2$ and the A/V expansion use software $Soft_2$ have been encrypted by using the content key data $Kc_2$, and the meta data $Meta_2$ and the watermark module $WM_2$ have been encrypted by using the content key data $Kc_2$ according to need.

Also, the content data $C_2$ has been compressed by for example the MPEG2 method. The A/V expansion use software $Soft_2$ is the software for the expansion of the MPEG2 method.

Also, in the header of the content file $CF_2$, for example, as shown in FIG. 112, directory structure data $DSD_2$ indicating the linkage to the key file $KF_2$ and the content file $CF_3$ is contained.

In the content file $CF_3$, the header, meta data $Meta_3$, content data $C_3$, an A/V expansion use software $Soft_3$, and a watermark module $WM_3$ are stored.

Here, the content data $C_3$ and the A/V expansion use software $Soft_3$ have been encrypted by using the content key data $Kc_3$, and the meta data $Meta_3$ and the watermark module $WM_3$ have been encrypted by using the content key data $Kc_3$ according to need.

Also, the content data $C_3$ has been compressed by for example the JPEG method. The A/V expansion use software $Soft_3$ is the software for the expansion of the JPE G method.

Also, in the header of the content file $CF_2$, for example, as shown in FIG. 112, directory structure data $DSD_3$ indicating the linkage to the key file $KF_3$ is contained.

In the key file $KF_1$, the header, content key data $Kc_1$ encrypted by using the distribution use key data $KD_1$ to $KD_3$, usage control policy data 106$_1$, the SAM program download container $SDC_1$, and signature data $SIG_{220,ESC}$ are stored.

In the key file $KF_2$, the header, content key data $Kc_2$ encrypted by using the distribution use key data $KD_1$ to $KD_3$, usage control policy data 106$_2$, the SAM program download container $SDC_2$, and signature data $SIG_{221,ESC}$ are stored.

In the key file $KF_3$, the header, content key data $Kc_3$ encrypted by using the distribution use key data $KD_1$ to $KD_3$, usage control policy data 106$_3$, the SAM program download container $SDC_3$, and signature data $SIG_{222,ESC}$ are stored.

When receiving the secure container 104*a* shown in FIG. 112, the service provider 310 confirms the legitimacy of the signature data $SIG_{200,CP}$, $SIG_{201,CP}$, $SIG_{202,CP}$, $SIG_{203,CP}$, $SIG_{204,CP}$, and $SIG_{205,CP}$, that is, the legitimacy of the producers and transmitters of the content files $CF_1$, $CF_2$, and $CF_3$, and the legitimacy of the transmitters of the key files $KF_1$, $KF_2$, and $KF_3$ by using the public key data $K_{CP,P}$ stored in the certificate data $CER_{CP}$ after confirming the legitimacy of the related certificate data $CER_{CP}$ by using the public key data $K_{ESC,P}$ of the EMD service center 302.

Also, the content provider 301 confirms the legitimacy of the signature data $SIG_{220,ESC}$, $SIG_{221,ESC}$, and $SIG_{222,ESC}$ and the legitimacy of the producers of the key files $KF_1$, $KF_2$, and $KF_3$ by using the public key data $K_{ESC,P}$.

Then, the service provider 310 produces price tag data 312$_1$, 312$_2$, and 312$_3$ indicating the sales prices of the content files $CF_1$, $CF_2$, and $CF_3$.

Also, the service provider 310 produces the signature data $SIG_{220,SP}$, $SIG_{221,SP}$, and $SIG_{222,SP}$ of the price tag data 312$_1$, 312$_2$, and 312$_3$ by using the secret key data $K_{SP,S}$.

Also, the service provider 310 produces the signature data $SIG_{210,SP}$, $SIG_{211,SP}$, $SIG_{212,SP}$, $SIG_{213,SP}$, $SIG_{214,SP}$, and $SIG_{215,SP}$ of the content files $CF_1$, $CF_2$, and $CF_3$ and $KF_1$, $KF_2$, and $KF_3$ by using the secret key data $K_{SP,S}$.

Figure 114:
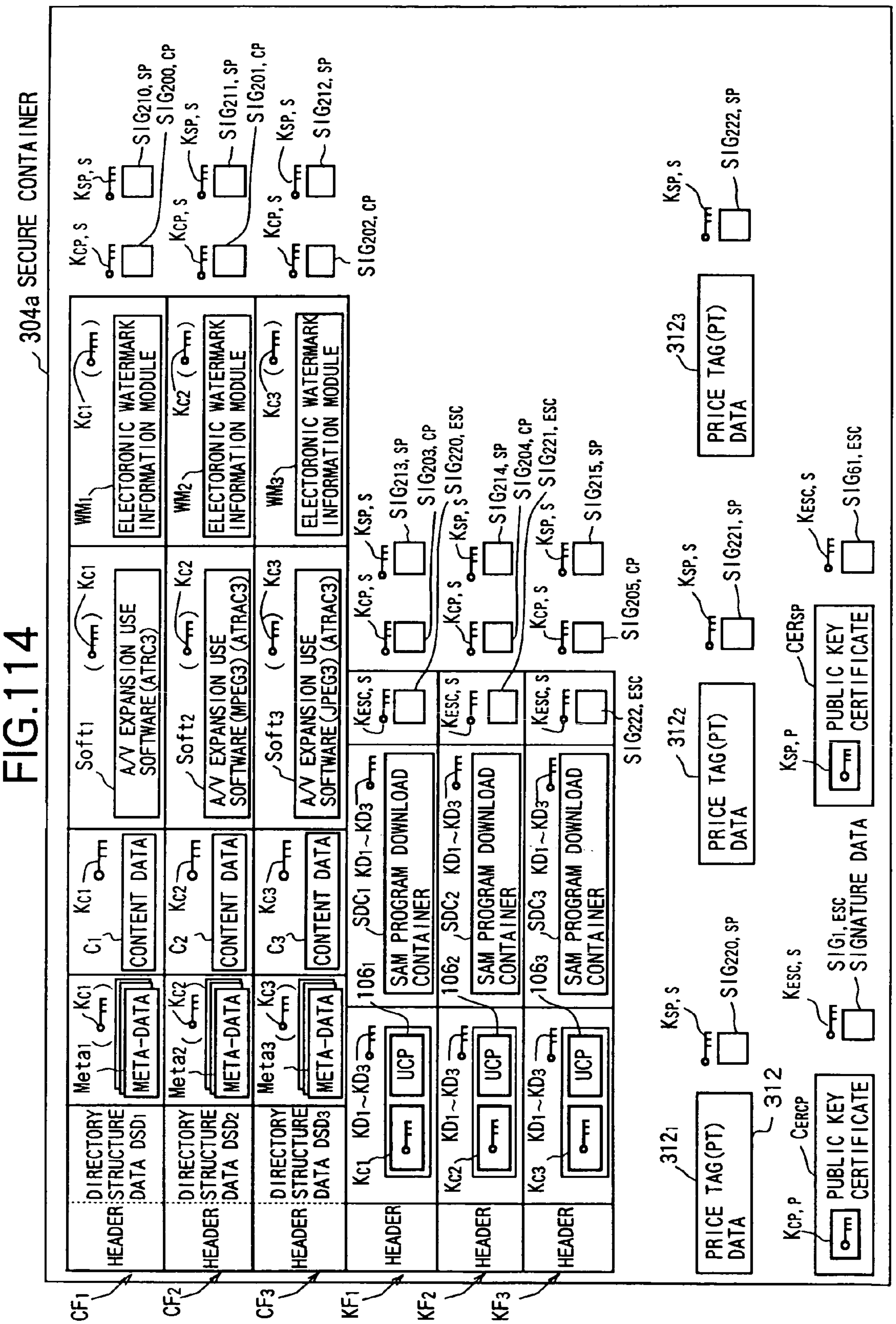
FIG. 114 is a view for explaining the format of the secure container provided from the service provider to the SAM shown in FIG. 47 in the eighth modification of the second embodiment of the present invention.

Next, the service provider 310 produces the secure container 304*a* shown in FIG. 114.

The service provider 310 distributes the secure container 304*a* shown in FIG. 114 to the user home network 303.

In the user home network 303, in the SAMs 305$_1$ to 305$_4$, after confirming the legitimacy of all signature data stored in the secure container 304*a*, the rights for the content data $C_1$, $C_2$ and $C_3$ are cleared in accordance with the link state shown in the directory structure data $DSD_1$ to $DSD_3$ based on the key files $KF_1$, $KF_2$, and $KF_3$.

Also, in the eighth modification mentioned above, in the secure container 304, the case where the plurality of content files $CF_{101}$, $CF_{102}$, and $CF_{103}$ provided from the single service provider 310 were stored in the single secure container 304*a* and distributed to the user home network 303 was exemplified, but as shown in FIG. 98, it is also possible to store a plurality of content files CF provided from a plurality of content providers 301*a* and 301*b* in a single secure container and distribute the same to the user home network 303.

Figure 113:
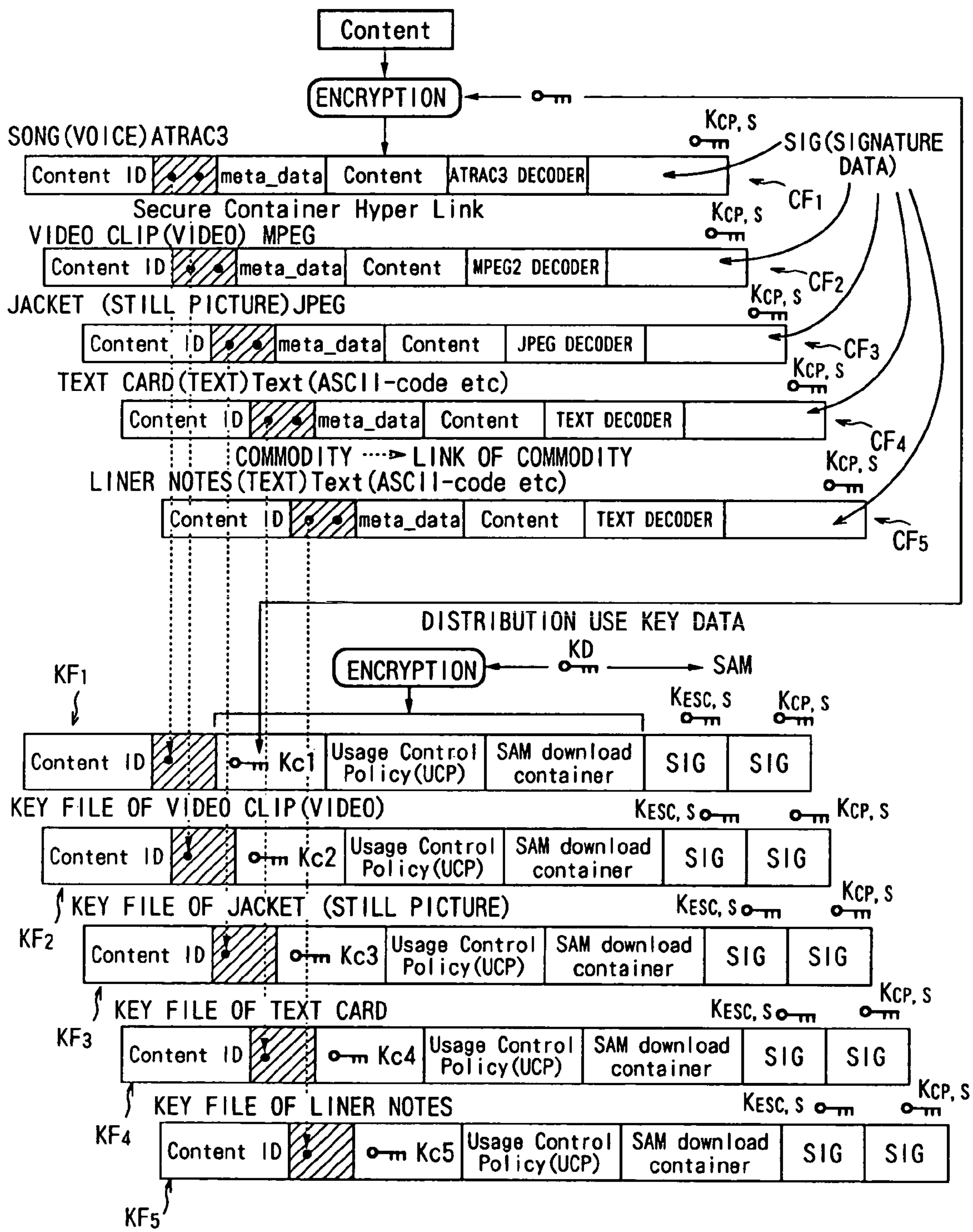
FIG. 113 is a view for explaining another example of the directory structure between the content file and the key file.

Also, in the secure containers 104 and 304, for example, as shown in FIG. 113, it is also possible if a content file $CF_1$ storing music (voice) data compressed by the ATRAC3, a content file $CF_2$ storing video clip data compressed by the MPEG2, a content file $CF_3$ storing the jacket (still image) data compressed by the JPEG, a content file $CF_4$ storing the lyrics data in a text format, and a content file $CF_5$ storing the liner note data in a text format and key files $KF_1$, $KF_2$, $KF_3$, $KF_4$ and $KF_5$ corresponding to them are stored.

Also in this case, similarly, by the directory structure data of the content files $CF_1$ to $CF_5$, the linkage among the content files $CF_1$ to $CF_5$ and the linkage between the content files $CF_1$ to $CF_5$ and the key files $KF_1$ to $KF_5$ are established.

Figure 115:
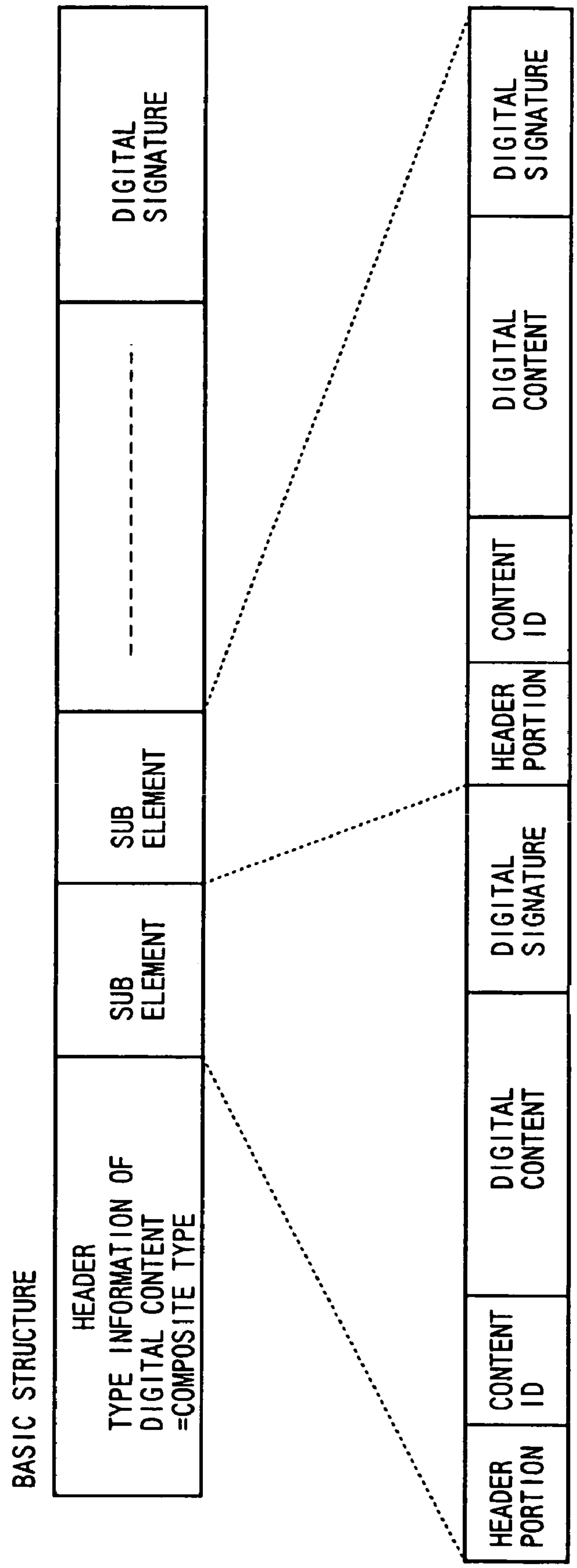
FIG. 115 is a view for explaining a first concept of the data format of a composite type secure container.
Figure 116:
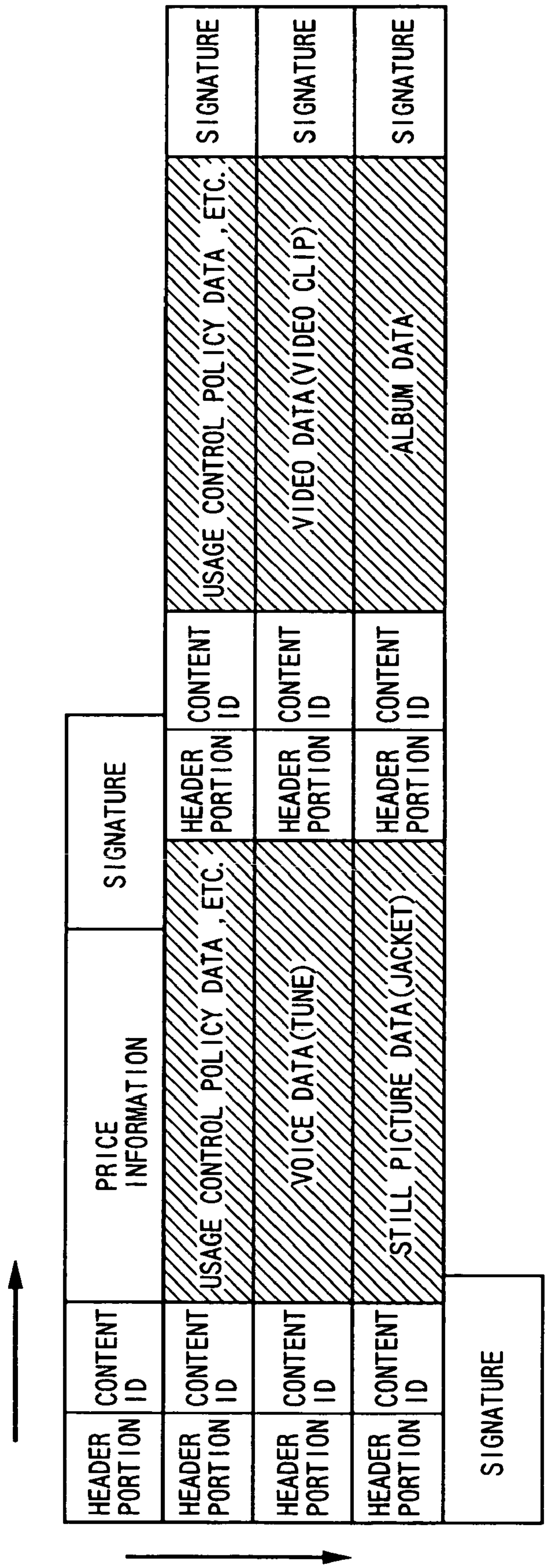
FIG. 116 is a view for explaining a second concept of the data format of the composite type secure container.

Note that, the concept of the data format in the case where a plurality of content data are stored in the secure container in the present embodiment (case of composite type) is shown in for example FIG. 115 or FIG. 116.

Note that, the format shown in FIG. 111 can be similarly applied to also the case where the secure container 104 is transmitted from the content provider 101 to the user home network 103 shown in FIG. 1.

Ninth Modification of Second Embodiment

In the above embodiment, the case where the content files CF and the key files KF were stored in the secure containers 104 and 304 with the directory structures and transmitted from the content provider 301 to the service provider 310 and from the service provider 310 to the SAMs 305$_1$ to 305$_4$ was exemplified, but it is also possible to separately transmit the content files CF and key files KF from the content provider 301 to the service provider 310 and from the service provider 310 to the SAMs 305$_1$ to 305$_4$.

This includes for example the following first technique and second technique.

Figure 117:
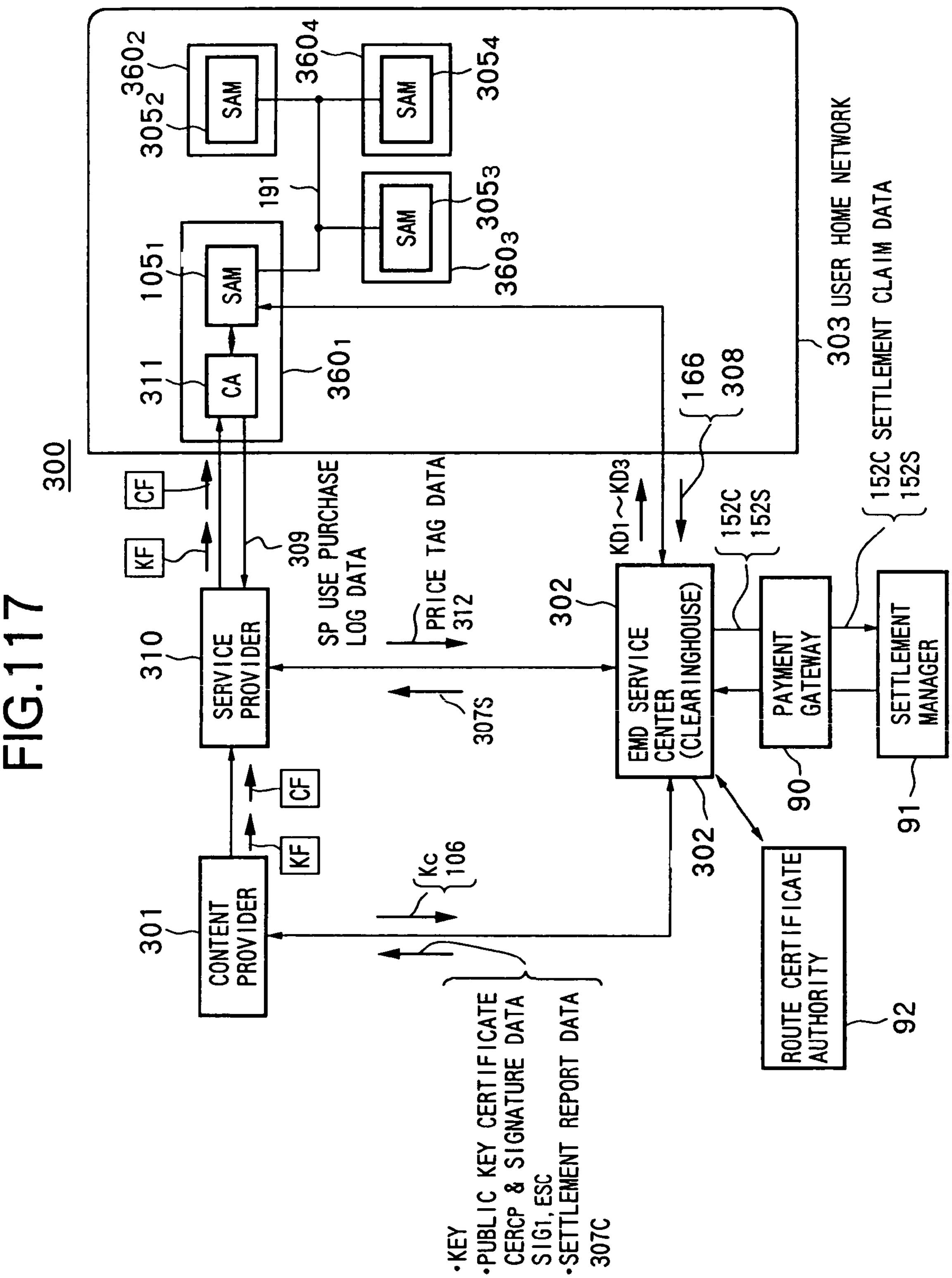
FIG. 117 is a view for explaining a case where a first procedure is employed in the EMD system according to the eighth modification of the second embodiment of the present invention.

In the first technique, as shown in FIG. 117, the content files CF and the key files KF are separately transmitted from the content provider 301 to the service provider 310 and from the service provider 310 to the SAMs 305$_1$ to 305$_4$.

Figure 118:
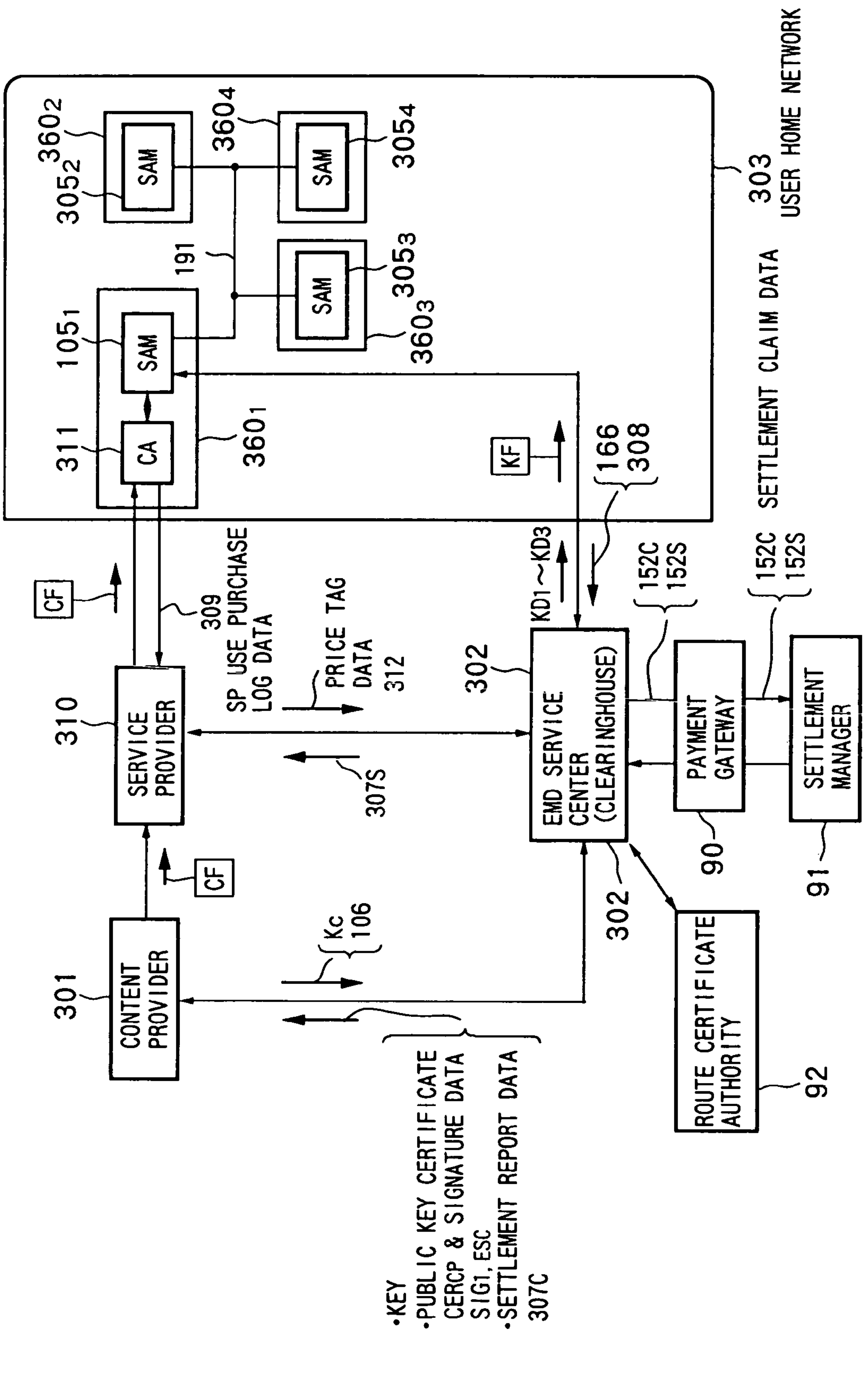
FIG. 118 is a view for explaining a case where a second procedure is employed in the EMD system according to the eighth modification of the second embodiment of the present invention.

Also, in the second technique, as shown in FIG. 118, the content files CF are transmitted from the content provider 301 to the service provider 310 and from the service provider 310 to the SAMs 305$_1$ to 305$_4$, and the key files KF are transmitted from the EMD service center 302 to the SAMs 305$_1$ to 305$_4$. The related key files KF are transmitted from the EMD service center 302 to the SAMs 305$_1$ to 305$_4$ when for example the users of the SAMs 305$_1$ to 305$_4$ are going to determine the purchase form of the content data C.

Where the first technique and the second technique are employed, for example, a link is established between related content files CF and between the content files CF and the key files KF corresponding to them by using the hyper link data HL stored in the headers of at least one of the content files CF and the key files KF. In the SAMs 105$_1$ to 105$_4$, the rights are cleared and the content data C is used based on the related link.

Also, in the above second embodiment, the case where the content data C and the key data such as the content key data Kc and the usage control policy data 106 were transmitted from the content provider 301 to the service provider 310 and from the service provider 310 to the SAMs 305$_1$ to 305$_4$ in the file format was exemplified, but it is not always necessary to comprise them in the file format so far as the link among them can be established.

Figure 119:
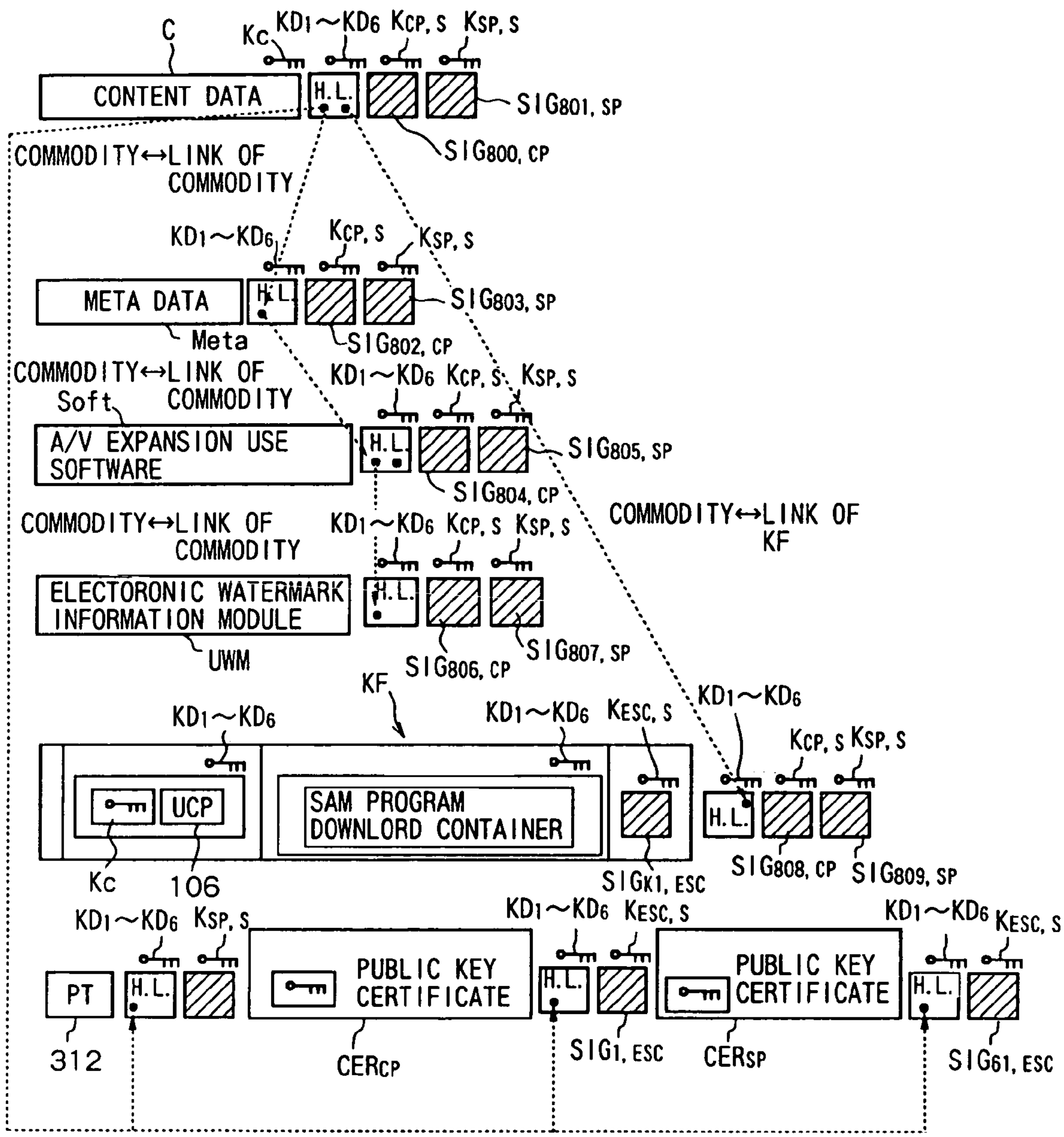
FIG. 119 is a view for explaining a data format in a case where the file format is not employed in the EMD system according to the eighth modification of the second embodiment of the present invention.

For example, as shown in FIG. 119, it is also possible to separately transmit the content data C, meta data Meta, A/V expansion use software Soft, watermark module WM, key file KF, price tag data 312, and the certificate data $CER_{CP}$ and $CER_{SP}$ from the content provider 301 and the EMD service center 302 to the SAMs 305$_1$ to 305$_4$.

In this case, as shown in FIG. 119, the content data C, meta data Meta, A/V expansion use software Soft, watermark module WM, key file KF, price tag data 312, and certificate data $CER_{CP}$ and $CER_{SP}$ are linked by the hyper link data HL.

Here, the hyper link data HL is encrypted by for example the distribution use key data $KD_1$ to $KD_6$ and transmitted.

Note that, in the present modification, as the formats of the content files CF and the key files KF, for example those shown in FIGS. 5A and 5B are employed. Also, in this case, preferably the signature data $SIG_{6,CP}$ and $SIG_{7,CP}$ of them are transmitted together with the content files CF and the key files KF.

10th Modification of Second Embodiment

Figure 120:
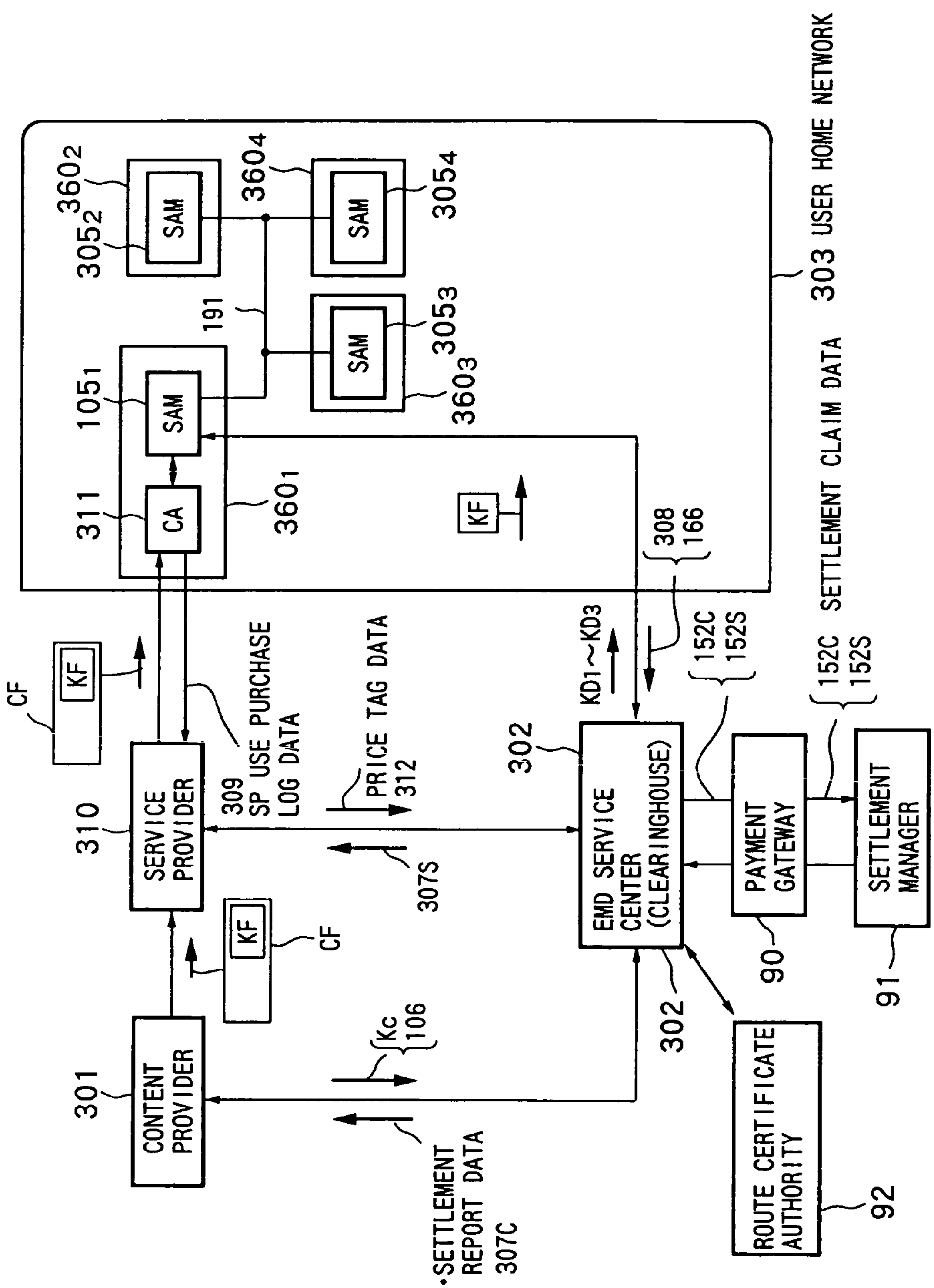
FIG. 120 is a view of the configuration of the EMD system according to a 10th modification of the second embodiment of the present invention.

In the above embodiment, the case where the content files CF and the key files KF were separately provided in the secure container 104 was exemplified, but for example, as shown in FIG. 120, it is also possible to store the key files KF in the content files CF in the secure containers 104 and 304.

In this case, with respect to the content files CF storing the key files KF, the signature data by the secret key data $K_{CP,S}$ of the content provider 301 and the signature by the secret key data $K_{SP,S}$ of the service provider 310 are attached.

11th Modification of Second Embodiment

In the above embodiment, the case where the content data C was stored in the content files CF, the content key data Kc and the usage control policy data 106 were stored in the key files KF, and they were transmitted from the content provider 301 to the service provider 310 and from the service provider 310 to the SAM 305$_1$ etc. was exemplified, but it is also possible to transmit at least one among the content data C, content key data Kc, and usage control policy data 106 from the content provider 301 to the service provider 310 and from the service provider 310 to the SAMs 305$_1$ etc. in a format not depending upon the communication protocol without employing the file format.

Figure 121:
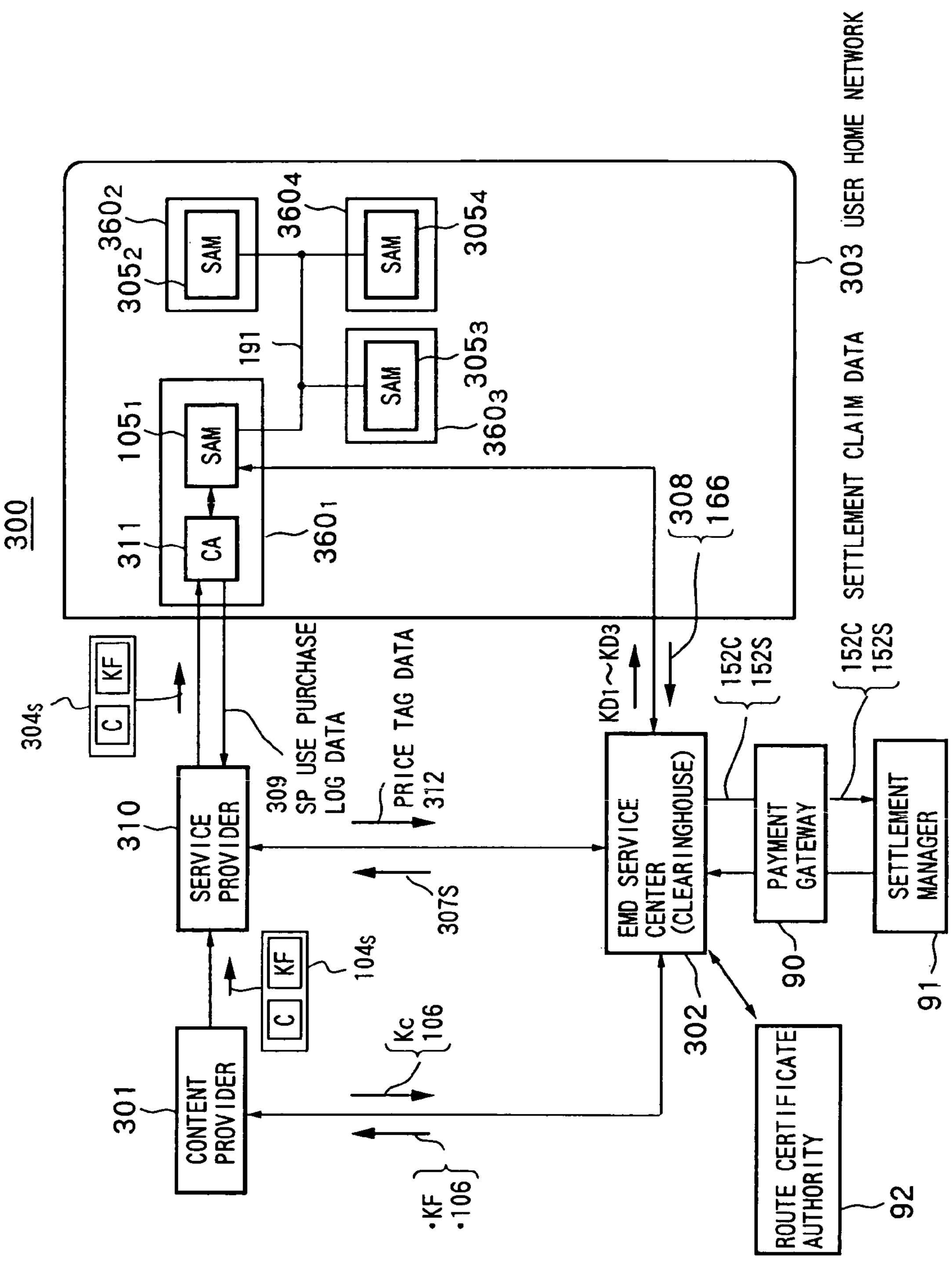
FIG. 121 is a view of the configuration of the EMD system according to a first pattern of an 11th modification of the second embodiment of the present invention.

For example, as shown in FIG. 121, in the content provider 301, the secure container 104*s* storing the content data C encrypted by the content key data Kc and the key file KF containing the encrypted content key data Kc and the encrypted usage control policy data 106 etc. is produced, and the secure container 104*s* is transmitted to the service provider 310 in a format not depending upon the communication protocol. Then, in the service provider 310, it is also possible if the price tag data 312 is added to the content data C and the key file KF stored in the secure container 104*s* to produce the secure container 304*s*, and the secure container 304*s* is transmitted to the SAM 305$_1$ etc. in a format not depending upon the communication protocol.

Figure 122:
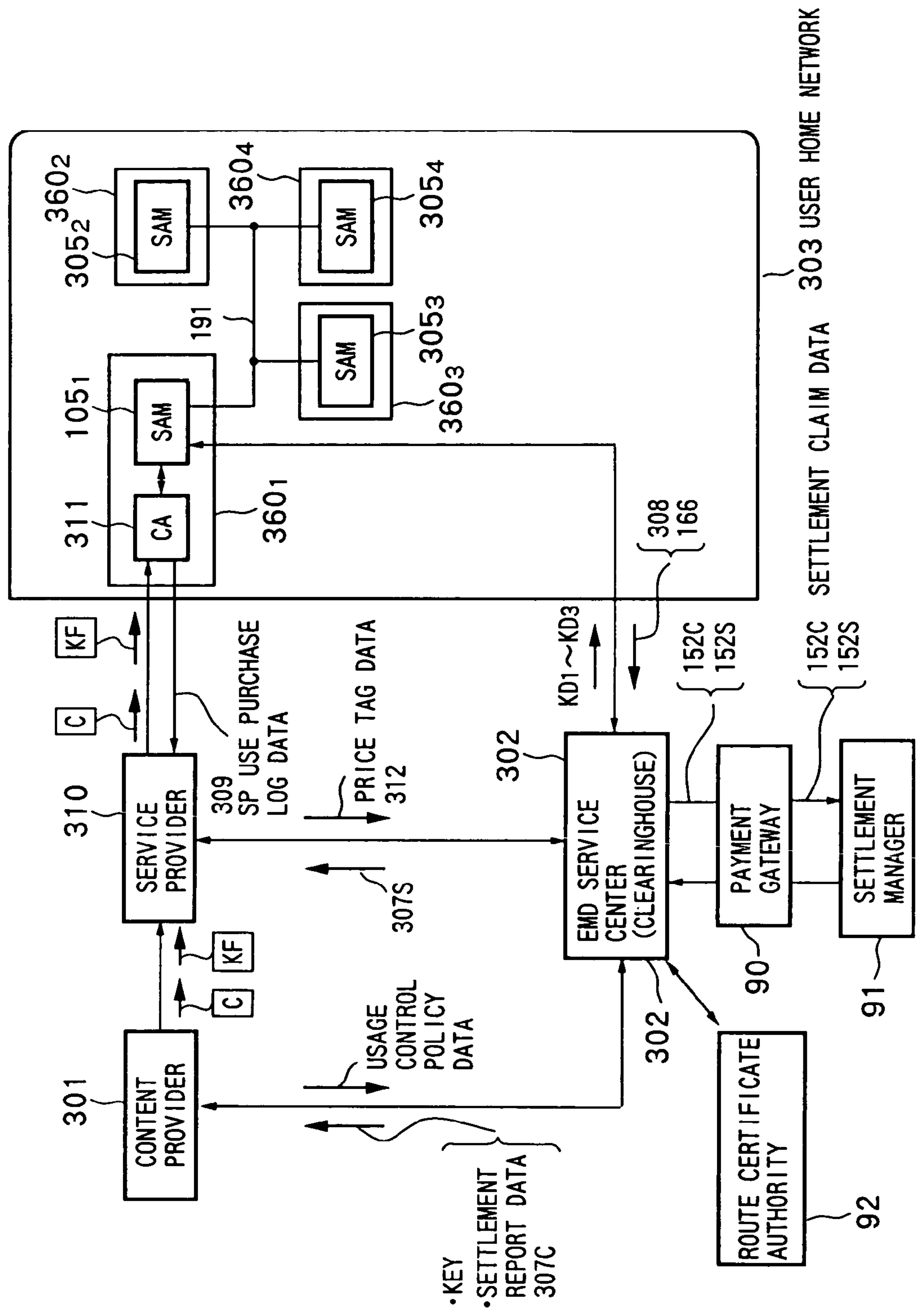
FIG. 122 is a view of the configuration of the EMD system according to a second pattern of the 11th modification of the second embodiment of the present invention.

Also, as shown in FIG. 122, the content data C encrypted by the content key data Kc and the key file KF containing the encrypted content key data Kc and the encrypted usage control policy data 106 etc. are separately transmitted from the content provider 301 to the service provider 310 in a format not depending upon the communication protocol. Then, from the service provider 310 to the SAM 305$_1$ etc., the content data C, key file KF, and the price tag data 312 are separately transmitted in a format not depending upon the communication protocol. Namely, the content data C is not comprised in the file format and is transmitted by the identical route to that for the key file KF.

Figure 123:
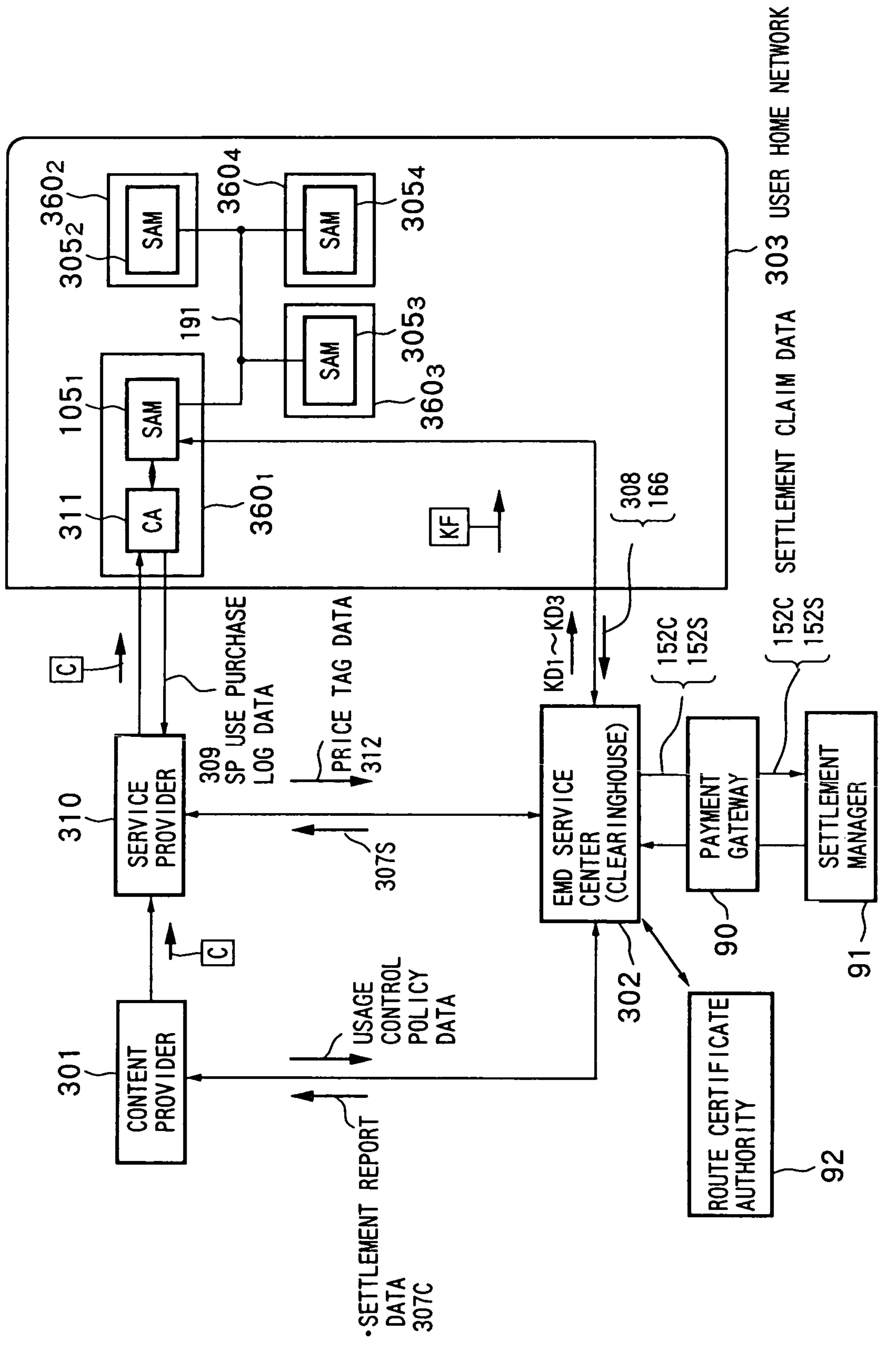
FIG. 123 is a view of the configuration of the EMD system according to a third pattern of the 11th modification of the second embodiment of the present invention.

Also, as shown in FIG. 123, the content data C encrypted by the content key data Kc is transmitted from the content provider 301 to the service provider 310 in a format not depending upon the communication protocol, while the content data C and the price tag data 312 are transmitted from the service provider 310 to the SAM 305$_1$ etc. in a format not depending upon the communication protocol. Also, it is also possible if the key file KF containing the encrypted content key data Kc and the encrypted usage control policy data 106 etc. is transmitted from the EMD service center 302 to the SAM 305$_1$ etc. Namely, the content data C is not comprised in the file format and is transmitted by a different route from that for the key file KF.

Figure 124:
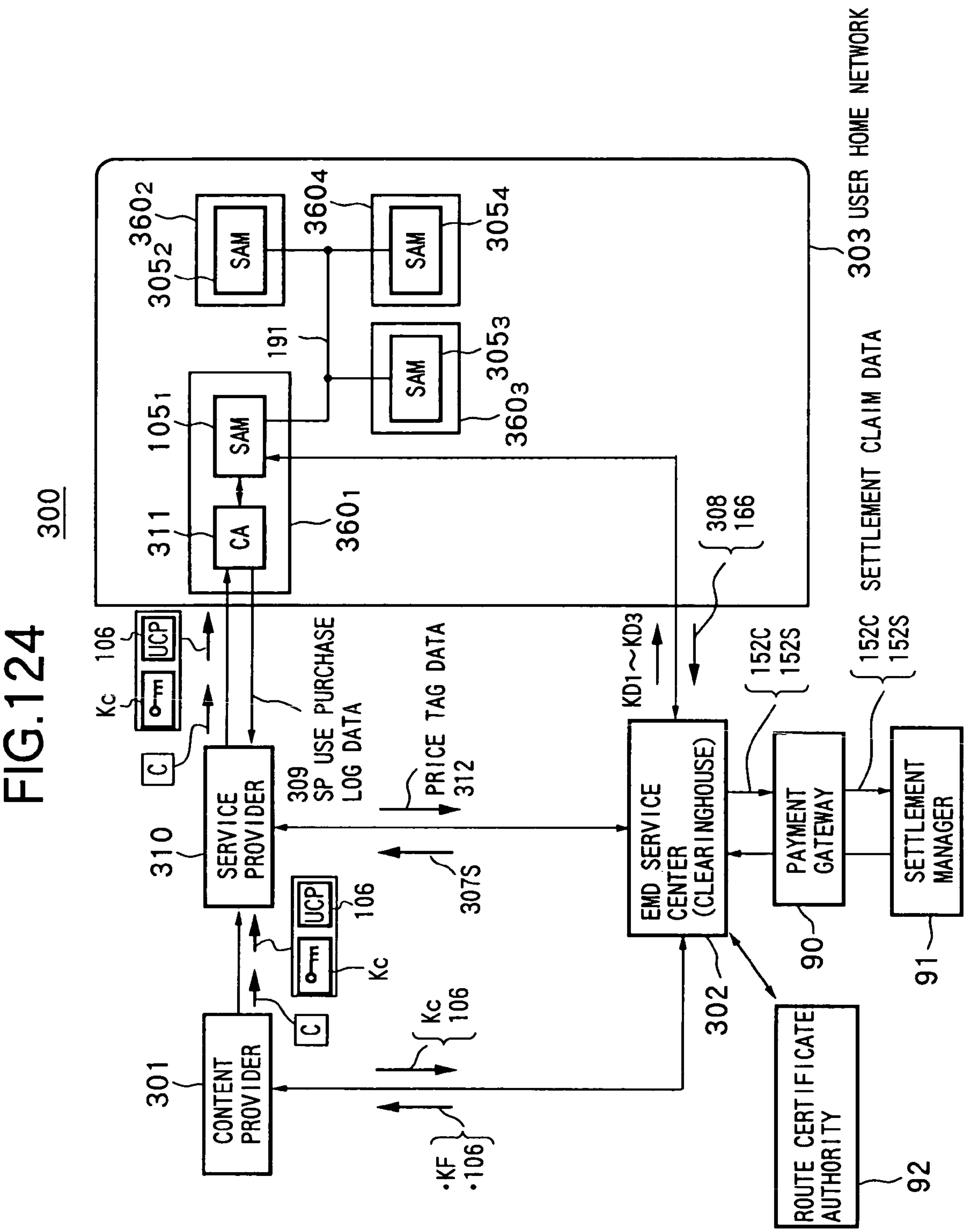
FIG. 124 is a view of the configuration of the EMD system according to a fourth pattern of the 11th modification of the second embodiment of the present invention.

Also, as shown in FIG. 124, the content data C encrypted by the content key data Kc, the content key data Kc, and the usage control policy data 106 are transmitted from the content provider 301 to the service provider 310 in a format not depending upon the communication protocol. Also, the content data C, content key data Kc, usage control policy data 106, and the price tag data 312 are transmitted from the service provider 310 to the SAM 305$_1$ etc. Namely, the content data C, content key data Kc, usage control policy data 106, and the price tag data 312 are transmitted not in the file format and by the same route.

Figure 125:
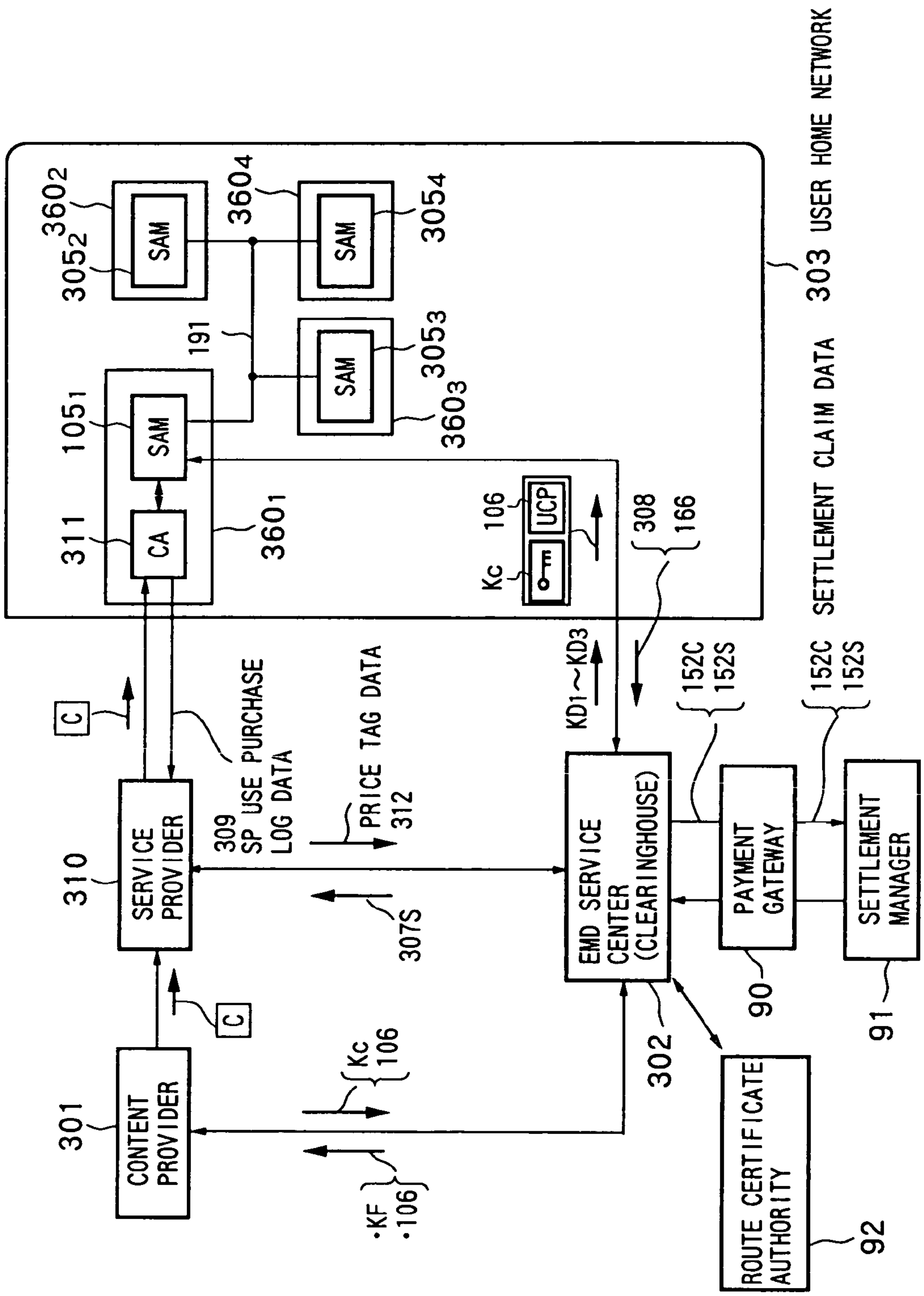
FIG. 125 is a view of the configuration of the EMD system according to a fifth pattern of the 11th modification of the second embodiment of the present invention.

Also, as shown in FIG. 125, the content data C encrypted by the content key data Kc is transmitted from the content provider 301 to the service provider 310 in a format not depending upon the communication protocol. Then, the content data C and the price tag data 312 are transmitted from the service provider 310 to the SAM 305$_1$ etc. in a format not depending upon the communication protocol. Also, the content key data Kc and the usage control policy data 106 are transmitted from the EMD service center 302 to the SAM 305$_1$ etc. Namely, the content data C, content key data Kc, and the usage control policy data 106 are transmitted not in the file format and by different routes.

12th Modification of Second Embodiment

In the EMD system 300 shown in FIG. 59 mentioned above, for example, as shown in FIG. 126, the user home network 303 can distribute a secure container 304A in accordance with the secure container 304 received from the service provider 310 to the user home network 303*a* in response to a request S303*a* from a SAM of the user home network 303*a* too.

In this case, it can be considered that the SAM of the user home network 303 functions in the same way as the service provider 310 explained in the second embodiment.

In this case, the SAM of the user home network 303*a* can uniquely newly set the price tag data 312.

Then, the purchase form of the content data C is determined in the SAM of the user home network 303*a*, and the usage log data 304*a* etc. in accordance with that are transmitted from the SAM of the user home network 303*a* to the EMD service center 302.

In the EMD service center 302, based on the usage log data 304*a*, the settlement processing for distributing the money paid by the user of the user home network 303*a* to the user of the content provider 301, service provider 310, and user home network 303 is carried out.

Figure 127:
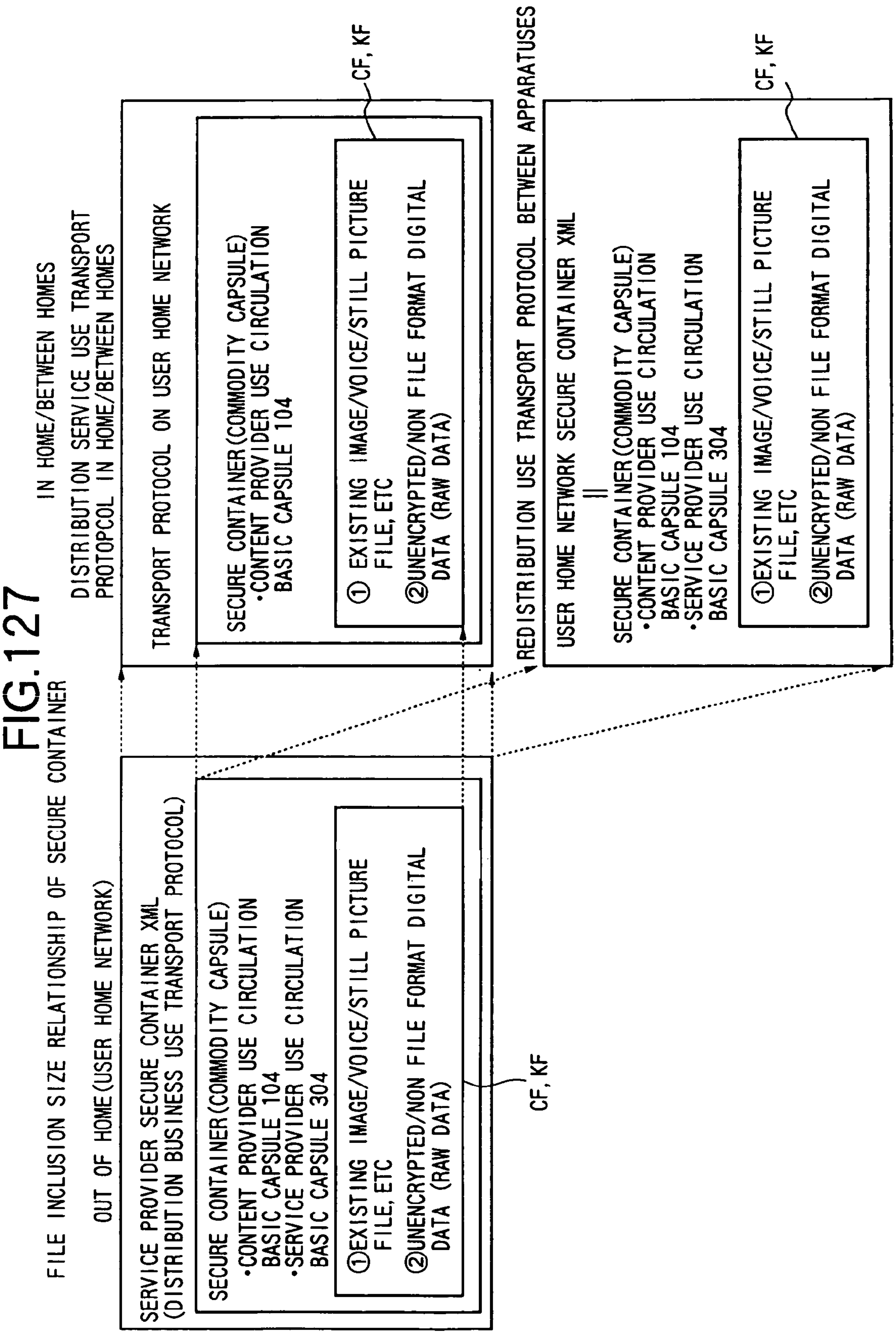
FIG. 127 is a view for explaining a file inclusion size relationship of the secure container in the second embodiment of the present invention.

Note that, the file inclusion size relationships of the secure containers in the present embodiment can be expressed as shown in FIG. 127.

Third Embodiment

Figure 128:
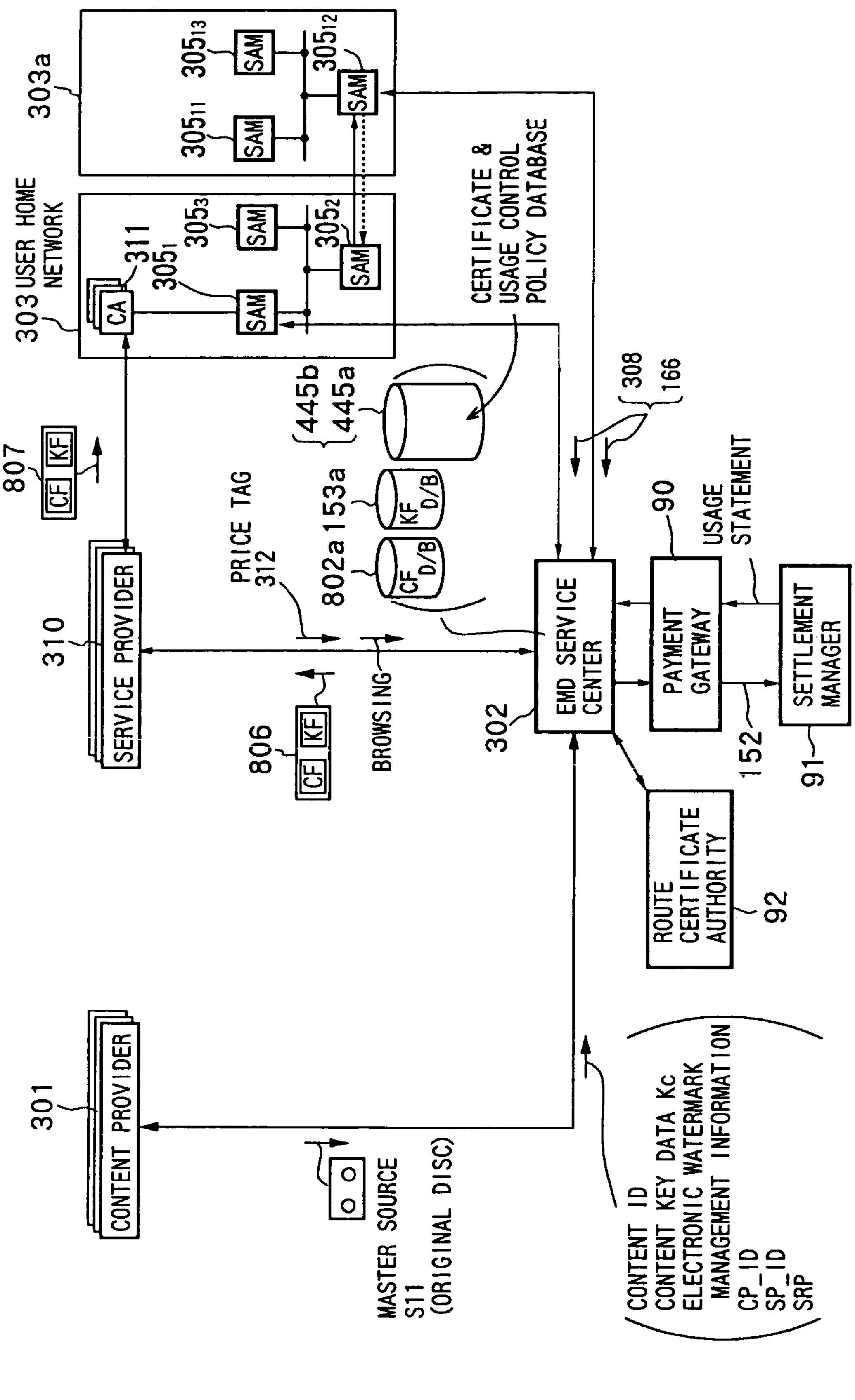
FIG. 128 is a view for explaining the EMD system of a third embodiment of the present invention.
Figure 129:
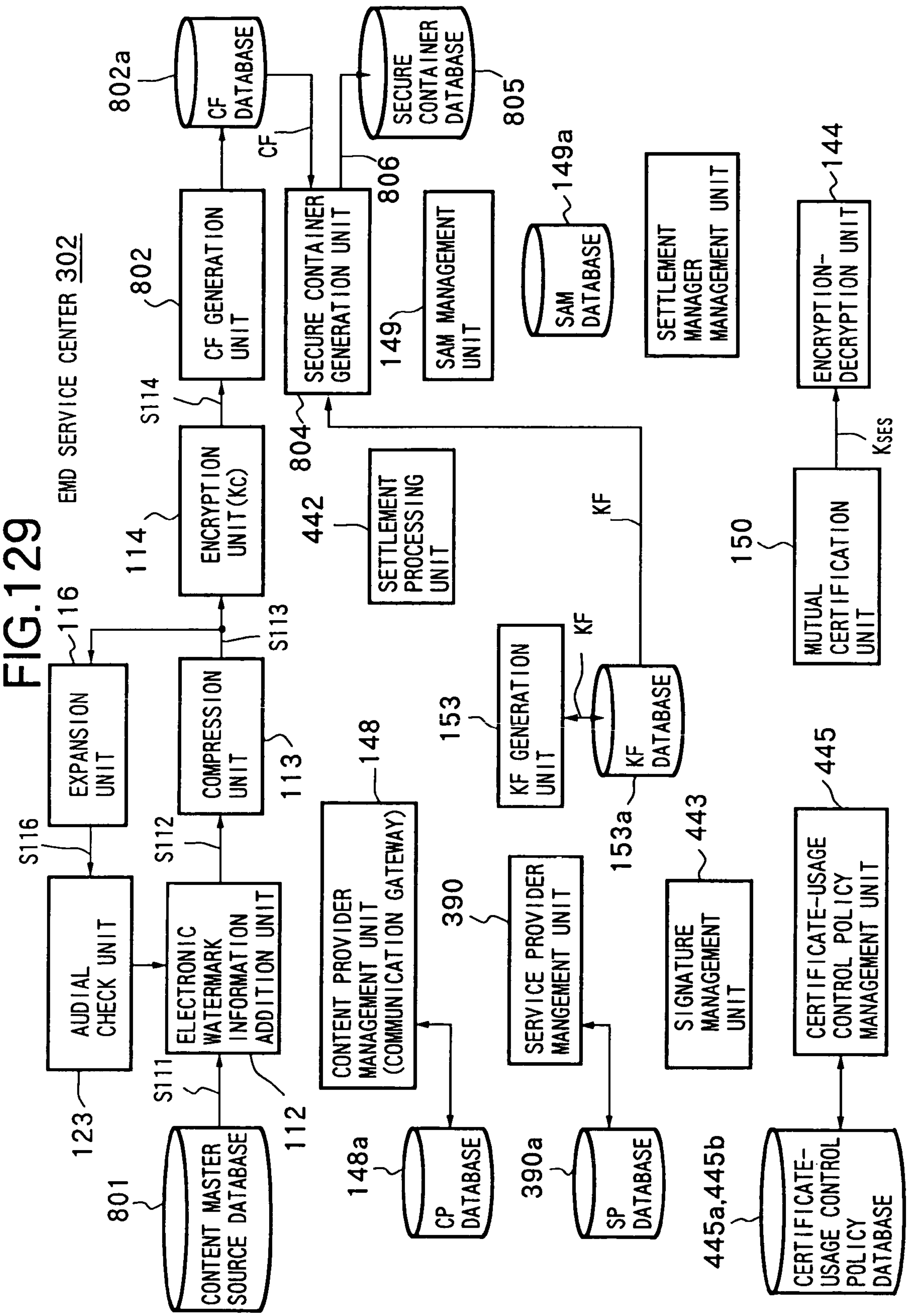
FIG. 129 is a functional block diagram of the EMD service center shown in FIG. 128.

FIG. 128 is a view for explaining the EMD system of a third embodiment of the present invention, while FIG. 129 is a functional block diagram of the EMD service center shown in FIG. 128.

In FIG. 129, components given the same reference numerals as those used in the above first embodiment and second embodiment are the same as the components having the same reference numerals explained in these embodiments.

In the EMD system of the present embodiment, the content provider 301 sends the master source (content data) S111 etc.

to the EMD service center 302, and for example the content file CF shown in FIG. 5A is produced in the EMD service center 302.

Also, the content provider 301 sends the content ID, content key data Kc, and the electronic watermark management information (contents of the electronic watermark information buried in the content data) of the content data S111, the identifier CP_ID of the content provider 301, the identifier SP_ID of the service provider 310, and the suggested retailer's price SRP of the content data to the EMD service center 302, and the key file KF shown in FIG. 5B is produced in the EMD service center 302.

Also, the EMD service center 302 stores the produced content file CF in the CF database 802*a*, attaches global unique content IDs to the individual content files CF, and centrally manages them. Also, the EMD service center 302 stores the key file KF in the KF database 153*a* and centrally manages also this by using the content ID.

An explanation will be made of the processing in the EMD service center 302 by referring to FIG. 129.

The EMD service center 302 stores the master source S111 received from the content provider 301 in the content master source database 801.

Next, in the electronic watermark information addition unit 112, the electronic watermark information indicated by the electronic watermark management information received from the content provider 301 is buried in the master source S111 read out from the content master source database 810 to produce the content data S112.

Next, in the compression unit 113, the content data S112 is compressed to produce the content data S113.

The content data S112 is expanded at the expansion unit 116 and then checked audially in the audial check unit 123. If necessary, the electronic watermark information is buried again by the electronic watermark information addition unit 112.

Next, in the encryption unit 114, the content data S113 is encrypted by using the content key data Kc to produce the content data S114.

Next, in the CF preparation unit 802, the content file CF shown in FIG. 5A storing the content data S114 etc. is produced, and the content file CF is stored in a CF database 802*a*.

Also, in the EMD service center 302, in the KF preparation unit 153, the key file KF shown in FIG. 5B is produced, and the key file KF is stored in a KF database 153*a*.

Next, in the secure container preparation unit 804, a secure container 806 storing the content file CF read out from the CF database 802*a* and the key file KF read out from the KF database 153*a* is produced, and the secure container 806 is stored in the secure container database 805.

Thereafter, the secure container database 805 is accessed by the service provider 310, and the secure container 806 is supplied to the service provider 310.

Next, the service provider 310 produces a secure container 807 storing the content file CF and key file KF stored in the secure container 806 and the price tag data 312 indicating the sales price of the content data.

Then, the service provider 310 distributes the secure container 807 to the user home network 303 by using the predetermined communication protocol and in a format not depending upon the related communication protocol or by storing the same in a storage medium.

In the user home network 303, in the case of on-line, the secure container 807 is provided to the SAM $\mathbf{305}_1$ etc. via the CA module 311, in the SAM $\mathbf{305}_1$ etc., the content key data Kc, usage control policy data 106, etc. stored in the key file KF are decrypted by using the distribution use key data $KD_1$ to $KD_3$ or the like, and the handling such as the purchase form of the content data stored in the content file CF is determined based on the decrypted usage control policy data 106.

Also, in the SAM $\mathbf{305}_1$ etc., the usage log data 308 indicating the purchase log etc. of the content data is produced, and the usage log data 308 is transmitted to the EMD service center 302.

Also, where the secure container 807 is distributed from the SAM $\mathbf{305}_2$ of the user home network 303 to the SAM $\mathbf{305}_{12}$ of the user home network 303*a*, processing similar to that in the SAM $\mathbf{305}_2$ is carried out in the SAM $\mathbf{305}_{12}$, and the usage log data 308 is transmitted from the SAM $\mathbf{305}_{12}$ to the EMD service center 302.

Note that, the processings with respect to the secure container 807 in the user home networks 303 and 303*a* are the same as the processings in the user home networks 103 and 303 in the first embodiment and second embodiment mentioned above.

Also, in the example shown in FIG. 128, the case where the secure container storing the content file CF and the key file KF was transmitted from the EMD service center 302 to the service provider 310 and from the service provider 310 to the user home network 303 (the case of in-band) was exemplified, but it is also possible to separately transmit the content file CF and the key file KF by the same route (the case of out-of-band).

Figure 130:
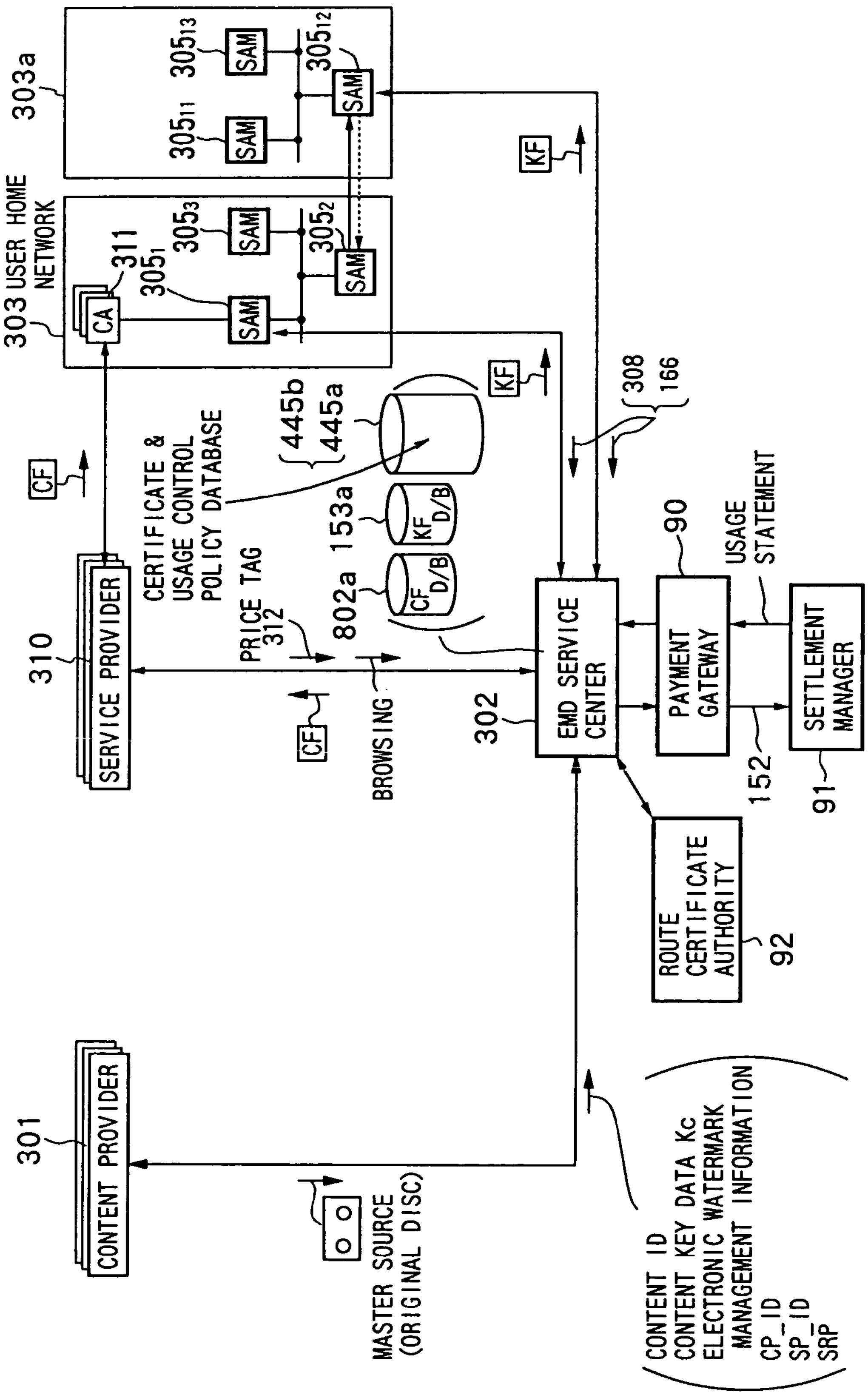
FIG. 130 is a view for explaining a modification of the EMD system of the third embodiment of the present invention.

Also, as shown in FIG. 130, it is also possible if the content file CF produced in the EMD service center 302 is supplied to the service provider 310, the service provider 310 supplies the content file CF to the user home network 303 and, at the same time, the key file KF produced in the EMD service center 302 is supplied from the EMD service center 302 to the SAM $\mathbf{305}_2$ and SAM $\mathbf{305}_{12}$ of the user home networks 303 and 303*a*.

Fourth Embodiment

Figure 131:
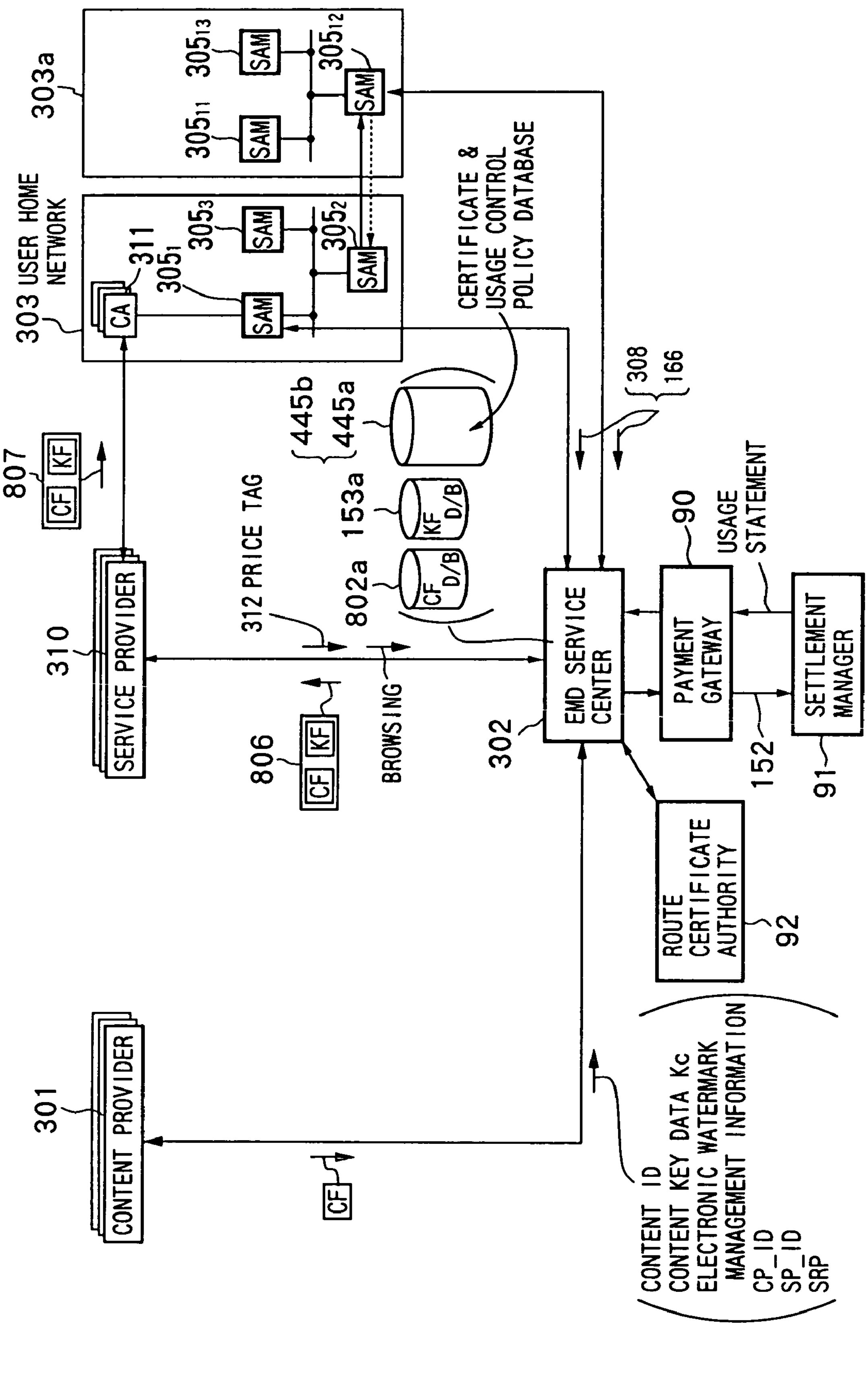
FIG. 131 is a view for explaining the EMD system of a fourth embodiment of the present invention.

FIG. 131 is a view for explaining the EMD system of a fourth embodiment of the present invention.

In the EMD system of the present embodiment, the content provider 301 produces for example the content file CF shown in FIG. 5A and sends this to the EMD service center 302.

Also, the content provider 301 sends the content ID of the content data, content key data Kc, electronic watermark management information (contents of the electronic watermark information to be buried in the content data and the burial position information), identifier CP_ID of the content provider 301, identifier SP_ID of the service provider 310 providing the content data, and the suggested retailer's price SRP of the content data to the EMD service center 302, and the key file KF shown in FIG. 5B is produced in the EMD service center 302.

Also, the EMD service center 302 stores the content file CF in the database 802*a*, attaches the global unique content IDs to individual content files CF, and centrally manages them. Also, the EMD service center 302 stores the produced key file KF in the KF database 153*a* and centrally manages it by using the content ID.

Also, in the EMD service center 302, the secure container 806 storing the content file CF read out from the CF database 802*a* and the key file KF read out from the KF database 153*a* is produced, and the secure container 806 is stored in the secure container database.

Thereafter, the secure container database is accessed by the service provider 310 and the secure container 806 is supplied to the service provider 310.

Next, the service provider 310 produces a secure container 807 storing the content file CF and key file KF stored in the secure container 806 and the price tag data 312 indicating the sales price of the content data.

Then, the service provider 310 distributes the secure container 807 to the user home network 303 by using a predetermined communication protocol in a format not depending upon the related communication protocol or by storing the same in a storage medium.

In the user home network 303, in the case of on-line, the secure container 807 is provided to the SAM $305_1$ etc. via the CA module 311, in the SAM $305_1$ etc., the content key data Kc and usage control policy data 106 etc. stored in the key file KF are decrypted by using the distribution use key data $KD_1$ to $KD_3$, and the handling such as the purchase form of the content data stored in the content file CF is determined based on the decrypted usage control policy data 106.

Also, in the SAM $305_1$ etc., the usage log data 308 indicating the purchase log etc. of the content data is produced, and the usage log data 308 is transmitted to the EMD service center 302.

Also, where the secure container 807 is distributed from the SAM $305_2$ of the user home network 303 to the SAM $305_{12}$ of the user home network 303*a*, processing similar to that of the SAM $305_2$ is carried out in the SAM $305_{12}$, and the usage log data 308 is transmitted from the SAM $305_{12}$ to the EMD service center 302.

Note that, the processings with respect to the secure container 807 in the user home networks 303 and 303*a* are the same as the processings in the user home networks 103 and 303 in the first embodiment and second embodiment mentioned above.

Also, in the example shown in FIG. 131, the case where the secure container storing the content file CF and the key file KF was transmitted from the EMD service center 302 to the service provider 310 and from the service provider 310 to the user home network 303 (the case of in-band) was exemplified, but it is also possible to separately transmit the content file CF and the key file KF by the same route (the case of out-of-band).

Figure 132:
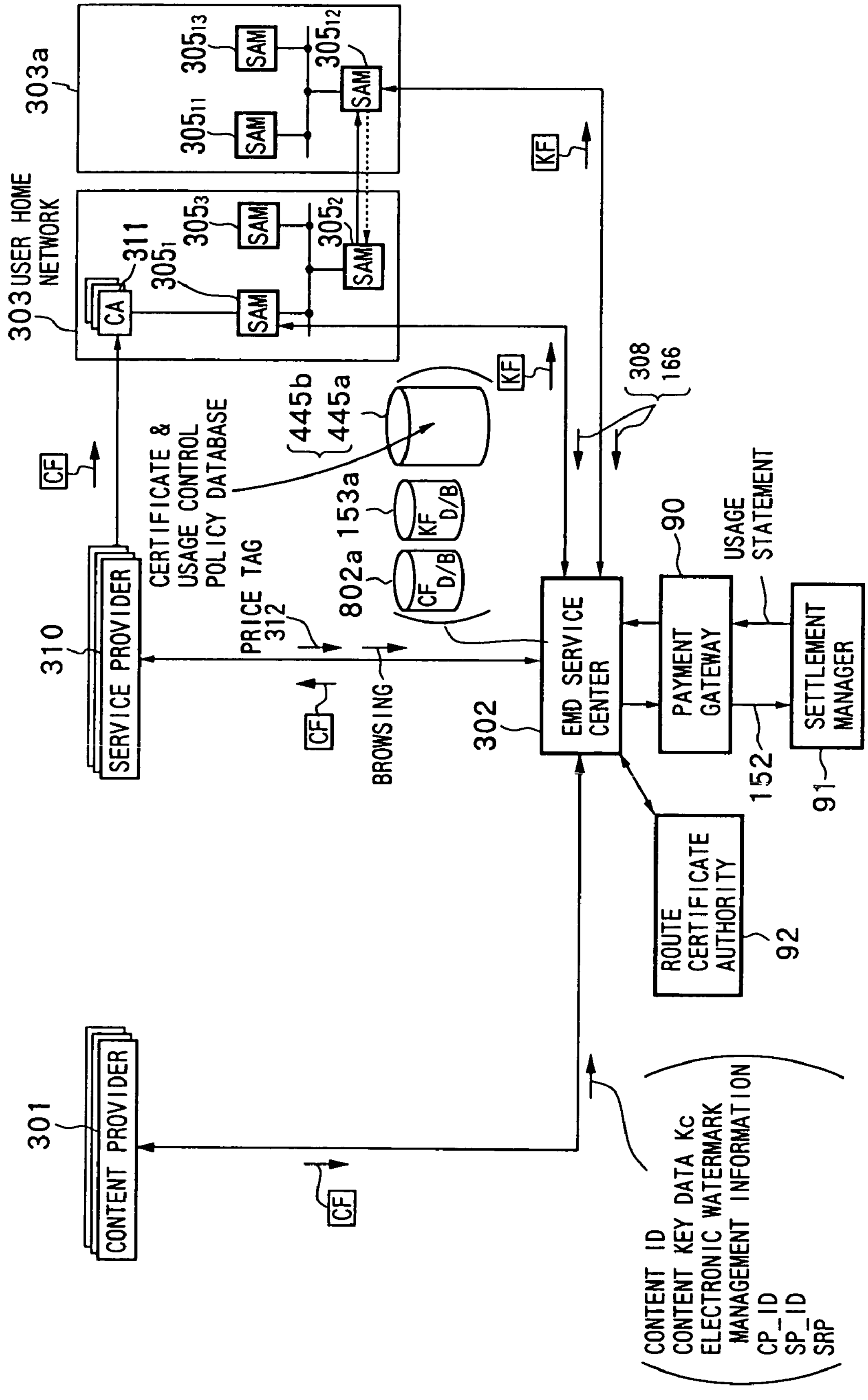
FIG. 132 is a view for explaining a modification of the EMD system of the fourth embodiment of the present invention.

Also, as shown in FIG. 132, it is also possible if the content file CF is supplied from the EMD service center 302 to the service provider 310, the service provider 310 supplies the content file CF to the user home network 303 and, at the same time, the key file KF produced in the EMD service center 302 is supplied from the EMD service center 302 to the SAM $305_2$ and SAM $305_{12}$ of the user home networks 303 and 303*a*.

Fifth Embodiment

Figure 133:
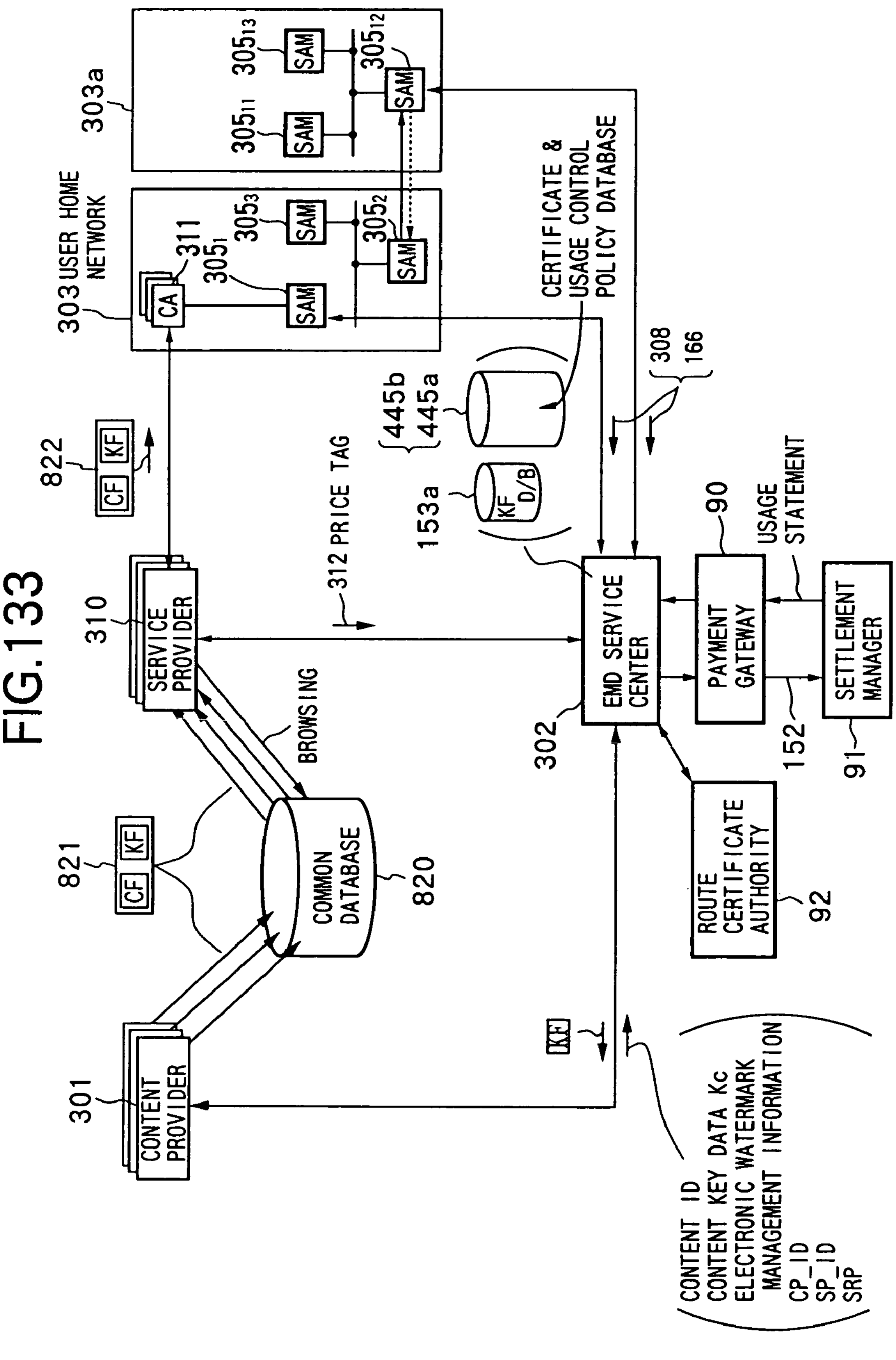
FIG. 133 is a view for explaining the EMD system of a fifth embodiment of the present invention.

FIG. 133 is a view for explaining the EMD system of a fifth embodiment of the present invention.

In the EMD system of the present embodiment, the Content provider 301 produces for example the content file CF shown in FIG. 5A.

Also, the content provider 301 sends the content ID of the content data, content key data Kc, electronic watermark management information (contents of the electronic watermark information to be buried in the content data and the burial position information), identifier CP_ID of the content provider 301, identifier SP_ID of the service provider 310 providing the content data, and the suggested retailer's price SRP of the content data to the EMD service center 302, and the key file KF shown in FIG. 5B is produced in the EMD service center 302.

The EMD service center 302 sends the produced key files KF to the content provider 301.

Also, the EMD service center 302 stores the key files KF in the KF database 153*a* and centrally manages the key files KF by using the content ID allocated to individual content data. At this time, the content ID is produced by for example the EMD service center 302 and globally uniquely determined for all of the content data provided by a plurality of content providers 301.

Next, in the content provider 301, a secure container 821 storing the produced content files CF and the key files KF received from the EMD service center 302 is produced, and the secure container 821 is stored in a common database 820.

In the common database 820, secure containers 821 provided by a plurality of content providers 301 are centrally managed by using the content ID.

The service provider 310 browses (searches through) the common database 820 by using for example the content ID, receives the intended secure container 821 from the common database 820, produces a secure container 822 obtained by further storing the price tag data 312 indicating the sales price of the content etc. in the secure container 821, and distributes the secure container 822 to the user home network 303.

In the user home network 303, the secure container 822 is provided to the SAM $305_1$ etc. via the CA module 311 in the case of on-line, in the SAM $305_1$ etc., the content key data Kc and the usage control policy data 106 etc. stored in the key files KF are decrypted by using the distribution use key data $KD_1$ to $KD_3$ or the like, and the handling such as the purchase form of the content data stored in the content files CF is determined based on the decrypted usage control policy data 106.

Also, in the SAM $305_1$, etc., the usage log data 308 indicating the purchase log etc. of the content data is produced, and the usage log data 308 is transmitted to the EMD service center 302.

Also, where the secure container 822 is distributed from the SAM $305_2$ of the user home network 303 to the SAM $305_{12}$ of the user home network 303*a*, processing similar to that in the SAM $305_2$ is carried out in the SAM $305_{12}$, and the usage log data 308 is transmitted from the SAM $305_{12}$ to the EMD service center 302.

Note that, the processings with respect to the secure container 807 in the user home networks 303 and 303*a* are the same as the processings in the user home networks 103 and 303 in the above first embodiment and the second embodiment.

Also, in the example shown in FIG. 133, the case where the secure containers storing the content files CF and the key files KF were sent from the content provider 301 to the common database 820, from the common database 820 to the service provider 310, and from the service provider 310 to the user home network 303 (the case of in-band) was exemplified, but it is also possible to separately transmit the content files CF and the key files KF by the same route (the case of out-of-band).

Figure 134:
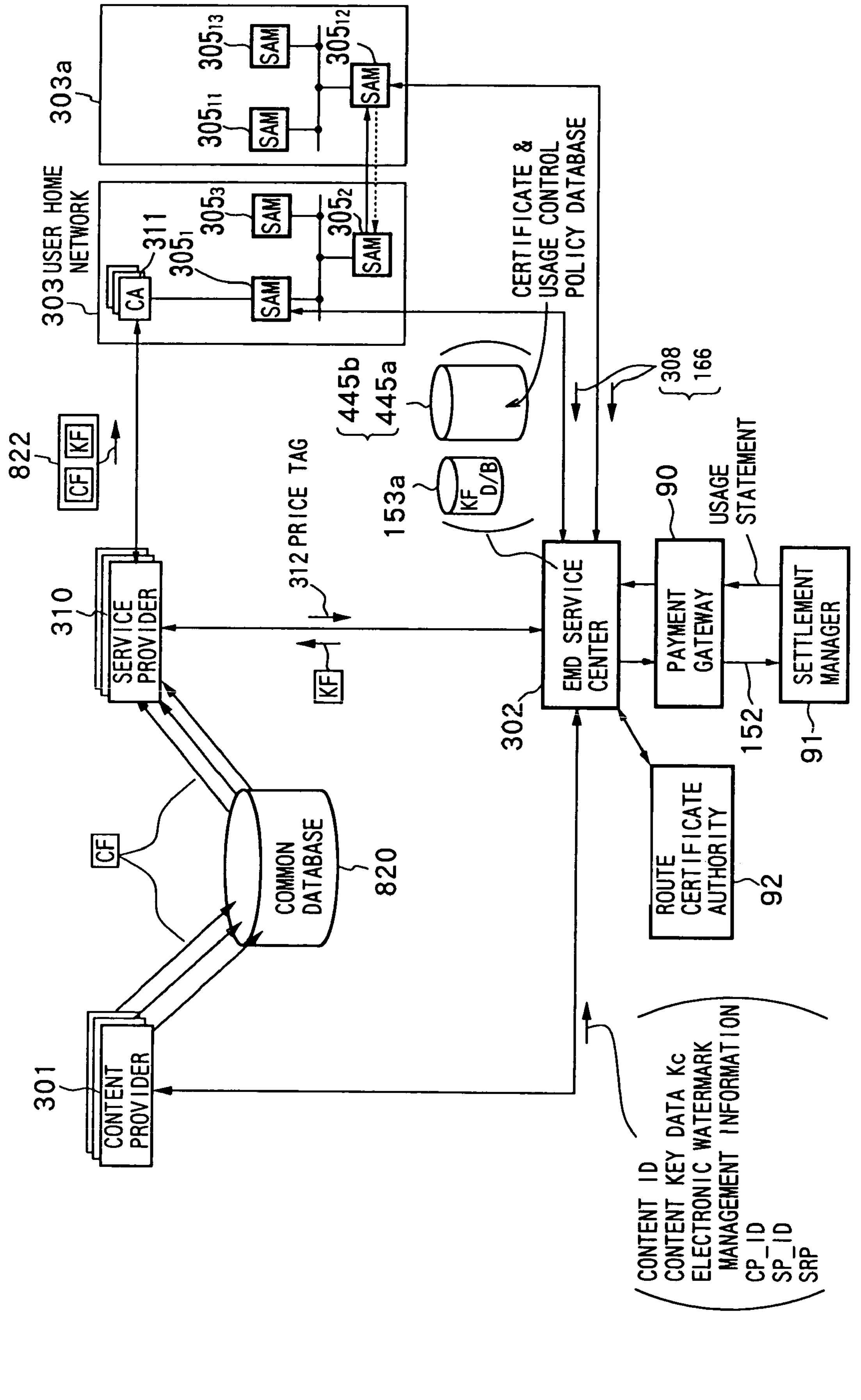
FIG. 134 is a view for explaining a modification of the EMD system of the fifth embodiment of the present invention.

Also, as shown in FIG. 134, it is also possible if the content files CF are stored in the common database 820 from the content providers 301, the service provider 310 obtains the content files CF from the common database 820 and, at the same time, the key files KF are sent from the EMD service center 302 to the service provider 310. In this case, the service provider 310 produces the secure container 822 by storing the content files CF obtained from the common database 820, the key files KF obtained from the EMD service center 302, and the price tag data 312.

The common database 820 centrally manages the content files CF by using the content IDs globally uniquely attached to the content data provided by a plurality of content providers 301.

Figure 135:
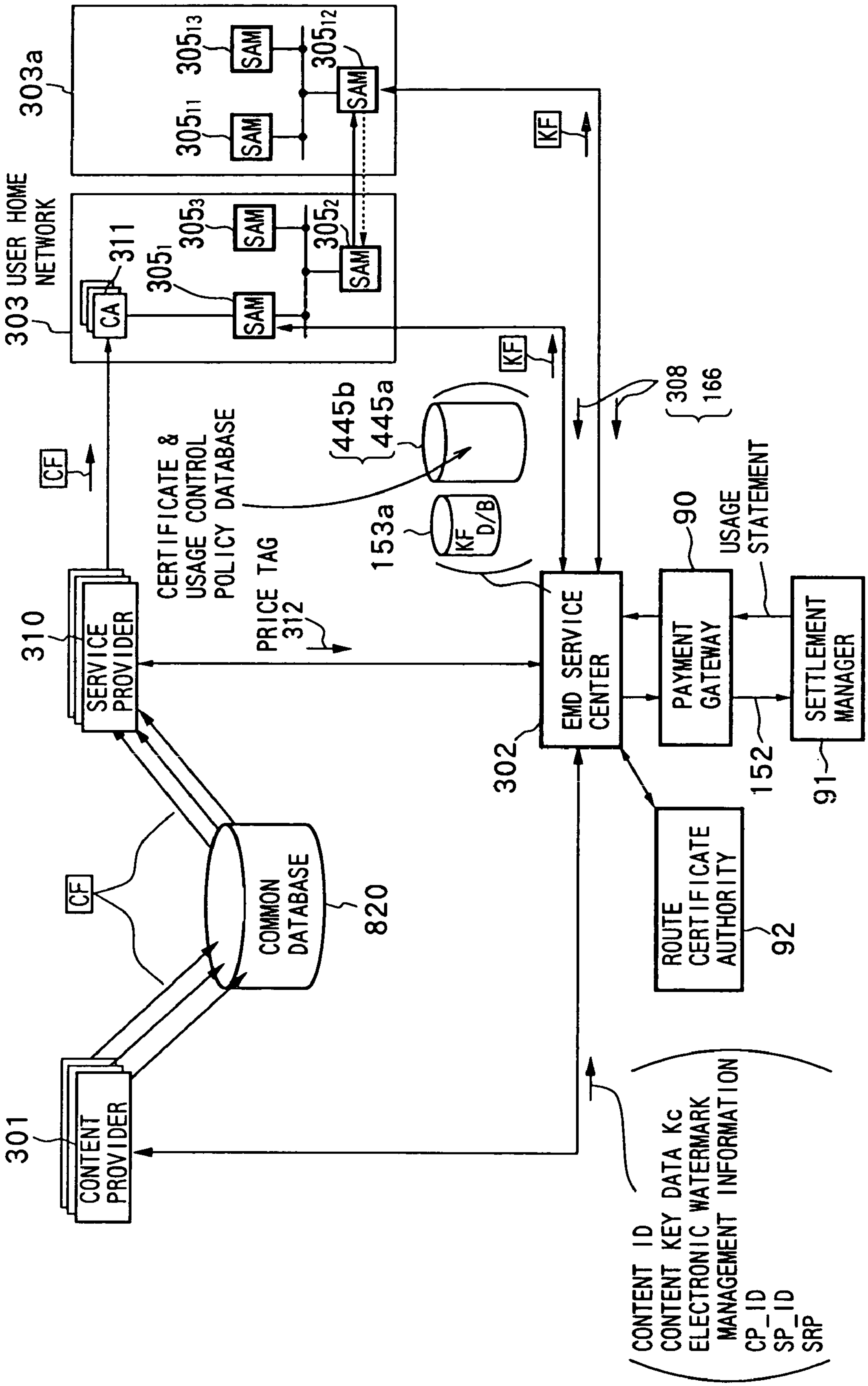
FIG. 135 is a view for explaining another modification of the EMD system of the fifth embodiment of the present invention.

Also, as shown in FIG. 135, it is also possible if the key files KF produced by the EMD service center 302 are sent to the SAMs $\mathbf{305}_1$, $\mathbf{305}_{12}$, etc. of the user home networks 303 and 303*a*. In this case, the service provider 310 distributes the content files CF to the user home network 303.

The price tag data 312 may be distributed to the user home network 303 by the service provider 310 too or may be distributed to the user home networks 303 and 303*a* by the EMD service center 302 too.

Sixth Embodiment

Figure 136:
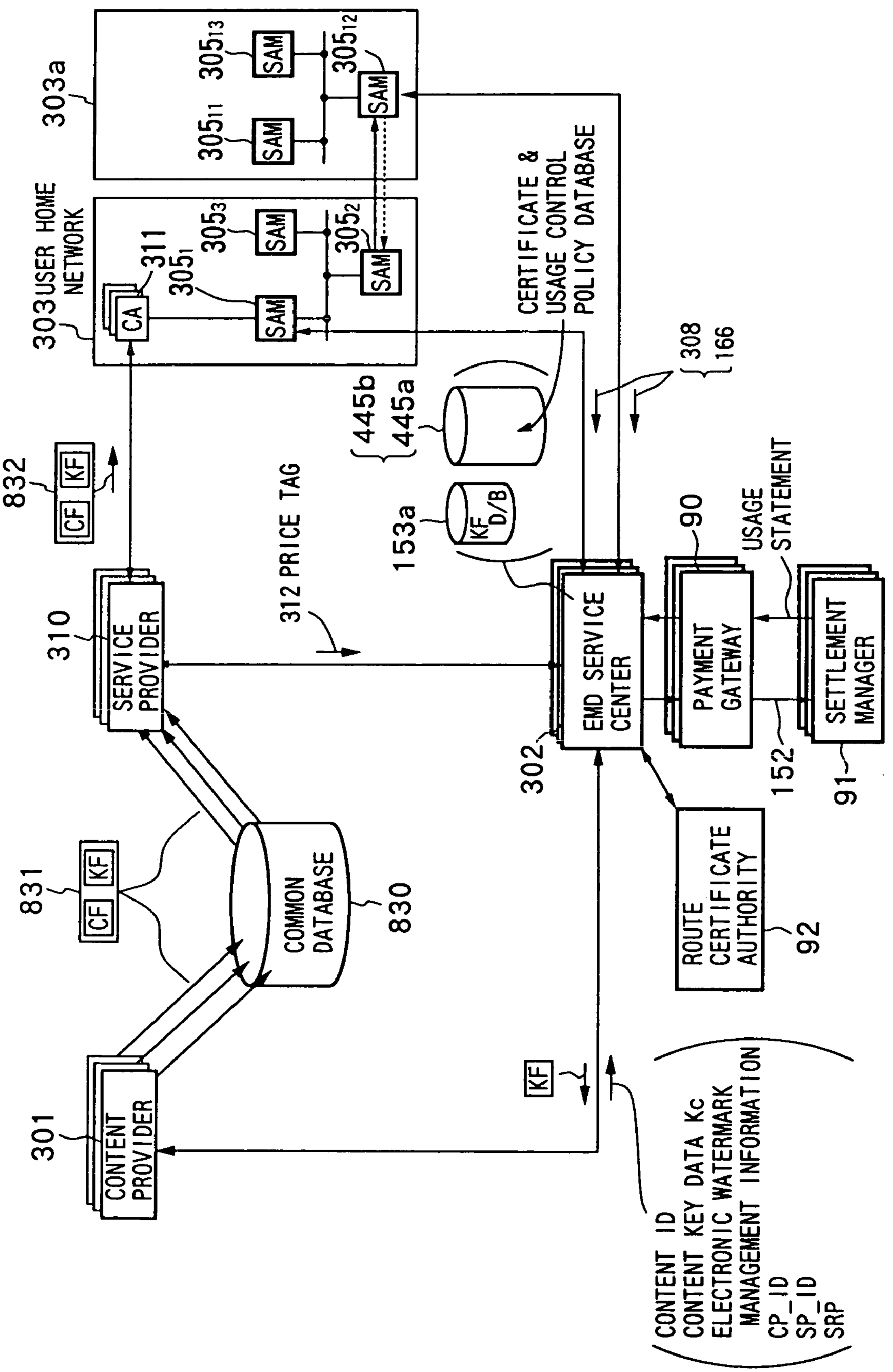
FIG. 136 is a view for explaining the EMD system of a sixth embodiment of the present invention.

FIG. 136 is a view for explaining the EMD system of a sixth embodiment of the present invention.

When compared with the EMD system shown in FIG. 133 mentioned above, the EMD system of the present embodiment is different in the characteristic features that a plurality of EMD service centers 302 are provided and that the content provider 301 performs the charge processing etc. with the corresponding EMD service centers 302, but is substantially the same in points other than that.

The content provider 301 produces for example the content file CF shown in FIG. 5A.

Also, the content provider 301 sends the content ID of the content data, content key data Kc, electronic watermark management information (contents of the electronic watermark information to be buried in the content data and the burial position information), identifier CP_ID of the content provider 301, identifier SP_ID of the service provider 310 providing the content data, and the suggested retailer's price SRP of the content data to one EMD service center 302 selected by itself (or determined in advance) among a plurality of EMD service centers 302, and the key file KF shown in FIG. 5B is produced in the EMD service center 302.

Also, the EMD service center 302 sends the produced key files KF to the corresponding content provider 301.

Also, the EMD service center 302 stores the key files KF in the KF database 153*a* and centrally manages the key files KF by using the content IDs allocated to individual content data. At this time, the content IDs are produced by for example the EMD service center 302 and globally uniquely determined for the content data corresponding to all secure containers 831 stored in the common database 830.

Next, in the content provider 301, a secure container 831 storing the produced content files CF and the key files KF received from the EMD service center 302 is produced, and the secure container 831 is stored in a common database 820.

In the common database 830, secure containers 831 provided by a plurality of content providers 301 are centrally managed by using the content IDs.

The service provider 310 browses (searches through) the common database 820 by using for example the content ID, receives the intended secure container 831 from the common database 820, produces a secure container 832 obtained by further storing for example the price tag data 312 indicating the sales price of the content in the secure container 831, and distributes the secure container 832 to the user home network 303.

In the user home network 303, the secure container 832 is provided to the SAM $\mathbf{305}_1$ etc. via the CA module 311 in the case of on-line, in the SAM $\mathbf{305}_1$ etc., the content key data Kc and the usage control policy data 106 etc. stored in the key files KF are decrypted by using the distribution use key data $KD_1$ to $KD_3$ or the like, and the handling such as the purchase form of the content data stored in the content files CF is determined based on the decrypted usage control policy data 106.

Also, in the SAM $\mathbf{305}_1$ etc., the usage log data 308 indicating the purchase log etc. of the content data is produced, and the usage log data 308 is transmitted to the EMD service center 302.

Also, where the secure container 822 is distributed from the SAM $\mathbf{305}_2$ of the user home network 303 to the SAM $\mathbf{305}_{12}$ of the user home network 303*a*, processing similar to that in the SAM $\mathbf{305}_2$ is carried out in the SAM $\mathbf{305}_{12}$, and the usage log data 308 is transmitted from the SAM $\mathbf{305}_{12}$ to the EMD service center 302.

Note that, the processings with respect to the secure container 807 in the user home networks 303 and 303*a* are the same as the processings in the user home networks 103 and 303 in the above first embodiment and the second embodiment.

Also, in the example shown in FIG. 136, the case where the secure containers storing the content files CF and the key files KF were sent from the content provider 301 to the common database 830, from the common database 830 to the service provider 310, and from the service provider 310 to the user home network 303 (the case of in-band) was exemplified, but it is also possible to separately transmit the content files CF and the key files KF by the same route (the case of out-of-band).

Figure 137:
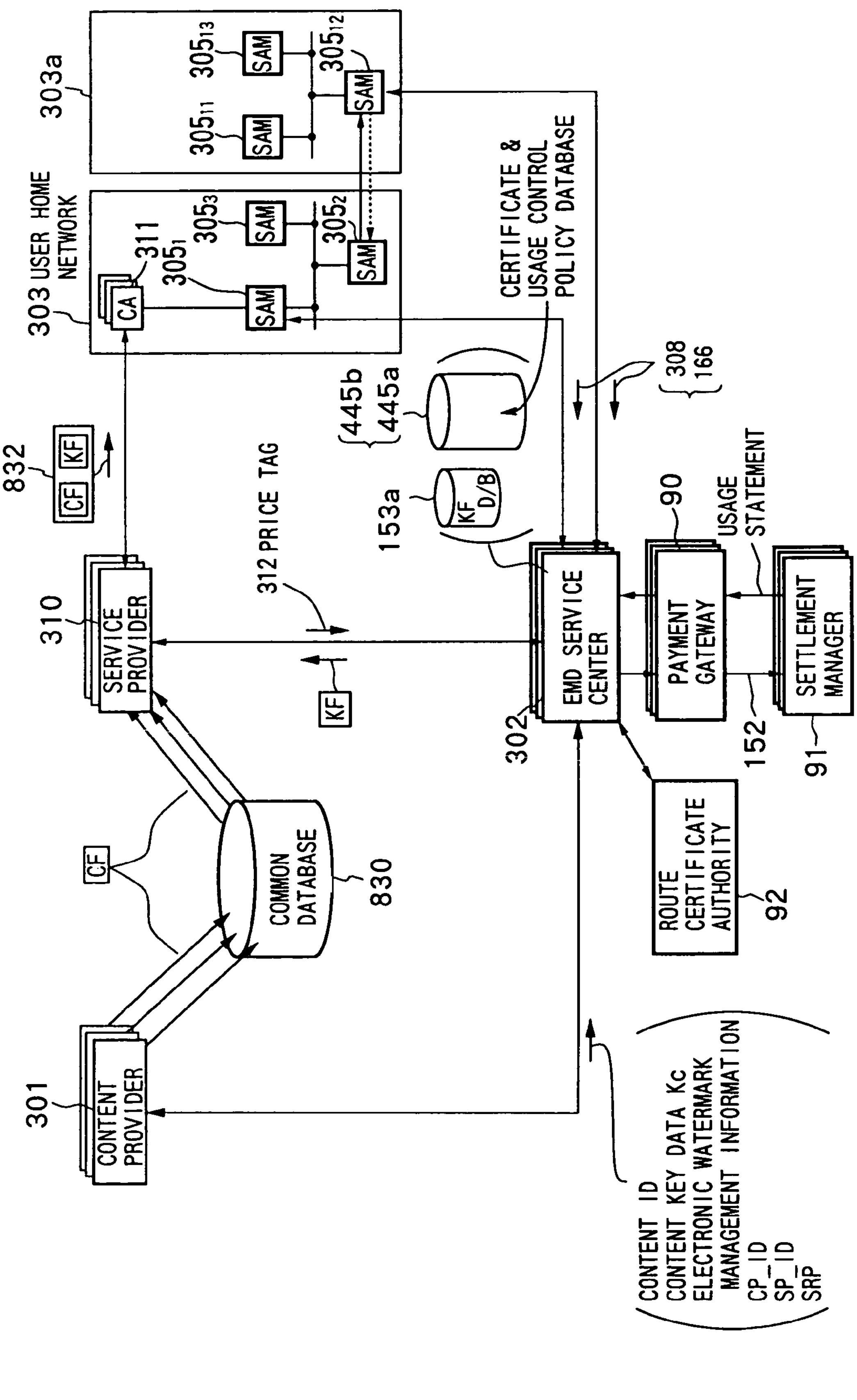
FIG. 137 is a view for explaining a modification of the EMD system of the sixth embodiment of the present invention.

Also, as shown in FIG. 137, it is also possible if the content files CF are stored in the common database 830 from the content providers 301, the service provider 310 obtains the content files CF from the common database 830 and, at the same time, the key files KF are sent from the EMD service center 302 to the service provider 310. At this time, the key file KF is sent to the content provider 301 from the EMD service center 302 corresponding to the content provider 301 produced the content file CF obtained by the service provider 310.

The service provider 310 stores the content file CF obtained from the common database 830, the key file KF obtained from the EMD service center 302, and the price tag data 312 to produce the secure container 832.

The common database 830 centrally manages the content files CF by using the content IDs globally uniquely attached to the content data provided by a plurality of content providers 301.

Figure 138:
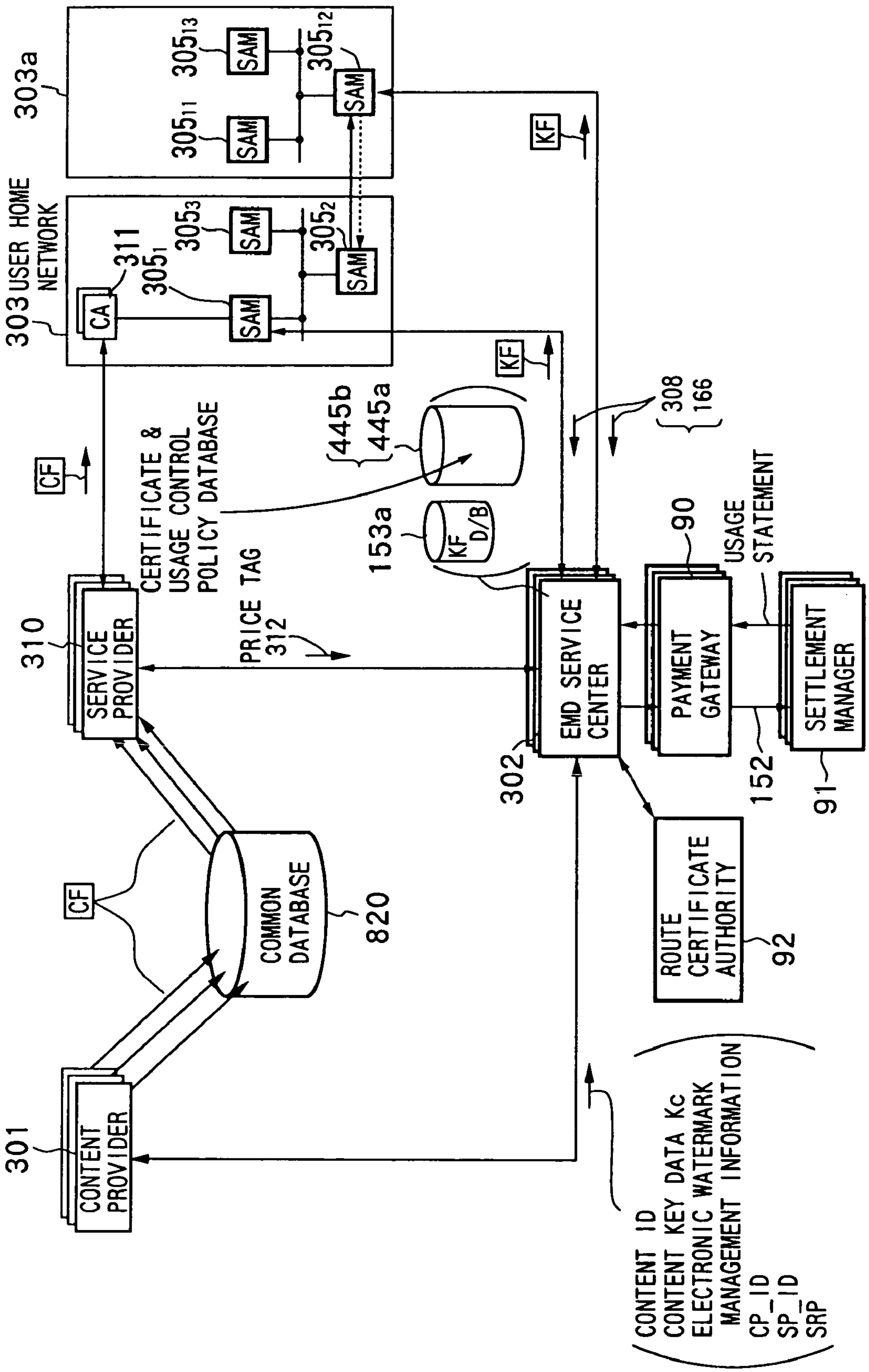
FIG. 138 is a view for explaining another modification of the EMD system of the sixth embodiment of the present invention.

Also, as shown in FIG. 138, it is also possible if the key files KF produced by the EMD service center 302 are sent to the SAMs $\mathbf{305}_1$, $\mathbf{305}_{12}$, etc. of the user home networks 303 and 303*a*. Also at this time, the key files KF are sent to the SAMs $\mathbf{305}_1$, $\mathbf{305}_{12}$, etc. from the EMD service center 302 corresponding to the content providers 301 preparing the content files CF provided to the SAM $\mathbf{305}_1$, $\mathbf{305}_{12}$, etc.

Also, the service provider 310 distributes the content files CF to the user home network 303. The price tag data 312 may be distributed by the service provider 310 to the user home network 303 too or may be distributed by the EMD service center 302 to the user home networks 303 and 303*a*.

Seventh Embodiment

Figure 139:
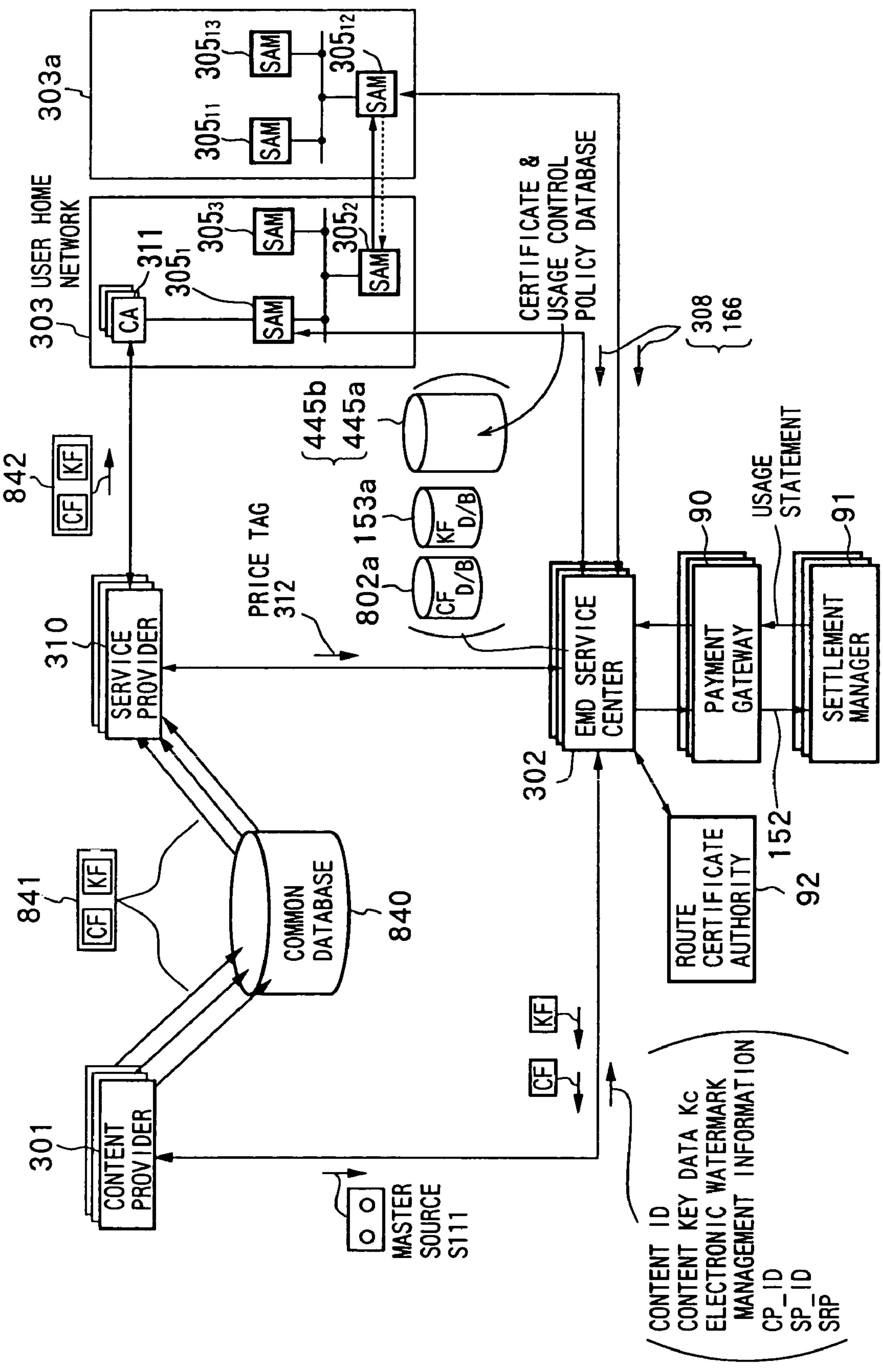
FIG. 139 is a view for explaining the EMD system of a seventh embodiment of the present invention.

FIG. 139 is a view for explaining the EMD system of a seventh embodiment of the present invention.

The EMD system of the present embodiment is different when compared with the EMD system shown in FIG. 136 mentioned above in the point that the master source S111 of the content data is sent from the content provider 301 to the EMD service center 302 and the content file CF is produced in the EMD service center 302. The points other than that are substantially the same.

The content provider 301 sends the master source S111 of the content data to one EMD service center 302 selected by itself (or determined in advance) among a plurality of EMD service centers 302, and the content file CF shown in FIG. 5A is produced in the EMD service center 302.

The EMD service center 302 sends the produced content file CF to the corresponding content provider 301.

Also, the content provider 301 sends the content ID of the content data, content key data Kc, electronic watermark management information (contents of the electronic watermark information buried in the content data), identifier CP_ID of the content provider 301, identifier SP_ID of the service provider 310 providing the content data, and the suggested retailer's price data SRP of the content data to the above one corresponding EMD service center 302, and the key file KF shown in FIG. 5B is produced in the EMD service center 302.

The EMD service center 302 sends the produced key file KF to the corresponding content provider 301.

Also, the EMD service center 302 stores the content files CF in the CF database 802*a*, stores the key files KF in the KF database 153*a*, and centrally manages the content files CF and the key files KF by using the content IDs allocated to the individual content data. At this time, the content IDs are produced by for example the EMD service center 302 and globally uniquely determined for the content data corresponding to all secure containers 831 stored in the common database 840.

Next, in the content provider 301, a secure container 841 storing the content file CF and the key file KF received from the corresponding EMD service center 302 is produced, and the secure container 841 is stored in the common database 840.

In the common database 840, secure containers 841 provided by a plurality of content providers 301 are centrally managed by using the content ID.

The service provider 310 browses (searches through) the common database 840 by using for example the content ID, receives the intended secure container 841 from the common database 840, produces a secure container 842 obtained by further storing for example the price tag data 312 indicating the sales price of the content in the secure container 841, and distributes the secure container 842 to the user home network 303.

In the user home network 303, the secure container 842 is provided to the SAM 305$_1$ etc. via the CA module 311 in the case of on-line, in the SAM 305$_1$ etc., the content key data Kc and the usage control policy data 106 etc. stored in the key files KF are decrypted by using the distribution use key data $KD_1$ to $KD_3$ or the like, and the handling such as the purchase form of the content data stored in the content files CF is determined based on the decrypted usage control policy data 106.

Also, in the SAM 305$_1$ etc., the usage log data 308 indicating the purchase log etc. of the content data is produced, and the usage log data 308 is transmitted to the EMD service center 302.

Also, where the secure container 822 is distributed from the SAM 305$_2$ of the user home network 303 to the SAM 305$_{12}$ of the user home network 303*a*, processing similar to that in the SAM 305$_2$ is carried out in the SAM 305$_{12}$, and the usage log data 308 is transmitted from the SAM 305$_{12}$ to the EMD service center 302.

Note that, the processings with respect to the secure container 807 in the user home networks 303 and 303*a* are the same as the processings in the user home networks 103 and 303 in the above first embodiment and the second embodiment.

Also, in the example shown in FIG. 139, the case where the secure containers storing the content files CF and the key files KF were sent from the content provider 301 to the common database 840, from the common database 840 to the service provider 310, and from the service provider 310 to the user home network 303 (the case of in-band) was exemplified, but it is also possible to separately transmit the content files CF and the key files KF by the same route (the case of out-of-band).

Figure 140:
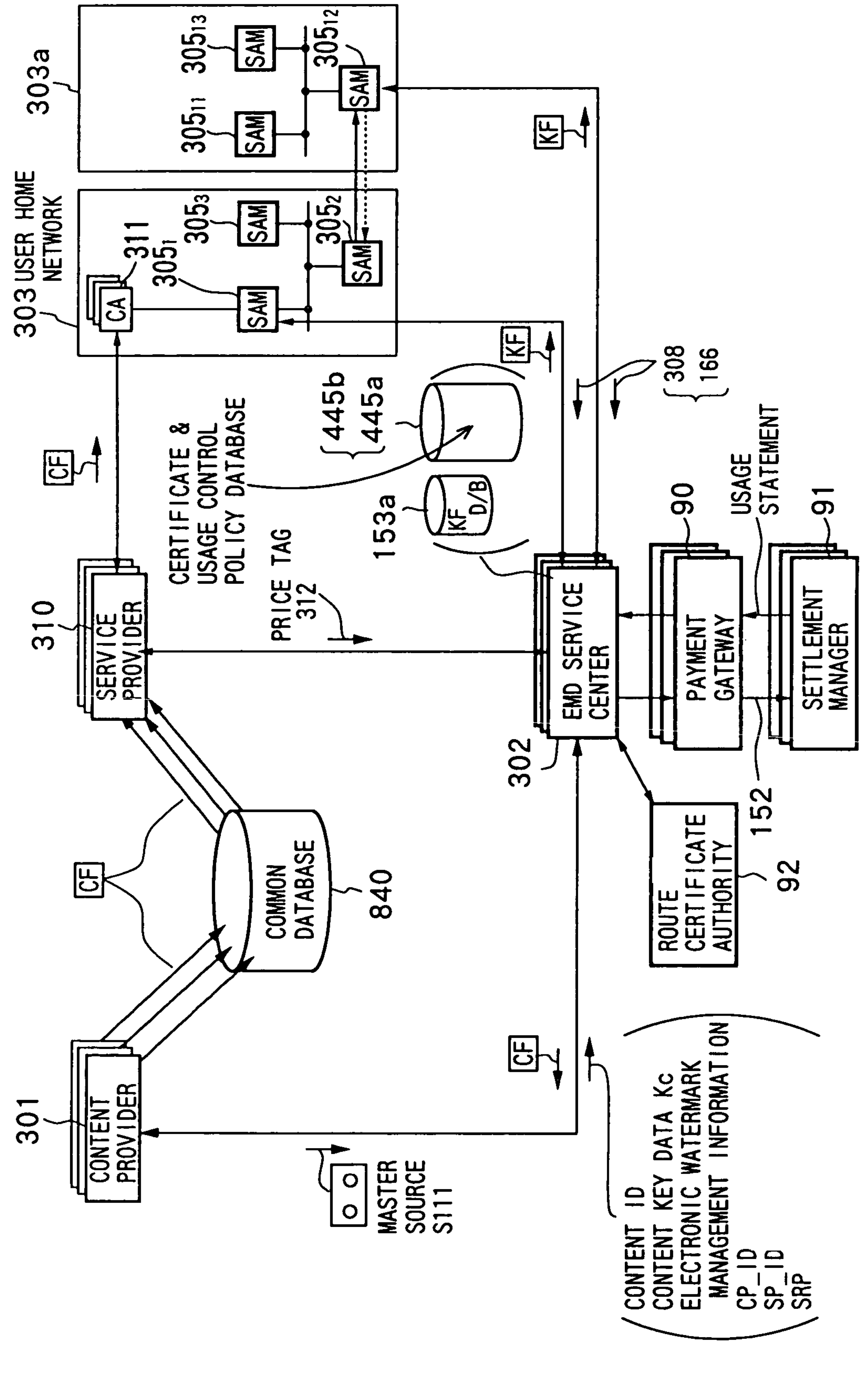
FIG. 140 is a view for explaining a modification of the EMD system of the seventh embodiment of the present invention.

Also, as shown in FIG. 140, it is also possible if the content files CF are stored in the common database 830 from the content providers 301, the service provider 310 obtains the content files CF from the common database 840 and, at the same time, the key files KF are sent from the EMD service center 302 to the service provider 310. At this time, the key files KF are sent to the content provider 301 from the EMD service center 302 corresponding to the content providers 301 preparing the content files CF obtained by the service provider 310.

The service provider 310 stores the content file CF obtained from the common database 840, the key-file KF obtained from the EMD service center 302, and the price tag data 312 to produce the secure container 842.

The common database 830 centrally manages the content files CF by using the content IDs globally uniquely attached to the content data provided by a plurality of content providers 301.

Figure 141:
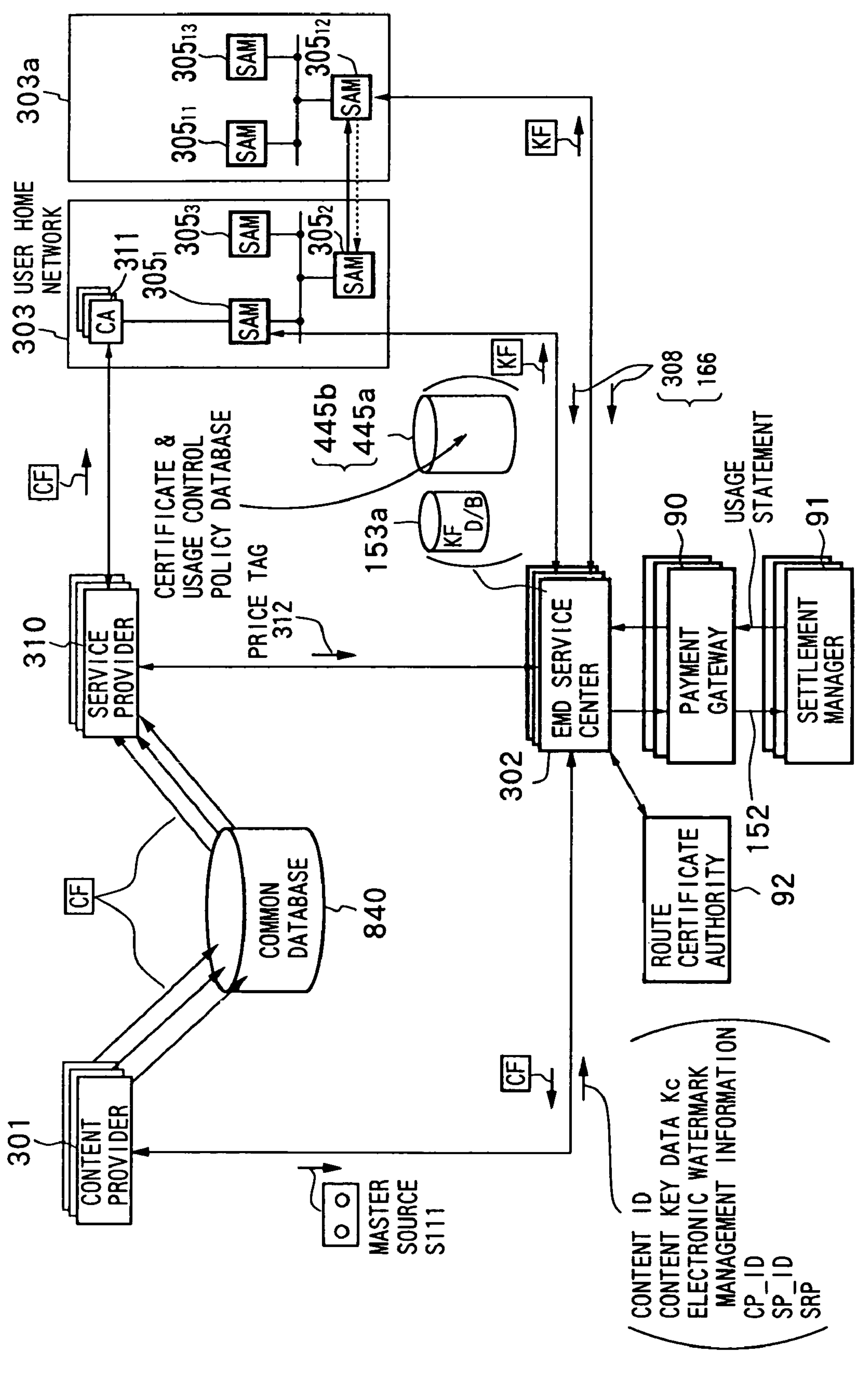
FIG. 141 is a view for explaining another modification of the EMD system of the seventh embodiment of the present invention.

Also, as shown in FIG. 141, it is also possible if the key files KF produced by the EMD service center 302 are sent to the SAMs 305$_1$, 305$_{12}$, etc. of the user home networks 303 and 303*a*. Also at this time, the key files KF are sent to the SAMs 305$_1$, 305$_{12}$, etc. from the EMD service center 302 corresponding to the content providers 301 preparing the content files CF provided to the SAMs 305$_1$, 305$_{12}$, etc.

Also, the service provider 310 distributes the content files CF to the user home network 303. The price tag data 312 may be distributed by the service provider 310 to the user home network 303 too or may be distributed by the EMD service center 302 to the user home networks 303 and 303*a*.

Eighth Embodiment

Figure 142:
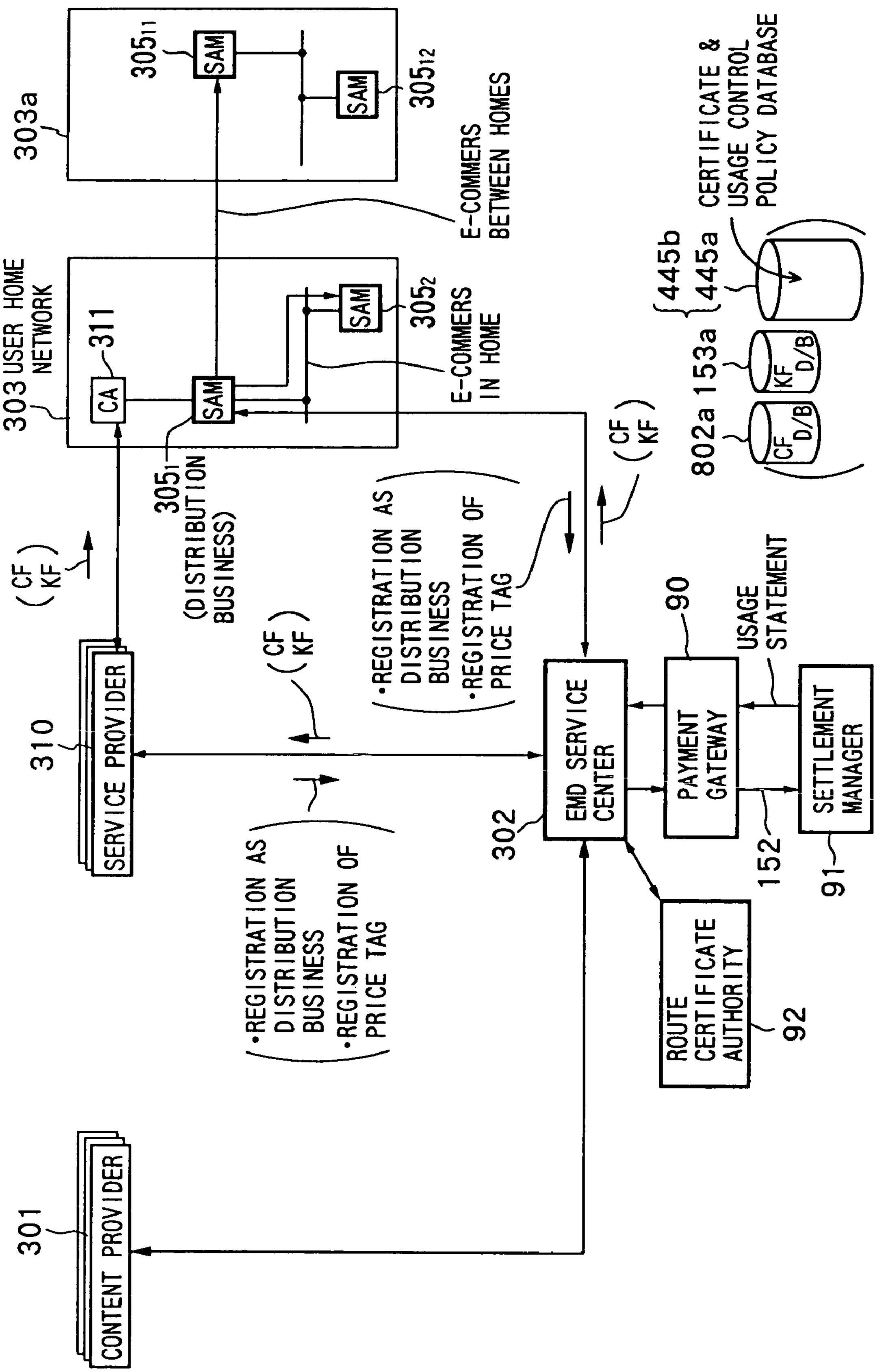
FIG. 142 is a view for explaining the EMD system of an eighth embodiment of the present invention.

FIG. 142 is a view for explaining the EMD system of an eighth embodiment of the present invention.

In the EMD system of the present embodiment, for example, the content file CF shown in FIG. 5A produced by the EMD service center 302 by using the master source provided from the content provider 301 to the EMD service center 302 or the content file CF shown in FIG. 5A produced by the content provider 301 and provided to the EMD service center 302 and the key file KF shown in FIG. 5B produced by the EMD service center 302 are distributed by the EMD service center 302 via the service provider 310 or directly to the SAM 305$_1$ of the user home network 303.

Here, the service provider 310 sends the price tag data 312 indicating the sales price of the content file CF to the user home network 303 and, at the same time, registers and authenticates the price tag data 312 in the EMD service center 302.

Also, the service provider 310 registers itself in the EMD service center 302 as the distribution business.

In the EMD system of the present embodiment, for example, the SAM 305$_1$ of the user home network 303 becomes the distribution business for distributing the content files CF and key files KF obtained from the service provider 310 or the EMD service center 302 to the SAM $305_2$ in the user home network 303 and/or SAM $305_{12}$ etc. in the user home network 303a.

Note, in this case, for example, the EMD service center 302 prohibits selling (redistributing) the purchased content data C while adding a certain sales margin to obtain a profit after the SAM $305_1$ purchases the content data C stored in the content file CF.

In the EMD system of the present embodiment, it is permitted to the SAM $305_1$ to copy the content data C to another SAM under the condition that content data for which the purchase form is not determined or content data C for which reproduction charge is determined as the purchase form is redistributed without a sale profit margin. Note that, this will be referred to as inter-apparatus redistribution.

Also, in the EMD system of the present embodiment, inter-apparatus trade in a form without a sale profit margin is permitted for a content file CF (or secure container) distributed from the service provider 310 to the SAM $305_1$.

Also, in the present embodiment, where the SAM $305_1$ performs sells (distributes) the content data C in a form taking a sales profit margin, the SAM $305_1$ registers itself in the EMD service center 302 as distribution business and receives permission and, at the same time, registers the price tag data 312 indicating the sales price of the content data C in the EMD service center 302. Then, it directly receives the content file CF and the key file KF from the CF database 802a and the KF database 153a in the EMD service center 302 not via the service provider 310.

Ninth Embodiment

Figure 143:
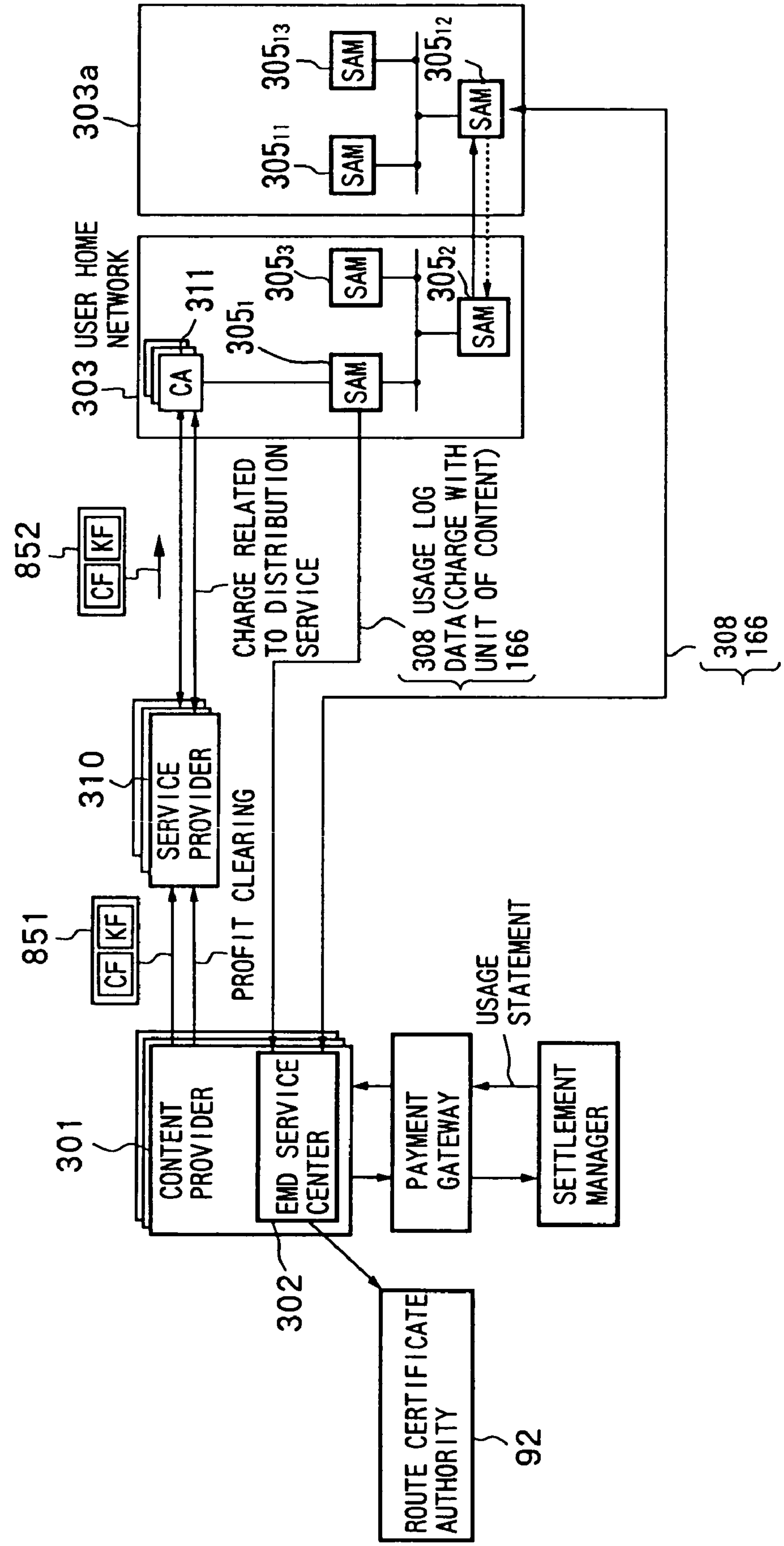
FIG. 143 is a view for explaining the EMD system of a ninth embodiment of the present invention.

FIG. 143 is a view for explaining the EMD system of a ninth embodiment of the present invention.

In the EMD system of the present embodiment, the characteristic feature resides in that each of the content providers 301 functions as an EMD service center 302 in addition functioning as a content provider.

In this case, where there are a plurality of content providers, each content provider 301 functions as an EMD service center 302.

A content provider 301 distributes a secure container 851 storing the content file CF and the key file KF to the service provider 310.

The service provider 310 further adds the price tag data 312 to the content file CF and the key file KF stored by the secure container 851 to produce a secure container 852 and distributes this to the user home network 303.

In the user home networks 303 and 303a, the purchase form etc. of the content file CF are determined based on the usage control policy data 106 stored in the key file KF, the usage log data 308 in accordance with that is produced, and this is transmitted to the EMD service center 302 in the content provider 301.

At this time, the usage log data 308 is produced for every content provider 301.

The EMD service center 302 of the content provider 301 distributes the profit paid by the users of the SAMs $305_1$ and $305_{12}$ with the corresponding service provider 310 based on the usage log data 308.

Also, the log data concerning the distribution service is sent from the CA module 311 of the user home network 303 to the corresponding service provider 310, whereby the charge processing with respect to the distribution service is carried out in the service provider 310.

The present invention is not limited to the above embodiments.

In the above embodiments, the case where audio data was used as the content data was exemplified, but it is also possible to use video data, audio and/or video data, text data, and a computer program or the like as the content data.

Also, in the above embodiments, the case where the key files KF were produced in the EMD service centers 102 and 302 was exemplified, but it is also possible to produce the key files KF in the content providers 101 and 301.

Figure 144:
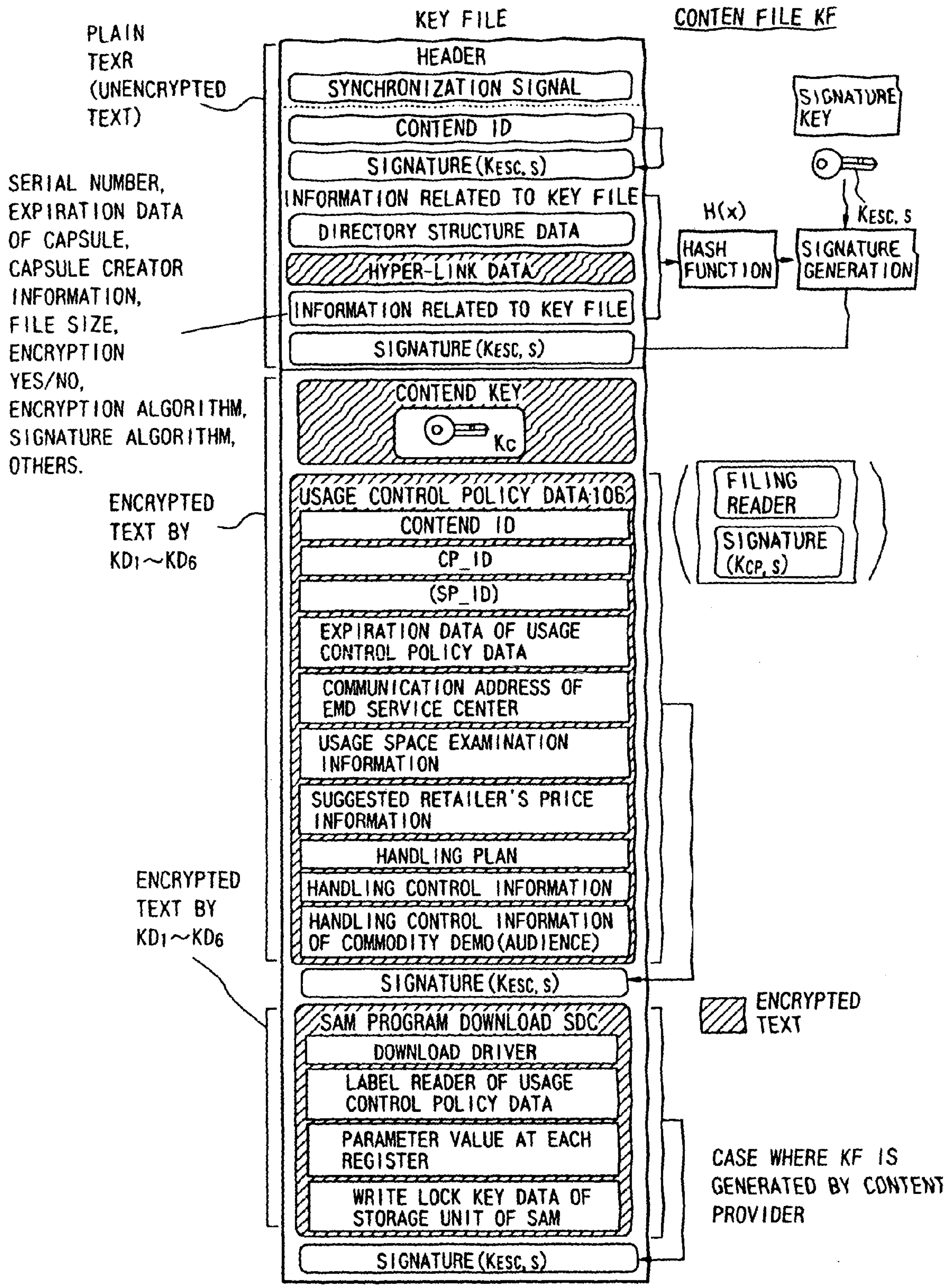
FIG. 144 is a view for explaining the format of the key file in a case where the key file is produced in the content provider.
Figure 145:
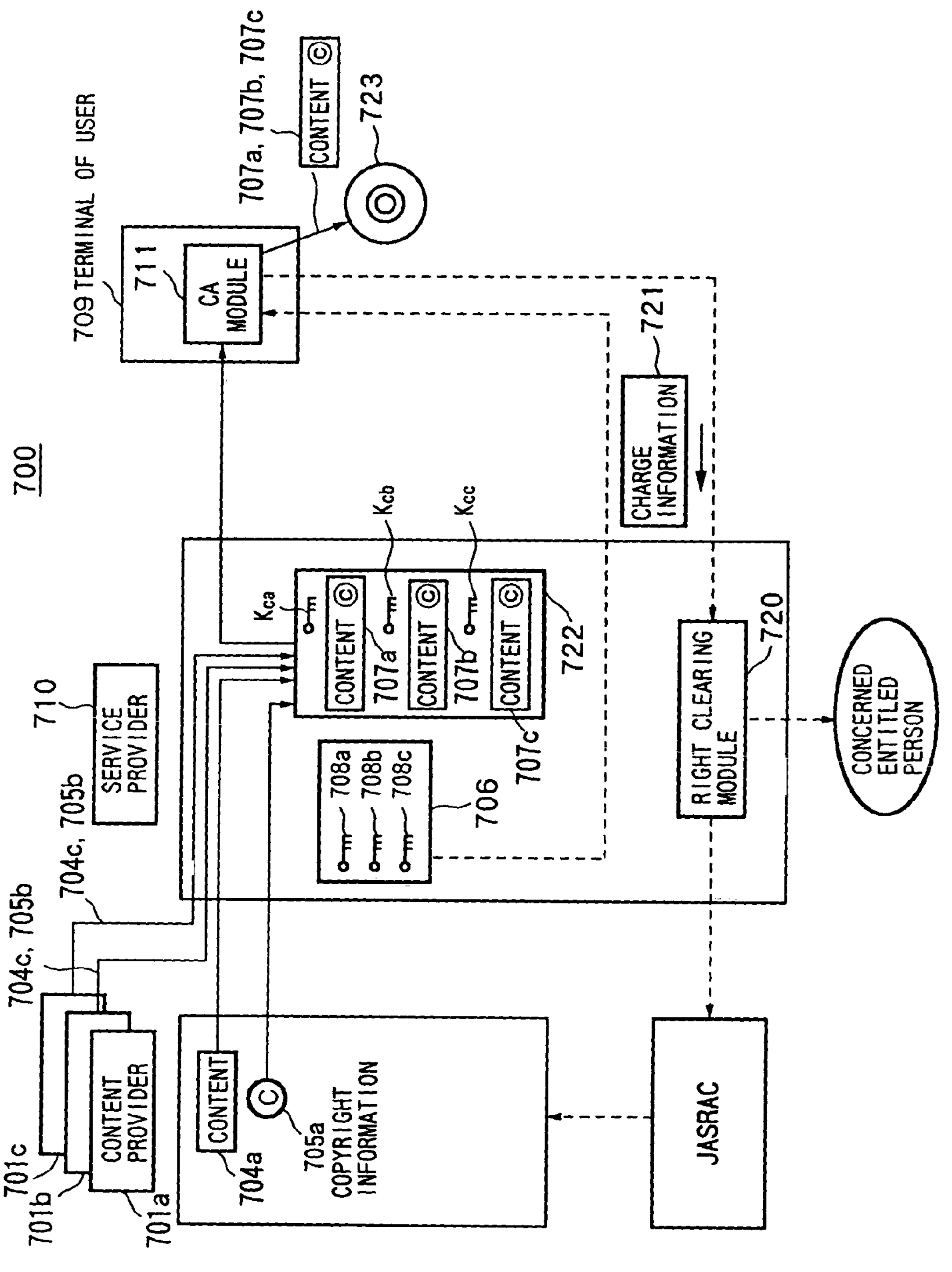
FIG. 145 is a view of the configuration of a conventional EMD system.

In this case, the format of the key file KF corresponding to FIG. 7 becomes as shown in FIG. 144. As shown in FIG. 144, the related key file KF has basically the same information as the key file KF shown in FIG. 7 except that signature data produced by using the secret key data $K_{CP,S}$ of the content providers 101 and 301 are used.

Also, in the above embodiments, the case where the usage control status data 166 is transmitted from the user home networks 103 and 303 to the EMD service centers 102 and 302 in real time was exemplified, but it is also possible if the usage control status data 166 is transmitted to the content providers 101 and 301 and/or service provider 310. By this, the content providers 101 and 301 and the service provider 310 can quickly grasp the purchase situation of the contents provided and distributed by themselves and can reflect the same in their service thereafter.

Below, effects by the EMD system of the above embodiments will be explained again while mentioning the related art and the problems thereof.

With the ROM type storage media which had been used as the means for distributing digital content (content data) in the days when digital broadcasts (data broadcasts) and the Internet and other digital networks were not so developed, the digital content was stored and distributed in an unencryped state. In the days when the digital network was not so developed, it was enough to consider methods for preventing casual copying by users on the user home network for the protection of the copyrights of these contents.

In recent days where the digital network has been developed, however, since ROM type storage media carrying unencrypted content can be obtained by general citizens anytime and everywhere, any individual can purchase one and easily compress and upload the data on the network. Particularly, the Internet is a network connecting the entire world. Therefore, it becomes possible to freely upload the unencrypted content on the Internet and for people to download it on their own personal terminals. Accordingly, there has arisen a possibility of serious infringement of the copyrights of the owners of the content (content providers).

Further, it also becomes possible for people not to upload the content in the unencrypted state, but to bury electronic watermark information of their own in that content, encrypt the data, and charge for the data on their own and thereby deliberately sell the digital content on the Internet behind the scenes without the permission of the copyright owner. At this time, since a share of the sales is not returned to the owner of the content, the copyright of the owner of the content (content providers) will be seriously infringed.

Also, by getting the permission of the copyright owner and concluding a contract for returning part of the sales to the owner of content (content provider) in advance, it becomes possible to offer a distribution service capable of generating profit by distributing the digital content, but basically the content provider does not favor circulation by such a secondary usage of content. Rental, secondhand sale, etc. are other types of business by secondary usage of the content.

When a distribution service by secondary usage appears, the problem of infringement of copyrights is sure to occur, so a long time is taken for setting up the service in the right direction. The distribution service ends up being first started without establishing a contract with the content provider. After the problem of infringement of copyrights occurs, the distribution of profit to the owners and protection of the copyrights start to be considered and permission as the distribution service is obtained. The rental CD and the rental video businesses correspond to this. The secondhand sale of game software etc. is a serious problem. In the secondhand sale of game software, part of the profit from the sales is not returned to the owners of the content. The owners have brought court actions against this, but these have been dismissed. This is very hard on the owners. Secondhand game software is sold in large volumes with a price of half or less of new software, therefore the market is very attractive for the users and a large influence is exerted upon the sale of new software.

Secondary usage of content means when a user who purchases a ROM type storage medium on which digital content has been already stored by the owner of the content using the ROM type storage medium distributed as a circulating means to obtain a profit further circulates the product. The fact that the purchasing user obtains a profit is not considered desirable from the standpoint of the (content provider) owner even if part of the profit is returned to it. With movie content etc., the owner of the content is protected by law in the form of recording rights/distribution rights. When purchasing content which an owner circulates in the public, the assumption is that it not be circulated further from the purchasing user. Groups of owners of game software have raised suits at courts to suppress secondary usage businesses attempting to apply such distribution right to game software as well.

Owners of content want to get distributors distributing digital content which they hold copyrights to under their control (they would like to know to whom the content is being distributed to). When there is a distributor desiring to distribute digital content to which one holds a copyright so as to provide a distribution service and make a profit, a system is desirable by which the owner of the content can directly supply the digital content.

Note that the distributor spoken of here designates a business that obtains a profit by collecting the profit margin of a few percent with respect to the price of the digital content.

A case where a profit margin is collected when delivering digital content to another apparatus/storage medium is defined as a content trade session distribution service, while a case where a profit margin is not collected is defined as inter-apparatus redistribution. The latter is legal under the principle of supra-distribution.

In the current system for management of distribution of digital content over the network where the service provider authors the content of its own distribution service from a ROM type storage medium storing unencrypted content circulated by the content provider for a distribution service, when considering the situation where one digital content owned by the content provider is distributed by a plurality of service providers, irrespective of the fact that it is identical content, authoring is carried out so that the rights are cleared by a CA module/electronic settlement tool employed by each service provider. Therefore, the formats of the encryption key (content key data) to be used and the licensing conditions of the content (usage control policy data) are different according to each service provider, so common rights clearing rules cannot be provided on the user home network. In such a case, by settling up for all of the key data used by the CA modules/electronic settlement tools by the CA modules/electronic settlement tools of the network apparatuses and then following the SCMS rules, common rights clearing rules can be realized on the user home network.

Also, even if the content encrypted by the key of a CA module/electronic settlement tool and the key data are passed through the network apparatus as they are and stored on a storage medium of the storage apparatus via the user home network bus (IEEE1394 or the like) and the purchase and settlement processing of the content can be performed remotely through the network apparatus from an apparatus connected to the 1394 bus, since there is a descrambler for decrypting the encrypted content in the network apparatus, in the end, reproduction cannot be carried out unless the content and the key data are returned back to the network apparatus at the time of reproduction (network CA).

As explained above, the existence of the ROM type storage medium storing unencrypted content, which has been widely circulated in the world up to the present, is at the root of the problem for current digital content network distribution services. This is a system where the form of the digital content can be produced by a person other than the content provider and where a person selling the content to a user can obtain payment for it. Therefore, the profit of the content provider is illegitimately infringed by_secondary usage of the content. Also, the distribution of the authored digital content is not strictly managed by the content provider, therefore it is difficult to monitor all profits earned by the digital content which it holds a copyright to and if its share of the profits is being returned to it.

The EMD system of the embodiments explained above solves the conventional problems mentioned above.

Namely, in the EMD system of the present embodiment, the digital contents authored by the content provider are all managed in a database on the content provider side by preparing content format and usage control policy data on the content provider side. The usage control policy data of the content is further authenticated and registered in the EMD service center (clearinghouse) as a third party reliable authority manager.

By doing this, the interested parties of the content provider can place the rights clearing rules of the digital content completely under their control and manage the distribution channels at the content provider side. Also, in the present case, steps are taken so that a distributor interposed between the user cannot see the content of the data of the usage control policy produced at the content provider side.

Also, in the EMD system of the present embodiment, the ROM type storage medium is considered as one means of distribution and the existence of the digital content stored there is freed from the ROM type storage medium. A content format having value of existence by solely digital content without regard as to means of distribution and channels of distribution is proposed. The digital content is managed in a certain prescribed format on the content provider side. Therefore, by considering the mounting of the digital content of that format in a ROM type storage medium, whether the content is circulated as a ROM type storage medium or circulated over a digital network, it becomes possible to provide common rights clearing rules for ROM->RAM and for network->RAM on the user home network. This is provided so that sale sessions of the digital content are all defined and managed by the content provider. Due to this, common rights clearing not depending on the means of distribution or the channel of distribution becomes possible. Also, by stipulating this format of content defined at the content provider side as the minimum unit for trading the digital content, common rights clearing rules can be provided without regard as to the type of the content format used in the subsequent distribution process. By returning the charge information produced at the time of purchase at the user home network not to the service provider, but to the EMD service center as a third party reliable authority manager and returning it therefrom to the service provider, the problems of the business of secondary usage of content were solved.

As explained above, according to the present invention, it becomes possible to handling data in the data processing device of the content data provided by the data providing apparatus based on the usage control policy data of the data providing apparatus.

As a result, it becomes possible to suitably protect profit according to the content data by the interested party of the data providing apparatus and, at the same time, the load of the inspection by the related interested party can be reduced.

LIST OF REFERENCE NUMERALS

90 . . . payment gateway
91 . . . settlement manager
92 . . . route certificate authority
100, 300 . . . EMD system
101, 301 . . . content provider
102, 302 . . . EMD service center
103, 303 . . . user home network
104, 304 . . . secure container
$\mathbf{105}_1$ to $\mathbf{105}_4$, $\mathbf{305}_1$ to $\mathbf{305}_4$ . . . SAM
106 . . . usage control policy data
107, 307 . . . settlement report data
108, 308 . . . usage log data
$\mathbf{160}_1$ . . . network apparatus
$\mathbf{160}_2$ to $\mathbf{160}_4$ . . . AV apparatuses
152, 152*c*, 152*s* . . . settlement claim data
191 . . . bus
310 . . . service provider
311 . . . CA module
312 . . . price tag data
CF . . . content file
KF . . . key file
Kc . . . content key data

The invention claimed is:

1. A data providing system for distributing content data from a data providing apparatus to a data processing apparatus and managing said data providing apparatus and said data processing apparatus by a management apparatus, wherein
said management apparatus prepares a key file storing encrypted content key data and encrypted usage control policy data indicating a content of rights such as usage permission conditions of said content data,
said data providing apparatus provides said content data encrypted by using said content key data, and
said data processing apparatus decrypts said content key data and said usage control policy data stored in said key file and determines the handling of said content data based on the decrypted usage control policy data.

2. A data providing system as set forth in claim 1, wherein said management apparatus adds signature data for verification to the key file.

3. A data providing system as set forth in claim 1, wherein said data providing apparatus prepares a content file storing the content data and provides the content file to the data processing apparatus.

4. A data providing system as set forth in claim 3, wherein said data providing apparatus adds signature data for verification to the content file.

5. A data providing system as set forth in claim 1, wherein
the data providing apparatus prepares usage control policy data and sends it to said management apparatus,
said data processing apparatus determines at least one of the purchase form and the usage form of the distributed content data based on the usage control policy data and sends log data showing the log of at least one of the purchase form and the usage form decided to said management apparatus, and
said management apparatus performs profit distribution processing for distributing the profit obtained along with the purchase and usage of the content data in the data processing apparatus to the interested parties of the data providing apparatus based on the received log data.

6. A data providing method for distributing content data from a data providing apparatus to a data processing apparatus and managing said data providing apparatus and said data processing apparatus by a management apparatus, wherein
said management apparatus prepares a key file storing encrypted content key data and encrypted usage control policy data indicating a content of rights such as usage permission conditions of said content data,
said data providing apparatus provides said content data encrypted by using said content key data, and
said data processing apparatus decrypts said content key data and said usage control policy data stored in said key file and determines the handling of said content data based on the related decrypted usage control policy data.

7. A data providing apparatus which is managed by a management apparatus and distributes content data to a data processing apparatus,
receiving a key file storing encrypted content key data and encrypted usage control policy data indicating a content of rights such as usage permission conditions of said content data, and
distributing a module storing a content file storing the content data encrypted by using said content key data and said key file received from said management apparatus to said data processing apparatus.

8. A data processing apparatus managed by a management apparatus and utilizing content data,
receiving a module containing a key file storing encrypted content key data and encrypted usage control policy data indicating a content of rights such as usage permission conditions of said content data and a content file storing the content data encrypted by using said content key data,
determining at least one between a purchase form and an usage form of said content data based on said usage control policy data, and
transmitting a log data indicating the log of the determined at least one of the related purchase form and usage form to said management apparatus.

9. A data providing method which is managed by a management apparatus and distributes content data to a data processing apparatus,
receiving a key file storing encrypted content key data and encrypted usage control policy data indicating a content of rights such as usage permission conditions of said content data, and
distributing a module storing a content file storing the content data encrypted by using said content key data and said key file received from said management apparatus to said data processing apparatus.

10. A data processing method managed by a management apparatus and utilizing content data,
receiving a module containing a key file storing encrypted content key data and encrypted usage control policy data indicating a content of rights such as usage permission conditions of said content data and a content file storing the content data encrypted by using said content key data,
determining at least one between a purchase form and an usage form of said content data based on said usage control policy data, and
transmitting a log data indicating the log of the determined at least one of the related purchase form and usage form to said management apparatus.

* * * * *